(12) United States Patent
Smith

(10) Patent No.: US 9,417,754 B2
(45) Date of Patent: Aug. 16, 2016

(54) USER INTERFACE SYSTEM, METHOD, AND COMPUTER PROGRAM PRODUCT

(75) Inventor: Michael S. Smith, Palo Alto, CA (US)

(73) Assignee: P4TENTS1, LLC, Wilmington, DE (US)

( * ) Notice: Subject to any disclaimer, the term of this patent is extended or adjusted under 35 U.S.C. 154(b) by 439 days.

(21) Appl. No.: 13/567,004

(22) Filed: Aug. 3, 2012

(65) Prior Publication Data

US 2016/0188181 A1  Jun. 30, 2016

Related U.S. Application Data

(60) Provisional application No. 61/515,835, filed on Aug. 5, 2011, provisional application No. 61/566,577, filed on Dec. 2, 2011, provisional application No. 61/569,213, filed on Dec. 9, 2011, provisional application No. 61/581,918, filed on Dec. 30, 2011.

(51) Int. Cl.
*G06F 3/048* (2013.01)
*G06F 3/041* (2006.01)

(52) U.S. Cl.
CPC .............. *G06F 3/048* (2013.01); *G06F 3/041* (2013.01)

(58) Field of Classification Search
None
See application file for complete search history.

(56) References Cited

U.S. PATENT DOCUMENTS

| | | |
|---|---|---|
| 3,524,169 A | 8/1970 | McAuliffe et al. |
| 3,633,322 A | 1/1972 | Morcom et al. |
| 3,659,229 A | 4/1972 | Milton |
| 3,738,166 A | 6/1973 | Fisher |
| 3,772,685 A | 11/1973 | Masi |
| 3,777,222 A | 12/1973 | Harris |
| 4,067,060 A | 1/1978 | Poussart et al. |
| 4,091,418 A | 5/1978 | Ciciora |
| 4,152,649 A | 5/1979 | Choquet |

(Continued)

FOREIGN PATENT DOCUMENTS

| | | |
|---|---|---|
| WO | 2005/114369 | 1/2005 |
| WO | 2008/037275 | 4/2008 |

(Continued)

OTHER PUBLICATIONS

Kratz, Sven et al., "Gesture Recognition Using Motion Estimation on Mobile Phones," 2007, pp. 1-5.

(Continued)

*Primary Examiner* — Antonio Xavier
(74) *Attorney, Agent, or Firm* — Patrick E. Caldwell, Esq.; The Caldwell Firm, LLC

(57) ABSTRACT

A system, method, and computer program product are provided for a touch or pressure signal-based interface. In operation, a touch or pressure signal is received in association with a touch interface of a device. To this end, a user experience is altered utilizing the signal.

A system, method, and computer program product are provided for modifying one or more objects in one or more memory devices. In one embodiment, an apparatus is provided, comprising one or more memory devices including a non-volatile memory. Additionally, the apparatus comprises circuitry including a first communication path for communicating with the at least one processor, and a second communication path for communicating with at least one storage sub-system which operates slower than the one or more memory devices. Further, the circuitry is operable to modify one or more objects in the one or more memory devices.

21 Claims, 139 Drawing Sheets

(56) References Cited

U.S. PATENT DOCUMENTS

| | | | |
|---|---|---|---|
| 4,293,734 A | 10/1981 | Pepper, Jr. |
| 4,296,756 A | 10/1981 | Dunning et al. |
| 4,302,011 A | 11/1981 | Pepper, Jr. |
| 4,353,552 A | 10/1982 | Pepper, Jr. |
| 4,524,421 A | 6/1985 | Searby et al. |
| 4,554,419 A | 11/1985 | King et al. |
| 4,636,632 A | 1/1987 | Ando |
| 4,644,101 A | 2/1987 | Jin et al. |
| 4,694,468 A | 9/1987 | Cullum |
| 4,770,281 A | 9/1988 | Hanks |
| 5,205,173 A | 4/1993 | Allen |
| 5,241,308 A | 8/1993 | Young |
| 5,247,434 A | 9/1993 | Peterson et al. |
| 5,257,413 A | 10/1993 | Warner et al. |
| 5,276,787 A | 1/1994 | Searby |
| 5,285,474 A | 2/1994 | Chow et al. |
| 5,305,423 A | 4/1994 | Clynes |
| 5,309,172 A | 5/1994 | Fox |
| 5,311,302 A | 5/1994 | Berry et al. |
| 5,343,650 A | 9/1994 | Swan |
| 5,371,760 A | 12/1994 | Allen et al. |
| 5,386,219 A | 1/1995 | Greanias et al. |
| 5,448,263 A | 9/1995 | Martin |
| 5,483,557 A | 1/1996 | Webb |
| 5,486,286 A | 1/1996 | Peterson et al. |
| 5,487,827 A | 1/1996 | Peterson et al. |
| 5,557,653 A | 9/1996 | Paterson et al. |
| 5,566,096 A | 10/1996 | Wodlinger et al. |
| 5,581,505 A | 12/1996 | Lee |
| 5,596,638 A | 1/1997 | Paterson et al. |
| 5,680,160 A | 10/1997 | LaPointe |
| 5,687,733 A | 11/1997 | McKown |
| 5,729,219 A * | 3/1998 | Armstrong et al. ............. 341/20 |
| 5,729,612 A | 3/1998 | Abel et al. |
| 5,742,894 A | 4/1998 | Jambhekar et al. |
| 5,743,859 A | 4/1998 | Wodlinger et al. |
| 5,744,027 A | 4/1998 | Connell et al. |
| 5,794,163 A | 8/1998 | Paterson et al. |
| 5,805,950 A | 9/1998 | Inglese et al. |
| 5,825,873 A | 10/1998 | Duncan et al. |
| 5,838,244 A | 11/1998 | Schmidt et al. |
| 5,856,822 A | 1/1999 | Du et al. |
| 5,859,522 A | 1/1999 | Theobald |
| 5,884,191 A | 3/1999 | Karpus et al. |
| 5,889,236 A | 3/1999 | Gillespie et al. |
| 5,925,942 A | 7/1999 | Theobald |
| 5,947,334 A | 9/1999 | Rudick et al. |
| 5,953,674 A | 9/1999 | Hutchison, IV |
| 5,970,092 A | 10/1999 | Currivan |
| 5,983,100 A | 11/1999 | Johansson et al. |
| 5,999,892 A | 12/1999 | Fan |
| 6,012,105 A | 1/2000 | Rubbmark et al. |
| 6,020,878 A * | 2/2000 | Robinson .................... 345/173 |
| 6,038,457 A | 3/2000 | Barkat |
| 6,040,933 A | 3/2000 | Khaleghi et al. |
| 6,045,512 A | 4/2000 | Roteliuk et al. |
| 6,081,724 A | 6/2000 | Wilson |
| 6,097,943 A | 8/2000 | Nordwall |
| 6,108,064 A | 8/2000 | Minoura et al. |
| 6,118,435 A | 9/2000 | Fujita et al. |
| 6,119,022 A | 9/2000 | Osborn et al. |
| 6,138,036 A | 10/2000 | O'Cinneide |
| 6,138,245 A | 10/2000 | Son et al. |
| 6,141,000 A | 10/2000 | Martin |
| 6,163,690 A | 12/2000 | Lilja |
| 6,169,538 B1 | 1/2001 | Nowlan et al. |
| 6,192,238 B1 | 2/2001 | Piirainen |
| 6,193,152 B1 | 2/2001 | Fernando et al. |
| 6,259,729 B1 | 7/2001 | Seki |
| 6,283,763 B1 | 9/2001 | Matsuzaki et al. |
| 6,284,131 B1 | 9/2001 | Hogard et al. |
| 6,285,890 B1 | 9/2001 | Panian |
| 6,330,247 B1 | 12/2001 | Chang et al. |
| 6,337,681 B1 | 1/2002 | Martin |
| 6,351,271 B1 | 2/2002 | Mainwaring et al. |
| 6,366,530 B1 | 4/2002 | Sluiter et al. |
| 6,371,923 B1 | 4/2002 | Roteliuk et al. |
| 6,377,825 B1 | 4/2002 | Kennedy et al. |
| 6,380,581 B1 | 4/2002 | Noble et al. |
| 6,385,463 B1 | 5/2002 | Lieberman et al. |
| 6,392,638 B2 | 5/2002 | Hanajima et al. |
| 6,417,845 B1 | 7/2002 | Chen et al. |
| 6,441,807 B1 | 8/2002 | Yamaguchi |
| 6,449,492 B1 | 9/2002 | Kenagy et al. |
| 6,456,517 B2 | 9/2002 | Kim et al. |
| 6,473,630 B1 | 10/2002 | Baranowski et al. |
| 6,476,795 B1 | 11/2002 | Derocher et al. |
| 6,477,390 B1 | 11/2002 | Gum et al. |
| 6,480,149 B1 | 11/2002 | Sutherland et al. |
| 6,496,854 B1 | 12/2002 | Hagersten et al. |
| 6,509,847 B1 | 1/2003 | Anderson |
| 6,523,124 B1 | 2/2003 | Lunsford et al. |
| 6,526,315 B1 | 2/2003 | Inagawa et al. |
| 6,529,744 B1 | 3/2003 | Birkler et al. |
| 6,533,757 B1 | 3/2003 | Lampropoulos et al. |
| 6,546,262 B1 | 4/2003 | Freadman |
| 6,549,790 B1 | 4/2003 | Rubbmark et al. |
| 6,564,285 B1 | 5/2003 | Mills et al. |
| 6,567,102 B2 | 5/2003 | Kung |
| 6,590,568 B1 | 7/2003 | Astala et al. |
| 6,603,986 B1 | 8/2003 | Bozoukov |
| 6,626,013 B2 | 9/2003 | Ohta et al. |
| 6,636,203 B1 | 10/2003 | Wong et al. |
| 6,636,749 B2 | 10/2003 | Holmes et al. |
| 6,636,918 B1 | 10/2003 | Aguilar et al. |
| 6,665,803 B2 | 12/2003 | Lunsford et al. |
| 6,670,234 B2 | 12/2003 | Hsu et al. |
| 6,689,947 B2 | 2/2004 | Ludwig |
| 6,714,802 B1 | 3/2004 | Barvesten |
| 6,721,019 B2 | 4/2004 | Kono et al. |
| 6,738,514 B1 | 5/2004 | Shin et al. |
| 6,747,636 B2 | 6/2004 | Martin |
| 6,751,113 B2 | 6/2004 | Bhakta et al. |
| 6,765,812 B2 | 7/2004 | Anderson |
| 6,776,546 B2 | 8/2004 | Kraus et al. |
| 6,791,640 B1 | 9/2004 | Okamoto et al. |
| 6,801,211 B2 | 10/2004 | Forsline et al. |
| 6,804,146 B2 | 10/2004 | Johnson |
| 6,829,297 B2 | 12/2004 | Xia et al. |
| 6,873,534 B2 | 3/2005 | Bhakta et al. |
| 6,879,318 B1 | 4/2005 | Chan et al. |
| 6,880,998 B2 | 4/2005 | Kraus et al. |
| 6,888,537 B2 | 5/2005 | Benson et al. |
| 6,892,270 B2 | 5/2005 | Roohparvar |
| 6,917,282 B2 | 7/2005 | Giegerich |
| 6,919,927 B1 | 7/2005 | Hyodo |
| 6,928,110 B2 | 8/2005 | Ougi et al. |
| 6,928,299 B1 | 8/2005 | Rinne et al. |
| 6,928,512 B2 | 8/2005 | Ayukawa et al. |
| 6,930,900 B2 | 8/2005 | Bhakta et al. |
| 6,930,903 B2 | 8/2005 | Bhakta et al. |
| 6,933,991 B2 | 8/2005 | Sanelle et al. |
| 6,954,495 B2 | 10/2005 | Piirainen |
| 6,956,562 B1 | 10/2005 | O'Hara et al. |
| 6,961,015 B2 | 11/2005 | Kernahan et al. |
| 6,967,903 B2 | 11/2005 | Guanter |
| 6,968,208 B2 | 11/2005 | Kacines |
| 6,975,853 B2 | 12/2005 | Fang et al. |
| 6,983,169 B2 | 1/2006 | Vogel et al. |
| 6,990,044 B2 | 1/2006 | Kang |
| 7,003,316 B1 | 2/2006 | Elias et al. |
| 7,006,851 B2 | 2/2006 | Holmes et al. |
| 7,010,325 B1 | 3/2006 | Oh |
| 7,020,488 B1 | 3/2006 | Bleile et al. |
| 7,024,230 B2 | 4/2006 | Curtiss et al. |
| 7,030,854 B2 | 4/2006 | Baucom et al. |
| 7,031,670 B2 | 4/2006 | May |
| 7,050,783 B2 | 5/2006 | Curtiss et al. |
| 7,062,260 B2 | 6/2006 | Vuori |
| 7,062,261 B2 | 6/2006 | Goldstein et al. |
| 7,064,748 B2 | 6/2006 | Cok |
| 7,097,903 B2 | 8/2006 | Kishioka et al. |
| 7,098,776 B2 | 8/2006 | Chang et al. |
| 7,122,149 B2 | 10/2006 | Li et al. |

(56) References Cited

U.S. PATENT DOCUMENTS

| | | |
|---|---|---|
| 7,123,936 B1 | 10/2006 | Rydbeck et al. |
| 7,138,984 B1 | 11/2006 | Miles |
| 7,149,511 B1 | 12/2006 | Bachner, III et al. |
| 7,149,552 B2 | 12/2006 | Lair |
| 7,155,254 B2 | 12/2006 | Pinder |
| 7,171,239 B2 | 1/2007 | Tan et al. |
| 7,184,794 B2 | 2/2007 | Hess et al. |
| 7,190,720 B2 | 3/2007 | Fimoff et al. |
| 7,205,983 B2 | 4/2007 | Raap et al. |
| 7,224,992 B2 | 5/2007 | Patino et al. |
| 7,240,836 B2 | 7/2007 | Vrotsos et al. |
| 7,254,036 B2 | 8/2007 | Pauley et al. |
| 7,254,973 B2 | 8/2007 | Campian |
| 7,269,708 B2 | 9/2007 | Ware |
| 7,280,849 B1 | 10/2007 | Bailey |
| 7,286,436 B2 | 10/2007 | Bhakta et al. |
| 7,289,113 B2 | 10/2007 | Martin |
| 7,289,386 B2 | 10/2007 | Bhakta et al. |
| 7,296,107 B2 | 11/2007 | Lunsford et al. |
| 7,303,680 B2 | 12/2007 | Connell et al. |
| 7,312,784 B2 | 12/2007 | Baucom et al. |
| 7,312,791 B2 | 12/2007 | Hoshino et al. |
| 7,315,336 B2 | 1/2008 | North et al. |
| 7,318,892 B2 | 1/2008 | Connell et al. |
| 7,343,177 B2 | 3/2008 | Seshadri et al. |
| 7,343,439 B2 | 3/2008 | Mills et al. |
| 7,360,022 B2 | 4/2008 | Tian et al. |
| 7,363,054 B2 | 4/2008 | Elias et al. |
| 7,375,970 B2 | 5/2008 | Pauley et al. |
| 7,386,656 B2 | 6/2008 | Rajan et al. |
| 7,392,338 B2 | 6/2008 | Rajan et al. |
| 7,398,105 B2 | 7/2008 | Kalogeropoulos |
| 7,403,743 B2 | 7/2008 | Welch |
| 7,405,779 B2 | 7/2008 | Sanelle et al. |
| 7,423,557 B2 | 9/2008 | Kang |
| 7,424,312 B2 | 9/2008 | Pinder et al. |
| 7,435,636 B1 | 10/2008 | Hanafi |
| 7,437,221 B2 | 10/2008 | Hardman et al. |
| 7,442,050 B1 | 10/2008 | Bhakta et al. |
| 7,472,220 B2 | 12/2008 | Rajan et al. |
| 7,492,890 B2 | 2/2009 | Mllani |
| 7,493,109 B2 | 2/2009 | Munje et al. |
| 7,523,035 B2 | 4/2009 | Rokusek et al. |
| 7,526,317 B2 | 4/2009 | Pinder et al. |
| 7,529,872 B1 | 5/2009 | Schubert et al. |
| 7,532,492 B2 | 5/2009 | Dobyns et al. |
| 7,532,537 B2 | 5/2009 | Solomon et al. |
| 7,535,463 B2 | 5/2009 | Wilson |
| 7,555,318 B2 | 6/2009 | Seshadri et al. |
| 7,558,130 B2 | 7/2009 | Grunzke |
| 7,558,529 B2 | 7/2009 | Seshadri et al. |
| 7,558,894 B1 | 7/2009 | Lydon et al. |
| 7,565,179 B2 | 7/2009 | Hyatt |
| 7,565,458 B2 | 7/2009 | Thijssen et al. |
| 7,571,295 B2 | 8/2009 | Sakarda et al. |
| 7,580,312 B2 | 8/2009 | Rajan et al. |
| 7,581,127 B2 | 8/2009 | Rajan et al. |
| 7,590,796 B2 | 9/2009 | Rajan et al. |
| 7,598,607 B2 | 10/2009 | Chung et al. |
| 7,603,148 B2 | 10/2009 | Michalak |
| 7,609,567 B2 | 10/2009 | Rajan et al. |
| 7,612,436 B1 | 11/2009 | Lee et al. |
| 7,619,893 B1 | 11/2009 | Yu |
| 7,619,912 B2 | 11/2009 | Bhakta et al. |
| 7,620,433 B2 | 11/2009 | Bodley |
| 7,622,365 B2 | 11/2009 | Parekh |
| 7,622,895 B1 | 11/2009 | Griffin |
| 7,623,667 B2 | 11/2009 | Sander et al. |
| 7,626,579 B2 | 12/2009 | Hague et al. |
| 7,626,594 B1 | 12/2009 | Witehira et al. |
| 7,627,128 B2 | 12/2009 | Sander et al. |
| 7,627,307 B2 | 12/2009 | Droste et al. |
| 7,627,352 B2 | 12/2009 | Gauger, Jr. et al. |
| 7,630,202 B2 | 12/2009 | Pauley et al. |
| 7,633,963 B1 | 12/2009 | Anderson et al. |
| 7,636,274 B2 | 12/2009 | Solomon et al. |
| 7,639,239 B2 | 12/2009 | Kajimoto et al. |
| 7,643,642 B2 | 1/2010 | Patino et al. |
| 7,649,577 B2 | 1/2010 | Sanelle et al. |
| 7,649,605 B2 | 1/2010 | Kim |
| 7,650,168 B2 | 1/2010 | Bailey |
| 7,659,885 B2 | 2/2010 | Kraus et al. |
| 7,675,580 B2 | 3/2010 | Rho |
| 7,680,490 B2 | 3/2010 | Bloebaum et al. |
| 7,680,514 B2 | 3/2010 | Cook et al. |
| 7,689,168 B2 | 3/2010 | House |
| 7,692,627 B2 | 4/2010 | Wilson |
| 7,692,637 B2 | 4/2010 | Davis |
| 7,701,329 B2 | 4/2010 | Donohue |
| 7,705,824 B2 | 4/2010 | Baucom et al. |
| 7,715,831 B2 | 5/2010 | Wakefield |
| 7,715,873 B1 | 5/2010 | Biere et al. |
| 7,716,411 B2 | 5/2010 | Panabaker et al. |
| 7,724,589 B2 | 5/2010 | Rajan et al. |
| 7,730,338 B2 | 6/2010 | Rajan et al. |
| 7,738,068 B2 | 6/2010 | Lee |
| 7,755,612 B2 | 7/2010 | Park et al. |
| 7,760,187 B2 | 7/2010 | Kennedy |
| 7,761,724 B2 | 7/2010 | Rajan et al. |
| 7,769,187 B1 | 8/2010 | Farrar et al. |
| 7,777,581 B2 | 8/2010 | Pfaff et al. |
| 7,778,601 B2 | 8/2010 | Seshadri et al. |
| 7,779,185 B2 | 8/2010 | Schubert et al. |
| RE41,716 E | 9/2010 | Fernando et al. |
| 7,796,652 B2 | 9/2010 | Reitlingshoefer et al. |
| 7,800,592 B2 | 9/2010 | Kerr et al. |
| 7,811,097 B1 | 10/2010 | Bhakta et al. |
| 7,813,715 B2 | 10/2010 | McKillop et al. |
| 7,814,287 B2 | 10/2010 | Pratt |
| 7,818,036 B2 | 10/2010 | Lair et al. |
| 7,818,037 B2 | 10/2010 | Lair et al. |
| 7,826,318 B2 | 11/2010 | Holden et al. |
| 7,835,809 B2 | 11/2010 | Griffin, Jr. |
| 7,839,643 B1 | 11/2010 | Yu |
| 7,839,645 B2 | 11/2010 | Pauley et al. |
| 7,855,931 B2 | 12/2010 | LaBerge et al. |
| 7,857,225 B2 | 12/2010 | Challa et al. |
| 7,864,627 B2 | 1/2011 | Bhakta et al. |
| 7,869,608 B2 | 1/2011 | Sander et al. |
| 7,881,150 B2 | 2/2011 | Solomon et al. |
| 7,889,786 B2 | 2/2011 | Lapointe |
| 7,902,886 B2 | 3/2011 | Pfaff et al. |
| 7,903,096 B2 | 3/2011 | Jeon et al. |
| 7,916,574 B1 | 3/2011 | Solomon et al. |
| 7,932,893 B1 | 4/2011 | Berthaud |
| 7,940,839 B2 | 5/2011 | Lapointe et al. |
| 7,941,591 B2 | 5/2011 | Aviles |
| 7,952,566 B2 | 5/2011 | Poupyrev et al. |
| 7,966,578 B2 | 6/2011 | Tolmasky et al. |
| 7,973,777 B2 | 7/2011 | Lee et al. |
| 7,973,778 B2 | 7/2011 | Chen |
| 7,978,721 B2 | 7/2011 | Jeddeloh et al. |
| 7,982,721 B2 | 7/2011 | Hio |
| 7,999,795 B2 | 8/2011 | Hamblin et al. |
| 8,001,434 B1 | 8/2011 | Lee et al. |
| 8,018,723 B1 | 9/2011 | Yu et al. |
| 8,019,589 B2 | 9/2011 | Rajan et al. |
| 8,022,933 B2 | 9/2011 | Hardacker et al. |
| 8,033,836 B1 | 10/2011 | Bhakta et al. |
| 8,041,881 B2 | 10/2011 | Rajan et al. |
| 8,055,833 B2 | 11/2011 | Danilak et al. |
| 8,057,419 B2 | 11/2011 | Ellingboe et al. |
| 8,060,774 B2 | 11/2011 | Smith et al. |
| 8,068,021 B1 | 11/2011 | Donohue |
| 8,072,430 B2 | 12/2011 | Kim et al. |
| 8,072,837 B1 | 12/2011 | Solomon et al. |
| 8,077,535 B2 | 12/2011 | Schakel et al. |
| 8,081,474 B1 | 12/2011 | Zohni et al. |
| 8,081,535 B2 | 12/2011 | Bhakta et al. |
| 8,081,536 B1 | 12/2011 | Solomon et al. |
| 8,081,537 B1 | 12/2011 | Bhakta et al. |
| 8,081,677 B2 | 12/2011 | Badalone |
| 8,089,795 B2 | 1/2012 | Rajan et al. |
| 8,090,897 B2 | 1/2012 | Rajan et al. |

(56) References Cited

U.S. PATENT DOCUMENTS

| | | | |
|---|---|---|---|
| 8,093,702 | B2 | 1/2012 | Lua et al. |
| 8,094,134 | B2 | 1/2012 | Suzuki et al. |
| 8,094,673 | B2 | 1/2012 | Proctor et al. |
| 8,102,496 | B2 | 1/2012 | Kim |
| 8,103,928 | B2 | 1/2012 | Hargan |
| 8,106,491 | B2 | 1/2012 | Corisis et al. |
| 8,106,520 | B2 | 1/2012 | Keeth et al. |
| 8,111,534 | B2 | 2/2012 | Walker |
| 8,111,566 | B1 | 2/2012 | Wang et al. |
| 8,112,266 | B2 | 2/2012 | Rajan et al. |
| 8,115,291 | B2 | 2/2012 | Baek et al. |
| 8,120,044 | B2 | 2/2012 | Cho et al. |
| 8,122,207 | B2 | 2/2012 | Rajan et al. |
| 8,127,185 | B2 | 2/2012 | Jeddeloh |
| 8,127,204 | B2 | 2/2012 | Hargan |
| 8,130,527 | B2 | 3/2012 | Keeth |
| 8,130,560 | B1 | 3/2012 | Rajan et al. |
| 8,134,378 | B2 | 3/2012 | Keeth |
| 8,135,900 | B2 | 3/2012 | Kunimatsu et al. |
| 8,143,710 | B2 | 3/2012 | Cho |
| 8,148,763 | B2 | 4/2012 | Kim et al. |
| 8,148,807 | B2 | 4/2012 | Lee et al. |
| 8,154,901 | B1 | 4/2012 | Lee et al. |
| 8,154,935 | B2 | 4/2012 | Rajan et al. |
| 8,158,967 | B2 | 4/2012 | Tang et al. |
| 8,169,233 | B2 | 5/2012 | Ferolito et al. |
| 8,169,841 | B2 | 5/2012 | Johnson et al. |
| 8,173,507 | B2 | 5/2012 | Lim et al. |
| 8,174,105 | B2 | 5/2012 | Kwang et al. |
| 8,174,115 | B2 | 5/2012 | Chung |
| 8,180,954 | B2 | 5/2012 | Kilzer et al. |
| 8,181,048 | B2 | 5/2012 | Rajan et al. |
| 8,184,228 | B2 | 5/2012 | Han et al. |
| 8,185,778 | B2 | 5/2012 | Kilzer et al. |
| 8,187,901 | B2 | 5/2012 | Sheen |
| 8,188,982 | B2 | 5/2012 | You et al. |
| 8,189,328 | B2 | 5/2012 | Kanapathippillai et al. |
| 8,193,646 | B2 | 6/2012 | Wood et al. |
| 8,199,116 | B2 | 6/2012 | Jeon et al. |
| 8,207,945 | B2 | 6/2012 | Jong et al. |
| 8,209,479 | B2 | 6/2012 | Rajan et al. |
| 8,209,628 | B1 | 6/2012 | Davidson |
| 8,218,705 | B2 | 7/2012 | Yousefi Moghaddam et al. |
| 8,223,799 | B2 | 7/2012 | Karaoguz |
| 8,228,309 | B2 | 7/2012 | Tamaki et al. |
| 8,244,971 | B2 | 8/2012 | Rajan et al. |
| 8,253,699 | B2 | 8/2012 | Son |
| 8,261,041 | B2 | 9/2012 | Kunimatsu |
| 8,264,903 | B1 | 9/2012 | Lee et al. |
| 8,269,731 | B2 | 9/2012 | Mölne |
| 8,269,733 | B2 | 9/2012 | Hu |
| 8,270,148 | B2 | 9/2012 | Griffith et al. |
| 8,279,361 | B2 | 10/2012 | Chen et al. |
| 8,279,690 | B1 | 10/2012 | Wang et al. |
| 8,280,714 | B2 | 10/2012 | Rajan et al. |
| 8,286,102 | B1 | 10/2012 | Wilensky |
| 8,287,291 | B1 | 10/2012 | Bhakta et al. |
| 8,296,496 | B2 | 10/2012 | Mogul et al. |
| 8,301,833 | B1 | 10/2012 | Chen et al. |
| 8,310,452 | B2 | 11/2012 | Takenaka et al. |
| 8,315,349 | B2 | 11/2012 | Badalone |
| 8,319,743 | B2 | 11/2012 | No et al. |
| 8,325,143 | B2 | 12/2012 | Destura et al. |
| 8,327,104 | B2 | 12/2012 | Smith et al. |
| 8,334,835 | B2 | 12/2012 | Shen et al. |
| 8,334,850 | B2 | 12/2012 | Tsai |
| 8,340,953 | B2 | 12/2012 | Rajan et al. |
| 8,345,018 | B2 | 1/2013 | Jong et al. |
| 8,345,427 | B2 | 1/2013 | Pauley et al. |
| 8,349,228 | B2 | 1/2013 | Kazama |
| 8,359,187 | B2 | 1/2013 | Rajan et al. |
| 8,359,501 | B1 | 1/2013 | Lee et al. |
| 8,359,600 | B2 | 1/2013 | Kang et al. |
| 8,370,566 | B2 | 2/2013 | Danilak et al. |
| 8,373,675 | B2 | 2/2013 | Jeon et al. |
| 8,380,263 | B2 | 2/2013 | Murakami et al. |
| 8,384,674 | B1 | 2/2013 | Slothower et al. |
| 8,386,833 | B2 | 2/2013 | Smith et al. |
| 8,387,045 | B2 | 2/2013 | Yasutaka et al. |
| 8,397,013 | B1 | 3/2013 | Rosenband et al. |
| 8,407,412 | B2 | 3/2013 | Rajan et al. |
| 8,411,039 | B2 | 4/2013 | Guo et al. |
| 8,416,210 | B2 | 4/2013 | Jong et al. |
| 8,417,870 | B2 | 4/2013 | Lee et al. |
| 8,424,599 | B2 | 4/2013 | Atencio |
| 8,427,434 | B1 | 4/2013 | Merolla |
| 8,446,781 | B1 | 5/2013 | Rajan et al. |
| 8,451,238 | B2 | 5/2013 | Kim et al. |
| 8,452,917 | B2 | 5/2013 | Amer et al. |
| 8,458,436 | B2 | 6/2013 | Kunimatsu et al. |
| 8,471,824 | B2 | 6/2013 | Kim et al. |
| 8,473,670 | B2 | 6/2013 | Sareen et al. |
| 8,477,111 | B2 | 7/2013 | Lim |
| 8,479,110 | B2 | 7/2013 | Johnson et al. |
| 8,487,900 | B2 | 7/2013 | Chiu et al. |
| 8,488,325 | B1 | 7/2013 | Yu |
| 8,489,837 | B1 | 7/2013 | Lee |
| 8,493,384 | B1 | 7/2013 | Reisman et al. |
| 8,497,884 | B2 | 7/2013 | Cholewin et al. |
| 8,508,494 | B2 | 8/2013 | Moore |
| 8,516,185 | B2 | 8/2013 | Lee et al. |
| 8,516,187 | B2 | 8/2013 | Chen et al. |
| 8,516,188 | B1 | 8/2013 | Solomon et al. |
| 8,542,193 | B2 | 9/2013 | Hardacker et al. |
| 8,542,209 | B2 | 9/2013 | Lim |
| 8,553,012 | B2 | 10/2013 | Baucom et al. |
| 8,564,559 | B2 | 10/2013 | Hou |
| 8,566,505 | B2 | 10/2013 | Kilzer et al. |
| 8,566,516 | B2 | 10/2013 | Schakel et al. |
| 8,566,556 | B2 | 10/2013 | Rajan et al. |
| 8,581,870 | B2 | 11/2013 | Bokma et al. |
| 8,587,542 | B2 | 11/2013 | Moore |
| 8,589,639 | B2 | 11/2013 | Nakai et al. |
| 8,595,419 | B2 | 11/2013 | Rajan et al. |
| 8,599,634 | B1 | 12/2013 | Lee et al. |
| 8,601,204 | B2 | 12/2013 | Rajan et al. |
| 8,607,003 | B2 | 12/2013 | Bland et al. |
| 8,611,123 | B2 | 12/2013 | Koh |
| 8,615,679 | B2 | 12/2013 | Smith et al. |
| 8,619,452 | B2 | 12/2013 | Rajan et al. |
| 8,624,851 | B2 | 1/2014 | Kim et al. |
| 8,624,867 | B2 | 1/2014 | Tamaki et al. |
| 8,631,193 | B2 | 1/2014 | Smith et al. |
| 8,631,220 | B2 | 1/2014 | Smith et al. |
| 8,638,311 | B2 | 1/2014 | Kang et al. |
| 8,648,839 | B2 | 2/2014 | Liaw et al. |
| 8,654,104 | B2 | 2/2014 | Reisman et al. |
| 8,667,312 | B2 | 3/2014 | Rajan et al. |
| 8,671,243 | B2 | 3/2014 | Chen et al. |
| 8,671,244 | B2 | 3/2014 | Rajan et al. |
| 8,674,947 | B2 | 3/2014 | Henderson et al. |
| 8,675,429 | B1 | 3/2014 | Wang et al. |
| 8,677,060 | B2 | 3/2014 | Chen et al. |
| 8,689,064 | B1 | 4/2014 | Lee et al. |
| 8,692,815 | B2 | 4/2014 | Deslippe et al. |
| 8,698,777 | B2 | 4/2014 | Endo et al. |
| 8,700,834 | B2 | 4/2014 | Horn et al. |
| 8,705,239 | B1 | 4/2014 | Yu et al. |
| 8,707,104 | B1 | 4/2014 | Jean |
| 8,710,862 | B2 | 4/2014 | Ferolito et al. |
| 8,711,116 | B2 | 4/2014 | Papakipos et al. |
| 8,713,357 | B1 | 4/2014 | Jean et al. |
| 8,713,379 | B2 | 4/2014 | Takefman et al. |
| 8,717,303 | B2 | 5/2014 | Ludwig |
| 8,723,826 | B2 | 5/2014 | Chen et al. |
| 8,727,557 | B2 | 5/2014 | Yuan et al. |
| 8,730,199 | B2 * | 5/2014 | Sleeman et al. ............... 345/174 |
| 8,738,851 | B2 | 5/2014 | Kunimatsu et al. |
| 8,738,853 | B2 | 5/2014 | Amer et al. |
| 8,743,076 | B1 | 6/2014 | Ludwig |
| 8,745,321 | B2 | 6/2014 | Rajan et al. |
| 8,745,514 | B1 | 6/2014 | Davidson |
| 8,751,732 | B2 | 6/2014 | Danilak et al. |
| 8,754,862 | B2 | 6/2014 | Zaliva |

(56) References Cited

U.S. PATENT DOCUMENTS

| | | |
|---|---|---|
| 8,756,364 B1 | 6/2014 | Bhakta et al. |
| 8,760,408 B2 | 6/2014 | Heesemans et al. |
| 8,760,936 B1 | 6/2014 | Rajan et al. |
| 8,773,937 B2 | 7/2014 | Schakel et al. |
| 8,780,089 B2 | 7/2014 | Yuan et al. |
| 8,782,350 B2 | 7/2014 | Lee et al. |
| 8,787,060 B2 | 7/2014 | Lee |
| 8,816,993 B2 | 8/2014 | Yuan et al. |
| 8,831,687 B1 | 9/2014 | Kotab |
| 8,854,317 B2 | 10/2014 | Homma et al. |
| 8,866,785 B2 | 10/2014 | Ludwig |
| 8,872,798 B2 | 10/2014 | Rabu et al. |
| 8,878,809 B1 | 11/2014 | Kim et al. |
| 8,878,810 B2 | 11/2014 | Ludwig |
| 8,884,913 B2 | 11/2014 | Saynac et al. |
| 8,896,575 B2 | 11/2014 | Goertz et al. |
| 8,913,031 B2 | 12/2014 | Honda et al. |
| 8,917,262 B2 | 12/2014 | Liaw et al. |
| 8,947,381 B2 | 2/2015 | Jiyama et al. |
| 8,970,540 B1 | 3/2015 | Hebenstreit et al. |
| 8,976,128 B2 | 3/2015 | Moore |
| 8,982,081 B2 | 3/2015 | Li |
| 8,988,364 B2 | 3/2015 | Lee |
| 9,003,591 B2 | 4/2015 | Sakashita et al. |
| 9,013,414 B2 | 4/2015 | Kung et al. |
| 9,018,030 B2 | 4/2015 | Li et al. |
| 9,030,427 B2 | 5/2015 | Yasumatsu |
| 9,035,897 B2 | 5/2015 | Kinoshita |
| 9,041,679 B2 | 5/2015 | Reisman et al. |
| 9,045,670 B2 | 6/2015 | Shitara et al. |
| 9,046,999 B1 | 6/2015 | Teller et al. |
| 9,063,597 B2 | 6/2015 | Liaw et al. |
| 9,069,204 B2 | 6/2015 | Zhou et al. |
| 9,069,416 B2 | 6/2015 | Garrett et al. |
| 9,069,460 B2 | 6/2015 | Moore |
| 9,092,129 B2 | 7/2015 | Abdo et al. |
| 9,098,193 B2 | 8/2015 | Stoneham et al. |
| 9,116,609 B2 | 8/2015 | Bocirnea |
| 9,125,630 B2 | 9/2015 | Menzel |
| 9,130,651 B2 | 9/2015 | Tabe |
| 9,134,880 B2 | 9/2015 | Johnson et al. |
| 9,152,258 B2 | 10/2015 | Behdasht et al. |
| 9,152,288 B2 | 10/2015 | Dietz |
| 2001/0005692 A1 | 6/2001 | Song |
| 2001/0043291 A1 | 11/2001 | Kono et al. |
| 2002/0002629 A1 | 1/2002 | Fukushima |
| 2002/0002662 A1 | 1/2002 | Olarig et al. |
| 2002/0005111 A1 | 1/2002 | Ludwig |
| 2002/0008691 A1 | 1/2002 | Hanajima et al. |
| 2002/0033919 A1 | 3/2002 | Sanelle et al. |
| 2002/0045854 A1 | 4/2002 | Royo et al. |
| 2002/0085952 A1 | 7/2002 | Ellingboe et al. |
| 2002/0086711 A1 | 7/2002 | Flannery |
| 2002/0116959 A1 | 8/2002 | Ohta et al. |
| 2002/0118180 A1 | 8/2002 | Martin |
| 2002/0129315 A1 | 9/2002 | Onvural et al. |
| 2002/0130832 A1 | 9/2002 | Baucom et al. |
| 2002/0180763 A1 | 12/2002 | Kung |
| 2003/0117408 A1 | 6/2003 | Forsline et al. |
| 2003/0123328 A1 | 7/2003 | Guanter |
| 2003/0147041 A1 | 8/2003 | Oh et al. |
| 2003/0151589 A1 | 8/2003 | Bensen et al. |
| 2003/0217972 A1 | 11/2003 | Connell et al. |
| 2003/0232192 A1 | 12/2003 | Kishioka et al. |
| 2003/0234768 A1 * | 12/2003 | Rekimoto et al. ............ 345/169 |
| 2003/0235452 A1 | 12/2003 | Kraus et al. |
| 2004/0084372 A1 | 5/2004 | Connell et al. |
| 2004/0108995 A1 | 6/2004 | Hoshino et al. |
| 2004/0109788 A1 | 6/2004 | Li et al. |
| 2004/0121855 A1 | 6/2004 | Giegerich |
| 2004/0191509 A1 | 9/2004 | Kishioka et al. |
| 2004/0207542 A1 | 10/2004 | Chang et al. |
| 2004/0212598 A1 | 10/2004 | Kraus et al. |
| 2004/0212599 A1 | 10/2004 | Cok et al. |
| 2004/0239624 A1 | 12/2004 | Ramian |
| 2004/0263488 A1 | 12/2004 | Martin |
| 2005/0018495 A1 | 1/2005 | Bhakta et al. |
| 2005/0027928 A1 | 2/2005 | Avraham et al. |
| 2005/0045540 A1 | 3/2005 | Connell et al. |
| 2005/0094465 A1 | 5/2005 | Gervasi et al. |
| 2005/0099403 A1 | 5/2005 | Kraus et al. |
| 2005/0102444 A1 | 5/2005 | Cruz |
| 2005/0128853 A1 | 6/2005 | Ayukawa et al. |
| 2005/0182893 A1 | 8/2005 | Suh |
| 2005/0204091 A1 | 9/2005 | Kilbuck et al. |
| 2005/0231461 A1 | 10/2005 | Raap et al. |
| 2005/0242034 A1 | 11/2005 | Connell et al. |
| 2005/0251617 A1 | 11/2005 | Sinclair et al. |
| 2005/0264521 A1 | 12/2005 | Liu et al. |
| 2005/0270037 A1 | 12/2005 | Haynes et al. |
| 2005/0280746 A1 | 12/2005 | North et al. |
| 2006/0001654 A1 | 1/2006 | Smits |
| 2006/0001800 A1 | 1/2006 | Sanelle et al. |
| 2006/0007222 A1 | 1/2006 | Uy |
| 2006/0022955 A1 | 2/2006 | Kennedy |
| 2006/0026521 A1 | 2/2006 | Hotelling et al. |
| 2006/0033701 A1 | 2/2006 | Wilson |
| 2006/0044281 A1 * | 3/2006 | Lai ................................ 345/173 |
| 2006/0075402 A1 | 4/2006 | Neiger et al. |
| 2006/0077186 A1 | 4/2006 | Park et al. |
| 2006/0085757 A1 | 4/2006 | Andre et al. |
| 2006/0107719 A1 | 5/2006 | Campian |
| 2006/0138630 A1 | 6/2006 | Bhakta |
| 2006/0138983 A1 | 6/2006 | Lee et al. |
| 2006/0146032 A1 | 7/2006 | Kajimoto et al. |
| 2006/0167400 A1 | 7/2006 | Ellingboe et al. |
| 2006/0179088 A1 | 8/2006 | Kang |
| 2006/0195064 A1 | 8/2006 | Plahey et al. |
| 2006/0197736 A1 | 9/2006 | Baucom et al. |
| 2006/0197737 A1 | 9/2006 | Baucom et al. |
| 2006/0197750 A1 * | 9/2006 | Kerr et al. .................... 345/173 |
| 2006/0203899 A1 | 9/2006 | Gee |
| 2006/0209039 A1 | 9/2006 | Destura et al. |
| 2006/0238495 A1 | 10/2006 | Davis |
| 2006/0260711 A1 | 11/2006 | Fry et al. |
| 2006/0262099 A1 | 11/2006 | Destura et al. |
| 2006/0274050 A1 | 12/2006 | Lii |
| 2006/0284874 A1 | 12/2006 | Wilson |
| 2006/0294295 A1 | 12/2006 | Fukuzo |
| 2007/0008064 A1 | 1/2007 | Donohue |
| 2007/0035526 A1 | 2/2007 | Takenaka et al. |
| 2007/0040814 A1 | 2/2007 | Lee et al. |
| 2007/0070047 A1 | 3/2007 | Jeon et al. |
| 2007/0085837 A1 | 4/2007 | Ricks et al. |
| 2007/0097151 A1 | 5/2007 | Rosenberg |
| 2007/0103454 A1 | 5/2007 | Elias |
| 2007/0137901 A1 | 6/2007 | Chen |
| 2007/0146313 A1 | 6/2007 | Newman et al. |
| 2007/0148371 A1 | 6/2007 | Kazama |
| 2007/0153215 A1 | 7/2007 | Lee |
| 2007/0176902 A1 | 8/2007 | Newman et al. |
| 2007/0182864 A1 | 8/2007 | Stoneham et al. |
| 2007/0192563 A1 | 8/2007 | Rajan et al. |
| 2007/0195029 A1 | 8/2007 | Jeon et al. |
| 2007/0204075 A1 | 8/2007 | Rajan et al. |
| 2007/0229477 A1 | 10/2007 | Ludwig |
| 2007/0236470 A1 * | 10/2007 | Abanami et al. .............. 345/173 |
| 2007/0237170 A1 | 10/2007 | Proctor et al. |
| 2007/0246494 A1 | 10/2007 | Kim et al. |
| 2007/0262967 A1 | 11/2007 | Rho |
| 2007/0268261 A1 * | 11/2007 | Lipson .......................... 345/169 |
| 2007/0273561 A1 * | 11/2007 | Zadesky et al. .............. 345/173 |
| 2007/0291009 A1 | 12/2007 | Wright et al. |
| 2008/0007675 A1 | 1/2008 | Sanelle et al. |
| 2008/0010435 A1 | 1/2008 | Smith et al. |
| 2008/0018613 A1 | 1/2008 | Kim et al. |
| 2008/0024459 A1 | 1/2008 | Poupyrev et al. |
| 2008/0024712 A1 | 1/2008 | Kim |
| 2008/0025108 A1 | 1/2008 | Rajan et al. |
| 2008/0025122 A1 | 1/2008 | Schakel et al. |
| 2008/0025123 A1 | 1/2008 | Rajan et al. |
| 2008/0025124 A1 | 1/2008 | Rajan et al. |
| 2008/0025136 A1 | 1/2008 | Rajan et al. |
| 2008/0025137 A1 | 1/2008 | Rajan et al. |

(56) References Cited

U.S. PATENT DOCUMENTS

| | | |
|---|---|---|
| 2008/0026803 A1 | 1/2008 | Demuynek |
| 2008/0027697 A1 | 1/2008 | Rajan et al. |
| 2008/0027702 A1 | 1/2008 | Rajan et al. |
| 2008/0027703 A1 | 1/2008 | Rajan et al. |
| 2008/0028135 A1 | 1/2008 | Rajan et al. |
| 2008/0028136 A1 | 1/2008 | Schakel et al. |
| 2008/0028137 A1 | 1/2008 | Schakel et al. |
| 2008/0031030 A1 | 2/2008 | Rajan et al. |
| 2008/0031072 A1 | 2/2008 | Rajan et al. |
| 2008/0037353 A1 | 2/2008 | Rajan et al. |
| 2008/0056014 A1 | 3/2008 | Rajan et al. |
| 2008/0060854 A1 | 3/2008 | Perlin |
| 2008/0062169 A1 | 3/2008 | Heesemans et al. |
| 2008/0062773 A1 | 3/2008 | Rajan et al. |
| 2008/0068343 A1 | 3/2008 | Hoshino et al. |
| 2008/0082763 A1 | 4/2008 | Rajan et al. |
| 2008/0088602 A1* | 4/2008 | Hotelling ............ 345/173 |
| 2008/0094367 A1 | 4/2008 | Van De Ven et al. |
| 2008/0098331 A1 | 4/2008 | Novick et al. |
| 2008/0100584 A1 | 5/2008 | Hague et al. |
| 2008/0103753 A1 | 5/2008 | Rajan et al. |
| 2008/0104314 A1 | 5/2008 | Rajan et al. |
| 2008/0104344 A1 | 5/2008 | Shimozono et al. |
| 2008/0105600 A1 | 5/2008 | Connell et al. |
| 2008/0109206 A1 | 5/2008 | Rajan et al. |
| 2008/0109595 A1 | 5/2008 | Rajan et al. |
| 2008/0109597 A1 | 5/2008 | Schakel et al. |
| 2008/0109598 A1 | 5/2008 | Schakel et al. |
| 2008/0109629 A1 | 5/2008 | Karamcheti et al. |
| 2008/0115006 A1 | 5/2008 | Smith et al. |
| 2008/0120443 A1 | 5/2008 | Rajan et al. |
| 2008/0123459 A1 | 5/2008 | Rajan et al. |
| 2008/0126687 A1 | 5/2008 | Rajan et al. |
| 2008/0126688 A1 | 5/2008 | Rajan et al. |
| 2008/0126689 A1 | 5/2008 | Rajan et al. |
| 2008/0126692 A1 | 5/2008 | Rajan et al. |
| 2008/0130910 A1 | 6/2008 | Jobling et al. |
| 2008/0133825 A1 | 6/2008 | Rajan et al. |
| 2008/0136790 A1 | 6/2008 | Hio |
| 2008/0146285 A1* | 6/2008 | Lee et al. .............. 455/566 |
| 2008/0150911 A1 | 6/2008 | Harrison |
| 2008/0158171 A1 | 7/2008 | Wong et al. |
| 2008/0165255 A1 | 7/2008 | Christie |
| 2008/0174570 A1 | 7/2008 | Jobs et al. |
| 2008/0204427 A1 | 8/2008 | Heesemans et al. |
| 2008/0210843 A1 | 9/2008 | Han et al. |
| 2008/0211786 A1 | 9/2008 | Park et al. |
| 2008/0215192 A1 | 9/2008 | Hardman et al. |
| 2008/0239857 A1 | 10/2008 | Rajan et al. |
| 2008/0239858 A1 | 10/2008 | Rajan et al. |
| 2008/0240223 A1 | 10/2008 | Badalone |
| 2008/0250408 A1 | 10/2008 | Tsui et al. |
| 2008/0252607 A1 | 10/2008 | De Jong et al. |
| 2008/0252616 A1 | 10/2008 | Chen |
| 2008/0259046 A1* | 10/2008 | Carsanaro ............ 345/173 |
| 2008/0272478 A1 | 11/2008 | Anderson et al. |
| 2008/0290435 A1 | 11/2008 | Oliver et al. |
| 2008/0295839 A1 | 12/2008 | Habashi |
| 2008/0297487 A1 | 12/2008 | Hotelling et al. |
| 2008/0298113 A1 | 12/2008 | Liu et al. |
| 2008/0304431 A1 | 12/2008 | Karaoguz |
| 2008/0308946 A1 | 12/2008 | Pratt |
| 2009/0002312 A1 | 1/2009 | Son |
| 2009/0014876 A1 | 1/2009 | Youn et al. |
| 2009/0022256 A1 | 1/2009 | Fitzgerald |
| 2009/0024789 A1 | 1/2009 | Rajan et al. |
| 2009/0026600 A1 | 1/2009 | Koon et al. |
| 2009/0036111 A1 | 2/2009 | Danford et al. |
| 2009/0036176 A1 | 2/2009 | Ure |
| 2009/0039492 A1 | 2/2009 | Kang et al. |
| 2009/0045489 A1 | 2/2009 | Koon et al. |
| 2009/0046110 A1 | 2/2009 | Sadler et al. |
| 2009/0051659 A1 | 2/2009 | Mickelborough |
| 2009/0052218 A1 | 2/2009 | Kang |
| 2009/0065948 A1 | 3/2009 | Wang |
| 2009/0066660 A1 | 3/2009 | Ure |
| 2009/0067256 A1 | 3/2009 | Bhattacharyya et al. |
| 2009/0073138 A1 | 3/2009 | Lee et al. |
| 2009/0085225 A1 | 4/2009 | Park |
| 2009/0085608 A1 | 4/2009 | Alzheimer |
| 2009/0086420 A1 | 4/2009 | Stockham et al. |
| 2009/0090950 A1 | 4/2009 | Forbes et al. |
| 2009/0091536 A1 | 4/2009 | Callaghan |
| 2009/0091962 A1 | 4/2009 | Chung et al. |
| 2009/0103675 A1 | 4/2009 | Yousefi Moghaddam et al. |
| 2009/0127668 A1 | 5/2009 | Choi |
| 2009/0128991 A1 | 5/2009 | Mauritzson |
| 2009/0143652 A1 | 6/2009 | Warburton et al. |
| 2009/0158152 A1 | 6/2009 | Kodimer et al. |
| 2009/0160781 A1 | 6/2009 | Henderson et al. |
| 2009/0166846 A1 | 7/2009 | Pratt et al. |
| 2009/0180257 A1 | 7/2009 | Park et al. |
| 2009/0197394 A1 | 8/2009 | Parekh |
| 2009/0206431 A1 | 8/2009 | Bolken et al. |
| 2009/0213066 A1 | 8/2009 | Hardacker et al. |
| 2009/0224822 A1 | 9/2009 | Alzheimer et al. |
| 2009/0225053 A1 | 9/2009 | Hu |
| 2009/0231290 A1* | 9/2009 | Chen ............ 345/173 |
| 2009/0237970 A1 | 9/2009 | Chung |
| 2009/0255705 A1 | 10/2009 | Pratt |
| 2009/0259806 A1 | 10/2009 | Kilzer et al. |
| 2009/0261457 A1 | 10/2009 | Pratt |
| 2009/0271731 A1 | 10/2009 | Lin et al. |
| 2009/0285031 A1 | 11/2009 | Rajan et al. |
| 2009/0289912 A1 | 11/2009 | Chen et al. |
| 2009/0295747 A1 | 12/2009 | Hsieh et al. |
| 2009/0300314 A1 | 12/2009 | LaBerge et al. |
| 2009/0300444 A1 | 12/2009 | Jeddeloh |
| 2009/0302484 A1 | 12/2009 | Lee et al. |
| 2009/0309142 A1 | 12/2009 | Akram |
| 2009/0319703 A1 | 12/2009 | Chung |
| 2009/0321861 A1 | 12/2009 | Oliver et al. |
| 2009/0321947 A1 | 12/2009 | Pratt |
| 2009/0323206 A1 | 12/2009 | Oliver et al. |
| 2010/0005390 A1 | 1/2010 | Bong |
| 2010/0017872 A1 | 1/2010 | Goertz et al. |
| 2010/0020039 A1 | 1/2010 | Ricks et al. |
| 2010/0026640 A1 | 2/2010 | Kim et al. |
| 2010/0035656 A1* | 2/2010 | Pan ................ 455/566 |
| 2010/0045612 A1 | 2/2010 | Molne |
| 2010/0045621 A1* | 2/2010 | Kang et al. ............ 345/173 |
| 2010/0053103 A1 | 3/2010 | No et al. |
| 2010/0053532 A1 | 3/2010 | Lai |
| 2010/0058211 A1* | 3/2010 | Lee et al. .............. 715/764 |
| 2010/0066764 A1 | 3/2010 | Refai |
| 2010/0077829 A1 | 4/2010 | Batista et al. |
| 2010/0079398 A1 | 4/2010 | Shen et al. |
| 2010/0085500 A1 | 4/2010 | Kim |
| 2010/0097347 A1 | 4/2010 | Lin |
| 2010/0110748 A1 | 5/2010 | Best |
| 2010/0134429 A1 | 6/2010 | You et al. |
| 2010/0134448 A1 | 6/2010 | Park et al. |
| 2010/0149101 A1 | 6/2010 | Guo et al. |
| 2010/0149124 A1 | 6/2010 | Kim et al. |
| 2010/0164745 A1 | 7/2010 | Migos et al. |
| 2010/0164884 A1 | 7/2010 | Chiu et al. |
| 2010/0188353 A1 | 7/2010 | Yoon et al. |
| 2010/0188365 A1 | 7/2010 | Tamaki et al. |
| 2010/0194709 A1 | 8/2010 | Tamaki et al. |
| 2010/0201651 A1 | 8/2010 | Baucom et al. |
| 2010/0206560 A1 | 8/2010 | Atencio |
| 2010/0207900 A1 | 8/2010 | Kung et al. |
| 2010/0208082 A1 | 8/2010 | Buchner et al. |
| 2010/0214499 A1 | 8/2010 | Sanelle et al. |
| 2010/0222735 A1 | 9/2010 | Plahey et al. |
| 2010/0225608 A1 | 9/2010 | Zhou et al. |
| 2010/0240390 A1 | 9/2010 | Russ et al. |
| 2010/0257304 A1 | 10/2010 | Rajan et al. |
| 2010/0259490 A1 | 10/2010 | Lee |
| 2010/0271888 A1 | 10/2010 | Rajan et al. |
| 2010/0277432 A1 | 11/2010 | Tsai |
| 2010/0281280 A1 | 11/2010 | Rajan et al. |
| 2010/0293460 A1 | 11/2010 | Budelli |
| 2010/0328230 A1* | 12/2010 | Faubert et al. ............ 345/173 |

(56) References Cited

U.S. PATENT DOCUMENTS

| | | |
|---|---|---|
| 2010/0332635 A1 | 12/2010 | Rogel et al. |
| 2011/0001706 A1 | 1/2011 | Sanford et al. |
| 2011/0007023 A1 | 1/2011 | Abrahamsson et al. |
| 2011/0012921 A1 | 1/2011 | Cholewin et al. |
| 2011/0016250 A1 | 1/2011 | Lee et al. |
| 2011/0025969 A1 | 2/2011 | Chen et al. |
| 2011/0035540 A1 | 2/2011 | Fitzgerald et al. |
| 2011/0037726 A1 | 2/2011 | Lee |
| 2011/0044064 A1 | 2/2011 | Hu et al. |
| 2011/0045813 A1* | 2/2011 | Choi .................. 455/418 |
| 2011/0050576 A1 | 3/2011 | Forutanpour et al. |
| 2011/0050591 A1 | 3/2011 | Kim et al. |
| 2011/0050592 A1 | 3/2011 | Kim et al. |
| 2011/0050593 A1 | 3/2011 | Kim et al. |
| 2011/0050594 A1 | 3/2011 | Kim et al. |
| 2011/0050608 A1 | 3/2011 | Homma et al. |
| 2011/0051334 A1 | 3/2011 | Griffith et al. |
| 2011/0057889 A1* | 3/2011 | Sakatsume .................. 345/173 |
| 2011/0059777 A1* | 3/2011 | Rao .................. 455/566 |
| 2011/0063248 A1 | 3/2011 | Yoon |
| 2011/0066790 A1 | 3/2011 | Mogul et al. |
| 2011/0080417 A1 | 4/2011 | Lin et al. |
| 2011/0084921 A1* | 4/2011 | Kang et al. .................. 345/173 |
| 2011/0088416 A1 | 4/2011 | Koethler |
| 2011/0095783 A1 | 4/2011 | Ferolito et al. |
| 2011/0102336 A1 | 5/2011 | Seok et al. |
| 2011/0102347 A1 | 5/2011 | Lim et al. |
| 2011/0109573 A1 | 5/2011 | Deslippe et al. |
| 2011/0109829 A1 | 5/2011 | Mathew et al. |
| 2011/0110047 A1 | 5/2011 | Pauley et al. |
| 2011/0113208 A1 | 5/2011 | Jouppi et al. |
| 2011/0115738 A1 | 5/2011 | Suzuki et al. |
| 2011/0117968 A1 | 5/2011 | Eromaki |
| 2011/0118029 A1 | 5/2011 | Lukas et al. |
| 2011/0122084 A1 | 5/2011 | Jeon et al. |
| 2011/0152739 A1 | 6/2011 | Roncadi et al. |
| 2011/0164047 A1 | 7/2011 | Pance |
| 2011/0169745 A1 | 7/2011 | Fang et al. |
| 2011/0169775 A1 | 7/2011 | Liaw et al. |
| 2011/0175805 A1 | 7/2011 | Rottler et al. |
| 2011/0175844 A1 | 7/2011 | Berggren |
| 2011/0175845 A1 | 7/2011 | Honda et al. |
| 2011/0175902 A1 | 7/2011 | Mahowald et al. |
| 2011/0181552 A1 | 7/2011 | Goertz et al. |
| 2011/0205446 A1 | 8/2011 | Hardacker et al. |
| 2011/0210942 A1 | 9/2011 | Kitamori et al. |
| 2011/0210943 A1 | 9/2011 | Zaliva |
| 2011/0227836 A1 | 9/2011 | Li et al. |
| 2011/0227877 A1 | 9/2011 | Chen |
| 2011/0239110 A1 | 9/2011 | Garrett et al. |
| 2011/0248941 A1 | 10/2011 | Abdo et al. |
| 2011/0254793 A1 | 10/2011 | Ban et al. |
| 2011/0260984 A1* | 10/2011 | Paleczny .................. 345/173 |
| 2011/0260994 A1 | 10/2011 | Saynac et al. |
| 2011/0261002 A1* | 10/2011 | Verthein .................. 345/174 |
| 2011/0273394 A1 | 11/2011 | Young et al. |
| 2011/0273396 A1 | 11/2011 | Chung |
| 2011/0291945 A1* | 12/2011 | Ewing et al. .................. 345/173 |
| 2011/0291953 A1 | 12/2011 | Cheok et al. |
| 2012/0007821 A1 | 1/2012 | Zaliva |
| 2012/0008436 A1 | 1/2012 | Rajan et al. |
| 2012/0011310 A1 | 1/2012 | Rajan et al. |
| 2012/0011386 A1 | 1/2012 | Rajan et al. |
| 2012/0013566 A1 | 1/2012 | Chung |
| 2012/0018871 A1 | 1/2012 | Lee et al. |
| 2012/0019448 A1 | 1/2012 | Pitkanen et al. |
| 2012/0023450 A1 | 1/2012 | Noto et al. |
| 2012/0032876 A1 | 2/2012 | Tabe |
| 2012/0034954 A1 | 2/2012 | Tabe |
| 2012/0037878 A1 | 2/2012 | Liu |
| 2012/0038045 A1 | 2/2012 | Lee |
| 2012/0042204 A1 | 2/2012 | Smith et al. |
| 2012/0044172 A1 | 2/2012 | Ohki et al. |
| 2012/0056846 A1 | 3/2012 | Zaliva |
| 2012/0059976 A1 | 3/2012 | Rosenband et al. |
| 2012/0059978 A1 | 3/2012 | Rosenband et al. |
| 2012/0060123 A1* | 3/2012 | Smith .................. 715/833 |
| 2012/0063194 A1 | 3/2012 | Baek et al. |
| 2012/0069647 A1 | 3/2012 | Kramer et al. |
| 2012/0070973 A1 | 3/2012 | Sandhu et al. |
| 2012/0074584 A1 | 3/2012 | Lee et al. |
| 2012/0077314 A1 | 3/2012 | Park et al. |
| 2012/0086670 A1 | 4/2012 | Teil et al. |
| 2012/0105367 A1 | 5/2012 | Son et al. |
| 2012/0105370 A1 | 5/2012 | Moore |
| 2012/0106228 A1 | 5/2012 | Lee |
| 2012/0109037 A1 | 5/2012 | Ellingboe et al. |
| 2012/0109621 A1 | 5/2012 | Rajan et al. |
| 2012/0124281 A1 | 5/2012 | Rajan et al. |
| 2012/0126883 A1 | 5/2012 | Juengling |
| 2012/0127685 A1 | 5/2012 | Corisis et al. |
| 2012/0135567 A1 | 5/2012 | Akram et al. |
| 2012/0135569 A1 | 5/2012 | Corisis |
| 2012/0138927 A1 | 6/2012 | Kang |
| 2012/0140583 A1 | 6/2012 | Chung |
| 2012/0147684 A1 | 6/2012 | Schakel et al. |
| 2012/0154328 A1 | 6/2012 | Kono |
| 2012/0162087 A1 | 6/2012 | Hou |
| 2012/0180043 A1 | 7/2012 | Tsirkin et al. |
| 2012/0182249 A1 | 7/2012 | Endo et al. |
| 2012/0194461 A1 | 8/2012 | Lim |
| 2012/0194462 A1 | 8/2012 | Lim |
| 2012/0201088 A1 | 8/2012 | Rajan et al. |
| 2012/0203958 A1 | 8/2012 | Jones et al. |
| 2012/0203993 A1 | 8/2012 | Virgin et al. |
| 2012/0204079 A1 | 8/2012 | Takefman et al. |
| 2012/0206165 A1 | 8/2012 | Ferolito et al. |
| 2012/0223900 A1 | 9/2012 | Jiyama et al. |
| 2012/0226924 A1 | 9/2012 | Rajan et al. |
| 2012/0229403 A1 | 9/2012 | De Jong et al. |
| 2012/0229404 A1 | 9/2012 | De Jong et al. |
| 2012/0229405 A1 | 9/2012 | De Jong et al. |
| 2012/0231853 A1 | 9/2012 | Takahashi et al. |
| 2012/0239874 A1 | 9/2012 | Lee et al. |
| 2012/0240044 A1 | 9/2012 | Johnson et al. |
| 2012/0242610 A1 | 9/2012 | Yasumatsu |
| 2012/0244348 A1 | 9/2012 | Park et al. |
| 2012/0250386 A1 | 10/2012 | Lee et al. |
| 2012/0254519 A1 | 10/2012 | Ellis |
| 2012/0254747 A1 | 10/2012 | Bocirnea |
| 2012/0266072 A1 | 10/2012 | Karaoguz |
| 2012/0271990 A1 | 10/2012 | Chen et al. |
| 2012/0274662 A1 | 11/2012 | Kim et al. |
| 2012/0293449 A1 | 11/2012 | Dietz |
| 2012/0306764 A1 | 12/2012 | Kamibeppu |
| 2012/0306765 A1 | 12/2012 | Moore |
| 2012/0306766 A1 | 12/2012 | Moore |
| 2012/0313888 A1 | 12/2012 | Lee et al. |
| 2012/0317433 A1 | 12/2012 | Ellis et al. |
| 2013/0002610 A1 | 1/2013 | Ho et al. |
| 2013/0007399 A1 | 1/2013 | Smith et al. |
| 2013/0009869 A1 | 1/2013 | Wilensky |
| 2013/0019076 A1 | 1/2013 | Amidi et al. |
| 2013/0021285 A1 | 1/2013 | Kimura et al. |
| 2013/0021295 A1 | 1/2013 | Kimura et al. |
| 2013/0027350 A1 | 1/2013 | Liaw et al. |
| 2013/0027358 A1 | 1/2013 | Liaw et al. |
| 2013/0054881 A1 | 2/2013 | Ellis et al. |
| 2013/0055134 A1 | 2/2013 | Knor |
| 2013/0060994 A1 | 3/2013 | Higgins et al. |
| 2013/0061019 A1 | 3/2013 | Fitzpatrick et al. |
| 2013/0061101 A1 | 3/2013 | Fitzpatrick et al. |
| 2013/0063364 A1 | 3/2013 | Moore |
| 2013/0063389 A1 | 3/2013 | Moore |
| 2013/0076649 A1* | 3/2013 | Myers et al. .................. 345/173 |
| 2013/0076941 A1 | 3/2013 | Palanciuc et al. |
| 2013/0082970 A1 | 4/2013 | Frey et al. |
| 2013/0082979 A1 | 4/2013 | Rabu et al. |
| 2013/0085215 A1 | 4/2013 | Shitara et al. |
| 2013/0086309 A1 | 4/2013 | Lee et al. |
| 2013/0093687 A1 | 4/2013 | Papakipos et al. |
| 2013/0100070 A1 | 4/2013 | Zheng et al. |
| 2013/0100087 A1 | 4/2013 | Liaw et al. |
| 2013/0102371 A1 | 4/2013 | Silva |

(56) References Cited

U.S. PATENT DOCUMENTS

| | | | |
|---|---|---|---|
| 2013/0103377 A1 | 4/2013 | Rajan et al. | |
| 2013/0103897 A1 | 4/2013 | Rajan et al. | |
| 2013/0106802 A1 | 5/2013 | Liaw et al. | |
| 2013/0109928 A1 | 5/2013 | Menzel | |
| 2013/0120284 A1 | 5/2013 | Chen et al. | |
| 2013/0120302 A1 | 5/2013 | Kang et al. | |
| 2013/0124993 A1 | 5/2013 | Daisy | |
| 2013/0125322 A1 | 5/2013 | Sakashita et al. | |
| 2013/0127765 A1 | 5/2013 | Behdasht et al. | |
| 2013/0132661 A1 | 5/2013 | Schakel et al. | |
| 2013/0132779 A1 | 5/2013 | Smith et al. | |
| 2013/0132838 A1 | 5/2013 | Daisy | |
| 2013/0141388 A1 | 6/2013 | Ludwig et al. | |
| 2013/0181928 A1 | 7/2013 | Li | |
| 2013/0181931 A1 | 7/2013 | Kinoshita | |
| 2013/0188336 A1 | 7/2013 | Yuan et al. | |
| 2013/0188424 A1 | 7/2013 | Rajan et al. | |
| 2013/0191585 A1 | 7/2013 | Rajan et al. | |
| 2013/0205102 A1 | 8/2013 | Jones et al. | |
| 2013/0215064 A1 | 8/2013 | Cholewin et al. | |
| 2013/0238849 A1 | 9/2013 | Amer et al. | |
| 2013/0254456 A1 | 9/2013 | Chen et al. | |
| 2013/0254497 A1 | 9/2013 | Chen et al. | |
| 2013/0275795 A1 | 10/2013 | Ellis et al. | |
| 2013/0282962 A1 | 10/2013 | Rub et al. | |
| 2013/0307809 A1 | 11/2013 | Sudou | |
| 2013/0307827 A1 | 11/2013 | Reisman et al. | |
| 2013/0321317 A1 | 12/2013 | Hirukawa | |
| 2013/0321340 A1* | 12/2013 | Seo et al. | 345/174 |
| 2013/0332796 A1 | 12/2013 | Ellis | |
| 2013/0332876 A1 | 12/2013 | Johnson et al. | |
| 2013/0335357 A1 | 12/2013 | Hou | |
| 2014/0028601 A1 | 1/2014 | Moore | |
| 2014/0040568 A1 | 2/2014 | Lee et al. | |
| 2014/0040569 A1 | 2/2014 | Solomon et al. | |
| 2014/0057102 A1 | 2/2014 | Park et al. | |
| 2014/0066139 A1 | 3/2014 | Ure | |
| 2014/0095769 A1 | 4/2014 | Borkenhagen | |
| 2014/0096092 A1 | 4/2014 | Johnson | |
| 2014/0099235 A1 | 4/2014 | Ellingboe et al. | |
| 2014/0104219 A1 | 4/2014 | Ludwig | |
| 2014/0104220 A1 | 4/2014 | Ludwig | |
| 2014/0132548 A1 | 5/2014 | Ludwig | |
| 2014/0132549 A1 | 5/2014 | Ludwig | |
| 2014/0134433 A1 | 5/2014 | Park et al. | |
| 2014/0134434 A1 | 5/2014 | Park et al. | |
| 2014/0139473 A1 | 5/2014 | Kang et al. | |
| 2014/0156919 A1 | 6/2014 | Chen et al. | |
| 2014/0156920 A1 | 6/2014 | Chen et al. | |
| 2014/0168128 A1 | 6/2014 | Reisman et al. | |
| 2014/0191962 A1 | 7/2014 | Kim | |
| 2014/0208248 A1 | 7/2014 | Davidson | |
| 2014/0210786 A1 | 7/2014 | Ludwig | |
| 2014/0340358 A1 | 11/2014 | Martinoli | |
| 2014/0368455 A1 | 12/2014 | Croisonnier et al. | |
| 2015/0068526 A1 | 3/2015 | Habashi | |
| 2015/0197670 A1 | 7/2015 | Shitara et al. | |
| 2015/0234518 A1 | 8/2015 | Teller et al. | |
| 2015/0253609 A1 | 9/2015 | Zhou et al. | |

FOREIGN PATENT DOCUMENTS

| | | |
|---|---|---|
| WO | 2008131058 A2 | 10/2008 |
| WO | 2008131058 A3 | 10/2008 |
| WO | 2011126893 A2 | 8/2011 |
| WO | 2011100444 A2 | 10/2011 |
| WO | WO2012149911 | 11/2012 |

OTHER PUBLICATIONS

Kratz, Sven et al., "Extending the Virtual Trackball Metaphor to Rear Touch Input," 2010, pp. 1-4.
Patterson, Robert, "Human Factors of Stereoscopic Displays," Washington State University, Jul. 5, 2009, pp. 1-14.
Marmor, Michael F., et al., "Visual Insignificance of the Foveal Pit," 2008, pp. 1-7.
Bornstein, Dan, "Android Dalvik VM Internals," May 29, 2008, slides 1-58.
Sud, Shivani, et al., "Dynamic Migration of Computation through virtualization of the mobile platform," Intel Labs, Oct. 26, 2009, slides 1-16.
Xiao, Feng et al., "Mobile Imaging: The Big Challenge of the Small Pixel," SPIE-IS&T vol. 7250, 2009, pp. 1-9.
Hofer, Heidi et al., "Organization of the Human Trichromatic Cone Mosaic," Oct. 19, 2005, pp. 1-11.
Brueck et al., "Certificate of Correction," U.S. Pat. No. 7,818,444B2. Oct. 19, 2010.
Refai, Wail Mohsen, "Office Communication," U.S. Appl. No. 12/233,386, May 27, 2011.
Ross, Arun et al., "A Calibration Model for Fingerprint Sensor Interoperability," SPIE Conference on Biometric Technology for Human Identification, Apr. 2006, pp. 1-12.
Bhardwaj, Rishi et al., "A Choices Hypervisor on the ARM Architecture," University of Illinois, Apr. 2006, pp. 1-5.
Xu, Fan et al., "A Dynamic Binary Translation Framework Based on Page Fault Mechanism in Linux Kernel," IEEE International Conference on Computer and Information Technology, 2010, p. 1-6.
Ebcioglu, Kernal et al., "A JAVA ILP Machine Based on Fast Dynamic Compilation," IBM T.J. Watson Research Center, 1997, pp. 1-13.
Muthitacharoen, Athicha et al., "A Low-bandwidth Network File System," Laboratory for Computer Science, MIT, Department of Computer Science, NYU, Oct. 21, 2001, pp. 1-14.
Onoue, Koichi et al., "A Virtual Machine Migration System Based on a SPU Emulator," Virtualization Technology in Distributed Computing, Nov. 17, 2006, pp. 1-8.
Rudolph, Larry, "A Virtualization Infrastructure that Supports Pervasive Computing," VMwar, IEEE CS, 2009, pp. 1-6.
Smith, J. E. et al., "Achieving High Performance via Co-Designed Virtual Machines," Oct. 1998, pp. 1-6.
Morre, Ryan W. et al., "Addressing the Challenges of DBT for the ARM Architecture," University of Pittsburgh. 2009, pp. 1-10.
Carroll, Aaron et al., "An Analysis of Power consumption in a Smartphone," 2010 USENIX Conference, 2010, pp. 1-14.
Deshane, Todd, "An Attack-Resistant and Rapid Recovery Desktop System," Clarkson University, Dissertation, Aug. 2010, pp. 1-130.
Chen, Wei et al., "An Emulator for Executing IA-32 Application on ARM-Based Systems," Journal of Computers, vol. 5, Jul. 7, 2010, pp. 1133-1141.
Bihlmayr, Wolfgang et al., "OLED Display Driver for the HCS08 Family," Freescale Semiconductor Application Note, Mar. 2007, pp. 1-42.
"Interfacing 4-wire and 5-wire resistive touchscreens to the LPC247x," Nov. 13, 2008.
On, Calvin, "ANA: A Method for ARM-on-ARM Execution," Sep. 2007, MIT, pp. 1-62.
Iqbal, Asif et al., "An Overview of Microkernel, Hypervisor and Microvisor Virtualization Approaches for Embedded Systems," Lund University, 2009, pp. 1-15.
Zwicker, Matthias et al., "Antialiasing for Automultiscopic 3D displays," 2006, pp. 1.
Fitzroy-Dale, Nicholas, "Architecture Optimization," University of new South Wales, Mar. 2010, pp. 1-152.
McCallum, David C. et al., "ARC-Pad: Absolute+Relative Cursor Positioning for Large Displays with a Mobile Touchscreen," University of Manitoba, Oct. 7, 2009, 1-4.
Bungale, Parashanth, "ARM Virtualization: CPU & MMU Issues," VMware, 2010, slides 1-16.
Chun, Byung-Gon et al., "Augmented Smartphone Applications Through Clone Cloud Execution," Intel Research Berkeley, May 18, 2009, pp. 1-5.
Sousa, Joao Pedro et al., "Aura: An Architectural Framework for User Mobility in Ubiquitous Computing Environments," Carnegie Mellon University Research Showcase, Aug. 1, 2002, pp. 1-15.
Hyser, Chris et al., "Autonomic Virtual Machine Placement in the Data Center," Feb. 26, 2008, pp. 1-11.
User'S Guide, "Motorola Backflip with Motoblur," 2010, pp. 1-67.

(56) References Cited

OTHER PUBLICATIONS

Satyanarayanan, Mahadev et al., "Bringing the Cloud Down to Earth: Transient PCs Everywhere," Carnegie Mellon University, Sep. 2010, pp. 1-11.
Chun, Byung-Gon et al., "CloneCloud: Elastic Execution between Mobile Device and Cloud," 2011, pp. 1-14.
Molnos, Anca et al., "Composable Processor Virtualization for Embedded Systems," 2010, pp. 1-10.
Lanman, Souglas et al., "Content-Adaptive Parallax Barriers: Optimizing Dual-layer 3D Displays using Low-Rank Light Field Factorization," 2010, pp. 1-10.
Pai, Ankur et al., "Customizable Multimedia Devices in Virtual Environments," Georgia Institute of Technology, 2008, pp. 1-18.
Jiang, Hai et al., "Data Conversion for Process/Thread Migration and Checkpointing," Wayne State University, 2003 International Conference on Parallel Processing (ICPP'03), 2003, pp. 1-8.
Kotzmann, Thomas et al., "Design of the Java HotSpot Client Complier for Java 6," May 2008, pp. 1-32.
Lowell, David E. et al., "Devirtualizable Virtual Machines Enabling General, Single-Node, Online Maintenance," Hewlett-Packard Laboratories, Oct. 7, 2004, pp. 1-13.
Sangorrin, Daniel et al., "Dual operation System Architecture for Real-Time Embedded Systems," Jul. 6, 2010, slides 1-24.
Sud, Shivani et al., "Dynamic Migration of Computation through Virtualization of the Mobile Platform," Intel Future Technology Research, Apr. 1, 2012, pp. 1-10.
Kloster, Jacob Faber et al., "Efficient Memory Sharing in the Xen Virtual Machine Monitor," Aalborg University, Jan. 2006, pp. 1-86.
Liebergeld, Steffen, "Efficient Virtualization on ARM Platforms," Techishe Universitat Dresden, May 6, 2009, pp. 1-52.
IS&T/SPIE, "Electronic Imaging," Hyatt Regency Hotel, Jan. 2011, pp. 1-153.
Ericson, Finn, "Interactive Handheld Phantograms," KTH Computer Science and Communication, Thesis, 2010, pp. 1-38.
Brash, David, "Extensions to the ARMv7-A Architecture," Aug. 2010, pp. 1-21.
Deshane, Todd et al., "Xen Hypervisor Deployment, Management, and Cloud Computing Tools," Clarkson University, 2010, slides 1-151.
Silvia, "Adaptive HTTP Streaming for open Codecs," Oct. 9, 2010, pp. 1-6.
Doudalis, Ioannis et al., "HARE++: Hardware Assisted Reverse Execution Revisited," Georgia Institute of Technology, Mar. 2011, pp. 1-8.
Van Schaik, Carl et al., "High-Performance Microkernels and Virtualization on ARM and Segmented Architectures," 2007, pp. 1-11.
Heiser, Gernot, "Hypervisors for Consumer Electronics," University of New South Wales, 2009, pp. 1-5.
Kalady, Saidalavi et al., "Implementation of a Purley Hardware-assisted VMM for x86 Architecture," Preceedings of the World congress on Engineering 2009 vol. 1, 2009, pp. 1-5.
Varanasi, Prashant, "Implementing Hardware-Supported Virtualization in OKL4 on ARM," Nov. 30, 2010, pp. 1-88.
Lagar-Cavilla, Andres et al., "Interactive Resource-Intensive Applications Made Easy," 2007 pp. 1-21.
Kozuch, Michael et al., "Internet Suspend/Resume," Carnegie Mellon University and Intel Research Pittsburgh, 2002, pp. 1-7.
Iphone, "How the Iphone works," HowStuffWorks, 2007, pp. 1-4.
Gesler, Wilson S., "Physical Limits of Acuity and Hyperacuity," University of Texas, Oct. 26, 1983, pp. 1-8.
Kaser, Dominik et al., "FingerGlass: Efficient Multiscale Interaction on Multitouch Screens," 2011, pp. 1-10.
Dall, Christoffer et al., "KVM for ARM," Columbia University, 12$^{th}$ annual Linux Symposium, 2010, pp. 1-12.
Wolf, Chris, "Let's Get Virtual: A Look at Today's Server Virtualization Architectures," Burton Group Data center Strategies, May 14, 2007, pp. 1-42.
Smaldone, Stephen, "Leveraging Smart Phones to Reduce Mobility Footprints," 2009, pp.
Clark, Chistopher, "Live Migration of Virtual Machines," 2005, pp. 1-14.
Chapman, Matthew et al., "MagiXen: Combining Binary Translation and Virtualization," HP Enterprise Systems and Software Laboratory, May 4, 2007, pp. 1-15.
Immersion "Creating the HD Haptic Experience in Mobile Devices," 2011, pp. 1-3.
Wintek, "Specifications for LCD Module," 2010, pp. 1-28.
Kozuch, Michael A. et al., "Migration without Virtualization," Intel Research Pittsburg, 2005, pp. 1-5.
Schrader, Bernhard, "Multi Root I/O Virtualization," FCS TEC-Team, Fujitsu Siemens, Nov. 2, 2008, slides 1-9.
Jacobsson, Sarah, "Nexus one's Screen is Gorgeous, But With Issues," PCWorld, Feb. 32, 2010, pp. 1-5.
Lynch, James P., "Nokia 6100 LCD Display Driver," 2010, pp. 1-55.
McCammon, Rob, "Android Solutions," Open Kernel Labs, 2009, slides 1-11.
Chen, Juinn-Yeu et al., "On Static Binary Translation and Optimization for ARM based Applications," Apr. 6, 2008, pp. 1-10.
King, Samuel T. et al., "Operating Systems Extensions to Support Host Based Virtual Machines," Department of Electrical Engineering and Computer Science, University of Michigan, 2002, pp. 1-14.
Bahar, Barus et al., "Mobile-Phone Based Gesture Recognition," Proceedings of the Enterface'07, 2007, pp. 1-8.
Jeong, Jae-Woo et al., "Parfait: A New Scheduler Framework supporting Heterogeneous Xen-ARM schedulers," Jan. 2011, pp. 1-5.
Satyanarayanan, Mahadev et al., "Pervasive Personal Computing in an Internet Suspend/Resume System," IEEE Computer Society, Mar. 2007, pp. 1-10.
Cox, Landon P. et al., "Pocket Hypervisors: Opportunities and Challenges," Mar. 8, 2007, pp. 1-6.
Gilbert, Benjamin et al., "Pocket ISR: Virtual Machines Anywhere," Carnegie Mellon University, Mar. 2010, pp. 1-19.
McGill, Kathleen et al., "Process Migration for Resilient Applications," Dartmouth College, 2011, pp. 1-14.
Garlan, David et al., "Project Aura: Toward Distraction-Free Pervasive Computing," IEEE, 2002, pp. 1-10.
Park, Miri et al., "Real-time Operating System Virtualization for Xen-Arm," 2009, pp. 1-2.
Zhou, Honbo et al., "Receiver Makes Right Data Conversion in PVM," Oak Ridge National Laboratory, 1995 pp. 1-8.
Red Hat, "Virtualization Guide: Red Hat Virtualization," Red Hat Inc., 2007, pp. 1-104.
Pasricha, Sudeep et al., "Reducing Backlight Power Consumption for Streaming Video Application on Mobile Handheld Devices," University of California, Nov. 2, 2003, pp. 1-7.
Probst, Mark et al., "Register Liveness Analysis for Optimizing Dynamic Binary Translation," 2002, pp. 1-10.
Seo, Sangwon, "Research on System Virtualization using Xen Hypervisor for ARM based secure mobile phones," Seminar Security in Telecommunications, Jan. 14, 2010, pp. 1-11.
Sahami, Alireza et al., "Rich Tactile Output on Mobile Devices," Nov. 2008, pp. 1-12.
Riecke, Bernhard E. et al., "Selected Technical and Perceptual Aspects of Virtual reality Displays," Technical Report No. 154, Oct. 2006, pp. 1-17.
Bickford, Jeffery et al., "Rootkits on Smart Phones: Attacks, Implication and Opportunities," Jun. 10, 2010, pp. 1-6.
Casiez, Gery et al., "RubberEdge: Improved Interaction with Mobile Devices via Elastic-Edged Touchpads," Apr. 2008, pp. 1-1.
Akhshabi, Saamer et al., "An Experimental Evaluation of Rate-Adaptation Algorithms in Adaptive Streaming over HTTP," Feb. 23, 2011, pp. 1-12.
PCI-SIG et al., "Single Root I/O Virtualization and Sharing Specification Revision 1.0," Sep. 11, 2007, pp. 1-84.
Downs, Rick, "Using Resistive touch screens for human/machine interface," 2005, pp. 1-6.
Date, Munekazu et al., "Small-Depth-Error Display Using Depth Fused 3D (DFD)," Feb. 2009, pp. 1-4.
Zctoak, Coden, "Special Topic: Mobile Cloud Computing and Applications," ZTE Communications, vol. 9, Mar. 2011, pp. 1-70.
McCammon, Rob, "Streamlining Android Migration with Virtualization," ARM and Android, Jul. 19, 2012, pp. 1-4.

(56) References Cited

OTHER PUBLICATIONS

SEMTECH, "Advanced Communications and Sensing," Jul. 25, 2011, pp. 1-61.
Krause, Mike et al., "Implementing PCI I/O Virtualization Standards," Apr. 6, 2011, pp. 1-8.
Balasubramanian, Niranjan et al., "Energy Consumption in Mobile Phones: A Measurement Study and Implications for Network Applications," University of Massachusetts Amherst, Nov. 4, 2009, pp. 1-14.
Chaudhary, Vipin et al., "Techniques for Migrating Computations on the Grid," 2006, pp. 1-19.
Citrix, "The 'Nirvana Phone,' Concept Specification and Draft Reference Architecture," 2010, pp. 1-10.
ARM, "The ARM Architecture," 2010, pp. 1-43.
Mijat, Roberto et al., "Virtualization is Coming to a Platform Near You," ARM, 2011, pp. 1-12.
Sousa, Joao Pedro, et al., "The Aura software Architecture: an Infrastructure for Ubiquitous Computing," Carnegie Mellon University Research Showcase, Aug. 1, 2003, pp. 1-48.
Osman, Steven et al., "The Design and Implementation of Zap: A System for Migrating Computing Environments," OSDI, Dec. 2002, pp. 1-16.
Hartig, Hermann, "The L4 Microkernel," Artist Summer School in Europe, Sep. 2010, slides 1-99.
Heiser, Gernot et al., "The OKL4 Microvisor: convergence Point of Microkernels and Hypervisors," Aug. 30, 2010, pp. 1-5.
Mackenzie, I. Scott, et al., "The Tactile Touchpad," Conference on Human Factors in Computing Systems, 1997, pp. 1-5.
Ben-Yehuda, Muli et al., "IBM Research Report, the Turtles Project: Design and Implementation of Tested Virtualization," IBM Research Division, Jan. 9, 2010, pp. 1-15.
Baker, Bonnie C. et al., "The Power Behind Resistive Touch Screens," Texas Instruments, 2007, pp. 1-9.
Hertzum, Morten et al., "TouchGrid: Touchpad pointing by recursively mapping taps to smaller display regions," Behaviour and Information Technology, vol, 24, No. 5, 2005, pp. 1-18.
Satyanarayanan, M. et al., "Towards seamless mobility on pervasive hardward," Mar. 1, 2005, pp. 1-33.
Wolback, Adam et al., "Transient customization of Mobile Computing Infrastructure," Carnegie Mellon University, Apr. 20, 2008, pp. 1-5.
Immersion, "TouchSense System for Mobile Devices," 2010, pp. 1-8.
Ben-Yehuda, Muli et al., "The Turtles Project: Design and Implementation of Nested Virutalization," IBM Research, Oct. 2010, slides 1-92.
McCammon, Rob, "Using Virtualization to Create Mass-Market Smartphones," Technology in Depth, 2011, pp. 1-4.
Hung, Perry L., "Varmosa: Just-in-time Binary Translation of Operating System Kernels," Jun. 2009, pp. 1-58.
Goodacre, John et al., "Virtualization Across the ARM Ecosystem," ARM, Sep. 9, 2009, pp. 1-9.
Potter, Shaya, "Virtualization Mechanisms for Mobility, Security and system Administration," Columbia University, 2010, pp. 1-241.
Pelzl, Jan et al., "Virtualization Technologies for Cars, Solutions to increase safety and security of vehicular ECUs," 2008, pp. 1-10.
Deering, Michael F., "The Limits of Human Vision," Sun Microsystems, 1998, pp. 1-6.
Chandrasekaran, Dinesh et al., "Hardware-assisted Secure Virtualization," 2009 pp. 1-8.
VMware, "Understanding Full virtualization, Paravirutalization, and Hardware Assist," Sep. 11, 2007, pp. 1-17.
Stockhammer, Thomas, "dynamic Adaptive Streaming over HTTP-Design Principles and Standards," Qualcomm Incorporated, Feb. 23, 2011, pp. 1-3.
Wijering, Jeroen, "What is Video Streaming?," LongTail Community Blog, Apr. 27, 2011, pp. 1-6.
Chipounov, Vitaly et al., "Dynamically Translating x86 to LLVM using QEMU," 2010, pp. 1-5.
US 7,965,578, 06/2011, Bhakta et al. (withdrawn).
US 7,965,579, 06/2011, Solomon et al. (withdrawn)
Li, J., "A Nanosensor Device for Cellphone Integration and Chemical Sensing Network," DHS CELL-ALL Phase II Workshop, Jul. 29, 2010, 22 pages.
Pering, T. et al., "The PSI Board: Realizing a Phone-Centric Body Sensor Network," 4th International Workshop on Wearable and Implantable Body Sensor Networks, Mar. 2007, pp. 1-6.
Wang, Z. et al., "Exploiting Smart-Phone USB Connectivity for Fun and Profit," ACSAC '10, Dec. 6-10, 2010, 10 pages.
Welte, H., "Anatomy of contemporary GSM cellphone hardware," Apr. 16, 2010, pp. 1-11.
Arora, A., "Sensing by the people, for the people & of the people," Apr. 21, 2008, 48 pages.
Opdenacker, M., "Linux USB drivers," Sep. 15, 2009, pp. 1-95.
U.S. Appl. No. 11/226,061.
Takefman, M. L. et al., U.S. Appl. No. 61/457,233, filed Feb. 8, 2011.
U.S. Appl. No. 11/449,435.
Intel, "Intel PXA27x Processor Family," Memory Subsystem, Jul. 2004, pp. 1-138.
Maxim, "1Gbps to 12.5Gbps; Passive Equalizer for Backplanes and Cables," MAX3787, 19-0406, Rev. 1, Dec. 2005, pp. 1-15.
Wang, B. et al., "6b9b Encoding Scheme for Improving Single-Ended Interface Bandwidth and Reducing Power Consumption without Pin Count Increase," IEEE, 2007, pp. 25-28.
Chen, Y.-H., "Ad-STAC & 3DIC Technology of ITRI," 2010, pp. 1-14.
Schrader, J.H.R et al., "CMOS Transmitter using Pulse-Width Modulation Pre-Emphasis achieving 33dB Loss Compensation at 5-Gb/s," 2005 Symposium on VLSI Circuits Digest of Technical Papers, pp. 388-391.
Garlepp, B. W. et al., "A Portable Digital DLL for High-Speed CMOS Interface Circuits," IEEE Journal of Solid-State Circuits, vol. 34, No. 5, May 1999, pp. 632-644.
D'Ambrosia, J. et al. "40 Gigabit Ethernet and 100 Gigabit Ethernet Technology Overview," Nov. 2008, pp. 1-16.
"The International Technology Roadmap for Semiconductors," Interconnect, 2009, pp. 1-89.
Gustlin, M., "40 and 100 Gigabit Ethernet PCS and PMA Overview," Ethernet Summit, Feb. 2010, pp. 1-15.
Intel, "Intel® GW80314 I/O Companion Chip," Datasheet, Order No. 273757-003US, Nov. 2004, pp. 1-88.
Gondi, S. et al., "A 10-Gb/s CMOS Merged Adaptive Equalizer/CDR Circuit for Serial-Link Receivers," 2006 Symposium on VLSI Circuits Digest of Technical Papers, IEEE, 2006, pp. 1-2.
Gondi, S. et al., "A 10Gb/s CMOS Adaptive Equalizer for Backplane Applications," 2005 IEEE International Solid-State Circuits Conference, 2005, pp. 1-3.
Lin, X. et al., A 2.5- to 3.5-Gb/s Adaptive FIR Equalizer With Continuous-Time Wide-Bandwidth Delay Line in 0.25-?m CMOS, IEEE Journal of Solid-State Circuits, vol. 41, No. 8, Aug. 2006, pp. 1908-1918.
Chandramouli, S., "A Broadband Passive Delay Line Structure in 0.18 MICRON CMOS for a Gigabit Feed Forward Equalizer," Thesis, 2004, pp. 1-52.
Stojanovic, V. et al., "Adaptive Equalization and Data Recovery in a Dual-Mode (PAM2/4) Serial Link Transceiver," 2004, pp. 1-4.
Sun, R. et al., "A Low-Power 20-Gb/s Continuous-Time Adaptive Passive Equalizer," Thesis, 2005, pp. 1-71.
Altera, "Using Pre-Emphasis and Equalization with Stratix GX," White Paper, Sep. 2003, ver. 1.0, pp. 1-11.
AMP, "DDR2 DIMM 25 Degree 1mm CL 240 position," DDR2 DIMM 25 Degree 240—Solder tail, 2005, p. 1.
AMP, "DDR2 DIMM Socket 1mm CL 240 position," DDR2 DIMM 240—Solder tail, 1998, p. 1.
Ramesh, G., "Design of De-Emphasis and Equalization Circuits for Gigabit Serial Interconnects," An Applications Workshop for High-Performance Design, Sep. 2005, pp. 1-28.
Bar-Niv, A., "Balanced equalization: The 10GBASE-KX4 formula for error-free transmission over backplanes," Networking Solutions, Mar. 2005, pp. 1-4.
Barr, T. W. et al., "Translation Caching: Skip, Don't Walk (the Page Table)," ISCA'10, Jun. 19-23, 2010, pp. 1-12.

(56) References Cited

OTHER PUBLICATIONS

Amd, "BIOS and Kernel Developer's Guide (BKDG) for AMD Family 14h Models 00h-0Fh Processors," BKDG for AMD Family 14h Models 00h-0Fh Processors, Feb. 16, 2011, Rev. 3.04, pp. 1-403.
Stojanovic, V., "Channel-Limited High-Speed Links: Modeling, Analysis and Design," Dissertation, Sep. 2004, pp. 1-180.
Hollis, T. M., "Circuit and Modeling Solutions for High-Speed Chip-To-Chip Communication," Dissertation, Apr. 2007, pp. 1-225.
Kloster, J. F. et al., "On the Feasibility of Memory Sharing," Jun. 2006, pp. 1-132.
Grundy, K. et al., "Designing Scalable 10G Backplane Interconnect Systems Utilizing Advanced Verification Methodologies," DesignCon 2006, pp. 1-20.
Shafer, M. et al., "Connector and Chip Vendors Unite to Produce a High-Performance 10 Gb/s NRZ-Capable Serial Backplane," DesignCon 2003; High-Performance System Design Conference, 2003, pp. 1-19.
Vrazel, M. G. et al., "Overcoming Signal Integrity Issues with Wideband Crosstalk Cancellation Technology," DesignCon 2006, pp. 1-25.
Liu, C. Y. et al., "Comparison of Signaling and Equalization Schemes in High Speed SerDes (10-25Gbps)," DesignCon 2007, pp. 1-23.
Chen, J. et al., "High Speed Signaling Design: from 1 Gbps to 10 Gbps," DesignCon East 2004, pp. 1-17.
Buckwalter, J. F., "Deterministic Jitter in Broadband Communication," Thesis, 2006, pp. 1-220.
Lee, C. J. et al., "DRAM-Aware Last-Level Cache Writeback: Reducing Write-Caused Interference in Memory Systems," Apr. 2010, pp. 1-21.
Cook, H. et al., "Virtual Local Stores: Enabling Software-Managed Memory Hierarchies in Mainstream Computing Environments," Technical Report No. UCB/EECS-2009-131, Sep. 24, 2009, pp. 1-24.
Hur, Y. S. et al., "Equalization and Near-End Crosstalk (NEXT) Noise Cancellation for 20-Gbit/sec 4 PAM Backplane Serial I/O Interconnections," Dissertation, Dec. 2005, pp. 1-143.
Liu, J. et al., "Equalization in High-Speed Communication Systems," IEEE Circuits and Systems Magazine, 2004, pp. 1-14.
Buchali, F. et al., "Fast Eye Monitor for 10 Gbit/s and its Application for Optical PMD Compensation," 2000 Optical Society of America, pp. 1-4.
Fujitsu, "125Gbps Parallel CDR Transceiver (0.18um)," 2002, pp. 1-2.
Dhiman, G. et al., "PDRAM: A Hybrid PRAM and DRAM Main Memory System," DAC '09, Jul. 26-31, 2009, pp. 1-6.
Avissar, O. et al., "Heterogeneous Memory Management for Embedded Systems," CASES'01, Nov. 16-17, 2001, pp. 1-10.
Sidiropoulos, S., "High Performance Inter-Chip Signalling," Technical Report No. CSL-TR-98-760, Apr. 1998, pp. 1-139.
Huang, H. et al., "Design and Implementation of Power-Aware Virtual Memory," 2003, pp. 1-14.
Ye, D. et al., "Prototyping a Hybrid Main Memory Using a Virtual Machine Monitor," Oct. 2008, 15 slides.
Wilton, S. J. E., "Implementing Logic in FPGA Memory Arrays: Heterogeneous Memory Architectures," 2002, pp. 1-6.
Intel, "Intel® 64 and IA-32 Architectures Software Developer's Manual," vol. 2A: Instruction Set Reference, A-M, Order No. 253666-037US, Jan. 2011, pp. 1-848.
Intel, "Intel® 64 and IA-32 Architectures Software Developer's Manual," vol. 3A: System Programming Guide, Part 1, Order No. 253668-037US, Jan. 2011, pp. 1-842.
Intel, "Intel® 64 and IA-32 Architectures Software Developer's Manual," vol. 3B: System Programming Guide, Part 2, Order No. 253669-034US, Mar. 2010, pp. 1-936.
Intel, "Intel® 64 and IA-32 Architectures Software Developer's Manual," vol. 1: Basic Architecture, Order No. 253665-037US, Jan. 2011, pp. 1-540.
"International Technology Roadmap for Semiconductors," 2009 Edition, Assembly and Packaging, pp. 1-70.
"IMIS™—Intimate Memory Interface Specification," Revision 1.0, Jun. 1, 2008, pp. 1-33.
Hynix, "I/O Interface Design Technology Using Ads," 2005, 41 slides.
Stachhouse, B. et al., "A 65 nm 2-Billion Transistor Quad-Core Itanium Processor," IEEE Journal of Solid-State Circuits, vol. 44, No. 1, Jan. 2009, pp. 18-31.
JEDEC Standard, DDR3 SDRAM Standard, JESD79-3D, Revision of JESD79-3C, Nov. 2008, Sep. 2009, pp. 1-220.
Balakrishnan, H., "Background: Single-Link Communication," Fall 2001, Sep. 5, 2001, pp. 1-6.
Micron, "NAND Flash Memory," 16Gb, 32Gb, 64Gb, 128Gb Asynchronous/Synchronous NAND Features, 2009, pp. 1-158.
Maxim, "Designing a Simple, Small, Wide-band and Low-Power Equalizer for FR4 Copper Links (Featuring the MAX3785, 1Gbps to 6.4Gbps Equalizer)," DesignCon 2003, HFTA-06.0, 2003, pp. 1-14.
Foster, G., "Measurements of Pre-Emphasis on Altera® Stratix® GX with the BERTScope 12500A," Ver. 1, Jun. 2005, pp. 1-7.
Sudan, K. et al., "Micro-Pages: Increasing DRAM Efficiency with Locality-Aware Data Placement," ASPLOS'10, Mar. 13-17, 2010, pp. 1-12.
Hollis, T. M. et al., "Mitigating ISI Through Self-Calibrating Continuous-Time Equalization," IEEE Transactions on Circuits and Systems—I: Regular Papers, vol. 53, No. 10, Oct. 2006, pp. 2234-2245.
Phadke, S. et al., "MLP Aware Heterogeneous Memory System," 2011 EDAA, pp. 1-6.
National Semiconductor, "EQ50F100—2.5 to 6.125 Gbps fixed equalizer; For 10 Gigabit Ethernet, storage and telecom backplanes," 2004, pp. 1-2.
"Understanding the Linux Virtual Memory Manager," Chapter 3: Page Table Management, pp. 33-52.
Turudic, A. et al., "Pre-Emphasis and Equalization Parameter Optimization with Fast, Worst-Case/Multibillion-Bit Verification," DesignCon 2007, Jan. 2007, pp. 1-28.
Hiraishi, A. et al., "Preferable Improvements and Changes to FB-DiMM High-Speed Channel for 9.6Gbps Operation," ELPIDA, Jan. 26, 2007, pp. 1-35.
Ye, D. et al., "Prototyping a Hybrid Main Memory Using a Virtual Machine Monitor," 2008, pp. 1-8.
Schrader, J.H.R et al., Pulse-Width Modulation Pre-Emphasis Applied in a Wireline Transmitter, Achieving 33 dB Loss Compensation at 5-Gb/s in 0.13- ?m CMOS, IEEE Journal of Solid-State Circuits, vol. 41, No. 4, Apr. 2006, pp. 990-999.
Toms, T. R., QUALCOMM, CDMA Technologies,"An Assessment of 3D Interconnect, Equipment Readiness and ITRS 3D," Jul. 16, 2008, pp. 1-23.
Ousterhout, J. et al., "The Case for RAMClouds: Scalable High-Performance Storage Entirely in DRAM," SIGOPS Operating Systems Review, vol. 43, No. 4, Dec. 2009, pp. 92-105.
Bien, F., "Reconfigurable Equalization for 10-Gb/sec Serial Data Links in a 0.18-?m CMOS Technology," Dissertation, Dec. 2006, pp. 1-121.
Hollis, T. et al., "Reduction of Duty Cycle Distortion through Band-Pass Filtering," 2005, pp. 1-4.
Grozing, M. et al., "Sampling Receive Equalizer with Bit-Rate Flexible Operation up to 10 Gbit/s," IEEE, 2006, pp. 516-519.
Hollis, T. M. et al., "Self-Calibrating Continuous-Time Equalization Targeting Inter-symbol Interference," 2006, pp. 1-4.
Analui, B., "Signal Integrity Issues in High-Speed Wireline Links: Analysis and Integrated System Solutions," Thesis, 2005, pp. 1-194.
Lin, M. et al., "Testable Design for Advanced Serial-Link Transceivers," 2007, pp. 1-6.
Shao, J. et al., "The Bit-reversal SDRAM Address Mapping," 2005, pp. 1-8.
Texas Instruments, "DC to 4-GBPS Dual 1:2 Multiplexer/Repeater/Equalizer," SN65LVCP40, SLLS623D—Sep. 2004—Revised Feb. 2006, pp. 1-22.
Tiruvuru, R. et al., "Transmission Line based FIR Structures for High Speed Adaptive Equalization," ISCAS 2006, IEEE, 2006, pp. 1051-1054.
Park, H.-J., "Signal Integrity for High Speed Circuit Design," Tutorial 9 (ISSCC 2006), pp. 1-91.

(56) References Cited

OTHER PUBLICATIONS

Galloway, P. et al., "Using Creative Silicon Technology to Extend the Useful Life of Backplane and Card Substrates at 3.125 Gbps and Beyond," DesignCon 2001, 2001 High-Performance System Design Conference, pp. 1-7.
"3D Packing" Newsletter on 3D IS, TSV, WLP & Embedded Technologies, Dec. 2009, pp. 1-16.
Hoe, J. C., "18-447 Lecture 21: Virtual Memory: Page Tables and TLBs," Apr. 13, 2009, pp. 1-11.
Kishan, "Virtual Memory Exercises," Windows Internals Course, University of Tokyo, Jul. 2003, pp. 1-3.
Schrader, J. H. R., "Wireline Equalization using Pulse-Width Modulation," 2007, pp. 1-152.
Schrader, J. H. R., "Wireline Equalization using Pulse-Width Modulation," IEEE 2006 Custom Intergrated Circuits Conference (CICC), 2006, pp. 591-598.
"Micron Technology Announces SyncflashTM Memory, A New Flash Technology," 1999, pp. 1.
Markatos, E., "On Using Network RAM as a non-volatile Buffer," Aug. 1998, pp. 1-15.
Bornstein, D., "Android—Dalvik VM Internals," 58 pages, Nov. 2011.
Pering, T., "Intel and Personal Wellness," 22 pages, Aug. 2009.
Klare, B. et al., "Assessment of H.264 Video Compression on Automated Face Recognition Performance in Surveillance and Mobile Video Scenarios," 8 pages, Apr. 2010.
U.S. Appl. No. 11/226,061, filed Sep. 13, 2005.
U.S. Appl. No. 11/449,435, filed Jun. 7, 2006.
"Memory Management" 55 slides, CSE 451: Operating Systems Winter 2007, University of Washington, Jan. 28, 2007.
Yuen, R. et al., "A 5Gb/s Transmitter with Reflection Cancellation for Backplane Transceivers," pp. 1-4, Sep. 2006.
Ryu, W. H. et al., "High-Frequency Simultaneous Switching Output Noise (SSO) Simulation Methodology for a DDR333/400 Data Interface," pp. 1-6, Jun. 27, 2002.
Burdach, M., "Physical Memory Forensics," 53 slides, Black Hat USA (2006), Aug. 1, 2006.
Buchali, S. et al., "Fast eye monitor for 10 Gbit/s and its application for optical PMD compensation", Conf. Opt. Fiber Commun. (OFC) 2001, vol. 2, Mar. 2001.
Hollis, T. M., "Inter-symbol Interference in Manchester Encoded Data," pp. 1-7, Oct. 2006.
Encoding—116 slides, University of Illinois, Urbana Champaign, Course CS 438, Mar. 2008.
Hollis, T., "Mitigating ISI through Self-Calibrating Continuous-Time Equalization," 36 slides, Oct. 2006.
Stojanovic, V. et al., "Modeling and Analysis of High-Speed Links," pp. 1-49, Mar. 2003.
"Understanding the Linux Virtual Memory Manager," Chapter 3: Page Table Management, pp. 33-52, Mel Gorman, Apr. 2004.
Karthick, A. R., "Memory Management and RMAP VM of 2.6," 14 slides, Jan. 2004.
Suchitha V, "Simulation methodology using SigXp 15.1 (SPB) for enabling DDR2-533 memory interface based on Intel® 945GMS design," Session No. 6.10, Intel, pp. 1-36, Sep. 2006.
Witt, K. et al., "Test & Simulation Results in Support of SAS-2," Vitesse, 17 slides, Jan. 2006.
CIS 501: Introduction to Computer Architecture, Unit 4: Memory Hierarchy II: Main Memory, CIS 501 (Martin/Roth): Main Memory, pp. 1-12, Sep. 2005.
Hong, Seongcheol, "NAND Flash-based Disk Cache Using SLC/MLC Combined Flash Memory," SNAPI 2010, 25pgs.

* cited by examiner

Paired Display

1. FIRST FIVE MINUTES OF MOVIE READ FROM SAU 1

2. REST OF MOVIE READ FROM D1

3. REST OF MOVIE MOVED TO SAU1

4. MOVIE READ FROM SAU 1

① DATA TRANSFER FROM D1 TO D2 ON TRIGGER

② DATA MADE AVAILABLE LOCALLY TO USER

|    | C1 | C2 | PL1 |
|----|----|----|-----|
| R1 | b0 | b1 | p0  |
|    | R2 | b2 | b3  |
|    |    |    | p1  |
| PL2| p2 | p3 |     |

|     | C1 | C2 | PL1 |
|-----|----|----|-----|
| R1  | 1  | 0  | 1   |
| R2  | 1  | 1  | 0   |
| PL2 | 0  | 1  |     |

BLOCK 1 AT t1

① READ AND FIND ERROR IN b3

|     | C1 | C2 | PL1 |
|-----|----|----|-----|
| R1  | 1  | 0  | 1   |
| R2  | 1  | 0* | 0   |
| PL2 | 0  | 1  |     |

BLOCK 1 AT t2

② CORRECT ERROR IN b3

|     | C1 | C2 | PL1 |
|-----|----|----|-----|
| R1  | 1  | 0  | 1   |
| R2  | 1  | 1  | 0   |
| PL2 | 0  | 1  |     |

BLOCK 1 AT t3

| P10 | b0 - b3 |
| P11 | b2 - b5 |
| P12 | b4 - b7 |
| P13 | b0, b1, b6, b7 |

① KEEP LIST OF BLOCK(S)

② SAU 1 CLEARED

③ SAU 1 RE-LOADS FROM BL1

USER INTERFACE SYSTEM, METHOD, AND COMPUTER PROGRAM PRODUCT

CROSS-REFERENCE TO RELATED APPLICATIONS

This application claims the benefit of U.S. Provisional Application No. 61/515,835, filed Aug. 5, 2011, U.S. Provisional Application No. 61/566,577, filed Dec. 2, 2011, U.S. Provisional Application No. 61/569,213, filed Dec. 9, 2011, and U.S. Provisional Application No. 61/581,918, filed Dec. 30, 2011, the entire contents of which are incorporated herein by reference.

If any definitions (e.g., figure reference signs, specialized terms, examples, data, information, etc.) from any related material (e.g., parent application, other related application, material incorporated by reference, material cited, extrinsic reference, etc.) conflict with this application (e.g., abstract, description, summary, claims, etc.) for any purpose (e.g., prosecution, claim support, claim interpretation, claim construction, etc.), then the definitions in this application shall apply.

BACKGROUND AND FIELD OF INVENTION

Embodiments of the present invention generally relate to consumer electronic devices, particularly cell phones, tablets, and other mobile devices (however, applicability is also relevant to non-mobile devices).

Embodiments of the present invention generally relate to improvements to storage systems, including but not limited to the use of memory devices including NAND flash.

Embodiments of the present invention generally relate to consumer electronic devices particularly cell phones and their use with cloud-based services.

BRIEF SUMMARY

A system, method, and computer program product are provided for a touch or pressure signal-based interface. In operation, a touch or pressure signal is received in association with a touch interface of a device. To this end, a user experience is altered, utilizing the signal. In different embodiments, various features may be further incorporated in association with the system, method, and computer program product, for improvement purposes.

A system, method, and computer program product are provided for modifying one or more objects in one or more memory devices. In one embodiment, an apparatus is provided, comprising one or more memory devices including a non-volatile memory. Additionally, the apparatus comprises circuitry including a first communication path for communicating with the at least one processor, and a second communication path for communicating with at least one storage sub-system which operates slower than the one or more memory devices. Further, the circuitry is operable to modify one or more objects in the one or more memory devices.

A system, method, and computer program product are provided for modifying content. In operation, a content request for content is received from a device, the content request including information associated with at least one aspect associated with the device. Additionally, the content is modified based on the information. Further, the content is sent to the device.

Embodiments of the present invention generally relate to devices such as cell phones, other mobile devices, and other consumer devices.

In different embodiments, various features may be further incorporated in association with the system, method, and computer program product, for improvement purposes.

BRIEF DESCRIPTION OF THE SEVERAL VIEWS OF THE DRAWINGS

So that the features of various embodiments of the present invention can be understood, a more detailed description, briefly summarized above, may be had by reference to various embodiments, some of which are illustrated in the accompanying drawings. It is to be noted, however, that the accompanying drawings illustrate only embodiments and are therefore not to be considered limiting of the scope of various embodiments of the invention, for the invention may admit to other effective embodiments. The following detailed description makes reference to the accompanying drawings that are now briefly described.

Embodiments of the present invention generally relate to storage systems, including but not limited to memory devices such as NAND flash. NAND flash offers storage access times intermediate between the access times of DRAM and access times of a mechanical disk. Therefore, integration of memory devices such as NAND flash into the hierarchy of a storage system offers faster performance for data storage and retrieval. In this description, storage system devices (e.g., systems, subsystems, components, assemblies, units, blocks, modules, etc.) that include memory devices used to improve storage system performance will be referred to as storage accelerator units. Additional potential advantages of NAND flash include reduced size, reduced power, easier integration, and other factor(s) that depend on the type of system etc.

In some embodiments, storage systems may include layers of storage devices(s). Each layer of storage device(s) may represent a logical layer of storage arranged in a hierarchical structure. Thus, for example, some storage layers may offer faster access while some storage layers offer greater storage capacity or higher reliability, etc. In some embodiments, more than one hierarchical storage layer of storage devices(s) may be introduced in the architecture of such a hierarchical storage system, including different types of memory device technology to take advantages of differences in technology (e.g., in bandwidth, access speed, reliability, durability, cost, etc.). In some embodiments, more than one storage accelerator unit may be introduced within a hierarchical storage layer.

In various embodiments, various features may be further incorporated in association with the system, method, and computer program product, for improvement purposes.

So that the features of various embodiments of the present invention can be understood, a more detailed description, briefly summarized above, may be had by reference to various embodiments, some of which are illustrated in the accompanying drawings. It is to be noted, however, that the accompanying drawings illustrate only embodiments and are therefore not to be considered limiting of the scope of the invention, for the invention may admit to other effective embodiments. The following detailed description makes reference to the accompanying drawings that are now briefly described.

Figure 1:
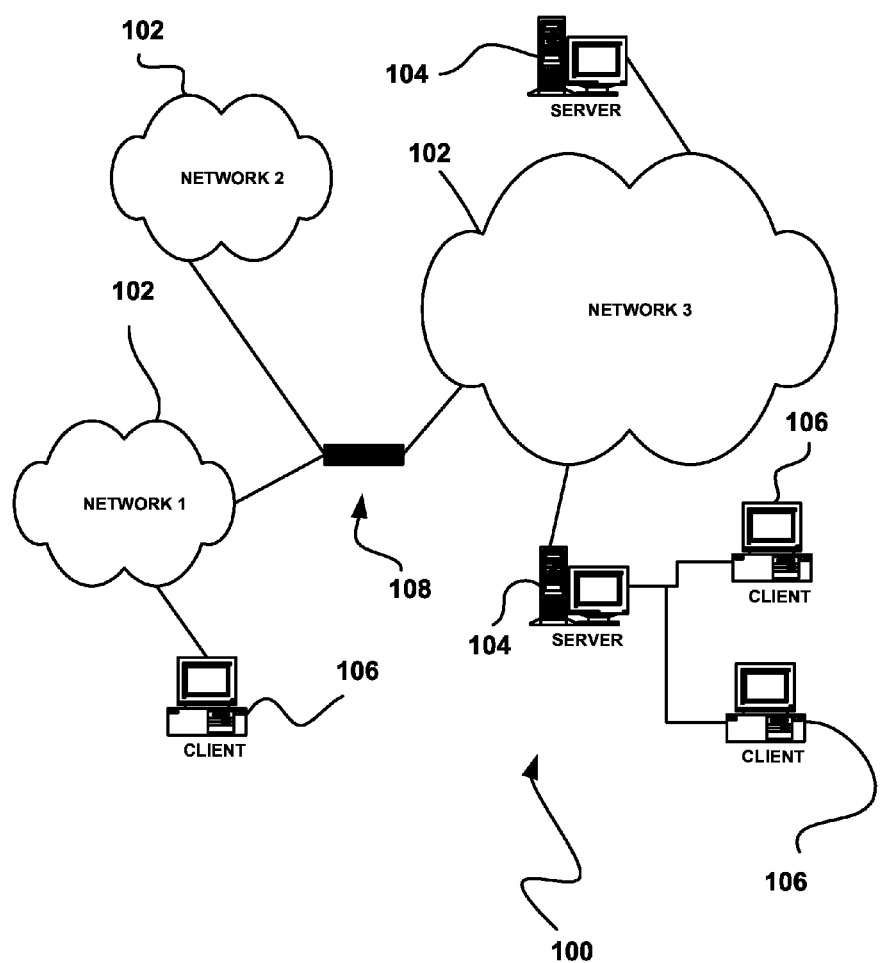

FIG. 1 illustrates a network architecture, in accordance with one embodiment.

Figure 2:
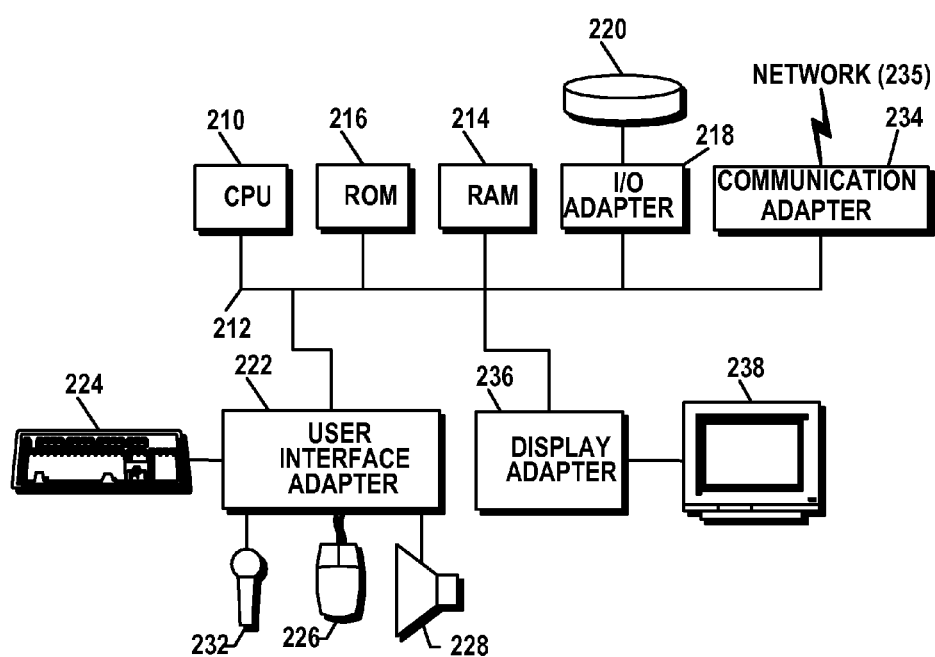

FIG. 2 shows a representative hardware environment that may be associated with the servers and/or clients of FIG. 1, in accordance with one embodiment.

Figure 3:
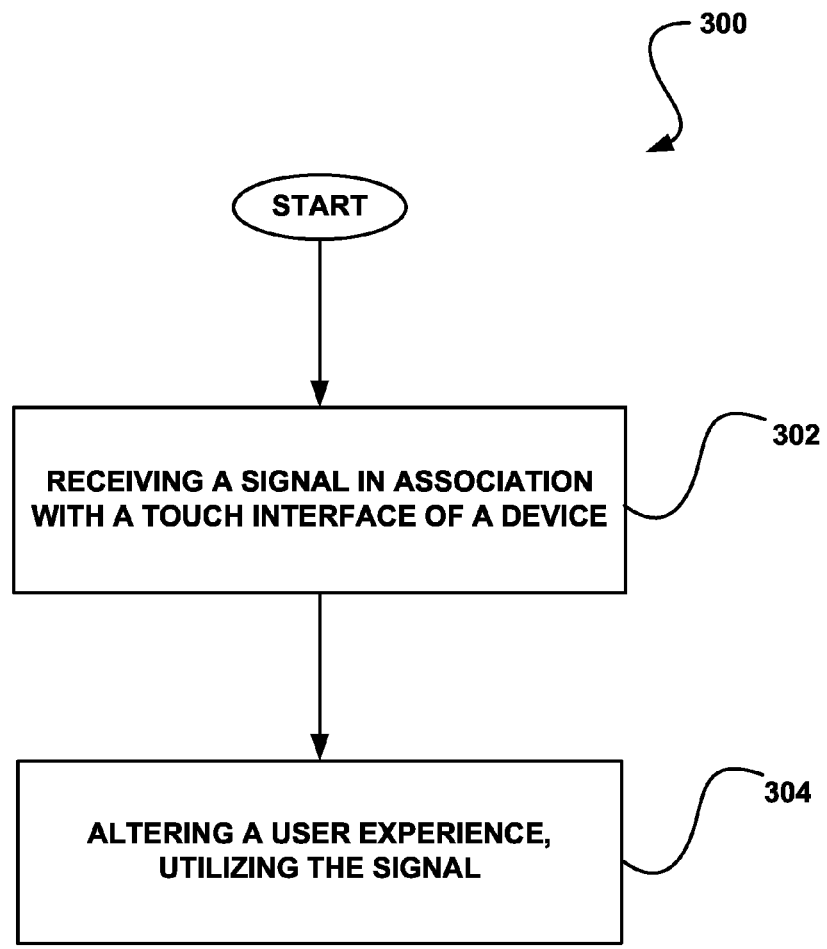

FIG. 3 shows a method for altering a user experience based on a received signal, in accordance with one embodiment.

Figure 4:
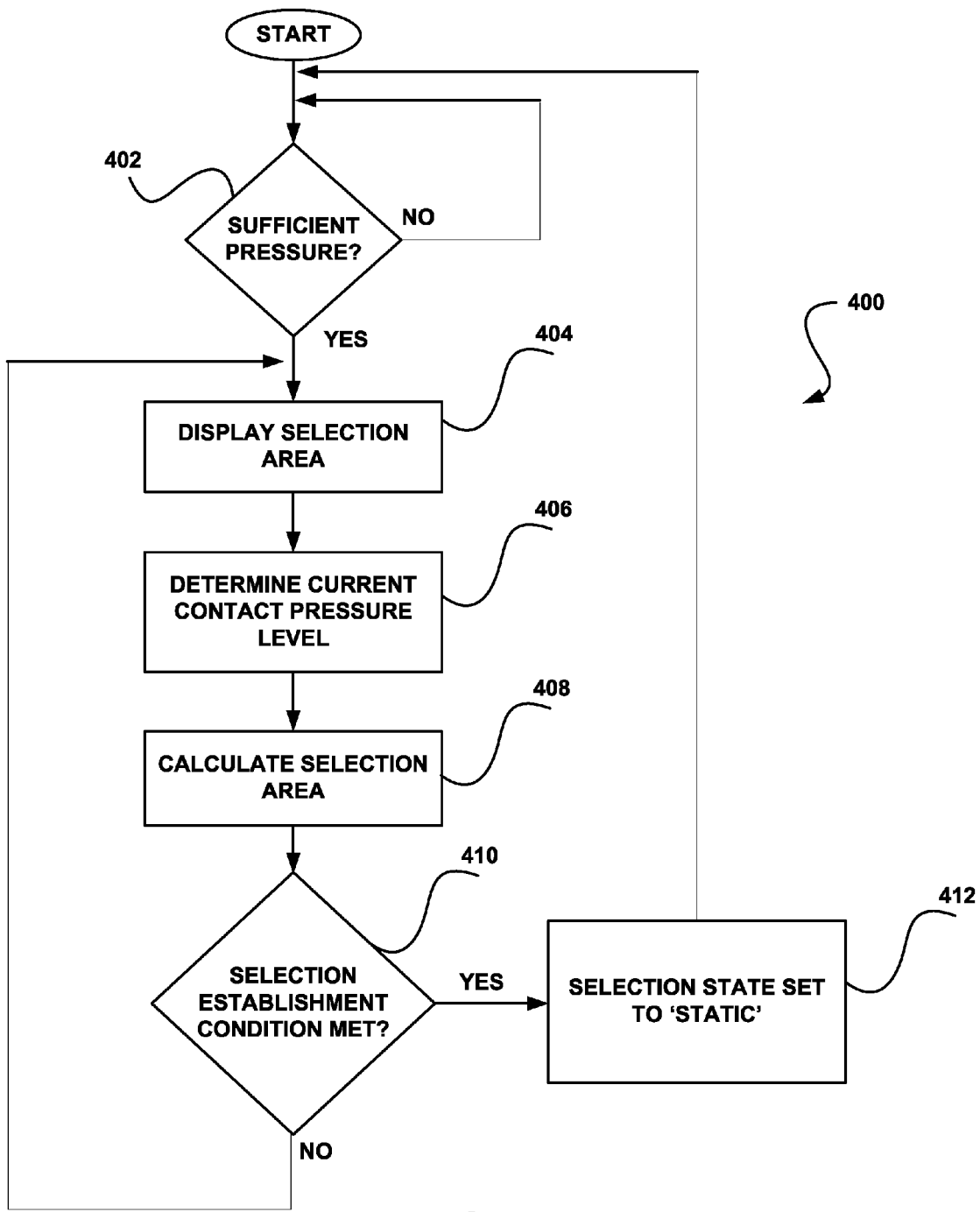

FIG. 4 shows a method for defining a selection made within a user interface based in part on contact pressure, in accordance with one embodiment.

Figure 5:
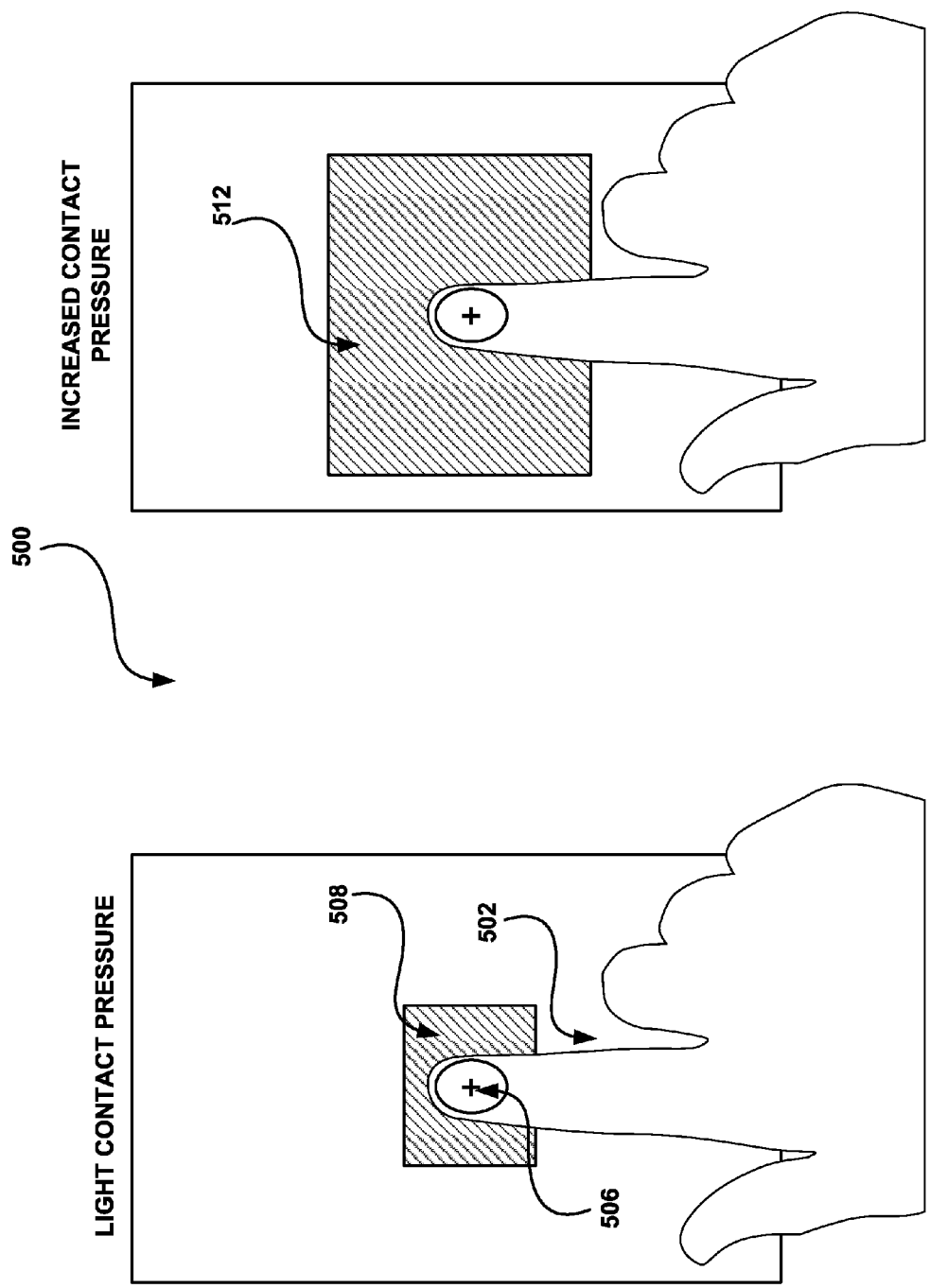

FIG. 5 shows a pressure-sensitive user interface for making a selection, in accordance with one embodiment.

Figure 6:
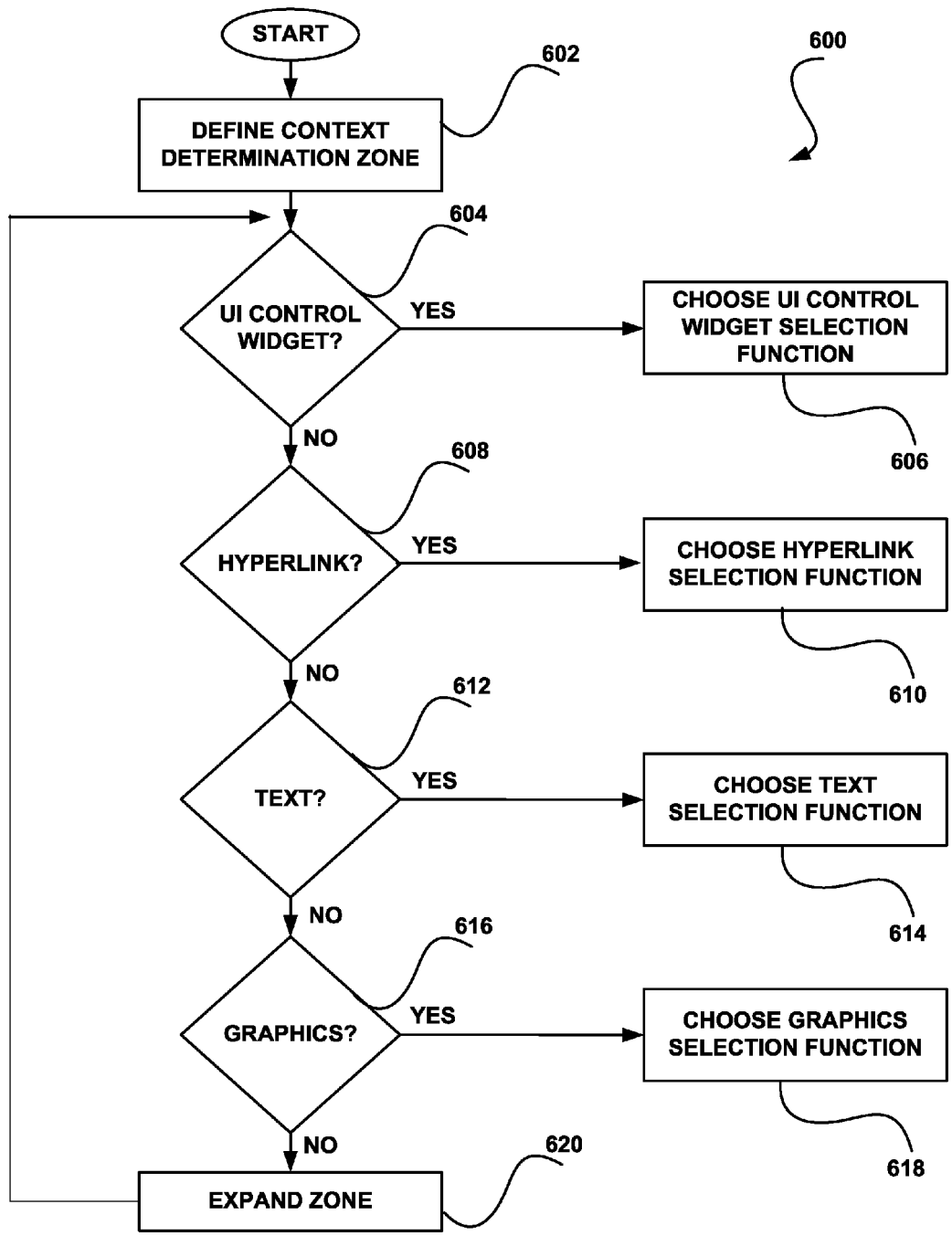

FIG. 6 shows a method for determining the context of a contact pressure-based selection and choosing an appropriate selection function, in accordance with one embodiment.

Figure 7:
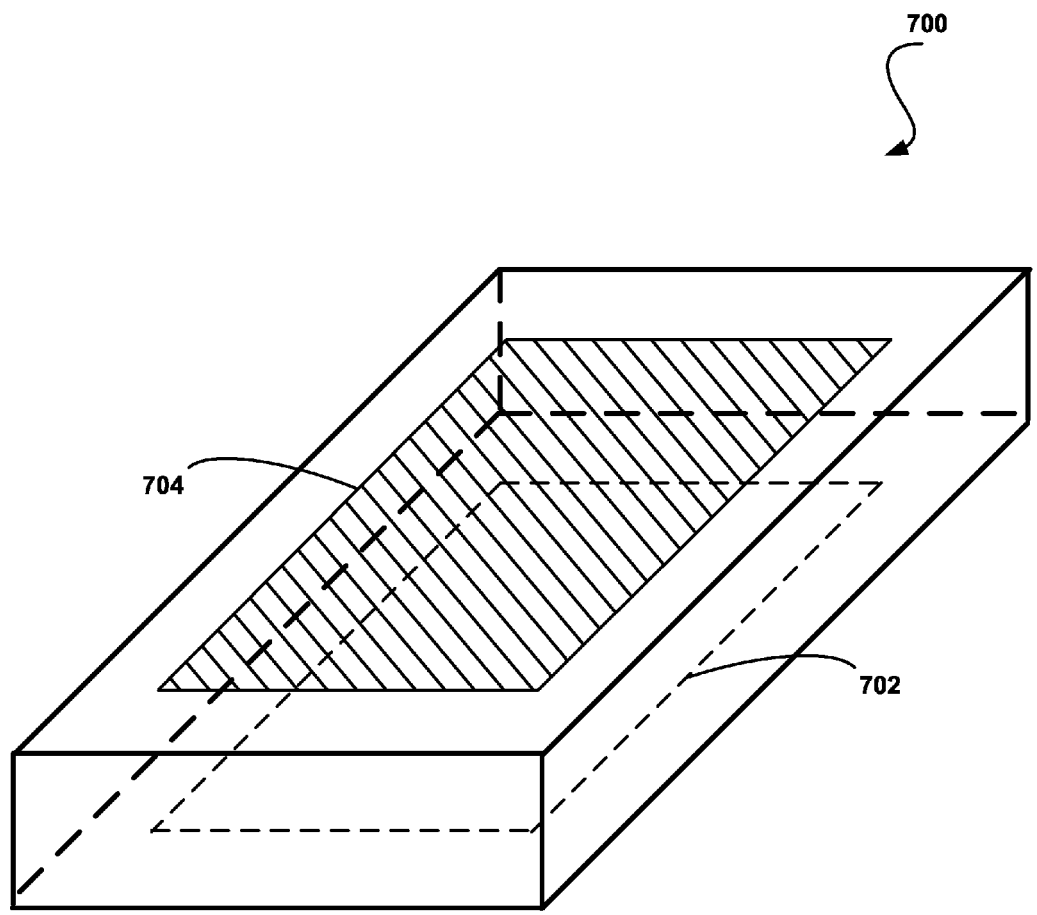

FIG. 7 shows a device having a backtouch interface, in accordance with one embodiment.

Figure 8:
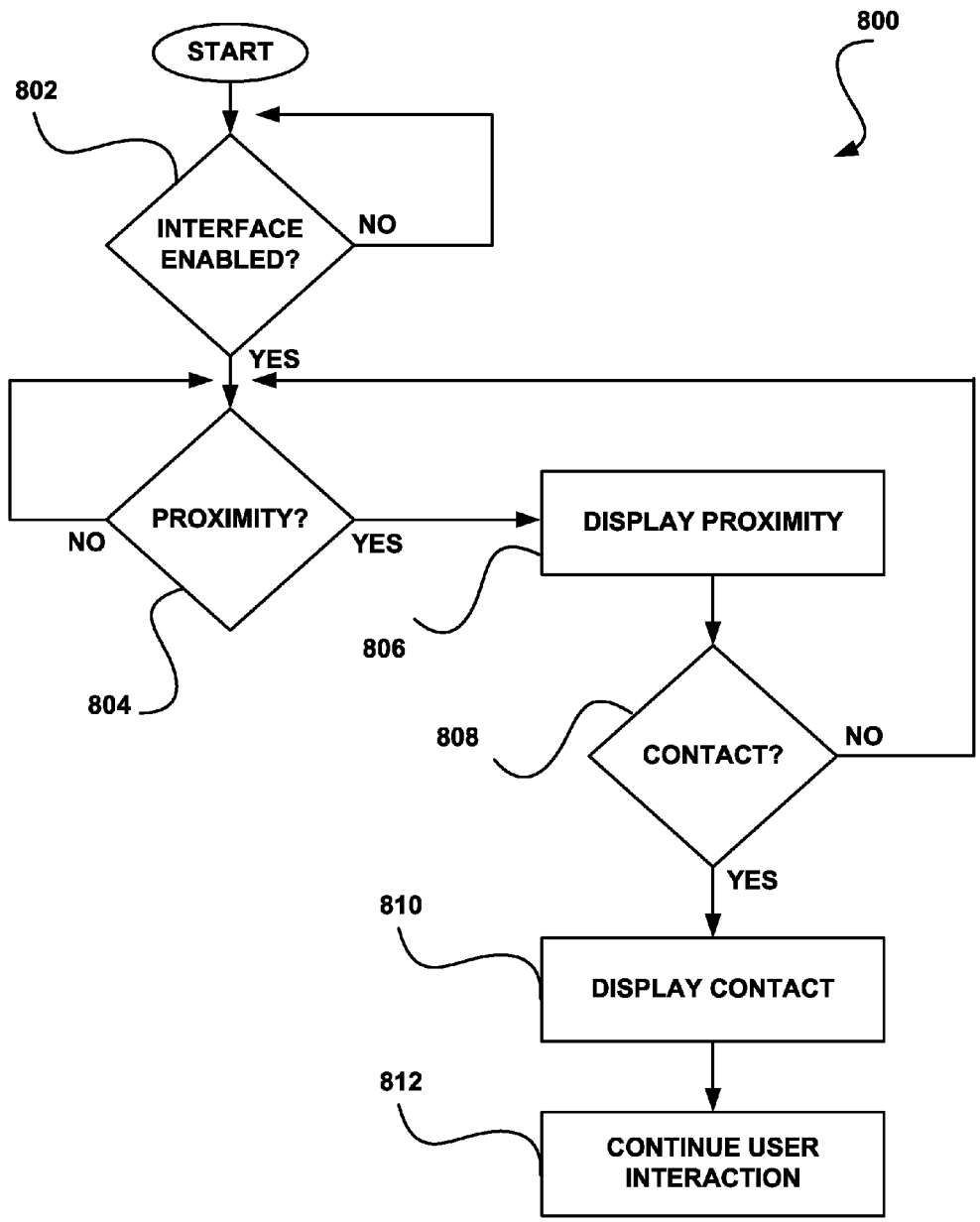

FIG. 8 shows a method for providing feedback to the user of a backtouch interface, in accordance with one embodiment.

Figure 9:
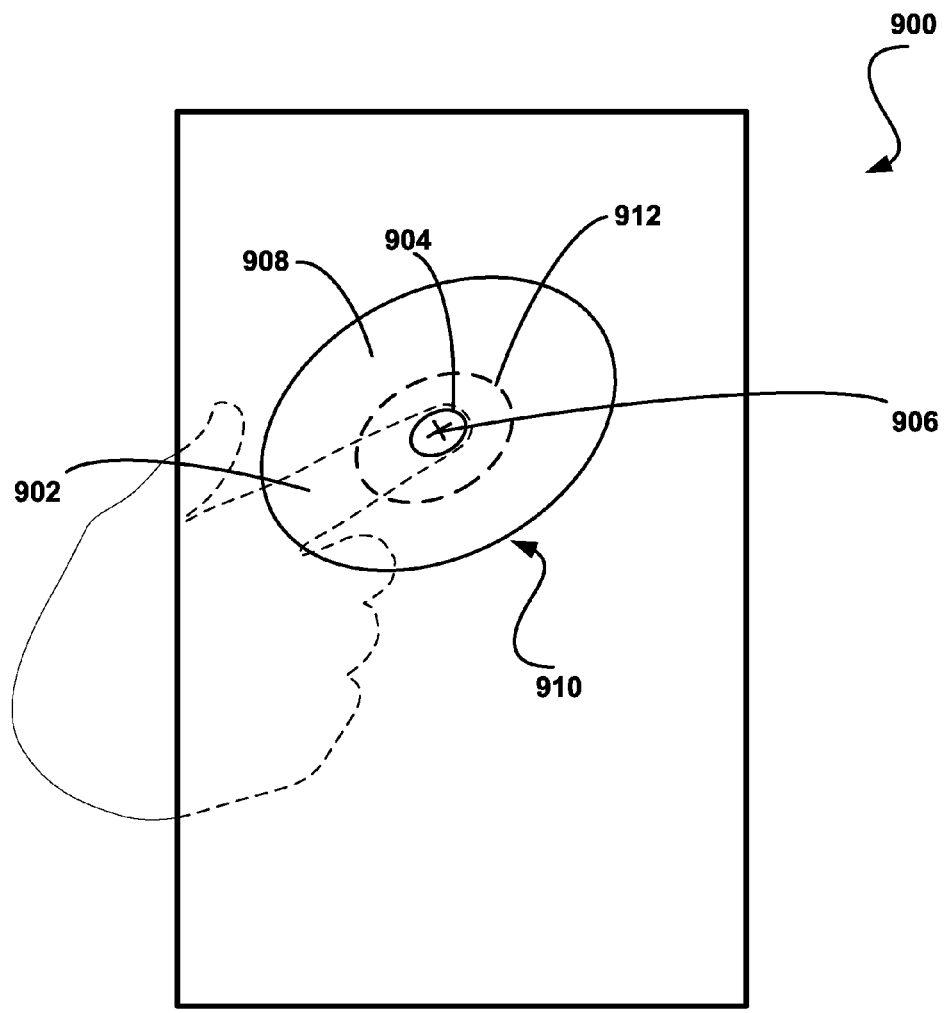

FIG. 9 shows a pressure-sensitive user interface for making a selection using a backtouch interface, in accordance with one embodiment.

Figure 10:
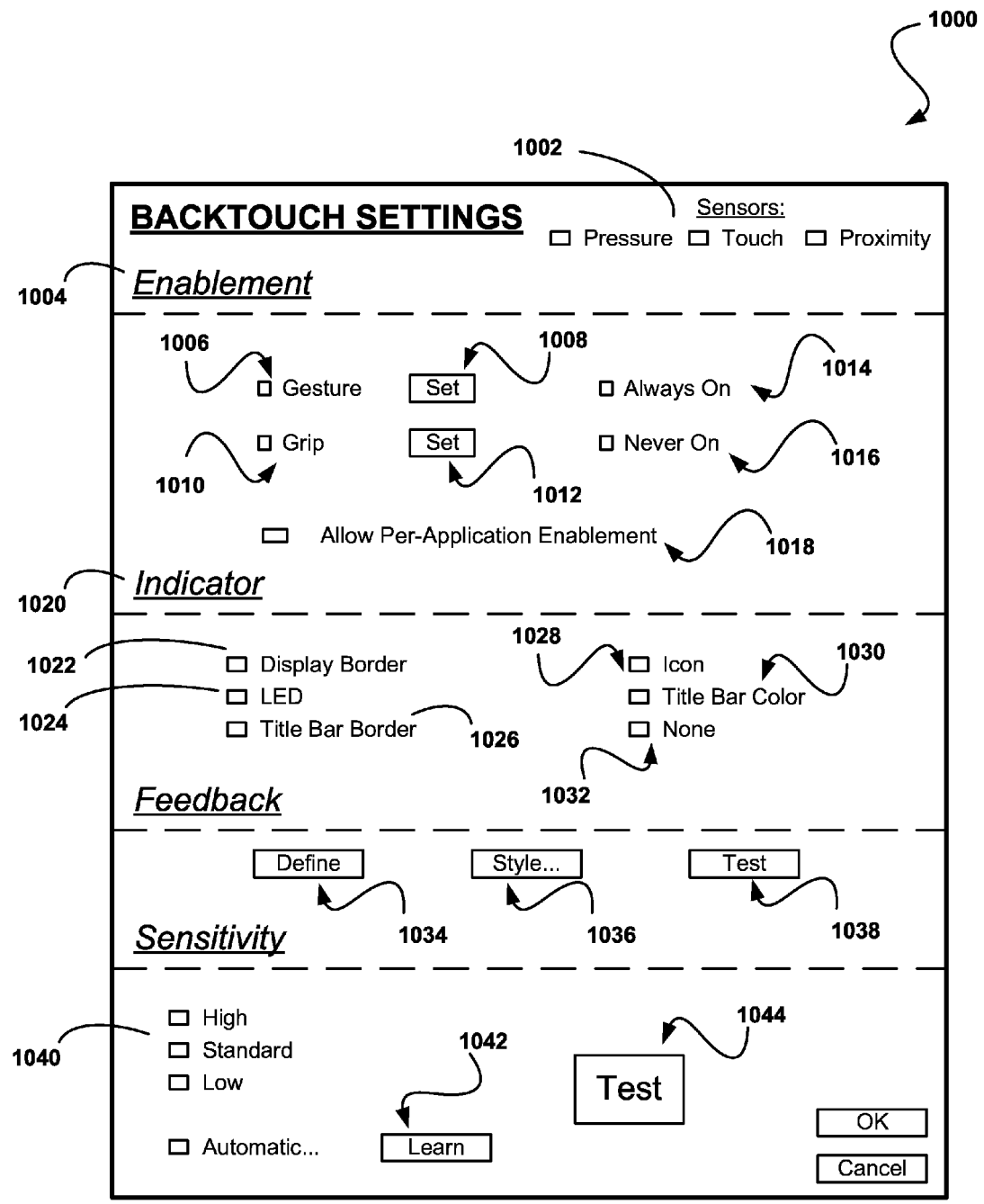

FIG. 10 shows a user interface for defining settings associated with a backtouch interface, in accordance with one embodiment.

Figure 11:
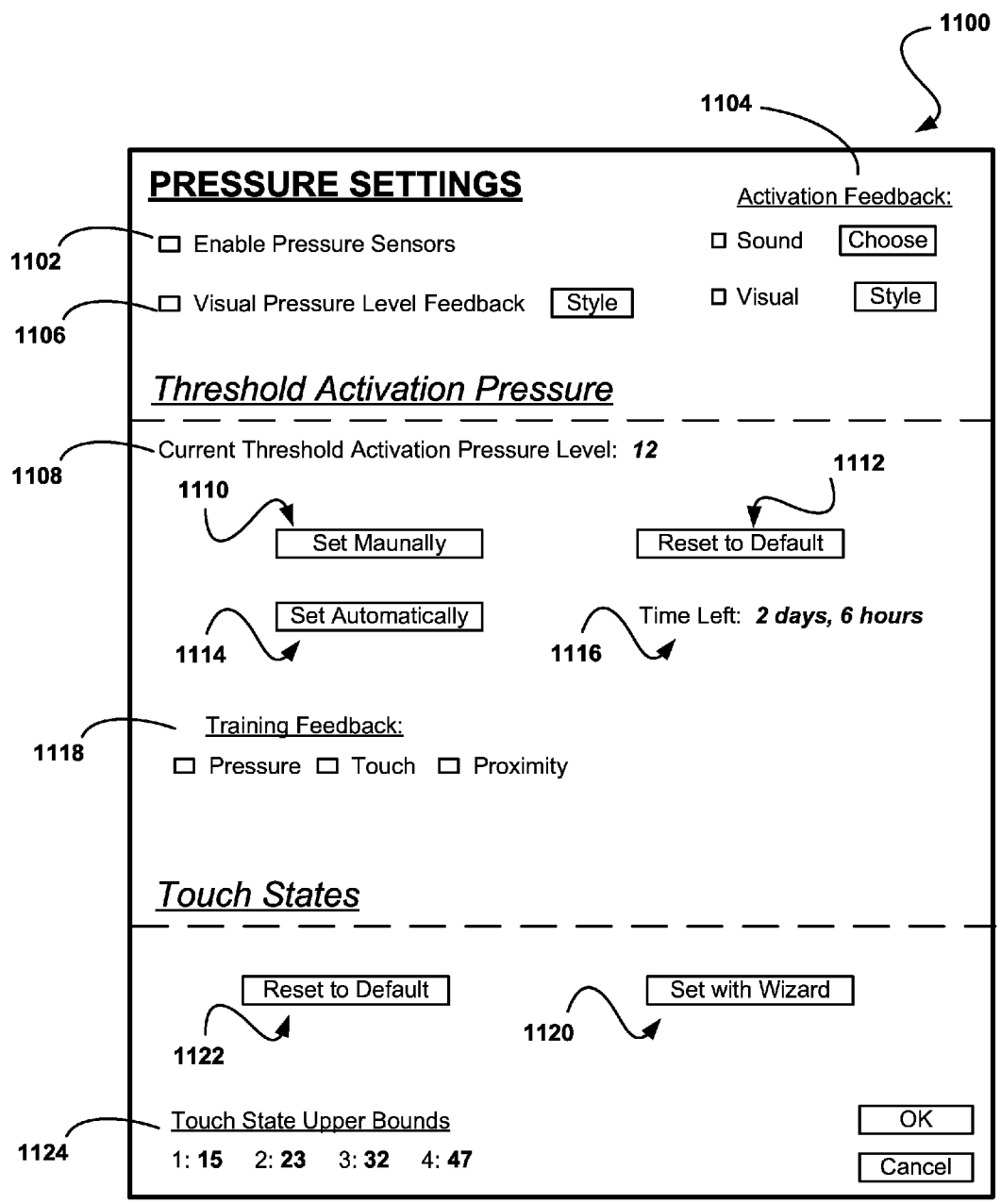

FIG. 11 shows a user interface for defining settings associated with a pressure-sensitive interface, in accordance with one embodiment.

Figure 12:
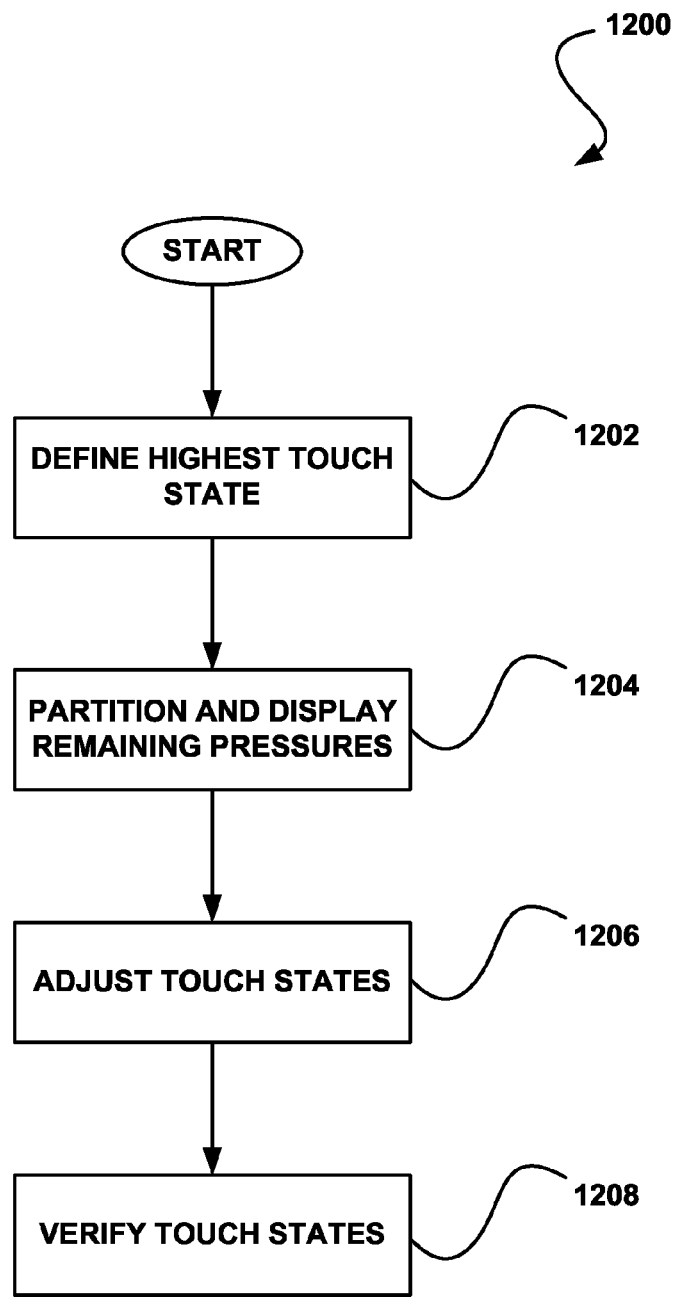

FIG. 12 shows a method for assisting a user in defining touch states, in accordance with one embodiment.

Figure 13:
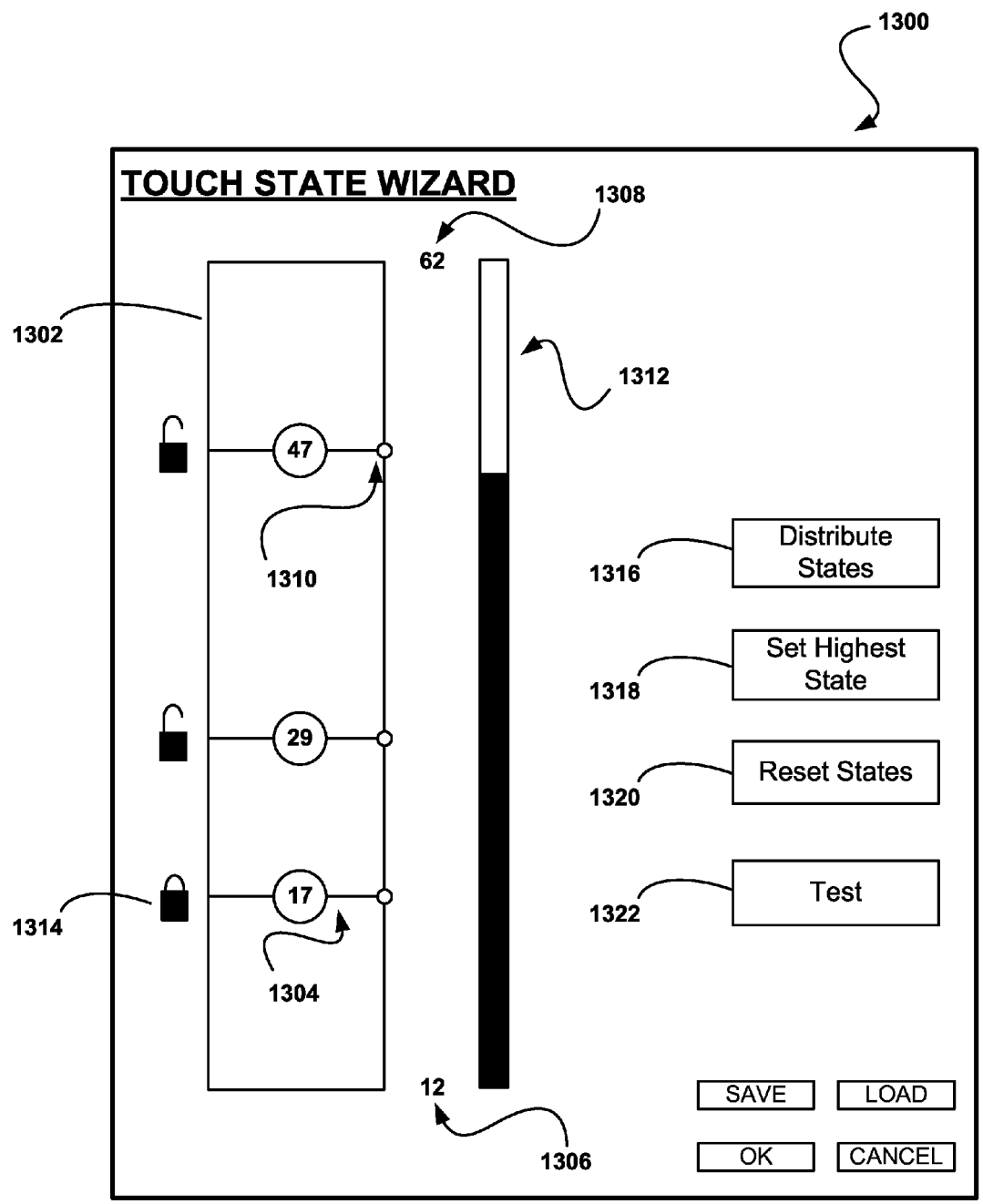

FIG. 13 shows a user interface for assisting a user in defining touch states, in accordance with one embodiment.

Figure 14:
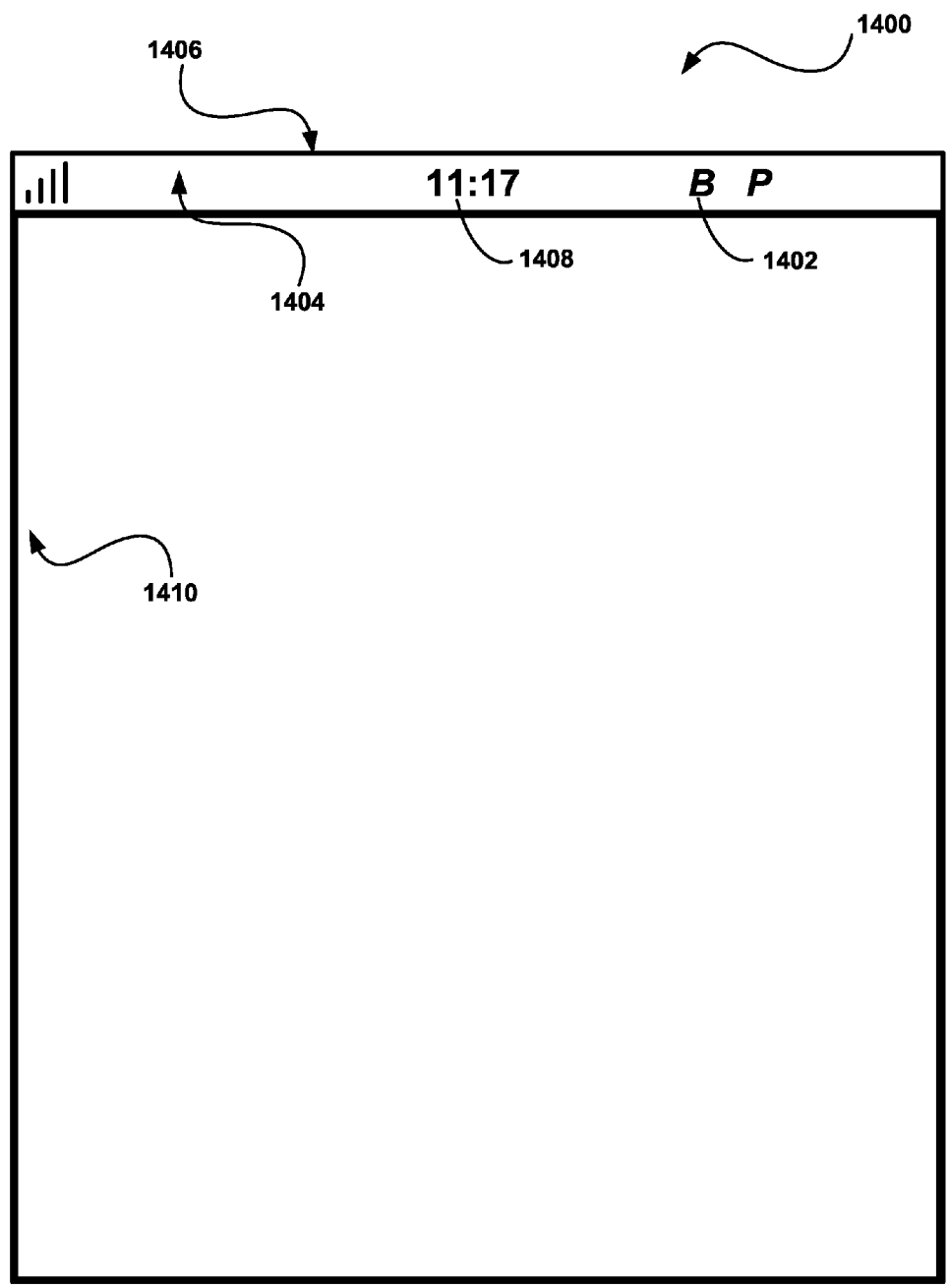

FIG. 14 shows a user interface for indicating that a backtouch or pressure-sensitive interface is activated, in accordance with one embodiment.

Figure 15:
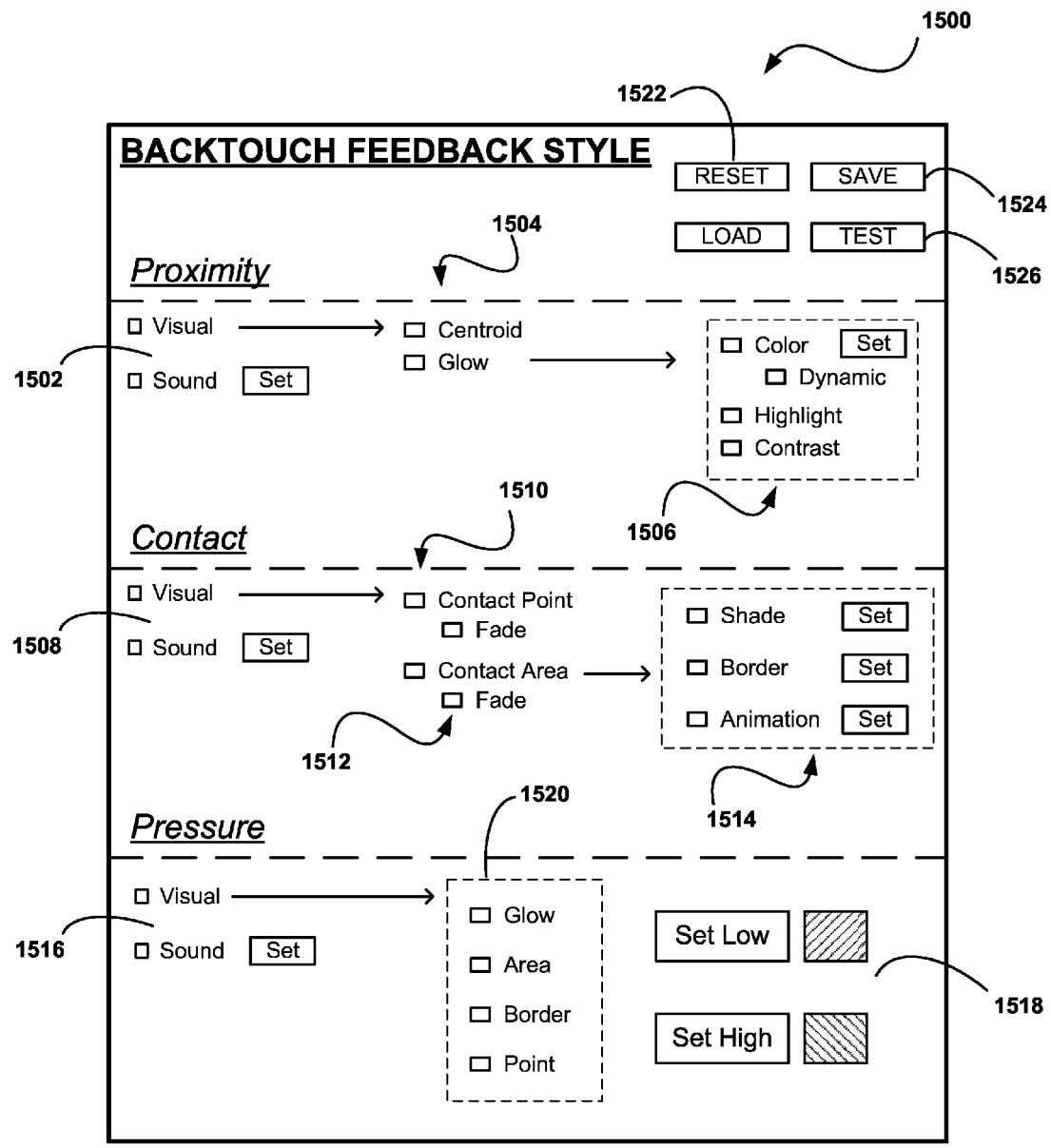

FIG. 15 shows a user interface for defining a backtouch feedback style, in accordance with one embodiment.

Figure 16:
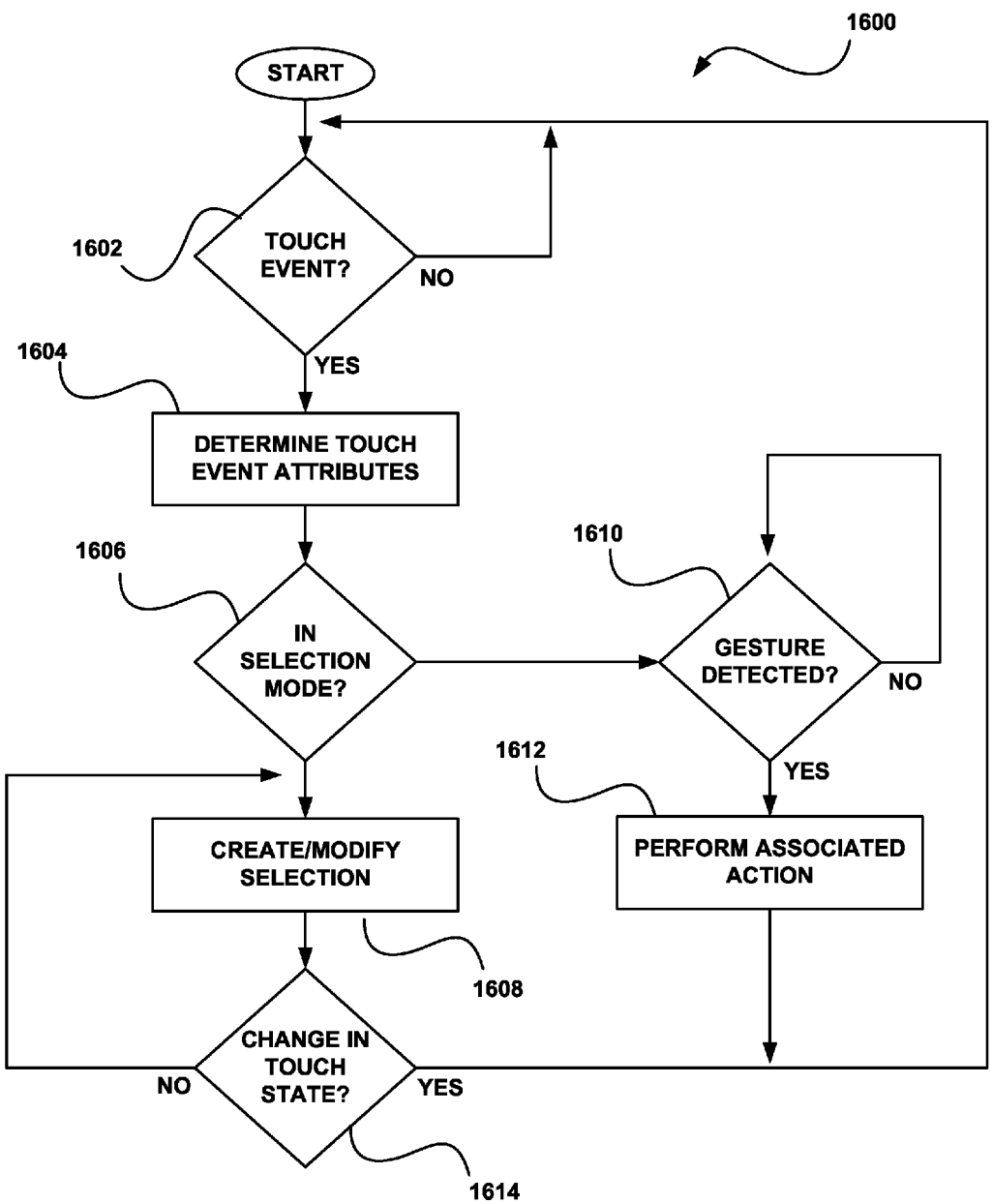

FIG. 16 shows an alternative method for defining a selection made within a user interface based in part on contact pressure, in accordance with one embodiment.

Figure 17:
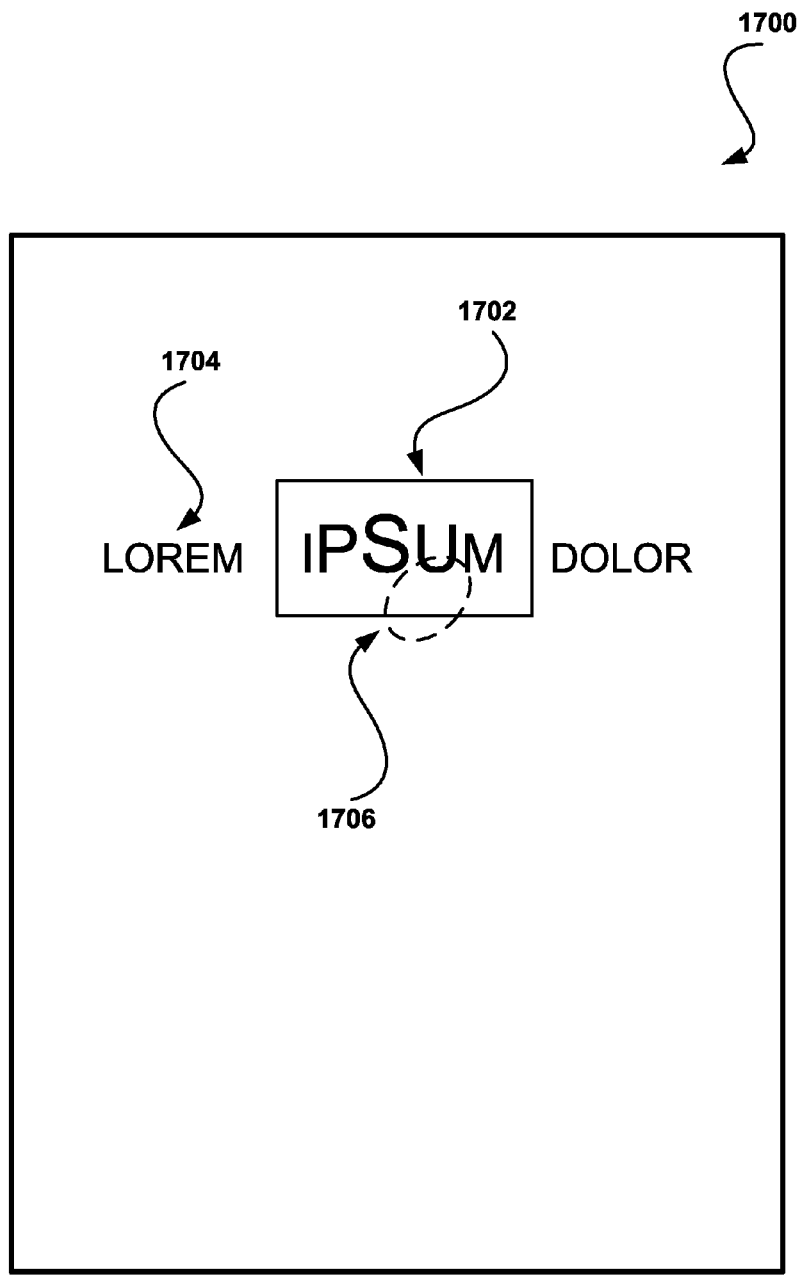

FIG. 17 shows a user interface for performing operations on a selection, in accordance with one embodiment.

Figure 18:
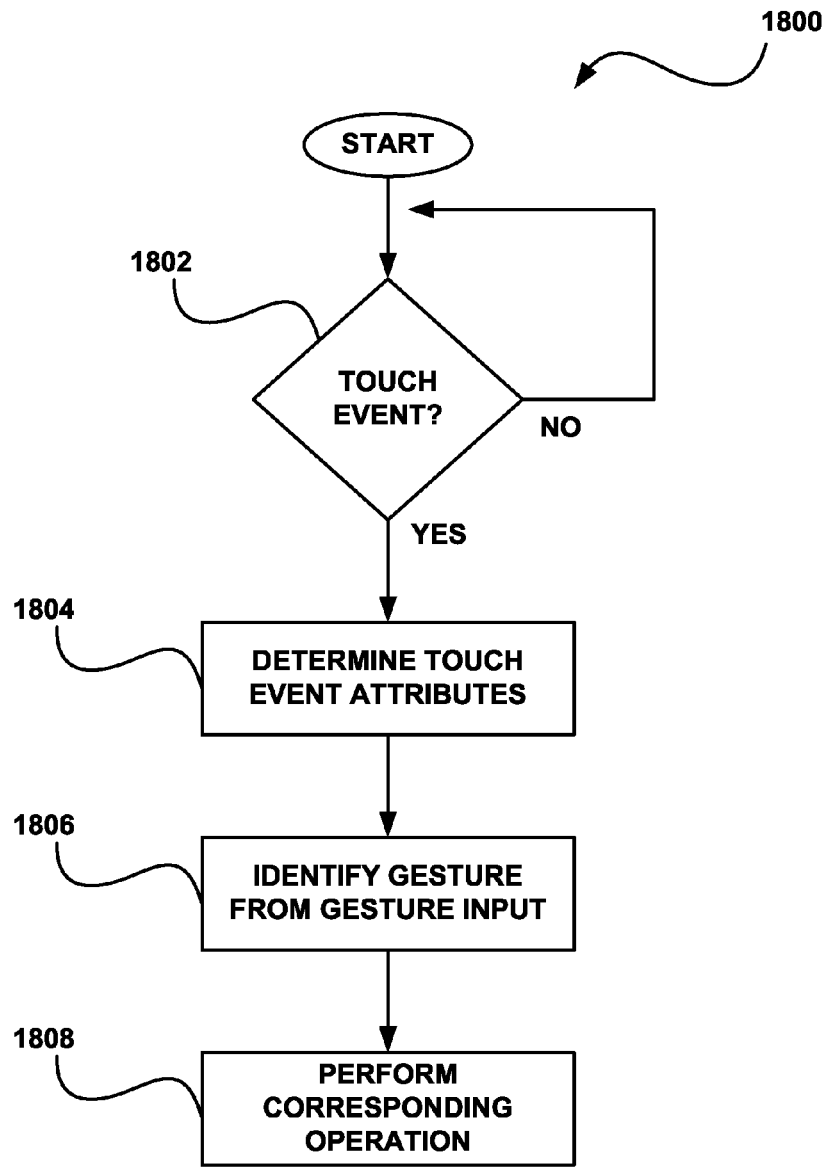

FIG. 18 shows a method for utilizing contact pressure-based gestures, in accordance with one embodiment.

Figure 19:
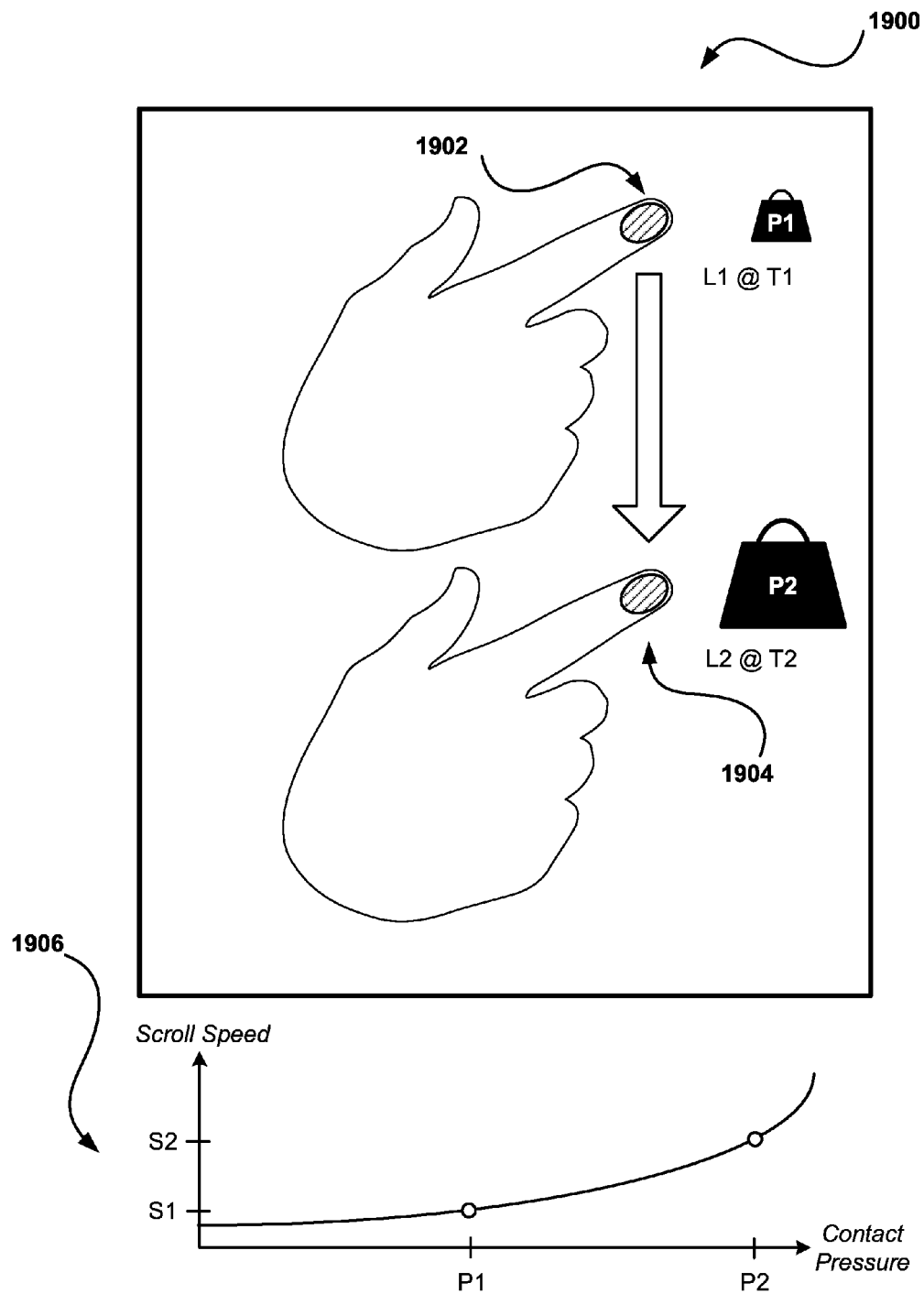

FIG. 19 shows an example of a contact pressure-based gesture for scrolling a text field, in accordance with one embodiment.

Figure 20:
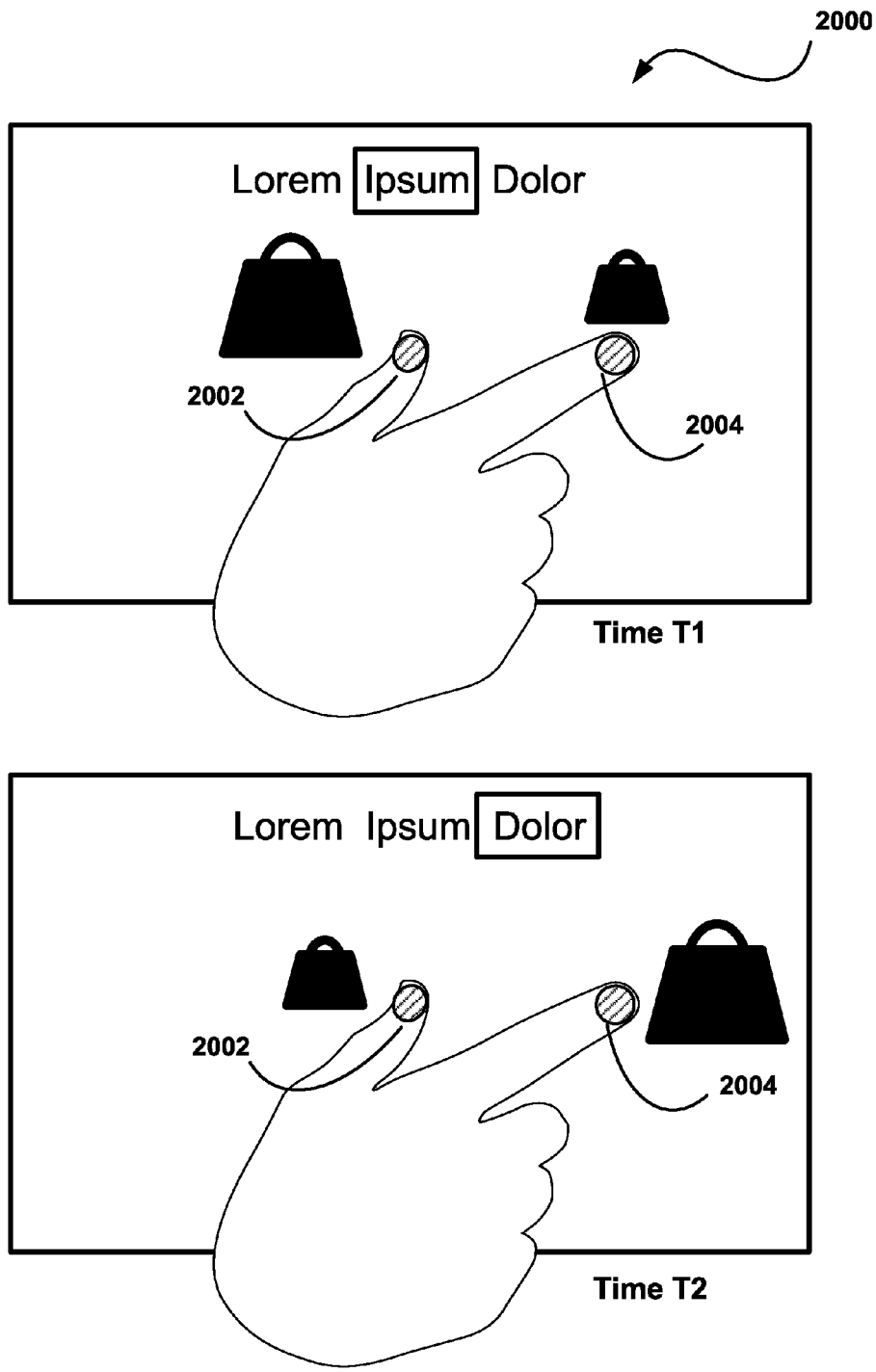

FIG. 20 shows an example of a multitouch pressure gesture for indicating a direction, in accordance with one embodiment.

Figure 21:
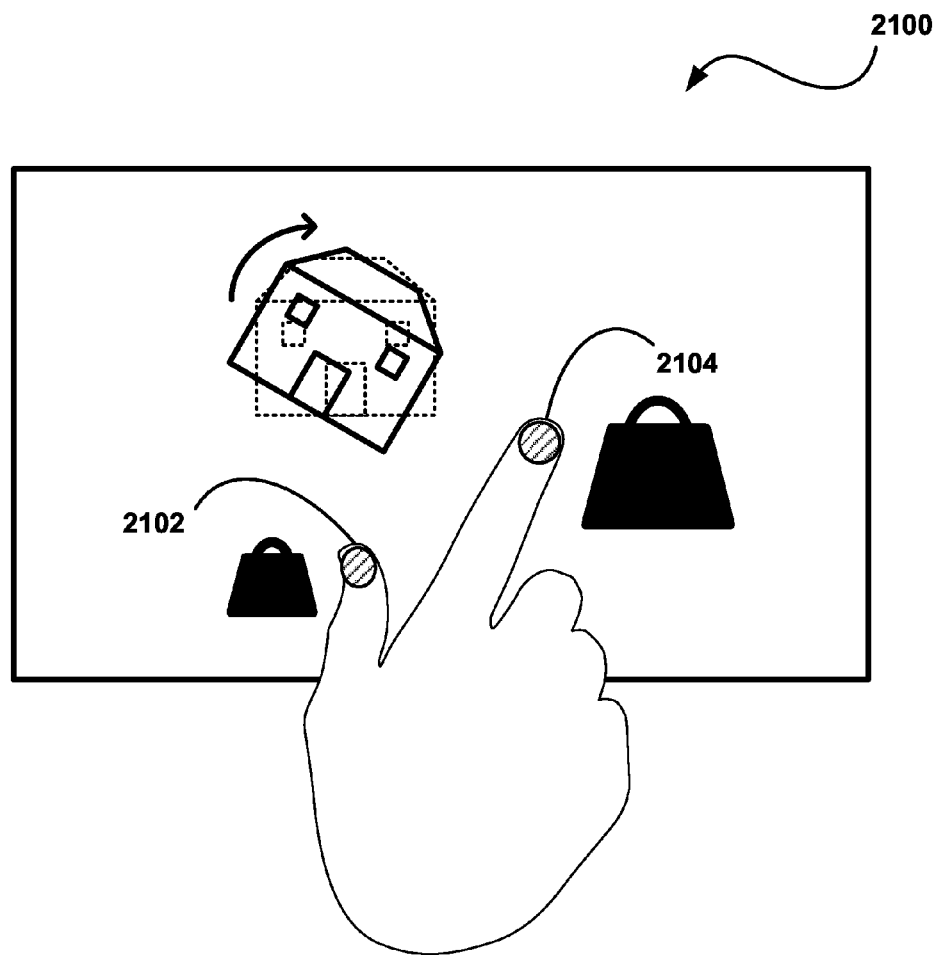

FIG. 21 shows an example of a multitouch pressure gesture for indicating a rotation, in accordance with one embodiment.

Figure 22:
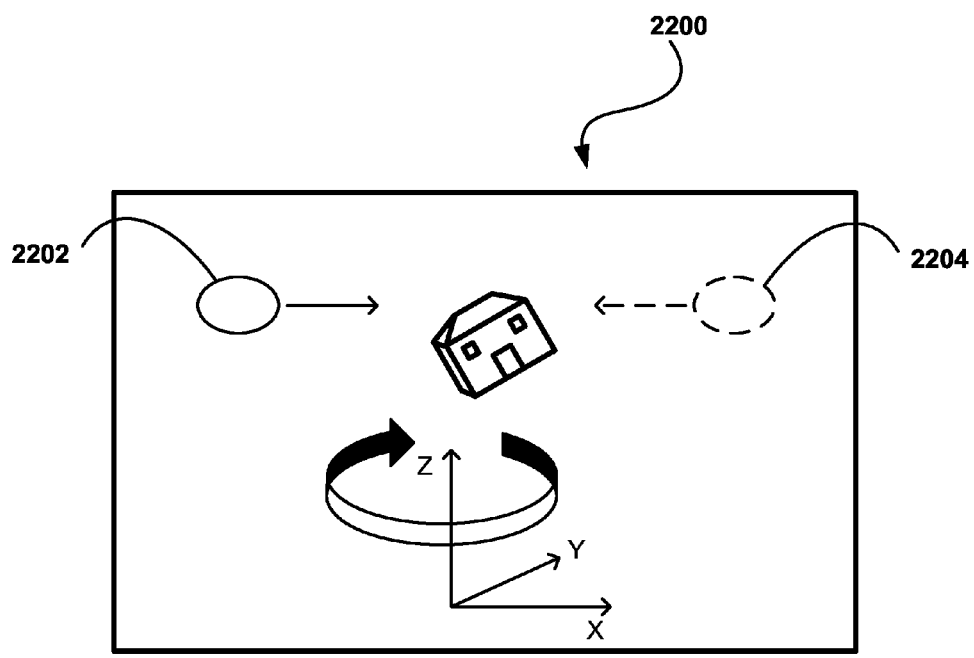

FIG. 22 shows an example of a front-back gesture, in accordance with one embodiment.

Figure 23:
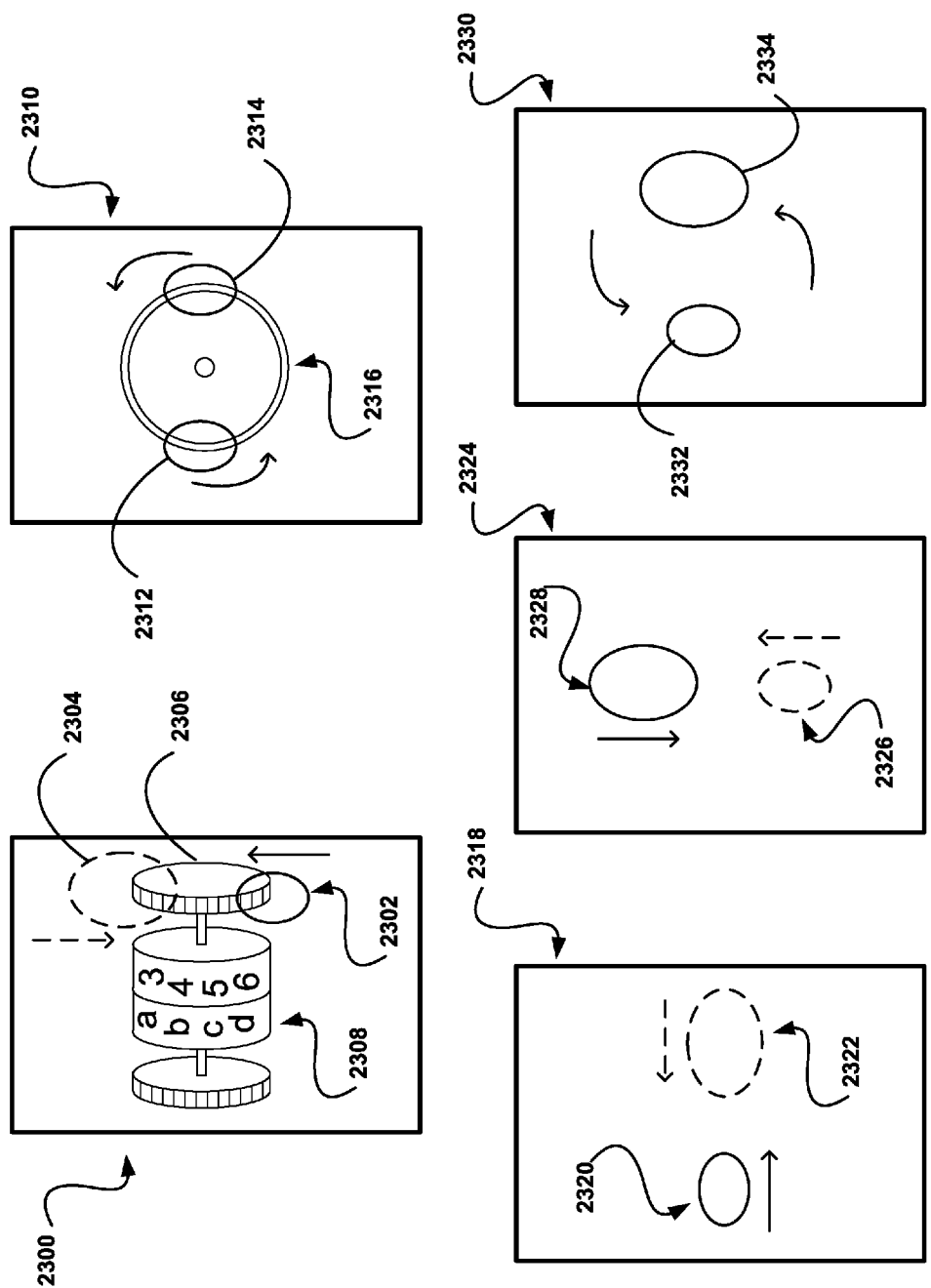

FIG. 23 shows an example of a virtual control knob gesture, in accordance with one embodiment.

Figure 24:
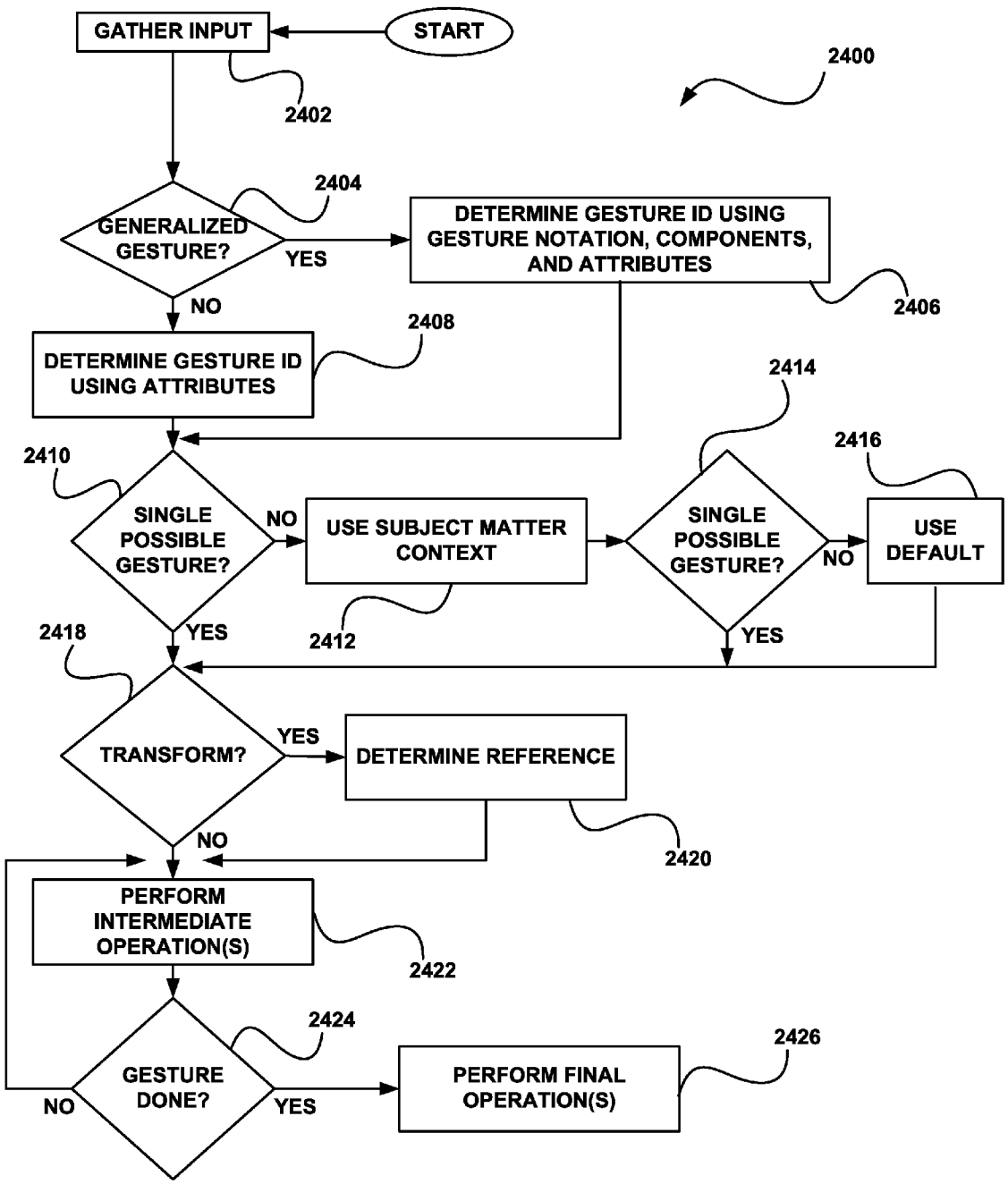

FIG. 24 shows a method for gesture differentiation, in accordance with one embodiment.

Figure 25:
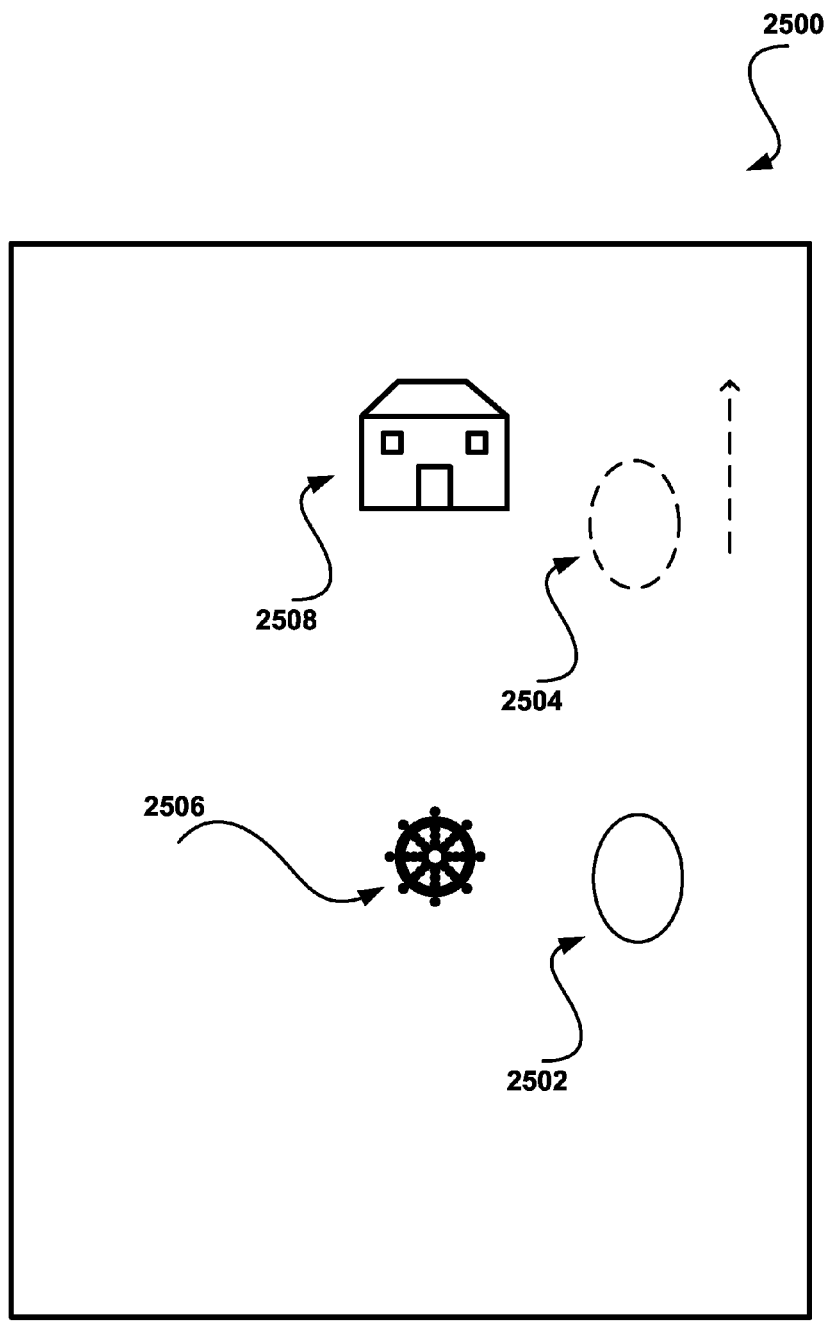

FIG. 25 shows an example of an "anchor and move" gesture, in accordance with one embodiment.

Figure 26:
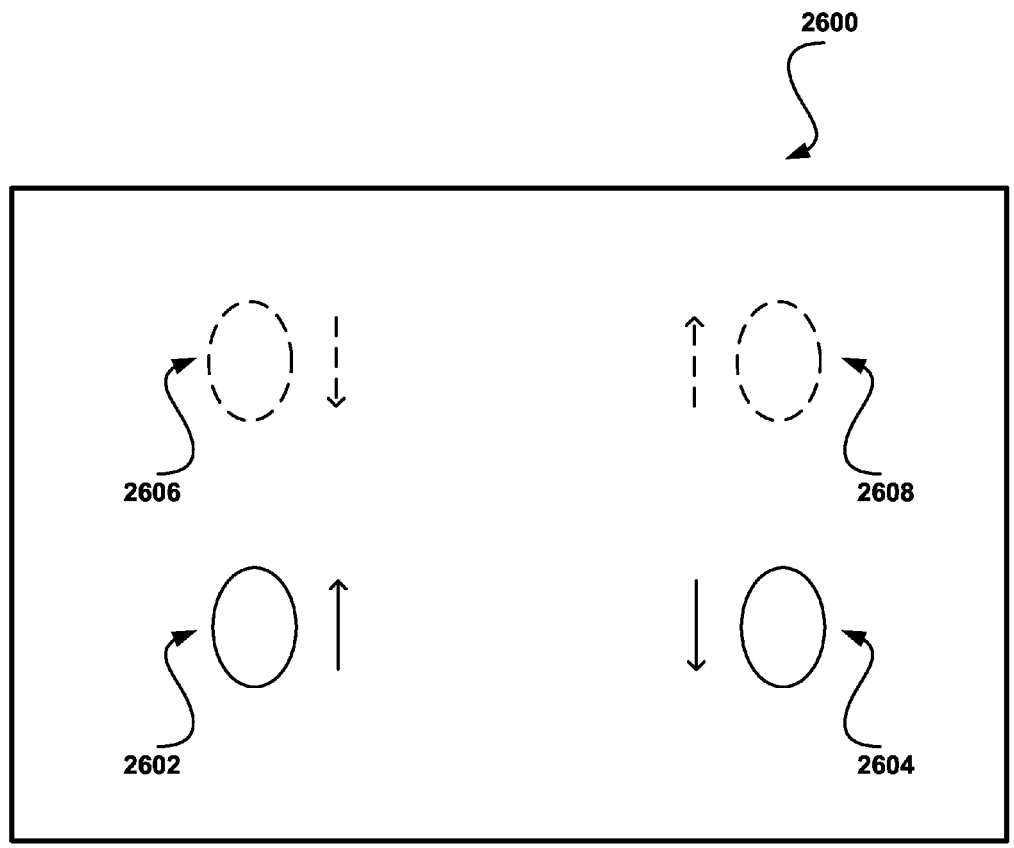

FIG. 26 shows an example of a twist gesture, in accordance with one embodiment.

Figure 27:
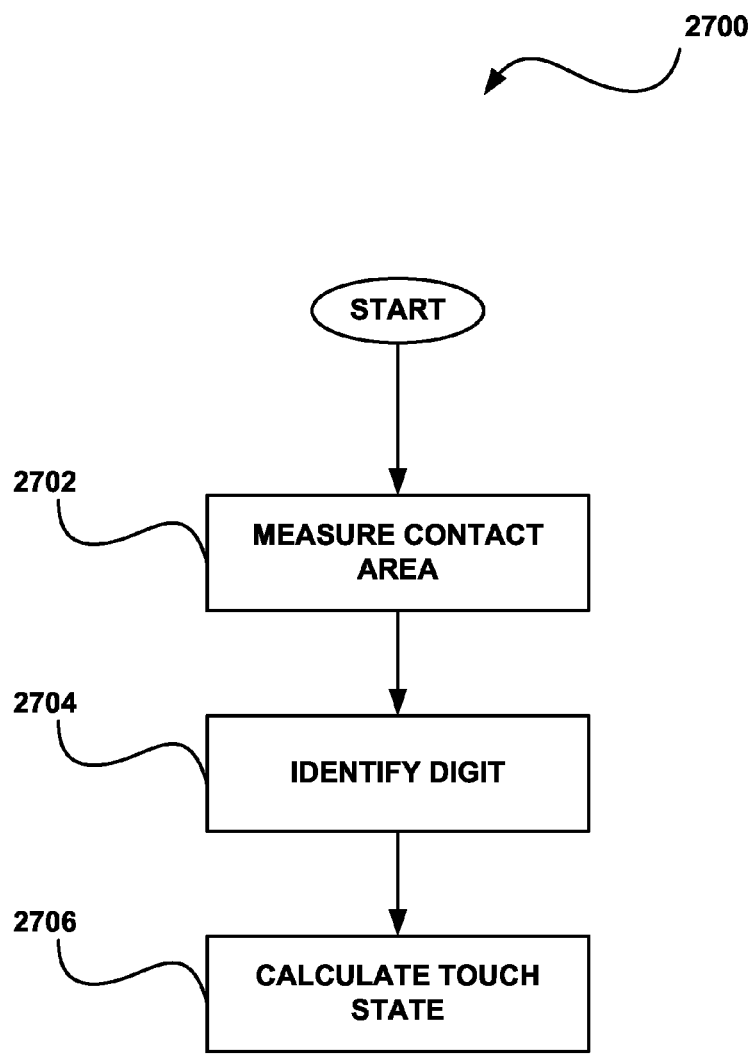

FIG. 27 shows a method for determining touch states using a touch-sensitive interface, in accordance with one embodiment.

Figure 28:
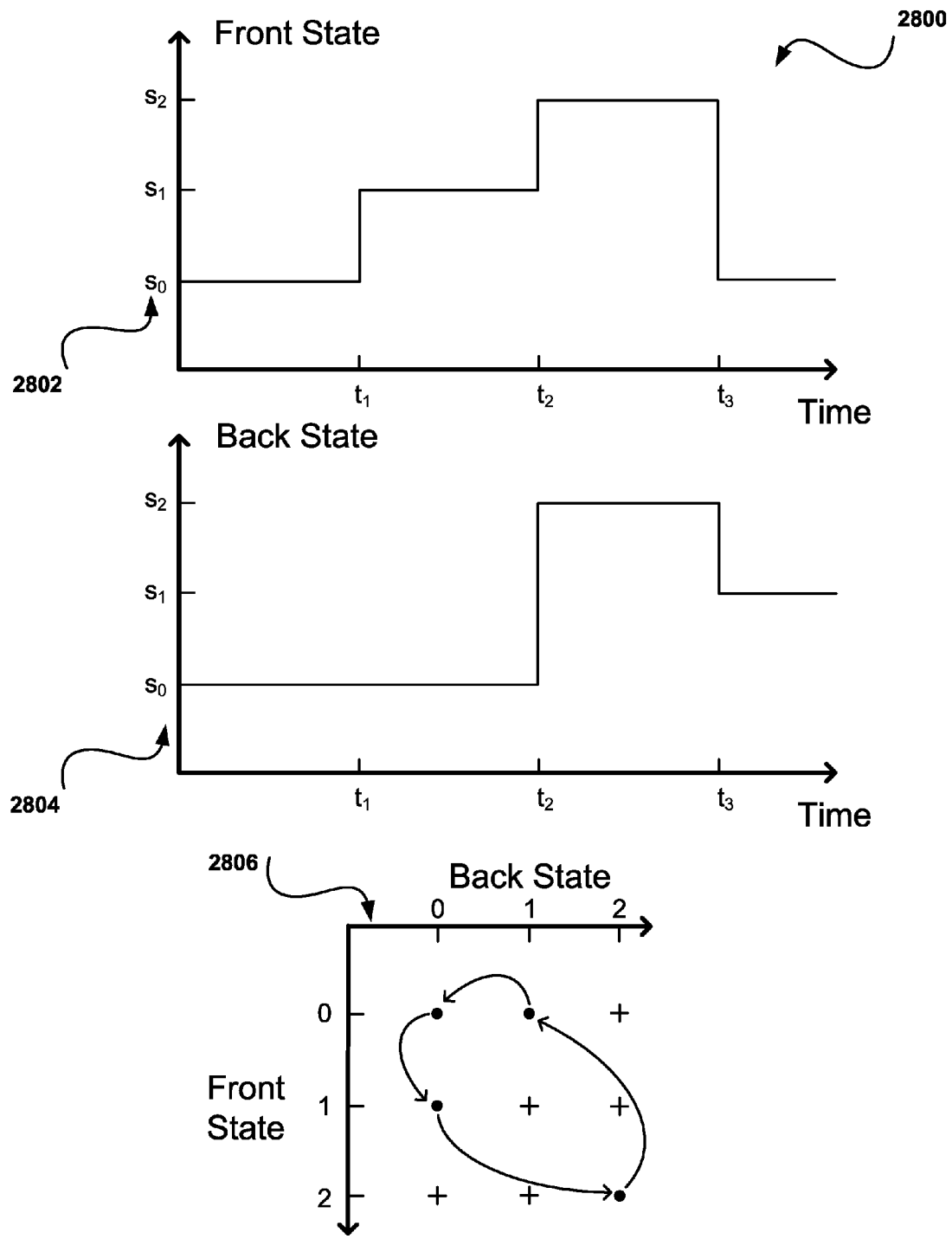

FIG. 28 shows examples of pattern-based gestures, in accordance with one embodiment.

Figure 29:
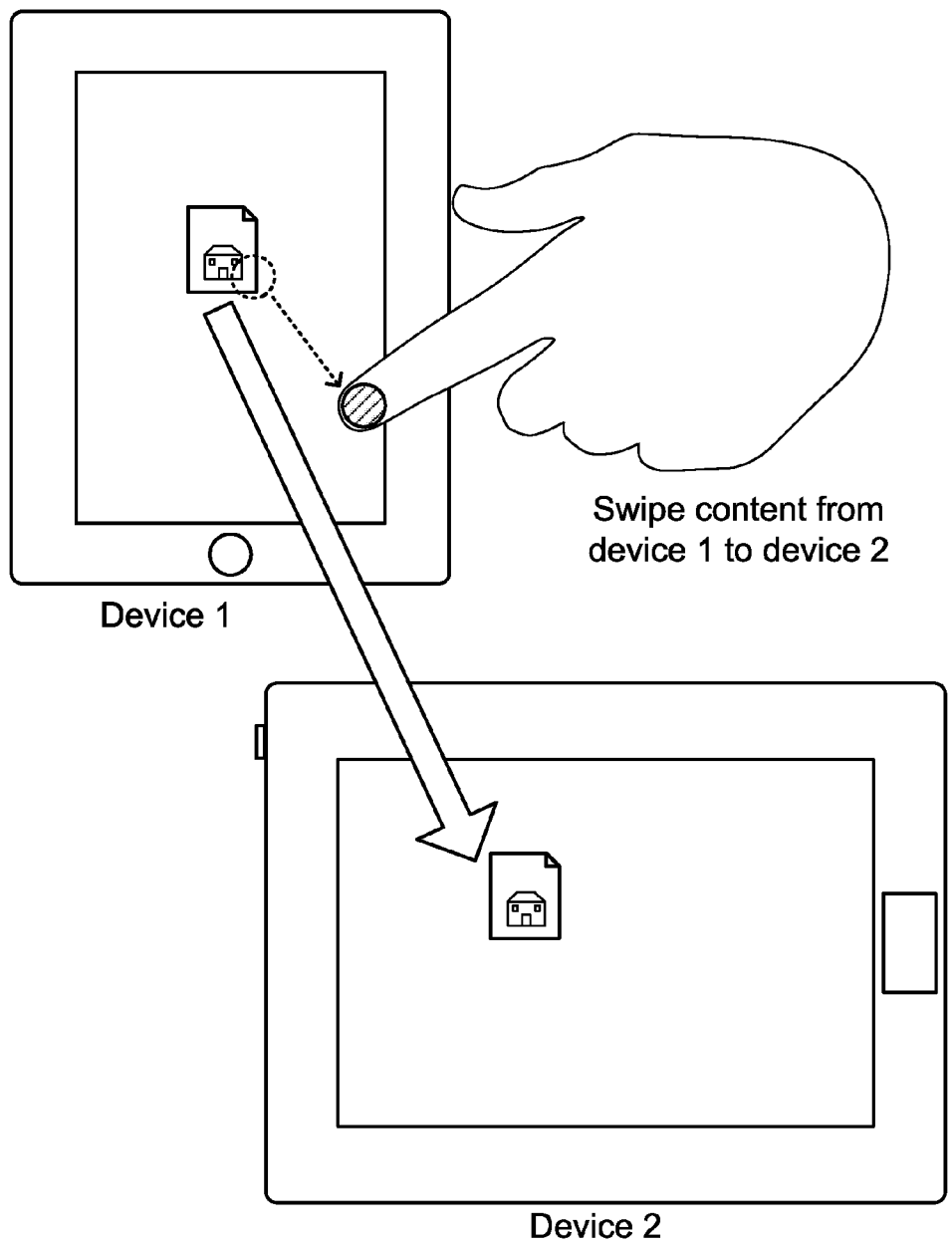

FIG. 29 shows file sharing triggered by a gesture, in accordance with one embodiment.

Figure 30:
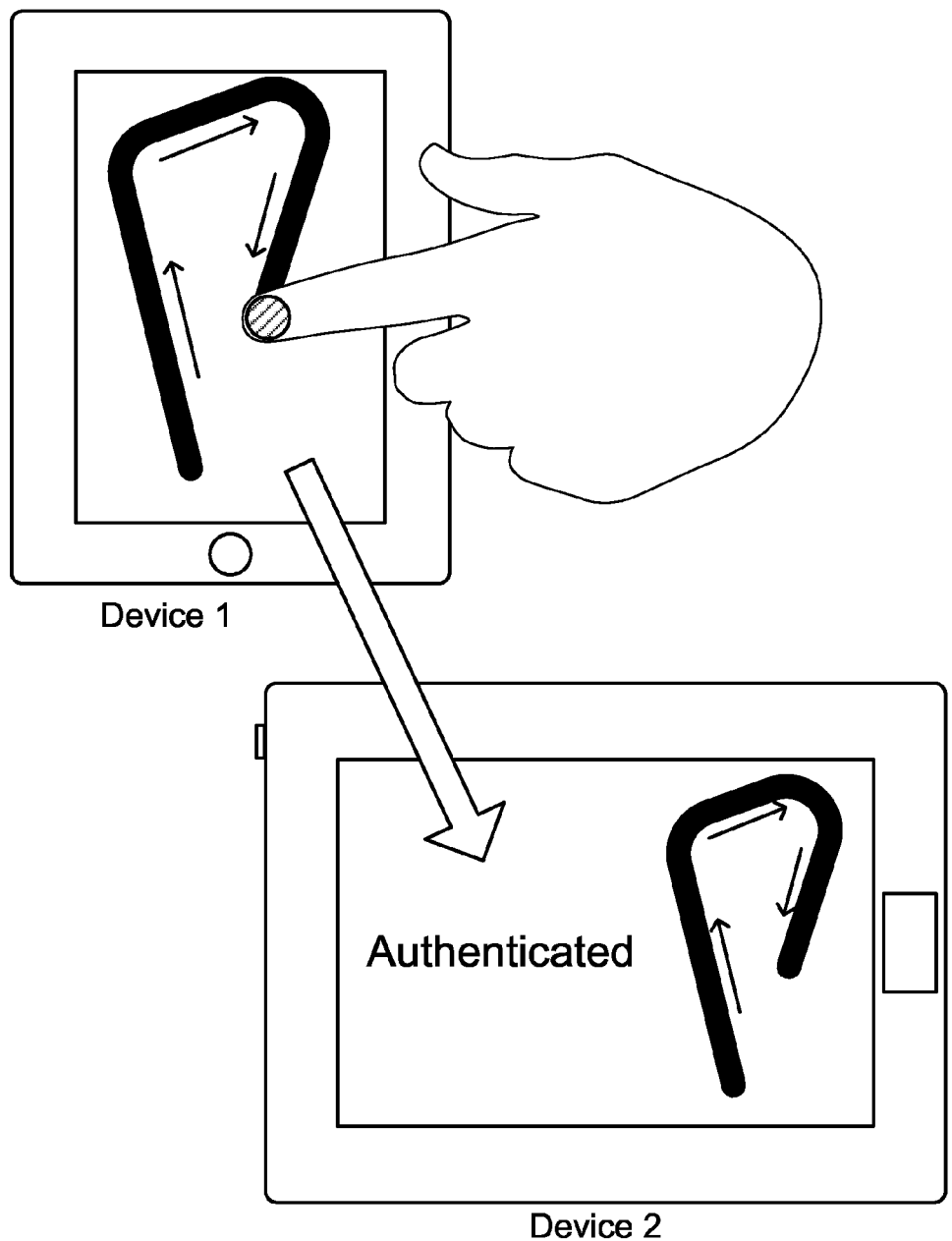

FIG. 30 shows an example of touch-based device authentication, in accordance with one embodiment.

Figure 31:
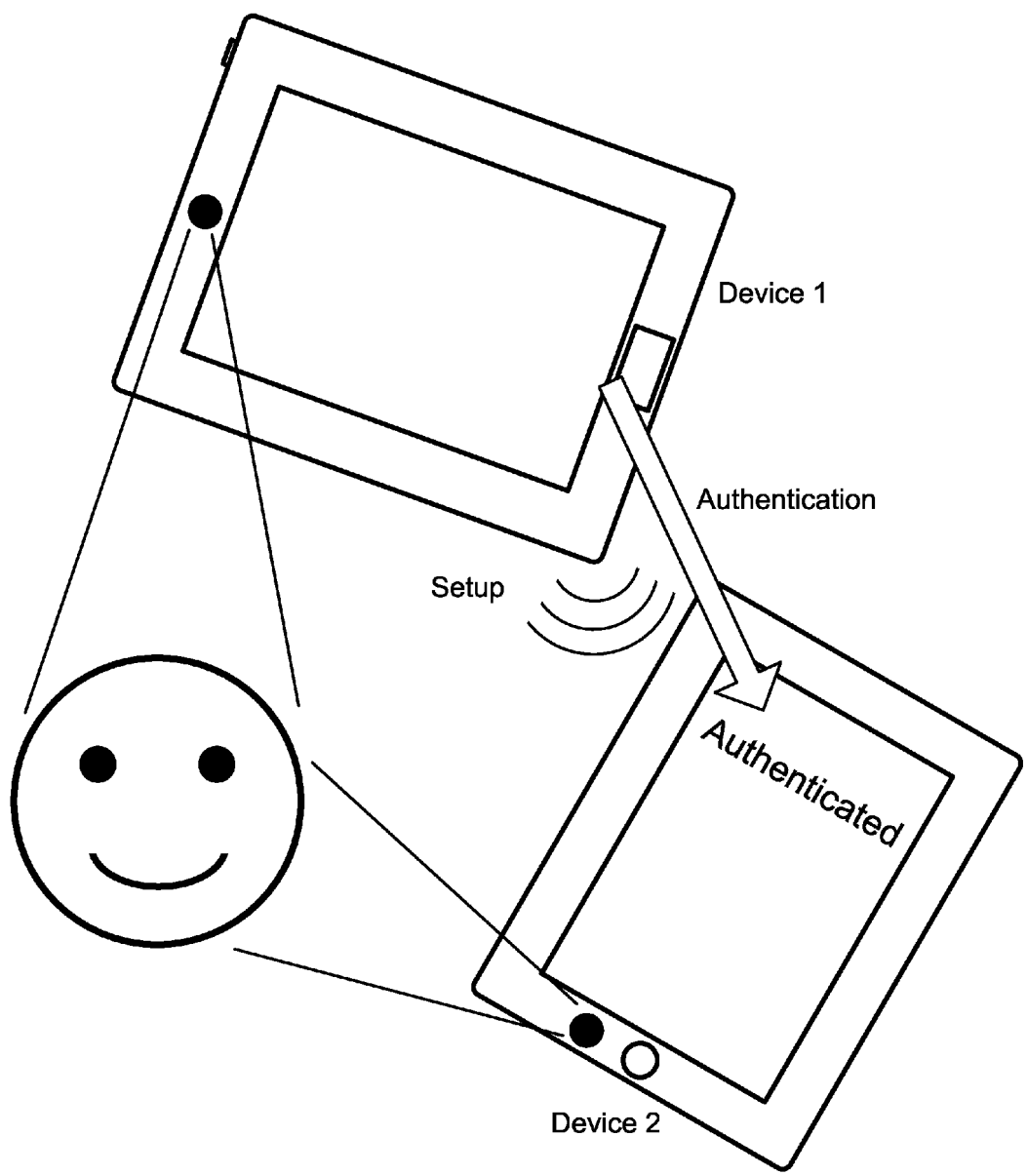

FIG. 31 shows an example of multi-device facial recognition, in accordance with one embodiment.

Figure 32:
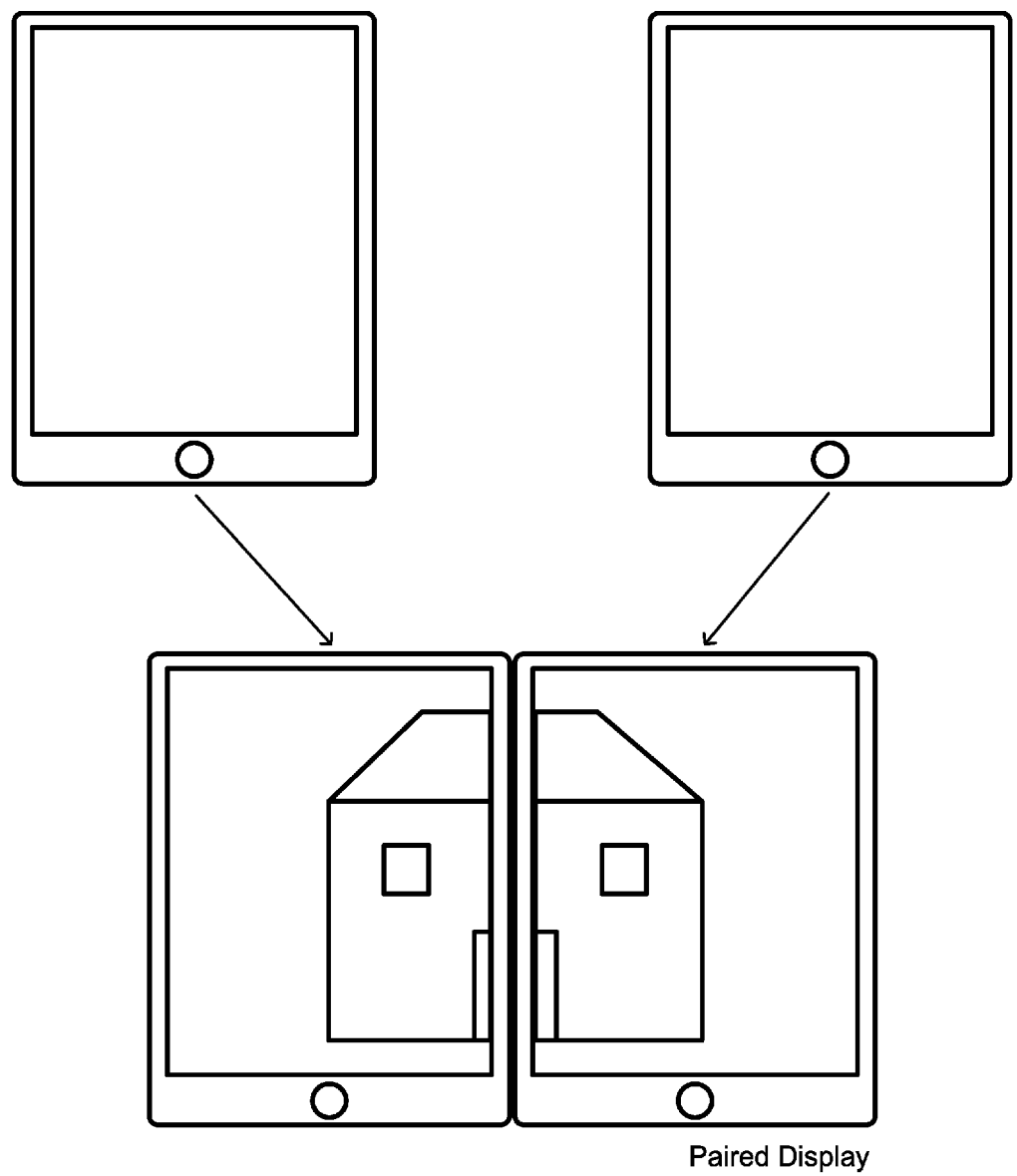

FIG. 32 shows two displays combined to function as one, in accordance with one embodiment.

Figure 33:
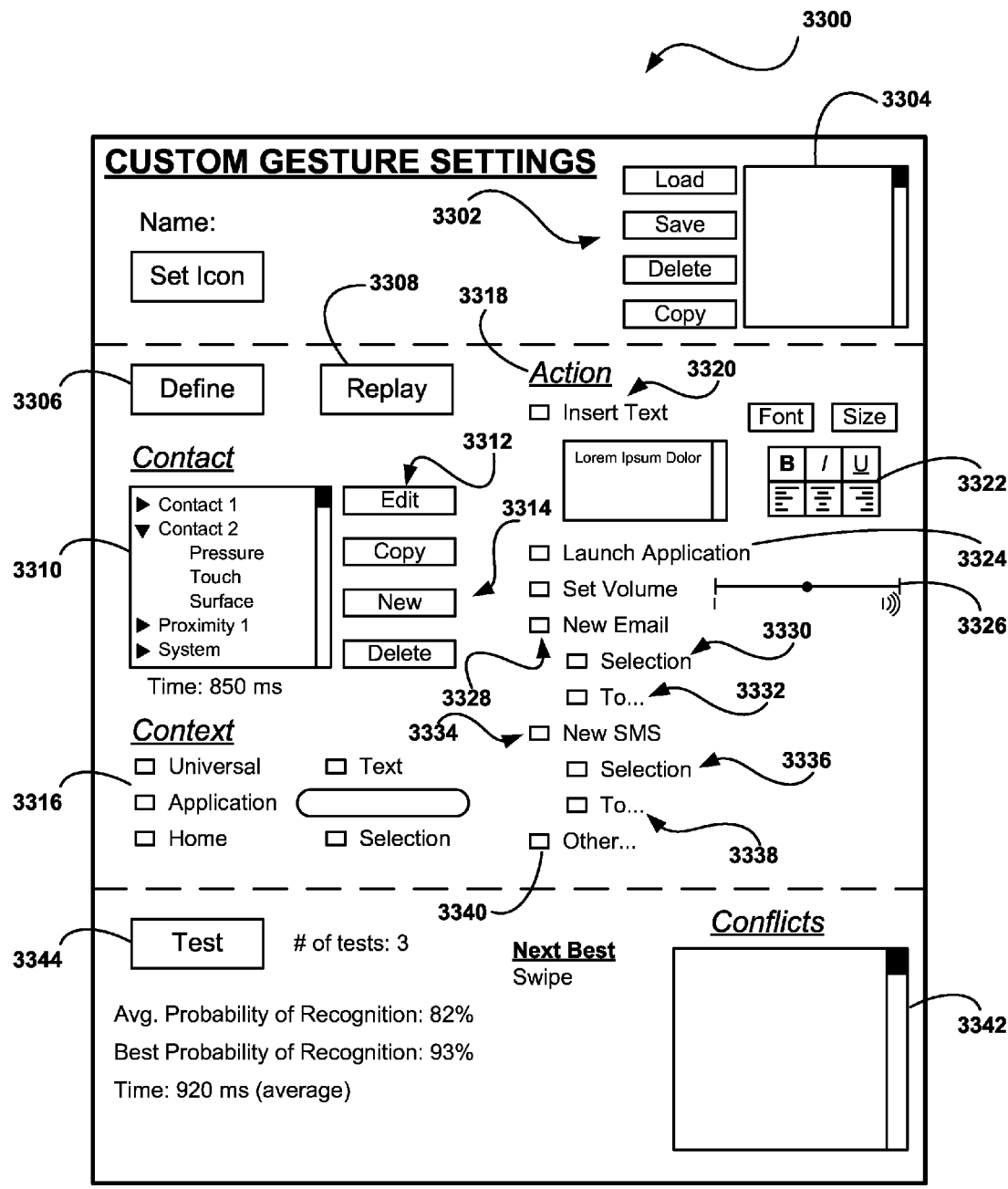

FIG. 33 shows a user interface for defining custom gestures, in accordance with one embodiment.

Figure 34:
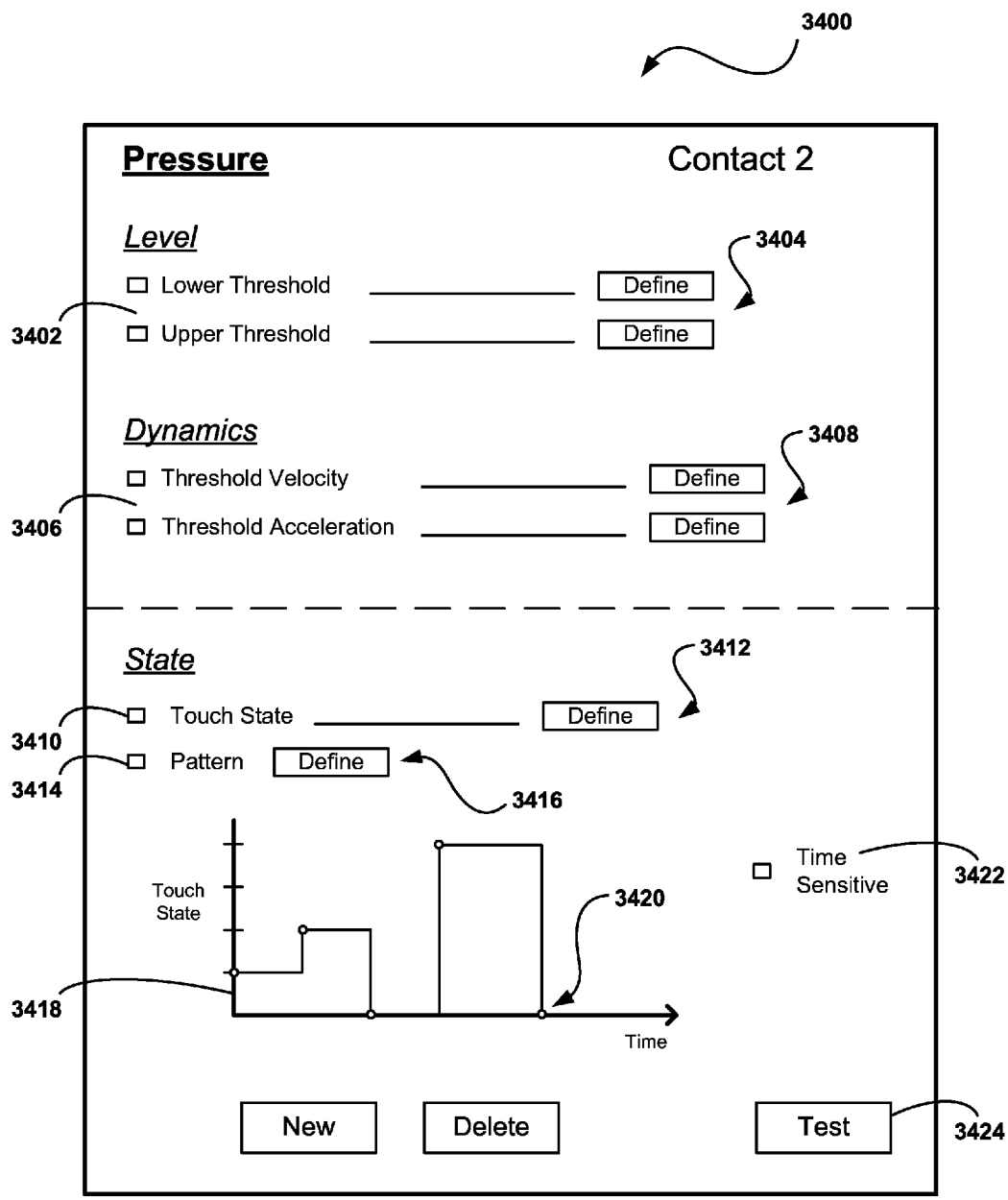

FIG. 34 shows a user interface for defining pressure inputs for a custom gesture, in accordance with one embodiment.

Figure 35:
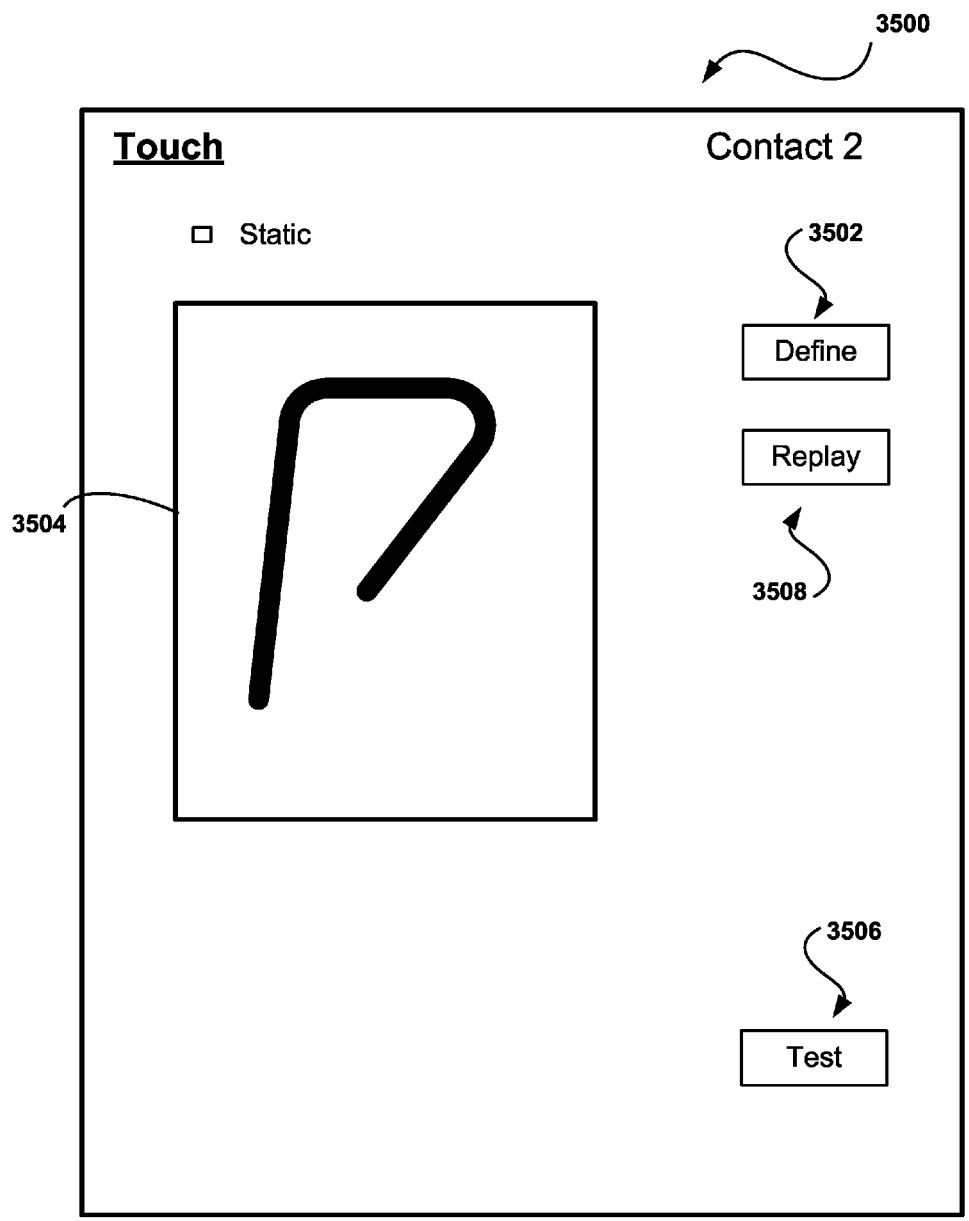

FIG. 35 shows a user interface for defining touch inputs for a custom gesture, in accordance with one embodiment.

Figure 36:
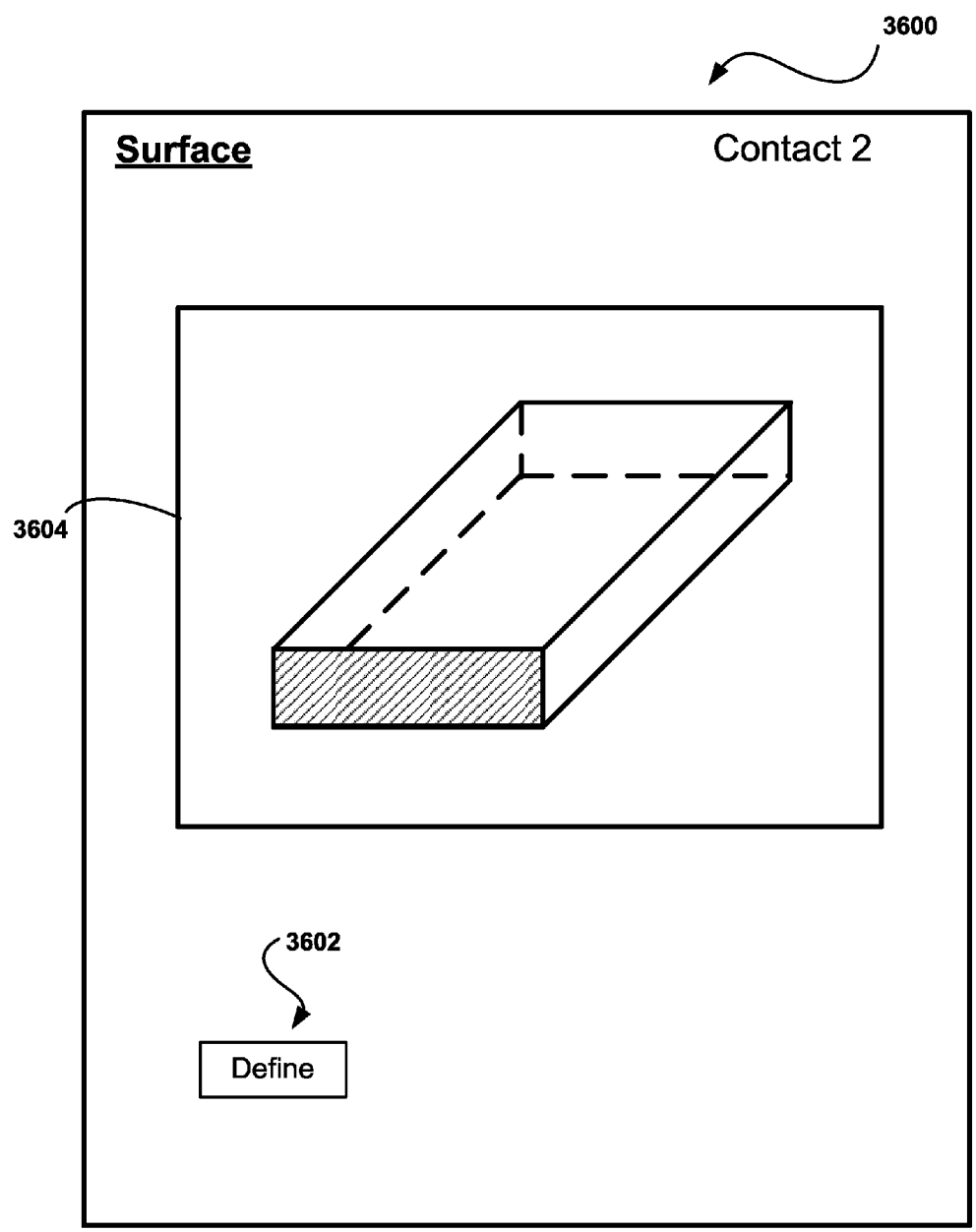

FIG. 36 shows a user interface for defining surface inputs for a custom gesture, in accordance with one embodiment.

Figure 37:
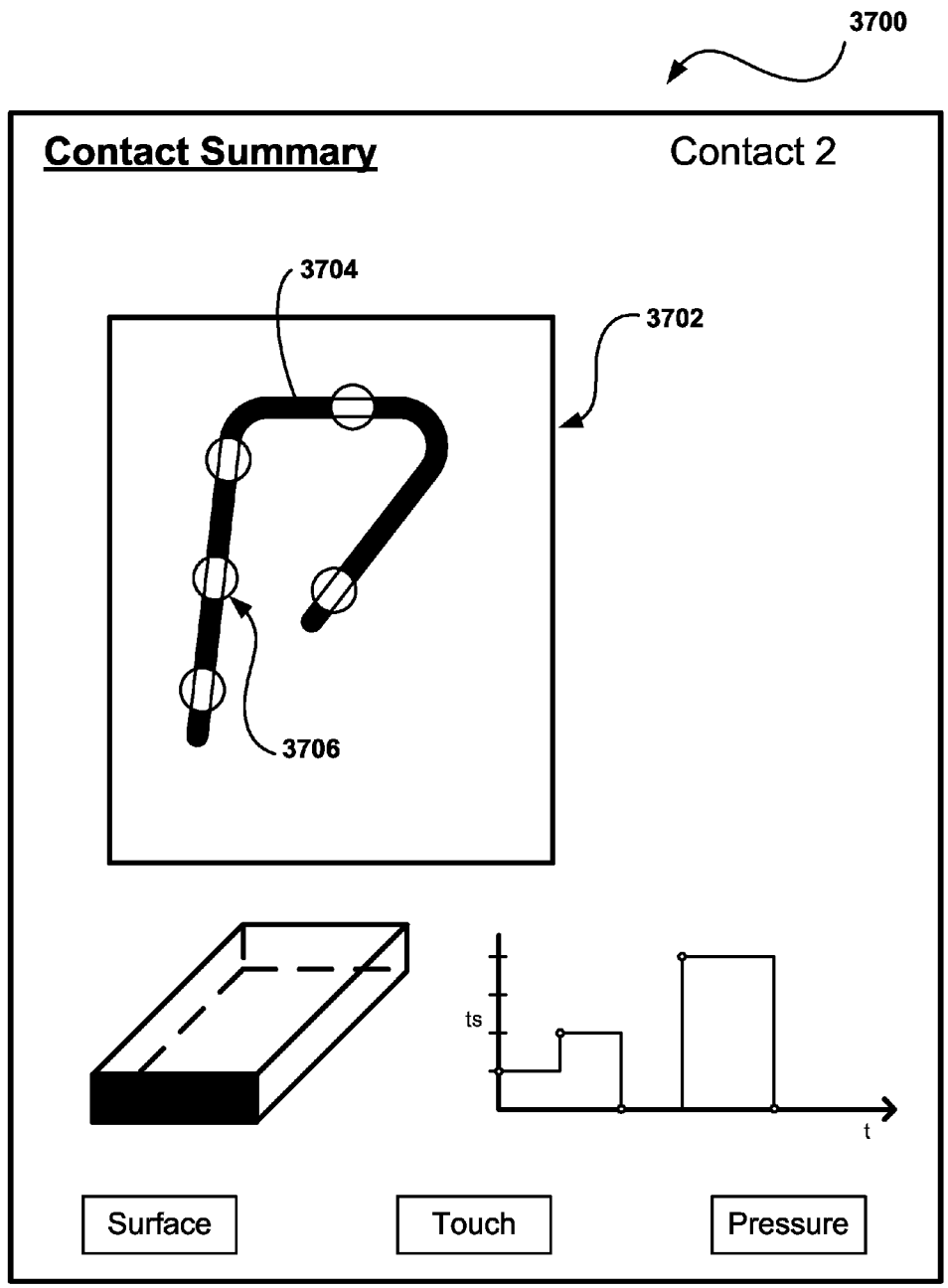

FIG. 37 shows a user interface for summarizing contact inputs for a custom gesture, in accordance with one embodiment.

Figure 38:
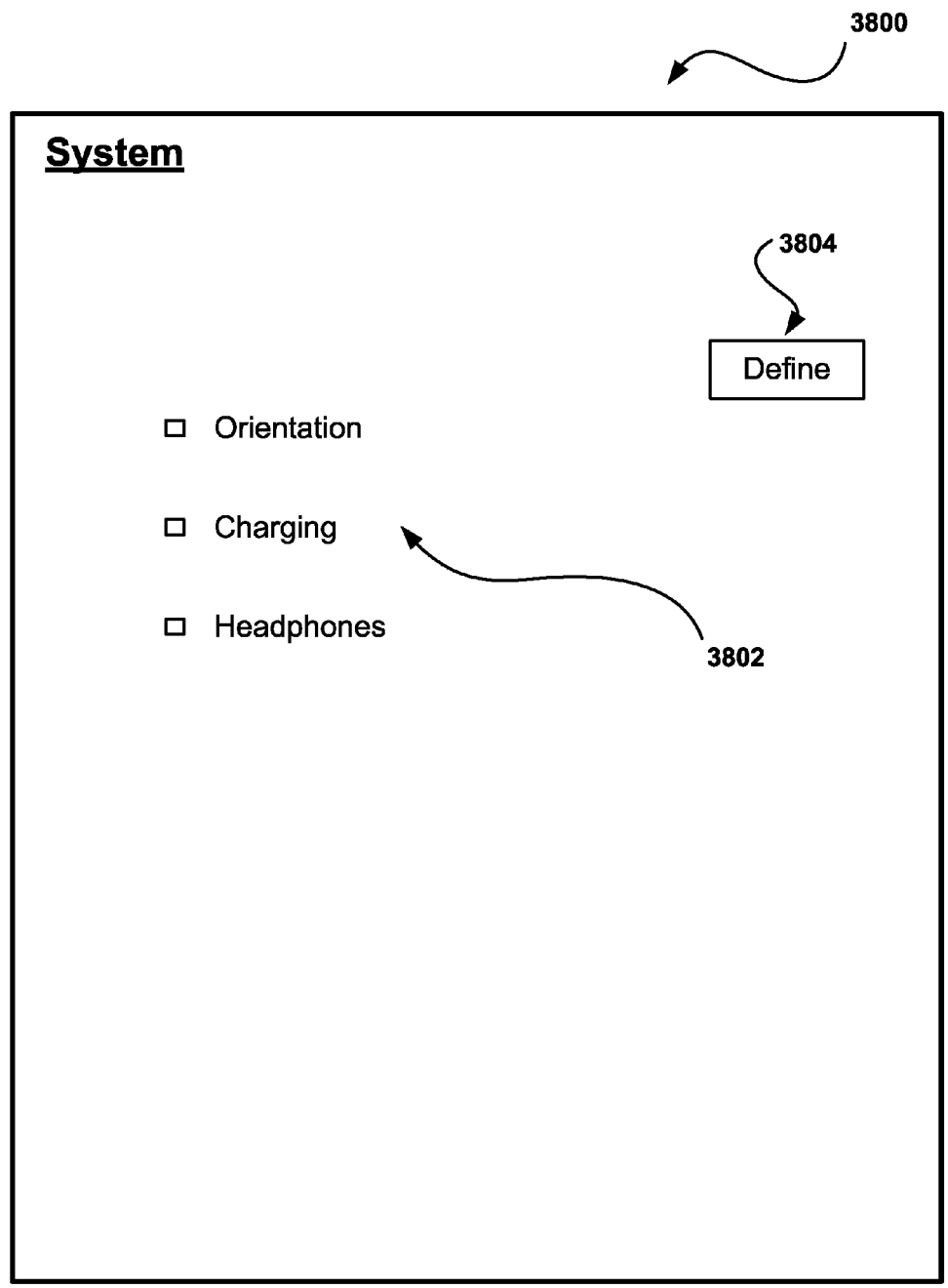

FIG. 38 shows a user interface for defining system inputs for a custom gesture, in accordance with one embodiment.

Figure 39:
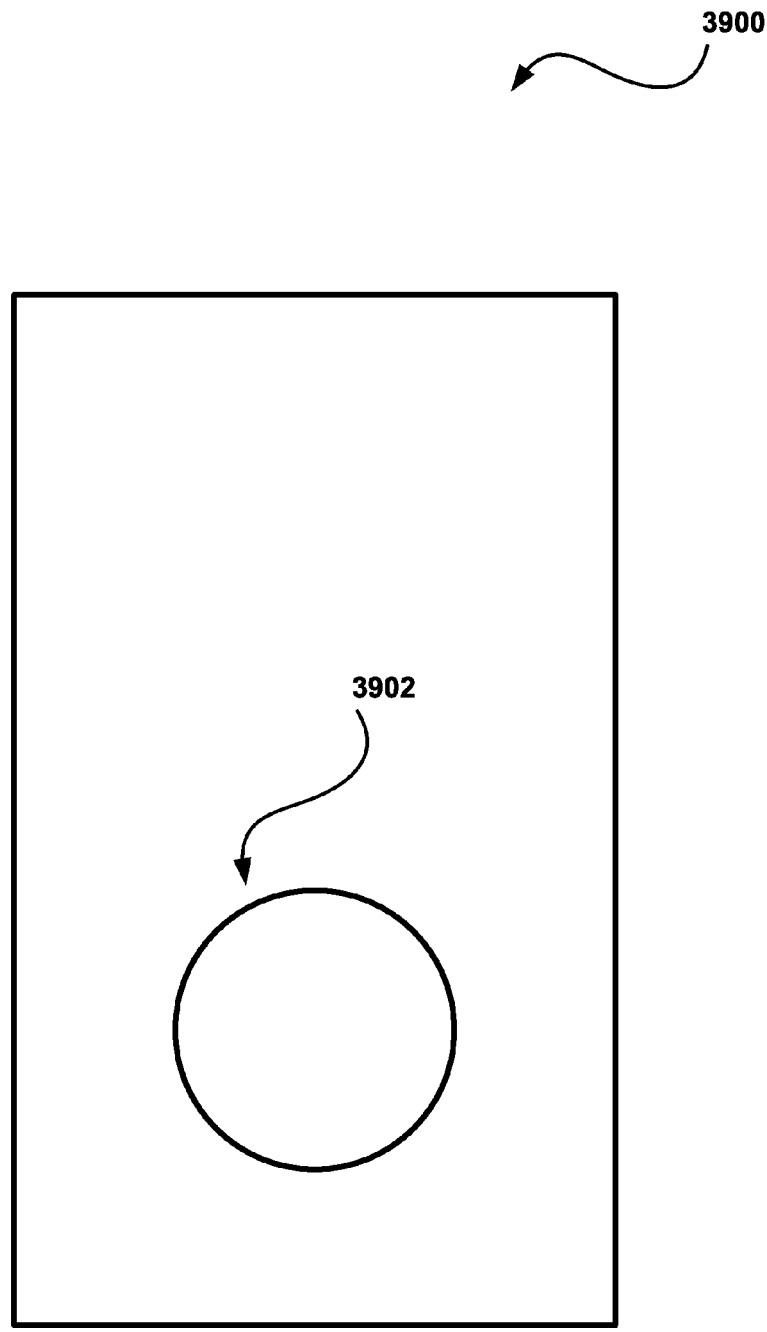

FIG. 39 shows a pressure-sensitive user interface containing a virtual trackball, in accordance with one embodiment.

Figure 40:
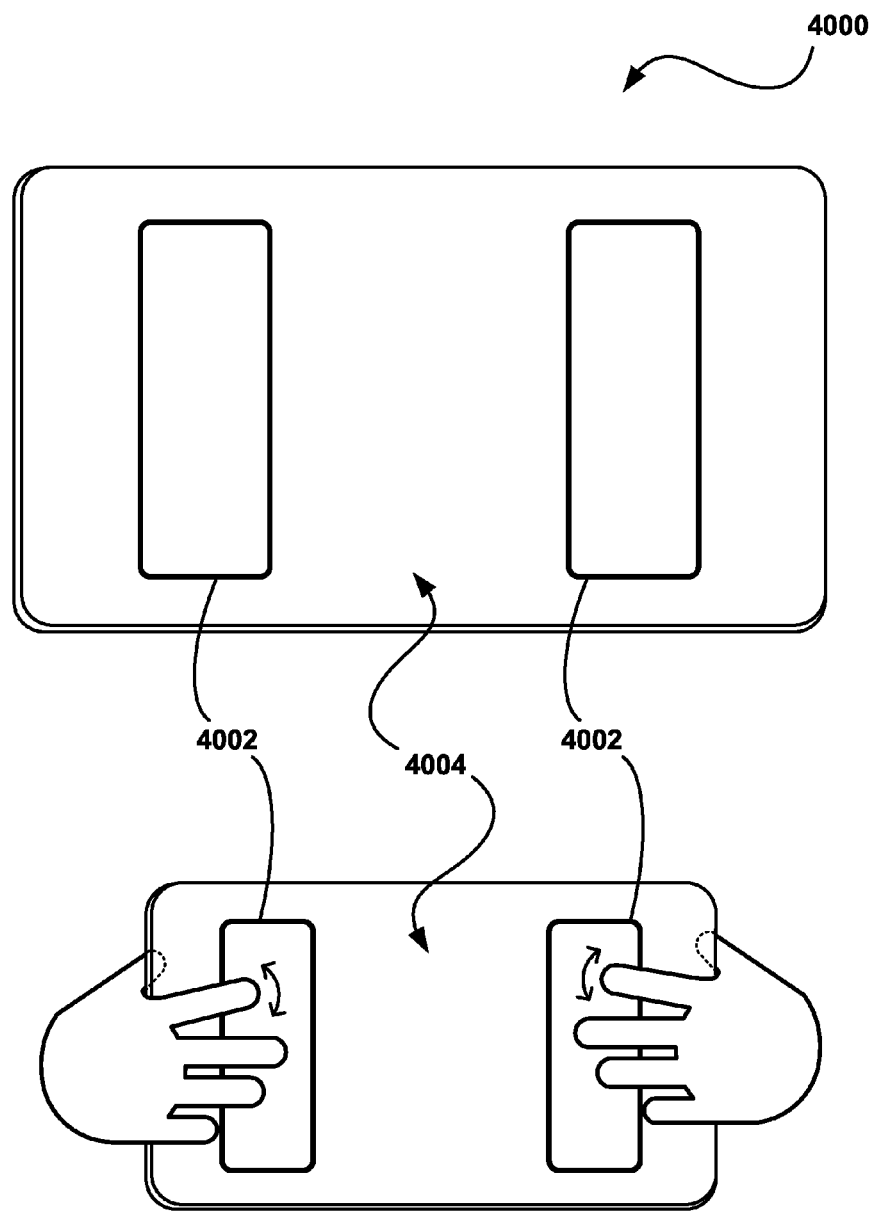

FIG. 40 shows a device with slide pads, in accordance with one embodiment.

Figure 41:
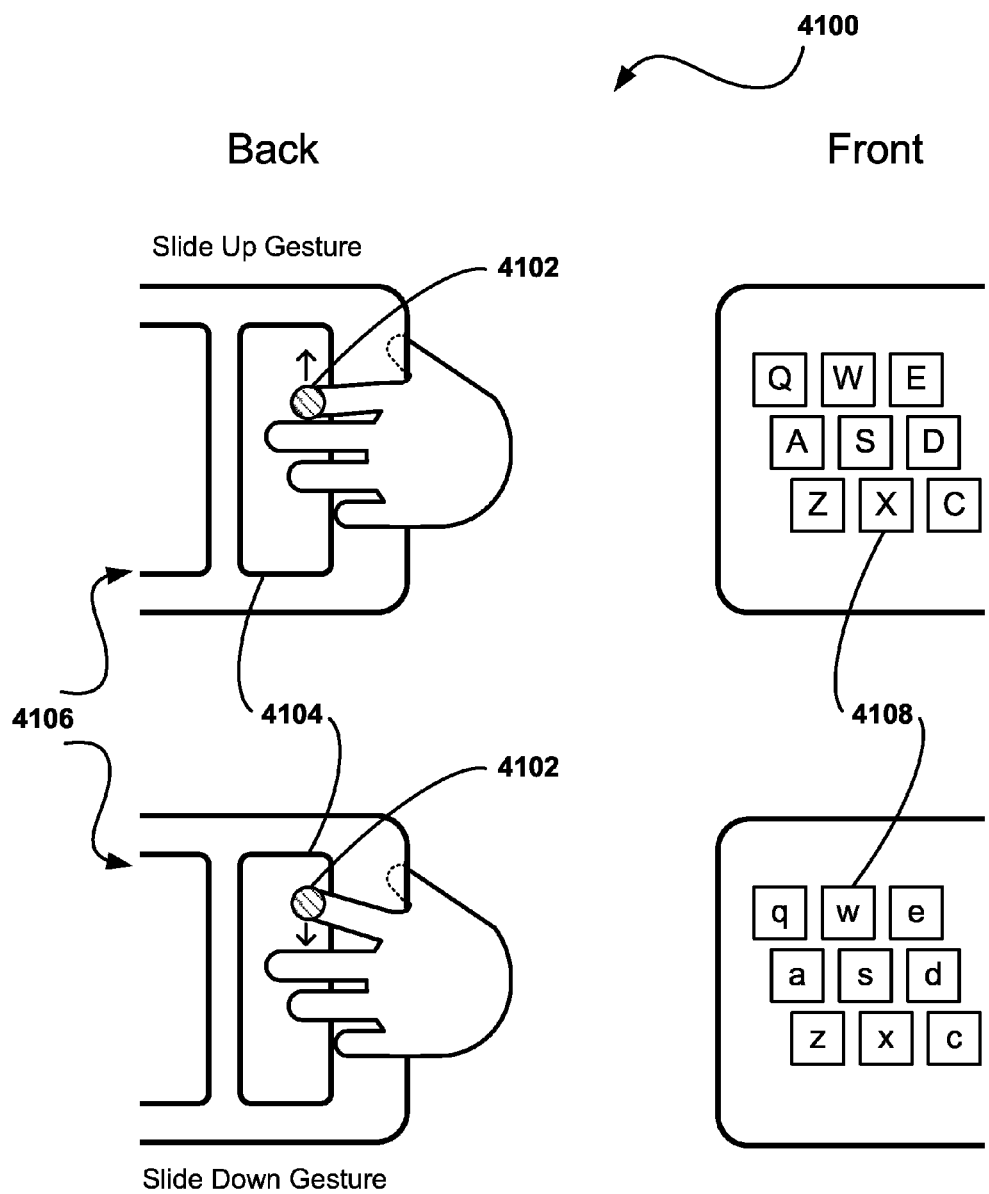

FIG. 41 shows an example of a slide pad gesture for performing an auxiliary function, in accordance with one embodiment.

Figure 42:
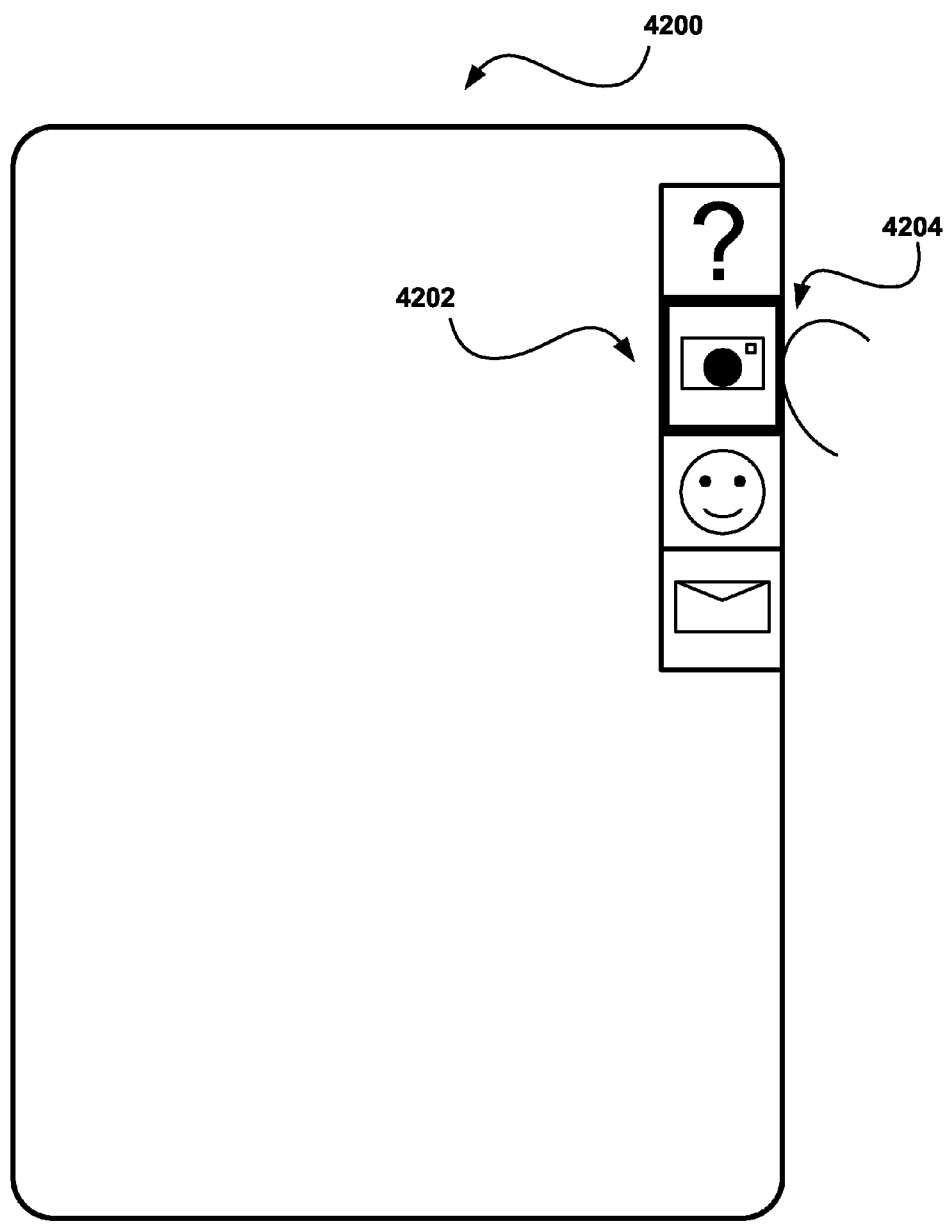

FIG. 42 shows a user interface for providing quick access to favorite operations, in accordance with one embodiment.

Figure 43:
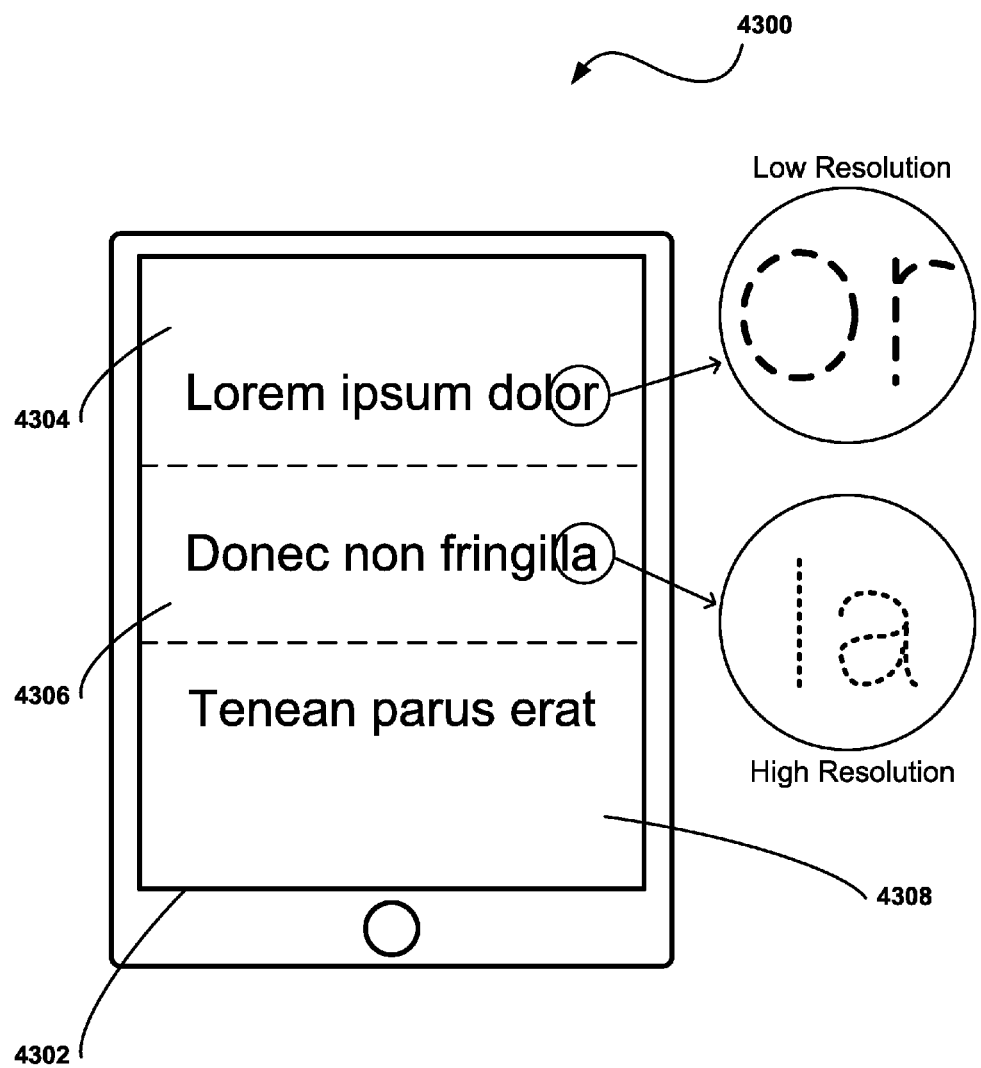

FIG. 43 shows a device with a non-uniform display, in accordance with one embodiment.

Figure 44:
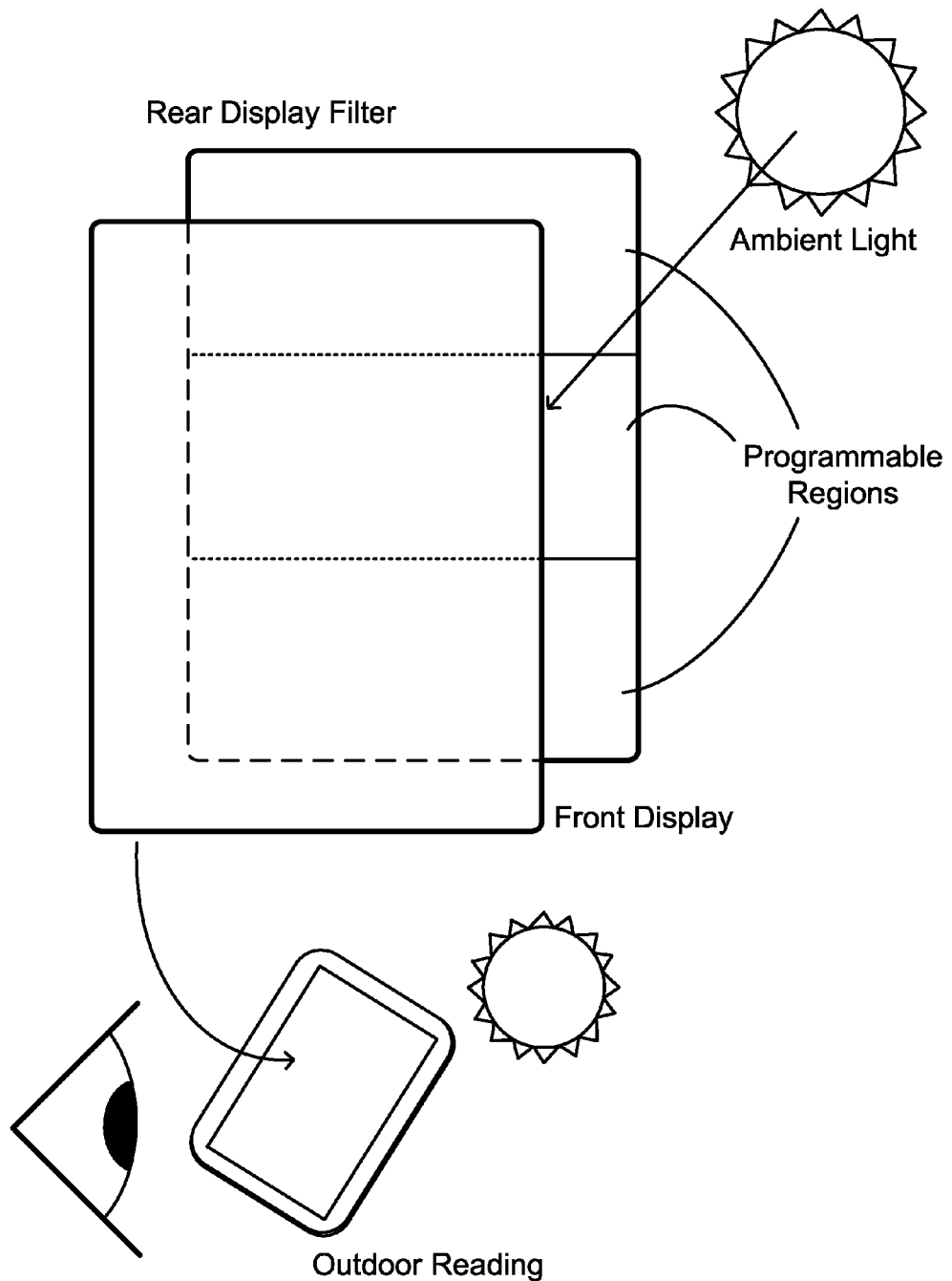

FIG. 44 shows a light valve technique, in accordance with one embodiment.

Figure 45:
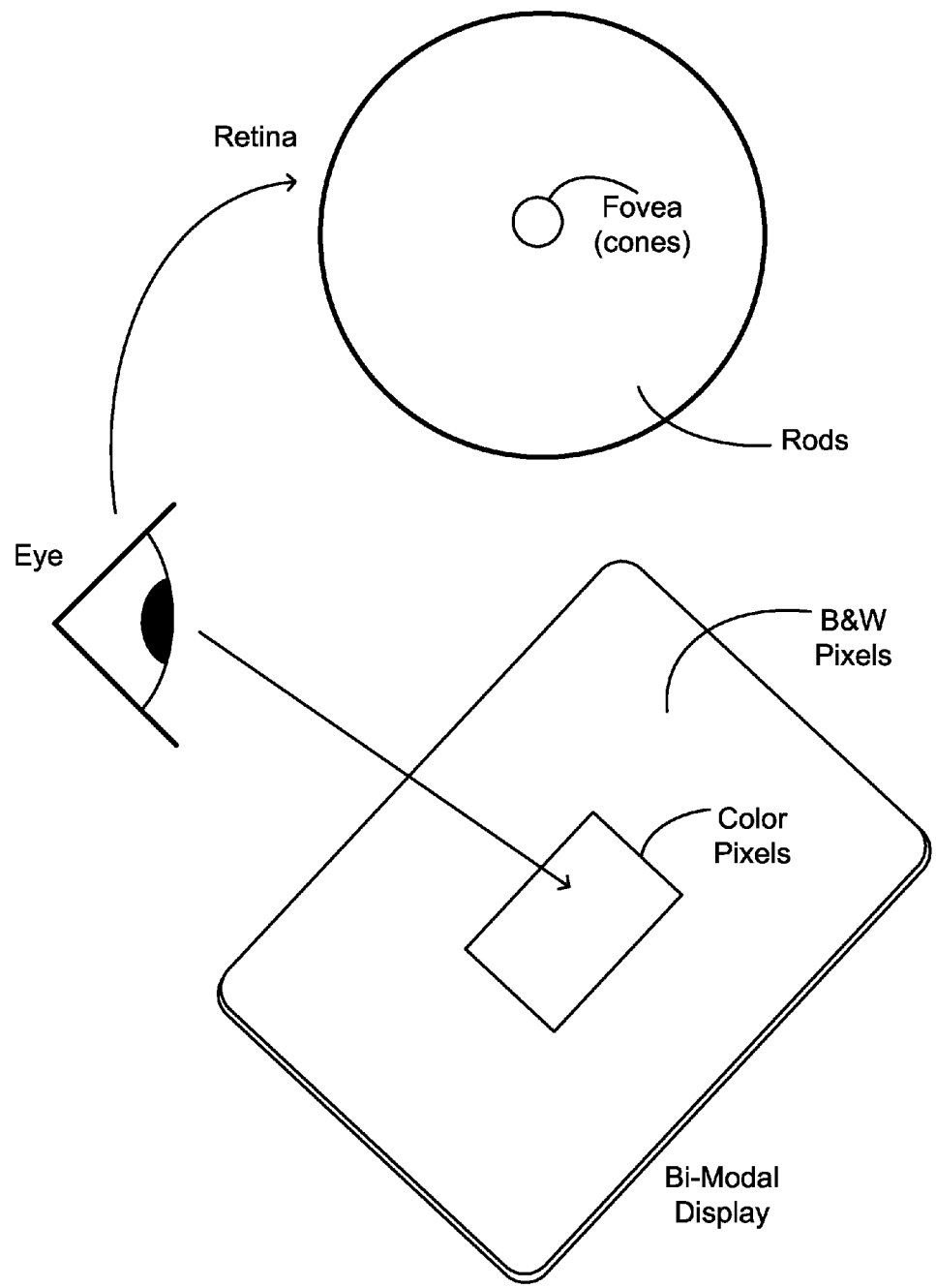

FIG. 45 shows a device display mixing color pixels with black and white pixels, in accordance with one embodiment.

Figure 46:
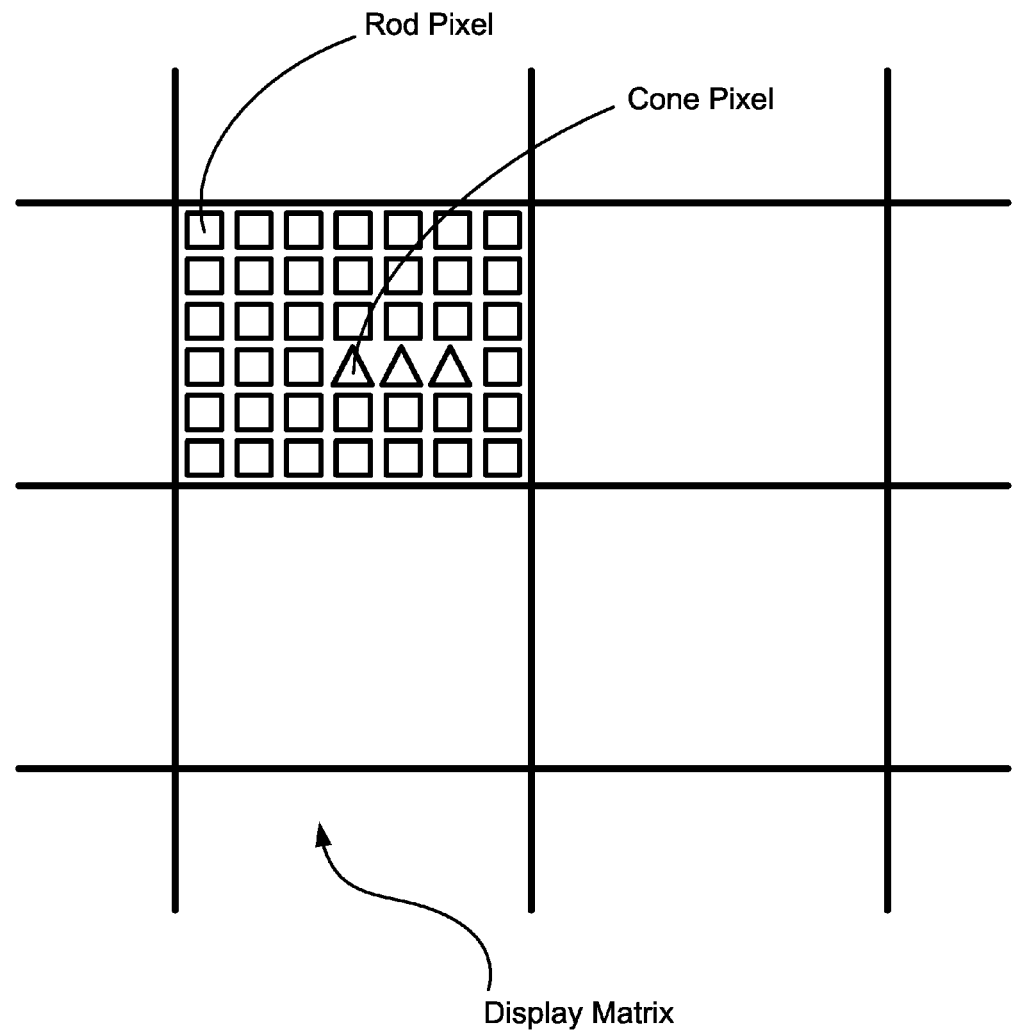

FIG. 46 shows a device display mixing color with black and white across a matrix, in accordance with one embodiment.

Figure 47:
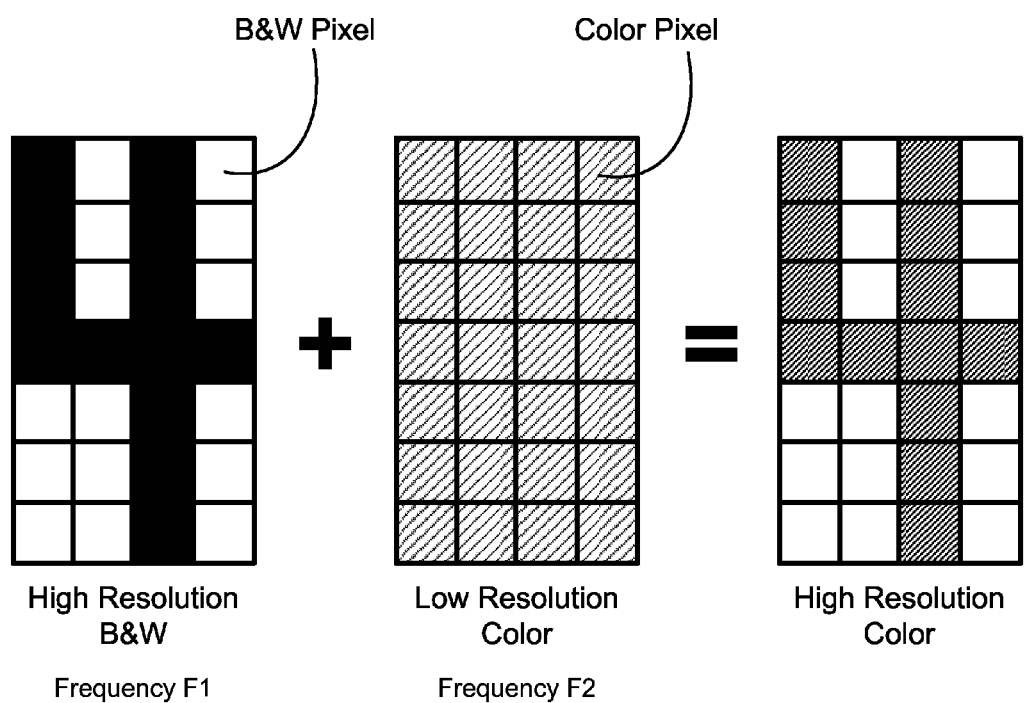

FIG. 47 shows a modulated display, in accordance with one embodiment.

Figure 48:
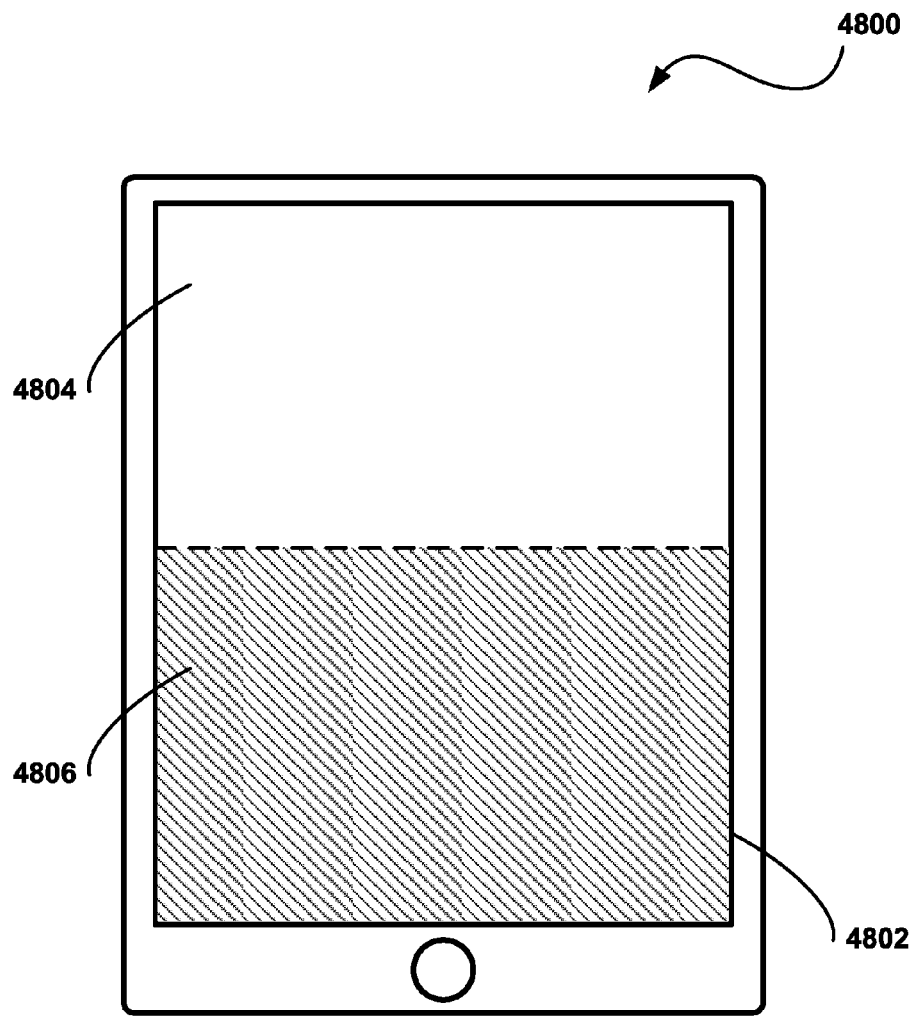

FIG. 48 shows a device with a display having a non-uniform backlight, in accordance with one embodiment.

Figure 49:
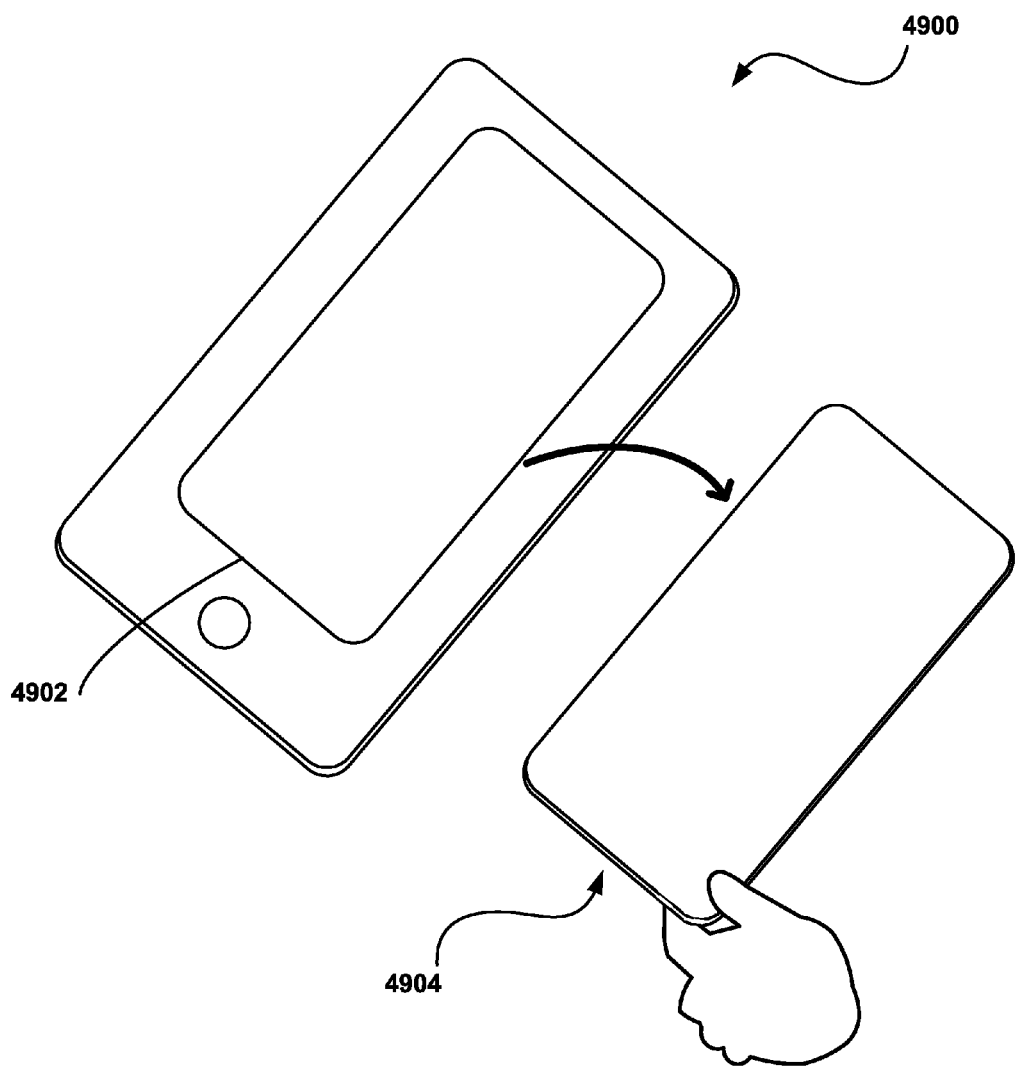

FIG. 49 shows a device having a removable back sensor or display, in accordance with one embodiment.

Figure 50:
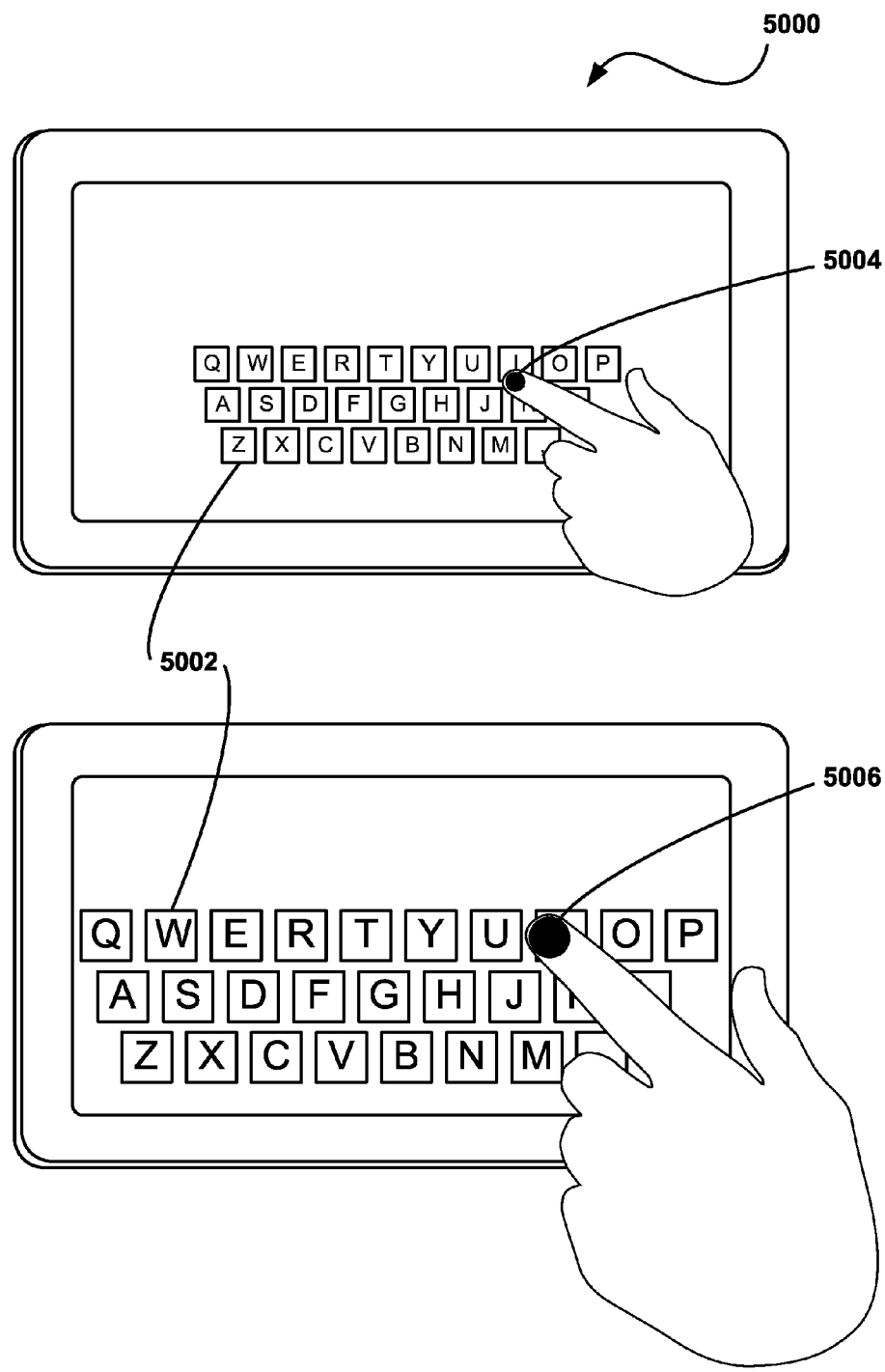

FIG. 50 shows a user interface containing an adaptive soft keyboard, in accordance with one embodiment.

Figure 51:
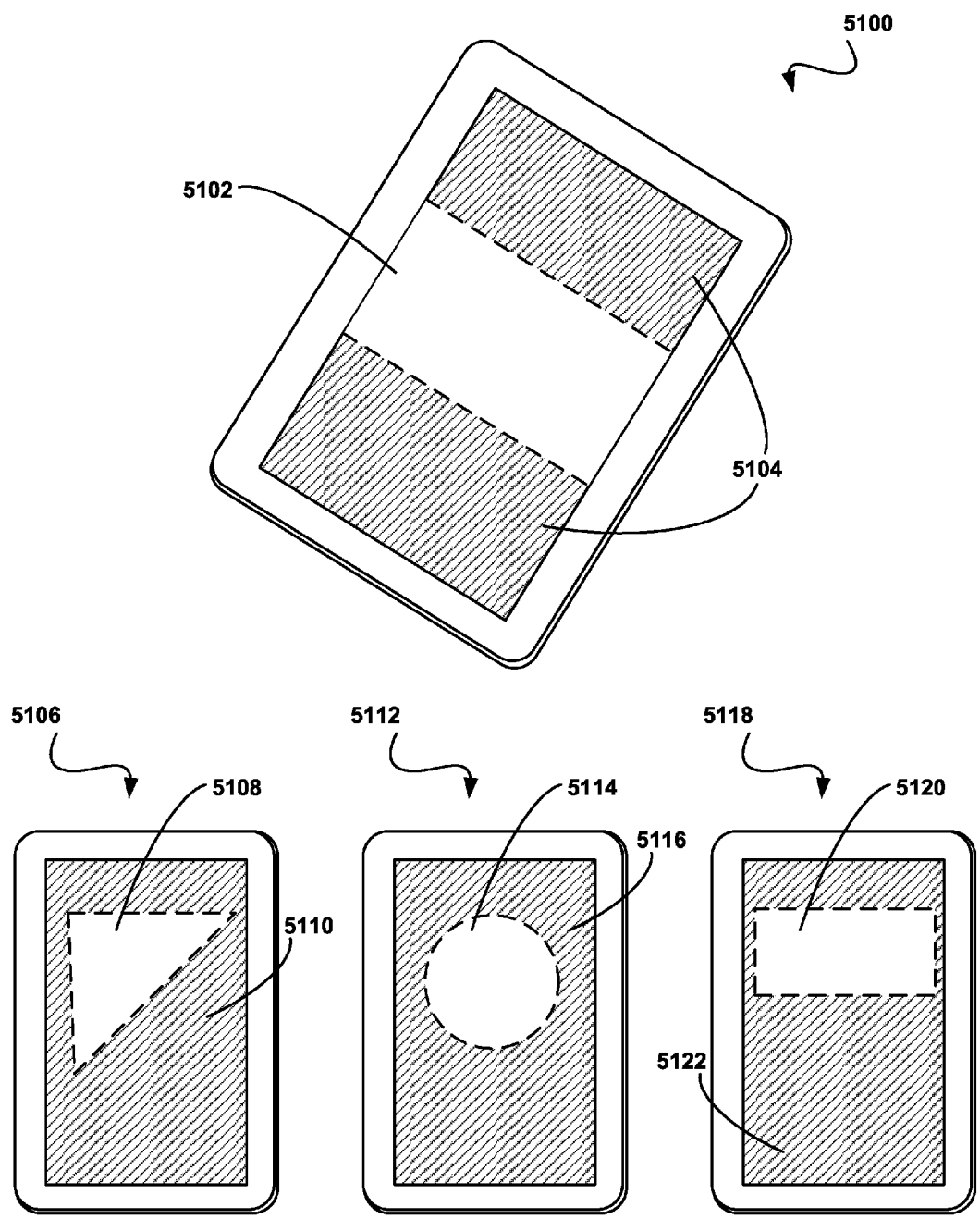

FIG. 51 shows a user interface with context-sensitive backlighting, in accordance with one embodiment.

Figure 52:
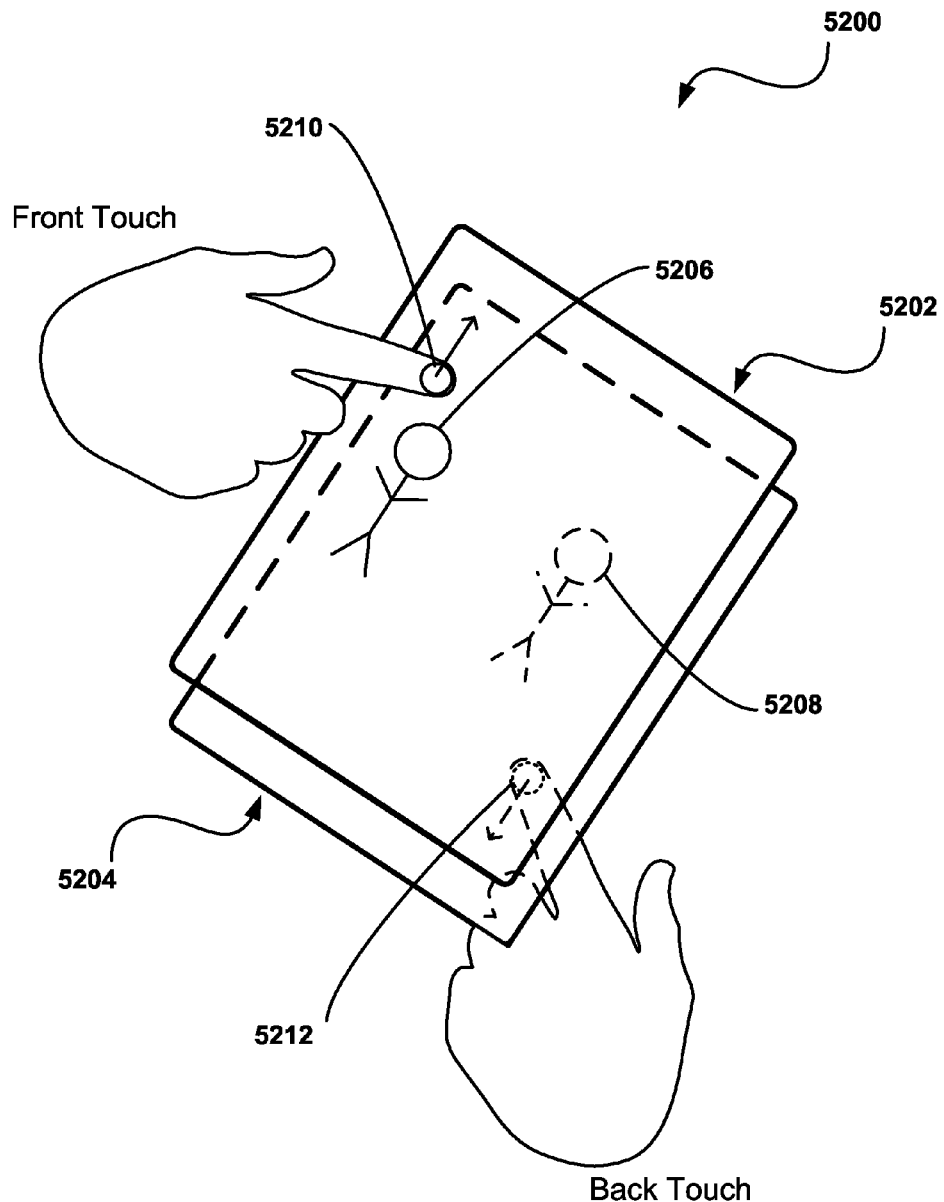

FIG. 52 shows a 3D layered user interface, in accordance with one embodiment.

Figure 53:
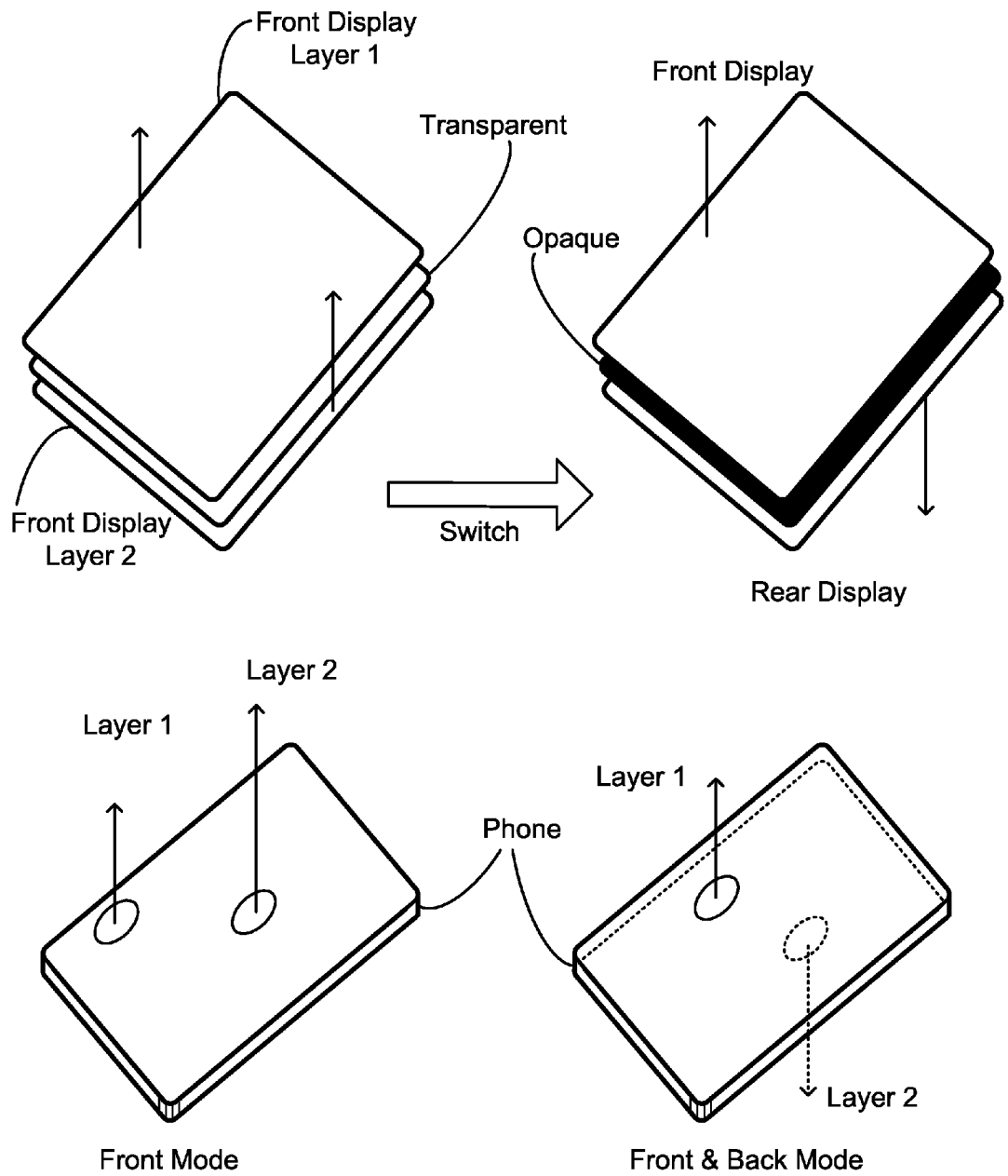

FIG. 53 shows a device which may be converted into a 3D layer enabled device, in accordance with one embodiment.

Figure 54:
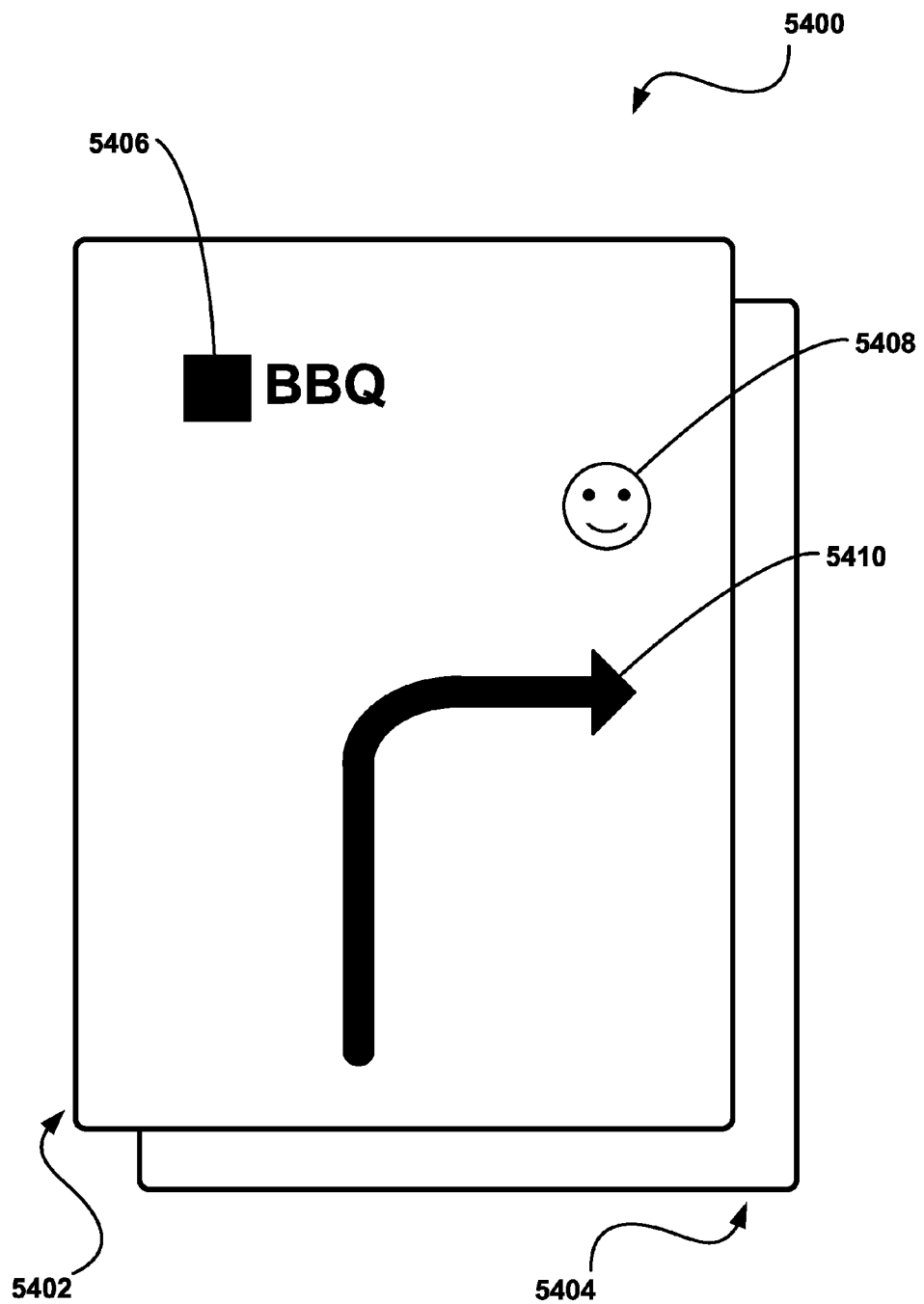

FIG. 54 shows a 3D layered user interface for augmented reality, in accordance with one embodiment.

Figure 55:
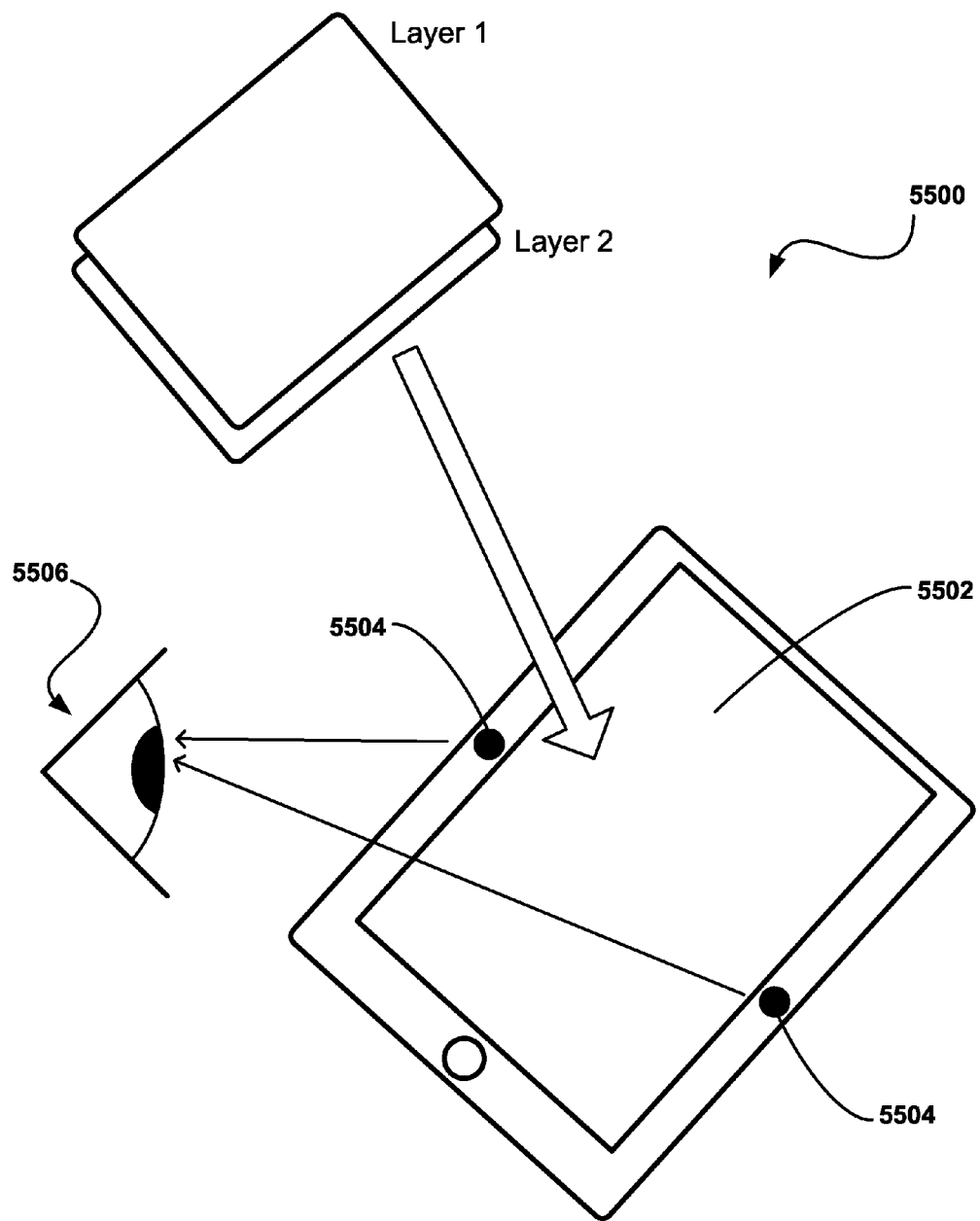

FIG. 55 shows a device with user gaze tracking sensors, in accordance with one embodiment.

Figure 56:
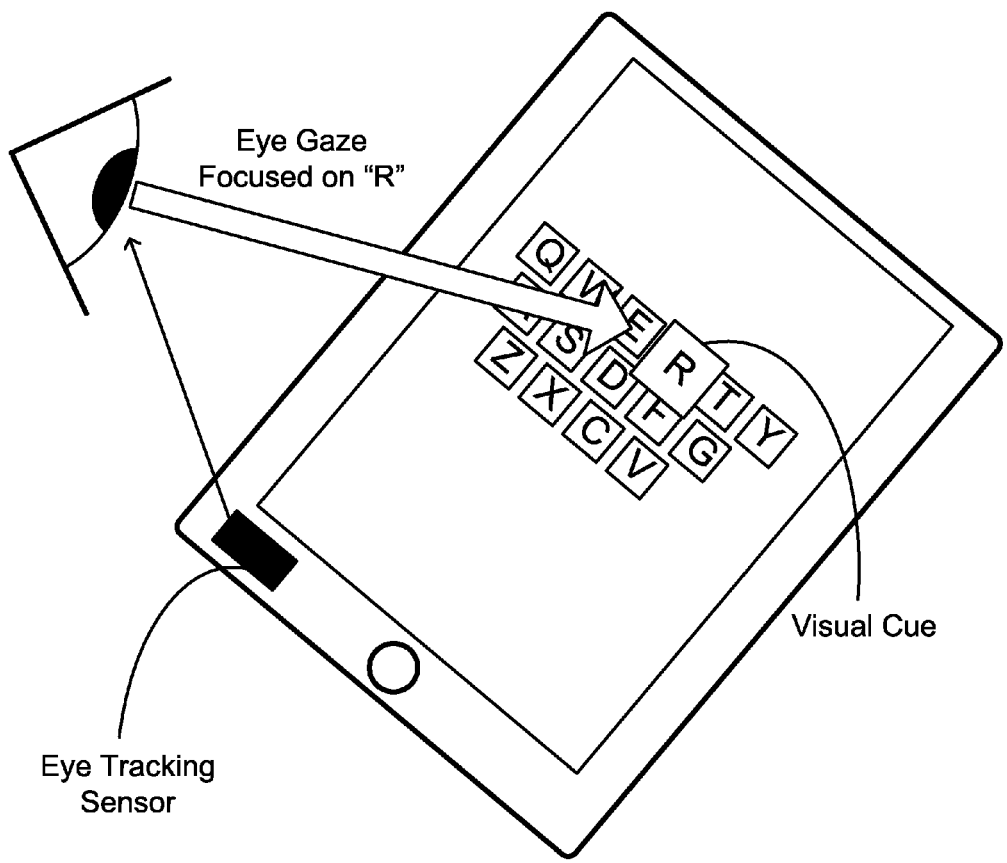

FIG. 56 shows the use of eye tracking to generate 3D depth cues, in accordance with one embodiment.

Figure 57:
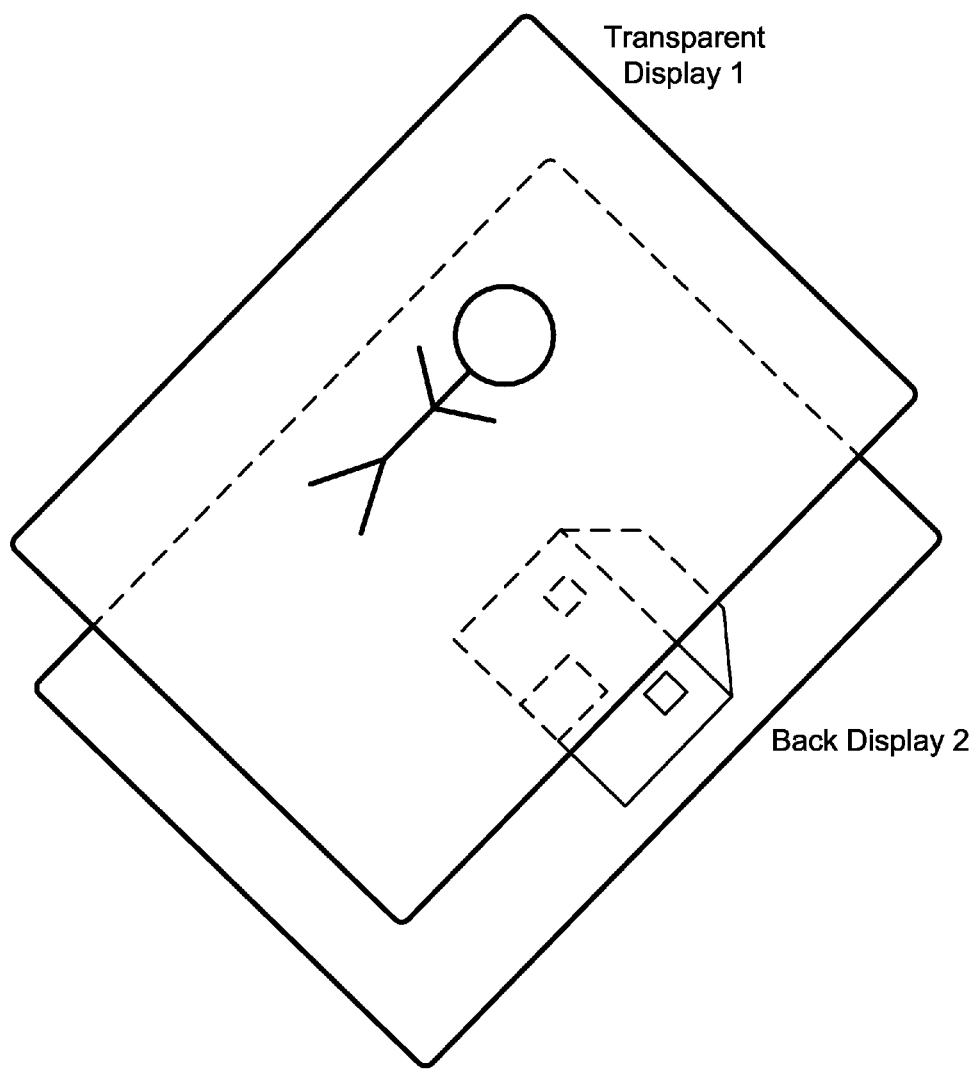

FIG. 57 shows a layered display, in accordance with one embodiment.

Figure 58:
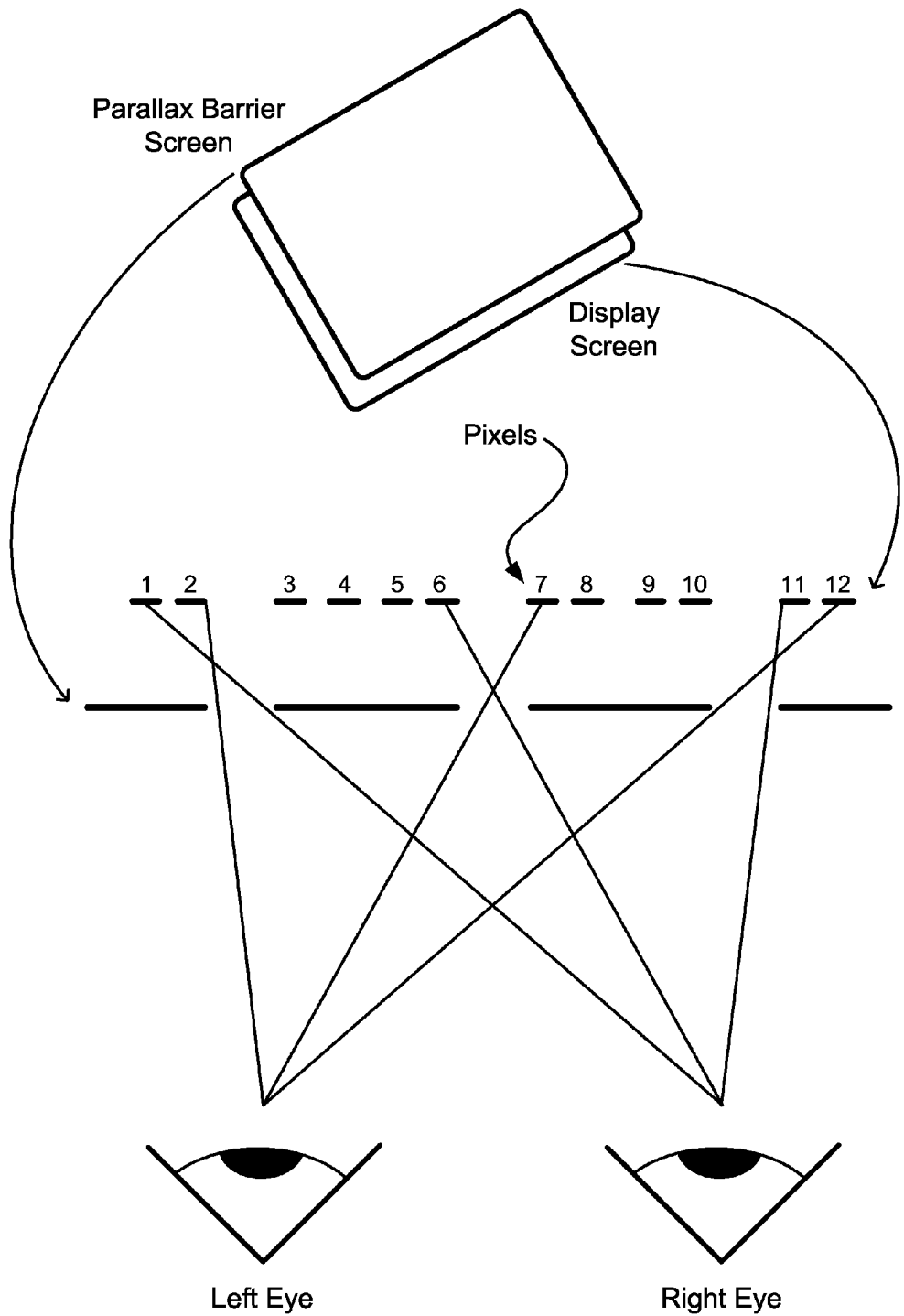

FIG. 58 shows an automultoscopic display, in accordance with one embodiment.

Figure 59:
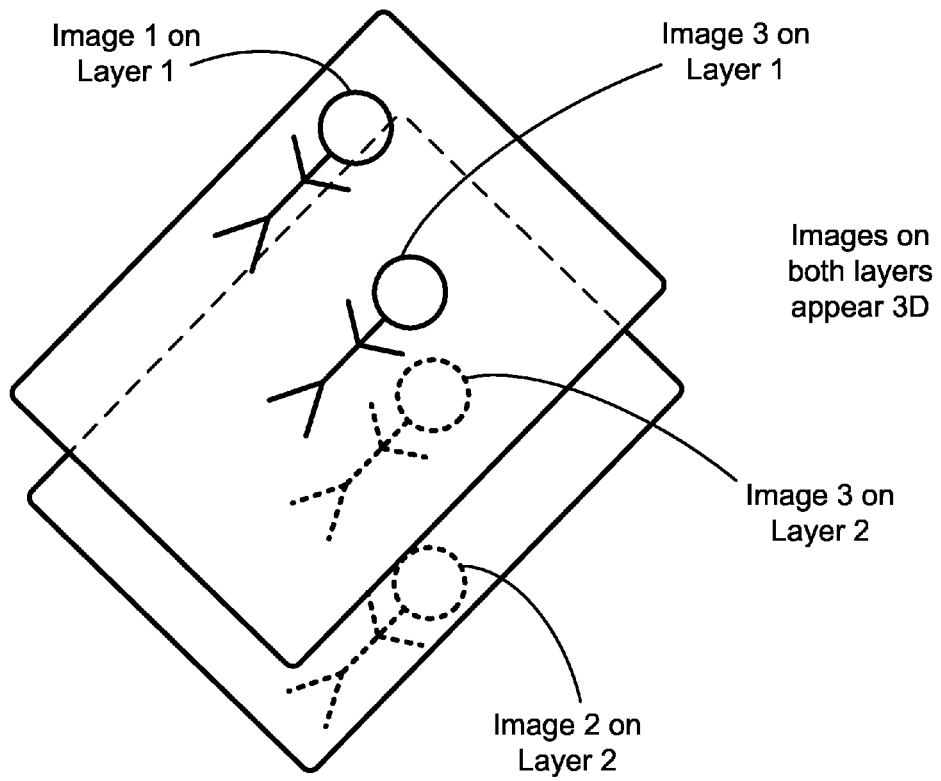
Figure 59:
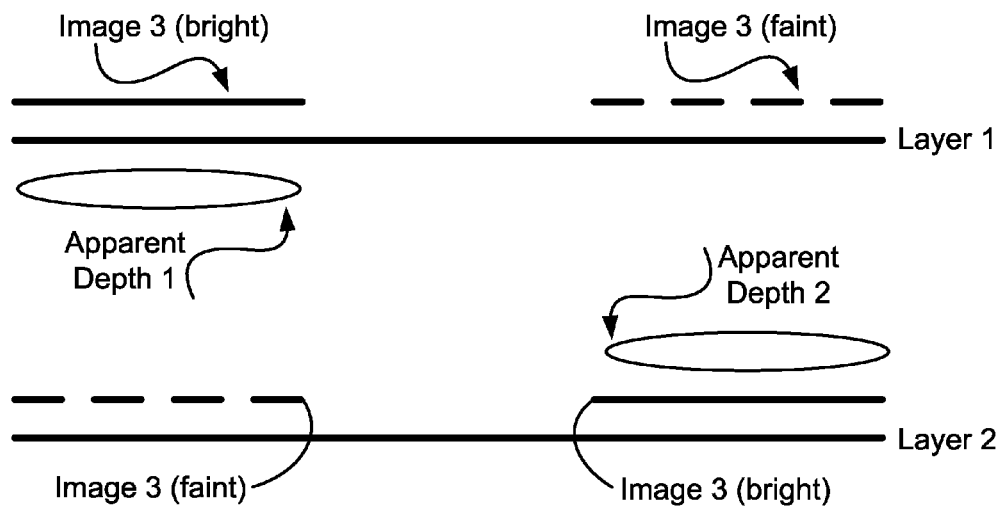

FIG. 59 shows a layered display containing depth fused 3D images, in accordance with one embodiment.

Figure 60:
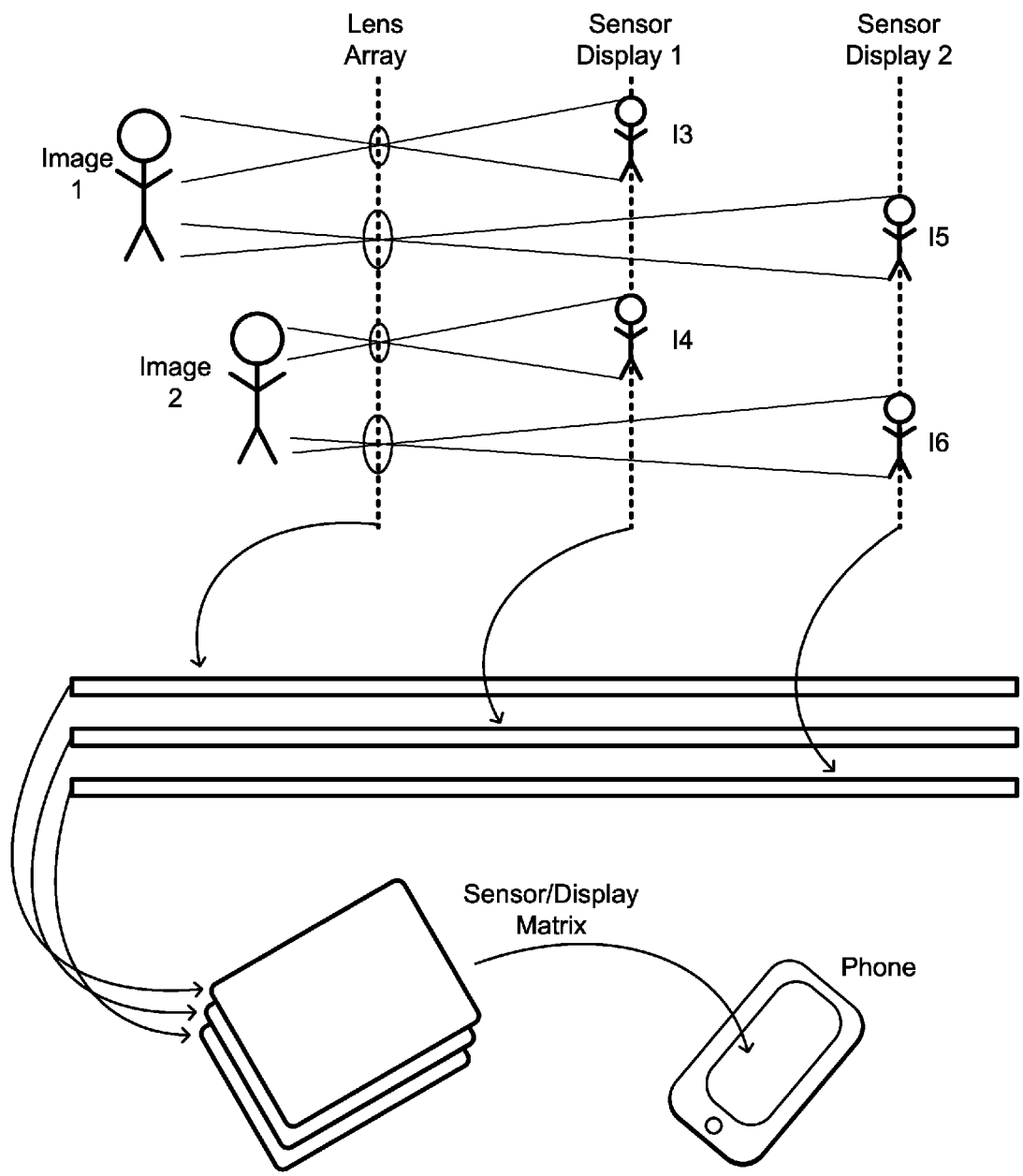

FIG. 60 shows a light field camera, in accordance with one embodiment.

Figure 61:
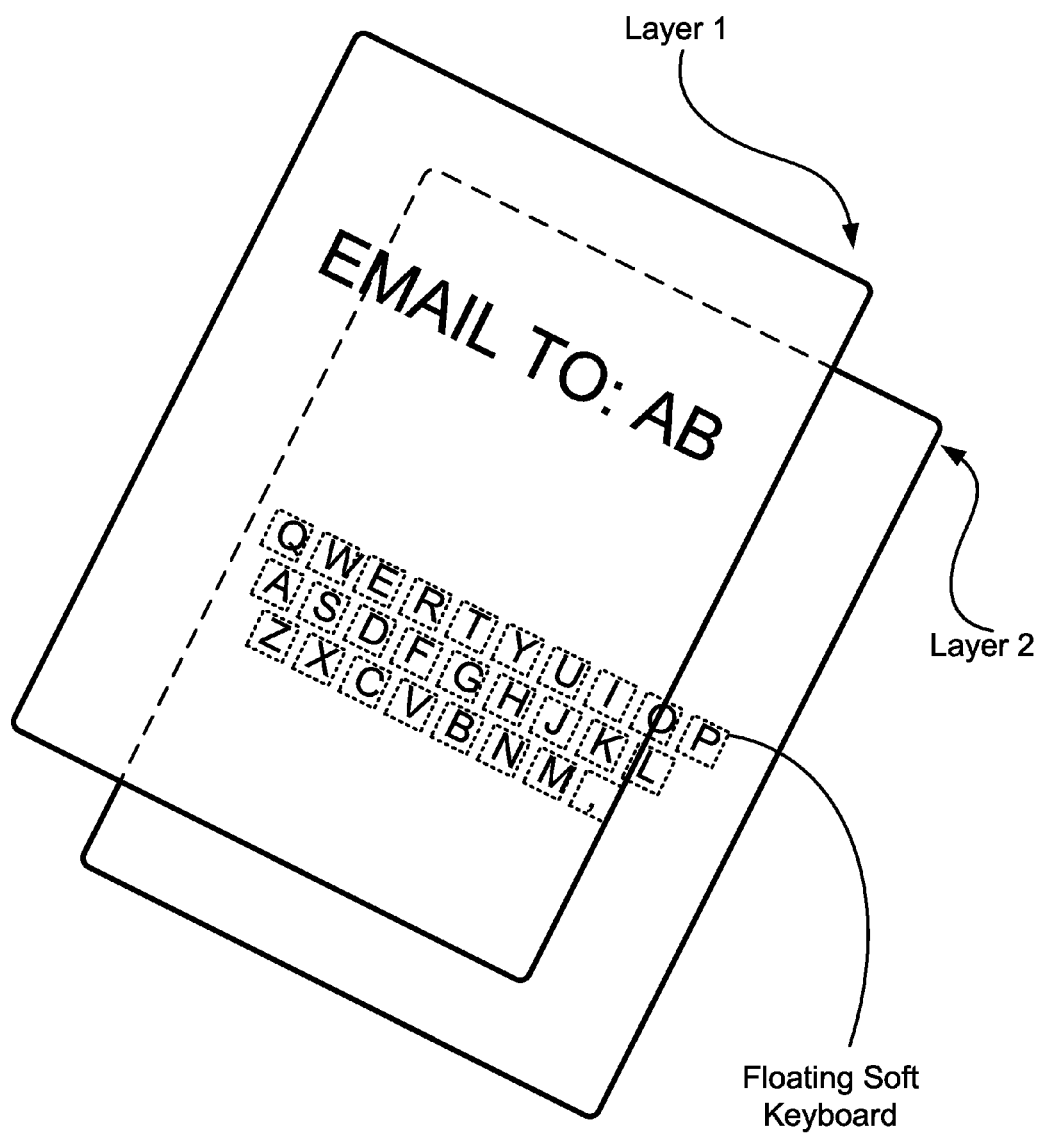

FIG. 61 shows a 3D layered user interface with a floating soft keyboard, in accordance with one embodiment.

Figure 62:
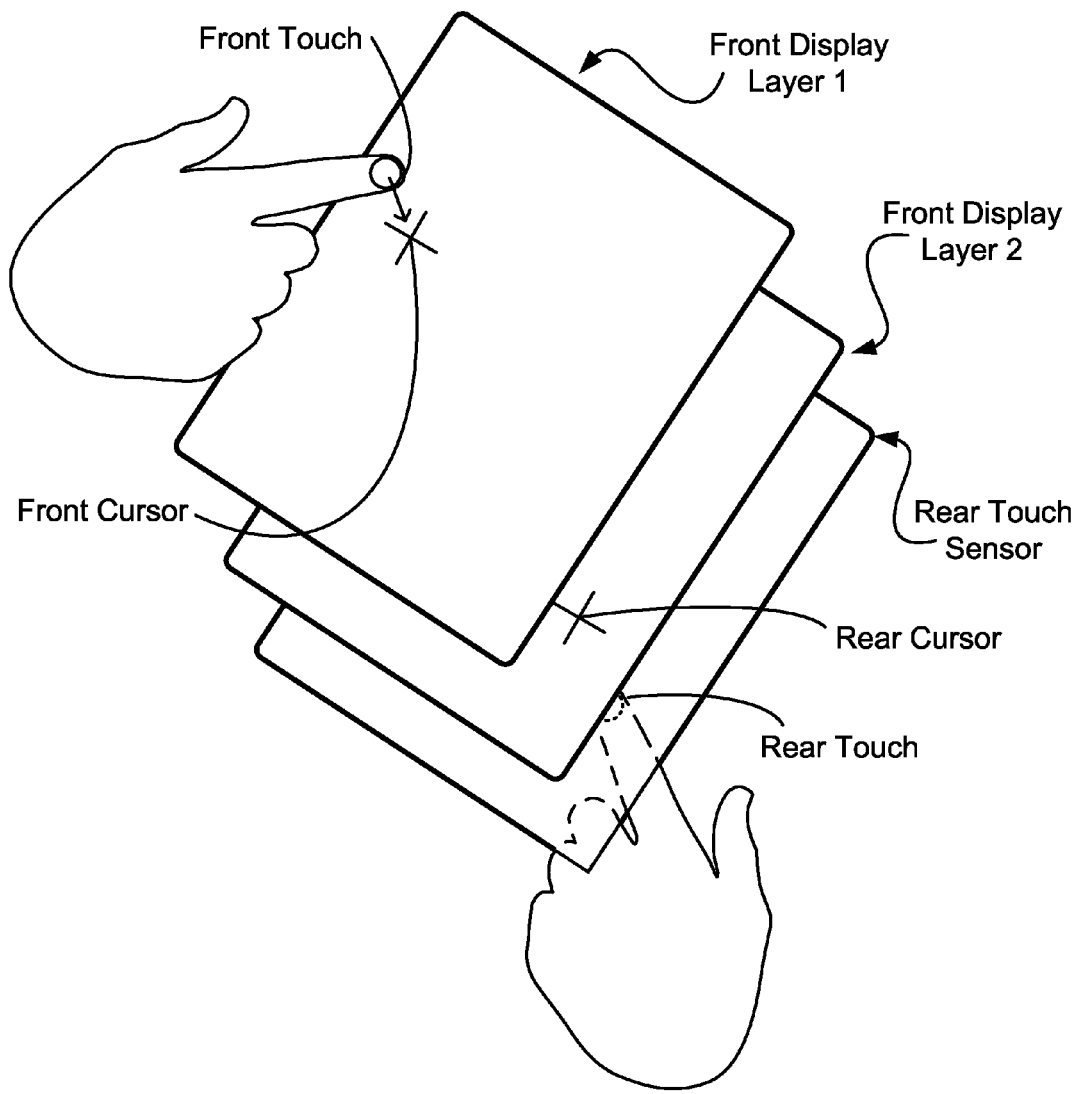

FIG. 62 shows a backtouch enabled 3D layered user interface, in accordance with one embodiment.

Figure 63:
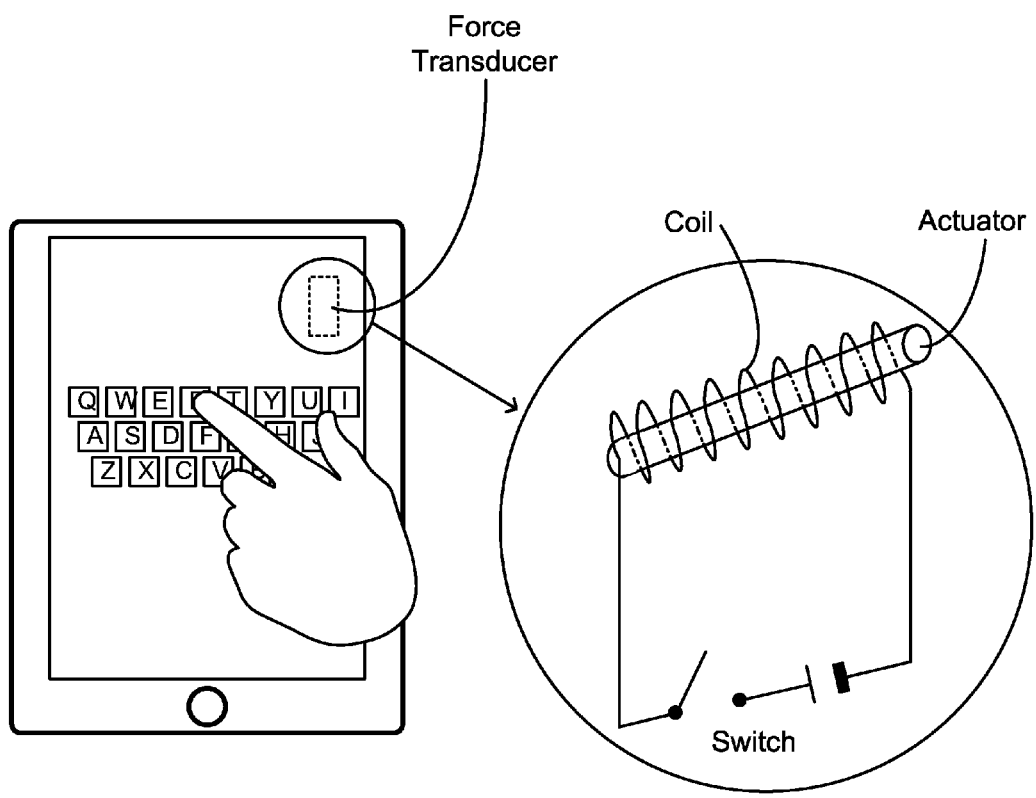

FIG. 63 shows a tactile feedback enabled display, in accordance with one embodiment.

Figure 64:
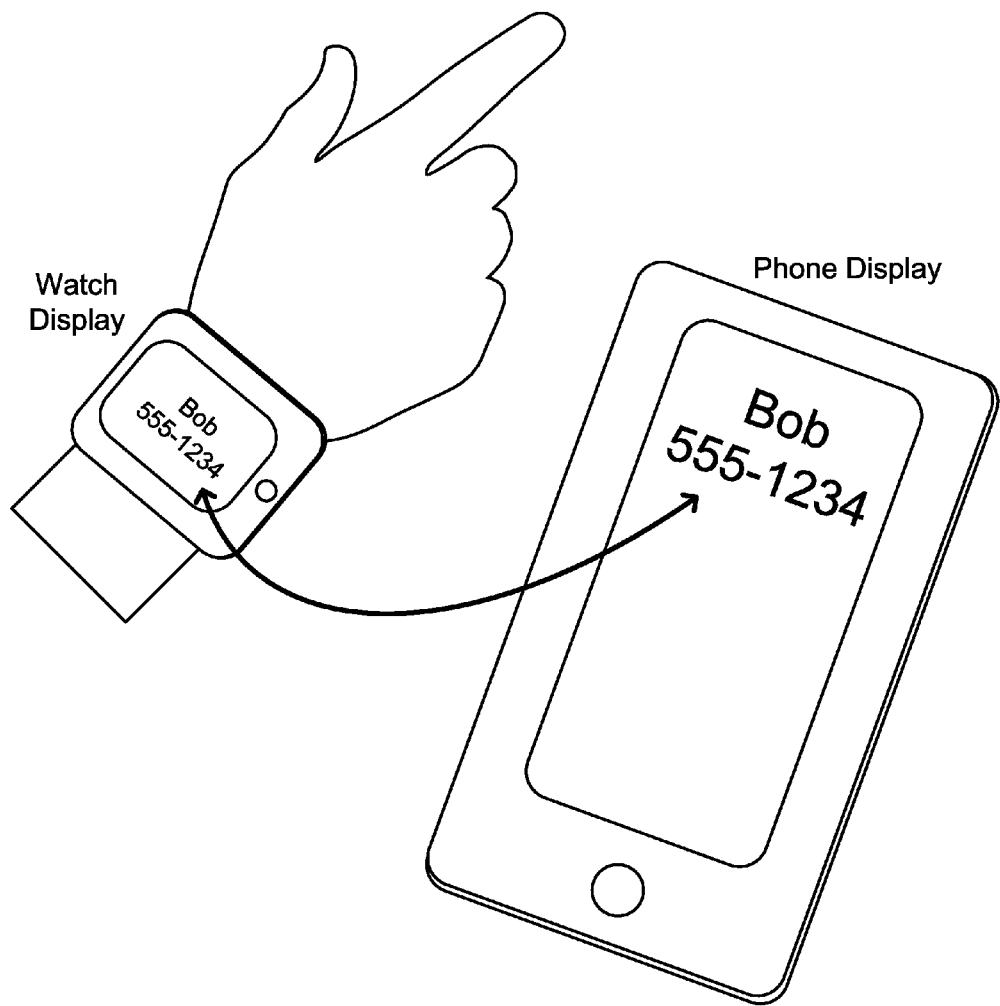

FIG. 64 shows a watch-based display extension, in accordance with one embodiment.

Figure 65:
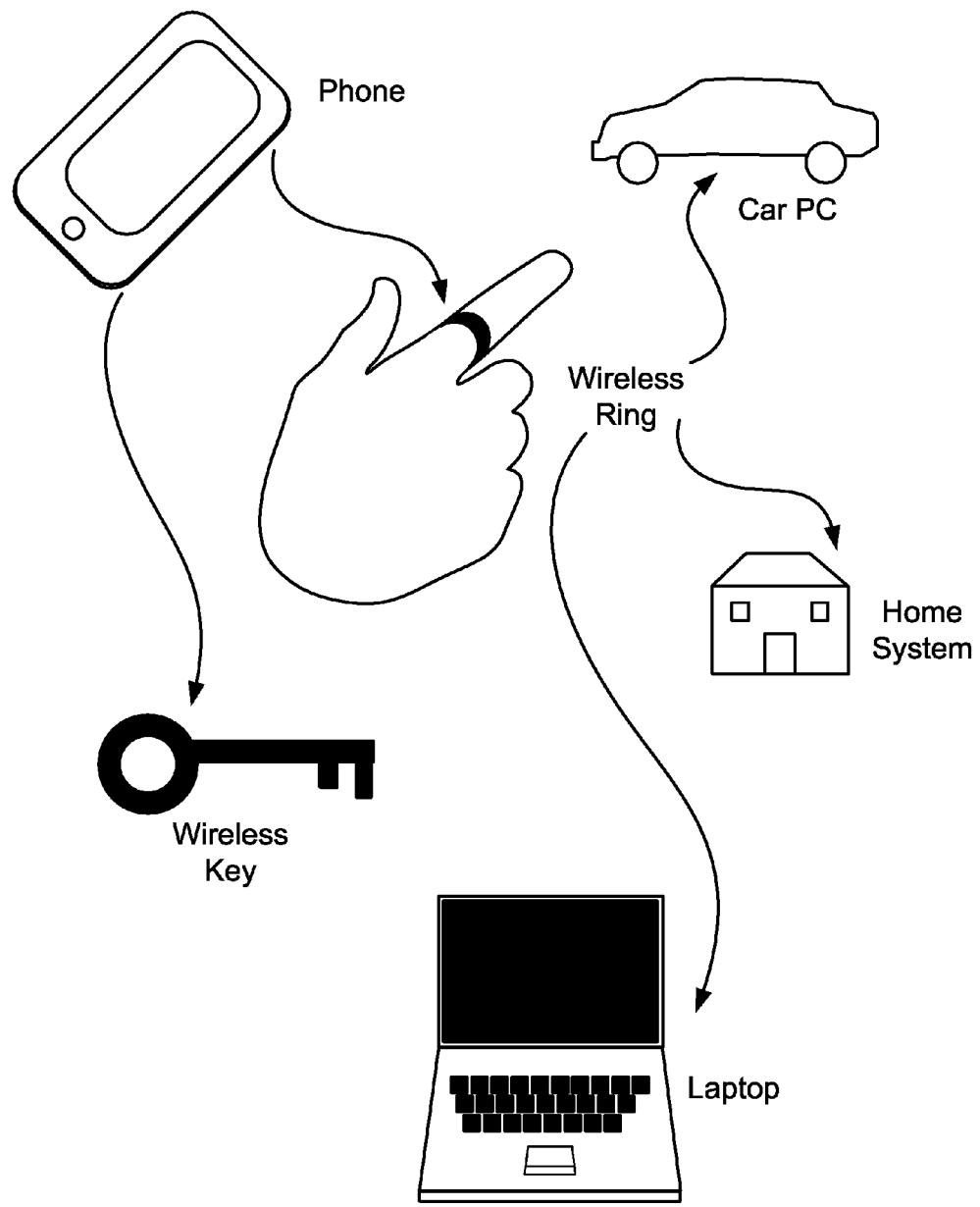

FIG. 65 shows a wireless storage ring and key, in accordance with one embodiment.

Figure 66:
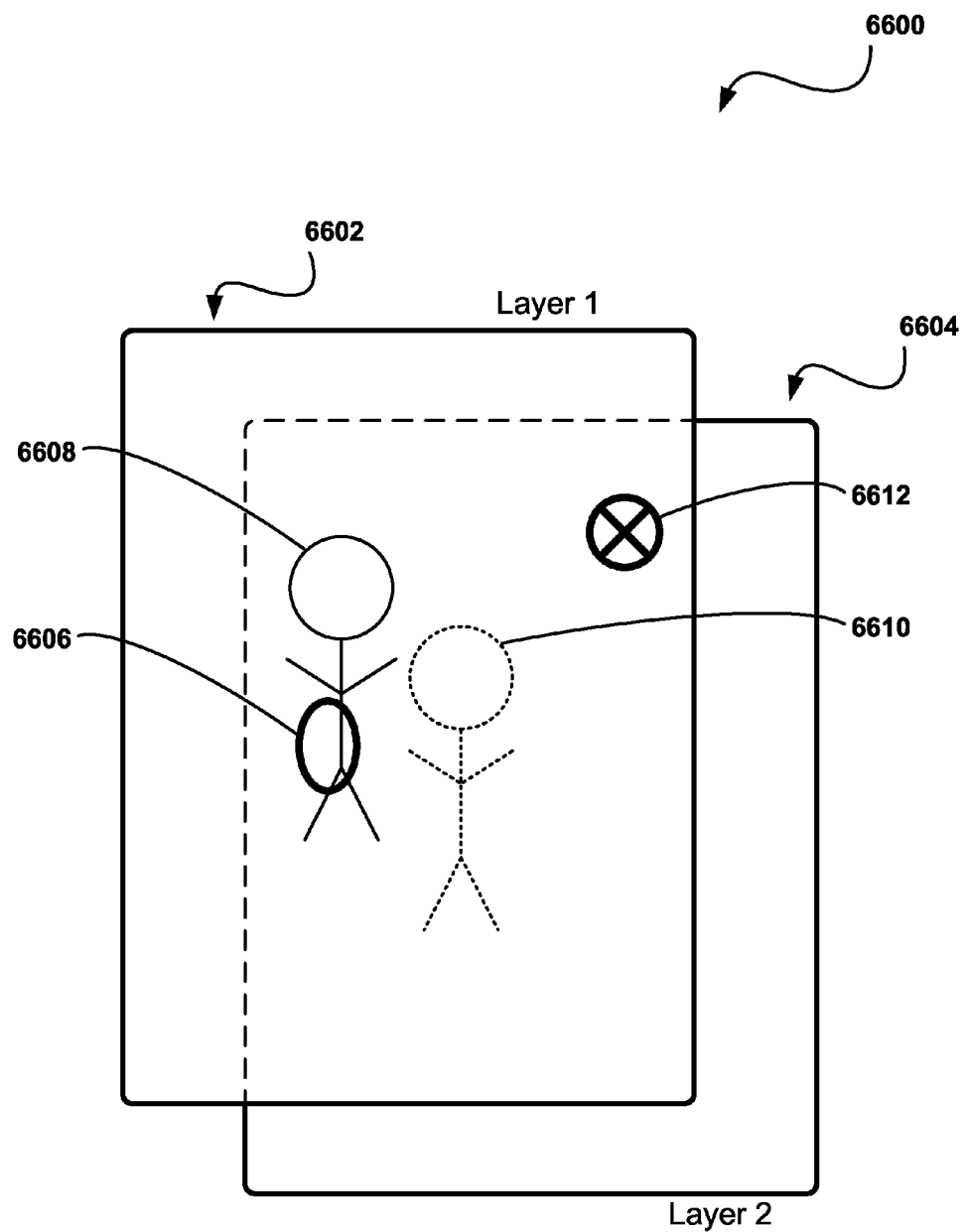

FIG. 66 shows a 3D layered user interface having a clipboard layer, in accordance with one embodiment.

Figure 67:
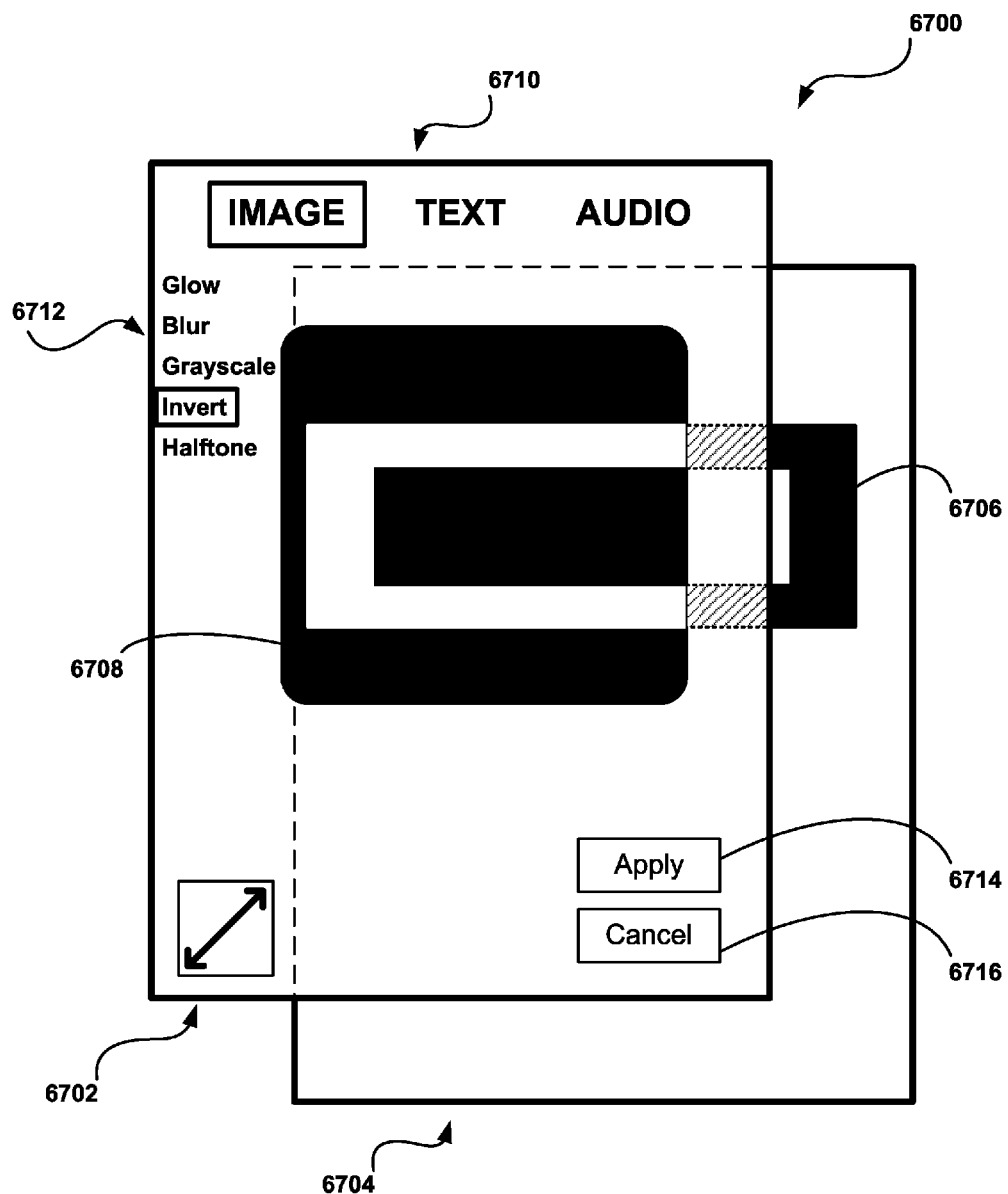

FIG. 67 shows a 3D layered user interface having an operation layer, in accordance with one embodiment.

Figure 68:
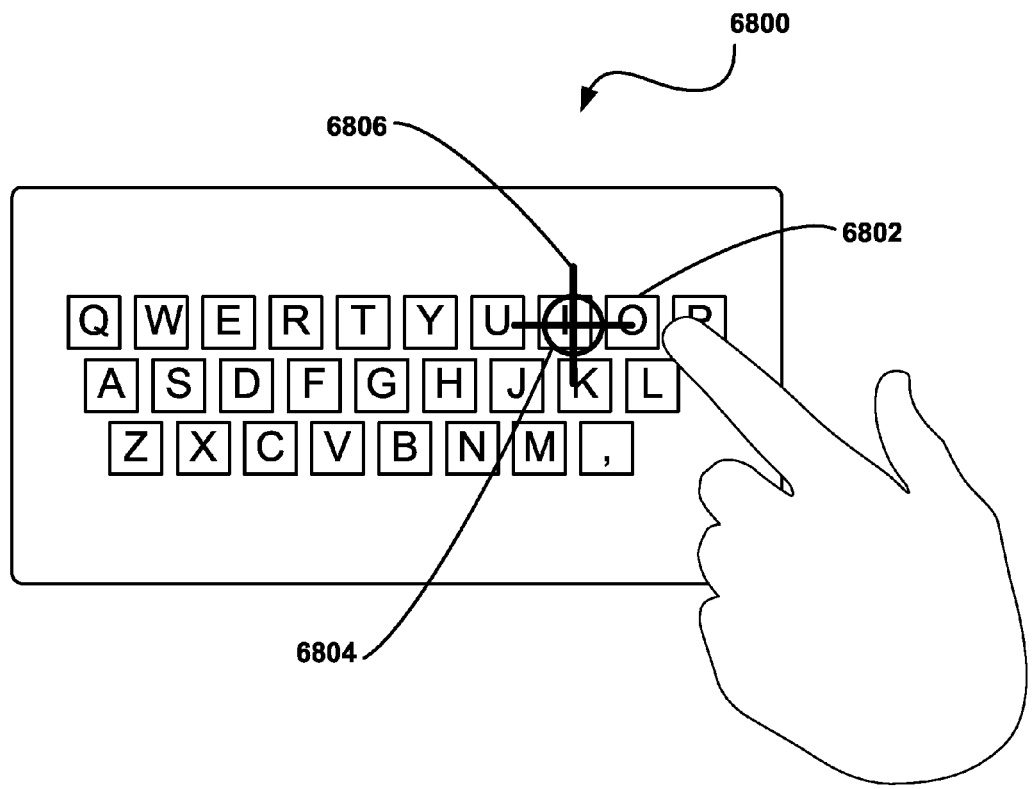

FIG. 68 shows a user interface for providing touch feedback, in accordance with one embodiment.

Figure 69:
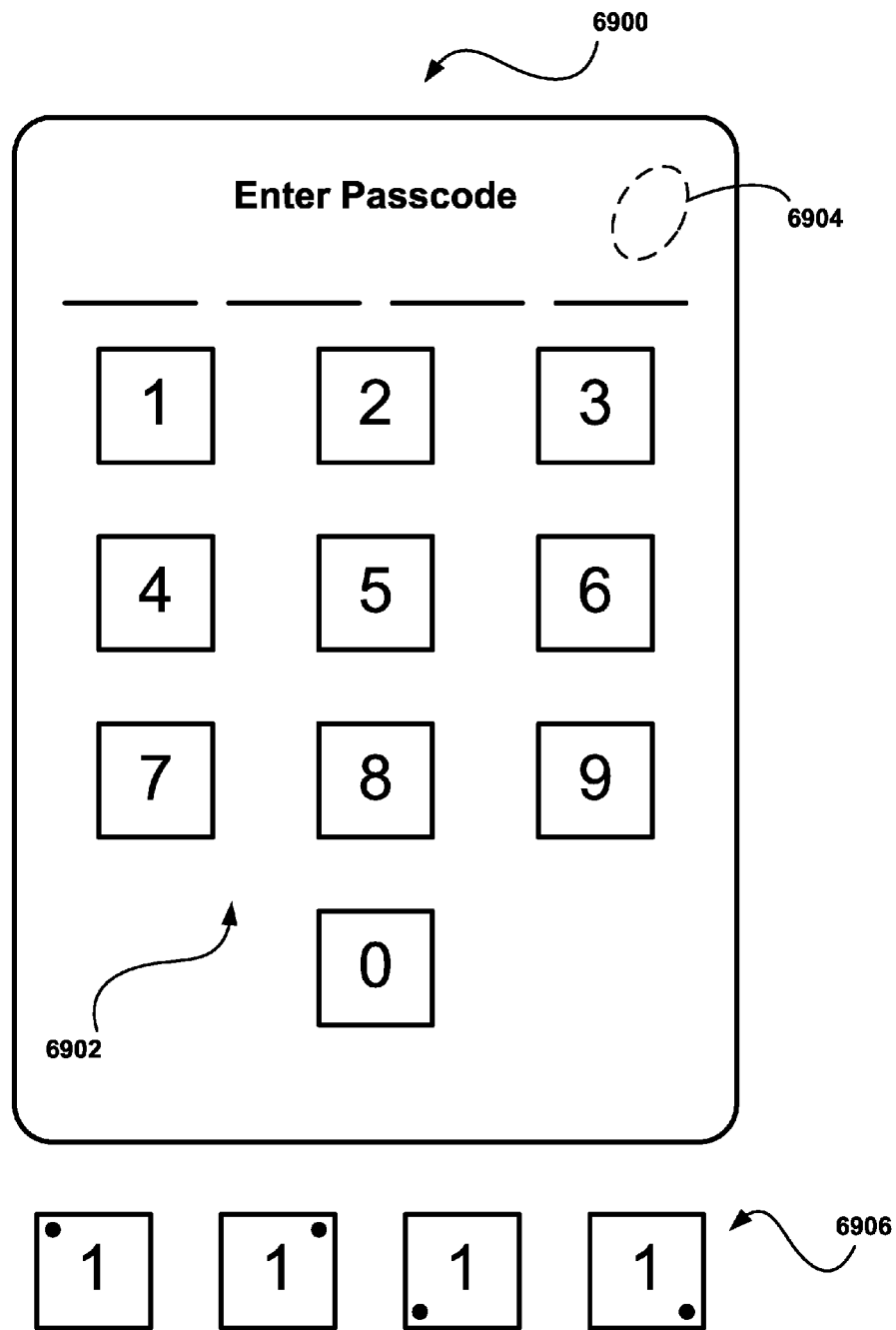

FIG. 69 shows a user interface for providing increased security, in accordance with one embodiment.

Figure 70:
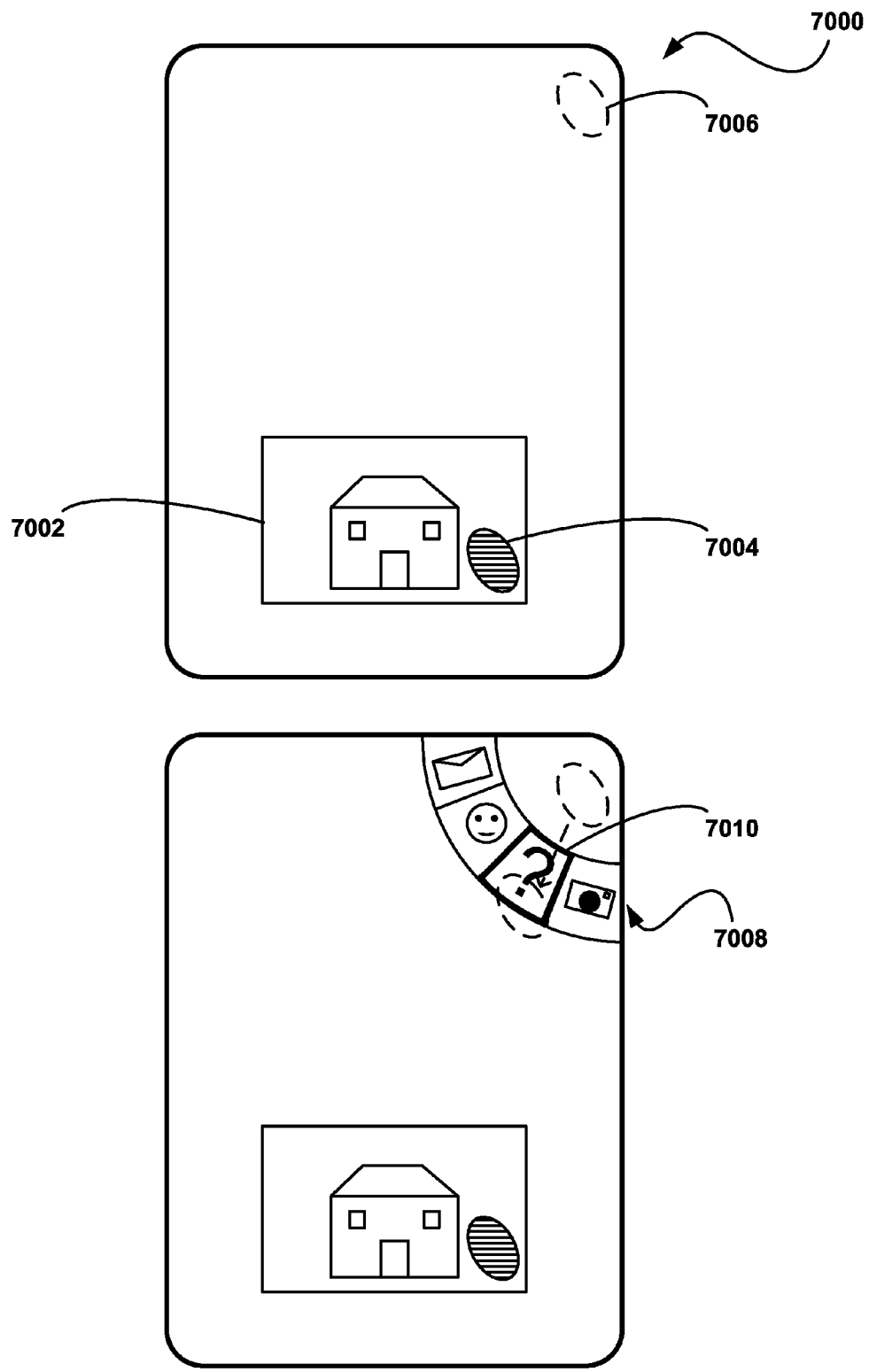

FIG. 70 shows a user interface for presenting a contextual menu, in accordance with one embodiment.

Figures 1A, 71:
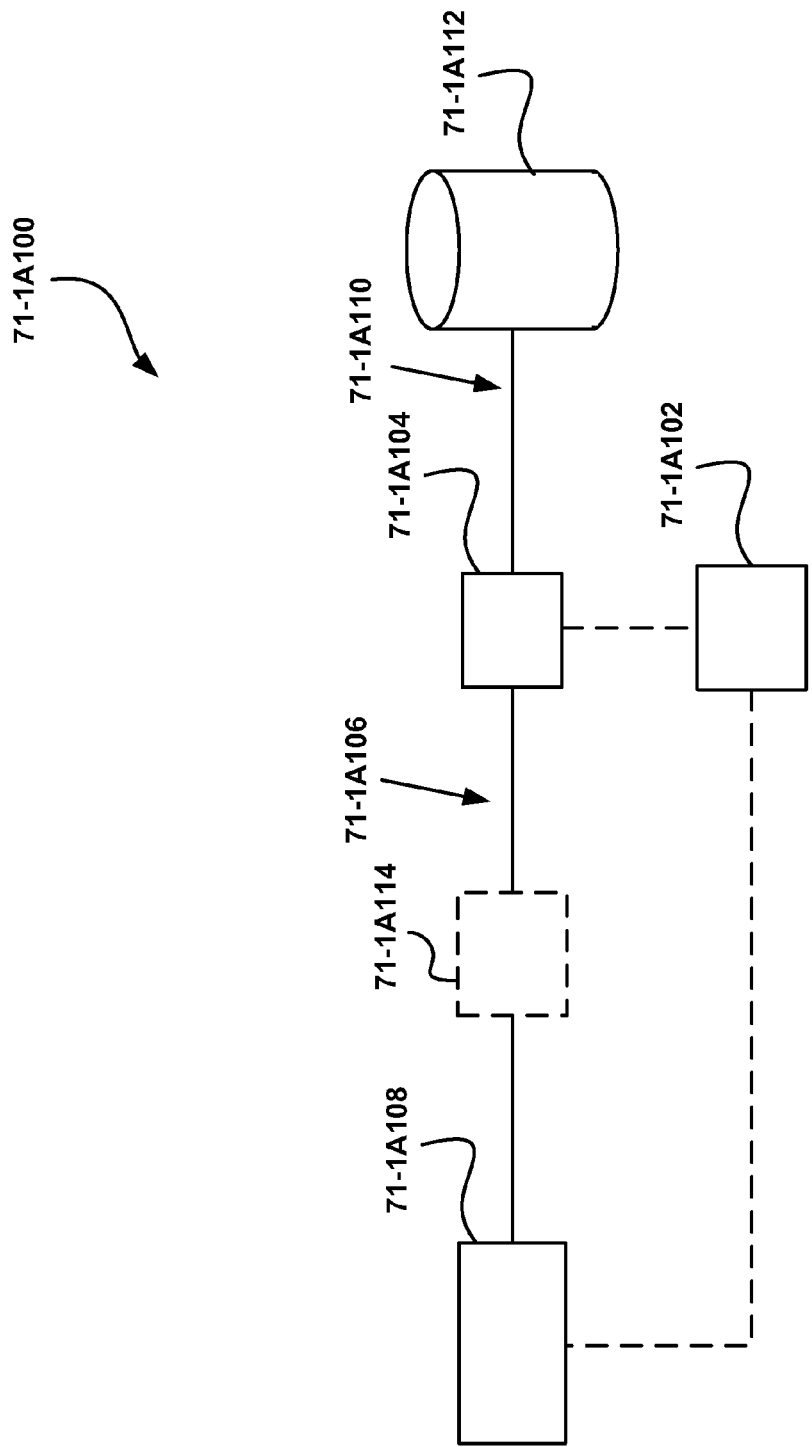

FIG. 71-1A shows a system for modifying one or more objects in one or more memory devices, in accordance with one embodiment.

Figures 1B, 71:
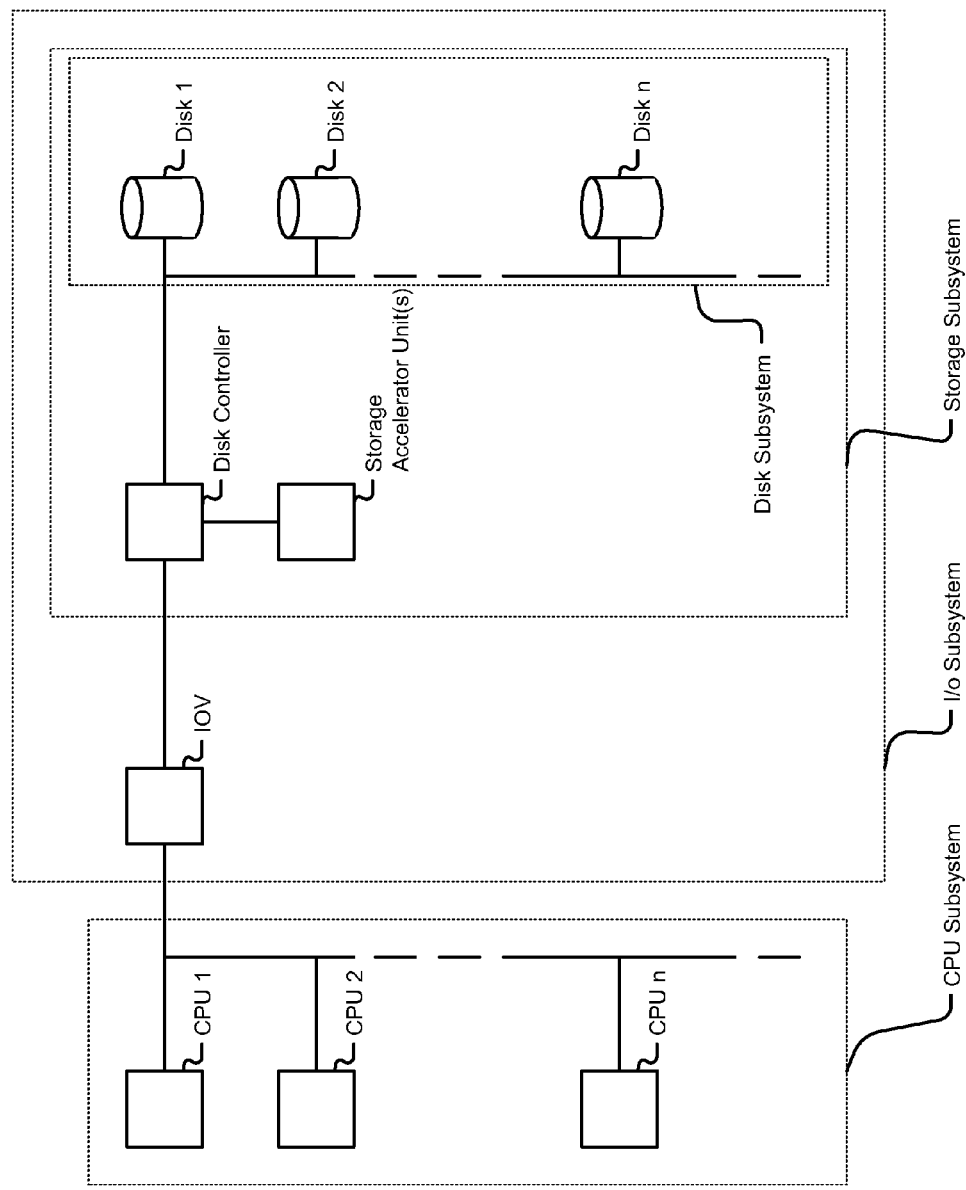
Figures 1, 1B, 71:
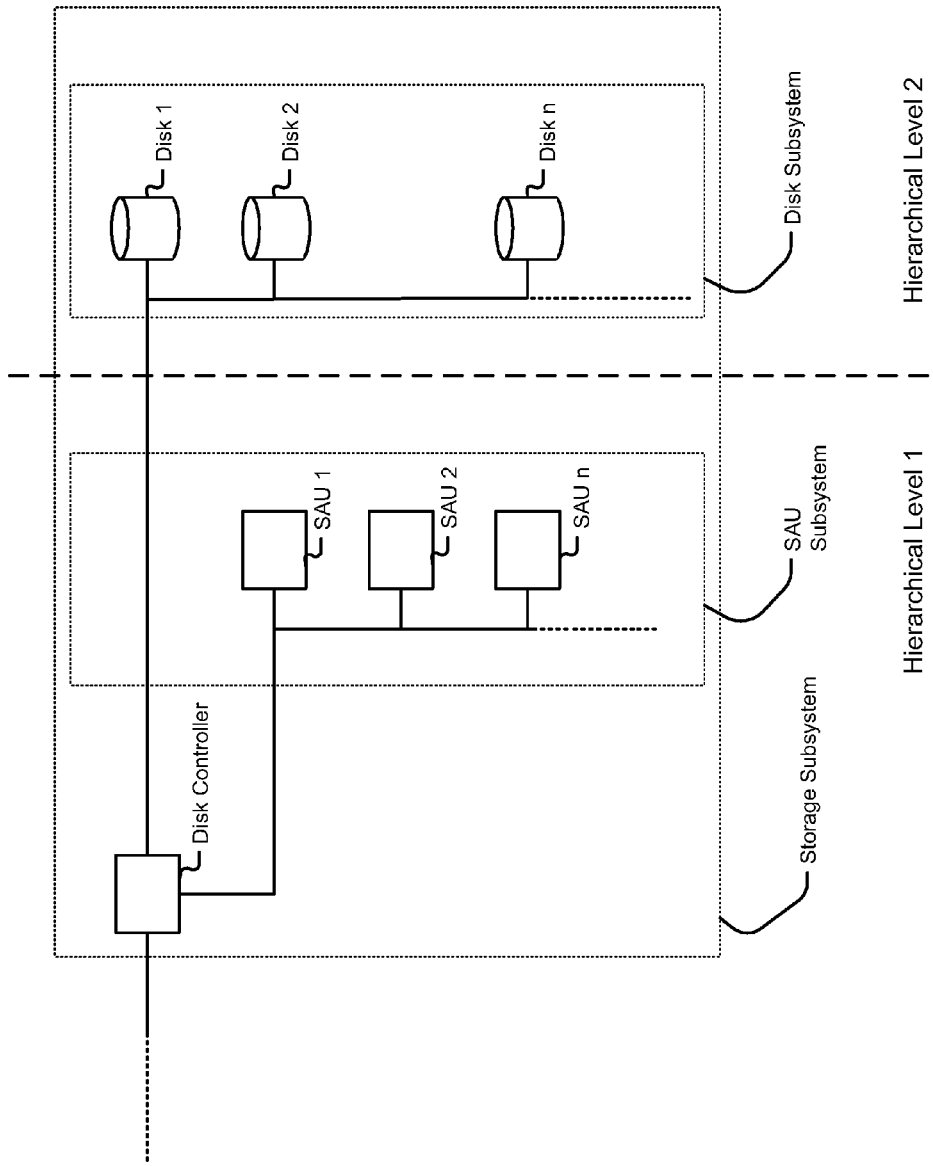

FIG. 71-1B shows a computer system comprising a hierarchical storage system that includes a storage accelerator unit (SAU), in accordance with one embodiment.

FIG. 71-1B-1 shows a computer system comprising a hierarchical storage system that includes a storage accelerator unit, in accordance with one embodiment.

Figures 1C, 71:
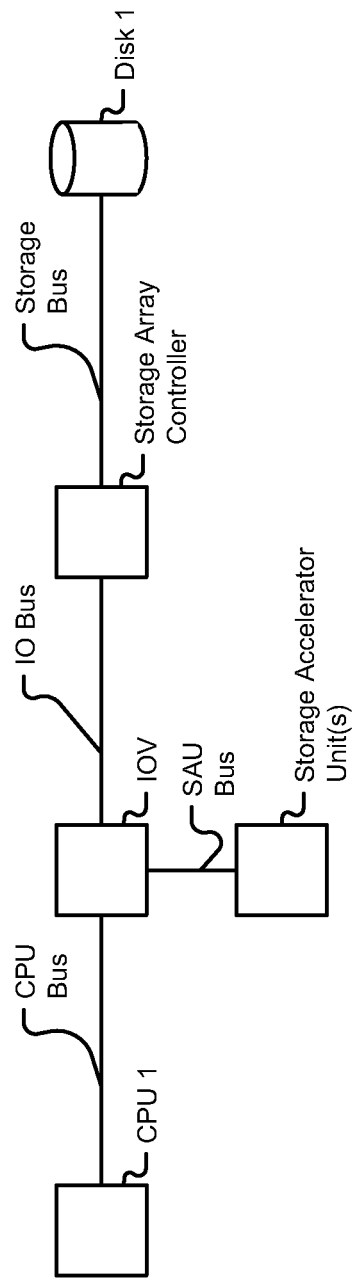

FIG. 71-1C shows a computer system comprising a hierarchical storage system that includes a storage accelerator unit coupled to a CPU, in accordance with one embodiment.

Figures 1D, 71:
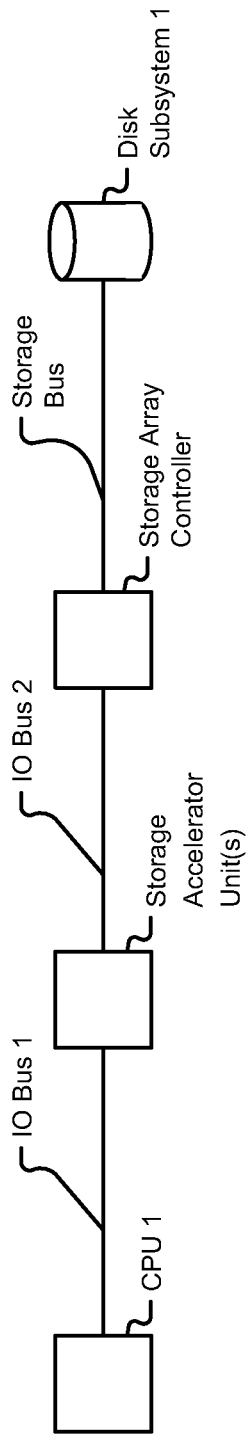

FIG. 71-1D shows a computer system comprising a hierarchical storage system that includes a storage accelerator unit coupled inline, in accordance with one embodiment.

Figures 1E, 71:
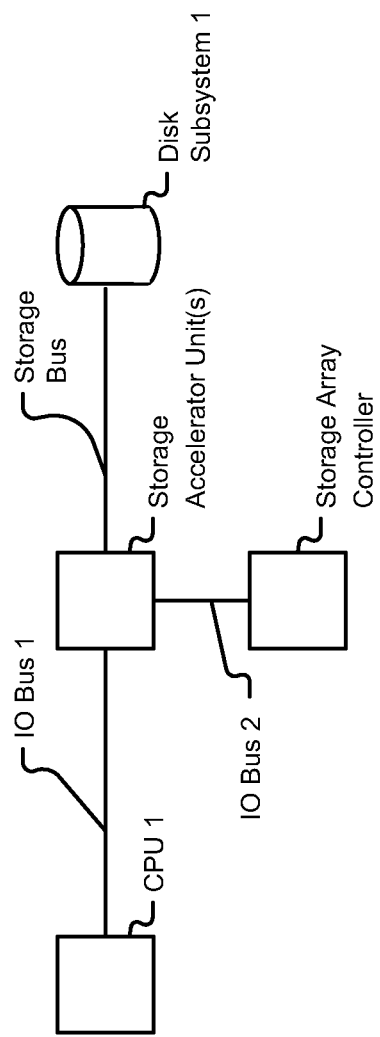

FIG. 71-1E shows a computer system comprising a hierarchical storage system that includes a storage accelerator unit coupled to a CPU and to a disk subsystem, in accordance with one embodiment.

Figures 1F, 71:
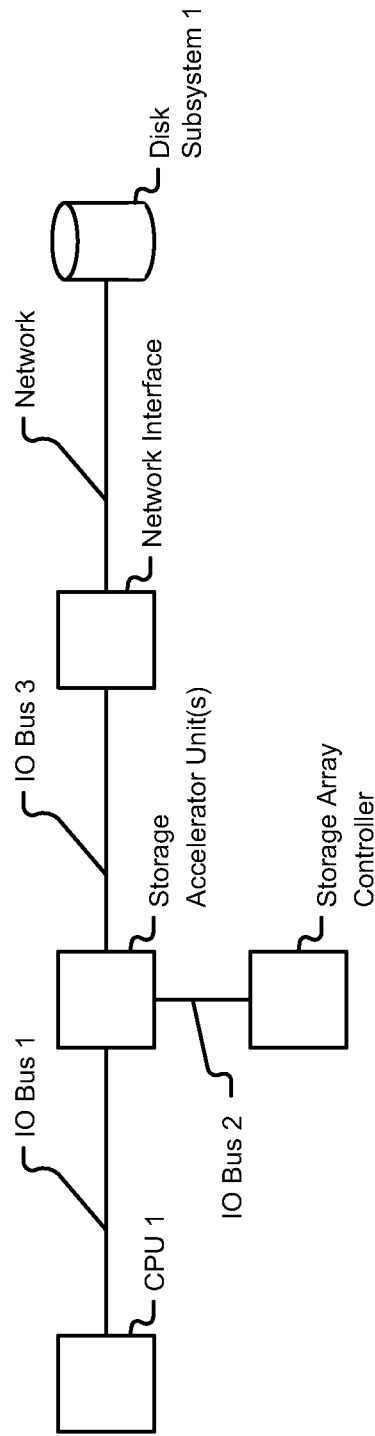
Figures 2, 71:
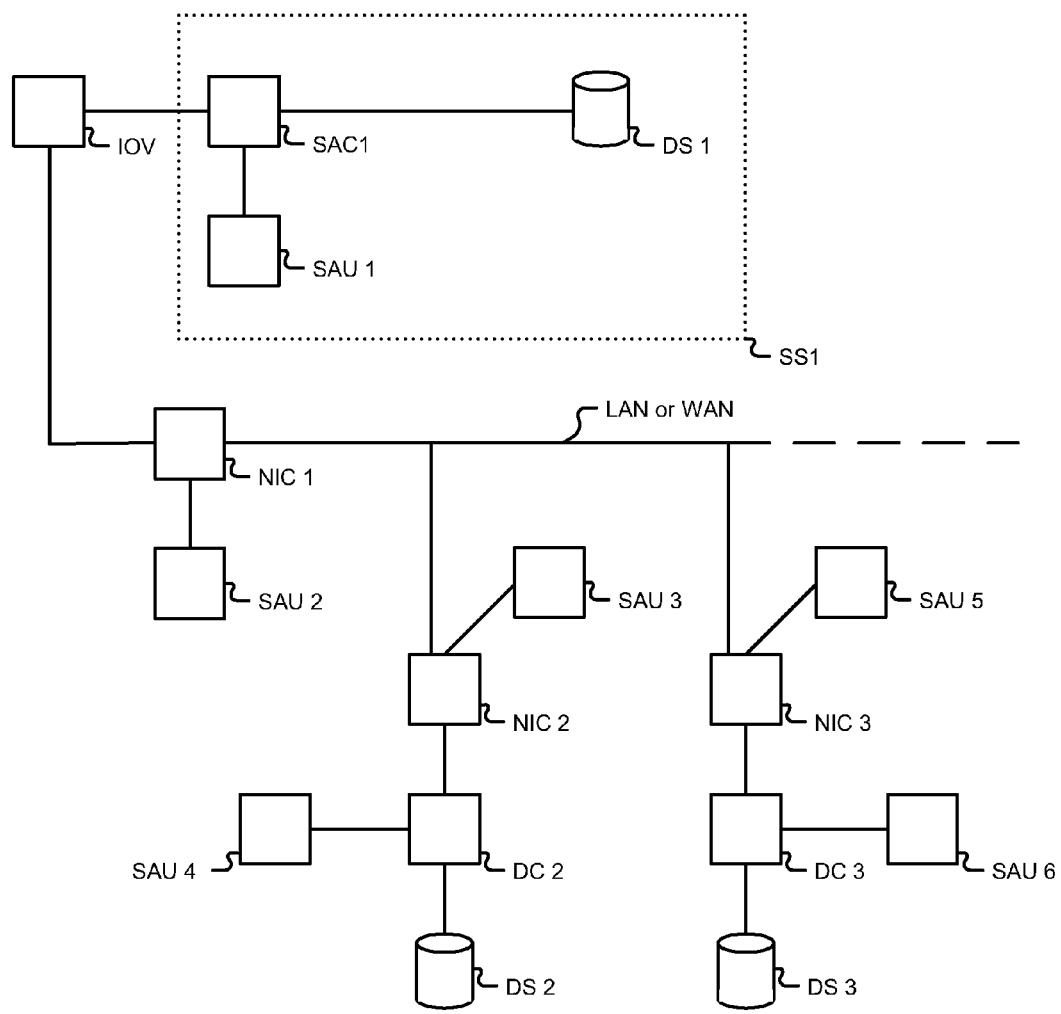

FIG. 71-1F shows a computer system comprising a hierarchical storage system that includes a storage accelerator unit coupled to a CPU and a network interface, in accordance with one embodiment.

FIG. 71-2 shows a networked hierarchical storage system, in accordance with one embodiment.

Figures 3A, 71:
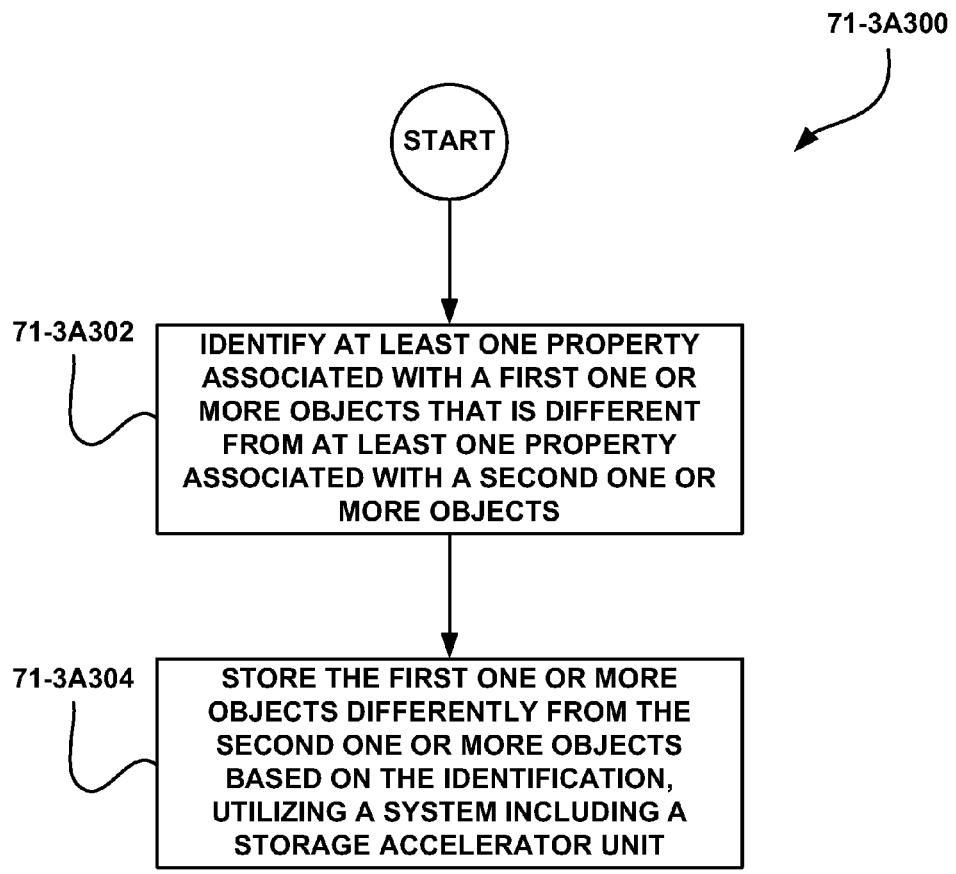

FIG. 71-3A shows a method for storing a first one or more objects differently from a second one or more objects based on the identification, in accordance with one embodiment.

Figures 3B, 71:
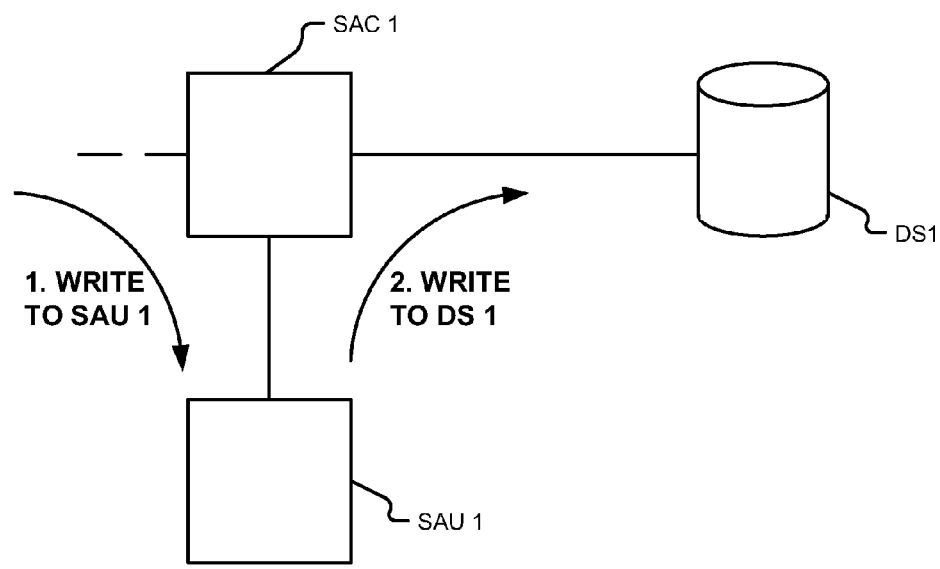

FIG. 71-3B shows a use of a hierarchical storage system, including a write storage accelerator unit, implementing intermediate write commands, in accordance with one embodiment.

Figures 4A, 71:
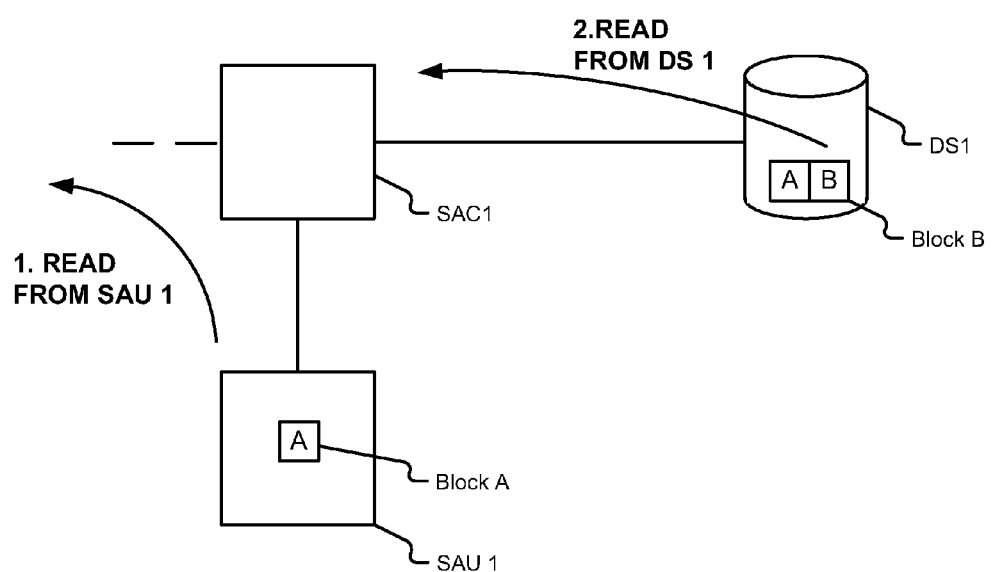

FIG. 71-4A shows a use of a hierarchical storage system, including a read storage accelerator unit, implementing intermediate read commands, in accordance with one embodiment.

Figures 4B, 71:
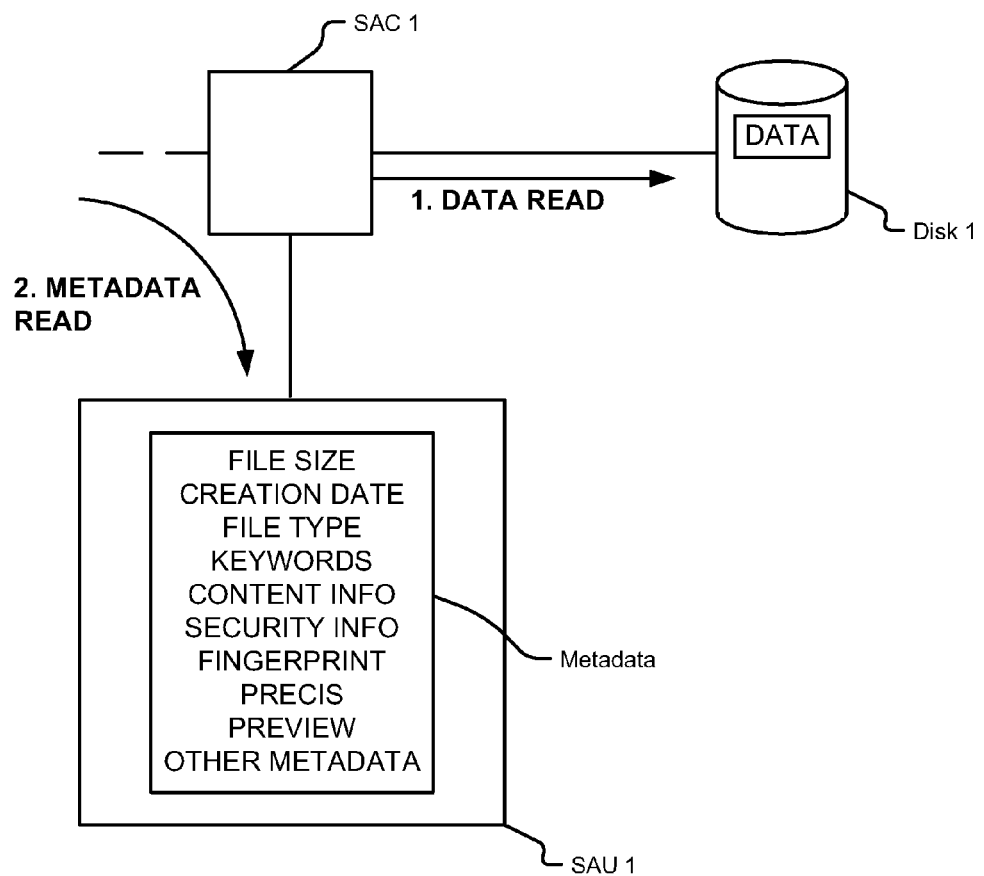

FIG. 71-4B shows a use of a hierarchical storage system implementing acceleration of metadata storage, in accordance with one embodiment.

Figures 5A, 71:
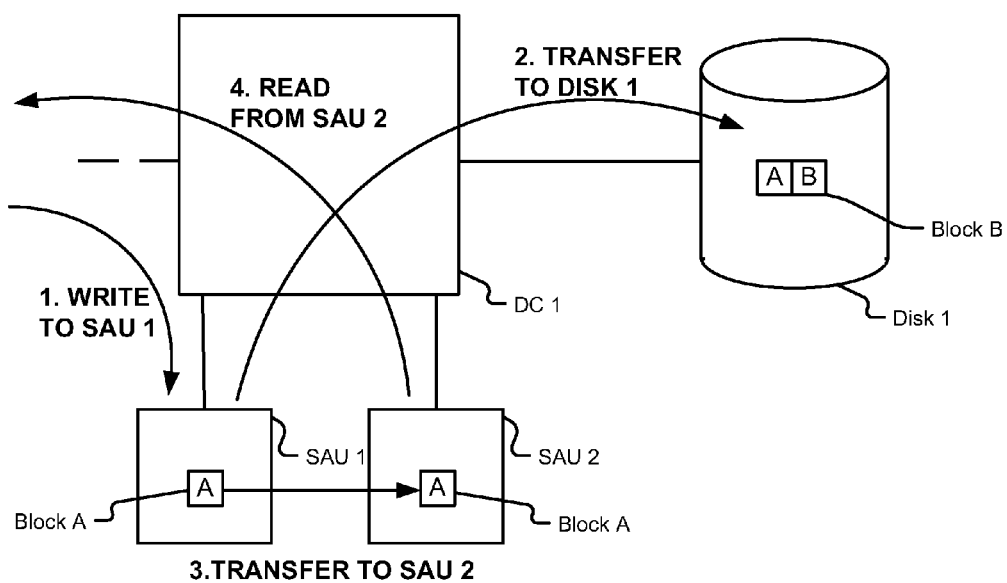

FIG. 71-5A shows a multiple storage accelerator unit storage subsystem including two storage accelerator units contained at the same level of storage subsystem hierarchy, in accordance with one embodiment.

Figures 5B, 71:
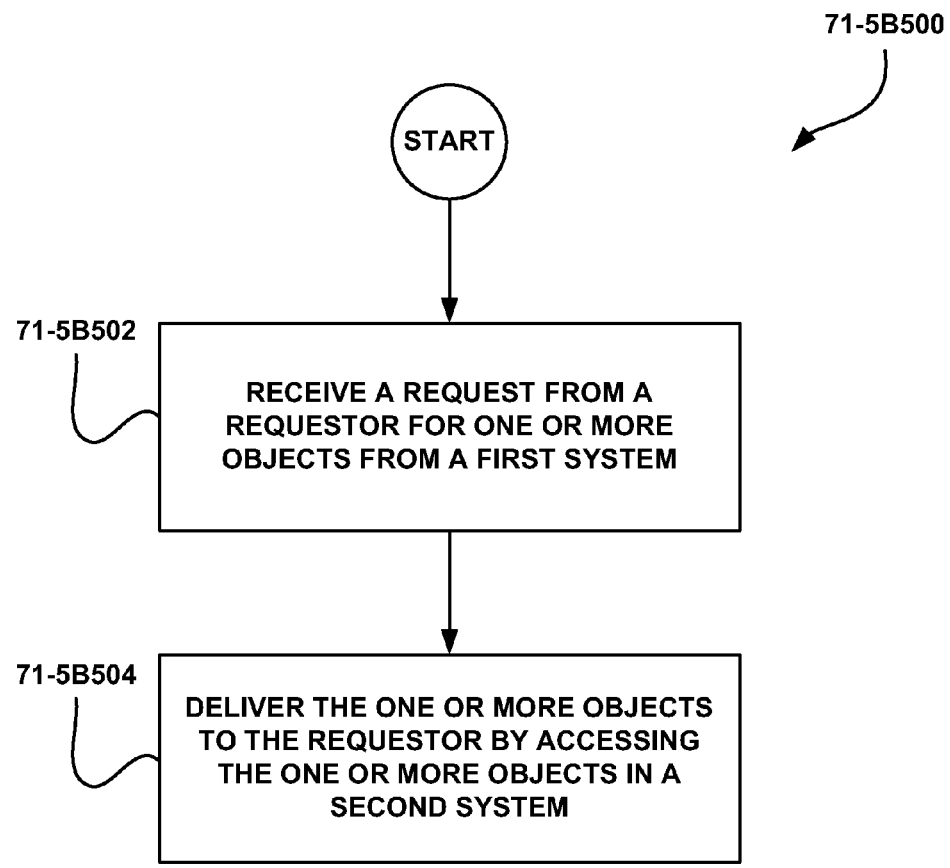

FIG. 71-5B shows a method for delivering one or more objects to a requestor, in accordance with one embodiment.

Figures 5C, 71:
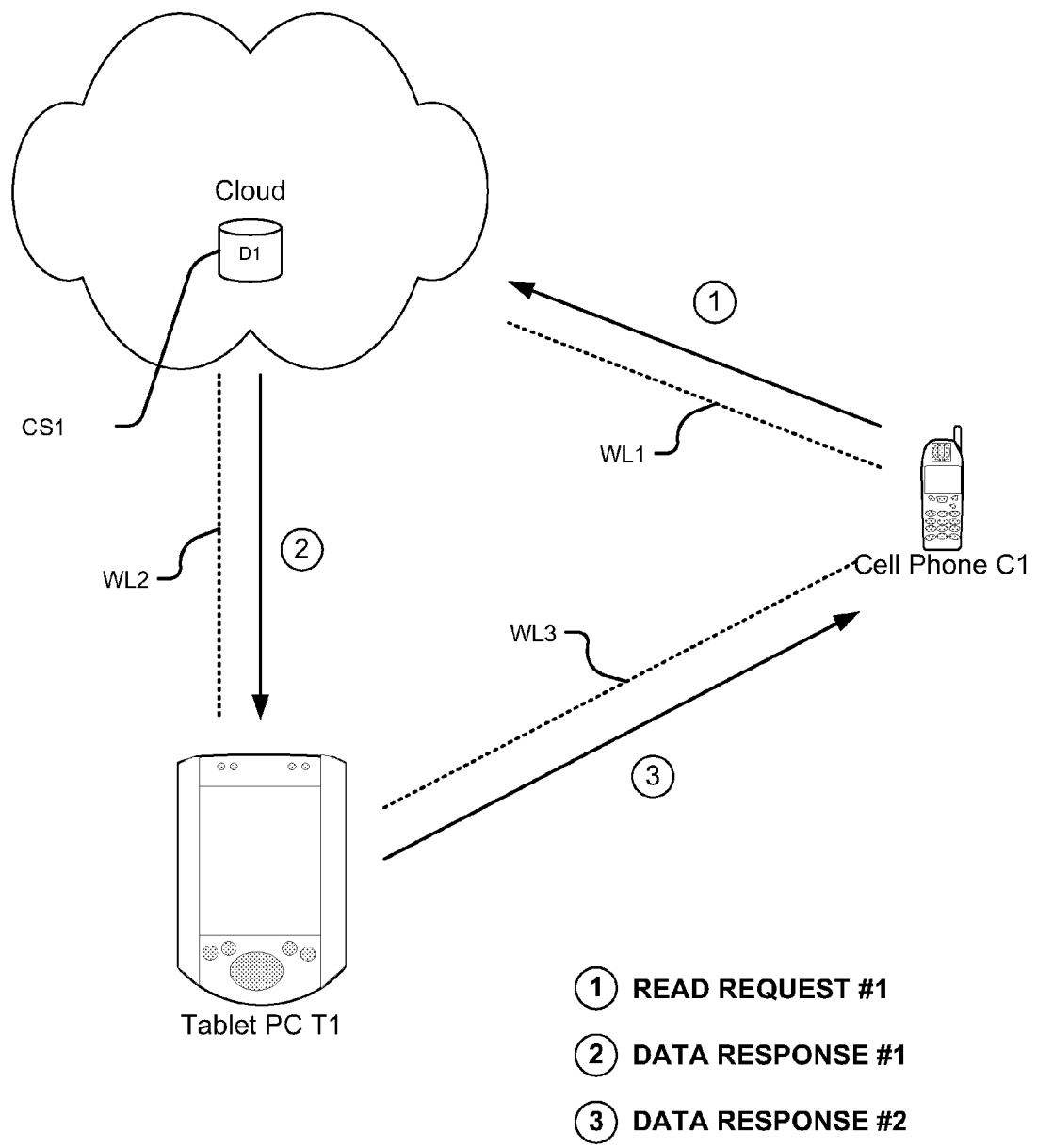

FIG. 71-5C shows a use of a hierarchical storage system implementing proxy storage acceleration, in accordance with one embodiment.

Figures 5D, 71:
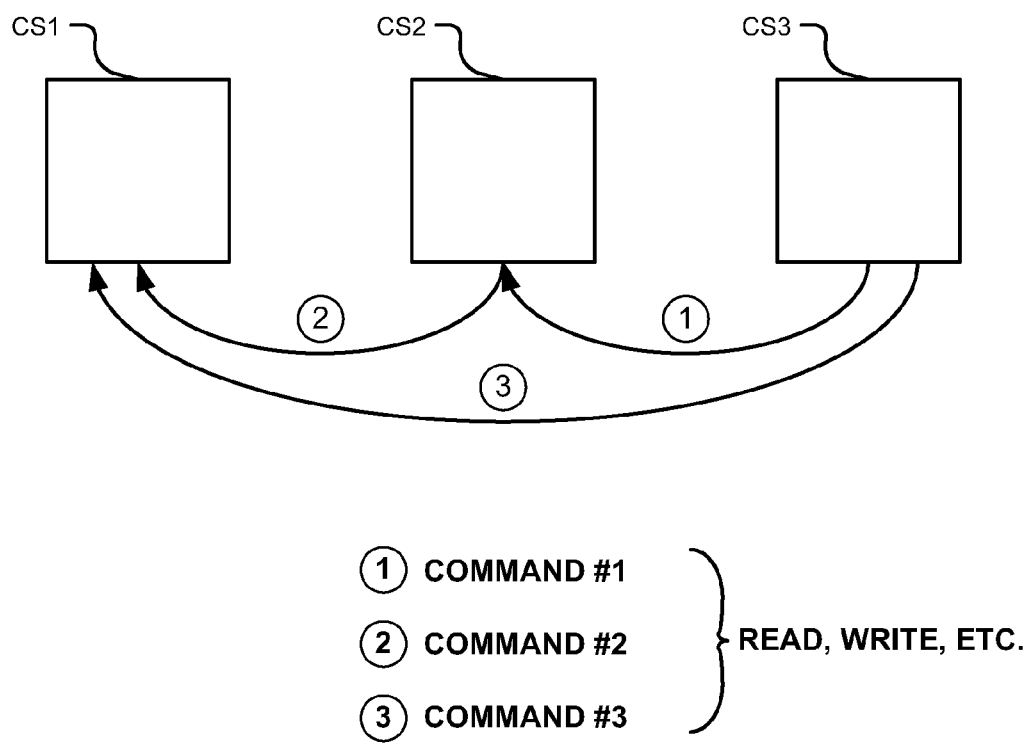
Figures 6, 71:
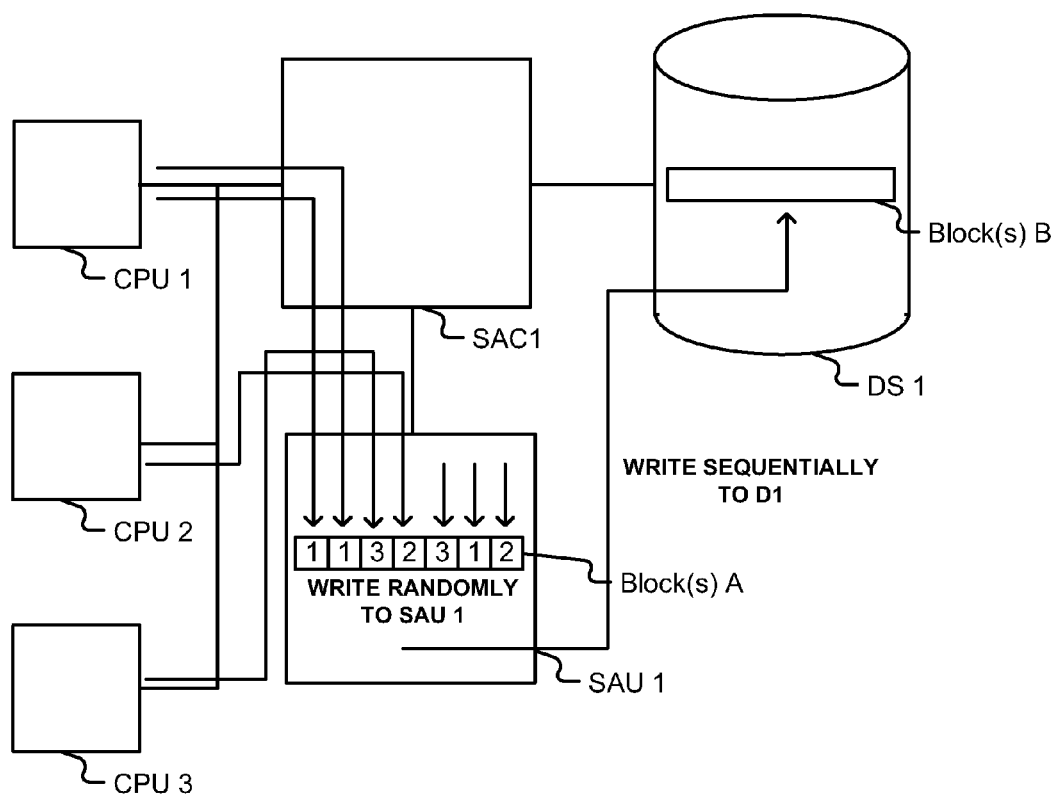
Figures 7, 71:
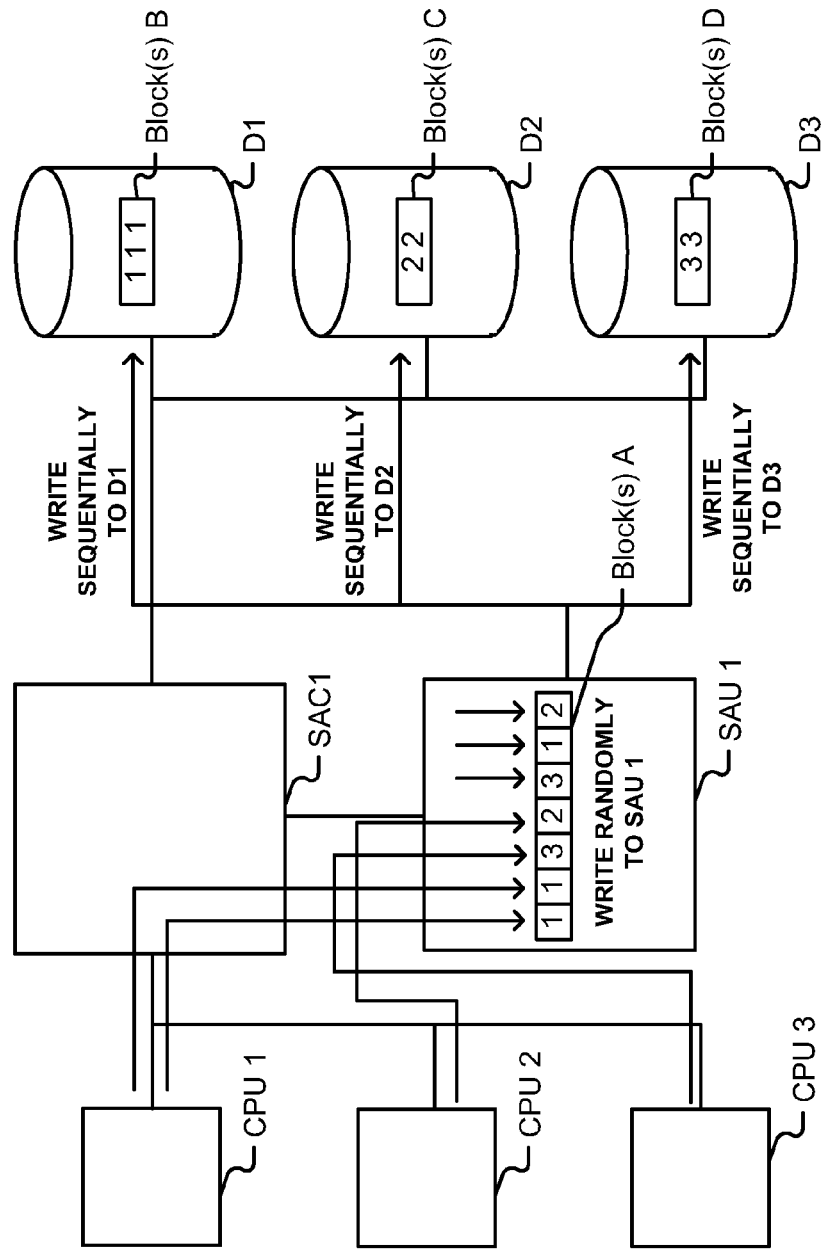
Figures 8, 71:
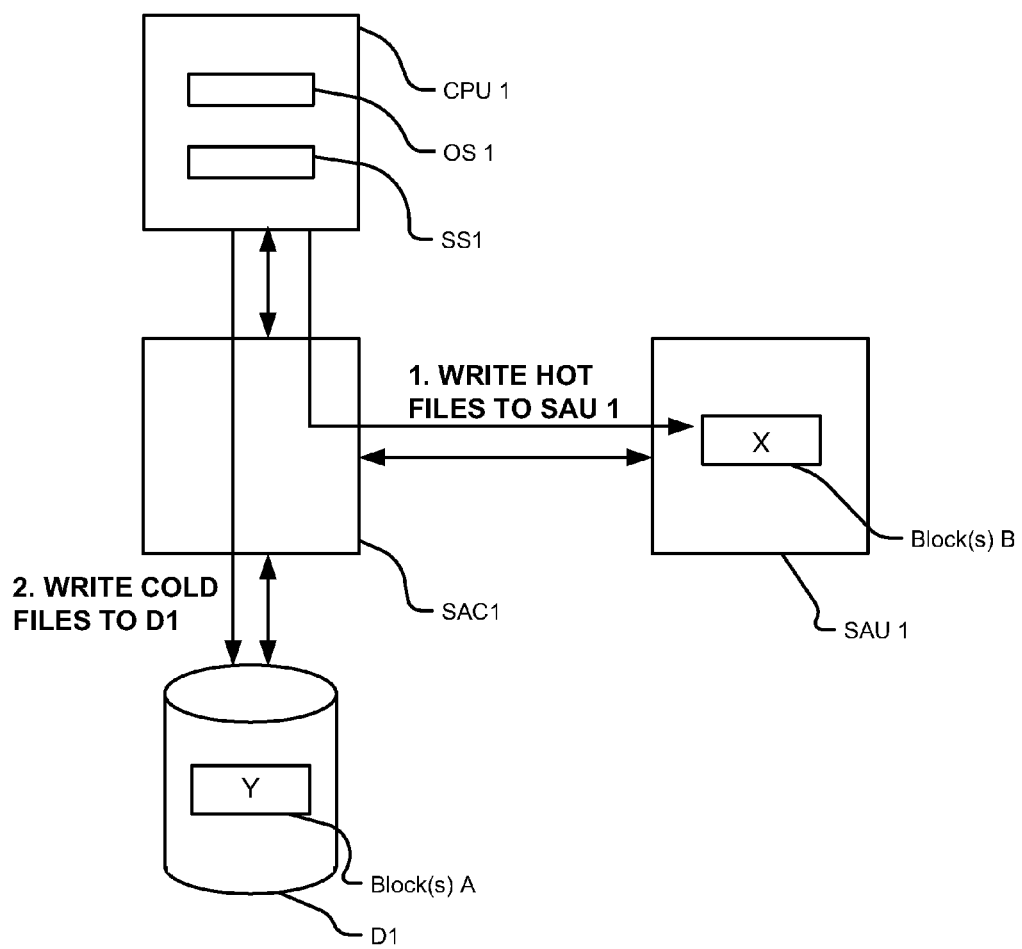

FIG. 71-5D shows a use of a system implementing command virtualization and acceleration, in accordance with one embodiment.

FIG. 71-6 shows a hierarchical storage system implementing a method for sequentializing write commands from a plurality of CPUs, in accordance with one embodiment.

FIG. 71-7 shows a hierarchical storage system implementing a method for sequentializing write commands from a plurality of CPUs, in accordance with one embodiment.

FIG. 71-8 shows a hierarchical storage system integrated with the operating system, implementing a method of prioritizing files and data, in accordance with one embodiment.

Figures 9A, 71:
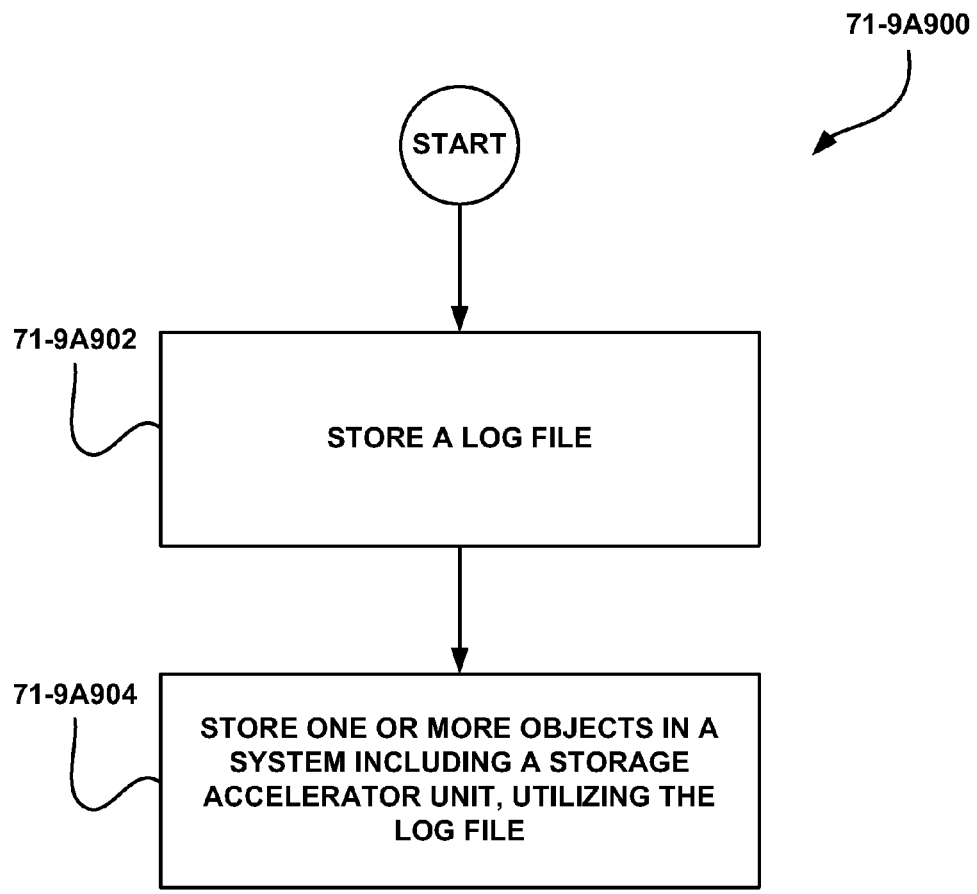

FIG. 71-9A shows a method for storing one or more objects in a system including a storage accelerator unit, in accordance with one embodiment.

Figures 9B, 71:
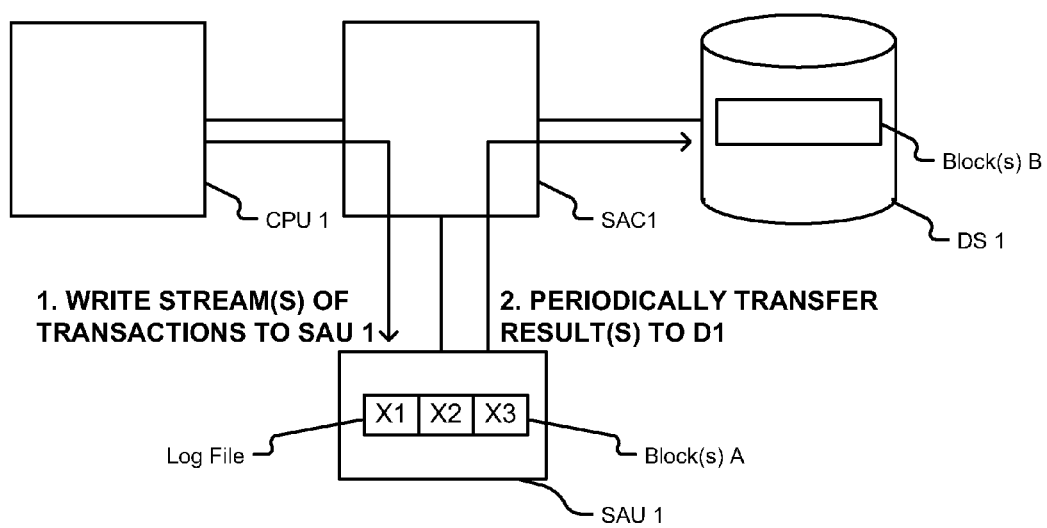
Figures 10, 71:
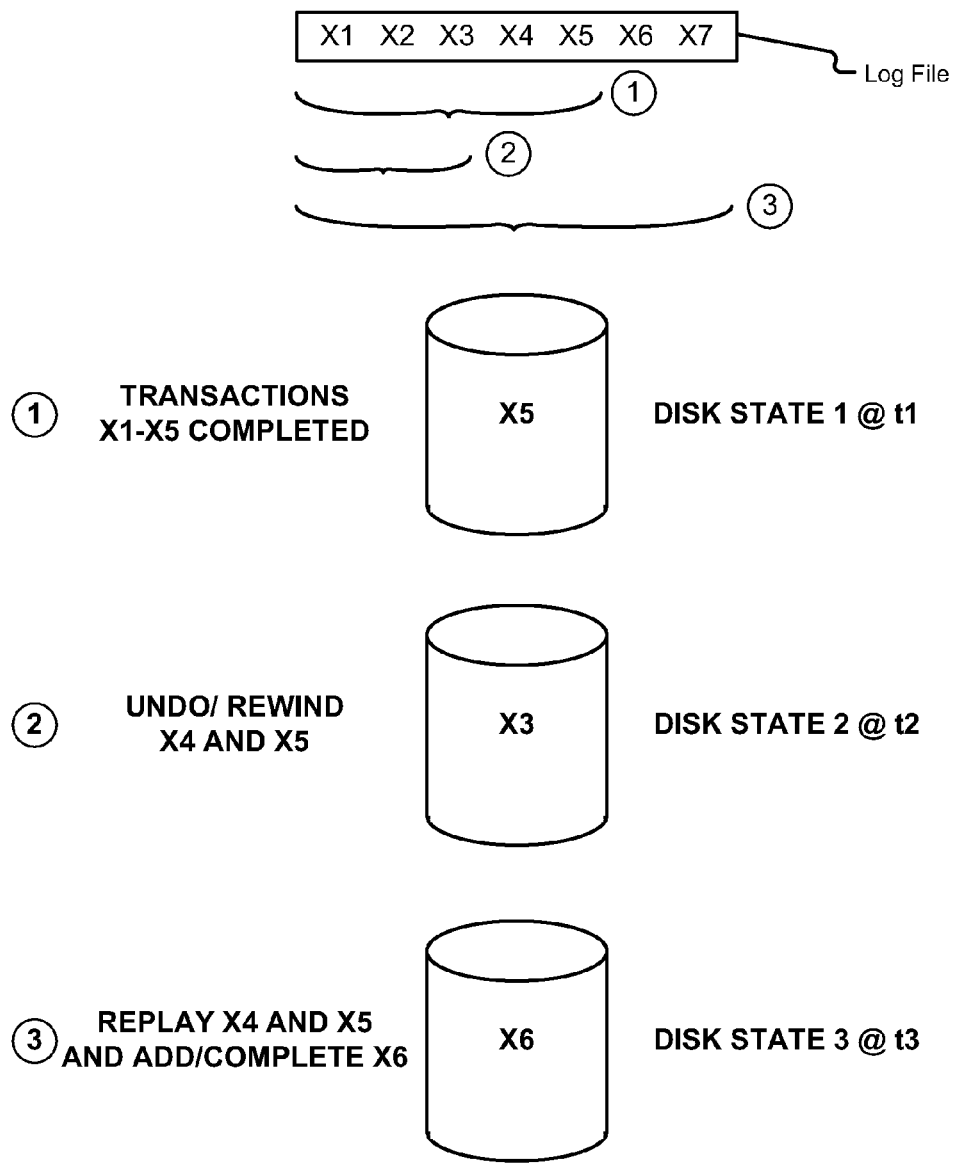

FIG. 71-9B shows a hierarchical storage system implementing a method of logging transactions between a CPU and the hierarchical storage system, in accordance with one embodiment.

FIG. 71-10 shows a method of replaying transactions from a log file, in accordance with one environment.

Figures 11A, 71:
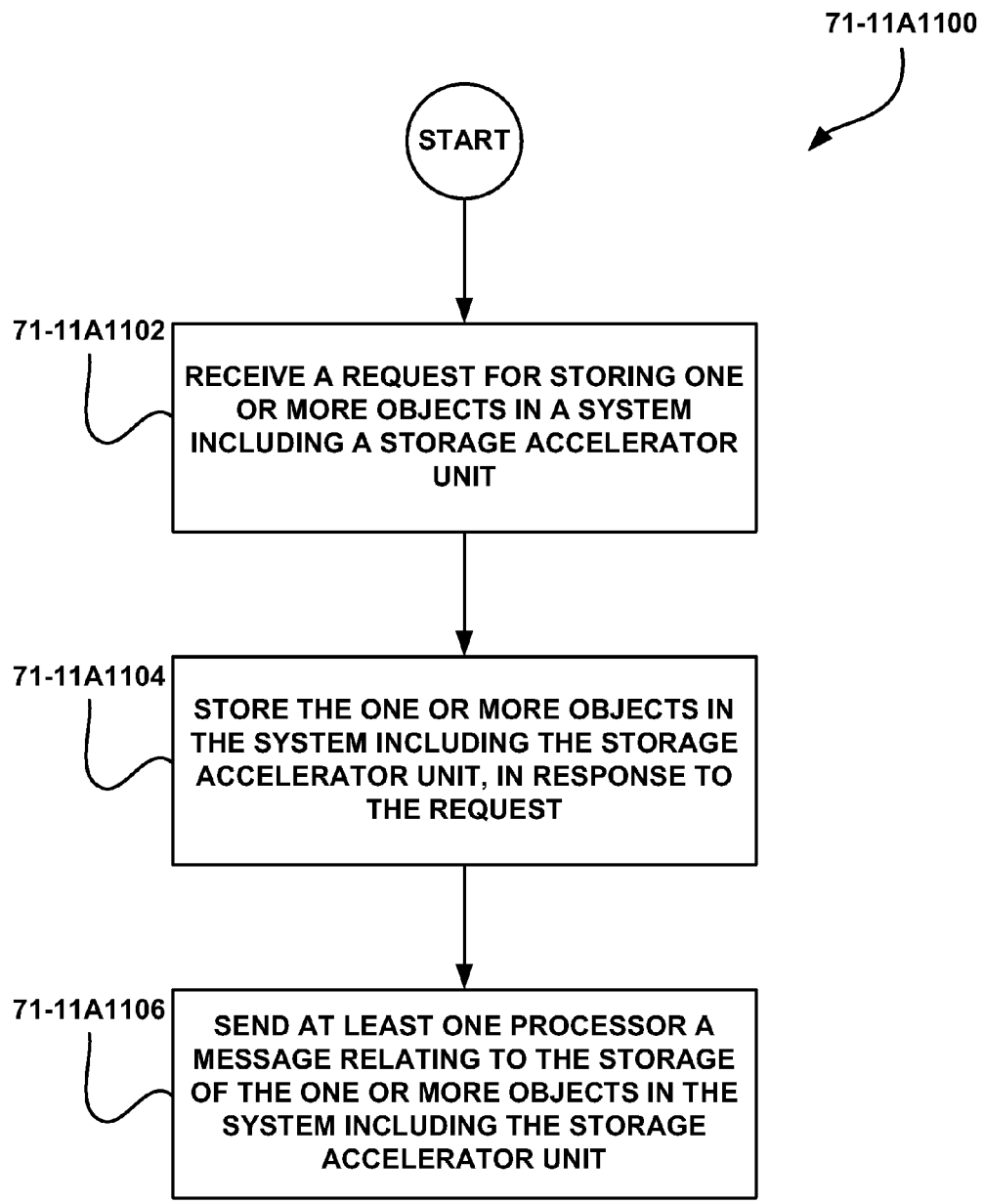

FIG. 71-11A shows a method for sending at least one processor a message relating to the storage of the one or more objects in the system including a storage accelerator unit, in accordance with one embodiment.

Figures 11B, 71:
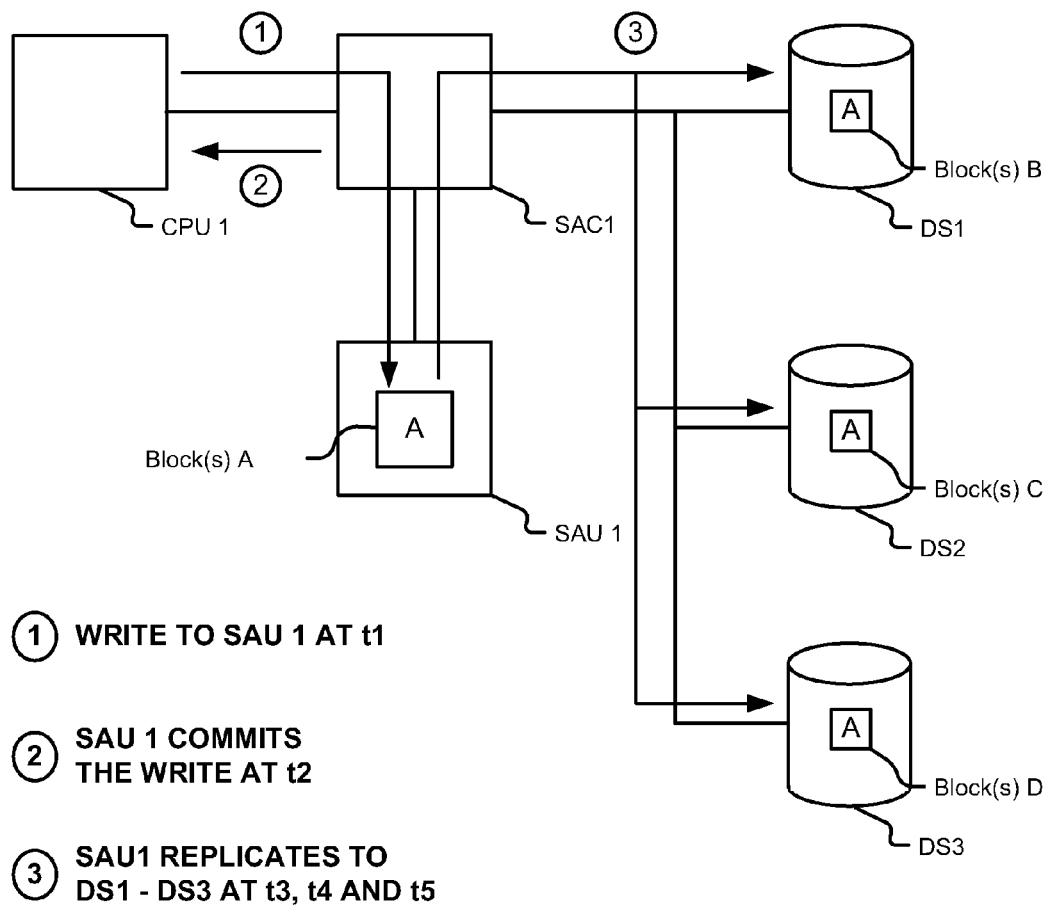

FIG. 71-11B shows a hierarchical storage subsystem implementing a method for committing and replicating data, in accordance with one embodiment.

Figures 12A, 71:
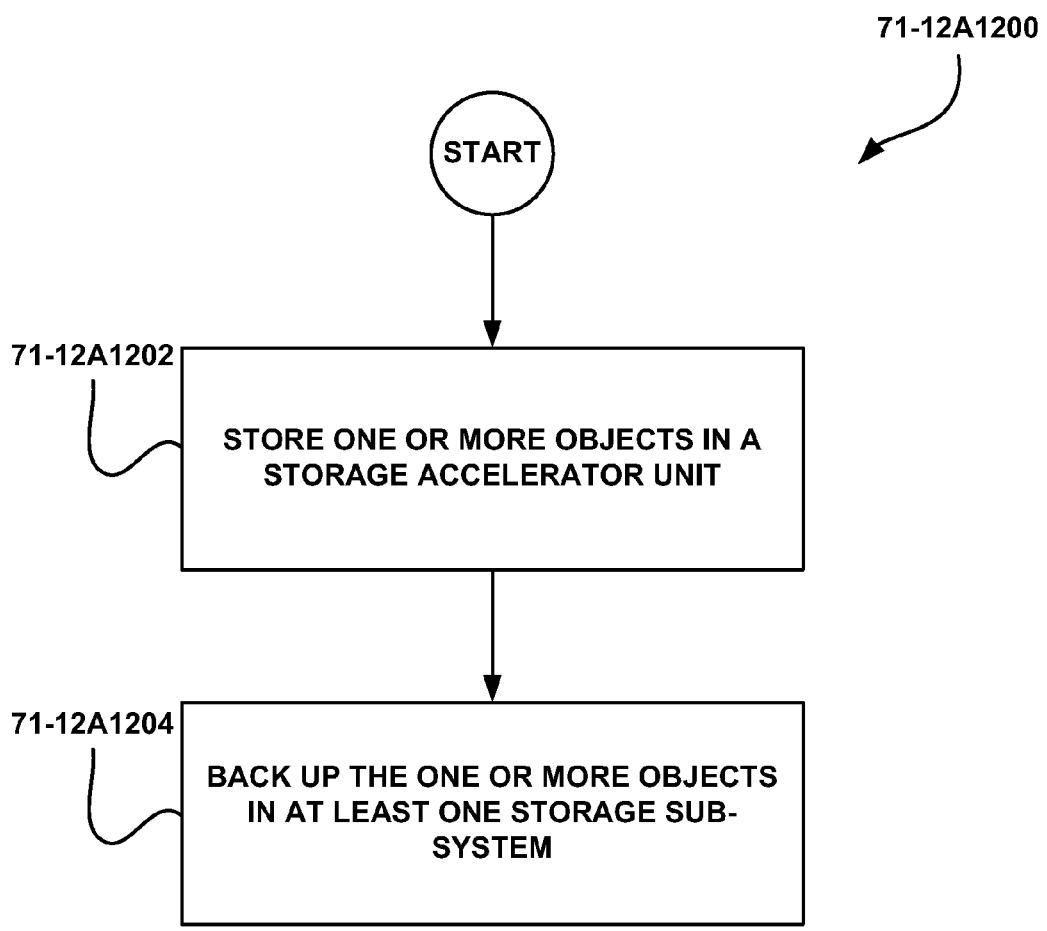

FIG. 71-12A shows a method for backing up one or more objects in at least one storage sub-system, in accordance with one embodiment.

Figures 12B, 71:
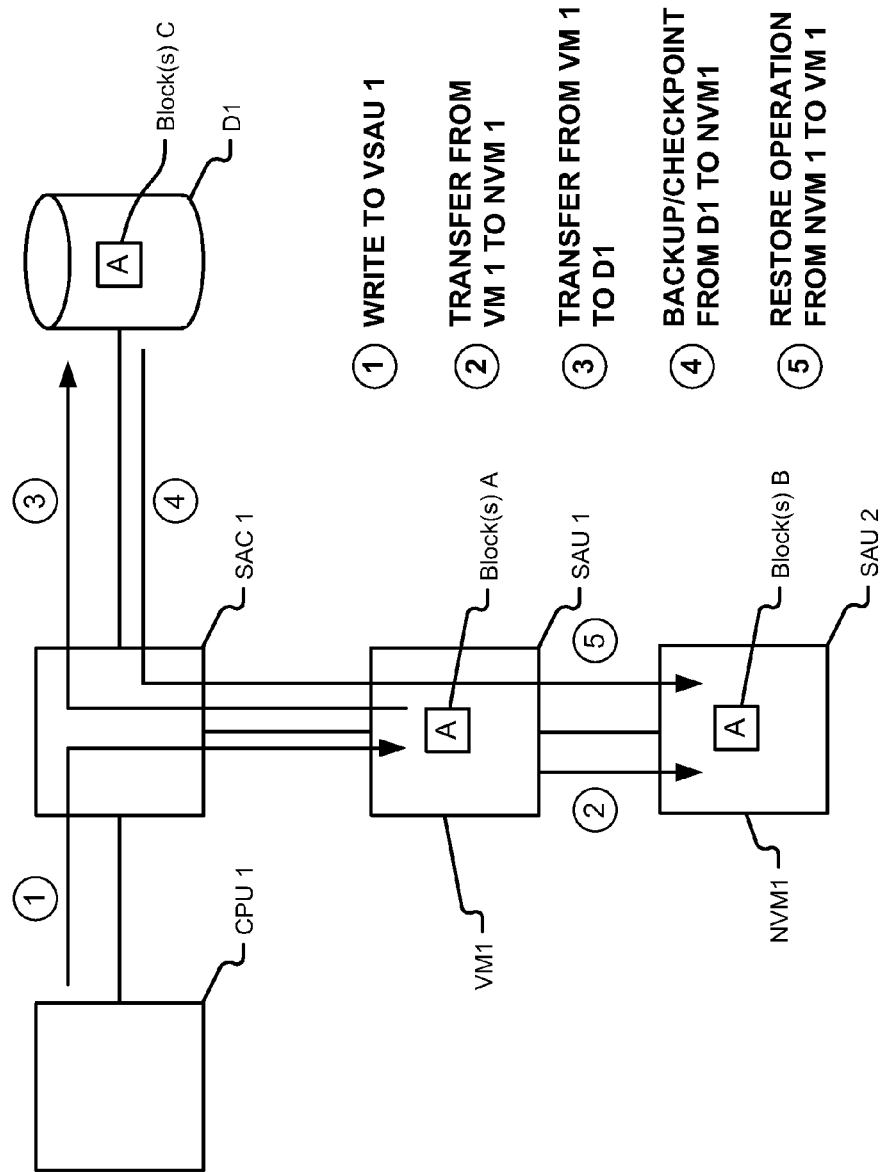
Figures 13, 71:
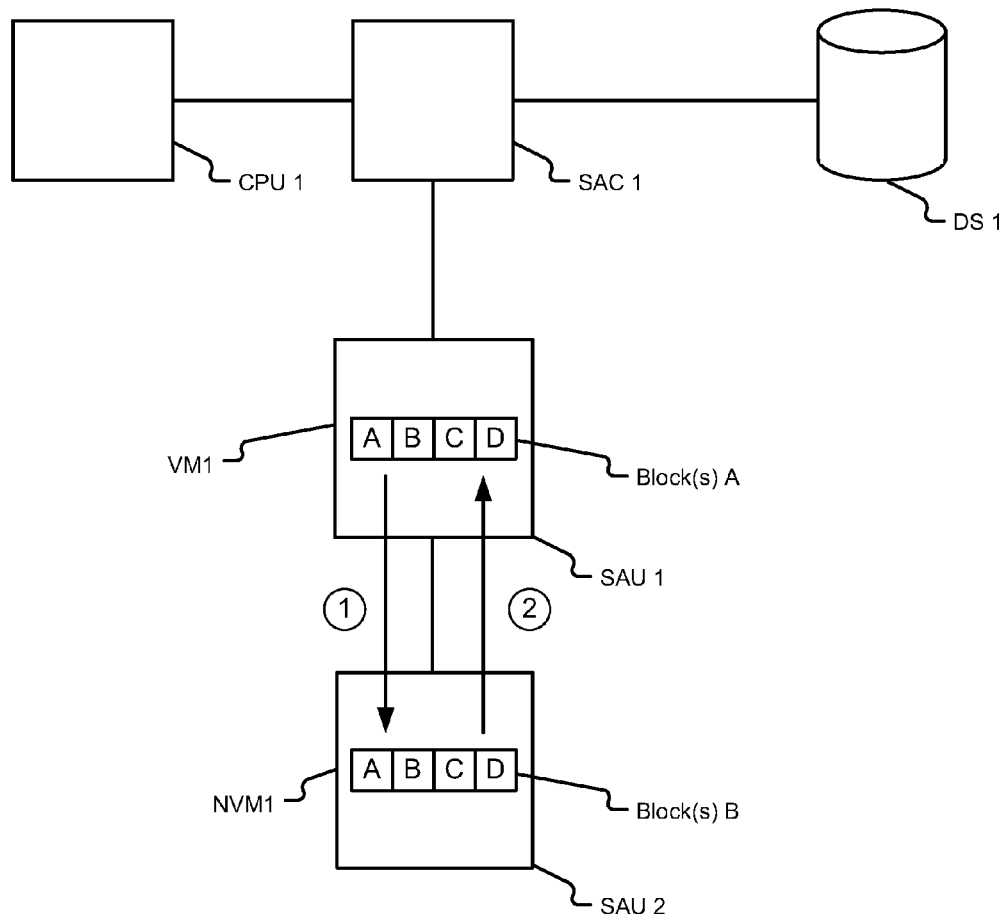
Figures 14, 71:
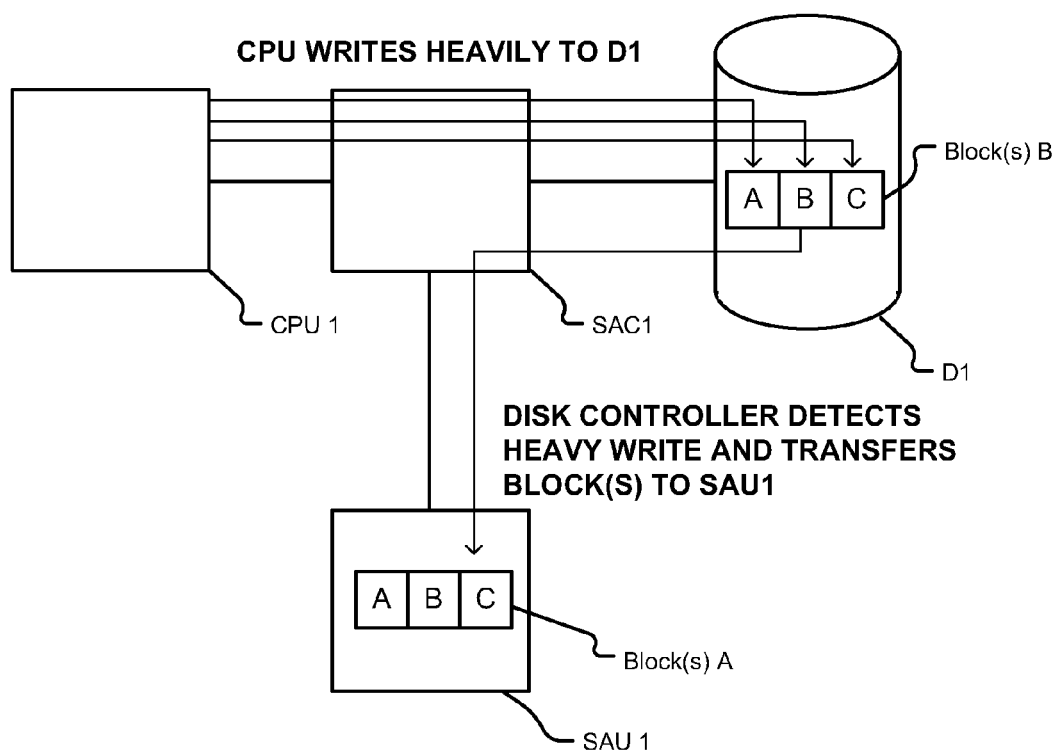

FIG. 71-12B shows a CPU coupled to a hierarchical storage subsystem, in accordance with one embodiment.

FIG. 71-13 shows a CPU coupled to a hierarchical storage system, in accordance with one embodiment.

FIG. 71-14 shows a hierarchical storage system implementing a method of prioritizing files and data, in accordance with one embodiment.

Figures 15A, 71:
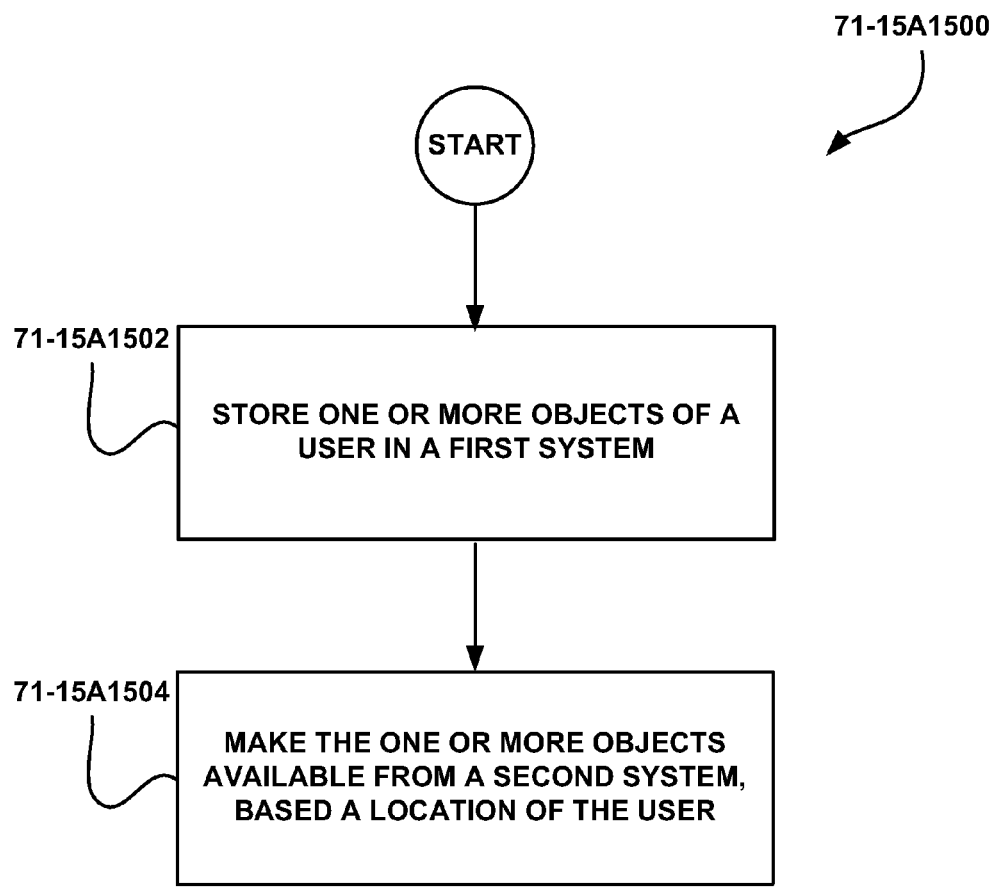

FIG. 71-15A shows a method for making the one or more objects available from a second system, based a location of the user, in accordance with one embodiment.

Figures 15B, 71:
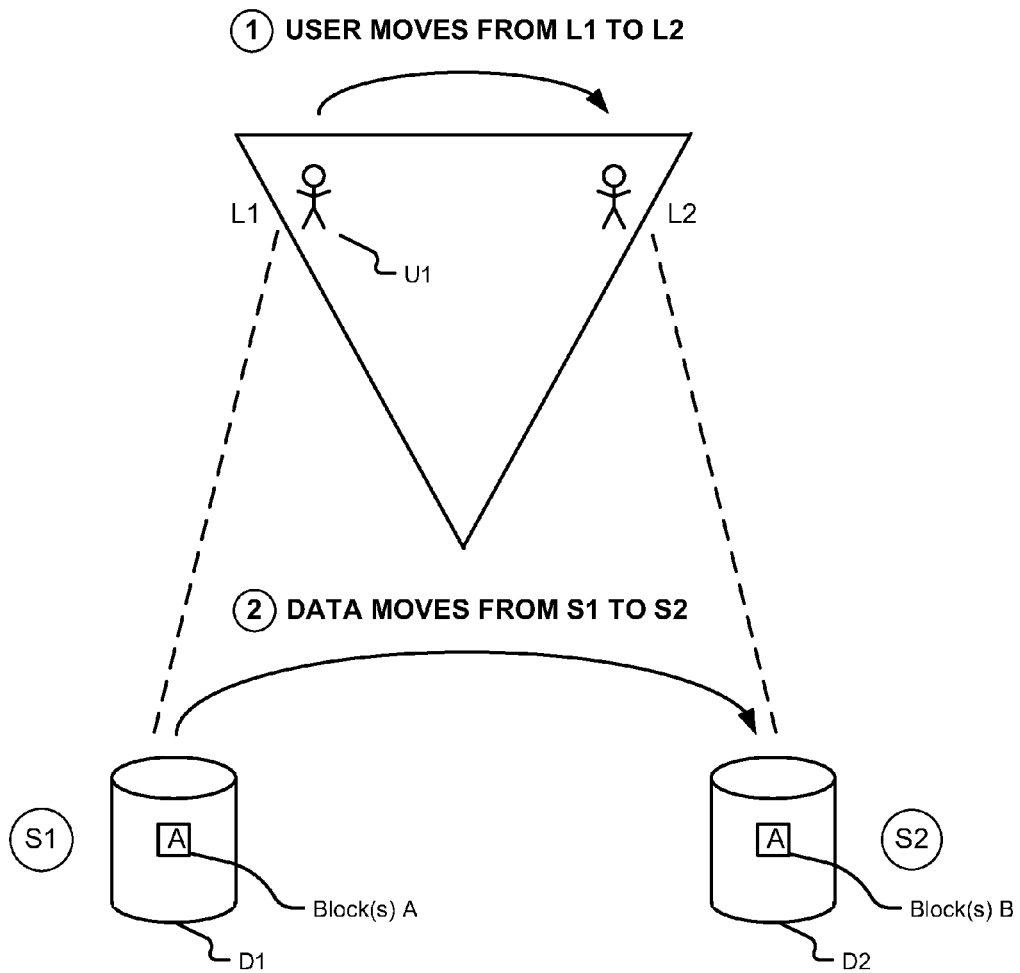
Figure 71:
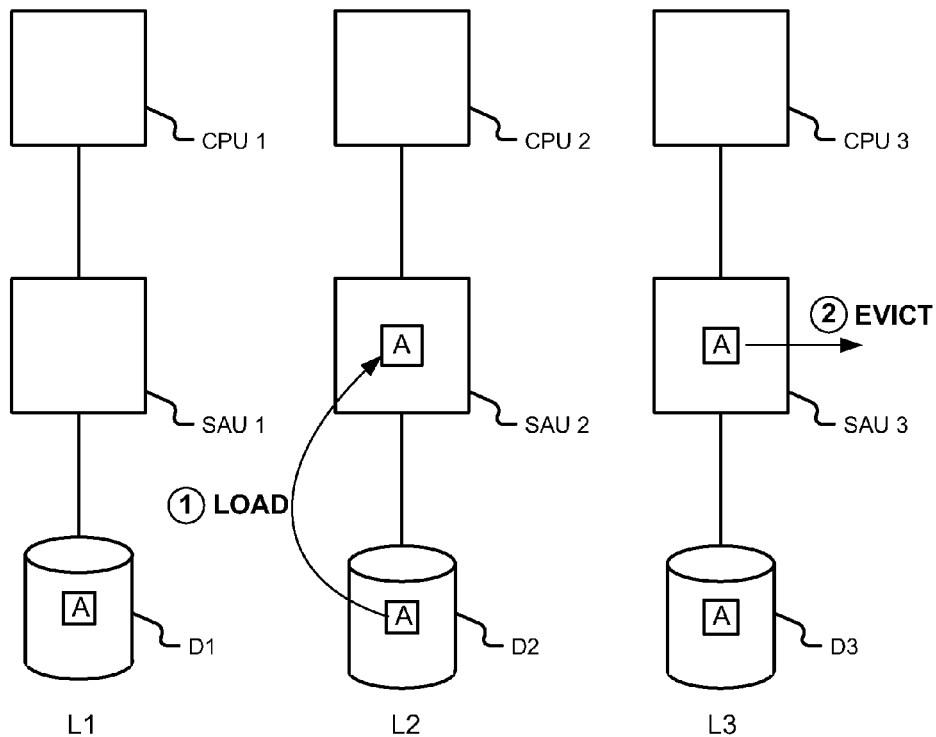
Figure 16:
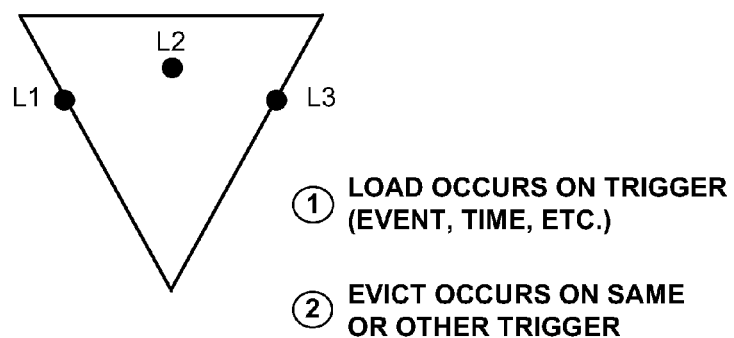
Figures 17, 71:
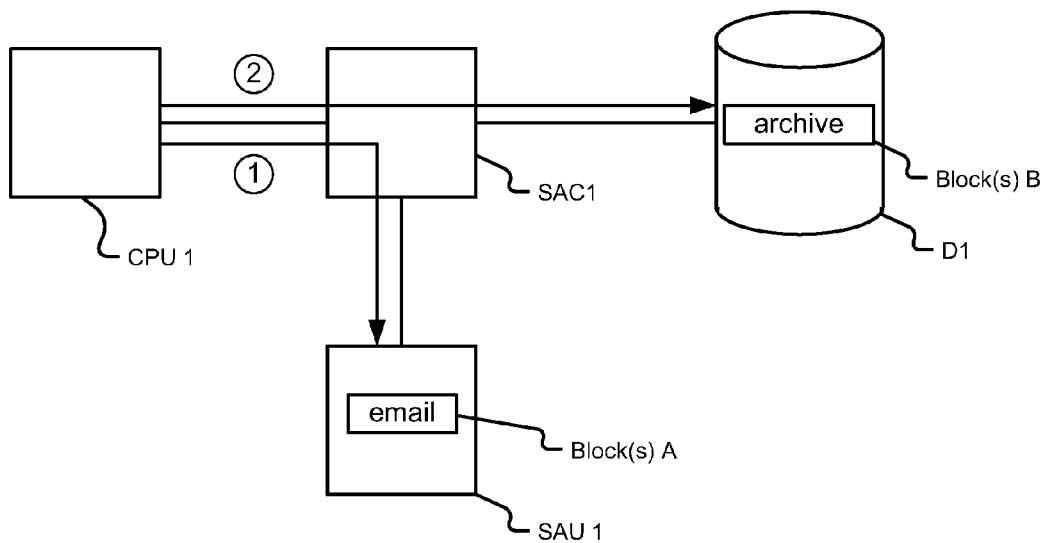
Figures 18, 71:
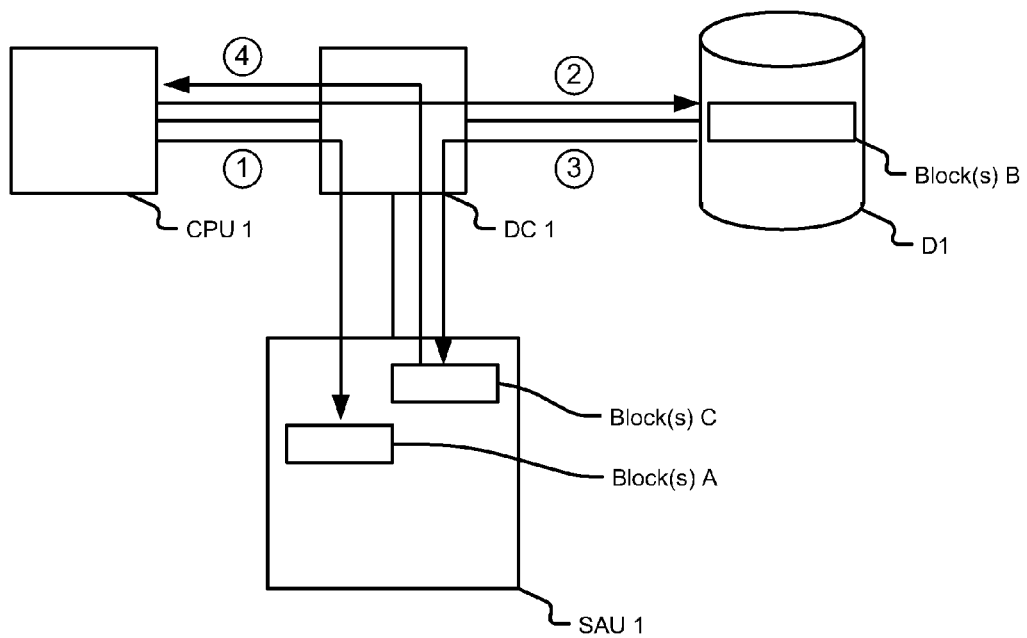
Figures 19, 71:
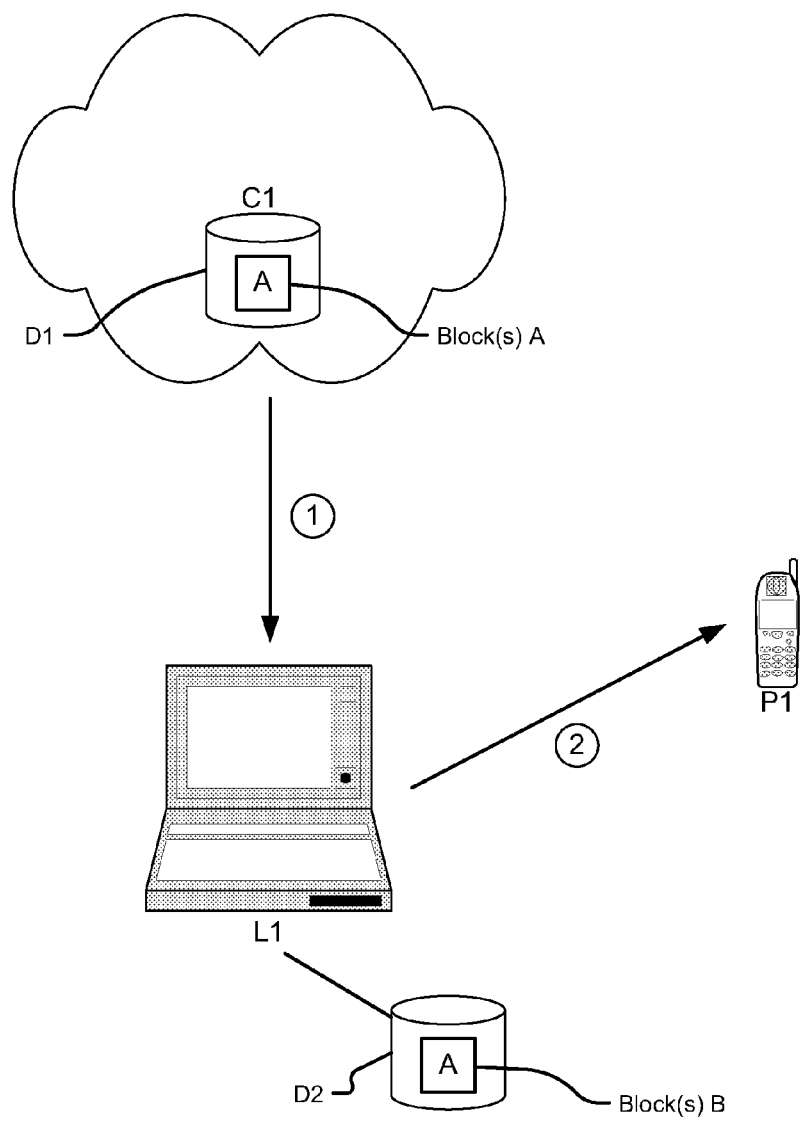
Figures 20, 71:
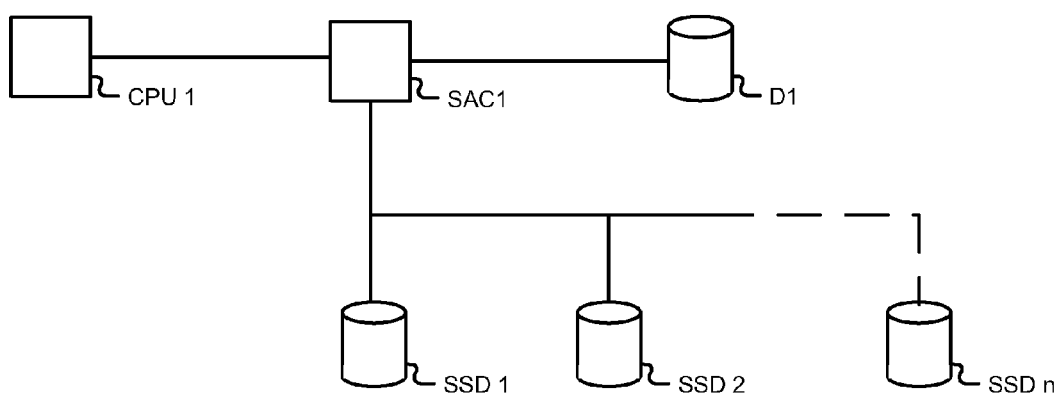
Figures 21, 71:
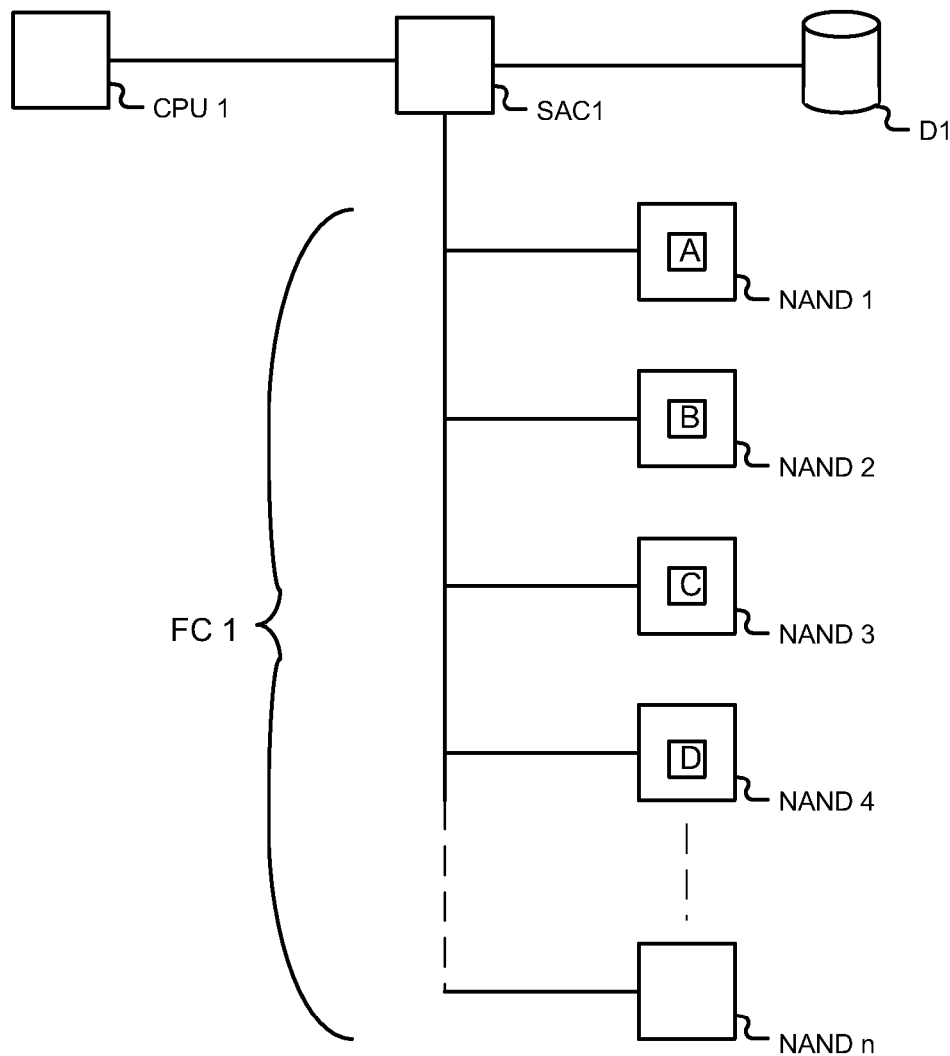
Figures 22, 71:
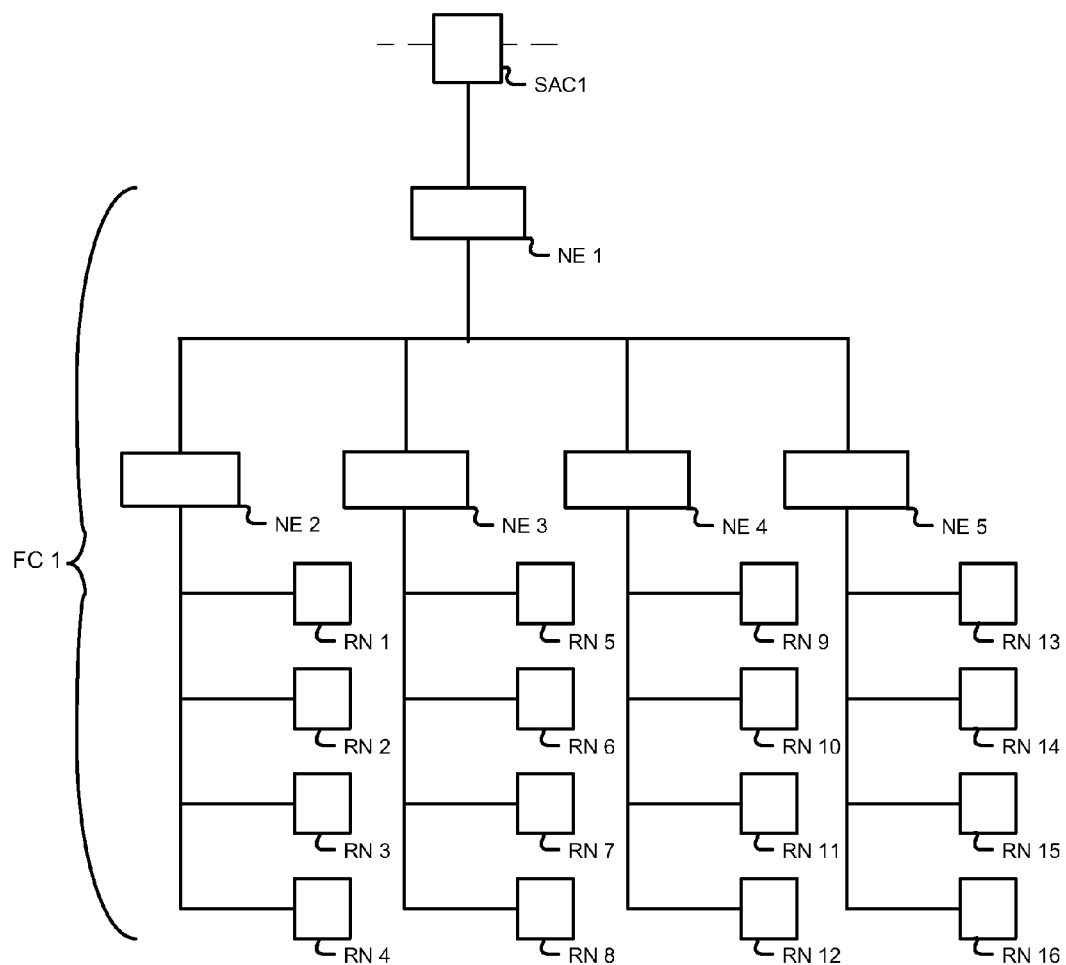

FIG. 71-15B shows a system of disk subsystems, in accordance with one embodiment, where different disk subsystems may be located in different geographic locations and the system may perform geolocation storage operations.

FIG. 71-16 shows a system of storage systems, in accordance with one embodiment, comprising one or more storage acceleration units (SAUs) that may perform geolocation storage operations.

FIG. 71-17 shows a hierarchical storage system implementing a method of prioritizing files in accordance with one embodiment.

FIG. 71-18 shows a hierarchical storage system including a storage accelerator unit that splits data objects, in accordance with one embodiment.

FIG. 71-19 shows a system and method for a storage proxy, in accordance with one embodiment.

FIG. 71-20 shows a hierarchical storage system, in accordance with one embodiment.

FIG. 71-21 shows a hierarchical storage system, in accordance with one embodiment.

FIG. 71-22 shows a hierarchical storage system, in accordance with one embodiment.

Figures 23A, 71:
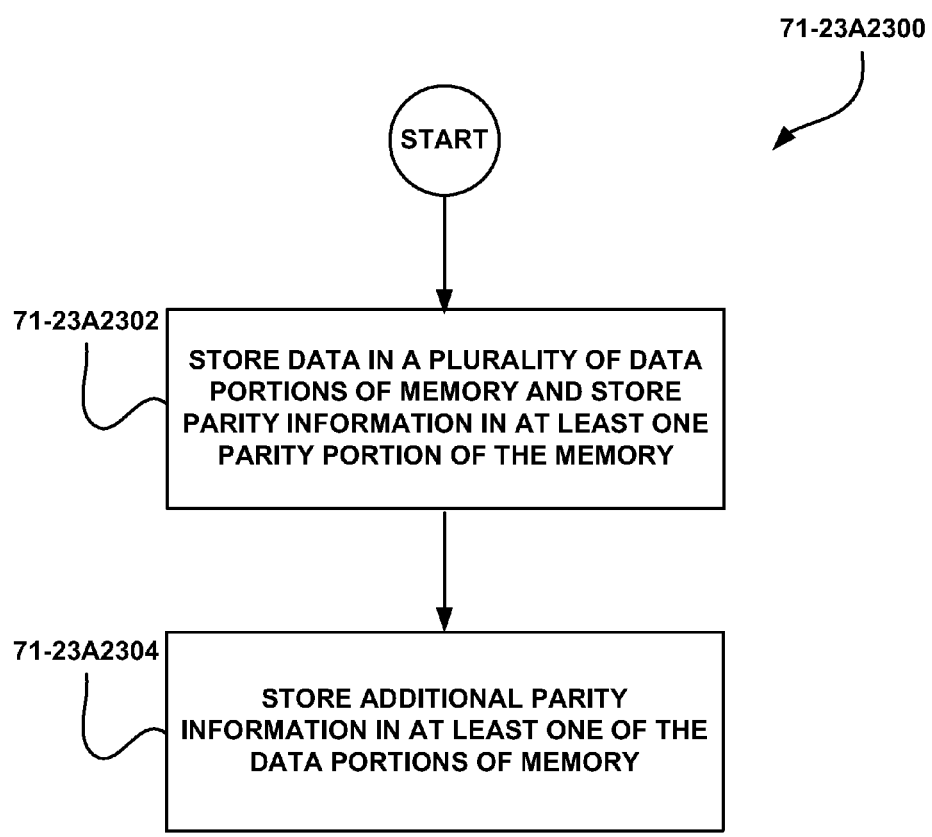

FIG. 71-23A shows a method for storing parity information in data portions of memory, in accordance with one embodiment.

Figures 23B, 71:
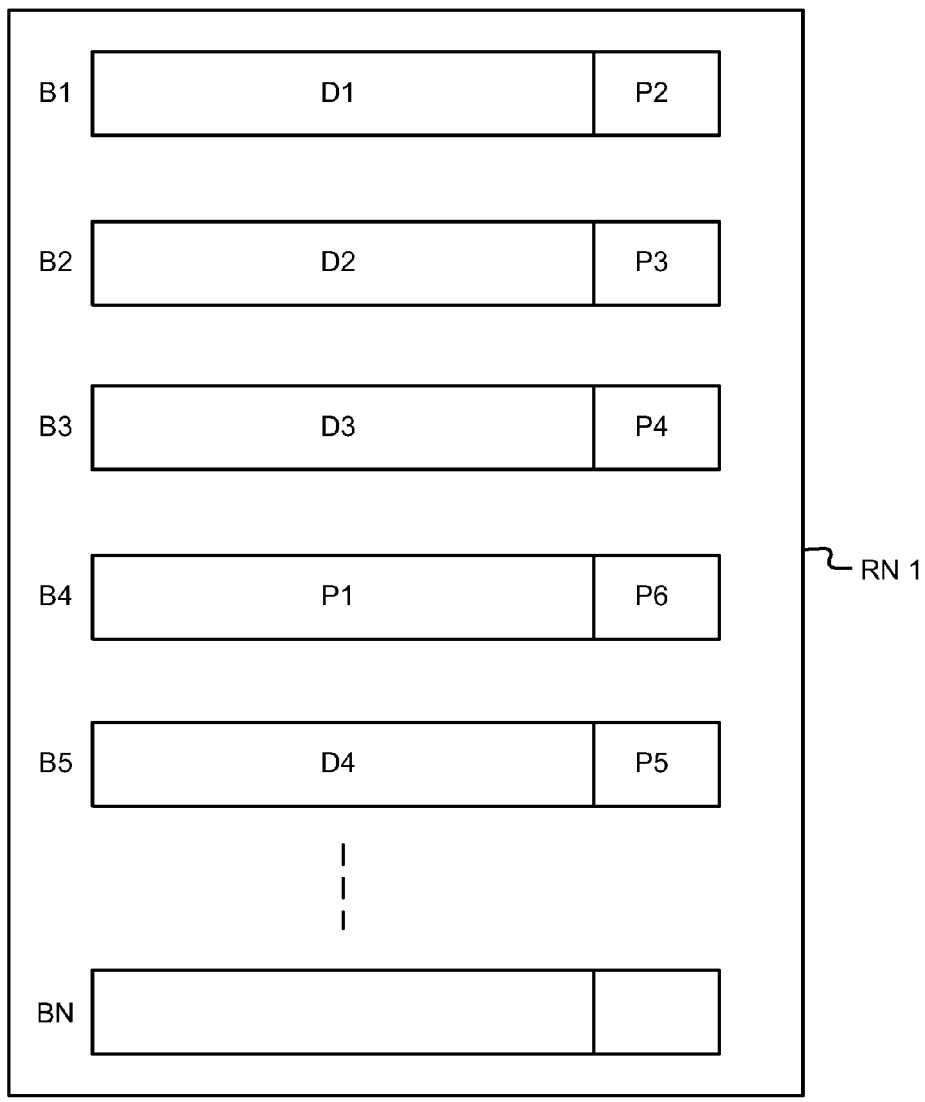
Figures 24, 71:
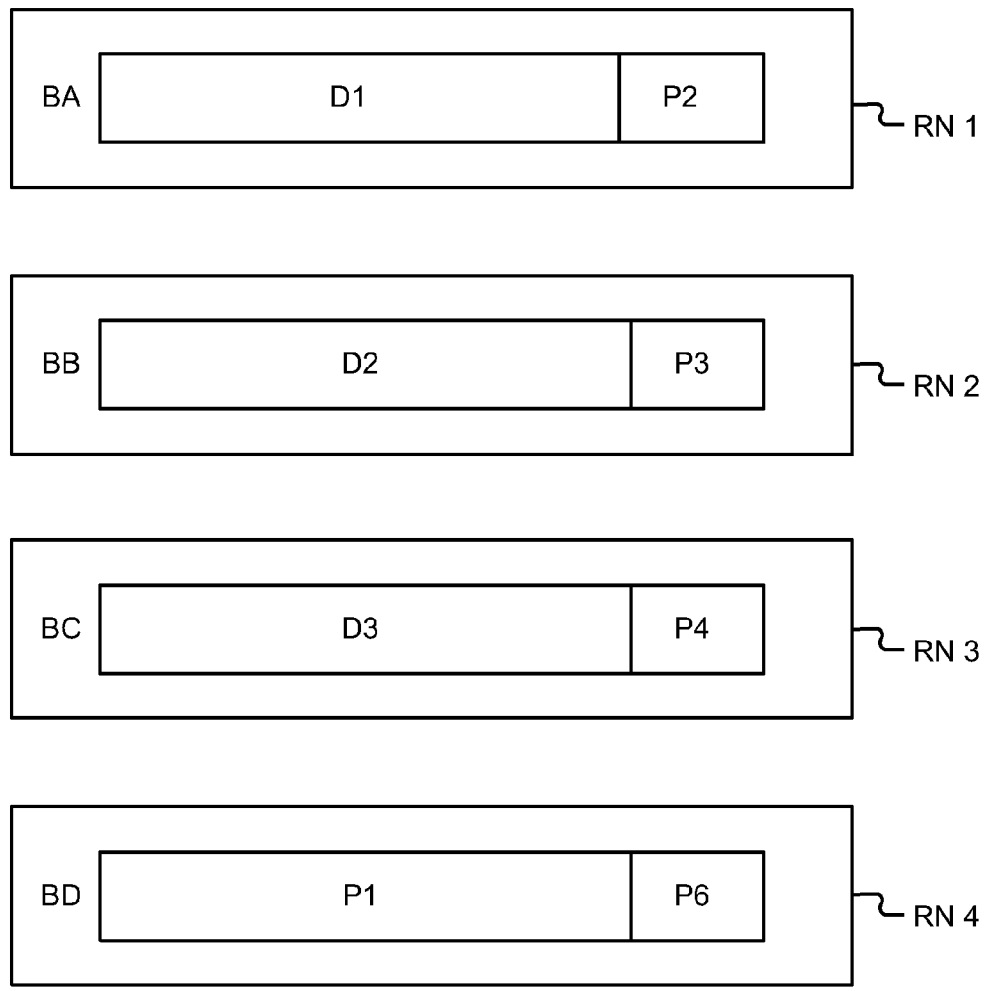
Figures 25, 71:
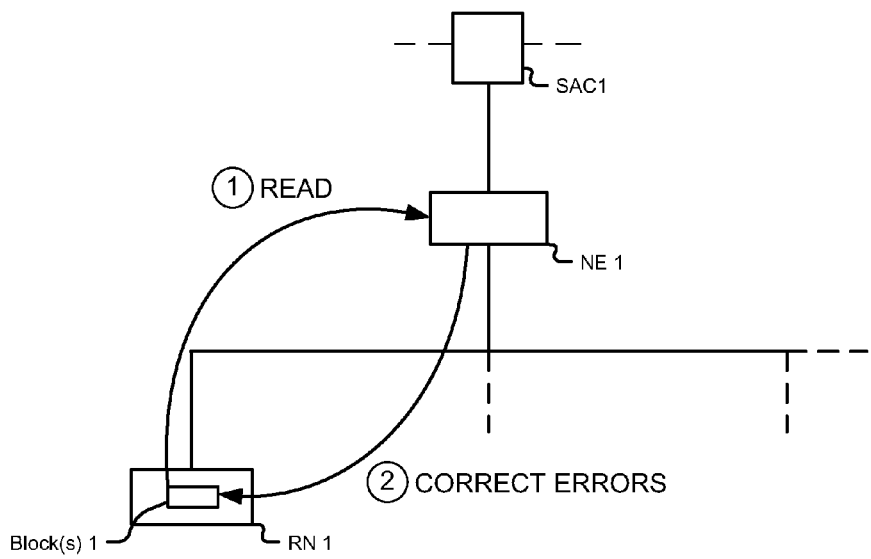

FIG. 71-23B shows a method to use nested parity in a raw NAND memory device, in accordance with one embodiment.

FIG. 71-24 shows a method to distribute nested parity across a plurality of raw NAND memory devices, in accordance with one embodiment.

FIG. 71-25 shows a method of nested error correction implemented in a NAND expander, in accordance with one embodiment.

Figures 26A, 71:
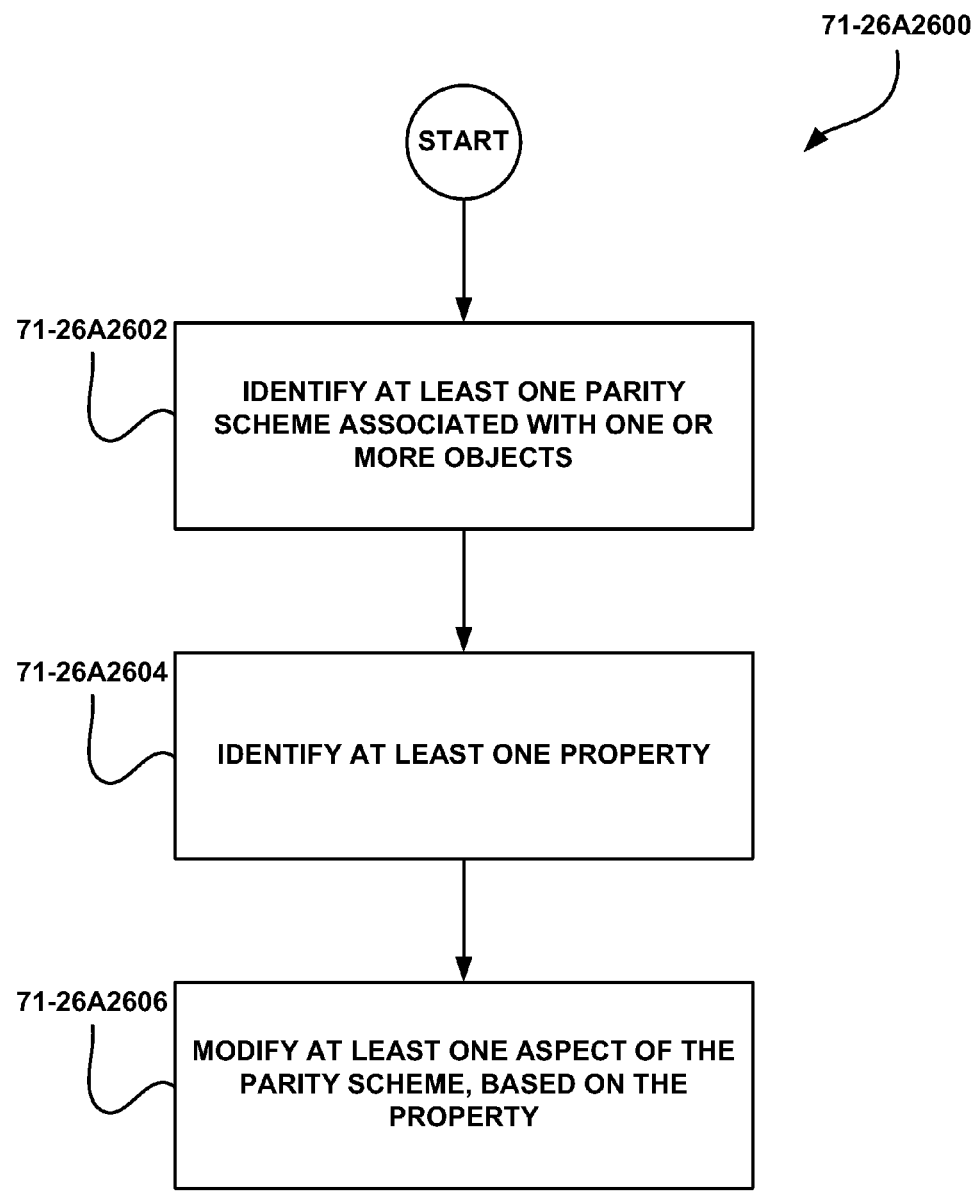

FIG. 71-26A shows a method for modifying at least one aspect of a parity scheme, based on the property, in accordance with one embodiment.

Figures 26B, 71:
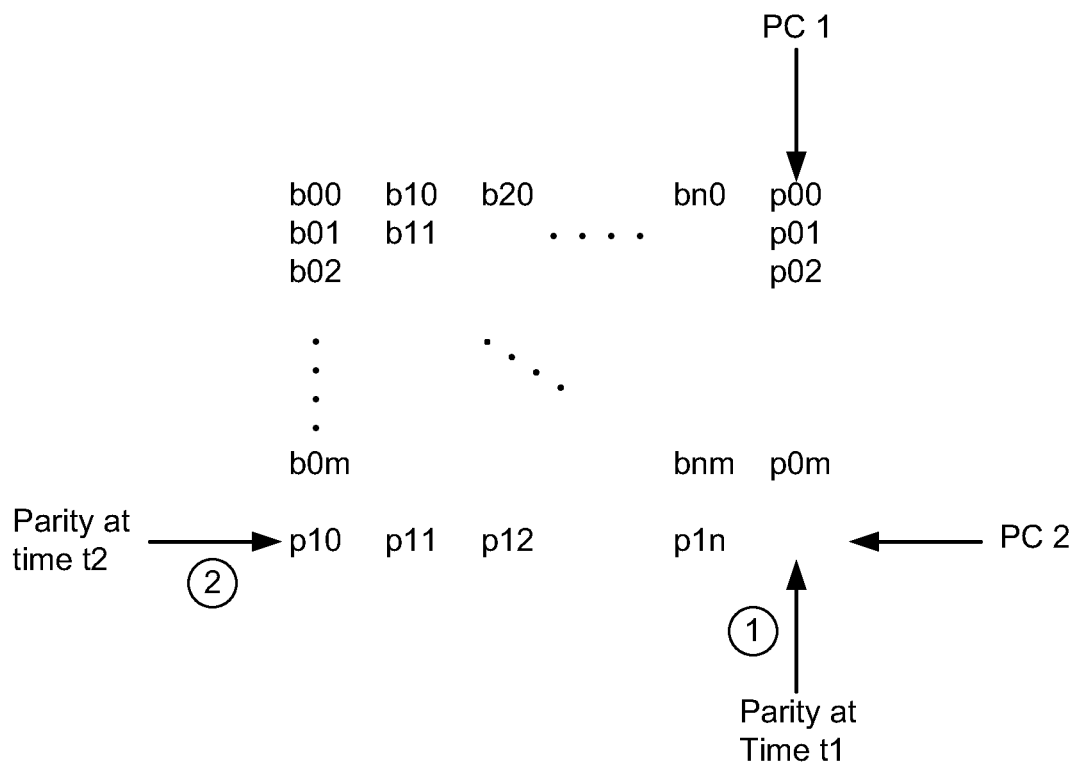
Figures 27, 71:
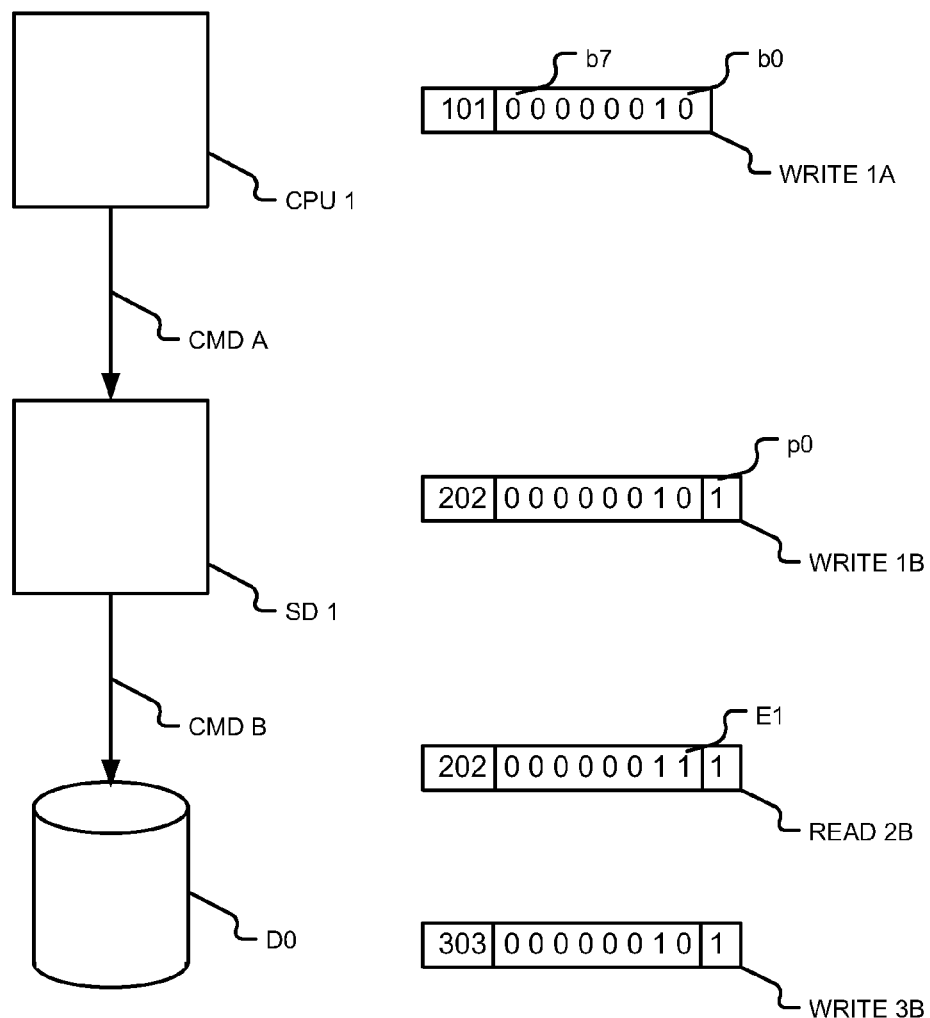
Figures 28, 71:
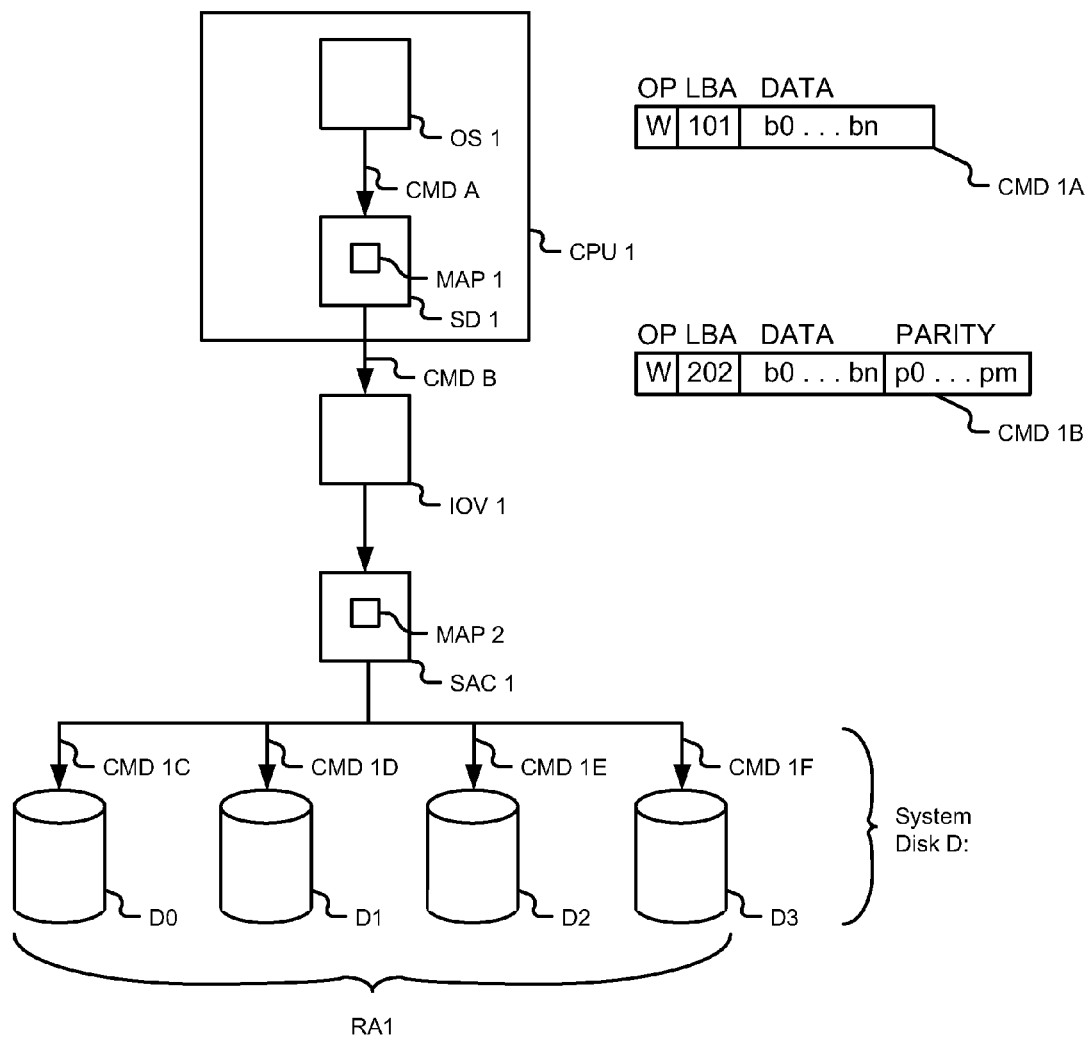

FIG. 71-26B shows a method to apply time varying parity, in accordance with one embodiment.

FIG. 71-27 shows a method to apply software coding and correction to a data set, in accordance with one embodiment.

FIG. 71-28 shows a method to apply superimposed parity to a data set, in accordance with one embodiment.

Figures 29A, 71:
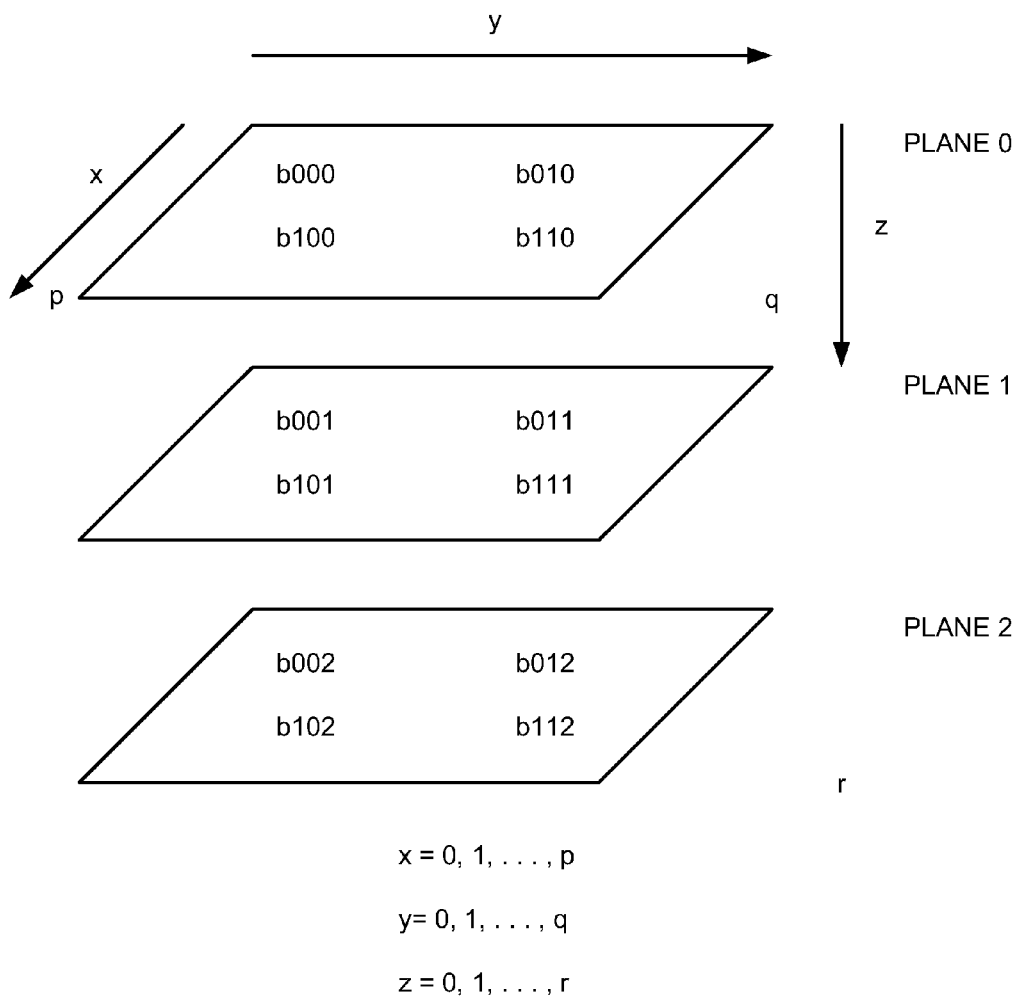

FIG. 71-29A shows a method to apply multidimensional parity to a data set, in accordance with one embodiment.

Figures 29B, 71:
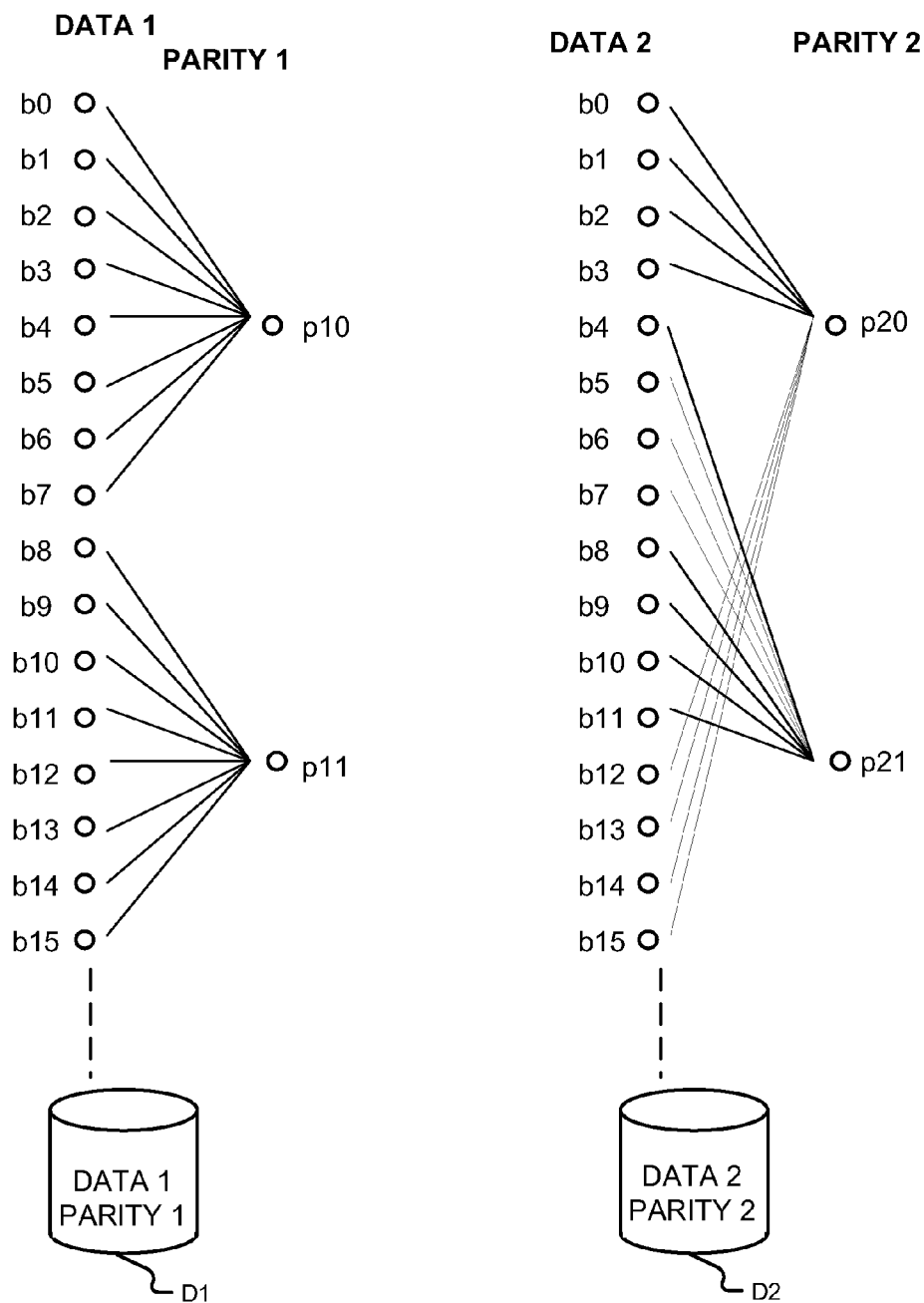
Figures 30, 71:
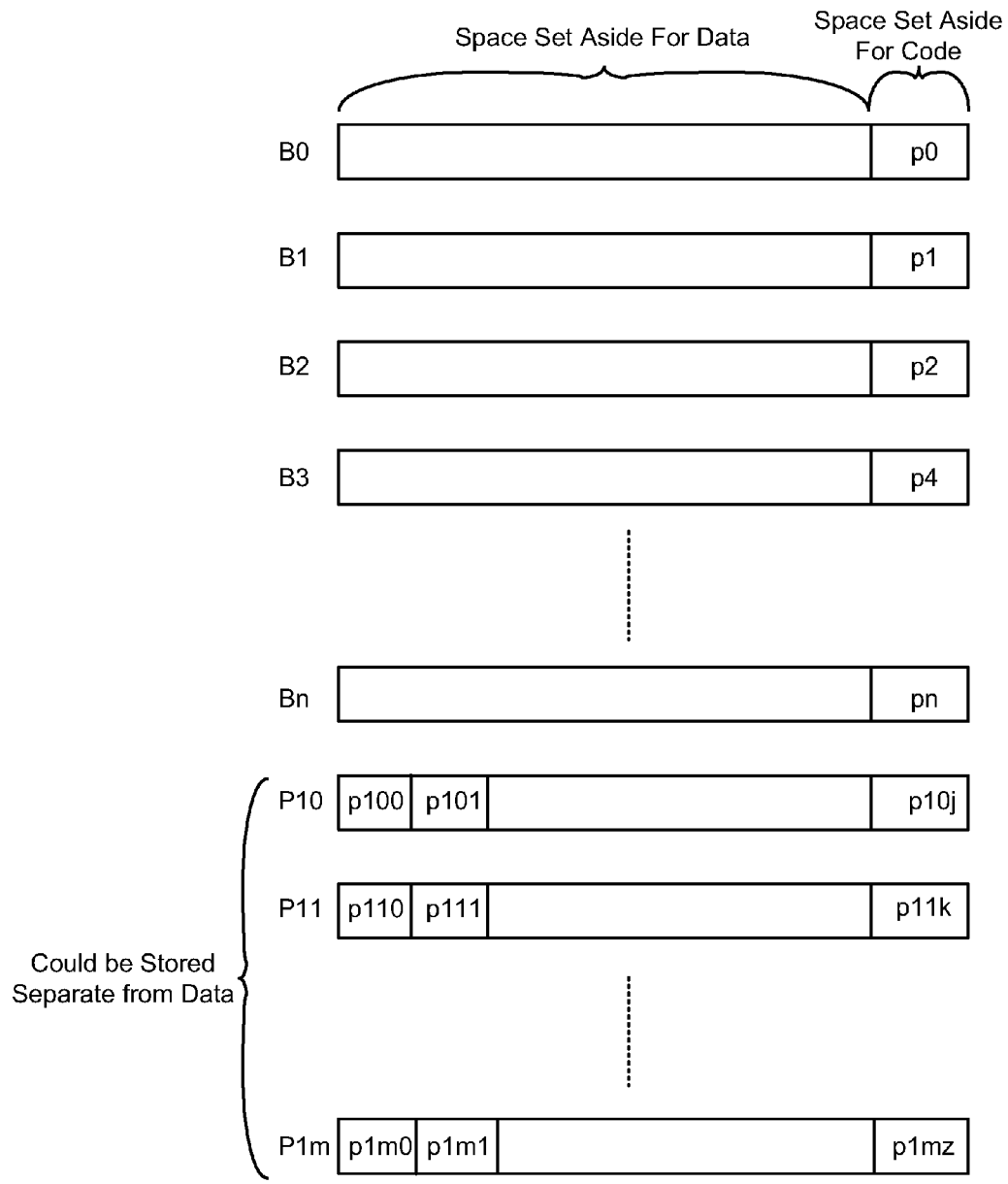

FIG. 71-29B shows a method to apply dislocated parity to a data set, in accordance with one embodiment.

FIG. 71-30 shows a method for parity storage, in accordance with one embodiment.

Figures 31A, 71:
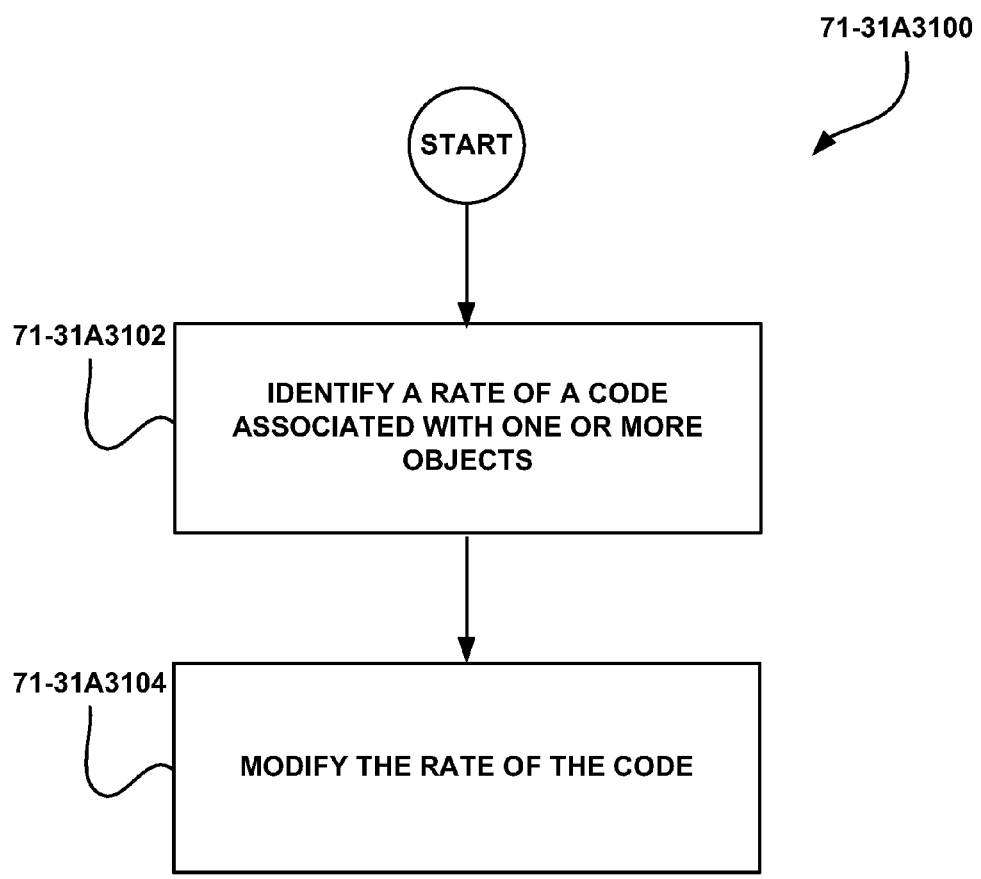

FIG. 71-31A shows a method for adjustable rate coding, in accordance with one embodiment.

Figures 31B, 71:
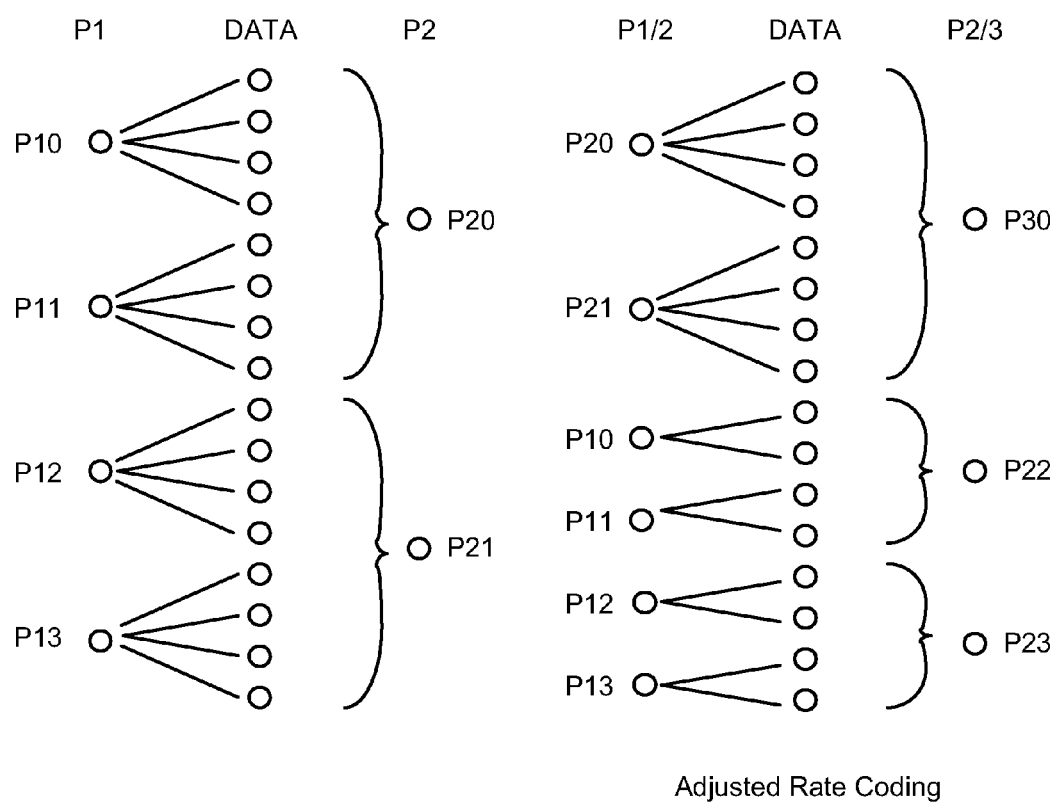
Figures 32, 71:
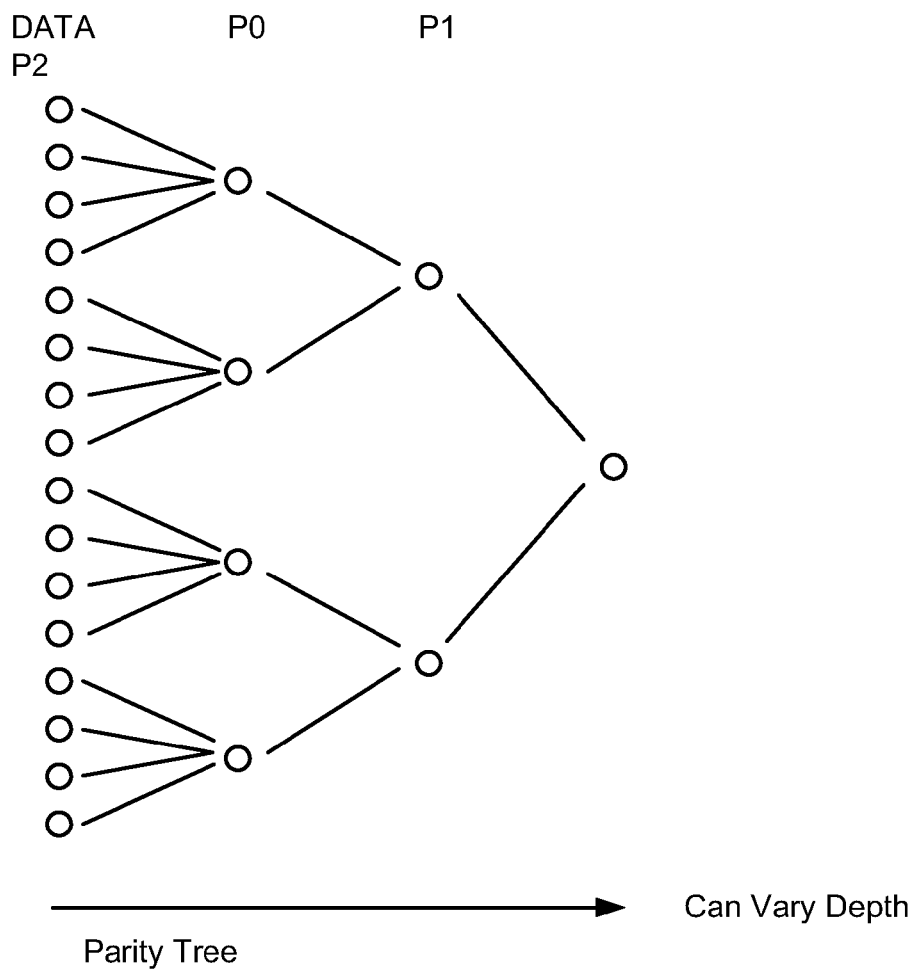
Figures 33, 71:
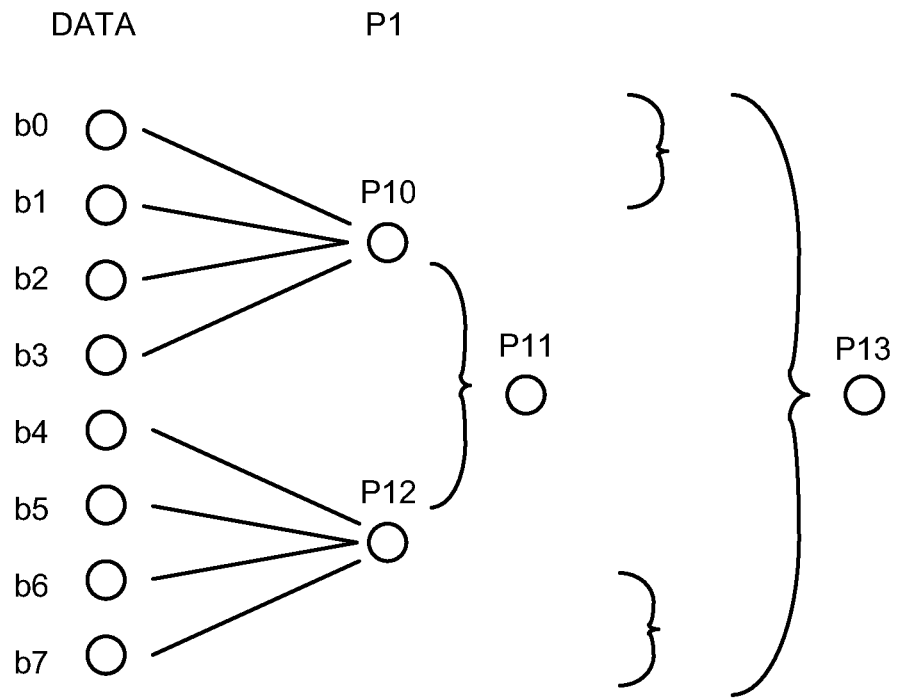
Figures 34, 71:
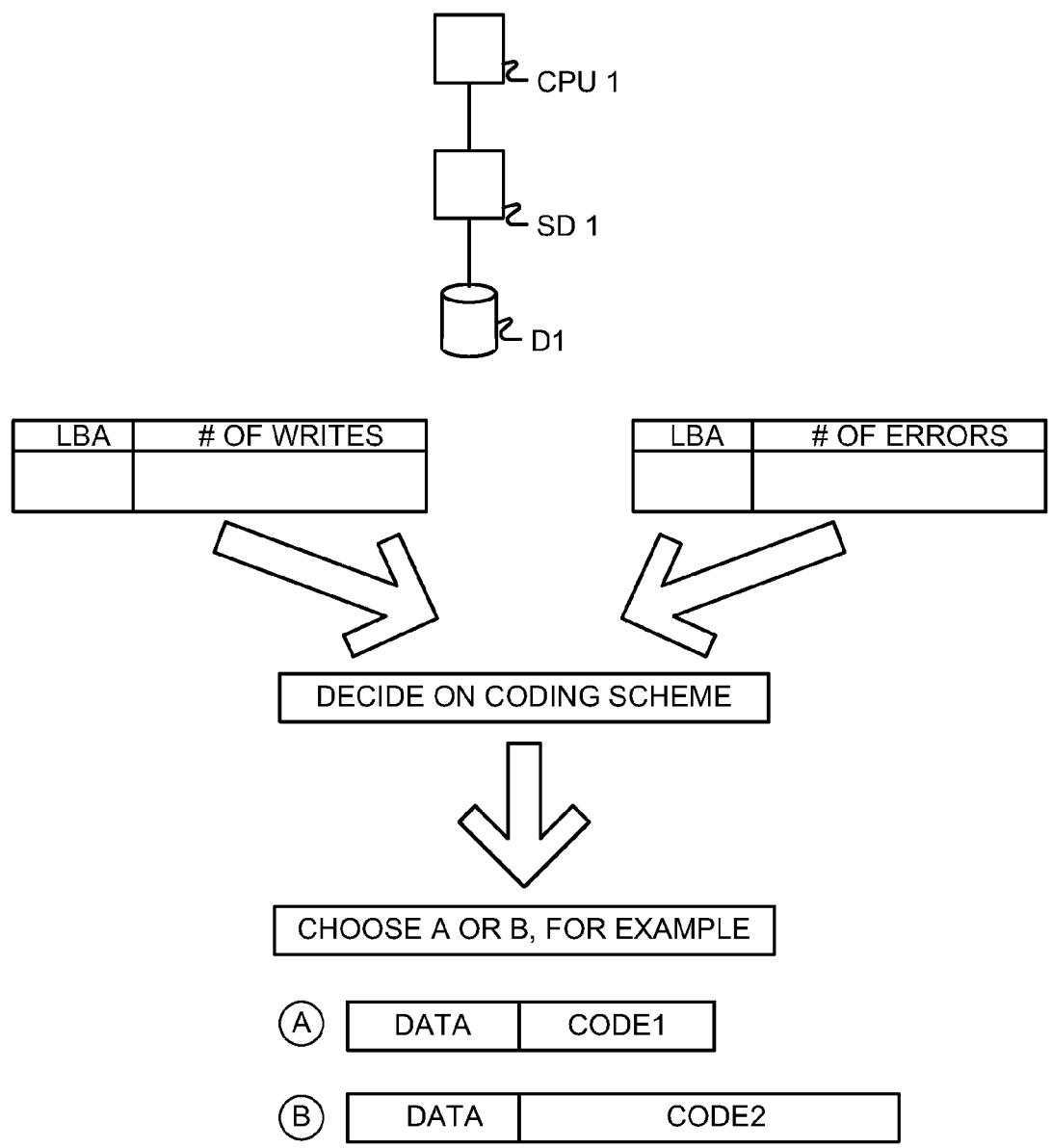
Figures 35, 71:
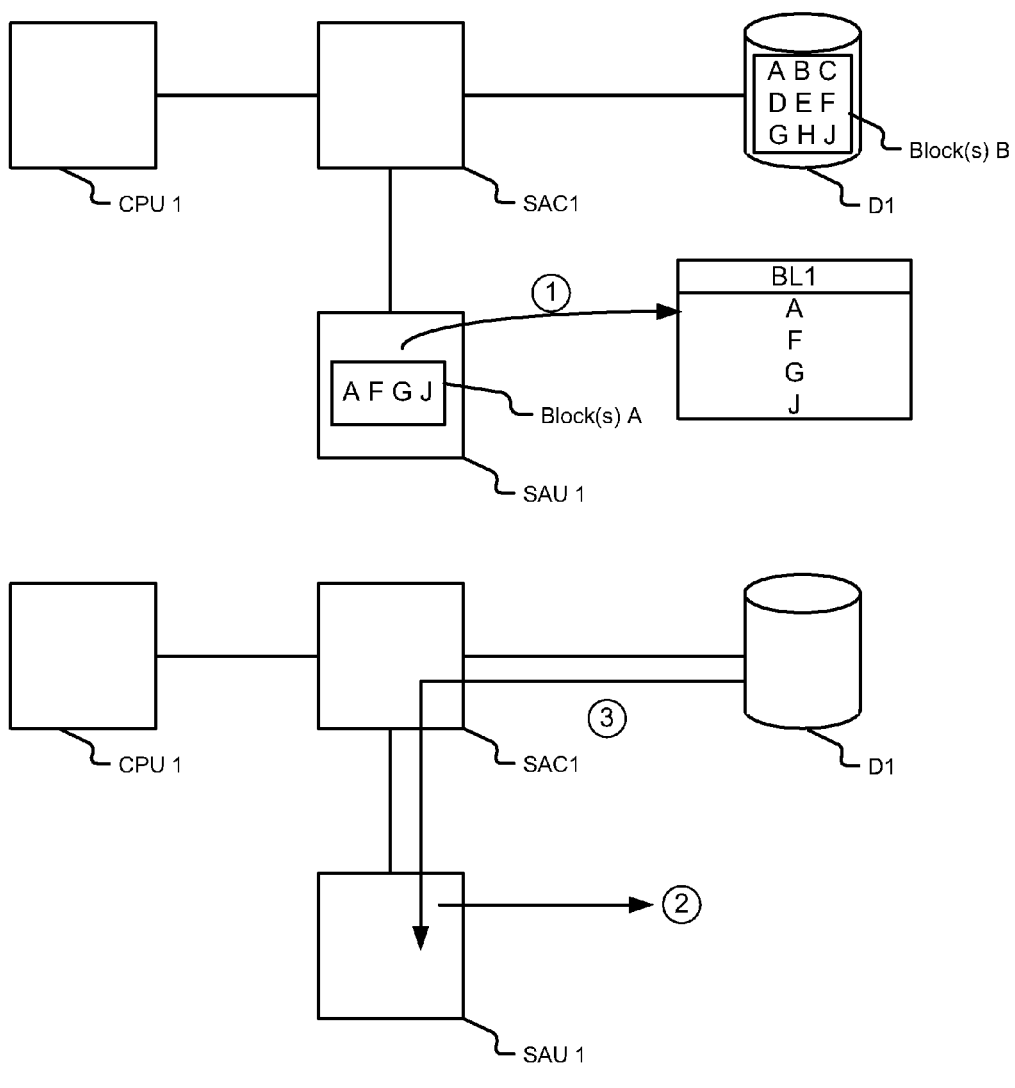

FIG. 71-31B shows a method for adjustable rate coding, in accordance with one embodiment.

FIG. 71-32 shows a method for implementing a variable depth parity tree, in accordance with one embodiment.

FIG. 71-33 shows a method for implementing overlapped parity, in accordance with one embodiment.

FIG. 71-34 shows a method for implementing variable coding, in accordance with one embodiment.

FIG. 71-35 shows a method for clearing and reloading data from a storage accelerator unit, in accordance with one embodiment.

Figures 36A, 71:
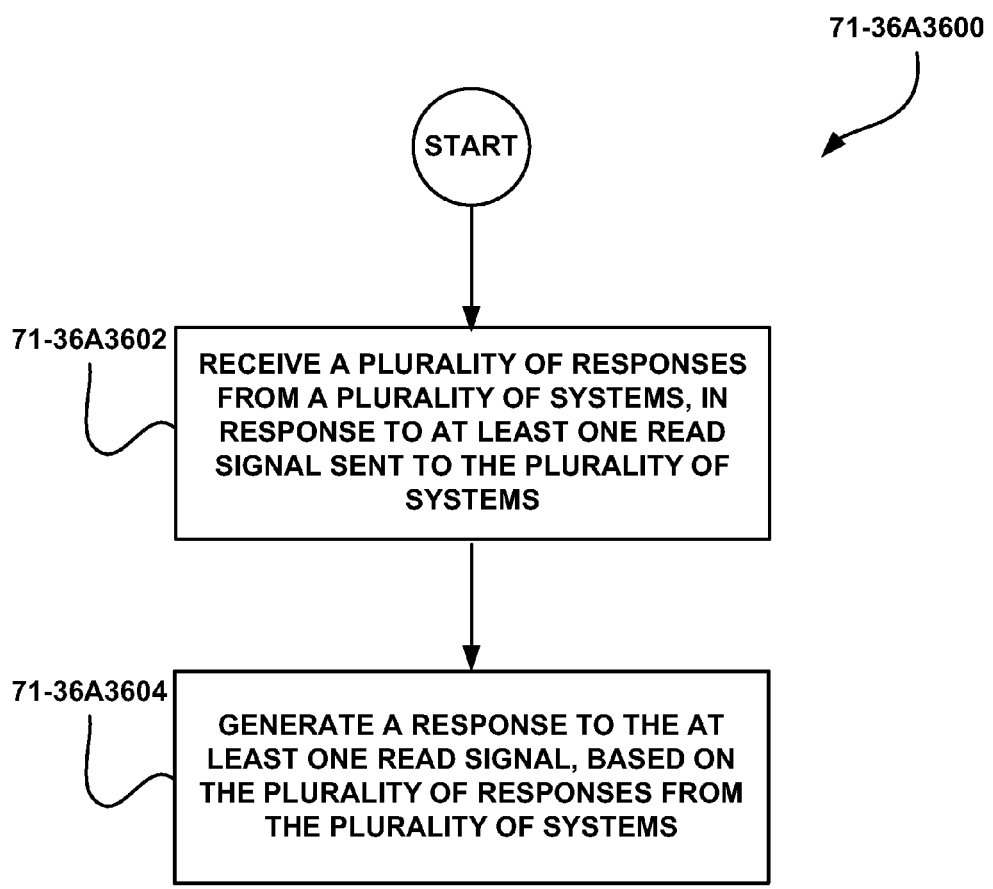

FIG. 71-36A shows a method for generating a response to at least one read signal, in accordance with one embodiment.

Figures 36B, 71:
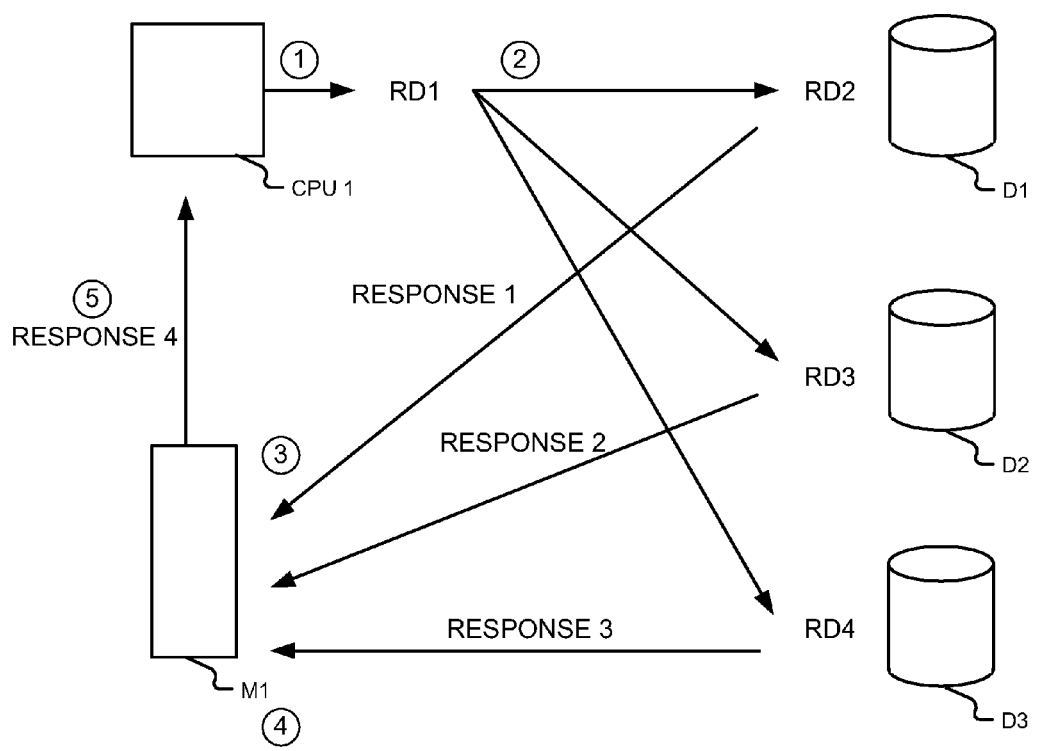

FIG. 71-36B shows a method for implementing weighted reads, in accordance with one embodiment.

Figures 37A, 71:
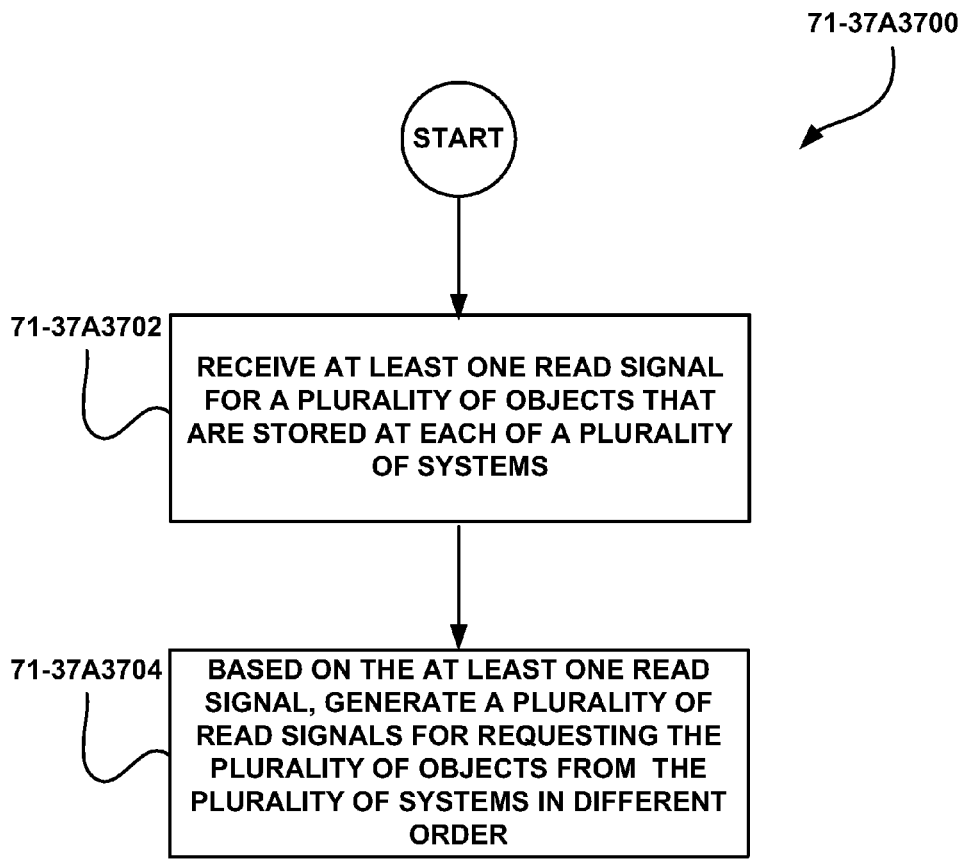

FIG. 71-37A shows a method for requesting a plurality of objects from a plurality of systems in different order, in accordance with one embodiment.

Figures 37B, 71:
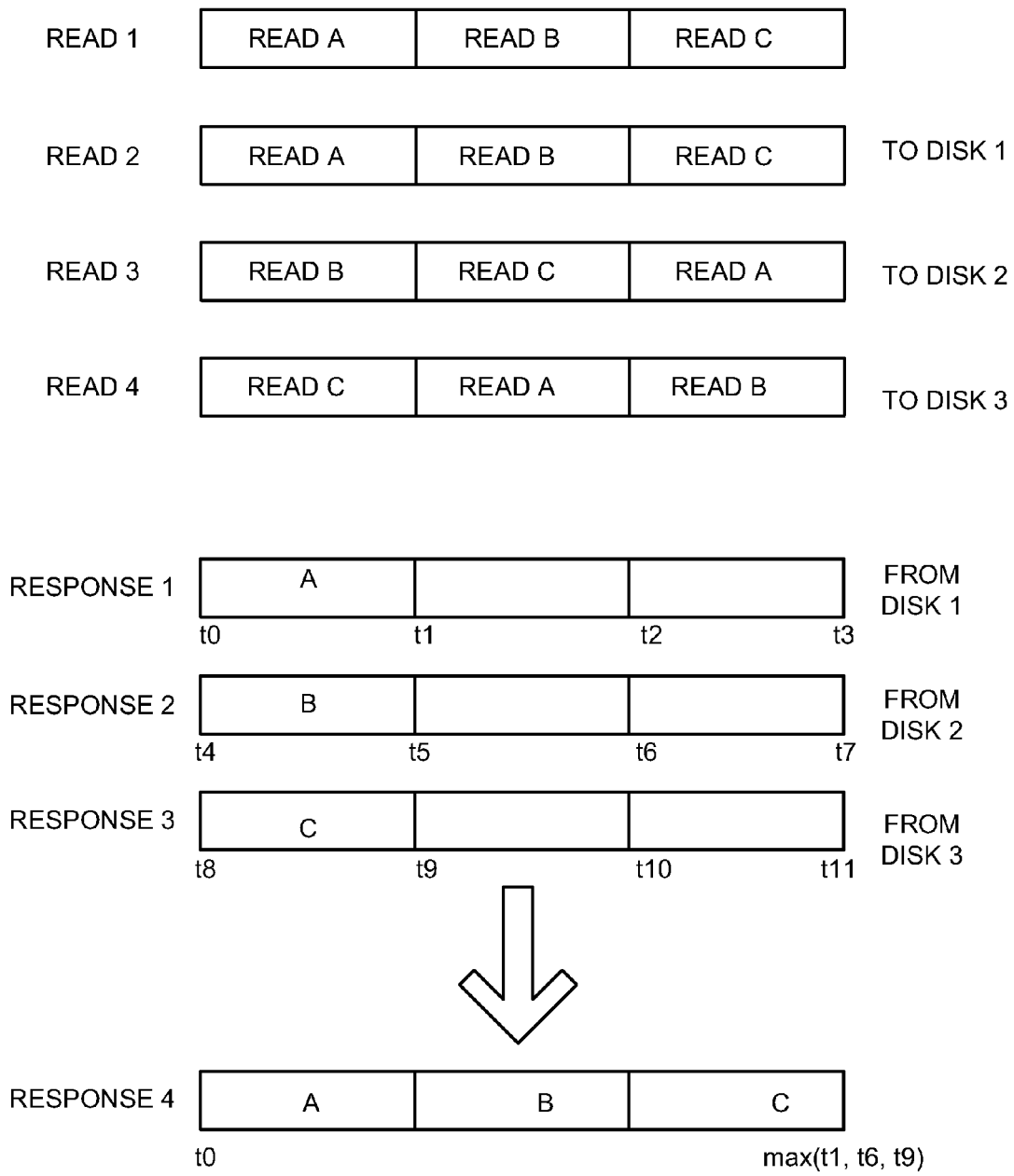
Figures 38, 71:
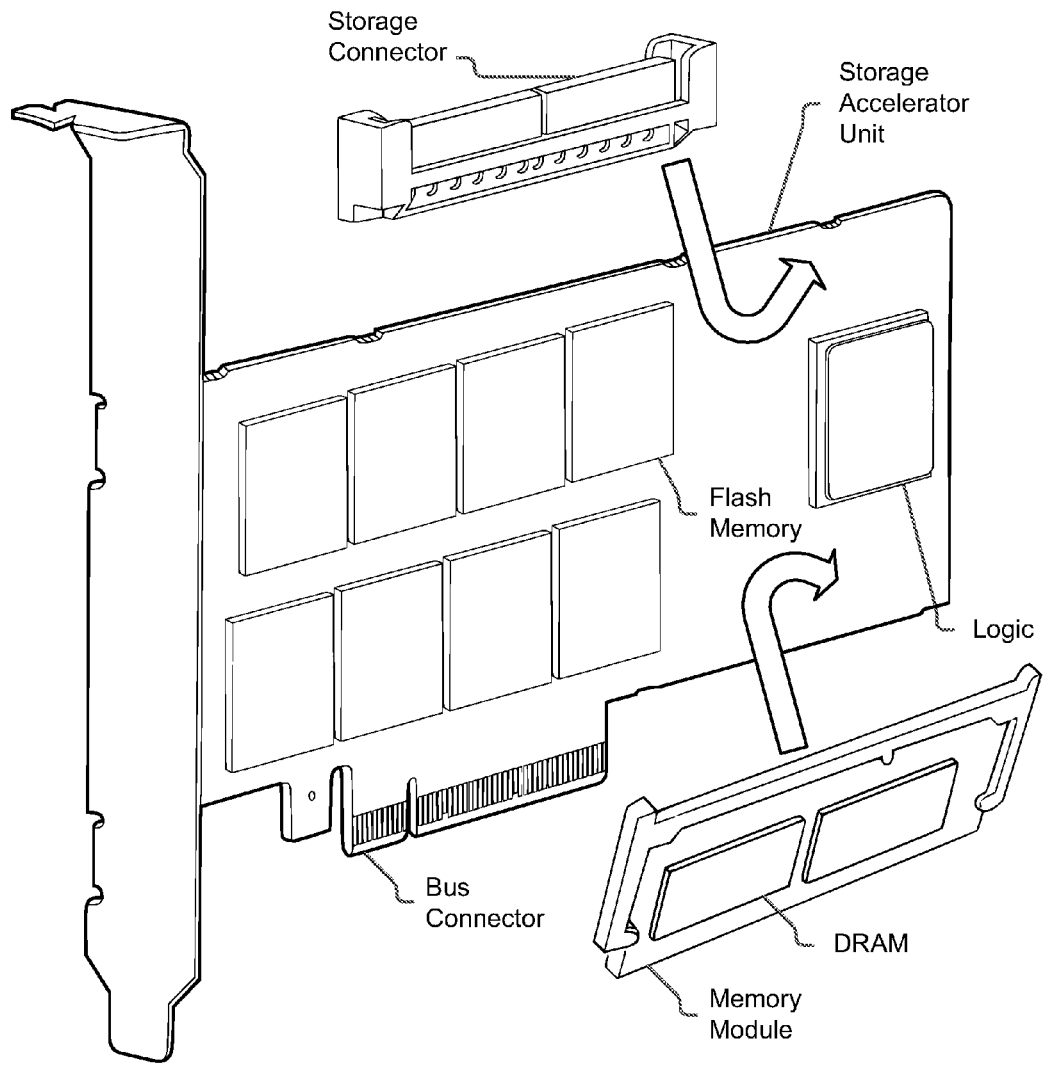

FIG. 71-37B shows a method for implementing reordering reads, in accordance with one embodiment FIG. 71-38 shows a storage accelerator unit, in accordance with one embodiment.

Figures 1, 72:
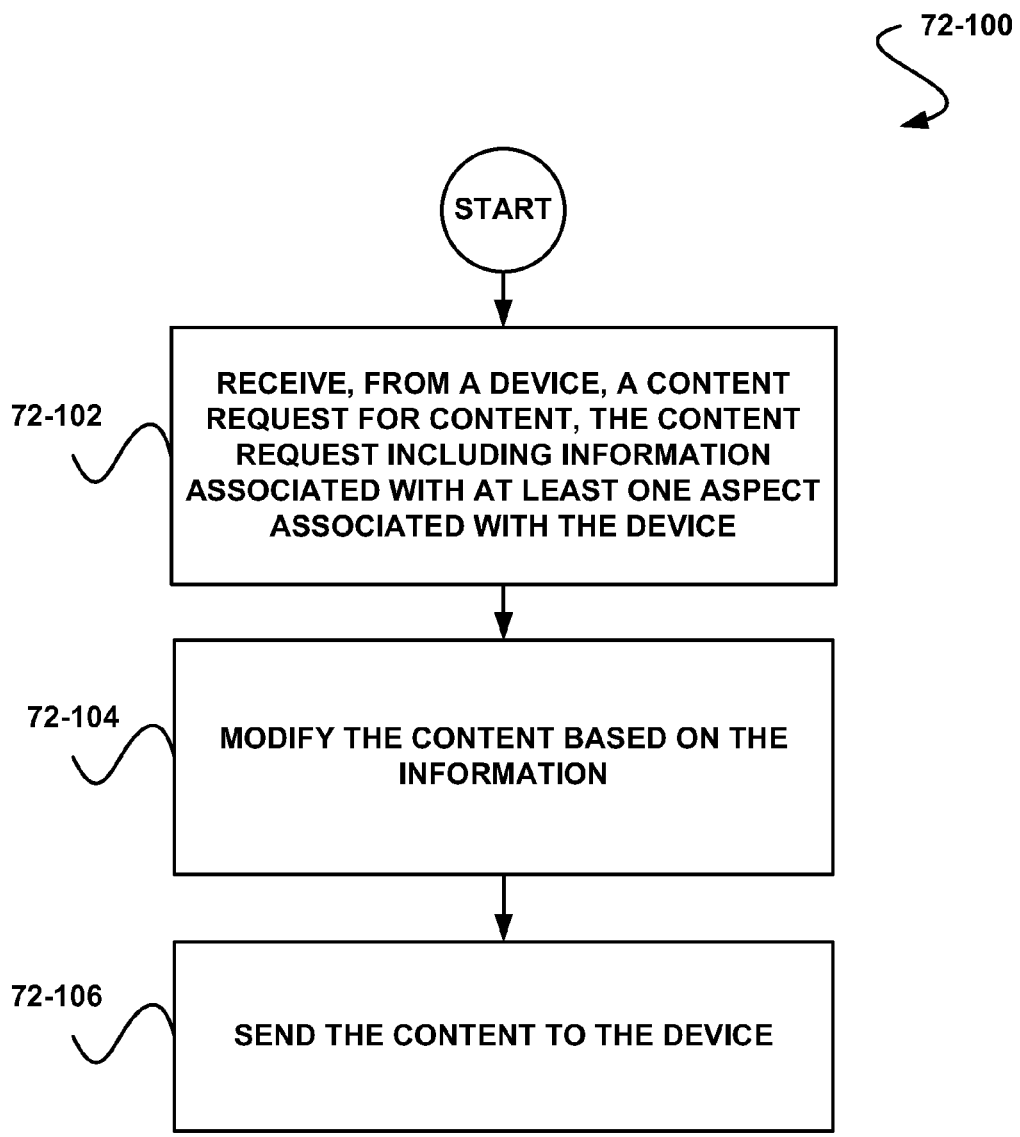
Figures 2, 72:
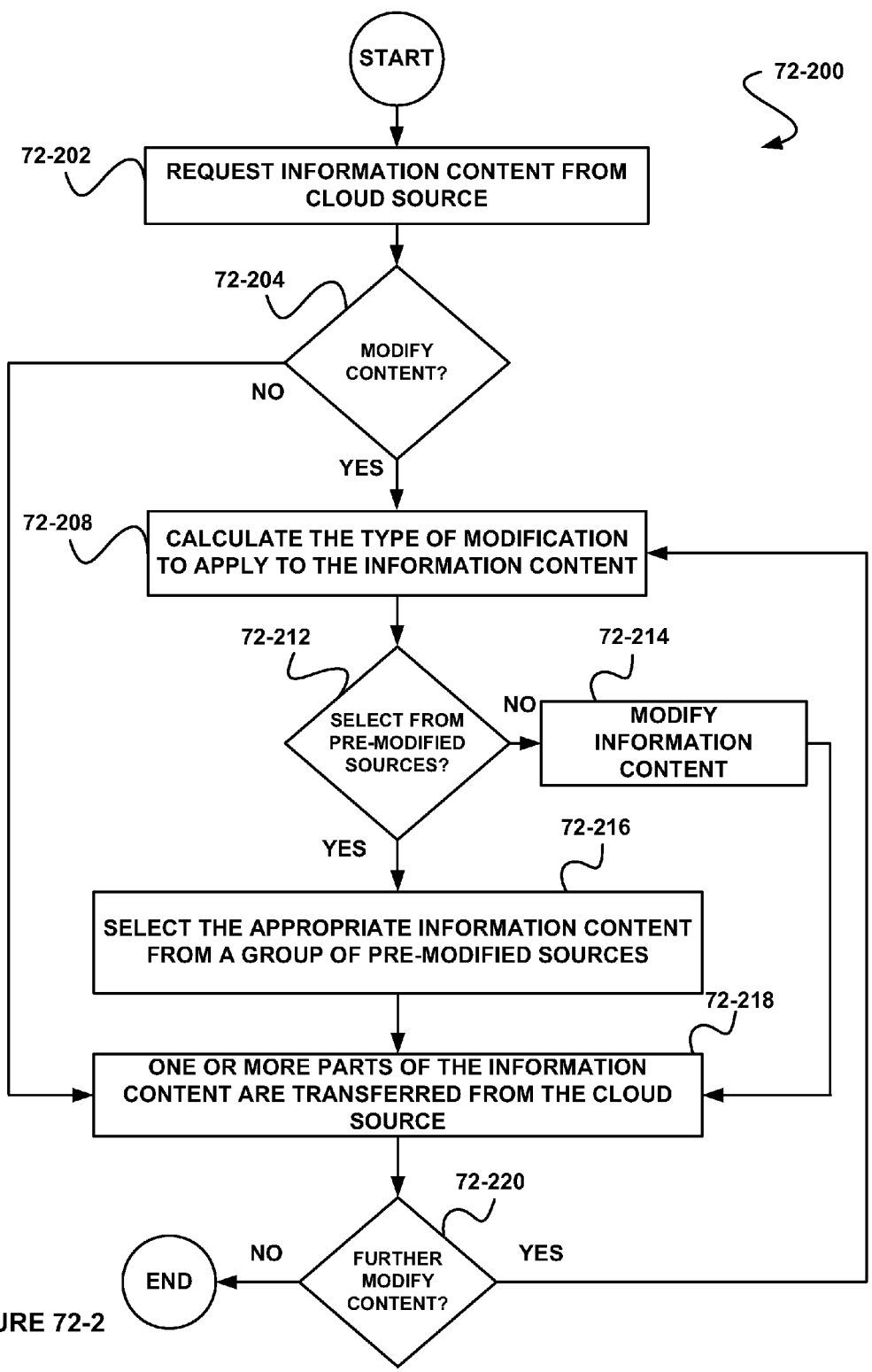
Figures 3, 72:
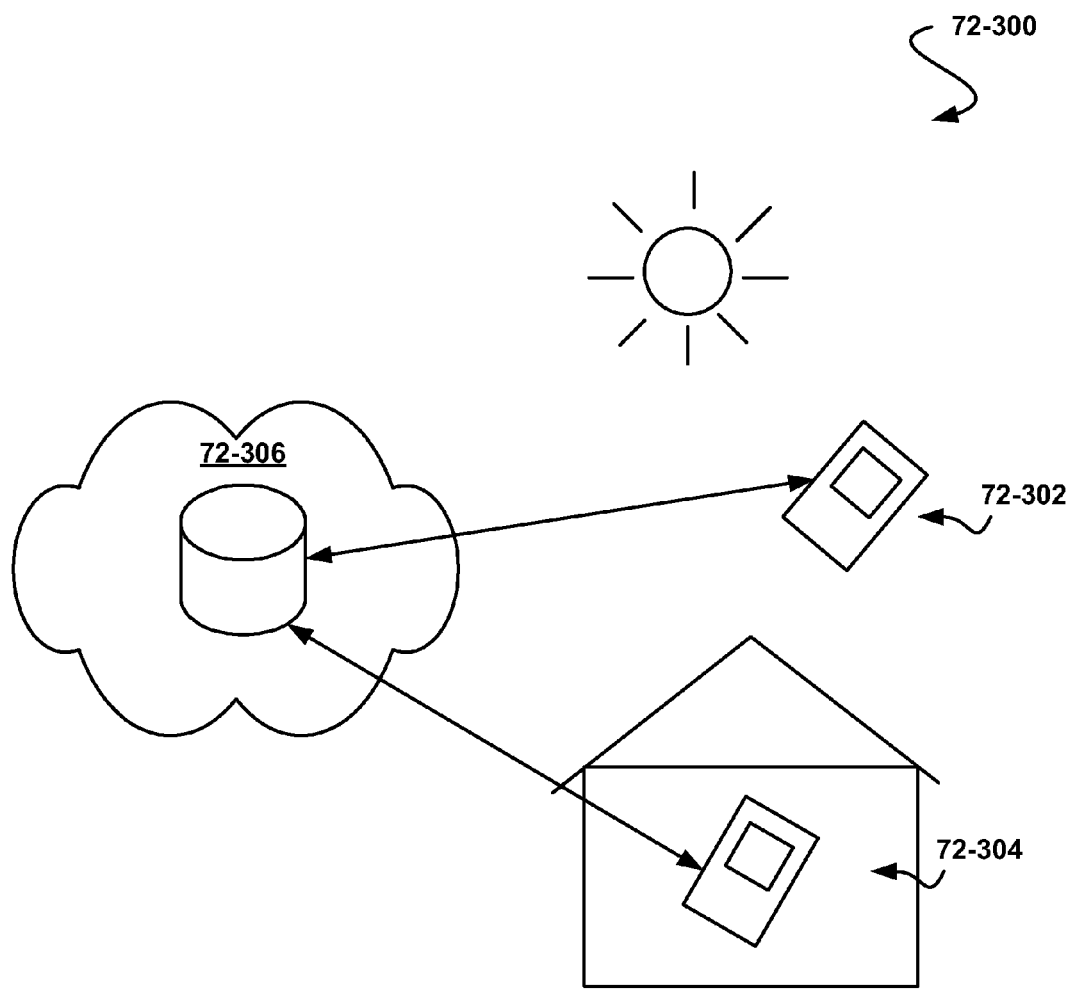
Figures 4, 72:
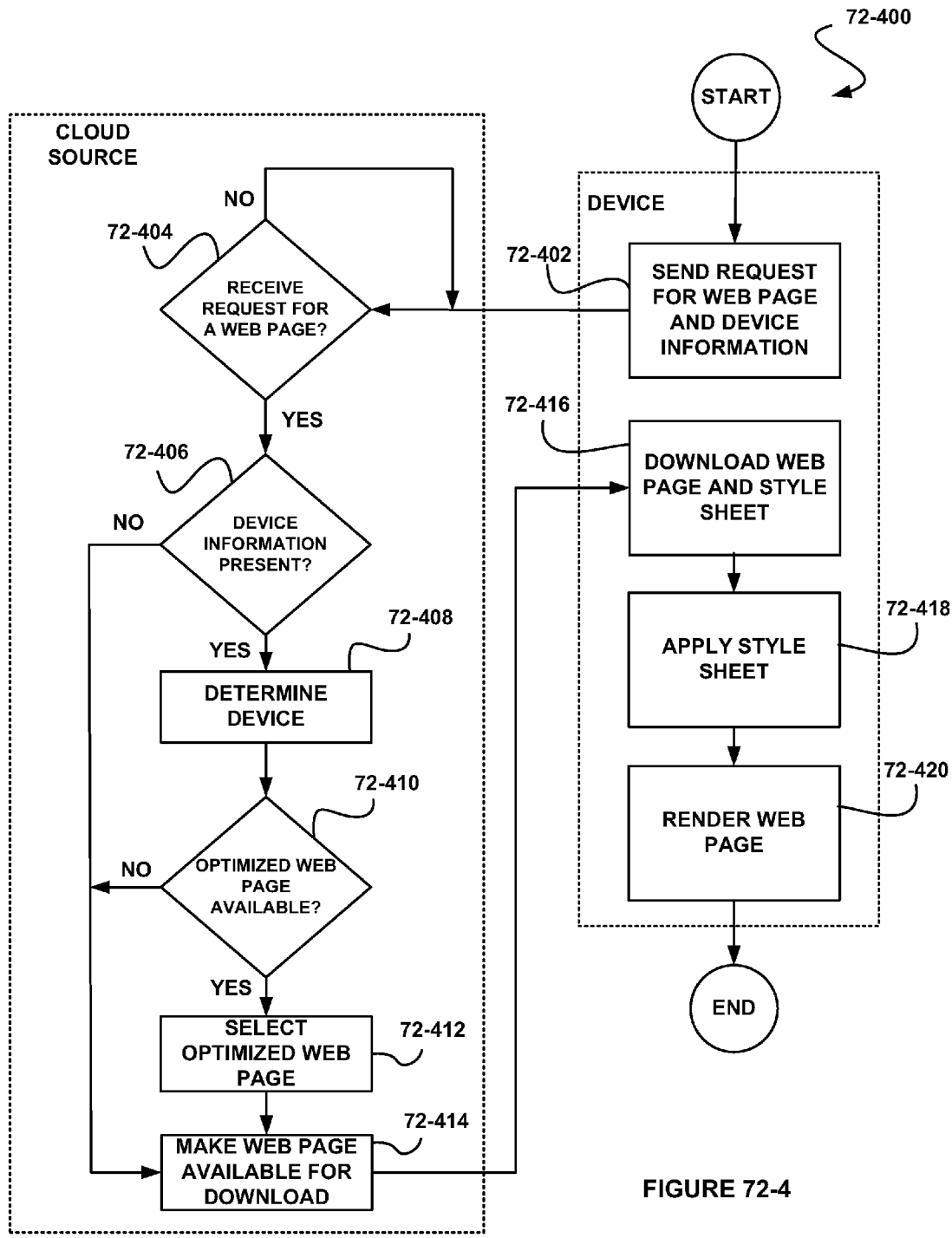
Figures 5, 72:
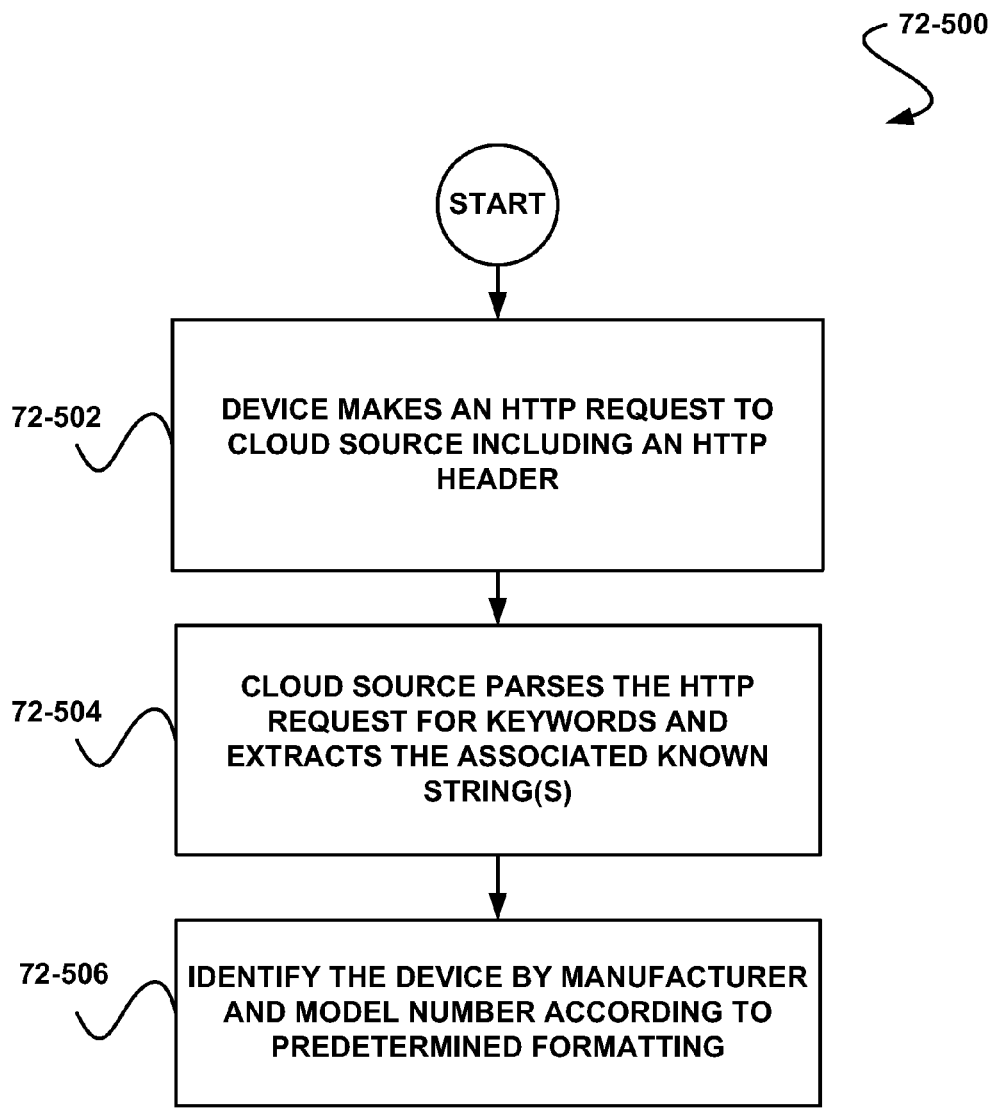
Figures 6, 72:
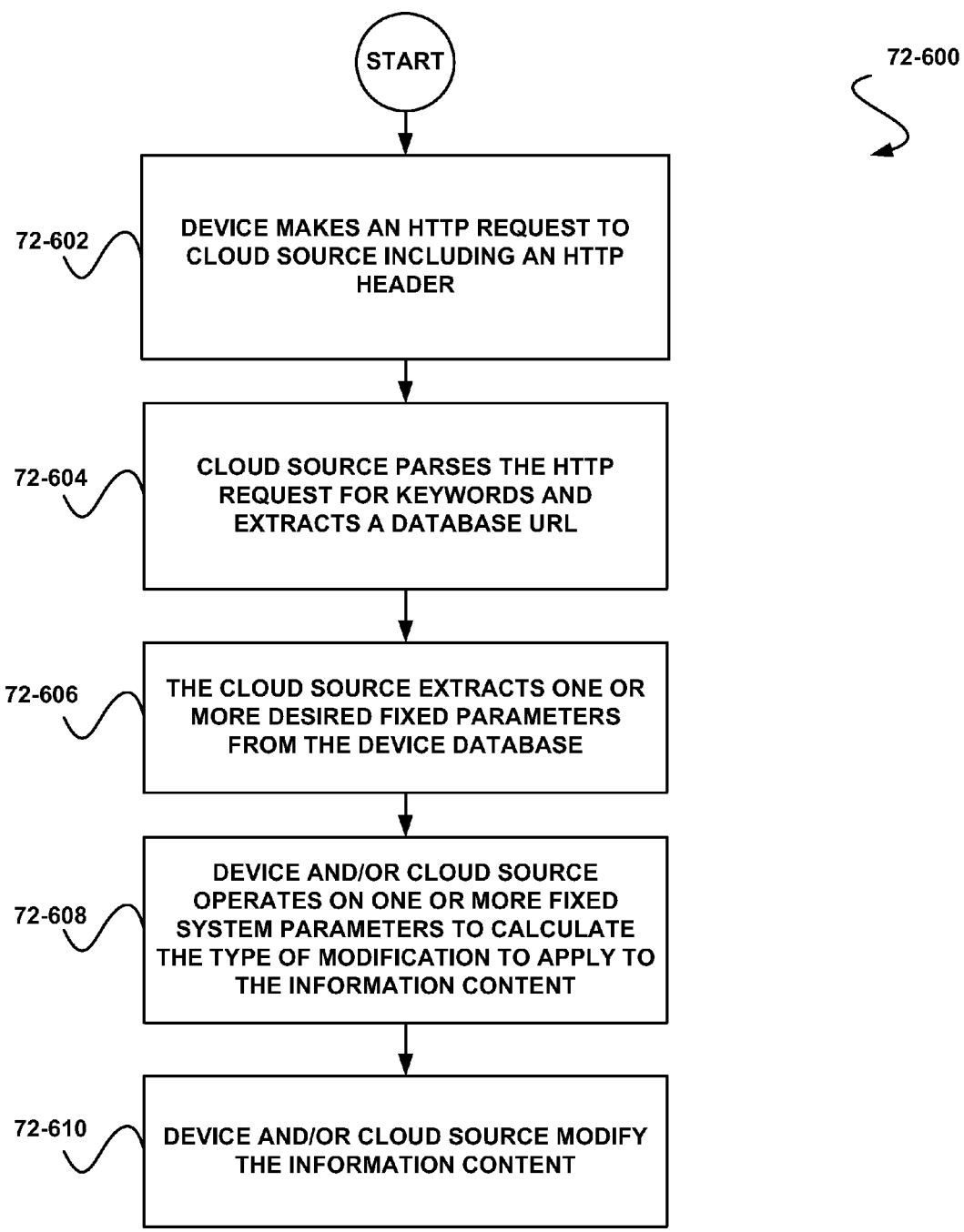
Figures 7, 72:
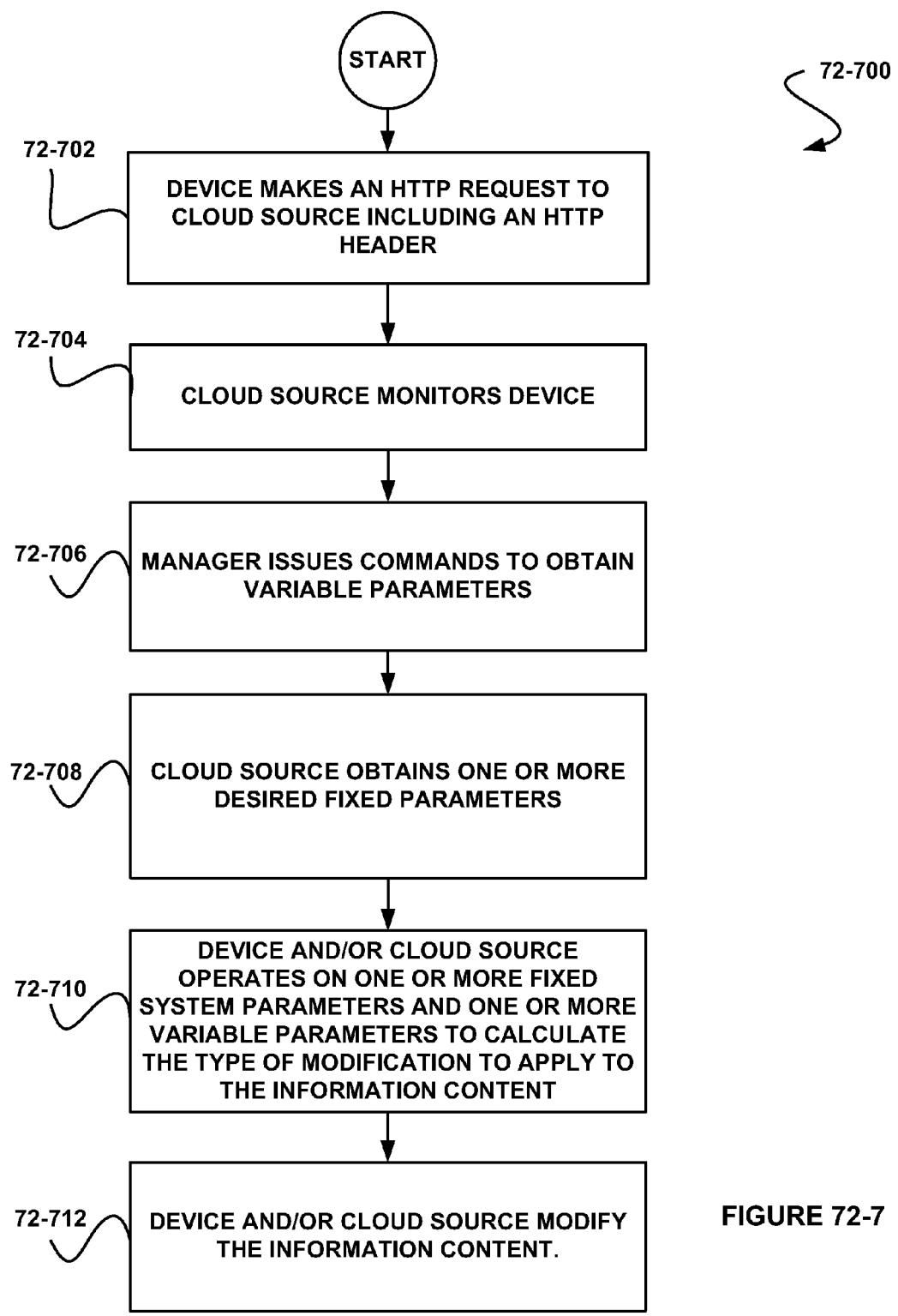

FIG. 72-1 shows a method for modifying content, in accordance with one embodiment.

FIG. 72-2 shows a method for modifying content, in accordance with another embodiment.

FIG. 72-3 shows a system for modifying content, in accordance with one embodiment.

FIG. 72-4 shows a method for modifying content, in accordance with another embodiment.

FIG. 72-5 shows a method for device identification in order to modify information content, in accordance with another embodiment.

FIG. 72-6 shows a method for obtaining and using static system parameters to modify information content, in accordance with another embodiment.

FIG. 72-7 shows a method for obtaining and using dynamic system parameters to modify information content, in accordance with another embodiment.

Figures 8A, 72:
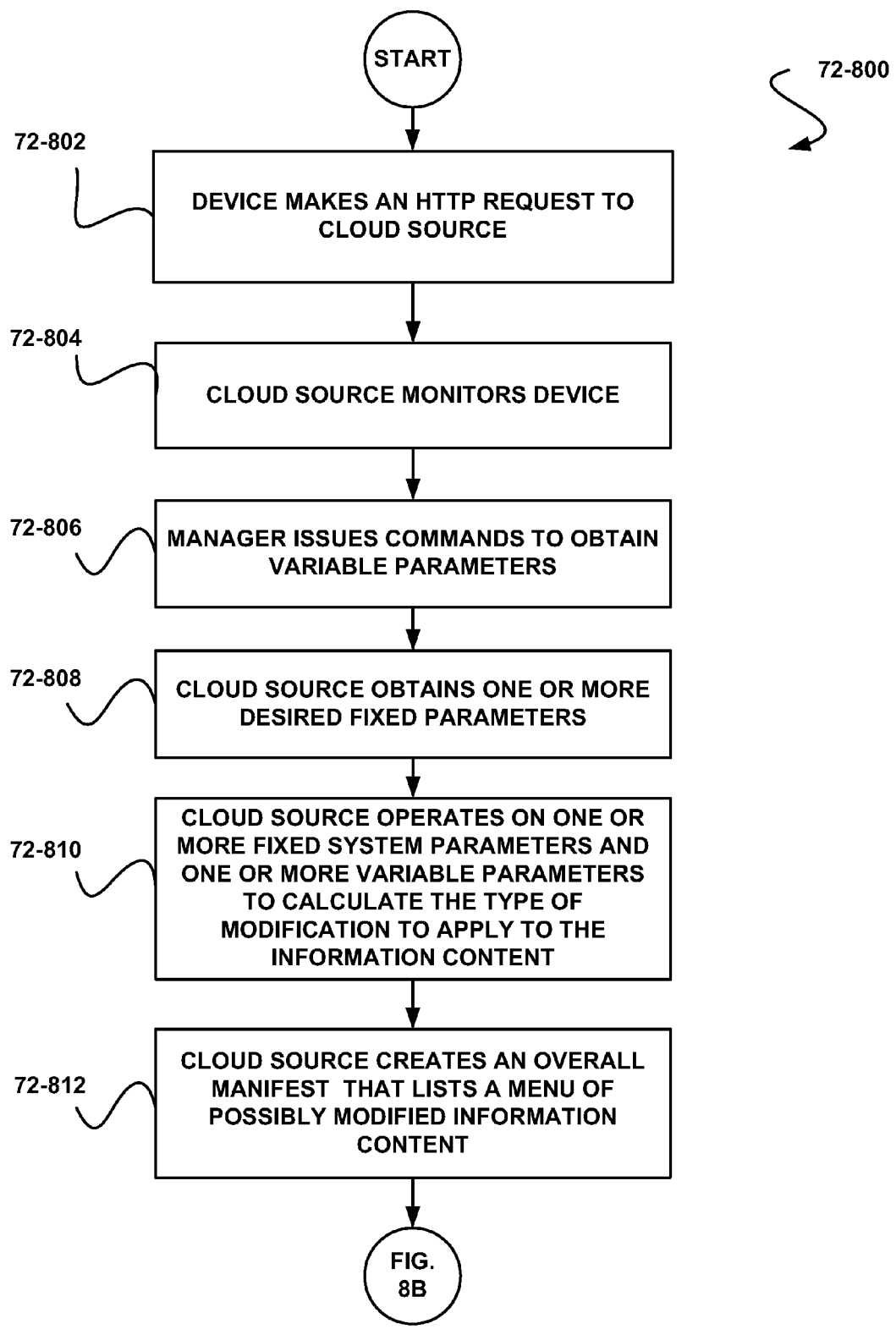
Figures 8B, 72:
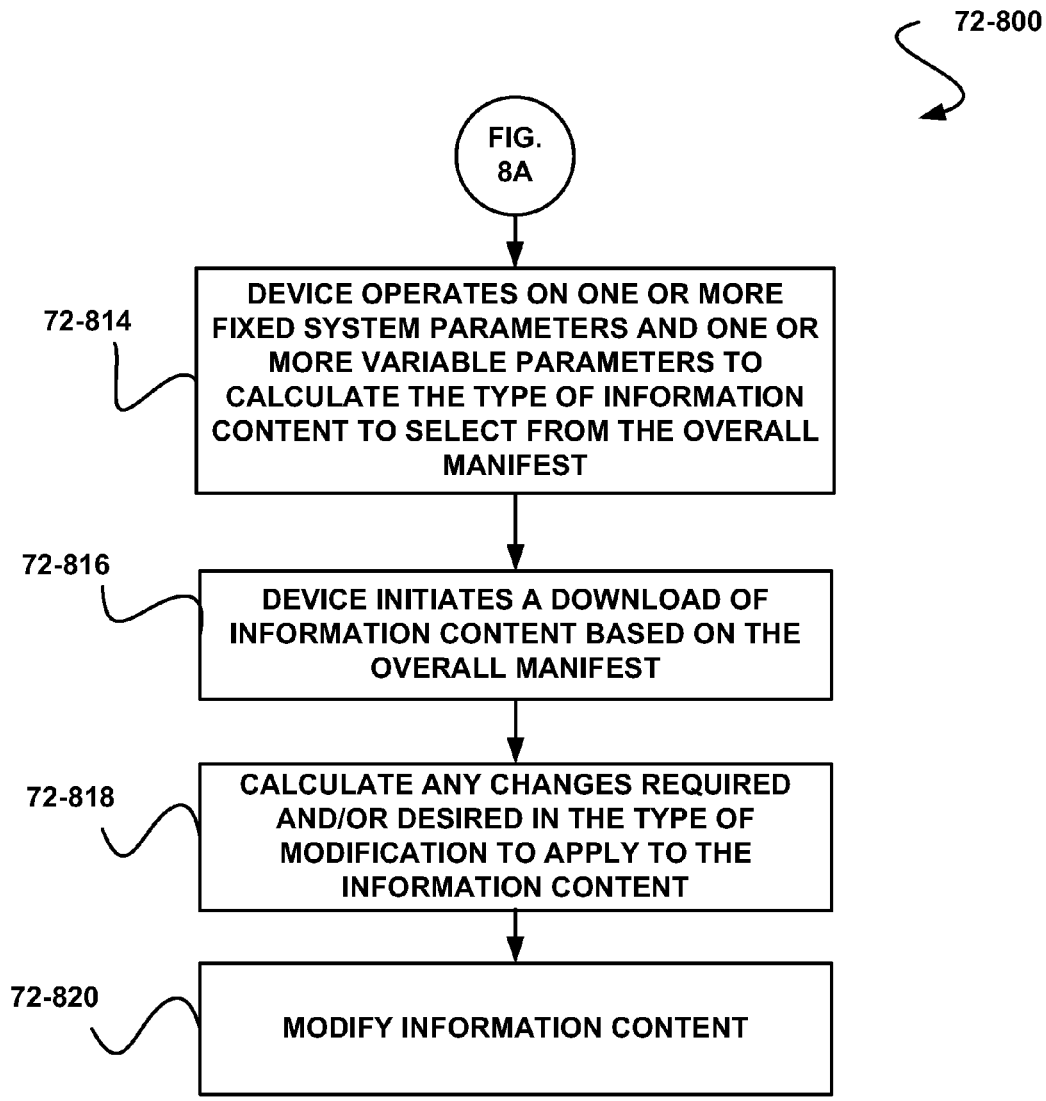
Figures 9, 72:
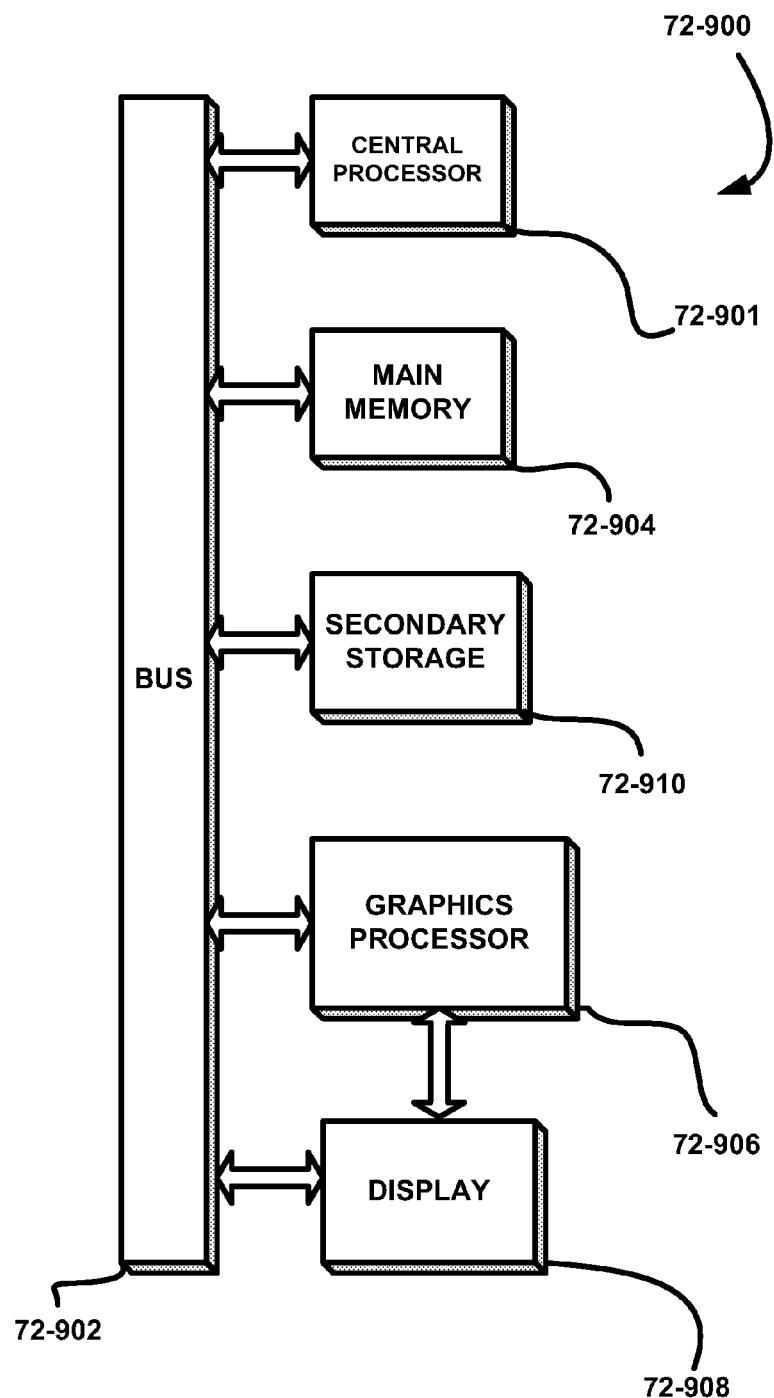

FIGS. 72-8A and 72-8B show a method for utilizing manifests to control system behavior and modify information content, in accordance with another embodiment.

FIG. 72-9 illustrates an exemplary system in which the various architecture and/or functionality of the various previous embodiments may be implemented.

While the invention is susceptible to various modifications, combinations, and alternative forms, various embodiments thereof are shown by way of example in the drawings and will herein be described in detail. It should be understood, however, that the accompanying drawings and detailed description are not intended to limit the invention to the particular form disclosed, but on the contrary, the intention is to cover all modifications, combinations, equivalents and alternatives falling within the spirit and scope of the present invention as defined by the relevant claims.

DETAILED DESCRIPTION

Terms that are special to the field of the invention or specific to this description may, in some circumstances, be defined in this description. Further, the first use of such terms (which may include the definition of that term) may be highlighted in italics just for the convenience of the reader. Similarly, some terms may be capitalized, again just for the convenience of the reader. It should be noted that such use of italics and/or capitalization and/or other formatting, highlighting etc, by itself, should not be construed as somehow limiting such terms: beyond any given definition, and/or to any specific embodiments disclosed herein, etc.

In this description there may be multiple figures that depict similar structures with similar parts or components. Thus, as an example, to avoid confusion an Object in FIG. 1 may be labeled and/or referenced as "Object (1)" and a similar, but not identical, Object in FIG. 2 is labeled and/or referenced as "Object (2)", etc. Again, it should be noted that use of such labeling and reference manner, by itself, should not be construed as somehow limiting such terms: beyond any given definition, and/or to any specific embodiments disclosed herein, etc.

In the following detailed description and in the accompanying drawings, specific terminology and images are used in order to provide a thorough understanding. In some instances, the terminology and images may imply specific details that are not required to practice all embodiments. Similarly, the embodiments described and illustrated are representative and should not be construed as precise representations, as there are prospective variations on what is disclosed that may be obvious to someone with skill in the art. Thus this disclosure is not limited to the specific embodiments described and shown but embraces all prospective variations that fall within its scope. For brevity, not all steps may be detailed, where such details will be known to someone with skill in the art having benefit of this disclosure.

In the following detailed description and in the accompanying drawings, some embodiments and their constituent parts may have been simplified for clarity of explanation. In some cases, a complex system may be broken down into its constituent parts and pieces and each part or piece explained separately. The explanations for each part or piece may possibly use a separate figure along with accompanying text to describe variations and alternative implementations. In some cases, complex elements have been simplified to more clearly define their function. In many cases, a system may be comprised of multiple complex elements with each element being a more complex version of a simple part or piece that has been explained separately. It is not possible to describe every possible combination of complex elements in all possible systems. Thus, the description herein is not limited to just the specific embodiments of parts or pieces described with each figure or in an accompanying explanation, or even those example systems described, but rather the possible combinations of complex elements based on the parts and pieces described.

DEFINITIONS

A computer system (e.g., a host system, host, computer, etc.) may include one or more storage systems (or storage subsystems, disk systems, disk subsystems, etc.) that may include storage arrays that include storage devices. A storage device may include a solid-state storage device, hard-disk drive (HD or HDD), or other device (e.g., tape, optical media, etc.).

A solid-state storage device may refer to a solid-state disk (SSD), but the solid-state storage device is not necessarily an SSD. A solid-state storage device may, for example, comprise memory devices such as flash memory devices (e.g., NAND, NOR, MLC, SLC, etc.), but may also comprise other forms of solid-state memory devices or memory components (e.g., SRAM, DRAM, MRAM, volatile memory, non-volatile memory, etc.), a combination of different types of solid-state components and/or other memory devices, or a combination of solid-state memory with other types of storage devices (e.g., hybrid disk, etc.). An SSD may be in a form-factor that is a drop-in replacement for a hard-disk (3.5", 2.5" form factors, etc.) or may be in any other form-factor or with any interface (e.g., Compact Flash CF, MultiMediaCard MMC, miniSD, Memory Stick, SmartMedia, TransFlash, Secure Digital SD, DIMM or other memory module form factor, PCI Express Card, mini PCI-E card, etc.). An SSD may use a standard storage interface (e.g., IDE, SAS, SATA, etc.) or an IO bus interface (e.g., PCI, PCI-E, USB, LightPeak, etc.), a networking interface (e.g., Ethernet, FCoE, Infiniband, etc.), a CPU bus interface (e.g., Intel QPI, HyperTransport, etc.), or other interface (e.g., PCI-E over Ethernet, etc.). An SSD in a storage array may have a capacity of more than 100 Gbytes and contain tens of NAND flash memory chips. A typical 1 Gbit NAND flash memory chip may contain 1024 flash blocks with each flash block containing 64 flash pages and each flash page containing 2 kbytes.

Storage arrays may also include a combination of SSD and HDD, or combinations of various storage devices (e.g., magnetic, optical, tape, solid-state, etc.).

A solid-state storage device may use a disk controller (e.g., storage controller, controller, ASIC, other chips component(s), etc.) to provide the computer system with a standard storage (e.g., disk, storage networking, etc.) interface (e.g., IDE, SATA, SAS, Fibre Channel (FC), etc.), a standard peripheral (e.g., IO bus, IO attach, etc.) interface (e.g., PCI-E, USB, PCI Express, PCI, etc.), other standard interface (e.g., Ethernet, wireless 802.11, etc.), a proprietary (e.g., non-standard, etc.) interface, a combination of these (e.g., PCI-E over Ethernet, FC over Ethernet (FCoE), etc.), or other storage, networking, interconnect interface(s) etc.

A storage array controller (often also called disk controller, host-bus adapter, etc.) may be logically located between the computer system and one or more SSDs or HDDs in a disk subsystem. In the context of the present description, the use of the term disk controller has been avoided as a term to describe a controller that controls one or more disks. The term storage array controller has been used herein for a controller that controls one or more disks. In some cases, each disk (HDD or SSD etc.) may have its own disk controller, thus causing potential confusion over terms. Alternative terms for storage array controller may include host-bus adapter, host adapter, host controller. However, the term host-bus adapter (often abbreviated HBA) and similar terms have been avoided herein to avoid confusion with HBA used here for host block address.

An SSD may include its own SSD controller, but, in some cases, a storage array controller may have more resources than an SSD controller. A storage array controller may use resources, such as memory, CPU, logic, non-volatile memory, etc., as well as unique information (e.g., because a storage array controller is higher than the SSD controller in the storage array hierarchy, i.e., further from the storage devices) in order to manage and control a storage array as well as provide information to an SSD controller.

A computer system typically contains one or more CPUs. A CPU may execute (e.g., run, etc.) an operating system (e.g., Microsoft Windows, Linux. MacOS, etc.). An operating system (OS) typically sees a storage array as a collection of disk sectors or just sectors (and sectors may also be called blocks). Disk sectors may be 512 bytes in length (and typically are in the 2011 timeframe). The sectors or blocks of a storage device are typically addressed as logical blocks using a logical block address (LBA).

To avoid confusion, the term host block address (HBA) is used herein for the LBA used to address a storage array controller. Unless explicitly stated otherwise, it is assumed that the host block size (HBS) is equal to the disk block size (DBS). The HBA may be a composite or union of a logical unit number (LUN) that identifies a logical portion of the storage array or disk or other device in the storage array; an LBA; the virtual machine (VM), if any; a UserID that identifies the user application; a VolumeID that identifies a logical target volume; and other data that may be used for logical access or management purposes. To simplify the description, clarify the figures, and in particular to make it clear that operations may be performed on different LUNs, the LUN may be shown separately from HBA in figures.

A disk number (D) may identify a disk or other storage device in the storage array. A disk logical block address (DBA) is the LBA that identifies the disk sector on the disk or other storage device. An array block address (ABA) is a composite or union of D and DBA, written <D, DBA>. The storage array may be a RAID array, JBOD, or any other particular type of storage array.

A disk controller for an HDD or SSD maintains the relationship between an ABA (or the DBA portion of the ABA) and the disk sectors that are physically part of a storage device (often called the physical disk sectors or physical sectors).

To summarize, with just a single disk, the host may provide an LBA directly to the disk; the disk controller may convert the LBA to the physical disk sector (e.g., for an HDD) or to the PBN (e.g., for an SSD). In the presence of a storage array controller the host may still provide an LBA, but now to the storage array controller (and thus the LBA may be referred to as an HBA to avoid confusion); the storage array controller may then map this HBA to an ABA and may provide the ABA (or possibly just the DBA portion of the ABA) to the disk; the disk (e.g., an HDD or SSD, etc.) may then convert this DBA or ABA (treating the DBA portion of the ABA as though it were just an LBA, which it is) to a physical disk address: either the physical disk sector (e.g., for an HDD) or PBN (e.g., for an SSD).

In various embodiments, structures and their functions, operations and algorithms (e.g., methods, functions, etc.) may be described in terms of software operations, code and pseudo-code. It should be noted that the algorithms may be performed in hardware; software; firmware; microcode; a combination of hardware, software, firmware or microcode; or in any other manner that performs the same function and/or has the same effect. In various embodiments, the data structures, or parts of the structures, may be stored in the storage array controller in SRAM, DRAM, embedded flash, or other memory. Additionally, the data structures, or parts of them, may be stored outside the storage array controller. For example, the data structures may be stored on any of the storage devices of a storage array (the local storage or remote storage, i.e., remote from the storage array connected to the storage array controller) or on a host system (the local host or a remote host, i.e., remote from the host connected to the storage array controller).

A storage command may be directed to a storage device and may specify one or more operations, such as read, write, etc. A storage command may be referred to as a disk command or just command. To help prevent such confusion, the term storage command may be used when referencing commands in general. The term disk command (or disk write, etc.) may be utilized for the command as it arrives at (or is received by) the disk (either SSD or HDD, usually via a standard interface or storage bus, such as SATA, etc.). The term host command (or host write, etc.) may be utilized for the command as it leaves (or is transmitted by) the OS. A disk command may be the same as a host command when there is a direct connection between the OS on a host system and a single disk.

A storage array controller may perform certain functions instead of (or in addition to) an OS running on a host system; and a storage array controller may also perform certain functions instead of (or in addition to) disk controller(s) in a storage array. A storage array controller may be logically located between a host system and storage array (or disk subsystem, storage subsystem, etc.). Each disk may contain its own disk controller, but a storage array controller may have more resources than a disk controller. The algorithms described here allow a storage array controller and attached storage accelerator units (SAUs) to use resources, such as memory, non-volatile memory, etc., as well as unique information (because a storage array controller is higher than a disk controller in a storage array hierarchy, i.e., further from the storage devices) in order to manage and control a storage array as well as provide information to disk controller(s). For example, a storage array controller may be aware of LUNs but a disk controller may not be aware of LUNs. This hierarchical management approach has advantages and potential uses that are explained throughout this description in the forms of various algorithms that may be employed by themselves or in combination.

A device driver is typically (though not necessarily) software that may be manufactured with and sold with a storage array controller. In various embodiments, the device driver may be implemented in software, hardware, firmware or a combination, and may be designed, manufactured and/or sold separately.

In one embodiment, a computer system may comprise multiple virtual machines (VMs), each VM including an operating system, and a hypervisor.

Each OS may include a file system and one or more storage drivers. The file system (sometimes considered part of an OS) may translate or convert from file-based access (i.e., in terms of directories, file names and offsets, etc.) to disk-based access (i.e., in terms of LBAs etc.). The storage driver (sometimes considered part of an OS) may be responsible for handling a disk or other storage device(s). The storage driver may be separate and distinct from the device driver. The storage driver may or may not be part of a storage stack, which is the software that controls access to a file system.

In the context of solid-state storage, typically flash memory, when a flash page (or some other portion) of a storage device is no longer required (i.e., it is obsolete, no longer valid, or is invalid, etc.) that flash page may be marked as dirty. When an entire flash block (e.g., typically between 16 to 256 flash pages) is dirty, the entire flash block may be erased and free space may be reclaimed. If free space on the device is low, a flash block may be chosen that has some dirty flash pages and some clean (i.e., pages that are not dirty, are good, or valid, etc.) flash pages. The clean flash pages may be transferred (i.e., written, moved or copied) to a new flash block. All the original clean flash pages may be marked as dirty and the old flash block may be erased. In the context of solid-state storage, this process of transferring flash pages to new flash blocks and erasing old flash blocks may be referred to as garbage collection Example embodiments described in this disclosure include one or more computer systems with one or more central processor units (CPUs) and possibly one or more I/O systems coupled to one or more storage systems that contain one or more storage array controllers and one or more storage devices.

In one embodiment, the storage system may include one or more bus structures. Depending on the constraints (e.g., signaling methods used, the intended operating frequencies, space, power, cost, and other constraints, etc.) various alternate bus structures may be used. A point-to-point bus may provide the optimal performance in systems requiring high-speed interconnections, due to the reduced signal degradation compared to bus structures having branched signal lines, switch devices, or stubs. However, when used in systems requiring communication with multiple devices or sub-systems, a point-to-point or other similar bus will often result in significant added cost (e.g., component cost, board area, increased system power, etc.) and may reduce the potential memory density due to the need for intermediate devices (e.g., buffers, re-drive circuits, etc.).

Functions and performance similar to that of a point-to-point bus can be obtained by using switch devices. Switch devices and other similar solutions offer advantages (e.g., increased memory packaging density, lower power, etc.) while retaining many of the characteristics of a point-to-point bus. Multi-drop bus solutions provide an alternate solution, and though often limited to a lower operating frequency can offer a cost/performance advantage for many applications. Optical bus solutions permit significantly increased frequency and bandwidth potential, either in point-to-point or multi-drop applications, but may incur cost and space impacts.

Although not necessarily shown in all the Figures, the storage systems may also include one or more separate control (e.g., command distribution, information retrieval, data gathering, reporting mechanism, signaling mechanism, register read/write, configuration, etc.) buses (e.g., a presence detect bus, an I2C bus, an SMBus, combinations of these and other buses or signals, etc.) that may be used for one or more purposes including the determination of the storage device and/or storage system attributes (generally after power-up), the reporting of fault or other status information to part(s) of the system, calibration, temperature monitoring, the configuration of storage device(s) and/or storage subsystem(s) after power-up or during normal operation or for other purposes. Depending on the control bus characteristics, the control bus(es) might also provide a means by which the valid completion of operations could be reported by storage device (s) to the storage controller(s), or the identification of failures occurring during the execution of storage controller requests, etc.

As used herein, the term bus refers to one of the sets of conductors (e.g., signals, wires, traces, and printed circuit board traces or connections in an integrated circuit) connecting two or more functional units in a computing system. The data bus, address bus and control signals may also be referred to together as constituting a single bus. A bus may include a plurality of signal lines (or signals), each signal line having two or more connection points that form a main transmission line that electrically connects two or more transceivers, transmitters and/or receivers.

As used herein, a signal (or line, signal line, etc.) refers to one or more electrical conductors or optical carriers, generally configured as a single carrier or as two or more carriers, in a twisted, parallel, or concentric arrangement, used to transport at least one logical signal. A logical signal may be multiplexed with one or more other logical signals generally using a single physical signal but logical signal(s) may also be multiplexed using more than one physical signal.

As used herein, memory devices are generally defined as integrated circuits that are composed primarily of memory (e.g., storage, etc.) cells, such as DRAMs (Dynamic Random Access Memories), SRAMs (Static Random Access Memories), FeRAMs (Ferro-Electric RAMs), MRAMs (Magnetic Random Access Memories), Flash Memory (e.g., NAND flash, NOR flash, etc.) and other forms of random access and related memories that store information in the form of electrical, optical, magnetic, chemical, biological, combination(s) of these, and/or in other forms.

Dynamic memory device types may include FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs, DDR2, DDR3, DDR4, or any of the expected follow-on devices and related technologies such as Graphics RAMs, Video RAMs, LP RAM (Low Power DRAMs) which are often based on the fundamental functions, features and/or interfaces found on related DRAMs.

Flash memory device types may include: NAND, NOR, SLC, MLC, TLC using any interface (e.g., standard interface (e.g., ONFI, etc.); non-standard interface; etc.). Flash memory device types may also include any of the expected follow-on devices and related technologies.

Memory devices may include chips (die) and/or single or multi-chip or multi-die packages of various types, assemblies, forms, and configurations. In multi-chip packages, the memory devices may be packaged with other device types (e.g., other memory devices, logic chips, CPUs, hubs, buffers, intermediate devices, analog devices, programmable devices, etc.) and may also include passive devices (e.g., resistors, capacitors, inductors, etc.). These multi-chip packages may include cooling enhancements (e.g., an integrated heat sink, heat slug, fluids, gases, micromachined structures, micropipes, capillaries, etc.) that may be further attached to the carrier or another nearby carrier or other heat removal or cooling system. Other forms of packaging (e.g., assemblies, modules, cards, units, molding, encapsulation, etc.) for memory devices are also possible.

Although not necessarily shown in all the Figures, storage and memory support devices (e.g., storage controller(s), network controller(s), chipset(s), adapter(s), expander(s), buffer(s), buffer circuit(s), buffer chip(s), register(s), intermediate circuit(s), power supply regulator(s), VRMs, hub(s), re-driver(s), PLL(s), DLL(s), non-volatile memory, SRAM, DRAM, logic circuits, analog circuits, digital circuits, diodes, switches, LEDs, crystals, active components, passive components, combinations of these and other circuits, etc.) may be comprised of multiple separate chips (e.g., die, dies, dice, integrated circuits, etc.) and/or components, may be combined as multiple separate chips onto one or more substrates, may be combined into a single package (e.g., using die stacking, multi-chip packaging, etc.) or even integrated onto a single device based on tradeoffs such as: technology, power, space, weight, cost, etc.

One or more of the various passive devices (e.g., resistors, capacitors, inductors, combination (a) of these, etc.) may be integrated into the support chip packages, or into the substrate, board, PCB, or raw card itself, based on tradeoffs such as: technology, power, space, cost, weight, etc. These packages may include an integrated heat sink or other cooling enhancements (e.g., such as those described above, etc.) that may be further attached to the carrier or another nearby carrier or other heat removal or cooling system.

Memory and storage devices, intermediate devices and circuits, hubs, buffers, registers, clock devices, passives and other memory and storage support devices etc. and/or other components may be attached (e.g., coupled, connected, etc.) to the storage system(s) and/or subsystem(s) and/or other component(s) via various methods including solder interconnects, conductive adhesives, socket structures, pressure contacts, electrical/mechanical/optical and/or other methods that enable communication between two or more devices (e.g., via electrical, optical, wireless, combinations of these, or alternate means, etc.).

The one or more storage system(s) and/or subsystem(s) and/or other components/devices may be connected (e.g., electrically, optically, wireless, etc.) to the CPU complex, computer system or other system environment via one or more methods such as soldered interconnects, connectors, pressure contacts, conductive adhesives, optical interconnects (e.g., laser, LED, optic fiber, etc.), wireless links (e.g., coupling, coils, etc.) and/or other signal communication and/or power delivery methods. Physical connector systems may include mating connectors (male/female), conductive contacts and/or pins on one carrier mating with a male or female connector, optical connections, pressure contacts (often in conjunction with a retaining, alignment, and/or closure mechanism) and/or one or more of various other communication and power delivery methods. The interconnection(s) may be disposed along one or more edges of an assembly (e.g., module, card, adapter, etc.) and/or placed a distance from the storage or other subsystem depending on such application requirements as ease of upgrade, ease of repair, cost, available space and/or volume, heat transfer constraints, component size and shape and other related physical, electrical, optical, visual/physical access, requirements and constraints, etc. Electrical interconnections on a card are often referred to as contacts, pins, connection pins, tabs, etc. Electrical interconnections on a connector are often referred to as contacts or pins.

The integrity, reliability, availability, serviceability, performance etc. of a communication path, data storage contents, and all functional operations associated with each element of a storage system or storage subsystem may be improved by using one or more fault detection and/or correction methods. Any or all of the various elements of a storage system or storage subsystem may include error detection and/or correction methods such as CRC (cyclic redundancy code, or cyclic redundancy check), ECC (error-correcting code), EDC (error detecting code, or error detection and correction), LDPC (low-density parity check), parity, checksum or other encoding/decoding methods suited for this purpose. Further reliability enhancements may include operation re-try (e.g., repeat, re-send, etc.) to overcome intermittent or other faults such as those associated with the transfer of information, the use of one or more alternate, stand-by, or replacement communication paths to replace failing paths and/or lines, complement and/or re-complement techniques or alternate methods used in computer, storage, communication, and related systems.

Additional functions that may reside local to the storage subsystem and/or storage system include write and/or read buffers, one or more levels of cache, protocol translation, error detection and/or correction circuitry, data scrubbing, local power management circuitry and/or reporting, operational and/or status registers, initialization circuitry, performance monitoring and/or control, and other functions.

TERMINOLOGY

The terminology used herein is for the purpose of describing particular embodiments only and is not intended to be limiting of the invention. As used herein, the singular forms (e.g., a, an, the, etc.) are intended to include the plural forms as well, unless the context clearly indicates otherwise.

The terms comprises and/or comprising, when used in this specification, specify the presence of stated features, integers, steps, operations, elements, and/or components, but do not preclude the presence or addition of one or more other features, integers, steps, operations, elements, components, and/or groups thereof.

In the following description and claims, the terms include and comprise, along with their derivatives, may be used, and are intended to be treated as synonyms for each other.

In the following description and claims, the terms coupled and connected may be used, along with their derivatives. It should be understood that these terms are not necessarily intended as synonyms for each other. For example, connected may be used to indicate that two or more elements are in direct physical or electrical contact with each other. Further, coupled may be used to indicate that that two or more elements are in direct or indirect physical or electrical contact. For example, coupled may be used to indicate that that two or more elements are not in direct contact with each other, but the two or more elements still cooperate or interact with each other.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a circuit, component, module or system. Furthermore, aspects of the present invention may take the form of a computer program product embodied in one or more computer readable medium(s) having computer readable program code embodied thereon.

In this description a portable multifunction device (a device) is used as an example. It should be understood, however, that one or more of the embodiments described herein may be applied to any device (e.g., consumer device, phone, phone system, cell phone, internet phone, music player, video player, camera, social interaction device, radios, TV, watch, personal communication device, electronic wallet, smart jewelry, personal computer, tablet, laptop computer, computer, server, embedded system, electronic glasses, displays, projector, computer appliance, kitchen appliance, home control appliance, lighting control, network device, router, switch, TiVO, AppleTV, GoogleTV, set-top box, cable box, modem, cable modem, PC, tablet, media box, streaming device, entertainment center, GPS device, automobile system, ATM, toy, gaming system, camera, video camera, music device, storage device, back-up device, exercise machine, e-book reader, PDA, combinations of these, etc.).

The device may support one or more applications e.g., search applications contacts and/or friends applications, messaging applications, telephone applications, video conferencing applications, e-mail applications, communications applications, voice recognition applications, instant messaging (IM) applications, blog and/or blogging applications, photographic applications (e.g., catalog, management, upload, editing, etc.), shopping, payment, digital camera applications, digital video camera applications, web browsing and browser applications, digital music player applications, digital video player applications, cloud applications, office productivity applications, backup and storage applications, other applications or combinations or multiple instances (e.g., versions, etc.) of these, etc.

Devices themselves may include (e.g., comprise, be capable of including, have features to include, have attachments, communicate with, etc.) one or more devices, e.g., as separate components, working in cooperation, as a collection of devices, as a multi-function device, with sockets or ports for extra devices and/or components, attached (e.g., direct attach, network attached, etc.) devices, upgrade components, expansion devices and/or modules, etc.

The device may have (e.g., execute, perform, capable of being programmed to perform, etc.) multiple functions (e.g., telephone, video conferencing, e-mail, instant messaging, blogging, digital photography, digital video, web browsing, digital music playing, social interaction, shopping, searching, combinations of these, etc.). Instructions for performing the device functions may be included in a computer readable storage medium or other computer program product configured for execution by one or more processors.

Language

The terminology and language used herein is for the purpose of describing particular embodiments only and is not intended to be limiting.

As used herein, the singular forms (e.g., a, an, the, one, etc.) are intended to include the plural forms as well, unless the context clearly indicates otherwise.

As used herein, the terms comprises and/or comprising, when used in this specification, specify the presence of stated features, numbers, integers, steps, operations, elements, and/or components, etc, but do not preclude the presence or addition of one or more other features, numbers, integers, steps, operations, elements, components, etc. and/or groups thereof.

In the following description and claims, the terms include and comprise, along with their derivatives, may be used, and are intended to be treated as synonyms for each other.

In the following description and claims, the terms coupled and connected may be used, along with their derivatives. It should be understood that these terms are not necessarily intended as synonyms for each other. For example, connected may be used to indicate that two or more elements are in direct physical or electrical contact with each other. Further, coupled may be used to indicate that that two or more elements are in direct or indirect physical or electrical contact. For example, coupled may be used to indicate that that two or more elements are not in direct contact with each other, but the two or more elements still cooperate or interact with each other.

The corresponding structures, materials, acts, and equivalents of all means or step plus function elements in the following claims are intended to include any structure, material, or act for performing the function in combination with other claimed elements as specifically claimed.

This description is presented for purposes of illustration and explanation, but is not intended to be exhaustive or limited to the invention in the forms disclosed. Modifications, permutations, combinations, and variations of embodiments will be understood and apparent to those of ordinary skill in the art without departing from the scope and spirit of this description.

The embodiments chosen and described herein are presented in order to best explain the principles of the embodiments and their practical applications, and to enable others of ordinary skill in the art to understand the embodiments with various modifications as are suited to the particular use contemplated.

As will be understood and appreciated by one skilled in the art, one or more embodiments described herein may be a system, device, method, or computer program product, etc. Accordingly, one or more embodiments described herein may take the form of an entirely hardware embodiment, an entirely software embodiment (including firmware, resident software, micro-code, etc.) or an embodiment combining software and hardware aspects that may all generally be referred to herein as a circuit, component, module or system. Furthermore, one or more embodiments described herein may take the form of a computer program product embodied in one or more computer readable medium(s) having computer readable program code embodied thereon.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), tablet computer, peripheral (e.g., printer, etc.), any component of a computer, and/or any other type of logic. In order to facilitate communication among the networks 102, at least one gateway 108 is optionally coupled therebetween.

FIG. 2 shows a representative hardware environment that may be associated with the servers 104 and/or clients 106 of FIG. 1, in accordance with one embodiment. Such figure illustrates a typical hardware configuration of a mobile device in accordance with one embodiment having a central processing unit 210, such as a microprocessor, and a number of other units interconnected via a system bus 212.

The mobile device shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the mobile device to a communication network 235 (e.g., a data processing network) and a display adapter 236 for connecting the bus 212 to a display device 238.

The mobile device may have resident thereon any desired operating system. It will be appreciated that an embodiment may also be implemented on platforms and operating systems other than those mentioned. One embodiment may be written using JAVA, C, Objective C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

FIG. 3 shows a method 300, in accordance with one embodiment. As an option, the method may be implemented in the context of the architecture and environment of any subsequent Figure(s). Of course, however, the method may be implemented in any desired environment.

As shown in operation 302, a signal is received in association with a touch interface of a device. In one embodiment, the signal may include a pressure signal which is indicative of a magnitude of pressure. In the context of the present description, such pressure signal may include any signal that is a function of or related to a pressure applied to the device. In one embodiment, such pressure signal may be indicative of a magnitude of pressure being applied to a touch interface of the device. In various embodiments, such pressure signal may be generated by a pressure sensor including, but not limited to those described in the context of subsequently described embodiments, or any other mechanism, for that matter, that is capable of generating the pressure signal.

In other embodiments, the signal may include a touch signal indicative of a touch interface being touched. In the context of the present description, such touch signal may or may not be indicative of a magnitude of pressure being applied to a touch interface of the device. For example, such touch signal may, in one embodiment, simply indicate whether applied pressure is sensed, or not, e.g., not necessarily gauge any more than two pressure states, including pressure-sensed and pressure-not-sensed, etc.

Also in the context of the present description, the aforementioned device may include any device including, but not limited to those described in the context of this and/or subsequently described embodiments. Further, in various embodiments, the touch interface may or may not be combined with a display. For example, if the touch interface is combined with a display, the touch interface may include a touch screen. Thus, the touch interface may, in various embodiments, include, but is not limited to a touch screen or any other interface responsive to touch that is described in the context of this and/or subsequently described embodiments.

In one optional embodiment, the touch interface may be positioned on a first face of a device that includes a display on a second face thereof. Further, the first face and second face may include any respective faces (e.g., front, back, left side, right side, top side, bottom side, etc.) that are different. Just by way of example, in various embodiments, the first face and the second face may be on opposite faces of the device of the device. Further, the first face may include a side face and the second face may include a front face of the device. Even still, the first face may include a back face and the second face may include a front face of the device. Of course, the touch interface may be positioned on the same face as the display, in other embodiments.

As indicated in operation 304, a user experience may be altered, utilizing the signal. In the context of the present description, the user experience may include any aspect of the device that is capable of being directly or indirectly experienced by a user including, but not limited to those described in the context of this and/or subsequently described embodiments.

For example, in the context of an embodiment involving the pressure signal, the user experience may be altered as a function of the magnitude of the pressure being applied to the touch interface, utilizing the pressure signal. Just by way of example, in various embodiments, the user experience may be altered by causing input to the device, by causing output from the device, by causing processing by the device, etc. In other embodiments involving a touch signal, the user experience may be altered in any manner, utilizing the touch signal (dependent or independent of any fluctuation of pressure).

Of course, the foregoing embodiments may be altered by adding and/or removing various features. For example, in one embodiment, the pressure signal may be received which is indicative of the magnitude of pressure being applied to a touch interface positioned on a first face of a device that includes a display on a second face thereof. To this end, the user experience may be altered as a function of the magnitude of the pressure being applied to the touch interface, utilizing the pressure signal.

In another embodiment, a pressure signal may be received which is indicative of a magnitude of pressure being applied to a touch screen. To this end, the user experience may be altered as a function of the magnitude of the pressure being applied to the touch screen, utilizing the pressure signal. In still yet another optional embodiment, a touch signal may be received which is indicative of a touch interface being touched, where the touch interface is positioned on a first face of a device that includes a display on a second face thereof. To this end, the user experience may be altered, utilizing the touch signal. Again, any of the features described above (or hereinafter, for that matter) may or may not be combined in any desired manner.

More illustrative information will now be set forth regarding various optional architectures and features with which the foregoing techniques discussed in the context of any of the present or previous figure(s) may or may not be implemented, per the desires of the user. For instance, various optional examples and/or options associated with the operations 302 and/or 304, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

FIG. 4 shows a method 400 for defining a selection made within a user interface based in part on contact pressure, in accordance with one embodiment. As an option, the method 400 may be implemented in the context of the architecture and environment of the previous Figures or any subsequent Figure(s). Of course, however, the method 400 may be carried out in any desired environment. It should also be noted that the aforementioned definitions may apply during the present description.

As shown, it is determined whether sufficient initial contact pressure is being exerted on an interaction surface. See determination 402.

In the context of the present description, an interaction surface refers to a surface through which a user may interact with a device. It may take up the majority of a device face, or just a subset. In various embodiments, an interaction surface may be sensitive to one or more types of interaction, including but not limited to, contact, pressure, and/or proximity. In one embodiment, an interaction surface is receptive to multitouch input. In another embodiment, an interaction surface may be non-planar. In yet another embodiment, an interaction surface may be transparent, and combined with a display. In still another embodiment, an interaction surface may be replaceable. Some embodiments of an interaction surface may have more than one texture, to provide tactile guides to a user when used on the back face of a device. Other embodiments of an interaction surface are non-rectangular.

In various embodiments, an interaction surface may utilize one or more forms of technology to sense contact. These contact-sensing technologies may include, but are not limited to, capacitive, resistive, optical, surface acoustic wave based, and/or any other contact sensing technologies now known or later developed.

In various embodiments, an interaction surface may utilize one or more forms of technology to sense proximity. These proximity-sensing technologies may include, but are not limited to, capacitive, resistive, eddy current, optical, ultrasonic, heat, electric field based, and/or any other contact sensing technologies now known or later developed.

In various embodiments, an interaction surface may utilize one or more forms of technology to sense pressure. These pressure-sensing technologies may include, but are not limited to, conductive, resistive, piezoelectric, and/or any other pressure sensing technologies now known or later developed. In some embodiments, an interaction surface may be able to only detect the total pressure being exerted on the surface. In other embodiments, an interaction surface may be able to discern the contact pressures associated with one or more points or areas of contact.

In the context of the present description, contact pressure is the pressure associated with one or more contact points or contact areas, the pressure being exerted on an interaction surface. For example, in one embodiment, contact pressure may be the pressure exerted on an interaction surface by a single finger press.

In the context of the present description, a contact area refers to the area of an interaction surface which is in physical contact with an implement of interaction. In various embodiments, the contact area may be described, stored, and processed, as a collection of cells that are part of an array. In one embodiment, this array may directly correspond to pixels of a display. In another embodiment, the array may correspond to a grid of discrete areas on an interaction surface which sense contact, pressure, or both. In still another embodiment, the contact area is represented as a primitive shape (e.g., circle, square, etc.) which best fits the actual area in contact with an implement of interaction.

In the context of the present description, an implement of interaction refers to an object which is detectable by an interaction surface in one or more ways (e.g., proximity, contact, pressure, etc.). In various embodiments, implements of interaction may include, but are not limited to, fingers, skin, a stylus, and/or any other object with which a user may interact with a device.

In the context of the present description, a contact point refers to a single location on an interaction surface which is associated with physical contact with an implement of interaction. In various embodiments, the contact point may be determined from a contact area. For example, in one embodiment, a contact point may be located in the center of its associated contact area. In another embodiment, a contact point may be located on an edge of its associated contact area.

Determining whether sufficient initial contact pressure is being exerted on an interaction surface depends on a threshold contact pressure. In some embodiments, the smallest degree of contact pressure may be sufficient, such that the definition of a selection may be triggered by any contact. In other embodiments, the definition of a selection does not occur until a non-negligible threshold contact pressure has been detected. In one embodiment, this threshold contact pressure may be defined by the user. In this way, accidental definitions of a selection may be avoided.

In some embodiments, determination 402 may be performed only after certain events have occurred. For example, in one embodiment, the determination may be made only after receipt of an input or combination of inputs. Possible inputs include, but are not limited to, object proximity to the interaction surface, activation of a hardware switch or button, activation of a software switch or button, and/or any other input capable of being detected. In one embodiment, the determination may not be made until the host device is woken from a sleep state. In another embodiment, the determination itself may also wake the host device from a sleep state.

If the result of determination 402 is that there is sufficient initial contact pressure being exerted on an interaction surface, the current contact pressure level is determined. See operation 404.

In the context of the present description, a contact pressure level is the pressure reading generated from the raw data received from a touch sensor. In various embodiments, the contact pressure level may be represented by a number. For example, in some embodiments, the contact pressure level may be represented by an integer. In another embodiment, the contact pressure level may be represented by a floating-point number. In various embodiments, the contact pressure level may be represented by a percentage of the measurable range of contact pressures. In one embodiment, the contact pressure level may be represented by a unit less number. In another embodiment, the contact pressure level may be represented by an actual measure of the contact pressure, associated with a unit of pressure.

In various embodiments, the contact pressure level may be represented by a touch state. In the context of the present description, a touch state refers to a predefined subset of the range of measurable contact pressures. For example, in one embodiment, contact pressure levels may be represented as one of four predefined touch states: no touch, light touch, medium touch, and heavy touch. As an option, the lowest touch state may require some form of proximity. In some embodiments, the user may be able to specify how the measurable range of contact pressures is partitioned across a predefined number of touch states. In one embodiment, the number and boundaries of touch states may be defined system-wide, for all applications. In another embodiment, the number and boundaries of touch states may be defined on a per-application basis.

As shown, the selection area is calculated. See operation 406. In the context of the present description, the selection area refers to a region of the display, or a region of an object pictured on the display, which has been chosen for selection. The calculation of the selection area may be based upon one or more factors, including, but not limited to, a contact pressure level, a touch state, a contact area, a contact point, a selection boundary, a selection boundary geometry, and/or any other information derived from user interaction. In some embodiments, the selection area may be described as the pixels contained within a selection boundary.

In the context of the present description, a selection boundary describes the boundary of an associated selection area, and is based upon a selection boundary geometry. Additionally, in the context of the present description, a selection boundary geometry refers to the shape of a selection boundary. In some embodiments, a selection boundary geometry may not have reference to actual size or location. For example, in one embodiment, a selection boundary geometry may be described using fractional coordinates on a unit square.

In various embodiments, a selection area may be described, stored, and/or processed as the area contained within a selection boundary. A selection boundary may be represented by a selection boundary geometry, a screen location, and one or more transformations, such as scale or orientation. In one embodiment, the screen location is the point on which the transformed selection boundary geometry is centered.

In some embodiments, the selection area may be described, stored, and/or processed, as a collection of cells that are part of an array. In one embodiment, this array may directly correspond to pixels of a display. In another embodiment, the array may correspond to a grid based on a coordinate system specific to an object being displayed. In still another embodiment, the selection area may be described, stored, and processed as a mathematical function that defines the boundary of the selection area.

In one embodiment, the shape of a selection boundary may be one of a plurality of selection boundary geometries predefined within an operating system. In another embodiment, the shape of a selection boundary may be predefined within an application, independent of selection boundary geometries defined within the operating system. In yet another embodiment, the selection boundary geometry may be specified by a user. In still another embodiment, the geometry of the selection boundary may depend upon at least one form of user input, including but not limited to contact pressure, number of fingers in contact with the screen, device orientation, location of user fingers, and/or any other form of user input. Finally, in another embodiment, the geometry of a selection boundary may depend upon the content within or near a location associated with the selection (e.g., contact point, finger location, focal point of user's eyes, cursor location, etc.).

In some embodiments, selection boundaries may have geometries based upon simple shapes, including, but not limited to, ovals, circles, triangles, squares, rectangles, and/or higher order polygons. In other embodiments, selection boundaries may be based upon regular shapes (e.g., a star, a plus sign, etc.). In one embodiment, a selection boundary may be based upon the geometry of a contact area.

There are numerous ways in which a selection boundary may be described, stored, and/or processed. In various embodiments, a selection boundary may be represented by the combination of an established selection boundary geometry with a location, a scale, and/or a rotation.

In one embodiment, a selection boundary may be described using the vertex coordinates of a selection boundary geometry, in conjunction with location, scale, and/or rotation factors. For example, a rectangular selection boundary geometry may be described by the coordinates of the four corners. As an option, the vertices of a selection boundary geometry may be described using coordinates within the unit square.

In another embodiment, a selection boundary may be described using a mathematical function representing an established selection boundary geometry, in conjunction with location, scale, and/or rotation factors. For example, an elliptical selection boundary geometry may be described by an ellipse function whose foci depend upon the scale factor.

In yet another embodiment, a selection boundary may be described using a spline-based representation of a selection boundary geometry, in conjunction with location, scale, and/or rotation factors. For example, a curled selection boundary geometry may be described using splines combined with location, scale, and rotation factors.

In other embodiments, a selection boundary may be described by a bitmap representation of a selection boundary geometry, in conjunction with location, scale, and/or rotation factors. For example, in one embodiment, a bitmap representation of a contact area may be used as a selection boundary geometry associated with a selection boundary. In another embodiment, a bitmap representation of an irregular shape may be used as a selection boundary geometry associated with a selection boundary. In this way, geometries which may be difficult to describe using vertices, formulas, or splines may be used as the bases for a selection boundary.

The selection area is calculated by determining the selection boundary. In various embodiments, the selection boundary may be determined by transforming an appropriate selection boundary geometry as a function of user input, including but not limited to, contact pressure level, contact point, contact area, number of fingers detected, device orientation, etc. Once the selection boundary has been determined, the selection area is known.

In various embodiments, the selection boundary may be defined by transforming the scale of an appropriate selection boundary geometry as a function of user input. For example, in one embodiment, a selection boundary with a circular geometry may have a larger radius at higher contact pressure levels. In another embodiment, a rectangular selection boundary geometry may be scaled linearly by a factor proportional to the contact pressure level. In some embodiments, the relationship between selection boundary geometry scale and a contact pressure level is proportional. In other embodiments, the relationship between selection boundary geometry scale and a contact pressure level is inversely proportional, such that higher pressure may make the geometry smaller.

In various embodiments, the selection boundary may be defined by transforming the orientation of an appropriate selection boundary geometry as a function of user input. For example, in one embodiment, a selection boundary with a star-shaped geometry may be rotated further clockwise at higher contact pressure levels. In some embodiments, the relationship between selection boundary geometry orientation and a contact pressure level is proportional, such that an increase in pressure may result in a clockwise rotation. In other embodiments, the relationship between selection boundary geometry orientation and a contact pressure level is inversely proportional, such that higher pressure may cause a counterclockwise rotation.

In some embodiments, a selection boundary may have an anchor point. In the context of the present description, an anchor point refers to a point located on or near the selection boundary geometry which remains fixed as the geometry is transformed. In one embodiment, a selection boundary may have a scaling anchor point, which remains fixed as the geometry is scaled. For example, a square selection boundary may have a scaling anchor point in the upper left corner, causing the square to expand down and to the right, keeping the upper left corner stationary.

In another embodiment, a selection boundary may have a rotational anchor point, which is used as an axis of rotation as the selection boundary geometry is rotated. For example, a star-shaped selection boundary may have a rotational anchor point located in the center, such that it rotates along an axis of symmetry.

In various embodiments, the calculation of the selection area may depend upon the context of the selection. Specifically, the selection boundary may be dependent upon the type of content on or near a point or area associated with the selection, including but not limited to, a contact point, a contact area, a cursor, a user focus, etc. In various embodiments, the selection boundary geometry and the manner in which it transforms as a function of user input may be context dependent. For example, in one embodiment, a selection made on or near a text field may cause the selection boundary geometry to be rectangular, with a scaling anchor point located in an upper corner appropriate for the text language (e.g., upper left corner for English, upper right corner for Arabic, etc.). In another embodiment, a selection on or near a text field may cause the rectangular boundary geometry to scale in increments of the same scale as the height and width of the text. In this way, it may be clear to the user which text has been selected, as there may never exist a selection boundary which contains only half a line or character.

In another embodiment, a selection on or near a text field may result in a rectangular selection boundary geometry which scales proportionally to a contact pressure level in a manner similar to how text is selected using a cursor. In this way, a user may select text in a familiar manner, while only having to vary the pressure being exerted on a contact point, for example. In one embodiment, the text selection begins to increase once a predefined contact pressure level has been achieved. As an option, the rate at which the selection grows may be a function of the contact pressure level, once the predefined contact pressure level has been achieved and the selection grown initiated. In another embodiment, the text selection scaling may be tiered, such that at one touch state, the selection grows character by character, at an intermediate touch state the selection grows word by word, and so on, such that the user is able to enlarge the text selection in increments of characters, words, lines, paragraphs, and pages, depending on the touch state. As an option, the selection may also be incremented by sentences.

In other embodiments, the above-mentioned methods for selecting text using a selection which expands in the direction the text would be read in may also be applied to the selection of other linear subject matter. For example, in one embodiment, this method may be used to select a video segment. As an option, the selection scaling may be tiered, growing from frame-by-frame to second-by-second to minute-by-minute, and so on. In another embodiment, this method may be used in the selection of a portion of chronologically arranged material. Possible material with a temporal arrangement may include, but is not limited to, a collection of photos, messages in an email account, text messages, web browser history, and/or any other collection of items which may be arranged chronologically.

In various embodiments, a selection made within a graphic (e.g., photograph, drawing, movie still, bitmapped or rasterized text, etc.) may utilize a default selection boundary geometry with a default scaling anchor point. In one embodiment, the user may be able to predefine the default selection boundary geometry and/or default scaling anchor point, to be used when making a selection within a graphic. In still another embodiment, the default selection boundary geometry and/or default scaling anchor point may be predefined within the operating system. As an option, these defaults may be predefined on a per-application basis.

In various embodiments, a selection made within a photograph may result in the use of a context-specific selection boundary geometry which transforms in a context specific manner. For example, in one embodiment, a selection made within a photograph containing one or more people may utilize the rough shape of the subjects' faces as a selection boundary geometry. As an option, the selection boundary geometry may be composed of the perimeter of all faces within a certain distance of a point related to the selection (e.g., contact point, user focus, etc.), the distance being proportional to a user input (e.g., contact pressure level, touch state, etc.). Face selection may be used to assist the user in establishing the identity of photographed individuals, allowing future identification to be performed automatically using facial recognition. In one embodiment, facial and other forms of recognition may be performed by a host device, a remote computer, a cloud service, or any other computational resource, or combination of these and other resources.

In another embodiment, a selection made within a photograph on or near an eye may utilize a rough shape of the eye as a selection boundary geometry. As an option, the exactness of the method used to automatically detect the shape of an eye may vary as a function of a user input, such as contact pressure level. Eye selection may be used to assist the user in removing the "red eye" effect sometimes seen in photographs.

In one embodiment, a selection made within a graphic may cause the selection boundary geometry to be defined by the collection of pixels near a point associated with the selection (e.g., contact point, user focus, etc.) which are similar in at least one aspect. Possible aspects include, but are not limited to, color, one or more dimensions of an associated color space, brightness, transparency, and/or any other aspect that may be associated with a pixel. As an option, the degree of similarity between pixels required to influence the selection boundary geometry may be a function of a user input, such as a contact pressure level. In this way, a user may be assisted in separating an object within the graphic from a background or other visual elements.

In various embodiments, there may exist limits to the amount a selection boundary geometry may be transformed as a function of user input. For example, in one embodiment, the selection boundary geometry may increase in size as the contact pressure level increases, until an upper contact pressure threshold is reached. Contact pressure levels beyond the upper threshold may not increase the size of the selection boundary geometry any further. In another embodiment, the scale of the selection boundary geometry may be limited by a lower contact pressure threshold, such that reducing the contact pressure level below the threshold may not reduce the scale of the selection boundary geometry any further. In yet another embodiment, both upper and lower contact pressure thresholds may be implemented. In other embodiments, this concept of thresholds may be applied to other variable aspects of the selection boundary, such as the orientation of the selection boundary geometry, and as a function of other user input, including but not limited to the location of a contact point, the size of a contact area, user focus, and/or any other type of user input.

In one embodiment, the user may be able to predefine one or more contact pressure thresholds associated with the limits of a transformation of the selection boundary geometry. As an option, the user may also predefine the limits of the transformation, in addition to the maximum and/or minimum contact pressure level which may affect said transformation. In another embodiment, these contact pressure thresholds and/or transformation limits may be predefined within the operating system. In still another embodiment, the contact pressure thresholds may be automatically optimized over time, by observing the typical range of pressures the user exerts in various use scenarios.

In one embodiment, the selection boundary geometry and/or transformation of the selection boundary geometry may depend upon the proximity of an object to an interaction surface, rather than an aspect of physical contact with an interaction surface.

In various embodiments, the selection boundary may depend, at least in part, upon the user focus. In the context of the present description, user focus refers to a point or area on a display which is the visual and/or interactive focus of the user. For example, in one embodiment, the user focus may be determined by tracking the eyes of a user with one or more device-mounted cameras, and calculating where the user is looking. This may also be referred to as user gaze, or user gaze tracking. As an option, eye movement may also be monitored, to ascertain the manner in which the user is using the device (e.g., methodically reading text, quickly scanning text, examining a picture, visually searching for an icon, etc.). In another embodiment, the user focus may be defined as the location of a cursor in a text environment. In still another embodiment, the user focus may be established through user input, such as a finger tap.

Various aspects of the selection boundary may depend upon the user focus. For example, in one embodiment, the user focus may be used to determine the context of a selection. In another embodiment, the user focus may be used to determine the location of a selection, allowing the user to make a selection without having to change the location of a contact point. In still another embodiment, the tracking of eye movement may be used to determine the type of selection (e.g., reading eye movement may trigger a text selection, etc.).

Once the selection boundary has been determined using an appropriate selection boundary geometry that has been transformed as a function of a user input, the selection area may be calculated.

As shown, the selection area is displayed. See operation 408. In various embodiments, a selection area may be displayed using one or more selection functions. In the context of the present description, a selection function refers to a function of one or more inputs which determines one or more properties of a selection. For example, in one embodiment, possible selection function inputs may include, but are not limited to, touch state, contact pressure level, selection state, finger locations, device orientation, user focus, pressure uncertainty, touch uncertainty, contact point, contact area, gestures, application type and/or context, application flags, operating system flags, and/or any other form of user or system input.

Within the context of the present description, pressure uncertainty refers to any data associated with the uncertainty inherent in measuring pressure exerted on an interaction surface. Pressure uncertainty may include, but is not limited to, the uncertainty of a measured contact pressure level, a multidimensional array of values representing the variance of contact pressure measured for each cell/pixel in the vicinity of a contact point, an uncertainty value inherent to a particular pressure sensor, and/or any other type of data associated with uncertainty in pressure measurement.

Within the context of the present description, touch uncertainty refers to any data associated with the uncertainty inherent in sensing contact with an interaction surface. Touch uncertainty may include, but is not limited to, the error range associated with the location of a contact point, a multidimensional array of values representing the probabilities of contact measured for each cell/pixel in the vicinity of a contact point, an uncertainty value inherent to a particular touch sensor, and/or any other type of data associated with uncertainty in sensing contact.

Within the context of the present description, a selection state refers to whether a selection is 'dynamic' and still able to vary as a function of user input, or 'static', and not currently varying as a function of user input.

In various embodiments, a selection function may determine one or more presentation properties of a selection. For example, possible presentation properties may include, but are not limited to, shading, color, contrast, brightness, line style, animation routine, transparency, pattern, border style, area style, and/or any other visual property that may describe an object on a display. Examples of animation routines include, but are not limited to, "marching ants", changing colors, flashing, simulated optical distortions, pulsing highlights, and/or any other routine which varies location, transparency, color, content, and/or any other graphical property over time. In some embodiments, an animation routine may be a function of user input.

In various embodiments, a selection function may vary one or more presentation properties as a function of contact pressure. In this way, the user has visual feedback as to the level of pressure they are exerting on the device. For example, in one embodiment, the selection function may indicate the contact pressure level by shading the selection with a color which is somewhere between a pair of colors which represent the extrema of measurable contact pressure levels.

In various embodiments, a selection function may determine one or more fundamental properties of a selection. Within the context of this description, fundamental selection properties may include, but are not limited to, selection boundary geometry, transformation(s) to be applied to the selection boundary geometry as a function of user input, anchor point(s), and/or any other property which may be associated with a selection area.

In various embodiments, the application of a selection function may display a secondary boundary. Within the context of this description, a secondary boundary is any boundary, radius, or area associated with a selection area, which is not the selection boundary. For example, in one embodiment, a secondary boundary may be the area within which facial detection is being performed, as opposed to the selection boundary, which may be the outline of detected faces. In another embodiment, a secondary boundary may be the area within which eye detection is being performed. In yet another embodiment, the secondary boundary may represent the pressure uncertainty or touch uncertainty associated with a contact area.

In various embodiments, the secondary boundary may be displayed in addition to, or instead of, the selection boundary. For example, in one embodiment where face detection is being performed as part of calculating the selection area, the selection boundary may be indicated with a solid color line while the secondary boundary may be indicated with a thin dotted line.

In various embodiments, the area unique to the secondary boundary (i.e. the portion of the enclosed area which does not overlap with the selection area) may have presentation properties that differ from the selection area. For example, in one embodiment, a user may make a text selection of which the intended boundaries are uncertain. The portion of the text which was almost certainly intended to be selected may be shaded in green, while the text which may or may not have been selected intentionally may be shaded in red. The user intention may be extrapolated from uncertainty associated with the contact and/or contact pressure used to make the selection, in accordance with one embodiment.

In various embodiments, the secondary boundary may be used to indicate uncertainty associated with a form of machine recognition including, but not limited to, facial recognition, OCR, and/or any other form of machine recognition. For example, faces within a selection which have been recognized with a threshold degree of confidence may be outlined in green, while faces whose recognition is suspect (i.e. multiple viable matches, etc.) may be outlined in red (i.e. a secondary border).

As shown, after the selection area has been displayed, it is determined whether the selection establishment conditions have been met. See determination 410.

Within the context of the present description, selection establishment conditions refer to one or more predefined conditions whose satisfaction may cause the selection state to switch from 'dynamic' to 'static'. For example, in one embodiment, once the selection establishment conditions have been satisfied, the selection may no longer vary with contact pressure levels until determination 402 once again detects sufficient initial contact pressure. In various embodiments, the selection establishment conditions may be defined within a selection function.

In various embodiments, one or more selection establishment conditions may depend upon changes in the contact pressure level. For example, in some embodiments, selection establishment may be conditioned upon whether the contact pressure level drops below a predefined level. In one embodiment, this threshold contact pressure level may be defined as being a set amount of pressure less than the current contact pressure level. In this way, a user may reduce the contact pressure a small amount to modify their selection, with further reduction causing a selection establishment condition to be satisfied. In another embodiment, the threshold contact pressure level may be a set pressure amount.

In various embodiments, a selection establishment condition may depend upon contact pressure velocity, or the rate at which the contact pressure level is changing. For example, in one embodiment, a user may be able to satisfy a selection establishment condition by quickly reducing the contact pressure level to a predefined level within a predefined amount of time. In another embodiment, selection establishment may be conditioned upon whether a user has increased the contact pressure level to a predefined level within a predefined amount of time. In yet another embodiment, a selection may be established by exceeding a predefined contact pressure velocity, without regard to the actual pressure levels. As a specific example, a user may establish their selection by a quick pulse of their finger, without having to reach a particular pressure level.

In various embodiments, a selection establishment condition may depend upon how much time has elapsed since a particular event. For example, in one embodiment, a selection may be established if the user maintains a contact pressure level for a predefined amount of time. As an option, there may be a predefine tolerance level for pressure variations which may not reset this timing, allowing for small fluctuations in contact pressure which may be difficult for a user to control.

In another embodiment, a selection establishment condition may be satisfied once a predefined amount of time has elapsed since the satisfaction of determination 402.

In various embodiments, a selection establishment condition may depend upon forms of user input that are not related to contact pressure. These forms of user input may include, but are not limited to, gestures, a change in the number of fingers in contact with the device, change in device orientation, surpassing a threshold level of accelerations (e.g., wrist flick, etc.), and/or any other form of user input. It should be noted that selection establishment may also be conditioned upon the satisfaction of a combination of any of the previously described conditions.

If it is determined that the selection establishment conditions have not been met, the selection is updated in a loop through performing operations 404, 406, and 408. The selection may continue to vary as a function of user input until the selection establishment conditions have been met.

If it is determined that the selection establishment conditions have been met, the selection state is changed from 'dynamic' to 'static'. See operation 412.

Setting the selection state to 'static' means the selection is no longer being modified by user input. In various embodiments, the selection function may depend in part on the selection state. For example, in one embodiment, when the selection state is 'static', the secondary boundary may be removed from the display. In another embodiment, a 'static' selection state may cause the selection area to be displayed in a different color, or with a different style of selection boundary. In yet another embodiment, changing a selection state from 'dynamic' to 'static' may cause one or more application and/or operating system flags to be set.

In various embodiments, changing a selection state from 'dynamic' to 'static' may prompt the user to choose an action to be performed on or with the contents of the selection. For example, in one embodiment, after the desired faces have been highlighted and the user has reduced the contact pressure level below the dynamic selection minimum threshold pressure, they may be prompted to confirm the identity of the selected faces. In another embodiment, after a text selection has been given a 'static' selection state, the user may be prompted with operations that may be performed on the selected text, including but not limited to copy, cut, paste, spell check, style (e.g., bold, underlined, italic, etc.), font, font size, and/or any other operation which may be performed on text.

In some embodiments, once a selection has become 'static', it can no longer be modified and may be destroyed upon creation of a new selection. In other embodiments, a user may further modify a static selection by first applying a contact pressure sufficient to satisfy determination 402. In one embodiment, satisfying determination 402 with a static selection already in existence may change the selection state of the previous selection from static to dynamic, allowing further variation as a function of user input. In another embodiment, satisfying determination 402 with a static selection already in existence may create a new selection, as a function of user input, which is combined with the previously made selection. In yet another embodiment, a user may chose whether to replace a previously made selection or augment (i.e. add to, subtract from, etc.) a previously made selection with a new selection. As an option, the user choice may be indicated through gesture, voice command, toggling a hardware control, toggling a software control, and/or any other form of user input.

In various embodiments, method 400 may be adapted to allow for the definition, establishment, and modification of selections through other types of user input. Other types of user input may include, but are not limited to, proximity to an interaction surface, number of contact points, gestures, and/or any other form of user input. For example, in one embodiment, a user may expand a text selection by bringing their finger into proximity to the interaction surface.

FIG. 5 shows a pressure sensitive user interface 500 for making a selection, in accordance with one embodiment. As an option, the user interface 500 may be implemented in the context of the architecture and environment of the previous Figures or any subsequent Figure(s). Of course, however, the user interface 500 may be implemented in any desired environment. The aforementioned definitions may apply during the present description.

As shown, the user interface 500 may be utilized in making a selection based in part on pressure exerted by the user upon one or more interaction surfaces located on a device. For example, in one embodiment, a user's finger 502 may exert a small amount of force over contact area 504, which is centered on contact point 506 located on a pressure sensitive touch screen. If the contact pressure level is sufficient, then a selection area 508 having a selection boundary 510 is calculated and displayed. As the contact pressure is increased, the selection boundary expands to encompass a larger selection area 512.

FIG. 6 shows a method 600 for determining the context of a contact pressure-based selection and choosing an appropriate selection function, in accordance with one embodiment. As an option, the method 600 may be implemented in the context of the architecture and environment of the previous Figures or any subsequent Figure(s). Of course, however, the method 600 may be implemented in any desired environment. The aforementioned definitions may apply during the present description.

As shown, the context determination zone is defined. See operation 602. Within the context of the present description, a context determination zone refers to the area that is examined while determining the context of a selection. In various embodiments, the context determination zone may be initially defined as a function of one or more elements of user input upon which the selection itself is based. For example, in one embodiment, the context determination zone may be initially defined to be the contact area. In another embodiment, the context determination zone may be a predefined shape (e.g., circle, square, etc.) of predefined size, centered on the contact point. As an option, the user may be able to specify the initial size and shape of the context determination zone. In yet another embodiment, the context determination zone may be located such that the contact point is off-center, to provide a more intuitive user experience (e.g., the zone may be offset to compensate for the user's view being obstructed by their finger, etc.).

In still another embodiment, the context determination zone may have a predefined size. As an option, the predefined initial size for a context determination zone may be chosen such that it is smaller than any user interface elements which may be detected. As an additional option, the predefined initial size may be chosen such that it is large enough to assist a user in distinguishing between potential selection targets which are close to each other.

As shown, once the context determination zone has been defined, it is then determined whether there is a user interface control widget within the context determination zone. See determination 604.

Within the context of the present description, a user interface control widget refers to any element within a user interface which may receive user input, which are typically non-textual. For example, in various embodiments, user interface control widgets may include, but are not limited to, buttons, radio boxes, check boxes, drop down lists, sliders, tabs, and/or any other non-textual UI widget.

In some embodiments, user interface control widgets may also include hyperlinks which are isolated from a text field. For example, text that responds to user interaction like a button, but is not located within a selectable text field. Selectable text fields and hyperlinks embedded within a text field (e.g., links within a web page, links within a word processing document, etc.) are specifically excluded from this definition of user interface control widgets, as they are treated as separate cases within this method.

In various embodiments, the determination as to whether there is a user interface control widget within the context determination zone begins with determining whether there is a UI control widget located at the contact point upon which the zone is based. In this way, time is not wasted determining the context of a well-aimed contact point.

If a UI control widget is not located at the contact point, then it may be determined if there is a UI control widget in the vicinity, within the context determination zone. In various embodiments, this determination may be performed using the bounding boxes associated with user interface elements. Within the context of the present description, a bounding box refers to a rectangle within which a user interface control widget may reside. In some embodiments, a bounding box may be the smallest rectangle which may contain a particular user interface control widget. In this way, detection of user interface control widgets whose shape is not rectangular is simplified.

For example, in one embodiment, the determination as to whether there is a user interface control widget within the context determination zone may be performed by determining if the boundary of the context determination zone intersects with the bounding box of any user interface control widgets. As an option, if the initial size of the context determination zone is larger than a predefined minimum (e.g., smallest bounding box associated with a typical UI control widget, smallest bounding box present within the present UI, etc.), the determination may also verify the absence of any bounding boxes completely contained within the context determination zone, on the initial pass.

In another embodiment, the determination may be performed by calculating the distances between the center of the context determination zone and the center of every UI control widget present in the interface, and comparing them with a distance related to the size of the context determination zone.

If it is determined in 604 that there is at least one user interface control widget within the context determination zone, then a context sensitive UI control widget selection function is chosen. See operation 606. In various embodiments, once an appropriate selection function is chosen, a selection is defined based upon user input. In one embodiment, the selection is defined using method 4.

Within the context of the present description, a context sensitive selection function refers to a selection function adapted for use in making a selection in a context which has been automatically determined. In various embodiments, a context sensitive selection function may include logic to use a different context sensitive selection function to define the user's selection, based upon user input. In this way, a user may be able to indicate that the initial context determination is not correct, and that another selection function should be used.

For example, in one embodiment, a context sensitive UI control widget selection function may include logic such that, if the contact pressure level exceeds a predefined limit $P_0$, further definition of the selection is handled by a different context sensitive selection function, such as one adapted for selecting hyperlinks. In another embodiment, a contact pressure level exceeding $P_0$ may cause the context determination zone to expand, and the process of choosing an appropriate selection function to resume, ignoring the UI control widget previously detected within the zone. As an option, future determinations may ignore all UI control widgets. In this way, a context-aware user selection initiated with a contact point in the vicinity of a UI control widget may be redirected to a different type of subject matter without forcing the user to reposition their finger, for example.

In various embodiments, a context sensitive UI control widget selection function may depend upon the context determination zone. For example, in one embodiment, a context sensitive UI control widget selection function may use the context determination zone as a secondary boundary. In this way, the selection function may be able to continue searching the context determination zone for additional UI control widgets.

In various embodiments, a context sensitive UI control widget selection function may include logic to handle the case where there is more that one UI control widget within the context determination zone. In one embodiment, the selection function may choose the UI control widget whose center is closest to the center of the context determination zone. In another embodiment, the selection function may choose the UI control widget whose bounding box has greatest overlap with the context determination zone. In still another embodiment, the selection function may choose the UI control widget whose bounding box has an edge or corner closest to the center of the context determination zone.

In various embodiments, a context sensitive UI control widget selection function may include logic to allow the user to toggle between multiple widgets found within the context determination zone. For example, in one embodiment, the selection function may include a list of all UI control widgets found at least partially within the context determination zone. As an option, the widgets may be arranged in the list in order of distance from the center of the context determination zone. In another embodiment, the selection function may traverse the list sequentially, selecting a different widget. As an option, the list traversal may occur as a function of user input, including but not limited to, gestures, contact pressure velocity, accelerometer data, and/or any other user input. In still another embodiment, switching between different widgets found within the context determination may occur after a predefined amount of time has elapsed, and the selection establishment conditions have not yet been satisfied. In yet another embodiment, a context sensitive UI control widget selection function may use user focus to choose between multiple UI control widgets found within the context determination zone.

In various embodiments, a context sensitive UI control widget selection function may visually indicate the selection of a widget to the user before the selection has been established. For example, in one embodiment, the selection function may highlight the outline of the widget. In another embodiment, the selection function may shade the widget using a predefined mask of the widget. In still another embodiment, the selection function may shade and/or outline the widget bounding box. In yet another embodiment, the selection function may change and aspect of text associated with the widget, aspects including but not limited to font, text style, text color, and/or any other text property. As a specific example, a context sensitive UI control widget selection function may cause the name of a button to be displayed in blue italics if it is the current context-based selection derived from user input. In this way, the user may see what control is about to be activated before satisfying the selection establishment conditions.

In various embodiments, a context sensitive UI control widget selection function may have selection establishment conditions that depend upon the type of user interface control widget that is being selected. Some user interface control widgets are multi-state in nature (e.g., sliders, drop down lists, etc.), while others are bi-state (e.g., buttons, check boxes, etc.). In some embodiments, it may be assumed that when a user satisfies the selection establishment conditions for a bi-state UI control widget, they intend for the state of the widget to be toggled. The selection establishment conditions for multi-state UI control widgets, on the other hand, may include the election of a widget state.

For example, in one embodiment, the selection establishment conditions for a multi-state widget may include one or more primary conditions to establish that the user intends for that particular multi-state widget to be selected, and a secondary condition, to establish the state of that widget.

In various embodiments, the secondary condition may be satisfied (and the widget state chosen) through user input which includes, but is not limited to, contact pressure. As an option, after the primary selection establishment conditions have been satisfied, the selection function may disregard pre-established pressure triggers (e.g., $P_0$, global pressure triggers, etc.) until the secondary selection establishment condition has been satisfied.

For example, in one embodiment, once the primary conditions for selecting a slider widget have been satisfied, a user may select a slider value by varying the contact pressure level between two predefined threshold pressures which represent the slider state extrema. In another embodiment, the contact pressure level at the time of satisfaction of the primary conditions may be used as a zero point, represented by the middle of the slider values. Increasing the contact pressure may increase the slider value, decreasing the contact pressure may decrease the slider value. In other embodiments, these methods may be used to traverse the items within a drop down list, or any other multi-state UI control widgets which may be assigned a value.

In various embodiments, the secondary selection establishment conditions may be finally satisfied using methods previously discussed, including but not limited to, a contact pressure velocity trigger.

Once the selection establishment conditions have been satisfied, the state of the UI control widget may be set. For example, a button may be toggled, a check box may be checked or unchecked, a slider value may be set, etc.

As a specific example of one embodiment, from a user perspective, a user may make contact with and exert pressure upon an interaction surface, with a contact point near a drop down menu. The user may increase the contact pressure until the drop down menu is highlighted. After maintaining that contact pressure level for a few seconds, the list of menu items becomes visible, after which the user may select an item by varying the contact pressure. Once the desired menu item is highlighted, the user may execute a rapid increase in pressure to finalize the selection of that menu item.

If it is determined in 604 that there is no user interface control widget within the context determination zone, it is then determined whether there is an embedded hyperlink within the context determination zone. See determination 608.

Within the context of the present description, an embedded hyperlink refers to a hyperlink which is embedded within a text field. For example, in one embodiment, embedded hyperlinks may include, but are not limited to, text or image links within a web page, text or image links within a word processing document, and/or any other type of link which may be contained within a document. It should be noted that any link which may be classified as a hyperlink may fall within this definition of embedded hyperlink, or within the definition of a UI control widget.

In various embodiments, the determination as to whether there is an embedded hyperlink within the context determination zone begins with determining whether there is an embedded hyperlink located at the contact point upon which the zone is based.

If an embedded hyperlink is not located at the contact point, then it may be determined if there is an embedded hyperlink in the vicinity, within the context determination zone. In various embodiments, the methods described for locating a UI control widget within the context determination zone may also be applied to determining whether there is an embedded hyperlink in the zone. In one embodiment, the bounding boxes may be handled by the application displaying the document in which an embedded hyperlink may be found. In another embodiment, the bounding boxes may be handled at a lower level, by the operating system.

If it is determined in 608 that there is at least one embedded hyperlink within the context determination zone, then a context sensitive embedded hyperlink selection function is chosen. See operation 610. In various embodiments, once an appropriate selection function is chosen, a selection may be defined based upon user input. In one embodiment, the selection may be defined using method 4.

In various embodiments, a context sensitive embedded hyperlink selection function may include logic to use a different context sensitive selection function to define the user's selection, based upon user input. In this way, a user may be able to indicate that the initial context determination is not correct, and that another selection function should be used.

For example, in one embodiment, a context sensitive embedded hyperlink selection function may include logic such that, if the contact pressure level exceeds a predefined limit $P_2$, further definition of the selection is handled by a different context sensitive selection function, such as one adapted for selecting text. In another embodiment, a contact pressure level exceeding $P_2$ may cause the context determination zone to expand, and the process of choosing an appropriate selection function to resume, ignoring the embedded hyperlink previously detected within the zone. As an option, future determinations may ignore all embedded hyperlinks. In this way, a context-aware user selection initiated with a contact point in the vicinity of an embedded hyperlink may be redirected to a different type of subject matter without forcing the user to reposition their finger, for example.

In various embodiments, a context sensitive embedded hyperlink selection function may depend upon the context determination zone. For example, in one embodiment, a context sensitive embedded hyperlink selection function may use the context determination zone as a secondary boundary. In this way, the selection function may be able to continue searching the context determination zone for additional embedded hyperlinks.

In various embodiments, a context sensitive embedded hyperlink selection function may include logic similar to that used in a context sensitive UI control widget selection function to handle the case where there is more that one embedded hyperlink within the context determination zone. Additionally, in various embodiments, a context sensitive embedded hyperlink selection function may include logic similar to that used in a context sensitive UI control widget selection function to allow a user to toggle between multiple embedded hyperlinks found within the context determination zone.

In various embodiments, a context sensitive embedded hyperlink selection function may visually indicate the selection of an embedded hyperlink before the selection has been established. For example, in one embodiment, the selection function may change the color of an embedded text hyperlink. In another embodiment, the selection function may change the font, style, or font size of an embedded text hyperlink. In yet another embodiment, the selection function may highlight the borders of a linked image. In this way, the user may see which embedded hyperlink is about to be activated before satisfying the selection establishment conditions.

In various embodiments, a context sensitive embedded hyperlink selection function may have selection establishment conditions which change, depending upon previous user input. For example, in one embodiment, if the contact pressure level surpasses a value of $P_1$, but not $P_2$, the selection establishment condition may change to require the selection of an option from a hyperlink contextual menu. The contextual menu may provide options common to web browsers, including but not limited to "open link", "copy link", and/or any other action which may be performed on or with a hyperlink. In various embodiments, the selection of the contextual menu item may be established using methods including, but not limited to, those described for multi-state UI control widgets, or other types of selections.

In various embodiments, once the selection establishment conditions have been satisfied, the selected embedded hyperlink may be activated.

If it is determined in 608 that there are no embedded hyperlinks within the context determination zone, it is then determined whether there is a selectable text field within the context determination zone. See determination 612.

Within the context of the present description, a selectable text field refers to a field of text which a user may select and perform operations upon (e.g., copy, cut, paste, etc.). In one embodiment, a selectable text field may also include any rasterized text which is recognized using an optical character recognition routine.

In various embodiments, the determination as to whether there is a selectable text field within the context determination zone begins with determining whether there is a selectable text field located at the contact point upon which the zone is based.

If a selectable text field is not located at the contact point, then it may be determined if there is a selectable text field in the vicinity of the contact point and within the context determination zone. In various embodiments, the methods described for locating a UI control widget within the context determination zone may also be applied to determining whether there is a selectable text field in the zone, including the use of bounding boxes.

If it is determined in 612 that there is at least one selectable text field intersecting with or within the context determination zone, then a context sensitive selectable text selection function is chosen. See operation 614. In various embodiments, once an appropriate selection function is chosen, a selection may be defined based upon user input. In one embodiment, the selection may be defined using method 4.

In various embodiments, if there is a selectable text field located at the contact point, the context sensitive selectable text selection function may behave like other text selection functions. For example, in one embodiment, the selection of the text would start at the contact point, and expand with pressure in the direction in which the text would be read.

In various embodiments, if there is a selectable text field within the context determination zone, but not at the contact point, the selection function may define the selection based upon the entire selectable text field. For example, in one embodiment, the text within selectable text field found in the context determination zone may be selected starting at the beginning of the text field, even if it is not near the contact point. In another embodiment, the selection of the text begins at the location closest to the contact point.

In various embodiments, a context sensitive selectable text selection function may depend upon the context determination zone. For example, in one embodiment, a context sensitive selectable text selection function may use the context determination zone as a secondary boundary. In this way, the selection function may be able to continue searching the context determination zone for additional selectable text fields.

In various embodiments, a context sensitive selectable text selection function may include logic to handle the case where there is more than one selectable text field within the context determination zone. In one embodiment, the selection function may choose the selectable text field which is closest to the contact point, the selection not extending beyond that text field. In another embodiment, the selection function may start the text selection in the selectable text field closest to the contact point; once all of the text in that closest field has been selected, the selection may continue to expand into the next closest text field, starting at the beginning of the field. In still another embodiment, the selection function may include logic similar to that used in a context sensitive UI control widget selection function to handle the case where there is more that one selectable text field within the context determination zone. Additionally, in yet another embodiment, a context sensitive selectable text selection function may include logic similar to that used in a context sensitive UI control widget selection function to allow a user to toggle between multiple selectable text fields found within the context determination zone.

In various embodiments, a context sensitive selectable text selection function may include logic to use a different context sensitive selection function to define the user's selection, based upon user input. In this way, a user may be able to indicate that the initial context determination is not correct, and that another selection function should be used.

For example, in one embodiment, a context sensitive selectable text selection function may include logic such that, if the contact pressure level exceeds a predefined limit $P_4$, further definition of the selection is handled by a different context sensitive selection function, such as one adapted for selecting graphics. In another embodiment, a contact pressure level exceeding $P_4$ may cause the context determination zone to expand, and the process of choosing an appropriate selection function to resume, ignoring the selectable text field previously detected within the zone. As an option, future determinations may ignore all selectable text fields. In this way, a context-aware user selection initiated with a contact point in the vicinity of a selectable text field may be redirected to a different type of subject matter without forcing the user to reposition their finger, for example.

In various embodiments, a context sensitive selectable text selection function may visually indicate the selection of a selectable text field before the selection has been established. For example, in one embodiment, the selection function may shade the selected text within a selectable text field. In another embodiment, the selection function may highlight the borders of an entire selectable text field which has been selected.

In various embodiments, a context sensitive selectable text selection function may have selection establishment conditions which change, depending upon previous user input. For example, in one embodiment, if the contact pressure level surpasses a value of $P_3$, but not $P_4$, the selection establishment condition may change to require the selection of an option from a text selection contextual menu. The contextual menu may provide options including, but not limited to, copy, cut, paste, style, send via email, send via SMS, lookup online, and/or any other action which may be performed on selected text. In various embodiments, the selection of the contextual menu item may be established using methods including, but not limited to, those described for multi-state UI control widgets, or other types of selections.

If it is determined in 612 that there is no text within the context determination zone, it is then determined whether there is a selectable graphic within the context determination zone. See determination 616.

Within the context of the present description, a selectable graphic refers to an image or display, or a portion of an image or display, which a user is able to select and perform operations upon (e.g., copy, cut, paste, save, etc.). In one embodiment, a selectable graphic may refer to any portion of a user interface which is able to be captured with a screenshot.

In various embodiments, the determination as to whether there is a selectable graphic within the context determination zone begins with determining whether there is a selectable graphic located at the contact point upon which the zone is based.

If a selectable graphic is not located at the contact point, then it may be determined if there is a selectable graphic in the vicinity of the contact point and within the context determination zone. In various embodiments, the methods described for locating a UI control widget within the context determination zone may also be applied to determining whether there is a selectable text field in the zone, including the use of bounding boxes. As an option, in addition to determining the boundaries of the bounding boxes within the context determination zone, it may also be determined whether they are able to be selected (e.g., checking a system flag, DRM, copy protection, etc.).

If it is determined in 616 that there is at least one selectable graphic within the context determination zone, then a context sensitive selectable graphic selection function is chosen. See operation 618. In various embodiments, once an appropriate selection function is chosen, a selection may be defined based upon user input. In one embodiment, the selection may be defined using method 4.

In various embodiments, if there is a selectable graphic located at the contact point, the context sensitive selectable graphic selection function may behave like other graphic selection functions. For example, in one embodiment, the selection of the graphic may be defined using method 4.

In various embodiments, if there is a selectable graphic within the context determination zone, but not at the contact point, the selection function may define the selection based upon the entire selectable graphic object. For example, in one embodiment, an image file embedded in a document near the contact point and at least partially within the context determination zone may be selected in its entirety. In another embodiment, said image file may be partially selected, starting at a location within the image that is closest to the contact point, and scaling as a function of user input and in a manner defined by the selection function.

In various embodiments, a context sensitive selectable graphic selection function may depend upon the context determination zone. For example, in one embodiment, a context sensitive selectable graphic selection function may use the context determination zone as a secondary boundary. In this way, the selection function may be able to continue searching the context determination zone for additional selectable graphic objects.

In various embodiments, a context sensitive selectable graphics selection function may include logic to handle the case where there is more than one selectable graphic object within the context determination zone. In one embodiment, the selection function may choose the selectable graphic object which is closest to the contact point.

In another embodiment, the selection function may include logic similar to that used in a context sensitive UI control widget selection function to handle the case where there is more that one selectable graphic object within the context determination zone. Additionally, in yet another embodiment, a context sensitive selectable graphic selection function may include logic similar to that used in a context sensitive UI control widget selection function to allow a user to toggle between multiple selectable graphic objects found within the context determination zone.

In various embodiments, a context sensitive selectable graphics function may pass control to another user interface function, depending upon user input. In this way, a user may be able to indicate that the initial context determination is not correct, and that they wish to activate a different user interface routine (e.g., application launcher, favorites list, system settings, etc.).

For example, in one embodiment, a context sensitive selectable graphic selection function may include logic such that, if the contact pressure level exceeds a predefined limit $P_6$, further user input is handled by a different context sensitive selection function, such as one adapted for selecting graphics. In another embodiment, a contact pressure level exceeding $P_4$ may cause the context determination zone to expand, and the process of choosing an appropriate selection function to resume, ignoring the selectable graphic previously detected within the zone. As an option, future determinations may ignore all selectable graphics. In this way, a context-aware user selection initiated with a contact point in the vicinity of a selectable graphic may be redirected to a different type of subject matter without forcing the user to reposition their finger, for example.

In various embodiments, a context sensitive selectable graphics selection function may visually indicate the selection of a selectable graphic object before the selection has been established. For example, in one embodiment, the selection function may shade the selected graphic object. In another embodiment, the selection function may highlight the borders of a graphic object which has been selected.

In various embodiments, a context sensitive selectable graphics selection function may have selection establishment conditions which change, depending upon previous user input. For example, in one embodiment, if the contact pressure level surpasses a value of $P_5$, but not $P_6$, the selection establishment condition may change to require the selection of an option from a graphic selection contextual menu. The contextual menu may provide options including, but not limited to, copy, cut, paste, set as wallpaper, send via email, send via SMS, and/or any other action which may be performed on selected graphics. In various embodiments, the selection of the contextual menu item may be established using methods including, but not limited to, those described for multi-state UI control widgets, or other types of selections.

If it is determined in 616 that there is no selectable graphics within the context determination zone, then the determination zone is expanded. See operation 620.

In one embodiment, the context determination zone may be expanded by a fixed number of pixels. In another embodiment, the determination zone may be expanded by a scaling factor. Once the context determination zone has been expanded, the context determinations are performed again.

In one embodiment, if the context determination zone reaches a predefined threshold size, the user may be informed that a context could not be determined and a selection cannot be made. Other forms of user feedback indicating a failure to determine context include an alert, a prompt, audio feedback, visual feedback, LED light, and/or any other type of feedback.

In various embodiments, the user may be able to specify which contexts they wish to be detected automatically. In some embodiments, additional types of subject matter may be detectable, including types of text data, such as dates, email addresses, phone numbers, and/or any other type of text information.

In some embodiments, contextual selections may be performed using method 600 only in situations where a contact pressure based form of user interaction has not been defined. In other embodiments, contextual selections may be made system wide using method 600 or similar methods.

FIG. 7 shows a device 700 having a backtouch interface, in accordance with one embodiment. As an option, the device 700 may be implemented in the context of the architecture and environment of the previous Figures or any subsequent Figure(s). Of course, however, the device 700 may be implemented out in any desired environment. It should also be noted that the aforementioned definitions may apply during the present description.

In the context of the present description, a device with a backtouch interface refers to a device with one or more backtouch sensors or backtouch switches. In one embodiment, a device with a backtouch interface may also include one or more other sensors and/or buttons, including but not limited to cameras, hardware buttons, and/or any other type of device or control. A device with a backtouch interface may also be referred to as a backtouch-enabled device.

Within the context of the present description, a backtouch sensor refers to an interaction surface located on a device which has reduced user visibility while the device is being operated, because it is obscured by the device itself. For example, in one embodiment, a backtouch sensor may be located on the back of the device, facing away from the user as they look at a display on the front side. A backtouch sensor may result in a better user interface experience since the user is able to interact with the device without obscuring the front display with an implement of interaction.

Additional embodiments may be described using the terms 'front' and 'back', but a backtouch-enabled device is not limited to those having parallel surfaces. Within the context of the present description, the terms 'front' or 'front surface' and 'back' or 'back surface' refer to any two surfaces of any portion, piece, section, slice, component, part, and/or face of a device or its parts.

In various embodiments, a backtouch interface may also be a display. For example, in one embodiment, a device may have high-resolution touchscreens on the front and back. In another embodiment of a multi-display, backtouch-enabled device, the front face may be a high-resolution touchscreen and the back face may be a low-resolution touchscreen. As an option, one or more of the touch screens in these embodiments may be black and white. In still another embodiment, the front and back displays may utilized different display technologies and/or different display properties. For example, in one embodiment, the front display may be a high-resolution trans missive touchscreen and the back display may be a low-resolution reflective touchscreen.

As shown, device 700 is an example of one embodiment of a backtouch-enabled device, possessing a backtouch sensor 702 and a display 704. In various embodiments, the display 704 may also be an interaction surface.

As previously defined, an interaction surface is a surface capable of sensing touch, pressure, proximity, or any combination thereof. In various embodiments, a backtouch sensor may be capable of sensing one or more of touch, pressure, or proximity.

For example, in one embodiment, a backtouch sensor may be a track pad. Within the context of the present description, a track pad is a touch sensitive pointing device which can detect the motion and position of an implement of interaction (e.g., user finger, stylus, etc.).

In various embodiments, a backtouch sensor may include a resistive touch sensor. In one embodiment, a resistive touch sensor is made up of two thin, conducting layers separated by a narrow gap. When an implement of interaction presses down on the outer layer, the two layers make contact at that point. A voltage may be applied across the upper layer, from top to bottom. The resistive touch sensor may act as a voltage divider; by measuring the output voltage on the lower layer, the vertical position of the touch position may be sensed. Swapping the voltage to the sides of the upper layer may allow the horizontal touch position to be sensed.

In various embodiments, a backtouch sensor may include a capacitive touch sensor. In one embodiment, a capacitive touch sensor is made of two layers of parallel conductive lines, separated by an insulator. The layers are arranged such that the conductive lines are perpendicular. When an implement of interaction is placed over the conducting lines, there is a change in capacitance. A high frequency signal may be applied to pairs of conducting lines; the resulting current that passes between the conducting lings is proportional to the capacitance between the conducting lines. This current may be used to sense the touch or proximity of an implement of interaction. A capacitive touch sensor may be capable of detecting more than one contact point or contact area.

The backtouch-enabled device shown in FIG. 7 is one exemplary embodiment. The geometry of a backtouch-enabled device need not be confined to parallel surfaces, with a distinct front and back. For example, in one embodiment, the device may have fold-out sections with interaction surfaces which become backtouch interfaces once the sections are folded out. In another embodiment, the backtouch-enabled device may be composed of curved parts, multiple parts, or complex plan form parts. In still another embodiment, the backtouch-enabled device may not be rectilinear in any outline and/or cross section. In yet another embodiment, the device may have one or more curved or non-planar surfaces, including but not limited to surfaces which are concave or convex. In some embodiments, the device may have one or more surfaces which are rigid or hard. In other embodiments, the device may have one or more surfaces which are soft or flexible. In still other embodiments, the device may change shape, depending on the mode of operation (e.g., slide-out hardware keyboard, plug-in modules, etc.).

In one embodiment, a backtouch-enabled device may have one or more backtouch sensors located on plane(s) parallel to the plane of a display. For example, see device 700. In another embodiment, a backtouch-enabled device may have one or more backtouch sensors located on plane(s) that are at an angle to the plane of a display.

In one embodiment, a backtouch sensor may be located on a plane which is completely obscured from the display. In another embodiment, a backtouch sensor may be located on a plane which is partially obscured from the display. For example, a backtouch sensor may be located on the back side of a transparent or translucent display.

In one embodiment, a backtouch interface is an interaction surface which may be made up of one or more touch sensors, one or more pressure sensors, one or more proximity sensors, one or more switches, or any combination of one or more such sensors or switches. In another embodiment, the switches which are part of a backtouch interface may be real or virtual, displayed or mechanical, soft or hard, or any combination of these properties.

In various embodiments, gestures and interactions described in terms of a backtouch interface may also be performed on sidetouch (left and right sides of a device) and captouch (top and bottom sides of a device) interfaces.

FIG. 8 shows a method 800 for providing feedback to the user of a backtouch interface, in accordance with one embodiment. As an option, the method 800 may be implemented in the context of the architecture and environment of the previous Figures or any subsequent Figure(s). Of course, however, the method 800 may be implemented in any desired environment. The aforementioned definitions may apply during the present description.

As shown, it is determined whether the backtouch interface is enabled. See determination 802.

Within the context of the present description, an enabled interface or surface refers to an interface or surface which is not disabled. Within the context of the present description, a disabled interface or surface refers to an interface or surface which is not passing user input to any process, system, application, or routine. In one embodiment, a disabled interface may continue to sense user input, even though it is not used. In another embodiment, a disabled interface may be able to recognize a predefined form or type of user input which then places the interface in an enabled state. As a specific example, in one embodiment, a disabled backtouch interface may not be used to make a selection until it detects a predefined pattern of increases and decreases of contact pressure. In this way, interfaces may be disabled to avoid unwanted input, and easily enabled when desired.

It is important to note that in various embodiments, an interface or surface may be enabled with respect to one type of user input, and disabled with respect to another type of user input. For example, it may be possible for an interaction surface to be enabled with respect to touch interactions, and disabled with respect to contact pressure or proximity.

In various embodiments, a backtouch interface may be enabled in response to user input. For example, in one embodiment, a backtouch interface may be enabled in response to a predefined gesture performed on an interaction surface receptive to touch. In another embodiment, a backtouch interface may be enabled in response to a predefined pattern of increases and decreases of contact pressure exerted upon an interaction surface receptive to pressure. In yet another embodiment, a backtouch interface may be enabled by a predefined series of taps or impacts with the device. As an option, the taps or impacts may be detected by an accelerometer. In still another embodiment, a backtouch interface may be enabled by toggling a hardware or software control (e.g., button, switch, etc.).

In various embodiments, a backtouch interface may be enabled without specific user input. For example, in one embodiment, a backtouch interface may be enabled by a backtouch-enabled application. In another embodiment, a backtouch interface may be enabled when the device orientation is within a predefined range. In yet another embodiment, a backtouch interface may always be enabled.

If it is determined that the backtouch interface is enabled, then it is determined whether there is an implement of interaction in proximity of the backtouch interface. See determination 804.

In various embodiments, there may be a threshold proximity that may be achieved before determination 804 is satisfied. In one embodiment, a user may define the threshold proximity. In another embodiment, the threshold proximity may be predefined within the operating system. In still another embodiment, the threshold proximity may be predefined on a per-application basis.

If it is determined that an implement of interaction is in proximity to the backtouch interface, a visual indication of the proximity is displayed. See operation 806.

In various embodiments, the location of the implement of interaction in proximity to the backtouch interface may be indicated to the user. For example, in some embodiments, a point associated with the location of the implement may be displayed. In one embodiment, the point may be the centroid of the area with the highest proximity value. As an option, the point may be represented as a circle, a crosshair, and/or any other shape or icon.

In one embodiment, the point associated with the location of the implement may be displayed using a predefined color. As an option, the user may be able to select the color used. In yet another embodiment, the point may be displayed by inverting the preexisting contents of the display located at that point.

In various embodiments, an area associated with the location of the implement may be displayed. For example, in one embodiment, the area may be the area with proximity values above a preset threshold value. In another embodiment, the area may be a circle centered upon the centroid of maximum proximity values. As an option, the size of the circle may be similar to a fingertip.

In one embodiment, the area associated with the location of the implement may be displayed with colored shading. As an option, the user may preset the color of the shading. In another embodiment, the area may be indicated by increasing the color brightness (e.g., moving towards white within a color space, etc.) of the display content within the area. In yet another embodiment, the area may be displayed by reducing the color brightness (e.g., moving towards black within a color space, etc.) of the display content outside the area. As an option, the area may be displayed with a sharp boundary, or with a softened boundary, creating a glow effect.

In various embodiments, the degree of proximity of the implement of interaction to the backtouch interface may be indicated to the user. For example, in one embodiment, the color of a point or area being displayed may be given a degree of transparency dependent upon the proximity values, allowing the original display content to be viewed. As an option, the proximity value may be averaged over the area, and a single transparency value given to the color applied. In another embodiment, the color of the content displayed within the area may be given a color brightness based upon the proximity, such that the area is white right before contact is made. In yet another embodiment, the color of the content displayed outside the area may be given a color brightness based upon an inverse relationship with the proximity, such that all but the area is black right before contact is made.

As shown, it is determined if an implement of interaction is in contact with the backtouch interface. See determination 808. If it is determined that there is no contact, the proximity may continue to be determined and displayed.

If it is determined that an implement of interaction is in contact with the backtouch interface, a visual indication of the contact is displayed. See operation 810.

In various embodiments, a visual indication of contact with a backtouch interface may differ from a visual indication of contact with a front display, where the contact point and area is usually obscured by an implement of interaction. For example, in one embodiment, the contact point may be displayed, instead of or in addition to the contact area. In another embodiment, the visual representation of the interior of the contact area may be colored. In yet another embodiment, the contact area may be represented by an iconic version of a fingerprint. In still another embodiment, the contact area may be distorted so as to appear to bulge out of the display. As an option, this distortion may increase as a function of contact pressure.

As shown, once the user has been given feedback regarding contact with the backtouch interface, further user interaction is handled by a different routine. See operation 8. For example, methods 4 or 6 may be implemented at this point, utilizing backtouch contact pressure and contact point to define a selection.

FIG. 9 shows a pressure-sensitive user interface 900 for making a selection using a backtouch interface, in accordance with one embodiment. As an option, the user interface 900 may be implemented in the context of the architecture and environment of the previous Figures or any subsequent Figure(s). Of course, however, the user interface 900 may be implemented in any desired environment. The aforementioned definitions may apply during the present description.

As shown, the user interface 900 may be utilized in making a selection based in part on pressure exerted by the user upon a backtouch interface. For example, in one embodiment, a user's finger 902 may exert a small amount of force over contact area 904, which is centered on contact point 906. In one embodiment, contact area 904 and contact point 906 may be displayed on top of the content already being displayed, to assist the user in making contact at the desired location. In another embodiment, the contact point 906 may be displayed as a symbol, such as a plus sign, which may be rotated to an orientation estimated to match that of the contacting finger. As an option, the finger orientation may be estimated using the size and shape of the contact area, detected location of other fingers, and/or any other user input or observable properties.

If the contact pressure level is sufficient, then a selection area 908 having a selection boundary 910 and a secondary boundary 912 (indicating uncertainty related to the contact area) is calculated and displayed. As an option, the selection may be defined using method 4 or 6, or any other method of defining a selection based upon contact pressure.

FIG. 10 shows a user interface 1000 for defining settings associated with a backtouch interface, in accordance with one embodiment. As an option, the user interface 1000 may be implemented in the context of the architecture and environment of the previous Figures or any subsequent Figure(s). Of course, however, the user interface 1000 may be implemented in any desired environment. The aforementioned definitions may apply during the present description.

In one embodiment, the user interface 1000 may include a plurality of check boxes 1002 which represent various types of user interactions detectable by the backtouch interface. The types of interactions may include, but are not limited to, pressure, touch, proximity, and/or any other type of user interaction. Through these checkboxes, a user may limit a backtouch interface to only certain types of interactions. As an option, the user interface 1000 may only present checkboxes for interaction types detectable by the particular backtouch interface associated with the settings being defined.

In one embodiment, the user interface 1000 may include a plurality of check boxes 1004 which represent various methods of enabling a backtouch interface. As an option, in one embodiment, more than one method of activation may be selected.

In one embodiment, the collection of backtouch interface enablement methods 1004 may include a checkbox 1006 which allows the interface to be activated by a gesture. In one embodiment, the gesture may be predefined within an application or operating system. In another embodiment, the user interface 1000 may include a button 1008 to allow a user to specify a gesture to activate the backtouch interface. As an option, the user may be presented with an interface where they may specify the gesture by performing it. In yet another embodiment, the user may choose from a plurality of predefined gestures.

In one embodiment, the collection of backtouch interface enablement methods 1004 may include a checkbox 1010 which allows the interface to be activated by a grip. In the context of the present description, a grip refers to the set of sensor data associated with a particular manner of holding a device. The sensor data associated with a grip may include, but is not limited to, points and areas of contact on one or more interaction surfaces, device orientation, contact pressure levels exerted in one or more contact areas, proximity data (e.g., proximity to portions of a users hand not in contact with the device, etc.), and/or any other sensor data.

In one embodiment, the backtouch interface-enabling grip may be predefined within an application or operating system. In another embodiment, the user interface 1000 may include a button 1012 to allow a user to specify a grip to enable the backtouch interface. As an option, the user may be presented with an interface where they may specify the grip by performing it. In yet another embodiment, the user may choose from a plurality of predefined grips.

In one embodiment, the collection of backtouch interface enablement methods 1004 may include a checkbox 1014 which keeps the backtouch interface enabled whenever the device is powered on, similar to a primary touch screen, for example. In another embodiment, the collection of backtouch interface enablement methods 1004 may include a checkbox 1016 which keeps the backtouch interface disabled.

In one embodiment, the user interface 1000 may include a check box 1018 which allows the criteria for backtouch interface enablement to be set on a per-application basis. As an option, check box 1018 may allow any application to override the preferences set with the plurality of check boxes 1004.

In one embodiment, the user interface 1000 may include a plurality of check boxes 1020 which represent various methods of indicating that a backtouch interface is enabled. As an option, in one embodiment, more than one indicator may be selected.

In one embodiment, the collection of indicator check boxes 1020 may include a checkbox 1022 which indicates that the backtouch interface is enabled by displaying a colored border around the edge of a display. In one embodiment, the colored border may be animated.

In one embodiment, the collection of indicator check boxes 1020 may include a checkbox 1024 which indicates that the backtouch interface is enabled using an LED. In one embodiment, the LED may indicate the enabled backtouch interface through a specific color, with other colors being reserved for indicating other device states. In another embodiment, the LED may pulse or flash when the backtouch interface is enabled.

In one embodiment, the collection of indicator check boxes 1020 may include a checkbox 1026 which indicates that the backtouch interface is enabled by displaying a colored border around a status bar (e.g., a minimal bar common to most user interfaces, etc.). In one embodiment, the colored border may be animated.

In one embodiment, the collection of indicator check boxes 1020 may include a checkbox 1028 which indicates that the backtouch interface is enabled by displaying an icon. In one embodiment, the icon may be located within a status bar.

In one embodiment, the collection of indicator check boxes 1020 may include a checkbox 1030 which indicates that the backtouch interface is enabled by changing the color of a status bar. In one embodiment, the color change may be animated.

In one embodiment, the collection of indicator check boxes 1020 may include a checkbox 1032 which allows the backtouch interface to be enabled without any indication to the user. As an option, this preference may be overridden by an application.

In various embodiments, the user interface 1000 may allow a user to configure the type and style of feedback provided while an enabled backtouch interface is being used. For example, in one embodiment, the user interface 70.0002.3-00 may include a button 1034 which allows a user to specify whether or not feedback is provided while the backtouch interface is being used. As an option, this preference may be overridden by applications (e.g., an application may be configured such that it provides backtouch interface feedback independent of any system preferences, etc.).

In one embodiment, the user interface 1000 may include a button 1036, which presents a user interface which allows a user to specify the style of feedback provided when a backtouch interface is being used. For example, a user may configure the feedback provided when an implement of interaction is in proximity to, contact with, and/or exerting pressure on the backtouch interface.

In one embodiment, the user interface 1000 may include a button 1038, which allows a user to test the style parameters they defined using button 1036. For example, in one embodiment, button 1038 may present a user interface where a user may experiment with a backtouch interface, observing the feedback styles they have configured. As an option, this interface may provide a quick way to reconfigure the feedback style.

In various embodiments, the user interface 1000 may allow a user to configure the sensitivity of a backtouch interface. In the context of the present description, the sensitivity of a backtouch interface refers to the threshold level of interaction (e.g., proximity, contact, pressure, etc.) which a backtouch interface may receive before treating the interaction as being intentionally made by a user. In this way, backtouch interactions incidental to device usage may be ignored, while intentional backtouch user interactions may be acted upon.

In one embodiment, the user interface 70.0002.3-00 may include a plurality of checkboxes 1040 that represent a plurality of backtouch interface sensitivity levels. The backtouch interface sensitivity levels may include, but are not limited to, predefined levels (e.g., "high", "standard", "low", etc.), user defined levels, automatically defined levels, and/or any other type of sensitivity level.

In one embodiment, the user interface 1000 may allow a user to specify the sensitivity levels for particular aspects of a backtouch interface (e.g., proximity, contact, pressure, etc.). As an option, the user interface may provide the user with the ability to save and load user defined backtouch interface sensitivity profiles.

In the context of the present description, an interface sensitivity profile refers to a collection of sensitivity parameters associated with various aspects of an interaction interface. The sensitivity parameters may include, but are not limited to, an activation threshold, a maximum signal beyond which interaction is ignored, sample rate(s), and/or any other parameter which may be associated with an interaction interface. As an option, the sensitivity parameters may be specific to particular types of interaction (e.g., proximity, contact, pressure, etc.).

In the context of the present description, an activation threshold refers to a threshold signal below which interaction is ignored. An activation threshold may be set for different types of user interaction (e.g., pressure, contact, proximity, etc.). For example, in one embodiment, an interaction surface may have a pressure activation threshold of P, below which all pressure interactions are ignored.

It is important to recognize the distinction between activation and enablement. In various embodiments, activation serves as a filter of incidental interactions, defining the weakest sensor signal which may not be ignored. Enablement serves a similar purpose, to ignore unwanted interactions; a disabled interface may not act upon any sensor signals except those related to enabling the interface. In other words, activation filters sensor signals based on strength, while enablement filters sensor signals based on the signal itself.

In one embodiment, the plurality of checkboxes 1040 may include an "automatic" checkbox, representing a backtouch interface sensitivity profile automatically determined by the device. As an option, if an automatic sensitivity profile has not been created, the user may be presented with the option of initiating the process of automatically determining an optimal backtouch interface sensitivity profile.

In one embodiment, the user interface 1000 may include a button 1042 which allows a user to initiate the process of automatically determining an optimal backtouch interface sensitivity profile. In the context of the present description, an optimal interface sensitivity profile refers to a sensitivity profile which would allow an interface to remain enabled all the time, with minimal accidental inputs. In one embodiment, the process of automatically determining an optimal backtouch interface sensitivity profile may include gathering data over a predefined amount of time. As an option, the time remaining may be displayed in user interface 1000. During this learning period, the backtouch enablement preferences specified in checkboxes 1004 may be overridden, and instead the user is required to enable the backtouch interface with a specific method, chosen such that accidental enablement is highly unlikely (e.g., two step activation using gestures, hardware switch with on-screen confirmation, etc.). This facilitates separating intentional interactions from incidental interactions. Once enabled, the backtouch interface may remain enabled for a short period of time. During the learning period, the device may gather data, including but not limited to sensor data from the backtouch interface, changes in orientation, backtouch interface enablements, and/or any other data related to use of the device. Once the learning period has elapsed, the gathered data may be used to estimate the levels of meaningless, incidental backtouch interaction, such as interaction due to holding the device. As an option, in another embodiment, the user may be able to specify the length of the learning period. In yet another embodiment, the user may be able to specify desired accuracy of the sensitivity level, balancing the reduction of unwanted interactions with a possible increase in intentional interactions being missed.

In one embodiment, the user interface 1000 may include a button 1044 which allows a user to test the specified sensitivity settings. For example, in one embodiment, button 1044 may present a user interface which provides feedback regarding interactions with the backtouch interface. As an option, the testing user interface may utilize a default set of backtouch feedback settings, if the user had previously turned feedback off. In another embodiment, button 1044 may activate a backtouch interface, and present feedback to the user within user interface 1000. As an option, user interface 1000 may ignore any input received from the backtouch interface, only provide feedback related to the user interactions. In this way, a user may test the settings with the backtouch interface without accidentally interacting with any checkboxes, buttons, or other element of user interface 1000.

In various embodiments, the interfaces of FIG. 10, as well as any other previous or subsequent interfaces, may take the form of webpages displayed utilizing a web browser on any desired computer, handheld device, etc. In such case, any of the parameters or other input disclosed herein may be entered without the use of the host device, whereby such parameters or other input (or derivatives thereof) may be pushed to the device for configuration/updating purposes.

FIG. 11 shows a user interface 1100 for defining settings associated with a pressure-sensitive interface, in accordance with one embodiment. As an option, the user interface 1100 may be implemented in the context of the architecture and environment of the previous Figures or any subsequent Figure(s). Of course, however, the user interface 1100 may be implemented in any desired environment. The aforementioned definitions may apply during the present description.

In one embodiment, the user interface 1100 may include a checkbox 1102 to allow the user to enable the pressure-receptive aspect of one or more interaction surfaces. In one embodiment, this checkbox may enable all pressure-receptive surfaces. In another embodiment, the user may be able to specify which pressure-receptive surfaces shall be enabled. In various other embodiments, enablement of pressure-receptive surfaces may be accomplished through user input outside of user interface 1100. Pressure-receptive surface enabling user input may include, but is not limited to, gestures, software buttons, hardware buttons, accelerometer data, contact pressure patterns, and/or any other form of user input.

In one embodiment, the user interface 1100 may include a plurality of check boxes 1104 which allow a user to specify which types of feedback to provide when the pressure-sensitive interface(s) is activated, if any at all. For example, in one embodiment, the user may specify a sound which plays whenever the pressure-sensitive interface is activated. In another embodiment, the user may specify a form of visual feedback to be given when the pressure-sensitive interface is activated. As an option, the user may select from a plurality of pre-defined forms of feedback.

In one embodiment, the user interface 1100 may include a checkbox 1106 which allows a user to specify whether they want visual feedback regarding contact pressure level. As previously described, contact pressure level may be visually represented in a number of ways, including, but not limited to, a color which is part of a two color spectrum, a percentage, a unitless number, and/or any other representation of a value located within a finite range. In one embodiment, user interface 1100 may allow a user to specify the type of contact pressure level feedback. As an option, a separate user interface may be presented to the user to define the form of the feedback.

In various embodiments, the user interface 1100 may be used to define the pressure activation threshold. In the context of the present description, a pressure activation threshold is the smallest contact pressure level which may not be ignored. In one embodiment, the current pressure activation threshold level 1108 may be displayed within user interface 1100. The current pressure activation threshold level may be displayed as a unitless number, a percentage of the maximum measurable contact pressure level, a color, a scale, and/or any other method of representing a value located within a finite range.

In one embodiment, the user interface 1100 may include a button 1110 which allows a user to manually specify the pressure activation threshold level. In one embodiment, the user may be presented with an interface where they may enter a specific value to be used as the pressure activation threshold. In another embodiment, the user may be prompted to exert the desired threshold pressure on a pressure-sensitive interface, confirming their selection by maintaining the desired contact pressure for a predefined amount of time. As an option, the user may be prompted to repeat this process more than one time, after which the resulting pressure levels may be averages. In yet another embodiment, the user may be given the chance to test the newly specified pressure activation threshold level.

In one embodiment, the user interface 1100 may include a button 1112 which resets the pressure activation threshold level to a predefined, default value. As an option, the user may be prompted to confirm this action before the default value is applied.

In one embodiment, the user interface 1100 may include a button 1114 which initiates a process which determines an optimal pressure activation threshold level. In the context of the present description, an optimal pressure activation threshold level refers to an activation threshold which would allow an interface to remain enabled all the time, with minimal erroneous inputs. In one embodiment, the process of automatically determining an optimal pressure activation threshold level may include gathering data over a predefined amount of time. As an option, the time remaining may be displayed in user interface 1100.

During this learning period, the pressure activation threshold may temporarily be set to a level sufficiently high that an accidental activation is highly unlikely. This facilitates separating intentional interactions from incidental interactions. During the learning period, the device may gather data, including but not limited to sensor data from the pressure-sensitive interface, changes in orientation, pressure-sensitive interface activations, and/or any other data related to use of the device. Once the learning period has elapsed, the gathered data may be used to estimate the levels of meaningless, incidental pressure interaction, such as interaction due to holding the device. As an option, in another embodiment, the user may be able to specify the length of the learning period. In yet another embodiment, the user may be able to specify desired accuracy of the pressure activation threshold level optimization, balancing the reduction of unwanted interactions with a possible increase in intentional interactions being missed.

In one embodiment, the user interface 1100 may display the amount of time remaining in an ongoing learning period. See, for example, text field 1116. In various embodiments, the time remaining in the learning period may be displayed in user interfaces other than 1100. User interfaces where the remaining time may be displayed include, but are not limited to, a status bar, a contextual menu, a shortcut menu, a pop-up interface adapted for managing various interaction interfaces, and/or any other user interface.

In one embodiment, the user interface 1100 may include a plurality of checkboxes 1118 which represent a plurality of forms of feedback associated with the automatic determination of an optimal pressure activation threshold level. During the learning period, it may be helpful to provide the user with feedback every time the pressure-sensitive interface is activated. The forms of feedback include, but are not limited to, a sound, vibration, screen flash, and/or any other form of feedback. In one embodiment, the feedback associated with the automatic determination of an optimal pressure activation threshold level may override preferences set elsewhere. In another embodiment, the user may specify the parameters of these forms of feedback.

The user interface 1100 may be used to define and manage touch states. In one embodiment, a preset number of global touch states may be defined, which the operating system and applications may make use of. In another embodiment, the touch states may be defined on a per-application basis.

In one embodiment, the user interface 1100 may include a button 1120 which presents the user with a user interface that facilitates the definition of touch states. As an option, the user may be able to select from a plurality of predefined touch state definitions. Additionally, the user interface 1100 may display the currently defined touch states. See, for example, text field 1124. The touch states may be represented as a unitless number, a percentage of the range of allowable contact pressure levels, a color, and/or any other representation of a contact pressure level.

In one embodiment, the user interface 1100 may include a button 1122 which allows the user to reset the touch state definitions to a predefined default definition. As an option, the user may be prompted for confirmation before resetting the touch state definition to default values.

FIG. 12 shows a method 1200 for assisting a user in defining touch states, in accordance with one embodiment. As an option, the method 1200 may be implemented in the context of the architecture and environment of the previous Figures or any subsequent Figure(s). Of course, however, the method 1200 may be implemented in any desired environment. The aforementioned definitions may apply during the present description.

As shown, the highest touch state is defined. See operation 1202. In one embodiment, the highest touch state may be predefined within the operating system. In another embodiment, the highest touch state may be specified by the user, in the form of a contact pressure value.

In various embodiments, the highest touch state may be defined through user interaction with a pressure-sensitive interface. For example, in one embodiment, a user may be prompted to exert a level of contact pressure beyond which the highest touch state may be triggered. As an option, the user may be prompted to exert this pressure multiple times, with the resulting values averaged. In another embodiment, the user may be prompted to exert the highest contact pressure level which is comfortable, and then defining the highest touch state using a contact pressure level slightly lower than that being exerted.

Once the highest touch state has been defined, the remaining spectrum of contact pressures is partitioned into the remaining touch states and displayed. See operation 1204.

In the context of the present description, the spectrum of contact pressures refers to the range of contact pressure levels a user may exert to interact with the device. For example, in one embodiment, the lower end of a spectrum of contact pressures may be equivalent to the pressure activation threshold level. In various embodiments, there may be multiple contact pressure spectrums defined. For example, in one embodiment, there may exist a distinct spectrum of contact pressures for each pressure-sensitive interaction surface. In another embodiment, there may exist a spectrum of contact pressures which is partitioned into touch states (a touch state spectrum), and a different spectrum of contact pressures for use with contact pressure levels (a contact pressure level spectrum).

In one embodiment, the touch state spectrum may have extrema defined by the user. As an option, the lower bound of the touch state spectrum may be the same as pressure activation threshold level.

In one embodiment, the touch state spectrum may be partitioned such that all touch states contain the same fraction of the touch state spectrum. In another embodiment, the touch state spectrum may be partitioned such that all touch states have equal portions of the touch state spectrum except for the highest touch state. In yet another embodiment, the touch state spectrum may be partitioned such that the touch states are weighted, some containing larger fractions of the spectrum than others. As an option, the weight factors may be predefined or may be user definable.

In one embodiment, the partitioned touch state spectrum may be displayed as a geometric shape (e.g., circle, rectangle, etc.) which has been segmented according to the touch state partitions. In another embodiment, the partitioned touch state spectrum may be displayed as an array of percentages of the total spectrum. In yet another embodiment, the touch state spectrum may be displayed as an array of contact pressure levels associated with the boundaries of the partitions.

Once the touch state spectrum has been partitioned and displayed, the user is given the opportunity to adjust the touch states. See operation 1206.

In one embodiment, the user may adjust the contact pressure levels associated with the touch states by specifying the numerical values of specific contact pressure levels. In another embodiment, the user may adjust the touch states by interacting with a graphical representation of the partitioned touch state spectrum. In yet another embodiment, the user may adjust the touch states by defining new partitions using a pressure-sensitive interface. As an option, the user may exert the desired contact pressure level to set the boundaries of a touch state.

Once the touch states have been adjusted, the newly partitioned touch state spectrum is verified. See operation 1208.

In one embodiment, the touch state spectrum may be verified by asking the user to confirm their choice through a user interface. In another embodiment, the user may verify the touch state spectrum by utilizing it in a testing interface. As an option, the user may be given visual feedback regarding the exact contact pressure level being exerted, in addition to the current touch state.

FIG. 13 shows a user interface 1300 for assisting a user in defining touch states, in accordance with one embodiment. As an option, the user interface 1300 may be implemented in the context of the architecture and environment of the previous Figures or any subsequent Figure(s). Of course, however, the user interface 1300 may be implemented in any desired environment. The aforementioned definitions may apply during the present description.

In one embodiment, the user interface 1300 may include a graphical representation 1302 of a touch state spectrum, hereinafter referred to as touch space spectrum rendering 1302. As another embodiment, the touch space spectrum rendering 1302 may be colored with the spectrum of colors between two colors representing spectrum extrema. As an option, the same colors used to provide pressure dependent feedback to the user of a pressure-sensitive interface may be used here.

The touch space spectrum rendering 1302 found in user interface 1300 may be broken up into ranges of contact pressure representing touch states. In various embodiments, the touch space spectrum rendering may be partitioned by one or more touch state dividers 1304. In one embodiment, the touch state dividers may simply be a line drawn between two touch states. In another embodiment, the touch state dividers may also display the contact pressure level separating those two touch states.

In various embodiments, a plurality of touch states may be defined. In one embodiment, the user may specify the number of touch states to define. In another embodiment, the number of touch states may defined within the operating system. In still another embodiment, the number of touch states may be defined on a per-application basis, by the applications themselves or by the user (if so allowed by the application). In yet another embodiment, there may exist a set of default touch states of a fixed number which may be overridden by a different set of touch states defined within an application.

In various embodiments, the touch space spectrum rendering 1302 found in user interface 1300 may have a labeled scale. For example, in one embodiment, the lower boundary 1306 of the lowest touch state (e.g., the touch state associated with the lowest contact pressures) may be displayed. As an option, the lower boundary of the touch space spectrum may be equivalent to the pressure activation threshold, which the user may define using, for example, user interface 1100.

In another embodiment, the upper boundary 1308 of the touch space spectrum rendering may be displayed. As an option, upper boundary 1308 may be automatically set to a value slightly higher than the lower boundary of the highest touch state, since the highest touch state is made up of all pressures above that lower boundary. In this way, the scale of the touch space spectrum rendering is not skewed due to the potentially large range of contact pressures making up the highest touch state. In yet another embodiment, the touch space spectrum rendering may change in scale due to user interaction, with upper boundary 1308 being automatically updated.

In various embodiments, the touch state dividers 1304 found in the user interface 1300 may possess touch state divider handles 1310 with which a user may adjust the partitioning of touch states. For example, in one embodiment, a user may touch and drag a touch state divider handle to change the value of the associated divider. In another embodiment, a user may select a touch state divider handle; after the touch state divider handle has been selected, the divider may be assigned a value equivalent to whatever contact pressure level the user exerts for a predefined amount of time. As a specific example, a user may select a touch state divider handle and then press on an interaction surface. Once the desired contact pressure level is reached, the user maintains the pressure for 3 seconds, after which the value of the touch state divider is updated.

In one embodiment, the user interface 1300 may include a contact pressure gauge 1312 which reports the contact pressure level currently being exerted, to assist the user in selecting a practical partitioning of the touch state spectrum. In another embodiment, the scale of the contact pressure gauge may match that of touch state spectrum rendering 1302. As an option, the scale of both contact pressure gauge 1312 and touch state spectrum rendering 1302 may be set to accommodate the larger of two values: the current contact pressure level, or a value slightly higher than the lower boundary of the highest touch state.

In various embodiments, the touch state dividers 1304 found in the user interface 1300 may each be associated with a plurality of icon buttons 1314 which a user may use to lock a touch state divider at a particular value. In one embodiment, adjusting one touch state divider may cause all other unlocked dividers to shift such that the remaining portions of the touch state spectrum are partitioned as evenly as possible. As an option, the user interface 1300 may include a button to unlock all touch state dividers. In another embodiment, the user interface 1300 may include a button 1316 which distributes all unlocked touch state dividers evenly throughout the remaining parts of the touch state spectrum.

In one embodiment, the user interface 1300 may include a button 1318 which allows the user to establish the highest touch state boundary through pressure-based user input. In another embodiment, the user may be prompted to establish this touch state boundary as soon as user interface 1300 is displayed, in accordance with method 1200. In one embodiment, the user may only specify the highest touch state, with the remaining touch state spectrum being evenly partitioned across the touch states.

In one embodiment, the user interface 1300 may include a button 1320 which resets all touch state boundaries to default values. In another embodiment, the highest touch state boundary may be preserved, only able to be reset within the interface used to define it that may be displayed in response to activating button 1318.

In various embodiments, the user interface 1300 may include a button 1322 which allows a user to test the currently defined touch states. For example, in one embodiment, a user may be asked to achieve various touch states, and maintain them for a certain period of time. In another embodiment, the user may be presented with an interface similar to 1300, but where the touch state spectrum rendering 1302 and the contact pressure gauge 1312 are more predominantly displayed. As an option, a sound may be played every time a touch state boundary is crossed.

FIG. 14 shows a user interface 1400 for indicating that a backtouch and/or pressure-sensitive interface is activated, in accordance with one embodiment. As an option, the user interface 1400 may be implemented in the context of the architecture and environment of the previous Figures or any subsequent Figure(s). Of course, however, the user interface 1400 may be implemented in any desired environment. The aforementioned definitions may apply during the present description.

In one embodiment, the user interface 1400 may include one or more icons 1402 to indicate that a backtouch and/or pressure-sensitive interface has been activated. As an option, the icons may also indicate whether an interface is enabled. For example, an icon may only be visible if the interface is enabled, and only in color if the interface is activated. In another embodiment, the icons may have a color which depends upon the contact pressure level currently being exerted on that particular interface.

In various embodiments, the user interface 1400 may include a status bar 1404 which provides the user feedback regarding various device functions, in addition to other information, such as the date and/or time. The status bar itself may be used to indicate whether a backtouch and/or pressure-sensitive interface has been activated. For example, in one embodiment, the status bar may have a shading color which depends upon the contact pressure level currently being exerted on an activated interface. This may be done in conjunction with displaying an icon 1402 to indicate which interface has been activated. In another embodiment, the change in color may be restricted to just the border 1406 of the status bar. In yet another embodiment, the type of interface which has been activated may be indicated through an animation routine, including, but not limited to, a pulsing of the border, a cyclical variation of transparency of the status bar shading, "marching ants" along the status bar border, and/or any other animation routine.

In one embodiment, the status bar 1404 within the user interface 1400 may include one or more items of textual information 1408. The items of textual information may include, but are not limited to, date, time, network type, battery level, other device or application status information, and/or any other type of textual information.

In one embodiment, the activation of a backtouch and/or pressure-sensitive interface may be indicated through the presentation properties of the textual information 1408. Presentation properties for textual information which may be altered to indicate the activation of an interface include, but are not limited to, font, style, size, color, animation routine (e.g., flashing text, cycling colors, etc.), and/or any other type of presentation property. In another embodiment, activation of a backtouch and/or pressure-sensitive interface may be indicated by temporarily replacing textual information 1408 with a message, which may include, but is not limited to, the identity of the activated interface.

In one embodiment, the user interface 1400 may indicate the activation of a backtouch and/or pressure-sensitive interface by displaying a border 1410 around the display. As an option, border 1410 may change color depending upon the current contact pressure level.

FIG. 15 shows a user interface 1500 for defining a backtouch feedback style, in accordance with one embodiment. As an option, the user interface 1500 may be implemented in the context of the architecture and environment of the previous Figures or any subsequent Figure(s). Of course, however, the user interface 1500 may be implemented in any desired environment. The aforementioned definitions may apply during the present description.

When interacting with a backtouch interface, it may or may not be important to provide the user with some form of feedback regarding the location and/or activity of their chosen implement of interaction. Providing interaction feedback allows the user to interact with the device using an interaction surface they may not be able to see.

In one embodiment, the user interface 1500 may include a plurality of checkboxes 1502 which represent various types of feedback which may be provided as an implement of interaction is in proximity to the backtouch interface. The types of feedback may include, but are not limited to, visual (e.g., screen flashes, status bar icons, iconic depictions of the location of the implement, etc.), sound, vibration, and/or any other form of feedback. In another embodiment, one or more of these types of feedback may be configured by the user. For example, in one embodiment, the user may select a sound to be played whenever an implement of interaction is in proximity to the backtouch interface. In yet another embodiment, the feedback may be limited to only those instances where the proximity to the backtouch interface appears intentional, rather than incidental. As a specific example, in one embodiment, feedback might be given for a fingertip, but not for a palm which is in proximity to the backtouch interface due to the user's grip.

In one embodiment, the user interface 1500 may include a plurality of checkboxes 1504 which represent various types of visual feedback that may indicate that an implement of interaction is in proximity to a backtouch interface. The types of visual feedback include, but are not limited to, graphical representation of probable implement location, status bar icon, screen flash, and/or any other type of visual feedback.

In various embodiments, a backtouch interface may be able to estimate the location of an implement of interaction in proximity to the backtouch interaction surface. This information can be used to provide useful feedback to the user. For example, in one embodiment, a point associated with the location may be displayed. As an option, the point may be the centroid of the area with the highest proximity value within a predefine threshold. In another embodiment, the point may be replaced or combined with an icon, shape, or symbol.

In another embodiment, the user may be provided with proximity feedback in the form of a visual representation of the proximity data received from the backtouch interface. As an option, the proximity values may be scaled such that the visual representation has the appearance of a glow, centered on the estimated location of the implement.

In one embodiment, the user interface 1500 may include a plurality of checkboxes 1506 which represent various styles of visual proximity feedback. The styles include, but are not limited to, dynamic coloring, the feedback described in conjunction with operation 806 of method 800, and/or any other type or style of visual feedback. In the context of the present description, dynamic coloring refers to coloring which varies as a function of proximity to the backtouch interface. For example, in one embodiment, the color of the visual proximity feedback may vary between two colors which represent the least discernable proximity and the greatest proximity before contact. As an option, the colors may include a transparency factor, so the visual feedback does not obstruct display contents any more than necessary.

In one embodiment, the user interface 1500 may include a plurality of checkboxes 1508 which represent various types of feedback which may be provided as an implement of interaction comes in contact with the backtouch interface. The types of feedback may include, but are not limited to, visual (e.g., screen flashes, status bar icons, iconic depictions of the location of the implement, etc.), sound, vibration, and/or any other form of feedback. In another embodiment, one or more of these types of feedback may be configured by the user. For example, in one embodiment, the user may select a sound to be played whenever an implement of interaction makes contact with the backtouch interface. In yet another embodiment, the feedback may be limited to only those instances where the contact with the backtouch interface is estimated to be intentional, rather than incidental. As a specific example, in one embodiment, feedback might be given for contact with a fingertip, but not for a palm which is in contact with the backtouch interface due to the user's grip.

In one embodiment, the user interface 1500 may include a plurality of checkboxes 1510 which represent various types of visual feedback indicating contact with the backtouch interface. The types of visual feedback include, but are not limited to, graphical representations of contact location and extent (e.g., contact point, contact area, etc.), a status bar icon, screen flash, and/or any other type of visual feedback, including those described in other embodiments.

In one embodiment, the user interface 1500 may include a plurality of checkboxes 1512 which cause the visual feedback indicating contact with the backtouch interface to fade after a set amount of time. In another embodiment, the user may specify the amount of time before fading begins, how quickly the fade occurs, and/or the limits of the fade (e.g., completely disappear, fade to 70% transparency, etc.). As an option, the fading of the visual feedback may be reversed if the implement of interaction moves beyond a preset threshold while still in contact with the backtouch interface.

In one embodiment, the user interface 1500 may include a plurality of checkboxes 1514 which allow the user to specify the style of visual feedback associated with making contact with the backtouch interface. The styles may include, but are not limited to, shading of a contact area, line style of the border of a contact area, animation routine, and/or any other style aspect of visual feedback, including those described in other embodiments.

In one embodiment, the user interface 1500 may include a plurality of checkboxes 1516 which represent various types of feedback which may be provided as an implement of interaction exerts pressure on the backtouch interface. The types of feedback may include, but are not limited to, visual (e.g., screen flashes, status bar icons, iconic depictions of the contact pressure of the implement, etc.), sound, vibration, and/or any other form of feedback. In another embodiment, one or more of these types of feedback may be configured by the user. For example, in one embodiment, the user may select a sound to be played whenever an implement of interaction exceeds a predefined contact pressure level with the backtouch interface. In another embodiment, the sound may play whenever there is a change in touch state. In yet another embodiment, the feedback may be limited to only those instances where the contact pressure on the backtouch interface is estimated to be intentional, rather than incidental. As a specific example, in one embodiment, feedback might be given for a finger press, but not for a palm squeeze incidental to the user's grip.

In one embodiment, the user interface 1500 may include buttons 1518 which allow the user to specify the colors which represent the extrema of measurable contact pressure levels. As an option, the colors may be specified with a transparency value.

In one embodiment, the user interface 1500 may include a plurality of checkboxes 1520 which represent various venues for presenting visual feedback based upon the current contact pressure level. The venues for pressure-related visual feedback include, but are not limited to, an area equivalent to or based upon the contact area, the contact point, the border of the display, the status bar, and/or any other type or example of visual feedback, including those described in other embodiments.

In one embodiment, the user interface 7.002.8-00 may include a button 1522 which returns all settings defined within user interface 7.002.8-00 to predefined default values. As an option, the user may be prompted to confirm the reset before restoring the default values.

In one embodiment, the user interface 7.002.8-00 may include buttons 1524 which allow a user to save and load collections of backtouch feedback settings. As an option, the user may be prompted to confirm loading a new collection of settings before overwriting the current collection.

In one embodiment, the user interface 1500 may include a button 1526 which allows a user to test the current backtouch feedback style settings. In one embodiment, button 1526 may enable the backtouch interface (if not already enabled) and allow the user to experience the current backtouch feedback style without being able to interact with user interface 1500 through the backtouch interface. In other words, the user may be able to expose the backtouch interface to a range of proximity, contact, and pressure interactions without accidentally changing any of the settings found within 1500.

In another embodiment, button 1526 may present to the user a user interface which allows the user to experience the current backtouch feedback style settings within a variety of simulated scenarios. The simulated scenarios may include, but are not limited to, web browsing, photo viewing, an application launcher, an eBook, word processing, and/or any other common use scenario. As an option, the simulated use scenarios may be defined such that the user is able to experience the current feedback style in a wide range of color schemes, subject matter, degrees of screen clutter, etc.

As a specific example of a backtouch feedback style collection in use, in one embodiment, a user may configure the backtouch interface through user interface 1500 such that having a finger in proximity to the backtouch interface causes a faint blue glow to appear on the display, over the location of the finger. The blue glow becomes brighter as the distance between the finger and the backtouch interface decreases, until contact is made. Upon contact, the display shows a small plus sign at the contact point and a thin "marching ants" border around the contact area. The contact area is not shaded. As the user increases contact pressure, the contact area is shaded red, which becomes more opaque as the pressure increases.

FIG. 16 shows an alternative method 1600 for defining a selection made within a user interface based in part on contact pressure, in accordance with one embodiment. As an option, the method 1600 may be implemented in the context of the architecture and environment of the previous Figures or any subsequent Figure(s). Of course, however, the method 1600 may be carried out in any desired environment. It should also be noted that the aforementioned definitions may apply during the present description.

As shown, it is determined if a touch event has occurred. See determination 1602.

In the context of the present description, a touch event refers to an event in which an implement of interaction comes into contact with an interaction surface. For example, in one embodiment, pressing on a pressure-sensitive backtouch interface with a finger may be a touch event. Another example may be making contact with a touch-sensitive display with a stylus.

If it is determined that a touch event has occurred, then the touch event attributes are determined. See operation 1604.

In the context of the present description, touch event attributes refer to one or more measurable aspects of the user interaction which resulted in a touch event. The measurable aspects may include, but are not limited to, touch state, contact area, contact point, contact pressure level, pressure uncertainty, touch uncertainty, and/or any other measurable aspect of user interaction.

As shown, it is determined whether the system is in a selection mode. See determination 1606.

In the context of the present description, a selection mode refers to a system state where a user may create or modify a selection in a display. In various embodiments, a selection mode may be represented by a system flag. Examples of when a system may be in a selection mode include, but are not limited to, instances where a selection already exists, instances where a user has indicated a desire to create a selection.

In various embodiments, a system may be placed in a selection mode through user input. For example, in one embodiment, the user may activate a selection mode by performing a predefined gesture on an interaction surface. In another embodiment, a user may activate a selection mode by exerting contact pressure on an interaction surface for a sufficient amount of time, the contact pressure exceeding a predefined threshold.

If the system is in a selection mode, then a selection is created and/or modified as a function of the touch event attributes, then displayed. See operation 1608.

In one embodiment, the selection may be created, modified, and/or displayed using one or more selection functions.

In another embodiment, a display function may be applied in addition to a selection function, to display the selection.

In the context of the present description, a display function refers to a function of one or more inputs which determines one or more properties of a display. Properties of a display may include, but are not limited to, color values for individual pixels, brightness of a display backlight or portions of a backlight, and/or any other properties of a display. Display functions may apply to an entire display and/or multiple displays.

In one embodiment, the selection may be displayed with a secondary boundary representing the uncertainty in the selection. As a specific example, there may be displayed a small, pale green tinged transparent circle to show the area that the device is certain the user selected and a surrounding pale-red tinged transparent area (a secondary boundary) representing the area where the device thinks the user may have tried to select, but is not certain.

Operation 1608 may continue to be performed, updating the selection with each iteration, until there is a change in the touch state. See determination 1614.

If it is determined in 1606 that the system is not in a selection mode, then it is determined if a gesture has been detected. See determination 1610. In one embodiment, a user may be given feedback when a gesture is detected. Possible feedback may include, but is not limited to, sound, flashing display, appearance of an icon, a colored border on the display, and/or any other form of user feedback.

If a gesture has been detected, then an associated action is performed. See operation 1612. In one embodiment, any gesture may be mapped to any command or operation of the device. In another embodiment, a user may be provided feedback when the action is performed. Possible feedback may include, but is not limited to, sound, flashing display, appearance of an icon, a colored border on the display, and/or any other form of user feedback.

A gesture may be associated with a variety of different actions. These actions may include, but are not limited to, scrolling a display or user interface element, zooming in or out, modifying the display brightness, and/or any other action. With respect to making or modifying a selection through method 1600, it is important to note that, in one embodiment, a gesture may be associated with placing the system in a selection mode.

FIG. 17 shows a user interface 1700 for performing operations on a selection, in accordance with one embodiment. As an option, the user interface 1700 may be implemented in the context of the architecture and environment of the previous Figures or any subsequent Figure(s). Of course, however, the user interface 1700 may be implemented in any desired environment. The aforementioned definitions may apply during the present description.

After selecting an object, using methods, interfaces, and embodiments described above or others, a user may wish to perform an operation upon the object. Providing easily accessible methods to perform operations on a selected object may enhance the user experience. The availability of multiple interaction surfaces and/or multiple sensitivities increases the number of simple, intuitive ways a user may interact with the device.

In various embodiments, once a selection is static, a user may perform operations on the selected object. Possible operations include, but are not limited to, replication operations (i.e. copy, cut, paste, etc.), relocation operations, text-specific operations, image-specific operations, cross-application operations, and/or any other type of operation.

In various embodiments, a user may perform replication operations on a selected object through simple gestures and other types of user input. For example, in one embodiment, a user may copy a selected object to a clipboard (i.e. temporary storage, etc.) by pressing sharply on a pressure-sensitive front interaction surface, on top of the selected object. In another embodiment, a user may cut a selected object by pinching the object (i.e. applying contact pressure on the object through a front and back interaction surface), then applying greater contact pressure on the front interaction surface than the back interaction surface. In yet another embodiment, a user may perform a paste operation, replacing the selected object with the contents of a clipboard, by pinching the selected object, then applying greater contact pressure on the back interaction surface than the front interaction surface. Of course, in other embodiments, these operations and those following may be assigned to any other gesture, depending upon the location, number, and sensing ability of the host device's interaction surface(s).

In various embodiments, a user may perform relocation operations on a selected object through simple gestures and other types of user input. For example, in one embodiment, a user may move a selected object by making contact with the object on an interaction surface (front or back) and dragging the contact point to relocate the object. As an option, if the selection was made within a sequential or ordered environment (i.e. word processing document, etc.), the selected object may become transparent or translucent while being relocated, so the user may better see the insertion point (i.e. cursor, etc.). As shown in this example, the same dragging gesture may have different effects, depending on the state of the selection (i.e. static vs. active, etc.).

In various embodiments, a user may perform text-specific operations on a selected text object using simple gestures and other types of user input. See, for example, user interface 1700 in FIG. 17. As shown, a selection 1702 has been made within a block of text 1704. In accordance with one embodiment, a user has temporarily magnified the selected text by bringing a finger into proximity to a back interaction surface, said proximity localized in an area 1706 on the selection. As an option, the degree of magnification may increase as the finger is brought closer to the interaction surface.

Another example of a text-specific operation is data detection, in accordance with one embodiment. For example, in one embodiment, a user may perform a data detection operation on a selected text object by pressing on the selection with two fingers through a back interaction surface. In various embodiments, the data detection operation may highlight detectable information found within the selected text including, but not limited to, email addresses, phone numbers, dates and times, addresses, web addresses, and/or any other form of information. In another embodiment, the data detection may only highlight types of information which may be further acted upon by the device, such that after detection, a user may initiation further action by touching the highlighted information. For example, in one embodiment, touching a highlighted phone number may dial the number, touching a highlighted address may activate a navigation application, touching a date may create an appointment in a calendar application, and so forth.

Other examples of text-specific operations may include, but are not limited to, highlighting, modifying the style (i.e. bold, italic, underline, strikethrough, color, shadow, etc.), modifying the font, modifying the font size, translating to a different language, and/or any other operation which may be performed on text. In one embodiment, a user may perform a gesture, such as a two finger, double press on the selected text, to bring up a menu of different text operations (or any other operation in the present description). In another embodiment, each operation may be assigned a different gesture.

In various embodiments, a user may perform image-specific operations on a selected object through simple gestures intuitively related to the operation being performed. For example, in one embodiment, a user may apply facial recognition and/or red eye removal by simply tapping (on a front or back interaction surface) on peoples faces within the selection. In another embodiment, a user may resize the selected object using the two finger pinch-to-zoom gesture. In still another embodiment, a user may rotate the selected object by making two points of contact on the object, then twisting the contacting hand. In yet another embodiment, a user may warp or distort a selected object by applying different levels of contact pressure to the selection via a front or back interaction surface. As an option, a front interaction may cause puckering, while a back interaction may cause bulging.

In various embodiments, a user may perform cross-application operations on a selected object through simple gestures. Cross-application operations may include, but are not limited to, placing the selected object in a new email or SMS message, placing the selected object in a social network posting, sending the object to an application capable of performing further operations (i.e. image editing application, word processing application, etc.), and/or any other operation which may involve another application. In other embodiments, a user may be presented with application-specific operations in a menu, in addition to cross-application operations, upon performing a predefined gesture.

FIG. 18 shows a method 1800 for utilizing contact pressure-based gestures, in accordance with one embodiment. As an option, the method 1800 may be implemented in the context of the architecture and environment of the previous Figures or any subsequent Figure(s). Of course, however, the method 1800 may be carried out in any desired environment. It should also be noted that the aforementioned definitions may apply during the present description.

As shown, it is determined if a touch event has occurred. See determination 1802.

If it is determined that a touch event has occurred, then the initial touch event attributes are determined. See operation 1804.

As shown, the gesture is identified from gesture input. See operation 1806.

In the context of the present description, gesture input refers to the collection of inputs, flags, and signals by which a gesture is identified and parameterized. For example, in one embodiment, a two-finger pinch gesture may be identified by two contact points combined with their motion with respect to each other, and parameterized by the extent of the motion. Possible gesture inputs may include, but are not limited to, touch event attributes (both initial and over time), system and/or application flags, switches, buttons, states, sensor data, and/or any other possible input.

For example, in one embodiment, a gesture may be made up of one or more contact points on an interaction surface, each associated with a different contact pressure level. In another embodiment, a gesture may In various embodiments, a gesture may be identified from gesture input. Some gestures may be able to be identified solely from initial touch event attributes. Other gestures may only be identified after the gesture has been performed for some period of time. As a specific example, a two finger pinch gesture and a two finger swipe are indistinguishable based solely on initial touch event attributes. However, once the swipe or pinch motion has begun, the gestures are immediately distinguished from each other.

In various embodiments, gestures may include one or more contact pressures being exerted upon an interaction surface. In some embodiments, pressure may be used to distinguish between two gestures. For example, in one embodiment, two gestures involving a two finger pinch on the front display and one finger contact with the backtouch interface may be defined based on the contact pressure level exerted on the back touch interface. In other embodiments, pressure may be used to specify one or more dimensions of the operation linked to a gesture. For example, in one embodiment, a swipe gesture to control scrolling of a text field may use contact pressure to determine the speed of the scrolling (e.g., higher pressure yields faster scrolling, etc.). In still other embodiments, contact pressure may be used to both identify as well as parameterize a gesture.

Once the gesture has been identified, the corresponding operation is performed. See operation 1808.

In various embodiments, a gesture may be associated with the modification of one or more device audio settings. For example, in one embodiment, a user may adjust the device volume by applying contact pressure to a back interaction surface, and dragging the contact point up and down to increase or decrease the device volume. As an option, the ringer volume may be adjusted by dragging left and right. In another embodiment, a user may change where audio is sent (i.e. internal speakers, headphone jack, Bluetooth device, etc.) by quickly pressing twice on a back interaction surface, then selecting an audio destination from a pop-up menu presented in response to the rapid double press. In yet another embodiment, a user may mute the audio by applying pressure on front and back interaction surfaces (i.e. a pinching motion), in a predefined corner of the device. In various embodiments, some or all of these device audio related operations may be available through gesture only after the user provides some form of activation input (i.e. touching an icon in the status bar, performing a simple gesture, etc.). In this way, gesture collisions (i.e. assignment of more than one operation to the same gesture, etc.) may be avoided. Of course, these and the following operations may be associated with any gesture or other user input, in various embodiments.

In various embodiments, a gesture may be associated with the modification of one or more display attributes. For example, in one embodiment, a user may adjust the intensity of a display backlight by applying contact pressure with three fingers on the display of interest. As an option, the backlight intensity may vary as a function of average contact pressure among the three contacts. In another embodiment, a user may activate a "night mode" (i.e. use of a monochrome red/black color space, inverting the display, etc.) by sequentially applying and releasing contact pressure on each corner of a front interaction surface. In various embodiments, some or all of these display attribute related operations may be available through gesture only after the user provides some form of activation input (i.e. touching an icon in the status bar, performing a simple gesture, etc.). In this way, gesture collisions (i.e. assignment of more than one operation to the same gesture, etc.) may be avoided.

In various embodiments, a gesture may be associated with the modification of one or more device attributes. For example, in various embodiments, a device may have a status bar along one side of a display which indicates the status of device hardware including, but not limited to, Wi-Fi signal strength, cellular network type and signal strength, Bluetooth status (i.e. on, off, etc.), system volume, battery remaining, etc. In some embodiments, a user may modify the status of these device attributes by interacting with status bar icons. For example, in one embodiment, a user may apply front surface contact pressure, above a predefined threshold for a predefined amount of time, to a status bar icon to turn off the associated device hardware (i.e. Wi-Fi, cellular modem, Bluetooth, etc.). In another embodiment, a user may apply similar pressure via a back interaction surface to a deactivated status bar icon to turn the associated hardware back on. As an option, applying said contact pressure may present the user with a menu of options associated with that device hardware (i.e. Wi-Fi networks to join, Bluetooth devices to pair, activate cellular voice/data/both, etc.).

In yet another embodiment, a user may apply contact pressure to a status bar battery indicator icon to activate a menu populated with one or more predefined collections of settings for various power scenarios (i.e. extreme cutbacks for low battery, high performance for charged battery, maximum performance while charging, etc.). In this way, a user may activate a power saving mode that allows them to stay connected to a Wi-Fi network while saving power by diming the display (i.e. while web browsing), and a different power saving mode which turns off Wi-Fi without having to dim the display as much (i.e. reading an eBook, etc.).

In various embodiments, some or all of these device attribute related operations may be available through gesture only after the user provides some form of activation input (i.e. touching an icon in the status bar, performing a simple gesture, etc.). In this way, gesture collisions (i.e. assignment of more than one operation to the same gesture, etc.) may be avoided.

In various embodiments, a gesture may be associated with application-specific operations. For example, in some embodiments, a user may interact with an email client through multiple interaction surfaces. In one embodiment, a user may scroll through a list of messages and select one for viewing using a back interaction surface. In another embodiment, a user may apply a contact pressure on a back interaction surface, then swipe downward, to forward the current message. In yet another embodiment, a user may apply a contact pressure on a back interaction surface, then swipe upward, to reply to the current message. As an option, a user may perform this gesture using two fingers to reply to all recipients of the message.

In other embodiments, a user may interact with a web browser through multiple interaction surfaces. In one embodiment, for example, a user may apply contact pressure on a link within a webpage, then perform a quick flicking gesture, in any direction, to open the link in a background tab or window. In another embodiment, a user may open a link in a new tab or window by pressing on the link through a back interaction surface for a predetermined amount of time.

In still other embodiments, a user may interact with a camera application through multiple interaction surfaces. For example, in one embodiment, a user may indicate a point to be used for white balancing by making contact with the displayed point through a back interaction surface. In another embodiment, a user may adjust one or more camera properties by applying different amounts of contact pressure on an icon shown on the front display. Possible camera properties may include, but are not limited to, aperture settings, simulated film speed, f-stop, degree of fill flash, and/or any other camera property or setting.

In even more embodiments, a user may interact with a movie player through a back interaction surface. For example, in one embodiment, a menu may fade into view when a user applies a contact pressure on the back interaction surface. The menu may allow the user to perform one or more movie-related operations, including but not limited to, toggling subtitles, selecting an audio track, selecting a chapter or bookmark, and/or any other movie related operation or setting.

In other embodiments, a user may interact with a navigation application using a back interaction surface. For example, in one embodiment, a user may cycle through a plurality of map layers by applying different levels of contact pressure on the back interaction surface. Possible map layers may include, but are not limited to, satellite images, street maps, weather maps, traffic maps, points of interest, navigational route, and/or any other type of map or navigational information.

In various embodiments, some or all of these application-specific operations may be available through gesture only after the user provides some form of activation input (i.e. touching an icon in the status bar, performing a simple gesture, etc.). In this way, gesture collisions (i.e. assignment of more than one operation to the same gesture, etc.) may be avoided.

In various embodiments, gestures may be associated with operations that are carried out as functions of the gesture input, when the gesture is performed and identified.

In various embodiments, the operations associated with a gesture may be carried out as a function of the associated gesture dynamics. In the context of the present description, gesture dynamics are aspects of a gesture that may vary without changing the identity of the gesture. Possible aspects may include, but are not limited to, contact point velocity, contact point acceleration, contact pressure velocity, contact pressure acceleration, time to complete gesture, and/or any other aspect which may be associated with a gesture.

In various embodiments, the association between gesture and operation may be context-dependent. In some embodiments, the association depends on application context (e.g., which application is active, etc.). For example, in one embodiment, a gesture which scrolls a text field in one application may turn a page when performed in a different application.

In other embodiments, the association may depend on application or state context (e.g., whether or not there is an active selection, whether or not a control has been activated, etc.). For example, in one embodiment, a gesture which may be used to select text may move text if performed when text has already been selected.

In other embodiments, the association may be independent of context, such that performing the gesture may cause the same operation to be carried out, regardless of what application is active. For example, a gesture which brings up an interface to adjust screen brightness and volume may be defined such that it is always available.

In various embodiments, a user may be given feedback as a gesture is performed. For example, in one embodiment, a representation of the gesture may be temporarily displayed as the gesture is performed. In this way, a user may be more aware of the form of the gesture they are performing. As an option, the geometry of the displayed gesture may be smoothed or otherwise modified.

FIG. 19 shows an exemplary contact pressure-based gesture 1900 for scrolling a text field, in accordance with one embodiment. As an option, the gesture 1900 may be implemented in the context of the architecture and environment of the previous Figures or any subsequent Figure(s). Of course, however, the gesture 1900 may be carried out in any desired environment. It should also be noted that the aforementioned definitions may apply during the present description.

In one embodiment of a pressure-based gesture, the display properties of one or more display(s) may be altered by the gesture, including the scroll speeds of one or more scrollable objects (e.g., text fields, images, cover art, etc.). Scrolling is a common operation, and is often assigned to a gesture in touch-based devices.

In one embodiment of a pressure-based gesture, one or more inputs may alter the scrolling speeds of one or more areas on the display. As a specific example, a user may wish to scroll quickly through a very large collection of objects (e.g., contact names, pages of text, photographs, etc.), and desires to control the speed of scrolling in a simple fashion. While performing a classic swipe gesture to scroll through the collection, the user may also apply increasing contact pressure to a pressure-sensitive surface as a means of controlling the scroll speed (e.g., increased contact pressure yields increased scroll speed, etc.). A swipe, slide or other simple gesture may be used.

See, for example, exemplary pressure-based gesture 1900. As shown, the gesture starts at touch event 1902, which involves a single finger is making contact at location L1, at time T1, while exerting contact pressure P1, in accordance with one embodiment. The gesture ends at touch event 1904, with touch event attributes L2, T2, and P2. In one embodiment, the sliding motion from L1 to L2 may be described as a swipe gesture.

As shown in plot 1906, as the contact pressure increases from P1 to P2, the scroll speed increases as well, from S1 to S2. In one embodiment, scroll speed may be a display function (in this case, a function of contact pressure). As an option, pressure-dependent display functions may be step-wise, changing in response to changes in discrete touch states, or continuous functions of a contact pressure level.

In various embodiments, pressure-based gestures may be classified as either dynamic gestures or static gestures. In the context of the present description, a dynamic gesture is a gesture that requires movement across or in proximity to an interaction surface. For example, in one embodiment, a swipe gesture may be classified as a dynamic gesture.

In the context of the present description, a static gesture refers to a gesture which does not involve movement across or in proximity to an interaction surface. Examples of static gestures may include, but are not limited to, button presses (real or virtual), multi-finger taps, operating a mechanical switch, a squeeze, and/or any other gesture which does not require motion.

In one embodiment of a pressure-based gesture that alters display properties, a scroll speed display function may be defined such that scroll speed increases in a non-linear fashion with respect to the contact pressure exerted in a swipe gesture.

In various embodiments, pressure-based gestures may be associated with different operations. For example, in one embodiment, pressure-based gestures may alter one or more display properties. Display properties may include, but are not limited to, backlight intensity, pixel color, scroll bar sensitivity, slideshow rate, and/or any other property associated with a display or its contents. As a specific example, a device may be in a sleep mode with the display and backlight inactive. A user may move his finger into proximity of a backtouch sensor in order to activate the display and the display backlight intensity to a low intensity level. By increasing the pressure on the backtouch sensor, the backlight intensity may be increased. Alternatively, the backlight intensity may be initially activated at a high level (e.g., depending on ambient light sensor etc.). In this case increasing pressure on the backtouch display may dim the backlight.

In one embodiment of a pressure-based gesture that alters a scroll speed, as the gesture magnitude is increased, the rate of scroll speed increase is increased. In other words, the scroll acceleration is increased.

In the context of the present description, gesture magnitude refers to the magnitude of the associated gesture dynamics. For example, in one embodiment, the gesture magnitude of a swipe gesture may include the length of the swipe and/or the contact pressure exerted during the swipe.

In one embodiment of a pressure-based gesture to control scroll acceleration, the scroll acceleration may depend on the gesture acceleration. Thus, if the contact is such that the contact point is accelerating with time (e.g., positive contact point acceleration), the scroll acceleration may be positive. In another embodiment, if the contact point acceleration is negative then the scroll acceleration may be negative (e.g., scroll speed decreased, etc.).

In one embodiment of a pressure-based gesture to control scroll acceleration, the scroll acceleration may be both positive and negative, depending on the contact point movement.

In one embodiment of a pressure-based gesture to control scroll acceleration, other display functions may also be altered. Possible display functions include, but are not limited to, selection(s), color, shape, image and/or text magnification, indicator(s) to provide feedback to user, and/or any other display function.

The addition of pressure dependence to already established touch gestures may facilitate user interactions with the device. Often, the efficacy of a gesture is limited by the size of the device. For example, on a device which uses the pinch-to-zoom gesture, zooming far in or out may require repetition of the gesture multiple times, due to screen size.

In one embodiment, the pinch-to-zoom touch gesture may be enhanced as a pressure-based gesture; after performing the pinch motion, the user exerts pressure on the two contact points. So long as the pressure remains above a predefined threshold, the zoom operation may continue inward/outward without requiring additional pinch motions. As an option, the speed of the zooming may be modified by changing the contact pressure level. As another option, any differences in contact pressure level between the two contact points may be dealt with by using the average pressure.

In another embodiment, the swipe to scroll touch gesture may be enhanced as a pressure-based gesture; after performing the swipe, the user exerts pressure on the contact point without further motion. So long as the pressure remains above a predefined threshold, the scroll operation may continue without requiring additional swiping motions. As an option, the scroll speed may vary as a function of the contact pressure level.

FIG. 20 shows an exemplary multitouch pressure gesture 2000 for indicating a direction, in accordance with one embodiment. As an option, the gesture 2000 may be implemented in the context of the architecture and environment of the previous Figures or any subsequent Figure(s). Of course, however, the gesture 2000 may be carried out in any desired environment. It should also be noted that the aforementioned definitions may apply during the present description.

As previously discussed, touch gestures may sometimes be modified to be pressure-dependent. In various embodiments, multitouch gestures may also be modified to depend upon pressure. As an option, the modified multitouch gestures may depend upon contact pressure differences between different contact points. In the context of the present description, a multitouch pressure gesture refers to a multitouch gesture whose definition relies in part on differences in contact pressure between different contacts. The definition of multitouch pressure gestures may rely on a variation in pressure differences over time, but it is not required of all multitouch pressure gestures.

See, for example, multitouch pressure gesture 2000 shown in FIG. 20. This static gesture is based upon two points of contact, 2002 and 2004. In various embodiments, this gesture may be used to indicate a direction. As depicted in FIG. 20, this multitouch pressure gesture is indicating a left-to-right direction, in accordance with one embodiment. In other embodiments, this gesture may be associated with any other operation, function, or action.

In various embodiments, multitouch pressure gesture 2000 may be performed by first exerting a contact pressure upon contact point 2002 which exceeds a contact pressure being exerted upon contact point 2004. As an option, various embodiments may require that both of these initial contact pressures exceed a predefined threshold contact pressure level. The gesture is completed by altering the contact pressures on the two contact points such that the pressure exerted on 2004 now exceeds that being exerted on 2002. As an option, a user may be required to maintain this pressure inequality for a predefined amount of time. When this gesture is performed using two digits on the same hand, the user's hand may appear to be rocking from left to right. A right to left direction may be indicated by changing the order of the pressures. This type of multitouch pressure gesture is hereinafter referred to as a rocker pressure gesture.

In various embodiments, a rocker pressure gesture may be preferable over simply indicating a side of the device through touch or pressure because it is less likely to be accidentally performed.

In various embodiments, a rocker pressure gesture may be used to modify a selection. For example, in one embodiment, a text selection may be expanded in a particular direction by performing a rocker pressure gesture in the desired direction, and maintaining the contact pressure difference between the two contact points until the text selection is the desired size. As an option, the speed at which the selection expands may be increased/decreased by increasing/decreasing the contact pressure differential. In another embodiment, this gesture may be used to modify the shape of a selection. For example, it may be used to modify the aspect ratio of the selection boundary geometry associated with the selection.

In various embodiments, a rocker pressure gesture may be used in conjunction with a user interface adapted for the visually impaired. For example, in one embodiment, the rocker pressure gesture may be used to move a selection from one UI element (e.g., button, slider, drop down menu, etc.) to the next. When a UI element is selected, the assistive interface may speak the object name and/or magnify it such that the visually impaired user understands. In this way, a visually impaired user may operate a user interface displayed on a screen which often provides zero tactile feedback.

In various embodiments, a rocker pressure gesture may be used to facilitate interaction with the operating system. For example, in one embodiment, this gesture may be used to traverse a list of applications running in a multi-tasking environment. In another embodiment, this gesture may be used to switch between windows in a windowed user environment. In yet another embodiment, a rocker pressure gesture may be used to increase/decrease system settings such as volume and display brightness.

In various embodiments, a rocker pressure gesture may be advantageous in an application environment. For example, in one embodiment, a rocker pressure gesture may be used to turn the pages of an electronic book, or other multipage document displayed as a book. Using a rocker pressure gesture would allow a user to hold the device with both hands while reading, thumbs in contact with the screen, without danger of accidentally triggering a page turn, nor requiring movement of hands or fingers to turn the page.

FIG. 21 shows an exemplary multitouch pressure gesture 2100 for indicating a rotation, in accordance with one embodiment. As an option, the gesture 2100 may be implemented in the context of the architecture and environment of the previous Figures or any subsequent Figure(s). Of course, however, the gesture 2100 may be carried out in any desired environment. It should also be noted that the aforementioned definitions may apply during the present description.

In various embodiments, multitouch gestures may enhance the user experience with the addition of pressure sensitivity. For example, in one embodiment, the measured difference in contact pressure levels among different contact points associated with a gesture may determine one or more parameters associated with the gesture. As an option, the one or more parameters may vary as a function of the pressure differential. Possible parameters may include, but are not limited to, speed of transformation, direction of transformation, stringency of a color matching selection, and/or any other parameter which may be associated with any type of action, command, or operation.

In another embodiment, the presence of a pressure differential among contact points associated with a gesture may change the identity of the gesture itself. For example, see FIG. 21.

As shown, multitouch pressure gesture 2100 is a static gesture based upon two points of contact, 2102 and 2104. In various embodiments, this gesture may be used to indicate a rotation. As depicted in FIG. 21, this multitouch pressure gesture is indicating a clockwise rotation, in accordance with one embodiment. In other embodiments, this gesture may be associated with any operation, function, or action.

In various embodiments, multitouch pressure gesture 2100 may be performed by exerting contact pressure upon contact points 2102 and 2104 such that there is a pressure differential. For example, as seen in FIG. 21, the contact pressure associated with contact point 2104 is greater than that associated with contact point 2102. As an option, various embodiments may require that both of these contact pressures exceed a predefined threshold contact pressure level. The gesture is completed by ending one or both contacts, or by performing a different gesture. As an option, a user may be required to maintain this pressure inequality for a predefined amount of time. This type of multitouch pressure gesture is hereinafter referred to as a tipping pressure gesture.

In various embodiments, a tipping pressure gesture may be used to rotate an object or element on a display. For example, in one embodiment, an image or selected portion of an image may be rotated by performing a tipping pressure gesture. As an option, the speed of rotation may depend upon the pressure differential between the two contact points. In another embodiment, the speed of rotation may vary as a function of the distance between the two contact points.

In one embodiment, the rotation may be performed in small angular increments, continuing until the tipping pressure gesture has ended. In another embodiment, the rotation is performed in 90° increments (e.g., changing the orientation of photographs, etc.), independent of gesture length or pressure differential. In some embodiments, the rotation may be performed using one of the contact points as the axis of rotation.

In some embodiments, a tipping pressure gesture may only cause a rotation in one direction (e.g., clockwise, etc.). In other embodiments, the direction of rotation caused by a tipping pressure gesture may depend on the positions of the two contact points with respect to each other. For example, in one embodiment, if the high pressure contact point is to the right of the low pressure contact point, the rotation may be in a clockwise direction, and in a counterclockwise direction otherwise. See, for example, multitouch pressure gesture 2100. In one embodiment, the axis used to make the left/right determination may be the horizontal axis as defined by the current device orientation. In another embodiment, the horizontal axis used to make the left/right determination is defined by device geometry, and is orientation independent. In still other embodiments, the axis used to determine left/right may be independent of device geometry or orientation (e.g., display diagonal, vertical, etc.).

In various embodiments, a tipping pressure gesture may be used to interact with user interface elements. For example, in one embodiment, a tipping pressure gesture may be used to increase/decrease the value of a selected slider or scale. In another embodiment, a tipping pressure gesture may be used to cycle through options on a circular pop-up menu. In still another embodiment, a tipping pressure gesture may be used to quickly scroll through a list of items. Possible items may include, but are not limited to, email messages, songs or videos, files, photos, and/or any other object or data.

In some embodiments, there may exist two or more gestures which are the same or similar in execution. For example, see multitouch pressure gestures 2000 and 2100. While performing a tipping pressure gesture, if a user allows the contact pressure differential to switch sign (i.e. low pressure contact point becomes the high pressure contact point, and visa versa), a rocker pressure gesture may be recognized by the device. In various embodiments, constraints may be placed upon gestures to assist the operating system in differentiating between similar gestures.

In various embodiments, similar or identical gestures may be distinguished from each other through the context of their use. For example, in one embodiment, the recognition of a tipping pressure gesture may be limited to instances where there is a rotatable object selected; the rocker pressure gesture would be available in all other instances. By ensuring similar gestures are not recognizable in the same context, user confusion and erroneous gestures may be reduced. These contexts may include, but are not limited to, selection status, device state, active application, system flags, selection subject matter, and/or any other property or attribute by which contexts may be defined.

In various embodiments, similar or identical gestures may be distinguished from each other by the positions of points of interaction, relative to a common axis system. In the context of the present description, a point of interaction refers to any point on an interaction surface where user interaction may be localized. Points of interaction include, but are not limited to, contact points, localized proximity and/or any other localized user interaction.

In the context of the present description, a common axis system refers to an axis system upon which all gesture data may be evaluated. For example, in one embodiment, the common axis system may be tied to the device geometry (i.e. the "horizontal" axis is always parallel to the long edge of the main display, etc.). In another embodiment, the common axis system may be tied to device orientation, such that the axis system changes depending on accelerometer data (though it is still common to all gestures).

Using a common axis system, an examination of the relative positions of points of interaction associated with a gesture may facilitate differentiation. For example, in one embodiment, rocker pressure gestures may only be recognized if a line between the two contact points is within a predefined deviation from the common horizontal axis (and the tipping pressure gesture available in all other cases). In another embodiment, the similar gestures may all be available at all times, but the location of points of interaction with respect to the common axis system may be used to give priority to certain gestures over others in certain situations.

In various embodiments, similar or identical gestures may be distinguished from each other through the timing associated with their execution. For example, in one embodiment, the performance of a rocker pressure gesture may have to be done within a certain amount of time, otherwise it may be interpreted as multiple tipping pressure gestures. In another embodiment, a tipping pressure gesture may have to be held for a certain amount of time before being recognized, such that the beginning of a rocker pressure gesture may not be identified as a tipping pressure gesture.

In various embodiments, one or more pressure-based gestures may be combined with other multi-touch and/or pressure-based gestures, such that a user may give multiple gesture-based instructions without breaking contact with one or more interaction surfaces. For example, suppose a user finger is at 3 o'clock and a user thumb at 9 o'clock and finger and thumb are one inch apart, both on a front touchscreen. The user may slide finger and thumb further apart. In one embodiment, this may result in an increase in selection area, for example. The user may then increase finger pressure. This may result in the increased selection area being rotated.

In other embodiments, other combinations and permutations of various inputs and gestures on various surfaces and using various sensors may be used to simplify the user interface and make pressure-based gestures more intuitive. As an option, such gestures may be pre-programmed, or programmed by the user, or a combination of both.

FIG. 22 shows an exemplary front-back gesture 2200, in accordance with one embodiment. As an option, the gesture 2200 may be implemented in the context of the architecture and environment of the previous Figures or any subsequent Figure(s). Of course, however, the gesture 2200 may be carried out in any desired environment. It should also be noted that the aforementioned definitions may apply during the present description.

In the context of the present description, a front-back gesture refers to a two surface gesture which includes inputs on interaction surfaces located on both the front and back of the device. For example, in one embodiment, a gesture which is performed on both a front touch-sensitive display and a back-touch interface may be classified as a front-back gesture. In some embodiments, a front-back gesture may involve multiple inputs on one or both interaction surfaces. In some embodiments, one or more inputs on one or both interaction surfaces may be pressure or proximity-based.

A front-back gesture is a type of generalized gesture. In the context of the present description, a generalized gesture refers to a gesture that includes input from multiple sources. Possible sources may include, but are not limited to, interaction surfaces, accelerometers, buttons, and/or any other functionality or hardware receptive to user interaction.

Generalized gestures may provide a more intuitive user experience, as they can sometimes closely mimic familiar actions associated with a particular task. For example, see the front-back gesture shown in FIG. 22.

As shown, front-back gesture 2200 is a dynamic gesture based upon two points of contact. In various embodiments, this gesture may be used to indicate a rotation. As depicted in FIG. 22, this front-back gesture is associated with rotation about an axis that is both parallel to the interaction surfaces and perpendicular to the motion of the contact points, in accordance with one embodiment. In some embodiments, the rotation axis may only need to be parallel to the front interaction surface (i.e. if the front and back surfaces are not parallel, etc.). In other embodiments, this gesture may be associated with any operation, function, or action.

In various embodiments, front-back gesture 2200 may be performed by making a single contact with the front interaction surface and a single contact with the back interaction surface. For example, as seen in FIG. 22, contact point 2202 is located on the front interaction surface and contact point 2204 is located on the back interaction surface. The gesture is performed by moving the contact points in opposite directions along parallel vectors. In some embodiments, the motion vectors of the two points of contact may diverge from being parallel to each other by a predefined amount and still be considered parallel. The gesture is completed by ending one or both contacts, or by performing a different gesture. This type of front-back gesture is hereinafter referred to as a spin gesture. In one embodiment, there may also exist spin gestures which are not front-back gestures.

In various embodiments, a front-back gesture may have an associated gesture reference. In the context of the present embodiment, a gesture reference refers to a constraint or parameter of one or more dimensions which is related to the operation linked to the gesture. For example, the gesture reference for the front-back gesture 2200 may be the axis of rotation. Other gesture references may include, but are not limited to, an axis for rotation, a plane for movement, and/or any other geometric constraint upon an operation.

In various embodiments, a spin gesture may be used to rotate an object or element on a display. For example, in one embodiment, a spin gesture may be used to rotate a displayed object within a three dimensional space. As an option, the rotation of the object may be about the same axis as the gesture reference. In another embodiment, a spin gesture may be used to rotate a displayed object about an axis independent of the gesture reference. In yet another embodiment, the gesture reference (i.e. axis of rotation) may not pass through the target object (i.e. the operation may move the object through three dimensional space about an axis, etc.).

In one embodiment of a front-back gesture, an object transformed by a spin gesture may include an entire image. In another embodiment of a front-back gesture, an object transformed by a spin gesture may include one or more recognized objects in an image.

In various embodiments, a spin gesture may be used to cycle through a plurality of items or objects. For example, in one embodiment, a spin gesture may be used to cycle through a number of style options which are applied to selected text. Style options include font, type size, bold, italic, underline, predefined style combinations, and/or any other attribute which may be assigned to text.

In another embodiment, a spin gesture may be used to select a color from a spectrum. In yet another embodiment, a spin gesture may be used to cycle through system environments. Possible system environments include, but are not limited to, applications running in a multi-tasking environment, screen layers, and/or any other environment or use scenario.

In various embodiments of a spin gesture, the gesture reference (i.e. axis of rotation) may be parallel to the display plane. For example, see the spin gesture depicted in FIG. 22.

In various embodiments of a spin gesture, the gesture reference may be perpendicular to the display plane. For example, in one embodiment, a rotation within the plane of the display (i.e. axis of rotation perpendicular to display) may be accomplished by a spin gesture performed on a single interaction surface. A single surface spin gesture is performed by making two contacts with a surface, and moving those contacts such that their motion vectors are in opposite directions, but parallel. This type of gesture may also be called a front-front gesture, to distinguish it from the front-back gestures.

In various embodiments of a spin gesture, the reference for a spin gesture may be determined by the locations of the interaction surface(s) used. For example, in one embodiment, a device may have faces in the x-plane, y-plane and z-plane. Each face may have an interaction surface. Depending on which faces are used in the spin gesture, a spin gesture operation may be performed about the x-axis, y-axis, or z-axis.

If the device was represented as a simple cube with six faces numbered according to a standard die, the types of gestures using two interaction surfaces (i.e. front-back gestures, etc.) may be enumerated.

In one embodiment, the main display (if there is one) may be declared to be the device front, and enumerated as face 1. Face 6 would be the back of the device. Faces 2, 3, 4, 5 are the sides of the device. In another embodiment, the x-, y-, and z-axis are defined to be to be perpendicular, with the x-axis passing through the centers of faces 2 and 5, the y-axis through faces 3 and 4, and the z-axis through faces 1 and 6.

With this labeling scheme, a front-back gesture would be designated as a 1-6 gesture, for example. The gesture components that together make up a complete gesture may be referred to by their faces. For example, a 1-6 gesture may comprise a 1-gesture (a first gesture component) combined with a 6-gesture (a second gesture component). In the context of the present description, this labeling scheme may be referred to as gesture notation.

In the context of the present description, gesture components refer to the individual gestures on any single interaction surface (e.g., the movement of a thumb on a touchscreen, the pressure of a finger on a backtouch sensor, etc.) that together make up a complete, compound gesture. In some embodiments, gesture components may be performed simultaneously. In other embodiments, gesture components may all be completed within a predefined window of time, but not necessarily performed simultaneously.

In various embodiments, compound gestures may be categorized by their components and operations. For example, the set of 1-6 spin gestures is a subset of all 1-6 gestures. As discussed before, a 1-6 spin gesture may be described as a 1-6 gesture in which the 1-gesture and 6-gesture move with opposite though parallel vectors (determined within some threshold of accuracy).

In one embodiment, gesture components may be characterized by their touch gesture shape, in order to catalog compound gestures. In the context of the present description, touch gesture shape refers to the basic geometry of a touch gesture. Examples of touch gesture shapes include, but are not limited to, lines, circles, arcs, and/or any other geometry.

In various embodiments, touch gesture shape is an example of a gesture attribute. In the context of the present description, a gesture attribute refers to a characteristic or property which may be associated with a gesture. In one embodiment, all gesture components have at least one gesture attribute. Possible characteristics and properties may include, but are not limited to, touch gesture shape, gesture scale, gesture size, gesture orientation, time, pressure gesture shape, proximity gesture shape, maximum pressure, and/or any other data which may be associated with a gesture. In the context of the present description, gesture orientation refers to the relative angle of a touch gesture shape, with respect to a predefined axis.

In the context of the present description, a pressure gesture shape refers to the path a contact point takes through a one dimensional pressure phase space. As an option, it may be correlated with the physical locations that make up a gesture shape. In the context of the present description, a proximity gesture shape refers to the path a detectable implement of interaction takes through a three-dimensional proximity phase space (the third dimension being estimated proximity). In various embodiments, the proximity gesture shape may be represented by the time evolution of local maxima of the data received by a proximity-sensitive interaction surface. In various embodiments, a pressure or proximity gesture shape may be the result of simplifying pressure or proximity data and identifying a matching basic geometry or predefined shape.

In various embodiments, gesture attributes may also include derived inputs. In the context of the present description, a derived input is an input which is derived or calculated from other inputs. Derived inputs may include, but are not limited to, velocity, acceleration, uncertainty, statistical variation, and/or any other derived input. As an option, these concepts, including but not limited to velocity and acceleration, may also be applied to pressure and/or proximity.

For example, in one embodiment, the device may sample one or more inputs at time t1 and time t2. The inputs sensed may include a contact point $PT(X1, Y1, t1)=PT1$ at time t1 and $PT(X2, Y2, t2)=PT2$ at time t2. The device may then calculate the velocity of part(s) of a gesture by calculating the distance $D(t2)=D2$ between PT1 and PT2 and dividing the distance D2 by the time difference $t2-t1$, to form an estimate of the gesture velocity $V(t2)=V2$.

In various embodiments, the gesture attributes may be used to alter the function performed by the gesture, as well as distinguish gestures. For example, in one embodiment, the velocity and acceleration of one or more of the gesture components comprising a spin gesture may modify the speed of the resulting rotation. In one embodiment, a gesture attribute may be a member of a predefined set (i.e. basic geometries and shapes, etc.) or have a numerical value.

In another embodiment, gestures may be differentiated by a single gesture attribute. For example, in one embodiment, there may be a 1-6 gesture, where the 1-gesture and 6-gesture are both lines. If the two component gestures have the same gesture orientation (i.e. the lines are in the same direction), the compound gesture may cause an object to move in the direction of the lines. If the two component gestures have opposite orientation (i.e. the lines are in opposite direction), the compound gesture may be a spin gesture and cause an object to rotate about the gesture reference.

In various embodiments, a touch gesture shape may be determined from a collection of contact point data taken over time. In one embodiment, the touch gesture shape associated with a set of contact points may be determined by constructing a best-fit line. In another embodiment, the touch gesture shape may be determined using a linear regression. In yet another embodiment, the touch gesture shape may be determined by fitting a shape (i.e. circle, square, triangle, etc.), or a fragment of a shape, to a series of averaged contact points. In other embodiments, similar techniques may be used to determine pressure or proximity gesture shapes.

In various embodiments, a compound gesture may be characterized by the gesture attributes of the component gestures. For example, in one embodiment of a 1-6 spin gesture, the gesture reference may be defined as the y-axis if the 1-gesture has a gesture angle (i.e. angle of the fitted line, etc.) within 30 degrees of the x-axis. As an option, the 1-angle and 6-angle may be averaged.

In one embodiment, spin gestures may be limited to those whose gesture components occur on parallel planes (i.e. 1-6, 2-5, 3-4, etc.). In another embodiment, spin gestures may also be performed using component gestures occurring on perpendicular planes. For example, a 1-2 spin gesture. In yet another embodiment, the gesture reference (i.e. axis of rotation) for spin gestures occurring on perpendicular planes may be restricted to an axis bisecting the angle between the planes, perpendicular to their intersection. In this way, the tactile association with spinning may be preserved (i.e. use of other axes may reduce the intuitive nature of the user experience).

In one embodiment, spin gestures may be constrained, such that the gesture reference is limited to axes parallel to the x-, y-, and z-axes. In other words, each spin gesture occurring on two parallel planes would have only two possible axes of rotation.

In various other embodiments, the axis of rotation for a spin gesture performed on two parallel planes (i.e. 1-6, etc.) may be less constrained. For example, in one embodiment, the axis of rotation may be defined as the axis which is perpendicular to the motion of the component gestures, and parallel to the component planes. In another embodiment, the constraint may be further reduced, by defining the axis of rotation as the axis which is normal to the plane which contains (within some tolerance) the motion of both component gestures.

In one embodiment, the axis of rotation associated with a spin gesture may be required to pass through the center of the device. In another embodiment, the axis of rotation may be required to pass through the center of a primary display. In yet another embodiment, the axis of rotation may pass through a point determined by an application and/or through user input.

In one embodiment, spin gestures may be defined and used in the manners discussed, even if the device has more or less than six faces, not all faces have interaction surfaces, and/or faces are not parallel or perpendicular. As an option, the operation performed by a spin gesture on such a device may be adapted to the device's physical geometry, such that the tactile familiarity of the gesture may be preserved.

Another example of a 1-6 gesture is the pivot gesture. In the context of the present description, a pivot gesture refers to a 1-6 gesture where one component gesture is a static contact point, and the other component gesture is a circle or arc (i.e. the gesture shape is a circle or arc) which would contain the static contact point if the two faces were combined. In one embodiment, a pivot gesture may be associated with a rotation operation, where an object is rotated about the static contact point, within the plane of the display. In another embodiment, a pivot gesture may be used to cycle through items in a circular menu, such as a pop-up menu.

FIG. 23 shows an exemplary virtual control knob gesture 2300, in accordance with one embodiment. As an option, the gesture 2300 may be implemented in the context of the architecture and environment of the previous Figures or any subsequent Figure(s). Of course, however, the gesture 2300 may be carried out in any desired environment. It should also be noted that the aforementioned definitions may apply during the present description.

In various embodiments, a virtual control knob gesture is a subset of the spin gesture. In some embodiments, there may be slight overlap with the set of spin gestures.

In some embodiments, virtual control knob gestures may provide a user with a more intuitive experience, as they mimic the manner in which a user would operate a real control knob. For example, see virtual control knob gesture 2300.

As shown, virtual control knob gesture 2300 is a dynamic gesture based upon two points of contact. In various embodiments, virtual control knob gestures are very similar to spin gestures, except they may be performed upon a knob or knob-like implement displayed on the screen. See for example virtual control knob 2302.

In various embodiments, virtual control knob gesture 2300 may be performed by making a single contact with the front interaction surface and a single contact with the back interaction surface, both contacts being on or in close proximity to a control knob on the display. For example, as seen in FIG. 23, contact point 2302 is located on the front interaction surface and contact point 2304 is located on the back interaction surface, both contact points located on top of/below displayed control knob 2306.

The gesture is performed by moving the contact points as though the knob is being turned. For example, in FIG. 23, contact point 2302 may be moved upward while contact point 2304 may be moved downward, as indicated. The gesture is completed by ending one or both contacts, performing a different gesture, or when one or both contact points is no longer in proximity to the displayed control knob.

As a specific example, in one embodiment, the device may be held in a user's right hand. The user's right hand thumb makes contact point 2302 on the front touchscreen, and their right hand index finger makes contact point 2304 on a back-touch interface, both contacts located on the displayed control knob 2306. As the gesture is performed, the control knob turns, incrementing the associated dial 2308.

In another embodiment, a virtual control knob gesture may be performed on a single interaction surface. See, for example, gesture 2310. Contact points 2312 and 2314 are made on top of displayed control knob 2316, which rotates on an axis perpendicular to the display. The gesture is performed by moving the contact points in a circular motion, as depicted.

In another embodiment, the device may be receptive to the performance of two virtual control knob gestures at the same time. For example, a user may turn both control knobs seen in the depiction of gesture 2300. In yet another embodiment, one or more virtual control knob gestures may be used in combination with other types of gestures. In other embodiments, a virtual control knob gesture may be associated with any other operation, action, or process.

In some embodiments, virtual control knob gestures may be differentiated from spin gestures because they may be performed upon a knob or knob-like implement displayed on the screen. In other embodiments, virtual control knob gestures differ for spin gestures in that their definition may depend upon which fingers are used. See for example virtual control knob gesture 2318.

In various embodiments, gestures may be defined such that particular fingers may be used. In one embodiment, fingers may be identified by the size of the contact area. In another embodiment, fingers may be identified by their relative location on interaction surfaces, taking into account other skin contact. In yet another embodiment, fingers may be identified though a combination of these and other methods. As an option, a user may be prompted to identify their fingers within a training interface.

As shown in FIG. 23, in one embodiment, gesture 2318 may be performed by making contact point 2320 with an index finger on a front interaction surface, and contact point 2322 with the thumb of the same hand, on a backtouch interface. The gesture is performed by moving the contact points in opposite directions, as depicted in FIG. 23 and as described in other embodiments. In one embodiment, this gesture may be distinguished by the same motion and contact points being made with the thumb on the front and the index finger on the back.

In various embodiments, the user may be provided feedback as they perform a virtual control knob gesture. For example, in one embodiment, a displayed virtual control knob may have markings which make apparent the rotation of the displayed knob as the gesture is performed. In another embodiment, performance of the gesture on a displayed virtual control knob may produce a clicking sound. As an option, the frequency of the clicks may vary as a function of how fast the displayed knob is being turned.

FIG. 24 shows a method 2400 for gesture differentiation, in accordance with one embodiment. As an option, the method 2400 may be implemented in the context of the architecture and environment of the previous Figures or any subsequent Figure(s). Of course, however, the method 2400 may be carried out in any desired environment. It should also be noted that the aforementioned definitions may apply during the present description.

As shown, potentially gesture related input is gathered. See operation 2402.

In various embodiments, there may exist a tiered approach to interpreting user input. For example, in one embodiment, it may first be determined whether there is any meaningful user input.

In various embodiments, each form of user input may have an associated threshold above which user interaction may rise before it may be deemed meaningful. Examples of such thresholds may include, but are not limited to, minimum threshold pressure level, minimum threshold proximity level, maximum context determination zone, and/or any other threshold meant to prevent acting on unintentional user interactions.

In one embodiment, upon detecting meaningful user input, it is then determined whether it is related to a basic user interaction (i.e. button press, basic application interaction, etc.). If the meaningful user input is not related to a basic user interaction, then it may potentially be related to a gesture. In one embodiment, that determination may result in the initiation of method 2400. In another embodiment, system and environmental information may be gathered, in addition to the meaningful user input.

Once potential gesture input has been received, it is determined if the gesture is possibly a generalized gesture. See determination 2404.

A generalized gesture is a gesture that includes input from multiple sources, including but not limited to multiple interaction surfaces. In one embodiment, the possibility of a generalized gesture may be determined by ascertaining the number of sources provided the meaningful input gathered in operation 2402.

If it is determined that the gesture is possibly a generalized gesture (i.e. there is meaningful input from more than one source), then possible gesture identities are deduced using gesture attributes, gesture components, and gesture notation. See operation 2406.

In various embodiments, the identification of a generalized gesture may begin with the identification of the component gestures. Component gestures may be identified by evaluating associated gesture attributes, as has been previously discussed. In one embodiment, once the component gestures have been identified, gesture notation may be used to narrow the field of potential gestures.

In one embodiment, a generalized gesture may be identified by first identifying the faces involved, then further limiting the possibilities by identifying characteristic gesture attributes in common, until the number of potential generalized gestures is either one, or cannot be further reduced. In another embodiment, a decision tree may be used to identify the generalized gesture.

If it is determined that the gesture is not a generalized gesture (i.e. there is meaningful input from only one source), then possible gesture identities are deduced using gesture attributes. See operation 2408.

In various embodiments, the same methods used to identify component gestures in operation 2406 may be used in this operation.

As shown, it is determined if there is a single possible gesture being performed. See determination 2410. In one embodiment, if there are no potential gestures, the user may be provided feedback indicating a failure to recognize the gesture. Feedback may be visual, aural, or both.

If there is more than one possible gesture being performed, then the gesture subject matter context is used to identify the gesture. See operation 2412.

In the context of the present description, gesture subject matter context refers to any subject matter which may be related to a gesture. Examples may include, but are not limited to, selected objects, objects displayed at or near the location of the gesture, and/or any other items, objects, or properties which may give context to a gesture.

In some embodiments, similar gestures may require the use of gesture subject matter context to differentiate. For example, in one embodiment, a spin gesture and virtual control knob gesture may be indistinguishable until it is determined whether there is a displayed control knob at the contact points.

After using the gesture subject matter context to identify the gesture, it is determined whether there is a single possible gesture being performed. See determination 710.010.1-14.

If there is still more than one possible gesture being performed, then a default response is performed. See operation 2416.

In one embodiment, the default response to the inability to identify the gesture may be to do nothing, and stop applying method 2400. In another embodiment, the default response may be to restart method 2400, in the hope that sufficient additional user input may have been gathered that may assist in gesture differentiation.

In yet another embodiment, the default response to the inability to identify the gesture may be to prompt the user to clarify their recent input. For example, in one embodiment, the user may be prompted by a pop-up interface which allows the user to select from identified potential gestures, or indicate that none of the candidates are correct. Since such user interaction could possibly interrupt the performance of the gesture, the user may have to repeat the gesture after making an appropriate selection.

If the identity of the gesture being performed has been determined, it is then determined whether the gesture is meant to trigger some sort of transformation. See determination 2418. Examples of possible transformations include, but are not limited to, move, slide, scale, rotate, and/or any other spatial or geometric transformation.

If the gesture is meant to trigger a transformation, then the gesture reference is determined. See operation 2420.

In various embodiments, gestures which cause a transformation to occur may have an associated gesture reference. For example, in one embodiment, a spin gesture may have a gesture reference (i.e. axis of rotation). In various embodiments, a gesture reference may be determined using the type or specific identity of the gesture and/or gesture attributes (i.e. gesture orientation, gesture shape, etc.).

As shown, the intermediate operations associated with the identified gesture are performed. See operation 2422.

In the context of the present description, an intermediate gesture operation refers to operations associated with a gesture which may be executed before the gesture is done. For example, a spin gesture which rotates a displayed object may cause rotation to occur and be displayed before the user has stopped performing the gesture. In this way, a user may receive feedback on their gesture before terminating the interaction. Not all gestures have associated intermediate operations.

In one embodiment, each execution of intermediate gesture operations may cause an update of the gesture attributes before execution begins. In this way, the feedback given to the user performing the operation is responsive to their performance.

In another embodiment, each execution of intermediate gesture operations may trigger a display update (i.e. rendering, etc.). As an option, the display update may be localized to the portions of the display affected by the gesture operations, and may be more frequent than display updates for other user interface elements.

The intermediate operations are continuously performed unless it is determined that the gesture has ended. See determination 2424.

In various embodiments, a gesture may be ended by ending one or more user inputs. For example, in one embodiment, a spin gesture may be ended by breaking contact with one or two interaction surfaces. In another embodiment, a proximity-based gesture may be ended by reducing at least one proximity below a predefined threshold. In yet another embodiment, a pressure-based gesture may be ended by reducing the contact pressure level associated with one or more contact points below a predefined threshold level.

In various embodiments, a gesture may be ended by performing a different gesture. In one embodiment, the performance of a new gesture may be detected by changes observed in one or more gesture attributes. As an option, the changes may have to exceed a predefined threshold before identification of a new gesture is attempted. In some embodiments, a gesture may not necessarily be able to end all other gestures.

Once it has been determined that the gesture has ended, the final operations associated with the identified gesture are performed. See operation 2426.

In various embodiments, gestures may be associated with one or more final operations. In the context of the present description, a final operation refers to an operation which is executed when a triggering gesture has ended. For example, in one embodiment, a gesture which triggers the display of a pop-up menu and allows a user to cycle through menu items may have as a final operation the selection of the current menu item and removal of the pop-up menu.

FIG. 25 shows an exemplary anchor and move gesture 2500, in accordance with one embodiment. As an option, the gesture 2500 may be implemented in the context of the architecture and environment of the previous Figures or any subsequent Figure(s). Of course, however, the gesture 2500 may be carried out in any desired environment. It should also be noted that the aforementioned definitions may apply during the present description.

As shown, anchor and move gesture 2500 is a dynamic front-back gesture based upon two points of contact. In various embodiments, this gesture may be used to anchor one object while modifying another. Possible modifications include, but are not limited to, translation, scale, rotate, and/or any other operation that may be performed on a graphic object. As depicted in FIG. 25, this front-back gesture is associated with the anchoring of one graphic object and the translation of another graphic object, in accordance with one embodiment. In other embodiments, this gesture may be associated with other modifications, including but not limited to text modification, user interface interactions, selection modifications, and/or any other type of modification which may be associated with a gesture. In still other embodiments, this gesture may be associated with any operation, function, modification or action.

In various embodiments, anchor and move gesture 2500 may be performed by making a single contact with the front interaction surface and a single contact with the back interaction surface. For example, as seen in FIG. 25, contact point 2502 is located on the front interaction surface and contact point 2504 is located on the back interaction surface. In one embodiment, the gesture is performed by moving one contact point while keeping the other stationary. For example, as shown, contact point 2502 may be kept stationary while contact point 2504 may move along a line. In various embodiments, this may result in an anchor object 2506 remaining unchanged, and a dynamic object 2508 being translated in the same direction as the contact point movement. As an option, the dynamic object may be modified as a function of the movement of the non-stationary contact point.

In the context of the present description, an anchor object refers to an object which remains unchanged by the anchor and move gesture. Additionally, in the context of the present description, a dynamic object refers to an object which is modified by the anchor and move gesture. In some embodiments, there are multiple ways to select the anchor and/or dynamic object.

In various embodiments, the dynamic and/or anchor object may be selected through pressure-based methods. For example, in one embodiment, one of these two objects may be selected using method 4. In another embodiment, both objects may be selected using method 4, after the user has indicated that a dual selection was to be made. As an option, the user may use a gesture to indicate the use of a dual selection. In still another embodiment, one or both objects may be selected using a gesture.

In various embodiments, the dynamic and/or anchor object may be selected as part of the anchor and move gesture. For example, in one embodiment, a user may select an anchor object by placing the implement of interaction making the stationary contact point on top/beneath it. In another embodiment, the dynamic object may be selected in a similar manner, using the implement of interaction whose interaction with the interaction surface may be dynamic. As an option in these embodiments, the selection of an object may be assisted by recognition routines (i.e. facial recognition, color matching, OCR, etc.). In yet another embodiment, method 6 may be used in conjunction with these embodiments to select one or both objects.

In various embodiments, the anchor and move gesture may be associated with modifying one object with respect to another. For example, in one embodiment, this gesture may be used to arrange photos in an environment which imitates a light table.

In some embodiments, the anchor and move gesture may be enhances with pressure sensitivity. For example, in one embodiment, a user may use contact pressure exerted on the dynamic contact point to modify a different aspect of the dynamic object. Possible aspects include, but are not limited to, scale, orientation, transparency, and/or any other aspect which may be made to vary with pressure.

In various embodiments, the anchor and move gesture may utilize one or more cues to provide feedback to the user. In the context of the present description, a cue refers to feedback, visual or otherwise, which is provided to the user. Examples of cues include, but are not limited to, the display logic within selection functions, visual representation of contact point movement, proximity feedback, contact pressure level feedback, and/or any other form of user feedback. For example, in one embodiment, the anchor object may be highlighted (e.g., change of color, text highlight, 3D representation, flashing or other dynamic selection area behavior, etc.)

In various embodiments, cues may include 3D or pseudo-3D effects. For example, in one embodiment, the anchor object may be made to appear to be floating above a background image, using 3D cues.

In various embodiments, a cue may modify a 2D representation into a pseudo-3D representation responsive to user inputs such as device orientation. For example, in one embodiment, the shadow of an object may be adjusted according to device orientation, to provide the illusion that an object is floating above a background. In another embodiment, the pseudo-3D representation may be responsive to user focus (including, in some embodiments, user gaze).

In various embodiments, the anchor and/or dynamic object may be text (i.e. letter, word, sentence, paragraph, etc.), graphics, recognized object(s), and/or any part or portion of the display.

In various embodiments, the anchor and move gesture may be used to allow easy modification of a single object. For example, in one embodiment, a user may select an anchor object, and then modify it as a function of the dynamics of the other contact point. As a specific example, a user may anchor a text selection, and cycle through different fonts by changing the distance between the anchor contact point and the dynamic contact point. As an option, pressure applied upon the dynamic contact point may cycle through different attributes of the anchor object which are modified as a function dynamic contact point location. Possible attributes include text style, color, transparency, image layer, and/or any other object attribute FIG. 26 shows an exemplary twist gesture 2600, in accordance with one embodiment. As an option, the gesture 2600 may be implemented in the context of the architecture and environment of the previous Figures or any subsequent Figure(s). Of course, however, the gesture 2600 may be carried out in any desired environment. It should also be noted that the aforementioned definitions may apply during the present description.

As shown, twist gesture 2600 is a dynamic 1-6 gesture based upon four points of contact. It is intended to mimic a twisting motion performed on the device. In various embodiments, twist gesture 2600 may be performed by making two contacts with the front interaction surface, and two contacts with the back interaction surface. In one embodiment, this is accomplished by holding the device with two hands, as depicted in FIG. 26. As shown, the user's thumbs make front side contact points 2602 and 2604, and the user's index fingers make back side contact points 2606 and 2608, in accordance with one embodiment. In other embodiments, different fingers and/or implements of interaction may be used.

The motion associated with one embodiment of twist gesture 2600 is such that all contact points may be slid in directions parallel to each other and perpendicular to the twisting axis. The contact points on the front interaction surface move in opposite directions, and the movement directions of the contact points on the back interaction surface are opposite those on the front surface. These movements imitate the motion of twisting the device.

In another embodiment, a twist gesture may be a static 1-6 gesture similar to 2600, except the thumbs and fingers are located such that like digits form a diagonal across the device. In accordance with one embodiment, this static gesture may be recognized by the application of contact pressure levels to the contact points which exceed a predefined lower threshold. In yet another embodiment, a twist gesture may involve a combination of contact point movement and contact pressures.

In various embodiments, a twist gesture may be associated with the deletion of one or more items. Possible items may include, but are not limited to, email messages, files, selected objects, and/or any other item which may be deleted. As an option, the deletion operation associated with a twist gesture may also include a visual routine which makes it appear that the item being deleted is being torn in half by the gesture.

In various other embodiments, a twist gesture may be associated with operations which are intuitively associated with the action of wringing out a wet cloth. For example, in one embodiment, a twist gesture may cause the compression of a selected file.

In another embodiment, a twist gesture may trigger the application of data detection routine(s) to selected text. In the context of the present description, a data detection routine refers to a routine which parses text data, creating hyperlinks for actionable information. Types of actionable information may include, but are not limited to, phone numbers, contact names, dates, addresses, and/or any other type of text data which may be associated with an operation or application. In one embodiment, the hyperlinks created by the data detection routine(s) may pass the actionable information to the appropriate application or function (i.e. selecting a phone number may dial it, selecting an address may display a map, etc.).

In one embodiment, a twist gesture may cause a twisting distortion to be applied to an image. As an option, the magnitude of the distortion may be a function of the average distance traveled by the four contact points. In another embodiment, a twist gesture may be associated with any operation, action, or function.

FIG. 27 shows an exemplary implementation 2700 of a method to determine touch states using a touch-sensitive interface, in accordance with one embodiment. As an option, the gesture 2700 may be implemented in the context of the architecture and environment of the previous Figures or any subsequent Figure(s). Of course, however, the gesture 2700 may be carried out in any desired environment. It should also be noted that the aforementioned definitions may apply during the present description.

FIG. 27 shows a method 2700 for determining touch states using a touch-sensitive interface, in accordance with one embodiment. As an option, the method 2700 may be implemented in the context of the architecture and environment of the previous Figures or any subsequent Figure(s). Of course, however, the method 2700 may be carried out in any desired environment. It should also be noted that the aforementioned definitions may apply during the present description.

In various embodiments, method 2700 may be used to provide basic pressure sensitivity for interaction surfaces which are touch-sensitive but not pressure-sensitive. In one embodiment, it may be limited to user interactions involving fingers or thumbs. It is based on the fact that as a digit presses harder on a surface, the contact area increases.

As shown, a contact area is measured. See operation 2702.

In one embodiment, the number of touch states which can be consistently recognized with this method may depend upon how accurate the touch-sensitive interaction surface is able to determine the contact area.

After measuring the contact area, the digit is identified. See operation 2704.

In various embodiments, a digit in contact with an interaction surface may be identified using incidental user interactions. Incidental user interactions include, but are not limited to, skin contact with various touch-sensitive interaction surfaces, detectable proximity to proximity-sensitive interaction surfaces, device orientation, and/or any other data related to how the user is holding or using the device.

As shown, the touch state is calculated. See operation 2706.

In various embodiments, the touch state may be calculated by comparing the measured contact area with a digit pressure response profile. In the context of the present description, a digit pressure response profile refers to a description of how the contact area associated with a digit changes as a function of contact pressure exerted. In one embodiment, a digit pressure response profile may depend upon a numerical measurement of the contact area. In another embodiment, a digit pressure response profile may also depend upon the shape of the contact area.

In various embodiments, a collection of one or more digit pressure response profiles may be predefined. In one example, a plurality of response profiles may be created and/or improved through prompting a user to provide examples of different levels of contact pressure exerted by specific digits. As an option, the user may be prompted to provide exemplary digit contact/pressure while holding the device in one of a plurality of predefined device grips (i.e. manner of holding the device).

In another embodiment, if the device possesses at least one touch-sensitive interaction surface which is also pressure-sensitive, one or more digit pressure response profiles may be created or improved by prompting the user to exert contact pressure on that surface while said surface is situated in a variety of orientations and locations (i.e. as a front surface, as a back surface, as a side surface, etc.). The user may be prompted to exert contact pressures representative of various touch states. As an option, the user may be provided with alternative forms of feedback during this process, as the device may need to be held such that the user cannot see the display. The alternative forms of feedback may include, but are not limited to, vibration, sound, LEDs, and/or any other form of feedback which does not require that the display be visible.

Some devices may not have a sufficient number of interaction surfaces to accurately determine the identity of a particular digit. In one embodiment, a generic digit pressure response profile may be predefined, to be used in situations where a digit cannot be identified. In another embodiment, a user may be prompted to identify an unrecognizable digit.

FIG. 28 shows exemplary pattern-based gestures 2800, in accordance with one embodiment. As an option, the gesture 2800 may be implemented in the context of the architecture and environment of the previous Figures or any subsequent Figure(s). Of course, however, the gesture 2800 may be carried out in any desired environment. It should also be noted that the aforementioned definitions may apply during the present description.

In the context of the present description, a pattern-based gesture refers to a gesture defined, at least in part, by a path through a phase space of one or more dimensions. See, for example, the pattern-based gestures 2800.

In some embodiments, pattern-based gestures may be based upon paths through a phase space whose dimensions do not include any measure of location on an interaction surface. In other words, in these embodiments, pattern-based gestures may not depend upon the location or movement of user interaction across an interaction surface. In one embodiment, these gestures may act as gesture components, which may be combined with other gesture components to form generalized gestures which may or may not be based upon location on or movement across an interaction surface.

See, for example, the pattern-based gesture 2802, described by a phase space path which represents the time evolution of the touch state associated with a contact point located on a front interaction surface. The location of the contact point upon the interaction surface is of no importance.

Pattern-based gesture 2802 is based upon three touch state transitions. At time t1, the contact point changes from touch state s0 to s1. Similar changes of state occur at t2 and t3. In various embodiments, these touch state transitions may be represented by ordered 2-tuples. For example, the first transition may be represented as (s1, t1). The pattern-based gesture itself may be represented as an ordered sequence of state transitions. For example, pattern-based gesture 2802 may be represented as {(s1,t1), (s2,t2), (s0,t3)}.

In other embodiments, pattern-based gestures may be based upon paths through a phase space that may include one or more measures of physical location upon an interaction surface. In other words, there may exist paths through the phase space that describe motion across an interaction surface.

In various embodiments, a pattern-based gesture may be based upon paths through a phase space which does not include time as a dimension. For example, in one embodiment, a pattern-based gesture may be defined by a series of transitions between touch states, where it does not matter how long the individual touch states are maintained.

In other embodiments, a pattern-based gesture may depend upon time to the extent that the entire path through phase space may be completed within a predefined amount of time (though still independent of how much time is spent at each state along the path). In still other embodiments, the gesture may be defined, in part, by the time spent on each leg of the path through phase space.

In one embodiment, a time-independent pattern-based gesture may be combined with a dynamic touch gesture (i.e. a one finger swipe, etc.) to form a generalized gesture.

In various embodiments, a touch state may be associated with a specific contact point upon a pressure-sensitive interaction surface. In other embodiments, the device may not be able to resolve the specific source of pressure exerted upon an interaction surface; in such cases, the pressure may be represented by surface touch states. In the context of the present description, a surface touch state is a partitioning of the range of measurable pressures exerted upon a surface (similar to touch states associated with contact points, but not contact point specific).

In various embodiments, there may exist a subset of generalized gestures referred to as pattern-based generalized gestures. In the context of the present description, a pattern-based generalized gesture refers to a pattern-based gesture which includes input from multiple sources. For example, see pattern-based gesture 2806, which is represented by a path through a two-dimensional phase space.

As shown, gesture 2806 is a pattern-based generalized gesture based upon the evolution of a touch state on a front interaction surface and a back interaction surface of a device, in accordance with one embodiment. The pattern-based gesture components are 2802 and 2804.

As depicted, gesture 2806 is represented by a state transition matrix of touch states, with transitions between touch states marked by directional arrows, in accordance with one embodiment. In the context of the present description, a state transition matrix refers to an iconic depiction of a path through a phase space.

As shown, 2806 represents the phase space made up of all nine possible combinations of the three possible front and back touch states. In one embodiment, these nine combinations may be referred to as touch state points. In another embodiment, the representation may also be shown as three-dimensional, with time as the third dimension.

It should be noted that the use of descriptors such as "front" and "back" in this example are for the sake of simplicity. In various embodiments, gesture 2806 may be performed using any two surfaces on a device, even if the device does not have distinct front and back surfaces. Additionally, in other embodiments, pattern-based generalized gestures such as 2806 may include any number of additional dimensions, each describing a form of user input and/or time.

In various embodiments, a pattern-based generalized gesture may be represented as an ordered sequence of n-tuples. For example, in one embodiment, the gesture 2806 may be represented as a sequence of 2-tuples, (front touch state, back touch state). Specifically, gesture 2806 may be represented as {(s1,s0), (s2,s2), (s0,s1)}. In another embodiment, gesture 2806 may be represented as a sequence of 3-tuples, of the form (front touch state, back touch state, time).

While exemplary gesture 2806 is based on a path through a touch state phase space, pattern-based gestures may also be based upon types and sources of user input which are not broken into discrete states (i.e. contact pressure level, etc.). Additionally, in some embodiments, pattern-based gestures may be defined in terms of the relative states of input, rather than exact. For example, in one embodiment, a pattern-based gesture may be defined in terms of relative pressure. In other words, rather than require that a fixed pressure be achieved, a user may simply cause a particular change in pressure to occur. In one embodiment, such a pattern-based gesture may be defined in terms of gesture attributes, including derived input such as pressure velocity.

In various embodiments, the use of pattern-based gestures based upon relative states may be used to trigger some form of user assistance. These patterns are well suited to trigger some form of user assistance, as they may be performed and recognized in the middle of performing a different gesture. For example, in one embodiment, a pattern-based gesture defined as a rapid 20% decrease and increase of contact pressure of any contact, done three times, may present to the user an interface providing help specific to what the user was doing at the time. Possible contexts include, but are not limited to, providing a list of possible gestures when help is requested during performance of a gesture, application help or manual depending on what application is active, a detailed explanation of a user interface control which was being selected when help was requested, and/or any other scenario where a user is operating the device.

In some embodiments, pattern-based gestures may be recognized in the form of an ordered sequence of tuples using a decision tree. The use of a decision tree, or similar form of logic, has the advantage of being computationally inexpensive. This method may be more appropriate for pattern-based gestures which are represented by paths through an easily enumerated phase space. For example, this method of gesture recognition may be more appropriate for a gesture like 2806 than a similar gesture based upon contact pressure levels, rather than touch states.

In other embodiments, the pattern-based gestures may be recognized using pattern recognition or pattern matching. For example, in one embodiment, pattern-based gestures may be recognized using the methods, or similar methods, as those used to determine a gesture shape in a gesture component. In various embodiments, the pattern-matching algorithms and methods may search for a match within a predefined margin of error.

In one embodiment, pattern recognition or pattern matching to identify pattern-based gestures may be performed by the device. As an option, this functionality may be part of the operating system. In another embodiment, the pattern recognition or pattern matching may be performed using compute resources other than those of the device. Alternative compute resources include, but are not limited to, a similar device, computing resources on a local network, cloud computing resources, and/or any other computing resource. In yet another embodiment, the pattern recognition or pattern matching may be performed using device and/or alternative computing resources combined with help from the user.

In one embodiment, pattern recognition algorithms and methods may search for a match between input and pre-defined patterns, within a certain probability. In another embodiment, the pattern recognition algorithms may be probabilistic and use statistical inference to find the best pattern match for a given set of input.

In one embodiment, probabilistic pattern recognition algorithms may output a probability that the input being described by a given pattern. In one embodiment, this probability may be reported to the user, either specifically (i.e. displayed as a number or percentage, etc.) or in summary (i.e. a label, a color coded border, an icon, etc.). In another embodiment, this probability may be used to alter or modify a selection. In yet another embodiment, this probability may be used to alter or modify one or more display properties.

In various embodiments, probabilistic pattern recognition algorithms may also determine the n best matches for the given input. In one embodiment, a user may specify the value of n. In another embodiment, these best matches may be reported to the user as a list of gesture names and/or iconic representations of the gestures. As an option, the associated probabilities may be reported as well.

In another embodiment, this list of probable gestures may be displayed to the user in response to a user input, such as a gesture associated with user assistance. In yet another embodiment, this list of probable gestures may be displayed to the user if the recognition algorithms were not able to recognize a gesture with a probability above a predefined threshold. The user may be able to select the intended gesture from the list; upon selection, the associated operation may be performed. As an option, one or more aspects of the list items may depend upon the associated probability of recognition. Possible aspects may include, but are not limited to, text size, button size, color, and/or any other aspect or property that may be associated with the list.

As a specific example, in one embodiment, the user may be typing on a soft keyboard and performs a gesture. The device then determines with probability 80% the gesture corresponds to pressing the letter W, with probability 15% the gesture corresponds to pressing Q, and with probability 5% that the user intended to press E. In this situation, the device may enlarge the W key by a large amount, enlarge the W key by a smaller amount, and enlarge the Q key by a still smaller amount.

In addition to gesture recognition, various embodiments may also perform user intent prediction. In the context of the present description, gesture prediction refers to a process of estimating user intent by assigning probabilities to candidate gestures based upon historical and real time use data. For example, in one embodiment, In various embodiments, the process of gesture recognition may include the computation of the probability of user intent. In the context of the present description, computation of the probability of user intent refers to the process of assigning probabilities to potential user actions, inputs, and intentions, based upon historical and current use data. Examples of historical data include, but are not limited to, often misspelled words, actions consistently followed by a correction, utilization of particular gestures in different use scenarios, and/or any other data which may establish a use pattern.

The estimation of user intent may enhance the user experience by making the device more responsive to user input. In various embodiments, computation of the probability of user intent may facilitate the entry of text though an interaction surface. For example, in one embodiment, frequently made spelling mistakes may be automatically corrected. In another embodiment, the user may be prompted with the word determined to be most likely to be what the user is intending to type.

As an option, the user may be able to accept or decline proposed word completions or proposed spelling corrections through a pressure-based gesture. For example, in one embodiment, a user may accept or decline a proposed completion or correction with a series of taps on a backtouch interface (i.e. one tap for accept, two taps for decline), in addition to keyboard based methods. In another embodiment, a user may be presented with a plurality of possible words to be used for auto completion. As an option, these words may be ordered depending upon a probability based upon historical usage. The words may be presented to the user in a line, with one word highlighted as a selection. In another embodiment, a user may cycle through proposed words with a backtouch gesture, such as a single finger swipe in the direction the words should be cycled in. Of course, these actions may be associated with any other type of gesture, including pattern-based gestures.

In various embodiments, gesture recognition may be enhanced by computation of the probability of user intent. For example, in one embodiment, probabilities may be assigned to potential gestures based upon historical gesture usage with similar context (i.e. application, selection mode, etc.). In another embodiment, estimated user intent may give weight to certain gestures during the recognition process. In this way, the gesture recognition process may be performed more efficiently, by considering the most likely gestures early in the process.

In various embodiments, the computation of the probability of user intent may affect the user interface. In various embodiments, the user interface may adapt in response to the user's intended form of interaction. For example, in one embodiment, upon determining that the probability that the user is performing a virtual control knob gesture has exceeded a predefined probability, and certain context requirements have been satisfied, a virtual control knob may appear for the user to interact with. In this way, the user is given visual feedback that their input is being received in the manner they intended. Examples of context requirements may include, but are not limited to, the user performing the gesture in the vicinity of a user interface object which may be controlled via a virtual control knob (i.e. slider, date, time, etc.), the virtual control knob gesture has not been reassigned to a different function by the active application, and/or any other requirement to ensure that a virtual control knob only appears when the user so intends.

Pattern-based gestures may be simple to perform and easy for a user to remember. For this reason, they are well suited to a number of applications. One of the most basic pattern-based gestures is the finger press. In various embodiments, a pattern-based gesture made up of one or more fluctuations of contact pressure between a low level and a higher level at a single contact point may be associated with often used operations. For example, in one embodiment, a double press (i.e. increase then decrease contact pressure twice) may activate an interface to switch between active applications in a multitasking environment. In another embodiment, a triple press may activate a pop-up menu populated with iconic representations of the user's preferred actions, contacts, applications, and scripts. In one embodiment, these gestures may be surface agnostic. For example, the application switching interface may be activated no matter which interaction surface received the double press. In another embodiment, these gestures may be surface specific, allowing other system processes and applications to assign operations to these simple gestures without colliding with a system-wide gesture. For example, a triple press on a side surface may activate a pop-up favorites menu, while a triple press on a back surface may activate an application-specific contextual menu.

Another simple pattern-based gesture is the pinch gesture. In various embodiments, this gesture is performed by making simultaneous contact with two different interaction surfaces such a line connecting the two contact points is roughly parallel to the force vectors being applied at said points. An example is pinching a device between a finger and a thumb, the finger and thumb contacting different interaction surfaces. In another embodiment, this gesture may be pressure based. Variations on this gesture may incorporate multiple pinches (i.e. fluctuations of contact pressure between a low level and a higher level, similar to the finger presses previously described).

These simple gestures may be associated with often used operations, including but not limited to, activating device interfaces (i.e. backtouch interface, proximity sensitivity, pressure sensitivity, etc.), displaying a common system interface (i.e. application launcher, system settings, etc.), displaying a menu of user defined "favorites" (i.e. applications, contacts, songs, movies, web bookmarks, recently used documents, etc.), mute volume, and/or any other often used interface or operation. Of course, in other embodiments, these gestures may be associated with any operation, function, or interface.

Building off the previous gesture, a pinch slide gesture is an example of a pattern-based generalized gesture which combines a pinch with a sliding motion. In some embodiments, it may be described as a 1-6 gesture, though it is not limited to just front/back interaction. In various embodiments, this gesture may be performed by pinching the device, then sliding the pinch across the interaction surfaces while maintaining contact. In one embodiment, a contact pressure above a predefined threshold may also be required. This gesture mimics the tactile experience of pushing or pulling an object such as a lever or cord.

In one embodiment, a pinch slide gesture may be used to quickly move through an alphabetical list, similar to using tabs to quickly find a contact quickly in a paper address book. In another embodiment, this operation may be adopted to moving quickly through other sorted lists of items, including but not limited to song lists, application lists, eBooks, and/or any other collection of organized data. As an option, the display may invite the use of this gesture by displaying virtual tabs (i.e. the alphabet, numbers, etc.) along a side of the display where the gesture would be performed.

In another embodiment, a pinch slide gesture may be used to quickly select text. For example, in one embodiment, a selection may be initiated by pinching at the desired location. The selection may be expanded by sliding the pinch to the desired selection end. In another embodiment, this method of selection may be adapted to selecting a portion of an image or graphic (i.e. pinch at one corner of desired selection bounding box and sliding to opposite corner, etc.).

In another embodiment, a pinch slide may be used to move quickly through a large document (i.e. word processing document, web page, image, etc.). For example, in one embodiment, the user may slide a pinch up and down the device, changing the displayed portion of the document relative to the position of the pinch (i.e. the top of the device represents the start of the document, the bottom of the device represents the end, and the relative location of the pinch becomes the portion of the document displayed. In another embodiment, the pinch slide may have to be initiated at a particular location to activate this document navigation functionality. For example, a web browser may have an icon near the top of the display that activates pinch slide navigation when the gesture is initiated on the icon. This functionality may be adapted to two dimensional navigation in a large image, displaying the portion of the image represented by the relative location of the pinch.

In yet another embodiment, a pinch slide gesture may be used to display menus of common operations or applications. For example, in one embodiment, a pinch slide gesture which begins near an edge of a display and then moves inward may cause a menu or window to slide in from that edge of the display. As an option, the menu or window may remain visible until a selection is made. In another embodiment, there may be different menus or windows associated with each edge of a display. In still another embodiment, a window may be closed (i.e. slid back out of view) by using a pinch slide to pull it out a bit farther, then releasing it, similar to rolling up a window shade.

The pinch slide gesture is well adapted for providing input where one of a plurality of values may be chosen; it is also easily combined with a pinch gesture. For example, in one embodiment, a user may activate a system and/or ringer volume slider with a double press pinch gesture, and then select a volume by sliding the pinch up and down the device. In another embodiment, a similar operation may be performed for backlight brightness. In yet another embodiment, a user may cycle between system volume, ringer volume, and system brightness sliders with a pinch gesture, and be able to interact with said sliders using a pinch slide. In still another embodiment, the selection of system/ringer volume or brightness may be determined by where on the device the pinch slide is being performed (i.e. left, middle, right, etc.).

A subset of pinch gestures are the side pinch gestures. In various embodiments, the side pinch gesture is performed by applying contact pressure beyond a threshold value to opposite sides of the device, the sides being those other than the front and back. As an option, the user may choose the predefined threshold value. In one embodiment, the pressure may be applied at contact points located on the sides such that a line connecting the contact points is roughly normal to the sides. In another embodiment, the side pinch gesture may also incorporate "presses" similar to the pinch and finger press gestures.

The side pinch gesture is a simple gesture well adapted for use with often used operations. For example, in one embodiment, a side pinch gesture may toggle the device mute, or activate an application launcher.

A variation on the side pinch gesture is the squeeze gesture. In various embodiments, a squeeze gesture is performed by applying contact pressure beyond a predefined threshold to one or more contact points located on opposite sides of the device. For example, in one embodiment, the gesture may be performed by holding the device in one hand, in a natural grip, and applying pressure to two opposite sides by squeezing. As an option, the squeeze gesture may incorporate "presses", similar to the finger press and pinch gestures.

The squeeze gesture is one of the easiest gestures to perform, and may be reserved for operations which are to be available system wide, independent of what application is running. In various embodiments, the squeeze gesture may be associated with commonly used operations. For example, in one embodiment, a double press squeeze gesture may be used to answer a phone call. In another embodiment, a double press squeeze gesture may be used to indicate an affirmative response to any on screen query (i.e. accept proposed auto correction, accept proposed auto completion, activate "ok" button in dialog boxes, etc.). As an option, a complementary negative response gesture may be defined as well, a gesture such as the combination of a single or double tap on the top side while squeezing the left and right sides.

In another embodiment, applying a squeeze gesture for a predefined amount of time may be associated with a delete operation, to be performed upon any selected or active object. As an option, the delete operation may be accompanied by a "crumpling paper" animation routine, as well as a prompt for user confirmation. In one embodiment, a user may not use a squeeze gesture to confirm an operation triggered by a squeeze operation (i.e. to prevent accidental implementation, etc.).

Another class of pattern-based gestures are the "no contact" pressure-based gestures. In some embodiments, the touch sensitive interaction surfaces require an implement of interaction which has a certain degree of conductivity in order to register contact. This class of gestures may be implemented in such devices, which are also pressure-sensitive. In various embodiments, the "no contact" pressure-based gestures may be used to interact with the device in situations where direct contact is not possible (i.e. device is in case, device is in pocket, device is in purse, etc.).

In various embodiments, the "no contact" pressure-based gestures may include variations of the finger press, pinch, and squeeze gestures, in addition to others. In some embodiments, "no contact" pressure-based gestures may require that the pressures being exerted do not create a contact point (i.e. pressure is exerted, but touch contact is not registered). These gestures are well adapted to situations where contact is not feasible. For example, in one embodiment, a user may silence a ringing phone by performing a rapid, one-finger double press on an interaction surface while the device is in the user's pocket, purse, or any other flexible or semi-flexible vessel. In another embodiment, a user may perform a predefined pattern-based gesture to cause the most recently received communication (i.e. voice mail, email, SMS message, etc.) to be reported to the user through a Bluetooth audio device.

In various embodiments, gestures may be used to trigger a variety of activities. For example, FIG. 29 shows a file sharing operation which was triggered, in part, by a gesture. FIG. 30 shows the authentication of two devices through a touch interaction. FIG. 31 shows another example of two devices working together. It depicts facial recognition being performed by two devices at the same time. Additionally, FIG. 32 shows the displays of two devices combined to function as a single display. Any of the embodiments discussed in the present description may be implemented in any of these environments.

FIG. 33 shows a user interface 3300 for defining custom gestures, in accordance with one embodiment. As an option, the user interface 3300 may be implemented in the context of the architecture and environment of the previous Figures or any subsequent Figure(s). Of course, however, the user interface 3300 may be implemented in any desired environment. The aforementioned definitions may apply during the present description.

In various embodiments, gestures may be programmed by the user. In other embodiments, gestures may be learned by the device.

As shown, the user interface 3300 may be utilized to define a custom gesture. For example, in one embodiment, the user interface may include a gesture name and/or an iconic representation of the gesture. In another embodiment, the iconic representation may be automatically chosen by the system, depending upon defined gesture parameters. In yet another embodiment, the user interface may contain a plurality of buttons 3302 which allow a user to save, load, copy, and/or delete custom gestures. The user interface may also contain a list 3304 of all defined custom gestures. As an option, the custom gestures may be grouped by context within the list.

In various embodiments, the user interface 3300 may contain a button 3306 to allow the user to define a custom gesture. In one embodiment, selecting button 3306 may initiate a gesture recording session. In the context of the present description, a gesture recording session refers to a period of time wherein the device monitors and records all observable user and system input. In another embodiment, selecting button 3306 may present to the user an interface with instructions before initiating a gesture recording session. Instructions may include, but are not limited to, how to record the gesture, a list of all forms of input upon which a gesture may depend, how to end the recording, and/or any other information which may assist the user. In yet another embodiment, the user may be presented with a short countdown before the gesture recording session is initiated, to give the user time to prepare for the recording. As an option, the device may give some form of visual or auditory feedback to the user to indicate that the recording session has begun.

In various embodiments, a gesture recording session may be terminated by user input. For example, in one embodiment, a gesture recording session may be terminated by the user through a vocal command, recognized by the system. In another embodiment, a gesture recording session may be terminated by the user through an sound which exceeds a predefined volume. In yet another embodiment, a gesture recording session may be terminated by the user by performing a gesture. As an option, the termination gesture may be a reserved gesture.

In the context of the present description, a reserved gesture refers to a gesture which may not be reassigned by a user, application, or process. For example, in one embodiment, there may be a set of gestures, chosen for their simplicity, which are reserved for operations fundamental to the user experience (i.e. a gesture to cycle through active applications running in a multitasking environment, etc.).

In still another embodiment, a gesture recording session may be terminated automatically after a predefined amount of time has elapsed. As an option, in one embodiment the user may specify the amount of time before the recording session begins.

In one embodiment, after the termination of a gesture recording session, the user may be prompted to repeat the gesture one or more times. As an option, the user may not have to indicate when the gesture is complete after the first recording session. In another embodiment, the repeated performance of the gesture may be used to better define the gesture parameters. For example, in one embodiment, gesture aspects which do not appear in every performance of the gesture may be indicated to the user as potentially irrelevant. In another embodiment, the system may use each iteration to improve the recorded description of the gesture. For example, the system may calculate the probability of correct recognition, using methods previously discussed, after each performance. As an option, the user may be prompted to repeat the gesture until the calculated probability of correct recognition has exceeded a predefined threshold.

In various embodiments, the user interface 3300 may include a button 3308 to allow a user to view a depiction of the performance of the custom gesture as currently defined. For example, in one embodiment, selecting button 3308 may display an animated recreation of the gesture in the context of a wireframe model of the device. In another embodiment, different forms of user input may be represented by different colors (i.e. pressure is red, touch is blue, proximity is green, etc.). As an option, changes in contact pressure level may be represented by changes in the color representing pressure. In another embodiment, the device surfaces may be displayed flattened into a two dimensional plane. In still another embodiment, the gesture replay may also include one or more plots which depict the time evolution of various gesture inputs, such as contact pressure or proximity associated with individual contacts or implements of interaction.

In various embodiments, the user interface 3300 may include a list 3310 displaying all components of the currently defined gesture. For example, in one embodiment, list 3310 may be a nested hierarchical list, grouped by "expected implement of interaction" and input type (i.e. contact 1, contact 2, proximity 1, etc.). In another embodiment, list 3310 may visually indicate (i.e. italicized, colored, underlined, etc.) recorded gesture aspects which were determined to be potentially irrelevant to the gesture. In yet another embodiment, list 3310 may break down the input from each "expected implement of interaction" into basic input categories. Categories may include, but are not limited to, pressure, touch, surface identity, proximity, proximity location, and/or any other aspect or type of user input.

The user interface 3300 may be utilized to specifically define or modify aspects of a custom gesture. For example, in one embodiment, the user interface 3300 may include a button 3312 to edit a gesture aspect selected in list 3310. In another embodiment, selecting button 3312 may present an interface to the user which may allow them to review and alter associated gesture aspects. This method of defining the gesture may not be as intuitive as teaching the system the gesture through repeated performance, but it does allow much greater control over the gesture aspects.

In one embodiment, the user interface 3300 may include a plurality of buttons 3314 which allow a user to copy, create, and delete gesture aspects associated with the current gesture. In another embodiment, the creation of a new gesture aspect may prompt the user to specify the input type to create, and with which "expected implement of interaction" it should be associated. As an option, a user may create a new "expected implement of interaction".

In one embodiment, the user interface 3300 may include a collection of check boxes 3316 which allow a user to specify the context in which the custom gesture may be performed. The contexts may include, but are not limited to, universal (i.e. available at all times), text (i.e. active text field, on-screen keyboard visible, etc.), application-specific, home (i.e. application chooser, etc.), selection (i.e. an active selection of an object exists), and/or any other type of context.

When defining a custom gesture, the associated action may be established. As shown, user interface 3300 may be utilized to specify and configure the action to be associated with the present gesture. For example, in one embodiment, the user interface may include a collection of checkboxes 3318 representing different actions which may be associated with the custom gesture.

In one embodiment, the collection of actions 3318 may include a checkbox 3320 to indicate that the gesture may trigger the insertion of a text snippet, as defined in a nearby text field. In another embodiment, the user interface may include a collection of buttons 3322 which may be used to format the text snippet. As an option, the text snippet may be defined as plain text, without formatting.

In another embodiment, the collection of actions 3318 may include a checkbox 3324 to indicate that the gesture may cause an application to launch. The user interface 3300 may also include a button which allows the user to specify which application should be launched when the gesture is performed.

In another embodiment, the collection of actions 3318 may include a checkbox 3326 to indicate that the gesture may set the system volume to a specified level. As an option, the user may be able to specify whether the gesture sets the system volume or a ringer volume. The user interface 3300 may also include a slider which allows the user to specify the volume to be associated with the present gesture.

In another embodiment, the collection of actions 3318 may include a checkbox 3328 to indicate that the gesture may trigger the creation of a new email message. In yet another embodiment, the user interface 3300 may include a checkbox 3330 to indicate, if the gesture is performed while an object is selected, whether the selected object should be inserted into the new email message. Possible objects may include, but are not limited to, images, text, video, files, and/or any other selectable media, file, or other kind of object. In still another embodiment, the user interface 3300 may also include a checkbox 3332 to indicate that the new email message should be addressed to a particular contact. As an option, the user may be able to choose the email address from a list of the user's contacts.

In another embodiment, the collection of actions 3318 may include a checkbox 3334 to indicate that the gesture may trigger the creation of a new SMS message. In yet another embodiment, the user interface 3300 may include checkboxes 3336 and 3338 to indicate the inclusion of a selected object and/or specific destination for the message, similar to the "new email message" action previously described. As an option, if a specific recipient is not specified, the new SMS message may be directed to the most recent SMS message sender.

In another embodiment, the collection of actions 3318 may include a checkbox 3340 to indicate that the gesture may take advantage of functionality provided by third party applications. In various embodiments, developers of third party applications may be able to provide functionality hooks that may be implemented by other applications or the operating system. For example, in one embodiment, a social networking application may allow the user to associate the custom gesture with the creation of a new posting within the social network.

In other embodiments, possible actions which may be associated with a user defined gesture may include, but are not limited to, a favorite contact (i.e. gesture displays a pop-up interface with buttons representing different methods of communicating with the contact, including but not limited to telephone, email, SMS, social networks, etc.), a predefine energy saving profile, a predefined set of application preferences, and/or any often repeated activity.

The user interface 3300 may be utilized to determine whether the custom gesture may conflict with already established gestures. For example, in various embodiments, the user interface may include a list 3342 of conflicting gestures. In one embodiment, the list of conflicts may be made up of other custom gestures, as well as system defined gestures. In another embodiment, the list may also include application specific gestures.

In yet another embodiment, items in the conflict list may be formatted to indicate their severity. For example, conflicting reserved gestures may be highlighted in red, while conflicting gestures which only exist in a single application may be slightly greyed out. In various embodiments, the conflict list may be created using pattern recognition methods previously discussed, or other methods and algorithms capable of matching patterns and/or data.

The user interface 3300 may be utilized to test a custom gesture, in accordance with one embodiment. For example, in various embodiments, the user interface may include a button 3344 which presents the user with an interface which allows them to test the custom gesture as it is currently defined. In one embodiment, the gesture testing interface may provide the user with a plurality of forms of feedback. Feedback may include, but is not limited to, current contact pressure level associated with each contact point, current touch state associated with each contact point, probability of correct gesture recognition, current gesture time, a visual representation of previous contact points, and/or any other form of user feedback.

In one embodiment, user interface 3300 may include statistics collected as a result of the gesture testing process. These statistics may include, but are not limited to, number of tests run with the current gesture configuration, average probability of correct gesture recognition, best probability of correct gesture recognition, identity of next most likely identified gesture (i.e. next closest gesture), minimum gesture performance time, maximum gesture performance time, average gesture performance time, and/or any other statistic related to the testing process.

In some embodiments, user defined gestures may be recognized in any context they were intended for. In other embodiments, a user may have to perform a predefined activation gesture before using a custom gesture.

As a specific example of how custom gestures may be utilized, in one embodiment, a user may define a gesture which is comprised of a triple finger press on a top side, followed by a singer finger swipe across a back interaction surface. The user may associate this gesture with a favorite contact. Upon performing this gesture, the user may be presented with a window showing a picture of the contact in addition to buttons linked to their telephone number and email address. In this way, communication may be established with this contact, at any time, with nothing more than a gesture and a button press.

FIG. 34 shows a user interface 3400 for defining pressure inputs for a custom gesture, in accordance with one embodiment. As an option, the user interface 3400 may be implemented in the context of the architecture and environment of the previous Figures or any subsequent Figure(s). Of course, however, the user interface 3400 may be implemented in any desired environment. The aforementioned definitions may apply during the present description.

As shown, the user interface 3400 may be utilized to configure aspects of a pressure-based gesture component. In one embodiment, user interface 3400 may be displayed in response to a user selecting a pressure item in list 3310 and selecting the edit button 3312, or in response to creating a new pressure element, within user interface 3300.

The user interface 3400 may be utilized to define the gesture component in terms of contact pressure levels. For example, in one embodiment, the user interface 3400 may include a collection of check boxes 3402 which allow a user to require upper and lower contact pressure level thresholds. In another embodiment, each check box may be associated with a button 3404 which allows a user to specify a contact pressure level by exerting the desired pressure. In still another embodiment, the contact pressure levels may be entered numerically.

In one embodiment, the user interface 3400 may include a collection of check boxes 3406 that allow a user to require threshold pressure velocity and/or pressure acceleration thresholds. In another embodiment, each check box may be associated with a button 3408 which allows a user to specify a contact pressure velocity or acceleration by example. In still another embodiment, the contact pressure velocity and/or acceleration may be entered numerically.

In various embodiments, a user may define a contact pressure level, velocity, and/or acceleration by example through a user interface. For example, in one embodiment, the user may be presented with an interface which provides continuous feedback regarding the contact pressure being exerted. In another embodiment, the user may be able to indicate that the previously exerted contact pressure level, velocity, and/or acceleration is satisfactory and should be used. In yet another embodiment, the user may be prompted to repeat the pressure exertion one or more times, and the resulting average results are used. In various embodiments, this interface may be shown to the user in response to selecting buttons 3404 or 3408.

The user interface 3400 may be utilized to define the gesture component in terms of touch states. For example, in one embodiment, the user interface 3400 may include a check box 3410 which allows a user to require a target touch state. In another embodiment, this check box may be associated with a button 3412 which allows a user to specify a touch state by example. As an option, this may be done using an interface similar to that used to define contact pressure levels, velocities, and/or accelerations. In still another embodiment, the touch state may be entered directly.

The user interface 3400 may be utilized to define the gesture component in terms of a pattern-based pressure gesture. For example, in one embodiment, the user interface 3400 may include a check box 3414 which allows a user to require the performance of a pattern-based pressure gesture. In another embodiment, this check box may be associated with a button 3416 which allows a user to specify a pattern-based pressure gesture by example. In one embodiment, this may be done using an interface similar to that used to define contact pressure levels, velocities, and/or accelerations. As an option, this interface may plot the touch states that make up the pattern as it is being defined.

In one embodiment, the user interface 3400 may include a plot 3418 which displays the currently specified pattern-based pressure gesture, plotting touch states versus time. In another embodiment, the touch state transitions 3420 displayed on plot 3418 may be able to be modified. In still another embodiment, user interface 3400 may include buttons which may be used to create and delete touch state transition markers on plot 3418.

In another embodiment, the user interface may include a checkbox 3422 which allows a user to specify whether the pattern-based pressure gesture shown in plot 3418 is time dependent or not. As an option, selection of checkbox 3422 may cause the time axis of plot 3418 to display the actual times associated with each touch state transition.

In one embodiment, the user interface 3400 may include a button 3424 which allows a user to test the pressure-based component gesture as it is presently defined. In another embodiment, selecting button 3424 may display a testing interface to the user. In various embodiments, the testing interface may provide the user with different forms of feedback. Feedback may include, but is not limited to, current contact pressure level and/or touch state, gesture time, probability of correct recognition, and/or any other form of feedback related to performance of a gesture.

FIG. 35 shows a user interface 3500 for defining touch inputs for a custom gesture, in accordance with one embodiment. As an option, the user interface 3500 may be implemented in the context of the architecture and environment of the previous Figures or any subsequent Figure(s). Of course, however, the user interface 3500 may be implemented in any desired environment. The aforementioned definitions may apply during the present description.

As shown, the user interface 3500 may be utilized to configure aspects of a touch-based gesture component. In one embodiment, user interface 3500 may be displayed in response to a user selecting a touch item in list 3310 and selecting the edit button 3312, or in response to creating a new touch element, within user interface 3300.

The user interface 3500 may be utilized to define the gesture component in terms of a path of contact points. For example, in one embodiment, user interface 3500 may include a button 3502 which allows a user to define a gesture touch path by performing the gesture. In another embodiment, user interface 3500 may also include a window 3504 where the user may draw a new gesture shape, or manipulate one already defined.

In one embodiment, user interface 3500 may also include a button 3506 which allows the user to test the defined touch gesture by performing it. As an option, the user may be provided with feedback regarding the performance, feedback which may include, but is not limited to, probability of recognition.

FIG. 36 shows a user interface 3600 for defining surface inputs for a custom gesture, in accordance with one embodiment. As an option, the user interface 3600 may be implemented in the context of the architecture and environment of the previous Figures or any subsequent Figure(s). Of course, however, the user interface 3600 may be implemented in any desired environment. The aforementioned definitions may apply during the present description.

As shown, the user interface 3600 may be utilized to select an interaction surface for a gesture component. In one embodiment, user interface 3600 may be displayed in response to a user selecting a surface item in list 3310 and selecting the edit button 3312, or in response to creating a new surface element, within user interface 3300.

The user interface 3600 may be utilized to define the gesture component in terms of a device surface. For example, in one embodiment, user interface 3600 may include a button 3602 which allows a user to specify a surface by giving it three sharp taps with a single finger (or some other gesture). In another embodiment, the user interface may also include a three dimensional representation of the device in a window 3604, upon which a user may indicate a surface.

FIG. 37 shows a user interface 3700 for summarizing contact inputs for a custom gesture, in accordance with one embodiment. As an option, the user interface 3700 may be implemented in the context of the architecture and environment of the previous Figures or any subsequent Figure(s). Of course, however, the user interface 3700 may be implemented in any desired environment. The aforementioned definitions may apply during the present description.

As shown, the user interface 3700 may be utilized to configure summary aspects of a contact-based gesture component. In one embodiment, user interface 3700 may be displayed in response to a user selecting a contact summary item in list 3310 and selecting the edit button 3312, or in response to creating a new contact summary, within user interface 3300.

The user interface 3700 may be utilized to define how the contact related aspects of a gesture component may combine with each other. For example, in one embodiment, user interface 3700 may include a window 3702 which contains a depiction of the touch path 3704 defined in user interface 3500. In another embodiment, touch path 3704 may include pressure points 3706 which represent pressure states at different time intervals. As an option, a user may drag the pressure points to different locations on the touch path, indicating the pressure level which may be achieved at those points of the touch path.

In various other embodiments, there are user interfaces for defining proximity based gesture components, which are similar in many respects to the interfaces used to define the role of contact pressure and touch FIG. 38 shows a user interface 3800 for defining system inputs for a custom gesture, in accordance with one embodiment. As an option, the user interface 3800 may be implemented in the context of the architecture and environment of the previous Figures or any subsequent Figure(s). Of course, however, the user interface 3800 may be implemented in any desired environment. The aforementioned definitions may apply during the present description.

As shown, the user interface 3800 may be utilized to configure system aspects of a generalized gesture. In one embodiment, user interface 3800 may be displayed in response to a user selecting a system item in list 3310 and selecting the edit button 3312, or in response to creating a new system element, within user interface 3300.

The user interface 3800 may be utilized to define the gesture component in terms of system related variables or inputs. For example, in one embodiment, user interface 3800 may include a plurality of checkboxes 3802 associated with various system inputs including, but not limited to, device orientation, device charging status, presence of headphones, and/or any other system related input or variable. In another embodiment, the user interface 3800 may also include a button 3804 which allows the user to define a target orientation by placing the device in the desired orientation until given an indication (i.e. sound, flash, etc.) that the orientation has been captured.

FIG. 39 shows a pressure-sensitive user interface 3900 which contains a virtual trackball, in accordance with one embodiment. As an option, the user interface 3900 may be implemented in the context of the architecture and environment of the previous Figures or any subsequent Figure(s). Of course, however, the user interface 3900 may be implemented in any desired environment. The aforementioned definitions may apply during the present description.

As shown, the user interface 3900 includes a virtual trackball 3902, which is receptive to user input, in accordance with one embodiment. In various embodiments, user interface 3900 may simulate one or more properties, attributes, or behaviors associated with the operation of a real, three-dimensional trackball user input device.

For example, in one embodiment, virtual trackball 3902 may simulate the operation of a real trackball by simulating the relationship between applied force and trackball rotation observed in a real trackball.

In different embodiments, various techniques may be employed to exploit the relationship between applied force and ball rotation exhibited in the operation of a real trackball. The force that causes a real 3D trackball to spin is the component of force applied which is in a direction tangential to the trackball surface. A user typically initially touches a real trackball in the center of the exposed trackball surface. The user then rotates the trackball by moving a finger horizontally at the desired angle of movement. As the finger moves further away from the initial point of contact with the trackball, the less the trackball may rotate with a given horizontal force FT applied by the finger. This behavior is a result of the gradual reduction of the component of force that moves the trackball as the finger moves a distance D from the center of the trackball. If the trackball radius is RT, and the force applied by the finger in a horizontal direction FT, analysis may show that the force that moves the trackball is FT when D=0 and 0 when D=RT. Thus, to the user, the rotation of the trackball is reduced (i.e. the force of a finger becomes less effective) as the distance from the center of the trackball increases. To this end, the operation of a real trackball may be simulated in a 2D environment by recreating the relationship between rotation efficacy and distance from the center of the trackball.

In various embodiments, this effect may be simulated on a 2D screen by applying an input function IF to the inputs. In the context of the present description, an input function refers to a function which modifies one or more properties of one or more input signals.

In one embodiment, the device may display a virtual trackball on a 2D screen at location (X1, Y1). The force FT that the user wishes to apply may be calculated as a function of contact pressure P(t) and/or gesture velocity. The force may thus be calculated by the device as FT(P(t), X(t), Y(t), etc.). Thus, the function FT may be a first input function IF1=FT. In order to simulate the behavior of a spherical trackball, a second input function IF2 may be applied. For example, in one embodiment, IF2 may equal (1−D/RT) for D<RT, and equal 0 otherwise. In various other embodiments, other real objects may be simulated in a 2D environment through the use of one or more input functions.

FIG. 40 shows a device 4000 with slide pads, in accordance with one embodiment. As an option, the device 4000 may be implemented in the context of the architecture and environment of the previous Figures or any subsequent Figure(s). Of course, however, the device 4000 may be carried out in any desired environment. The aforementioned definitions may apply during the present description.

In the context of the present description, a slide pad refers to a type of interaction surface which does not cover the majority of a device face, and which is at least touch-sensitive. In one embodiment, a slide pad may be non-rectangular. In another embodiment, a slide pad may have more than one texture, to provide tactile feedback to a user. In various embodiments, a device may have more than one slide pad on a face.

As shown, device 4000 includes two slide pads 4002 on the back face 4004. In other embodiments, one or more slide pads may be located on one or more device faces, including but not limited to side faces, flip-out portions of a device, slider portions, and/or any device face or facet.

In various embodiments, one or more slide pads may be used in conjunction with one or more displays that are not also interaction surfaces. In one embodiment, the use of slide pads in conjunction with non-interactive displays may provide a number of advantages. These advantages may include, but are not limited to, reduced expense, increased durability, and/or simplification of maintenance. In another embodiment, the user of slide pads may facilitate the incorporation of a non-planar or non-rigid display (i.e. flexible display, etc.). In yet another embodiment, slide pads may be replaced and/or upgraded to provide greater sensitivity to more forms of user input.

In various embodiments, the use of slide pads may provide an improved user experience. For example, in one embodiment, the size and modularity of a slide pad may make it possible to incorporate an apparatus to provide tactile feedback (i.e. vibration, etc.) to just that slide pad. In this way, a user may receive tactile feedback specific to a single hand, rather than vibrating an entire surface, for example.

In various embodiments, one or more slide pads may be used as interaction surfaces for the performance of any type or variation of gestures previously or subsequently described. In some embodiments, slide pads may have a geometry which favors one particular type of touch gesture or contact (i.e. a narrow strip may favor sliding, a ring may favor circular gestures, etc.). In one embodiment, slide pads may be of any shape, contour (i.e. planar, rounded, convex, concave, etc.), and/or size.

In some embodiments, slide pads may not be limited to being touch-sensitive. For example, in one embodiment, a slide pad may also be sensitive to contact pressure and/or proximity. In some embodiments, a device may utilize multiple slide pads having a variety of sensitivities.

FIG. 41 shows an exemplary slide pad gesture 4100 for performing an auxiliary function, in accordance with one embodiment. As an option, the gesture 4100 may be implemented in the context of the architecture and environment of the previous Figures or any subsequent Figure(s). Of course, however, the gesture 4100 may be carried out in any desired environment. It should also be noted that the aforementioned definitions may apply during the present description.

In the context of the present description, a slide pad gesture is a gesture adapted to the limitations of a slide pad, including but not limited to, limited geometry, limited size, limited sensitivity, and/or any other limitation which may be inherent in a slide pad.

In the context of the present description, an auxiliary function refers to a frequently used operation, command, or action. In one embodiment, any operation or command may be deemed an auxiliary function. In various embodiments, making auxiliary functions available through gestures may enhance the user experience by allowing the user to intuitively accomplish common tasks.

Making a distinction between slide pad gestures and other gestures, as well as incorporating slide pads in addition to other interaction surfaces, allows a device to provide a more intuitive user experience by increasing the number of distinct though simple gestures. For example, see FIG. 41.

As shown, slide pad gesture 4100 is a dynamic gesture based upon a single point of contact 4102 with a slide pad 4104 located on the back of a device, next to a larger interaction surface 4106. In various embodiments, this gesture may be associated with an auxiliary function which mimics the functionality of a shift and/or caps lock button on a keyboard. For example, in one embodiment, an upward slide may be the equivalent of holding down a shift key. As an option, this operation may cause a soft keyboard 4108 displayed on the front of the device to be populated with upper case letters and symbols. In another embodiment, a downward slide may be the equivalent of toggling a caps lock key. Assigning these auxiliary functions to these slide pad gestures allows a user, within the same interface, to swipe up on a backtouch interface to scroll through a document, and then swipe up on a slide pad to capitalize a soft keyboard also present on the display.

In one embodiment, a user may program the behavior of a slide pad. For example, in one embodiment, a user may specify that an upward gesture corresponds to entry of uppercase letters and a down gesture resumes input of lowercase letters. In another embodiment, a user may specify that two upward gestures in succession may correspond to a numeric or symbol entry mode, and two downward gestures in succession may correspond to a normal text entry mode.

In one embodiment, the auxiliary function associated with a slide bad gesture may depend on one or more contextual aspects, including but not limited to application environment, system flags, selection mode, and/or any other contextual data.

In one embodiment, a user may define custom slide pad gestures, through a user interface similar to that shown in FIG. 33. As an option, a user may associate a custom slide pad gesture with any auxiliary function, or any other device or system operation.

In various embodiments, slide pads may be located on the sides of a device, giving an inexpensive way to provide additional methods of one-handed device operation. For example, in one embodiment, a user may slide a thumb up and down a side-located slide pad to simulate the use of a thumb wheel. In another embodiment, the side mounted slide pad may span a significant portion of the device side, such that the virtual thumb wheel may be located wherever the user's thumb happens to contact the slide pad. In yet another embodiment, the virtual thumb wheel may be activated through a gesture. In still another embodiment, the virtual thumb wheel may be activated by applying contact pressure with the thumb on the slide pad for a predetermined amount of time.

In various embodiments, a virtual thumb wheel may be used for different operations, depending upon the context of use. For example, in one embodiment, the virtual thumb wheel may be used to scroll up and down an active window, or cycle through items in a list (i.e. messages, files, applications, active applications in a multitasking environment, etc.). In another embodiment, a virtual thumb wheel may be used to adjust one or more device properties including, but not limited to, volume, backlight brightness, and/or any other device property. In yet another embodiment, a virtual thumb wheel may be used to move through a three-dimensional environment which may include, but is not limited to, 3D layered user interfaces, 3D rendered scenes, a 3D virtual organizational space, and/or any other three-dimensional environment.

In other embodiments, virtual scroll wheels similar to the virtual thumb wheel may be located on any type of interaction surface situated on any face of a device (the only practical difference being the digit used to operate them).

FIG. 42 shows a user interface 4200 for providing quick access to favorite operations, in accordance with one embodiment. As an option, the user interface 4200 may be implemented in the context of the architecture and environment of the previous Figures or any subsequent Figure(s). Of course, however, the user interface 4200 may be implemented in any desired environment. The aforementioned definitions may apply during the present description.

As shown, the user interface 4200 may be utilized to provide easy, quick access to a plurality of favorite operations, applications, contacts, documents, and/or other types of objects. In various embodiments, favorites panel 4202 may be displayed in response to a gesture, the selection of a hardware or software button, voice command, accelerometer input (i.e. shaking the device, flicking the users wrist, etc.), and/or any other form of user input. In one embodiment, once favorites panel 4202 is displayed, a user may select an item using a slide pad 4204 located on the side of the device.

In one embodiment, a user may configure which items are displayed in the favorites panel. In another embodiment, the favorites panel may be automatically populated by the device, based upon factors which may include, but are not limited to, historical usage, date of last use, frequency of use, popularity information obtained from a remote system, and/or any other factors.

FIG. 43 shows a device 4300 with a non-uniform display, in accordance with one embodiment. As an option, the device 4300 may be implemented in the context of the architecture and environment of the previous Figures or any subsequent Figure(s). Of course, however, the device 4300 may be carried out in any desired environment. The aforementioned definitions may apply during the present description.

In the context of the present description, a non-uniform display refers to a display that is not homogeneous in one or more aspects. Possible aspects may include, but are not limited to, pixel size, pixel shape, resolution, color (i.e. color depth, color versus black and white or grayscale, etc.), brightness, contrast, intensity, display technology (i.e. e-ink, LCD, light emitting polymer, etc.), touch resolution, and/or any other aspect or property associated with a display. In one embodiment, a non-uniform display may be divided into portions, each portion having a different set of display properties. In another embodiment, a non-uniform display may be designed to match the characteristics of the human eye.

Further, in the context of the present description, an e-ink display refers to any display which is bi-stable. In the context of the present description, bi-stable refers to being capable of holding text or other rendered images even when very little or no power is supplied to the display. In one embodiment, the e-ink display may include a display that has a resolution 150 dpi or better. In another embodiment, the e-ink display may include any technology which may exhibit high contrast, or contrast substantially equal to that of print on paper. For example, the e-ink display may include displays such as bi-stable LCDs, MEMS, cholesteric, pigmented electrophoretic, E Ink-brand display, etc. Further, in one embodiment, the e-ink display may display visual content in black-and-white or grayscale. In some embodiments, the e-ink display may display visual content in color.

In various embodiments of uniform displays, a non-negligible amount of resources (i.e. energy expenditure, device component cost, etc.) may be expended on display aspects that may be wasted due to limitations of human physiology, including visual acuity and touch sensitivity.

In different embodiments, various techniques may be employed to exploit the physiological limits of the human eye. The retina of the eye is approximately 0.5 mm thick and lines the back of the eye. The retina is a circular disc of about 30 mm in diameter and an area of about 700 mm^2. The macula is an oval-shaped highly pigmented yellow spot near the center of the retina. The central retina has a diameter of about 5 mm and an area of about 80 mm^2. There is a very small, high-resolution sensing area in the center of the central retina called the fovea (or fovea centralis). Beyond the central retina is the peripheral retina stretching to the ora serrata, about 21 mm from the fovea.

The fovea has a diameter of about 1 mm and an area of about 1 mm^2, or about 0.1% of the retina and 1% of the central retina. Approximately half of the nerve fibers in the optic nerve carry information from the fovea, while the remaining fibers carry information from the rest of the retina. The fovea is responsible for sharp central vision (foveal vision and foveal view), which is used for reading, watching television, driving, or any activity where visual detail is of primary importance. To this end, the distinction between sharp central vision and less detailed peripheral vision may be exploited by confining the use of high resolution displays to a smaller area, surrounded by lower resolution display elements, which may be cheaper and consume less power.

In different embodiments, various techniques may be employed to exploit all types of photoreceptor cells. Rod cells (rods) are photoreceptor cells in the retina that can function in less intense light than cones. Rods are concentrated at the outer edges of the retina and are used in peripheral vision. Rods are more sensitive than cone cells. Rods are almost entirely responsible for night vision. There are about 100 million rods in the retina.

Cone cells (cones) are photoreceptor cells in the retina that are responsible for color vision. Cones function best in relatively bright light. Cone cells are densely packed in the fovea, with density decreasing towards the periphery of the retina. Cones are able to perceive finer detail and more rapid changes in images than rods because their response times to stimuli are faster. There are about 3 million cones in the retina, or about 3% of the number of rods.

Cones are specialized retinal cells containing pigments with different spectral sensitivities. The perception of color is a complex process that starts with the differential output of these cells in the retina and ends in the visual cortex of the brain. Humans usually have trichromatic vision with three kinds of cones with different photopsins, which have different response curves and thus respond to variation in color in different ways. The cones are conventionally labeled according to the ordering of the wavelengths of the peaks of their spectral sensitivities: short (S), medium (M), and long (L) cone types. The three cone types do not correspond closely to particular colors. For example, L cones are referred to as red receptors, but their peak sensitivity is in the greenish-yellow region of the spectrum. The S-cones and M-cones do not directly correspond to blue and green, although they are referred as such. The RGB color model is a convenient means for representing color, but not directly based on the types of cones in the human eye.

A rod is sensitive enough to respond to a single photon of light and is about 100 times more sensitive to a single photon than cones. Rods require less light to function than cones, they are therefore the primary source of visual information at night (scotopic vision). Cones require tens to hundreds of photons to become activated. Additionally, multiple rods converge on a single interneuron, collecting and amplifying the signals. However, this convergence reduces visual acuity because the pooled information from multiple cells is less distinct than it would be if the visual system received information from each rod individually. The convergence of rods also tends to make peripheral vision very sensitive to movement, and is responsible for the phenomenon of seeing something vague occur out of the corner of the eye.

Rods respond more slowly to light than cones do, so stimuli they receive are added over about 100 milliseconds. While this makes rods more sensitive to smaller amounts of light, it also means that their ability to sense changes, such as quickly changing images, is less accurate than that of cones.

Rods are most sensitive to wavelengths of light around 498 nm (green-blue), and insensitive to wavelengths longer than about 640 nm (red). This fact is responsible for the Purkinje effect: as intensity dims at twilight, the rods take over, and before color disappears completely, peak sensitivity of vision shifts towards the area of rod peak sensitivity (blue-green). To this end, such distinction between rods and cones may be exploited by using techniques that adapt a display to efficiently make use of both types of photoreceptor cells.

In different embodiments, various techniques may be employed to exploit the different concentration of photoreceptor cells located in different areas of the human eye. The fovea has a high concentration of cones. The center of the fovea is the foveola with a diameter of about 0.3 mm and an area of about 0.1 mm^2. The area of the foveola is about 0.01% of the retina and 0.1% of the central retina. The foveola has a very high concentration of cones but very few or no rods. The fovea and foveola have very compact cones that are thinner and more rod-like than cones elsewhere.

The central retina contains the parafovea and perifovea. The fovea is surrounded by the parafovea belt and the perifovea outer region. The parafovea belt ganglion cell layer is composed of more than five rows of cells, as well as the highest density of cones. The perifovea region ganglion cell layer contains two to four rows of cells, and is where visual acuity falls below the peak. The perifovea contains about 120 cones/mm versus about 500 cones/mm in the central fovea. The perifovea is surrounded by a larger peripheral area that delivers highly compressed information of low resolution.

The average number of rods in the eye is about 60 million and the average number of cones is about 3 million. At 40 microns from the foveola, cone density is about 125 thousand cones/mm^2 (about 350 cones/mm). The cone density in the foveal center is 170 thousand cones/mm^2 (about 400 cones/mm). Towards the retinal periphery, cone density decreases from 6 thousand cones/mm^2 (about 80 cones/mm) at a distance of 1.5 mm from the fovea to 2500 cells/mm^2 (50 cones/mm) close to the ora serrata. Cone diameter increases from the center towards the periphery. At 40 microns from the foveola, cone diameter is about 3.3 microns. In the outer retinal regions, cone diameter about 10 microns.

Rod density is highest in a ring-like area about 3-5 mm from the foveola with an average of 70 thousand rods/mm^2 (about 250 rods/mm). Rod density peaks at 150 thousand rods/mm^2 (about 400 rods/mm). Rod density decreases towards the retinal periphery to 35 thousand rods/mm^2 (about 200 rods/mm). Rod diameter increases from about 3 microns to about 6 microns in the periphery. The hexagonal rod and cone inner segments are arranged in a regular honeycomb fashion.

The optic nerve contains ganglion cell axons connected to the brain. The optic nerve also contains blood vessels that supply the retinal layers and neurons. The ganglion cells are the output neurons of the retina and lie innermost in the retina closest to the lens and front of the eye. The rods and cones are situated outermost in the retina against the pigment epithelium and choroid. Light travels through the retina and strikes the rods and cones. The absorption of photons by the visual pigment of the rods and cones is translated into first a biochemical signal and then an electrical signal that stimulates the neurons of the retina. The retinal signal is transmitted to the brain by spiking discharge patterns of the ganglion cells.

In the fovea the ratio of ganglion cells to photoreceptors is about 2.5:1; with almost every ganglion cell receiving data from a single cone, and each cone feeding between 1 and 3 ganglion cells. The acuity of foveal vision is determined by the density of the cone matrix, and the fovea is the area of the eye with the highest sensitivity to detail.

Visual acuity (image resolution, or just vision) measures to the ability to resolve two separated points or lines. The fovea is displaced about 4 to 8 degrees temporal to the optical axis. The fovea sees only the central two degrees of the visual field, roughly equal to the width of a thumbnail at arm's length. Assuming 20/20 visual acuity, the fovea has the ability to differentiate points around 1 arc-minute apart (1/60 of a degree), or about 1/16 of an inch at 20 feet.

Assuming the user holds a device display at 1 ft. (0.3 m) from their eyes, 1 arc-minute visual acuity corresponds to about 100 microns spacing (89 microns). With a field of vision equal to 2 degrees, the user can see a circular region 120 arc-minutes across. If we assume a pixel spacing of 1 arc-minute, the user can see a maximum area of about 10000 such pixels at the visual acuity limit.

A user typically focus on a small region of a display (e.g., text, graphics, movie, picture, web page, etc.). We define this small region of user focus as the area of attention. For example the user focus may be an application window, the area of attention may be a tab or web page etc. within the application window (e.g., within the user focus, etc.). Physiologists also refer to the exact point of eye gaze as the fixation point (or fixation). Thus, for example, the fixation may be a pixel within a character within a word within the area of attention within the user focus. To this end, the different zones and levels of visual acuity in the human eye may be exploited by adapting one or more properties associated with a display such that the resources used (i.e. resolution, backlight intensity, etc.) do not exceed the eye's capacity to receive.

The iPhone 4s has a 960-by-640-pixel display with 326 ppi resolution and 78 micron pixel width, at about the visual acuity limit (89 microns). The iPhone 4s screen thus has 614400 pixels of which only about 10000 or 16% (about one-sixth) can be seen with a 2 degree field of vision. The area of user focus corresponding to highest visual acuity on a typical display while reading text is only about 5 characters wide.

Most of the area of a conventional high-resolution display is wasted since the eye cannot see at high resolution over the area subtended by the entire display. In various embodiments, energy savings (i.e. battery life, etc.) and cost savings (i.e. battery size, etc.) may be obtained by more efficiently tailoring device properties (i.e. display resolution, size, pixel properties, brightness, etc.) to the inherent limits of human physiology.

In one embodiment, one or more regions (e.g., center strip, top, bottom, side, etc.) of a non-uniform display may provide for high-resolution viewing. For example, see FIG. 43.

As shown, device 4300 includes a display 4302 which is divided into three regions. In one embodiment, two of these display regions, 4304 and 4308, may be low resolution, while the third region, 4306 may be high resolution.

In various other embodiments of a non-uniform display, there may be three regions of a display. Region 1 may be the highest display resolution region, and may be intended for reading text. In one embodiment, Region 1 may be sized smaller than a field of view corresponding to an area of about 2 degrees subtended at the eye. In another embodiment, Region 2 may use a lower resolution display than Region 1, and have an area roughly corresponding to about 5 degrees subtended at the eye. In yet another embodiment, Region 3 may be the lowest resolution are of the display, may comprise a black and white display; Region 3 may be larger than an area corresponding to about 5 degrees subtended at the eye (e.g., roughly peripheral vision, etc.).

In one embodiment, Region 1 may be any shape, including but not limited to, a rectangle, square, circle, or any other shape. In another embodiment, Region 2 may surround Region 1. In yet another embodiment, Region 3 may surround Region 2. Of course, the regions may be any shape or size that allow a display to be divided into regions intended for one or more fields of vision (e.g., central vision, peripheral vision, etc.).

In one embodiment of a non-uniform display, one or more regions of the non-uniform display may be constructed such that the resolution is below normal visual acuity. In the context of the present description, visual acuity refers to a measure of the ability to resolve two separated points or lines.

In one embodiment, a device user interface may take advantage of the phenomenon of hyperacuity. In the context of the present description, hyperacuity refers to the eye's ability to resolve, in some special situations, object or lines at a level below normal visual acuity.

One example of hyperacuity is vernier acuity. In the context of the present description, vernier acuity refers to a measure of the ability to align two line segments. Under optimal conditions, the vernier acuity limit is about 8 arc seconds, about 10% of normal visual acuity. Vernier acuity is thought to be a process of the visual cortex rather than of the retina. Vernier acuity may have the same underlying mechanism that enables humans to resolve very slight differences in the orientations of two lines. Orientation is known to be processed in the visual cortex.

The stereoscopic acuity is the ability to detect small differences in depth with two eyes. For complex targets, stereoscopic acuity is similar to normal monocular visual acuity, but for simple targets, such as vertical rods, may be as low as only 2 arc seconds, about 3% of normal visual acuity.

The smallest detectable visual angle produced by a single fine dark line is about 0.5 arc seconds, about 1% of normal visual acuity. The mechanism is the ability to detect very small differences in contrast or illumination and does not depend on the angular width of the line, which cannot be discerned. Thus as a fine line gets finer, it appears to get fainter but not thinner.

In one embodiment of a non-uniform display, one or more regions of the non-uniform display may be constructed so that the resolution is below normal visual acuity (i.e. a resolution corresponding to hyperacuity, vernier acuity, stereoscopic acuity, etc.).

In one embodiment, hyperacuity may be used in a device user interface. For example, in one embodiment, two lines may be used to represent the output of an accelerometer (i.e. device orientation, tilt, etc.). When the tilt of the device is adjusted to exactly zero (i.e. the device is level, etc.), the two lines may be moved such that they align. Because the vernier acuity of the human eye is better than normal visual acuity, the eye is extremely sensitive to this sort of line alignment. This method may thus result in an increased accuracy in leveling the device. In various embodiments, these two lines may be refers to as a hyperacuity widget.

Other embodiments of the hyperacuity widget may be based upon the alignment of icons or other graphics. For example, in one embodiment, two lines at an angle may be used as a hyperacuity widget to represent the output of a rotation sensor.

In one embodiment of a non-uniform display, a hyperacuity widget may be displayed on a very high-resolution portion of the display.

In one embodiment of a non-uniform display, one or more hyperacuity widgets may be utilized to determine optimal display properties (i.e. optimal display resolution for specific lighting conditions, etc.). For example, in one embodiment, a hyperacuity widget may consist of a fine line displayed on a high-resolution portion of a display. The user may adjust the magnification of an image by adjusting the appearance of the fine line hyperacuity widget. When the fine line no longer appears to get narrower, but instead only fainter, the user knows they are no longer able to resolve the thickness of lines in an image, and further increases in magnification may result in diminishing returns.

In another embodiment of a non-uniform display, the user may adjust backlighting or some other display property (e.g., color gamut, contrast, etc.) according to the appearance of one or more hyperacuity widgets. As an option, the display being adjusted need not be the same display that shows the hyperacuity widget, but may be.

In yet another embodiment, the device may display one or more hyperacuity widgets to assist the user in adjusting display properties of text. Display properties of text may include, but are not limited to, font, size, style, color, and/or any other text property.

In one embodiment of a non-uniform display, the user may be presented with an interface containing one or more hyperacuity widgets as well as controls (i.e. buttons, sliders, etc.) associated with various display properties, to assist the user in determining optimal display settings. In another embodiment, the device may make a series of changes to one or more display properties and then prompt the user to respond with input on how the resolution of the hyperacuity widgets has changed.

In one embodiment of a non-uniform display, text may be scrolled, moved, translated, or displaced such that the area of attention is positioned in the high-resolution region of the display. In another embodiment, text may be scrolled, moved, translated, or displaced such that the area of attention is positioned in one or more regions of the display which have different display properties.

In the context of the present description, an area of attention refers to a subset of the user focus on which a user's field of vision is concentrated. For example, in one embodiment, if the user focus is an application window, then the area of attention may be a tab or web page within that application window.

In various embodiments of a non-uniform display, the display content may be modified such that potential areas of attention are positioned in one or more regions of the display having different display properties. For example, in one embodiment, text may be moved to a text-optimized region of a display (i.e. e-ink, high contrast, black-and-white, high resolution, etc.) while images may be moved to an image-optimized region of a display (i.e. color, high color fidelity, lower resolution, etc.). In one embodiment of a non-uniform display, the area of attention may be magnified.

In one embodiment of a non-uniform display, one or more displays may comprise adjoining displays of different properties. For example, in one embodiment, a display may consist of one or more smaller displays joined together. As a specific example, a display may comprise a first display which is an e-ink display, joined with a second display which is a LCD display.

In one embodiment, a display may comprise one or more display regions with different display properties. For example, in another embodiment, a first display region may have a first pattern of display pixels and a second region may have a second different pattern of display pixels.

In various embodiments of a non-uniform display, one or more displays may have one or more properties that may be modified. For example, in one embodiment, a display may comprise a layered e-ink and LCD display, and may be adjusted such that one or more regions are e-ink only and one or more regions are LCD only. Of course, any combination(s) of display technology may be used in a similar fashion.

In various embodiments of a non-uniform display, the display content may be manipulated such that potential areas of attention are positioned on one or more displays having different display properties. For example, in one embodiment, text may be moved to a text-optimized display (i.e. e-ink, black-and-white, higher resolution, etc.) and images moved to an image-optimized display (e.g., color, lower resolution, etc.).

In another embodiment of a non-uniform display, the display content may be manipulated such that potential areas of attention are positioned on one or more displays that may be on different devices. In yet another embodiment, the display content may be manipulated such that potential areas of attention are positioned on one or more displays that may be on a removable portion of the device.

In various embodiments of a non-uniform display, the display properties of regions of one or more displays may be adjusted such that they are optimized for viewing the one or more potential areas of attention located within them. For example, in one embodiment, contrast may be adjusted for an area of text while brightness may be adjusted for an area of photographs.

In one embodiment of a non-uniform display, any display property or combination of display properties may be changed in order to optimize any number of regions of the one or more displays.

In another embodiment, the display scrolling may be performed by the user. For example, in one embodiment, the user may perform the scrolling using a backtouch interface. In yet another embodiment, the scrolling may be performed by the device. As an option, the user may specify a scrolling speed. In still another embodiment, the scrolling may be controlled by detected user focus (including, in some embodiments, user gaze). In another embodiment, the scrolling speed may be adjusted automatically based upon observed user focus (i.e. if the user focus is tending to one side or another of the display region, the scrolling speed may be adjusted to bring the user focus back to the center of the device).

Another example of a non-uniform display may be seen in FIG. 44, which shows a display which makes use of a light valve technique.

In various other embodiments, device efficiency may be increased by taking advantage of the properties associated with rods and cones. For example, FIG. 45 shows a display which mixes color pixels with black and white pixels on different display types, to stimulate both rods and cones. FIG. 46 shows a display mixing color with black and white across a matrix to stimulate both rods and cones. Finally, FIG. 47 shows a display modulated between color and black and white, to simulate sharpness and enhanced color.

FIG. 48 shows a device 4800 with a display having a non-uniform backlight, in accordance with one embodiment. As an option, the device 4800 may be implemented in the context of the architecture and environment of the previous Figures or any subsequent Figure(s). Of course, however, the device 4800 may be carried out in any desired environment. The aforementioned definitions may apply during the present description.

In many cases, the most energy consuming part of a typical device are the display backlights. In various embodiments, energy consumption may be reduced through the use of displays having a non-uniform backlight.

In the context of the present description, a non-uniform backlight display refers to a display whose backlight may have one or more regions with different backlight intensities. In one embodiment, a non-uniform backlight may be combined with a non-uniform display.

In one embodiment of a non-uniform backlight display, one or more displays may be divided into one or more regions, each region having at least one different backlight property. Backlight properties may include, but are not limited to, intensity, color temperature, time until automatic dimming, power saving dim level, and/or any other property of a backlight.

For example, in one embodiment, some regions of the display may have low intensity backlighting and other regions of the display may have high intensity backlighting. For example, see FIG. 48.

As shown, device 4800 includes a display 4802 which has a non-uniform backlight. In one embodiment, display 4802 may have two regions, a region 4804 having high intensity backlighting and a region 4806 having low intensity backlighting.

In various embodiments, one or more aspects or properties of the display backlighting may be variable. For example, in one embodiment, the location and/or size of regions having different backlight properties may be variable.

In one embodiment of a non-uniform backlight display, high-intensity back lighting may be used for one or more areas of attention. In another embodiment, areas of attention may be moved to regions of high intensity backlighting. As an option, the movement of areas of attention may be performed by the user or by the device. In yet another embodiment, the movement of areas of attention may be between one or more displays having different backlight properties and/or having different backlight settings.

In some embodiments, the regions of different backlight properties may be separated by distinct boundaries. See, for example, device 4800. In other embodiments, the backlight properties may vary as a function of display location. As an option, this function may be continuous and differentiable. For example, in one embodiment, the backlight might gradually vary from a high intensity to low intensity.

In various embodiments, one or more aspects of the display backlighting may vary as a function of user input. For example, in one embodiment, variable backlighting may be used to provide feedback to the user when interacting with a proximity-sensitive backtouch interface. Specifically, in one embodiment, the contrast between the backlighting in the vicinity of an implement of interaction near a proximity-sensitive surface and the backlighting further away from the implement may increase as a function of proximity, such that right before contact is made the backlight is only activated in the vicinity of the implement of interaction.

In other embodiments, variable backlighting may be used as other forms of feedback. For example, in one embodiment, the backlighting in the area around a contact point might increase or decrease in intensity as a function of contact pressure. In another embodiment, the backlighting in the areas of a display which have been touched as part of a gesture may be temporarily decreased as the gesture is performed, such that the user may see the path traveled by an implement of interaction in the form of a temporarily darkened trail.

FIG. 49 shows a device 4900 having a removable back sensor or display, in accordance with one embodiment. As an option, the device 4900 may be implemented in the context of the architecture and environment of the previous Figures or any subsequent Figure(s). Of course, however, the device 4900 may be carried out in any desired environment. The aforementioned definitions may apply during the present description.

The use of modular components in a device may provide certain advantages, such as reduced cost and increased ease of repair. Modularity may also introduce new functionality to the device.

For example, in one embodiment, some modular components may continue to function after being separated from the device. For example, see FIG. 49.

As shown, device 4900 includes a front display 4902 and a touch-sensitive rear interaction surface located on a detachable device 4904. In one embodiment, the interaction surface of detachable device 4904 may also be a low power e-ink display.

In the context of the present description, device 4900 may be referred to as a host device, and device 4904 may be referred to as a detached device.

In one embodiment, the detached device may be a display, an interaction surface, a display with a backtouch interface, or any other combination of display(s) and interaction surface(s). In another embodiment, a detached device may have neither a display nor an interaction surface, but instead embody some other form of functionality. Possible functions include, but are not limited to, magnetic data stripe, storage, backlight, camera, speaker, microphone, keyboard, and/or any other type of device or apparatus.

In one embodiment, the front display of the host device may be removable. In another embodiment, one or more portions of the front display of the host device may be removable. In yet another embodiment, one or more other displays, or one or more portions of other displays, may be removable from the host device. As an option, these removable displays may or may not also include some form of interaction surface.

In one embodiment, one or more interaction surfaces may be removable from the host device. As an option, the removable interaction surface(s) may or may not have some form of display functionality. In another embodiment, one or more interaction surfaces which also function as displays may be removable from the host device. In yet another embodiment, one or more detached devices may comprise any combination of touchpad(s), touchscreen(s), display(s), touch interfaces, and/or any other form of interaction surface.

In one embodiment, a detached device may include internal sensors. Internal sensors may include, but are not limited to, accelerometers, digital compasses, RFID sensors, and/or any other type of sensor. In another embodiment, a detached device may include a CPU, one or more forms of storage, a microphone, a speaker, a battery, and/or any other device or component which may also be found in a host device.

In one embodiment, a detached device may be housed in a transparent or translucent material. In another embodiment, only portions of a detached device may be housed in transparent or translucent material.

In various embodiments, a detached device may be capable of operating in one of a plurality of roles within a host device. For example, in one embodiment, a detachable touch-sensitive front display may be removed from the front and placed on the back of the host device, where it may serve as a backtouch interface (i.e. display disabled).

In some embodiments, a host device may accept different types of detached devices. For example, in one embodiment, a host device may have front and back touch-sensitive LCD displays detached and replaced with a front e-ink display and a backtouch interface.

In one embodiment, a detached device may be powered via wireless, wired, battery, energy transmission (i.e. mutually coupled coils, other magnetic coupling technology, etc.), supercapacitor, and/or any other type of power source.

In various embodiments, a detachable device may continue to provide functionality to the host device after being detached. For example, in one embodiment, a detached backtouch interface may serve as a wired or wireless track pad, providing input to the host device. In various embodiments, any data coupling between host device (s0 and detached device(s) may be accomplished through wired, wireless, or a combination wired/wireless connection. Wireless connections may include, but are not limited to, RF, near-field communication (NFC), optical, infra-red, and/or any other form or type of wireless communication or transmission.

In one embodiment, a detached device may be approximately the size of a credit card. In another embodiment, a detached device may contain a magnetic strip, and may be used in conjunction with a magnetic card reader.

In various embodiments, a detachable device may be capable of determining its context with respect to a host device. For example, in one embodiment, a detached touchscreen may be able to detect whether it is being attached to the front of a host device or the back. As an option, a detachable device may use this context data to modify gesture definitions. For example, a left-to-right swipe gesture in a front context may be redefined to be a right-to-left gesture when the detachable device is in a rear context.

In one embodiment, a user, device, or other agent may modify how the device responds to a user. In another embodiment, a user, device, or other agent may modify how the user commands the device.

FIG. 50 shows a user interface 5000 containing an adaptive soft keyboard, in accordance with one embodiment. As an option, the user interface 5000 may be implemented in the context of the architecture and environment of the previous Figures or any subsequent Figure(s). Of course, however, the user interface 5000 may be implemented in any desired environment. The aforementioned definitions may apply during the present description.

In the context of the present description, an adaptive soft keyboard refers to an on-screen software keyboard which has at least one aspect which may vary as a function of user input or interaction. Keyboard aspects may include, but are not limited to, key size, key arrangement, key press sensitivity, and/or any other aspect which may be associated with a soft keyboard. For example, see FIG. 50.

As shown, user interface 5000 contains an adaptive soft keyboard 5002. In one embodiment, the keys of 5002 may vary in size, depending on the contact area associated with recent or historical key presses. For example, in one embodiment, a small contact area 5004 may result in a soft keyboard with smaller keys, while a large contact area 5006 may result in a soft keyboard with larger keys. In this way, the soft keyboard may adapt to the size of the implement(s) of interaction (i.e. finger, stylus, etc.) being used, to facilitate the interaction.

In various embodiments, one or more keys on a soft keyboard may change in size. In one embodiment, all keys on the soft keyboard may change in size. In another embodiment, only a subset of keys may change in size. (e.g., most commonly used keys change, vowels change, etc.).

In one embodiment, the key size may depend on touch pressure. For example, in one embodiment, the user may increase the size of one or more keys by exerting a greater contact pressure.

In one embodiment, one or more key sizes may depend on a computed metric. Computed metrics may include, but are not limited to, average contact area, average number of key presses over time, frequency of pressing specific keys, and/or any other metric associated with the use of a keyboard.

In various embodiments, key arrangement may depend upon how the user is holding the device. For example, in one embodiment, if the device determines that the user is holding it with thumbs on the front and fingers on the back, the soft keyboard may arrange the keys such that they are in easy reach of the user's thumbs. This determination may be based upon detected contact points on a rear interaction surface, contact with interaction surfaces located on the sides of the device, or by any other method of estimating user grip.

FIG. 51 shows a user interface 5100 with context-sensitive backlighting, in accordance with one embodiment. As an option, the user interface 5100 may be implemented in the context of the architecture and environment of the previous Figures or any subsequent Figure(s). Of course, however, the user interface 5100 may be implemented in any desired environment. The aforementioned definitions may apply during the present description.

In the context of the present description, context-sensitive backlighting refers to a method of backlighting a display where one or more backlight properties may depend upon contextual factors. Contextual factors may include, but are not limited to, type of content displayed, user focus, historical usage data, user input through a backtouch interface, other user input, and/or any other contextual factors. For example, see FIG. 51.

As shown, user interface 5100 makes use of context-sensitive backlighting such that there are one or more areas of bright backlighting 5102 as well as one or more areas of dim backlighting 710.040-04. In various embodiments, the size, shape, brightness, and numbers of bright and dim areas within user interface 5100 may depend upon the attributes of a user area of attention. In the context of the present description, the terms bright and dim are relative terms, indicating a level of backlighting as compared to other regions of the display.

The size and shape of a user area of attention may vary depending on the type of content being viewed. For example, when browsing a rectangular page of search results, a user typically scans text at the top of a page from left-right, then quickly scans vertically with increasingly shorter left-to-right scans. This may result in a triangular area of attention. This may be true for text in western style alphabets; there may be differences for languages read from right to left.

In various embodiments of a user interface utilizing context-sensitive backlighting, one or more areas of bright backlighting may be fitted to one or more areas of attention, depending on display content. For example, in one embodiment, a triangular area of the user interface may be brightly backlight when displaying text search results. See, for example, user interface 5106, having a brightly backlit triangular region 5108 for the text search results, and a dimly backlit area 5110 elsewhere.

A round area of attention may be associated with viewing movies or images. In another embodiment, a round area of the user interface may be brightly backlit when displaying movies or images. See, for example, user interface 5112, having a brightly backlit circular region 5114 for a movie, and a dimly backlit area 5116 elsewhere. In another embodiment, the display content may be modified with respect to the backlit area of attention. Modifications may include, but are not limited to, scaling, translation, and/or any other operation which may be performed on image or movie data.

A rectangular area of attention may be associated with reading a block of text. In yet another embodiment, a rectangular area of the user interface may be brightly backlit when displaying a block of text. See, for example, user interface 5118, having a brightly backlit rectangular region 5120 for a block of text, and a dimly backlit area 5122 elsewhere. In another embodiment, the text may be modified with respect to the backlit area of attention. Modifications may include, but are not limited to, scaling, translation, reflow, font size, wrapping style, hyphenation style, and/or any other modification which may be performed on text.

In various embodiments, the areas of attention, and backlight regions, may be of any shape. In one embodiment, the user may select the display properties for different regions of the user interface and/or different areas of attention. In another embodiment, the content type and use context may be determined automatically, using methods and information including, but not limited to, historical use data, user focus tracking (including user gaze tracking), file extensions, analysis of display content, application type, and/or any other possible source of contextual information. As an option, the definition of areas of attention, establishment of backlighting regions, and modification of displayed contents may be performed automatically.

In various embodiments, one or more aspects of the areas of attention, backlight properties, and/or display properties may be adjusted by the user through a backtouch interface. For example, in one embodiment, a user may move a finger on a backtouch input while reading text to adjust the backlight intensity to be increased over the area of attention.

In various embodiments, the backlight display properties associated with the area located near a boundary between two backlight regions may be defined as a function of the properties of both regions. For example, in one embodiment, the border between two backlight regions may be defined such that there is a gradient spanning the backlight intensities associated with the two regions. In another embodiment, the border between the two backlight regions may be defined such that there is a sharp change in brightness at the boundary. In yet another embodiment, the backlight display properties associated with the area located near a boundary between two backlight regions may be defined as a function of the other properties of both regions, properties which may include, but are not limited to, type of content being displayed, size of region, region creation time/date, and/or any other property which may be associated with a backlight region.

FIG. 52 shows a 3D layered user interface 5200, in accordance with one embodiment. As an option, the user interface 5200 may be implemented in the context of the architecture and environment of the previous Figures or any subsequent Figure(s). Of course, however, the user interface 5200 may be implemented in any desired environment. The aforementioned definitions may apply during the present description.

In the context of the present description, a 3D layered user interface refers to a user interface in which displayed objects may exist in one of a plurality of layers. For example, see FIG. 52.

As shown, user interface 5200 is comprised of two layers, a front layer 5202 and a back layer 5204. These layers are depicted in a staggered arrangement, to illustrate the depth; it should be noted that in various embodiments, the layers would be aligned. Object 5206 exists in the front layer, while object 5208 exists in the back layer. In various embodiments, a user may interact with the layers separately.

In various embodiments, a 3D layered user interface may be implemented in a layered display device. In the context of the present description, a layered display device refers to a device with at least one display that is made up of a plurality of overlapping display layers, each layer able to display content independent of other layers, with all layers facing the same direction. For example, in one embodiment of a layered display device, the device may have a display made up of a transparent display located on top of a second display, both facing forward. In another embodiment, the display layers may be separated by a non-opaque material, to enhance the layered appearance.

In another embodiment of a layered display device, the display layers may include one or more e-ink layers. In yet another embodiment, the display layers may include one or more LCD layers. In still another embodiment, the display layers may include both e-ink and LCD layers. Other embodiments may include any combination of layers embodying any display technology.

In various embodiments, a 3D layered user interface may be implemented in a device having single layer displays through the use of virtual display layers. In the context of the present description, a virtual display layer refers to a collection of display elements which have all been assigned the same apparent depth within the 3D layered user interface. In various embodiments, a 3D layered user interface may make use of multiple virtual display layers. For example, in one embodiment, a 3D layered user interface may have a virtual foreground display layer and a virtual background display layer.

Additionally, in the context of the present description, a display element refers to the region of the display allotted to an identifiable visual object. Identifiable visual objects may include, but are not limited to, digital objects (i.e. images, text boxes, UI control widgets, selections, etc.), subject matter objects (i.e. people within a photograph, letters and/or words within text, etc.), and/or any other type of identifiable visual object. When located in a virtual display layer, display elements may be referred to as 3D display elements.

In various embodiments, virtual display layers may be given the appearance of depth through the use of 3D depth cues. In the context of the present description, a 3D depth cue refers to an effect, manipulation, transformation, animation, or operation which gives a visual indication of simulated depth. For example, in one embodiment, a 3D depth cue may be a blur operation, such that layers located at successively greater depths may appear blurrier than those closer to the user. In various embodiments, one or more 3D depth cues may be used to give the appearance of depth to one or more virtual display layers. In one embodiment, different 3D depth cues may be used for different virtual display layers. In another embodiment, 3D depth cues may be used in conjunction with a 3D layered user interface implemented in a layered display device, to enhance the layered appearance.

In one embodiment, a 3D depth cue may include the addition of a shadow element to display elements located within a virtual display layer, making them to appear to float above the next virtual display layer. As an option, the location of the light source(s) casting the shadows may be based in part on data obtained from one or more cameras located on the host device.

In one embodiment, a 3D depth cue may include the addition of a depth-based fog, giving the appearance that the layers exist in an environment with a thin, uniform fog. In this way, distant objects may be "foggier" than objects close to the user.

In one embodiment, a 3D depth cue may include a depth-based apparent rate of movement. For example, in a situation where a user is swiping through multiple screens of layered content, the layers closer to the user may appear to move faster than those more distant, giving the appearance of depth.

In one embodiment, a 3D depth cue may include a time-dependent visual transformation. For example, in one embodiment, a background layer may be transformed such that it appears to be below rippling water, while the foreground layer appears to be floating on the surface. In another embodiment, the visual transformation may be static.

In one embodiment, a 3D depth cue may include animated visual elements which appear to exist in between layers. Elements may include, but are not limited to, birds or insects flying, shooting stars, tiny people walking, grass blowing in the wind, and/or any other visual element.

In one embodiment, a 3D depth cue may include moving and/or transforming display elements within a virtual display layer based upon detected user gaze and/or head position. For example, in one embodiment, display elements may be compressed and virtual display layers spread apart if the device determines the user is viewing the display from an angle, the degree of transformation varying with estimated viewing angle. In another embodiment, display elements located on different virtual display layers may be slide around within their respective layers as the user changes their angle of viewing, allowing them to "look around a corner" to see display elements that would be obscured when viewed head on.

In one embodiment, a 3D depth cue may include moving and/or transforming display elements within a virtual display layer based upon changes in device orientation detected through one or more hardware interfaces (i.e. accelerometer, tilt sensor, compass, etc.).

In one embodiment of a 3D layered user interface, the 3D cues may be implemented such that the user interface has an apparent depth equal to the thickness of the device. In another embodiment, the 3D cues may be implemented such that the user interface has an apparent depth equal to the distance between a front display and a backtouch interface.

In various embodiments, a user may interact with the layers separately. For example, in one embodiment, a front interaction surface may be used to interact with display elements in a foreground display layer, and a back interaction surface may be used to interact with display elements in a background display layer. See, for example, FIG. 52.

User interface 5200 is being implemented in a device having front and back touch-sensitive interaction surfaces. As shown, a user may manipulate display element 5206, located in front layer 5202, through a gesture 5210 performed on the front interaction surface. At the same time, a user may manipulated display element 5208, located in back layer 5204, through a gesture 5212 performed on the back interaction surface. In one embodiment, the manipulation of one of these display elements may be done completely independent of the other display element.

In one embodiment of a 3D layered user interface, a front input interface may be used to move display elements on a virtual foreground display layer. In another embodiment of a 3D layered user interface, a rear input interface may be used to move display elements on a virtual background display layer.

In various embodiments, there may be display layers with which a user may not interact. For example, in one embodiment, there may be an emphasis display layer situated in front of all other display layers. In the context of the present description, an emphasis display layer refers to a display layer (virtual or physical) which is used to provide visual emphasis to one or more display elements without providing independent means of user interaction. In other words, when a user interacts with a display element located in an emphasis display layer, they might also interact with one or more other layers. For example, in one embodiment, an emphasis display layer may be used to indicate results of a text search within a document (i.e. target words appear to float above the document, etc.). Although located on a different display layer, any text selection made by the user may incorporate text from both the emphasis display layer and the display layer housing the document. In another embodiment, an emphasis display layer may cause hyperlinks within a webpage to appear to float above the rest of the page, though still able to be selected along with non-hyperlink text.

In another embodiment, an emphasis display layer may be used to display user avatars floating above the text of a chat session; the user may not interact with the avatars. Other examples of the use of an emphasis display layer may include, but are not limited to, a status bar floating at the top of a display, pop-up volume indicators which appear when the volume is changed, icons within the status bar, and/or any other circumstance where visual emphasis is desired.

Another example of a display layer with which a user may not interact is an ambiance display layer. In the context of the present description, an ambiance display layer refers to a display layer (virtual or physical) which is used to display decorative display elements with which a user may not directly interact with. For example, in one embodiment, one or more ambiance display layers may be used to create the appearance of three-dimensional structure within the 3D layered user interface (i.e. walls, shelves, backdrop, etc.). In another embodiment, an ambiance display layer may be used to display a wallpaper or some other backdrop which is present behind the elements and controls of the user interface. In yet another embodiment, a user may customize one or more ambiance display layers through a separate user interface, but not through direct interaction.

In one embodiment of a 3D layered user interface, a rear touch input may be used to control display elements located on a virtual display layer. In another embodiment, a rear touch input may be used together with a front touch input to control one or more display elements on one or more virtual display layers.

In other embodiments of a 3D layered user interface, a user may interact with one of a plurality of layers through a back interaction surface, the layer being selected using a pressure-sensitive front interface. For example, in one embodiment, a user may select one of a plurality of display layers by applying a predefined level of contact pressure on the front interaction surface, and interact with the selected layer using a back interaction surface. As an option, 3D depth cues may be used to indicate "moving" through the display layers as the contact pressure is changed (i.e. magnifying and fading display layers as they are passed by, sharpening previously blurry display layers as they grow closer, etc.).

In one embodiment, one or more display layers associated with a 3D layered user interface may only be interacted with through coordinated user input on multiple interaction surfaces. For example, in one embodiment, a touch input on the front of the device together with a touch input on the back of the device may control the overlap between two or more virtual display layers.

In one embodiment, display elements may be assigned to virtual display layers, just as they may be assigned to physical display layers in a layered display device. In another embodiment, the process of assigning display elements to virtual display layers may be the same as the process of assigning display elements to physical display layers in a layered display device. In yet another embodiment, a 3D layered user interface may be designed such that it may take advantage of physical display layers, if present, or use virtual display layers if only single layer displays are available. It should be understood that all functionality and embodiments described with respect to virtual display layers may also be implemented in a layered display device.

In some embodiments, a single layer device may be converted to a layered display device. See, for example, FIG. 53, which shows a device whose rear screen may be reversed to face forward, creating a forward facing display.

FIG. 54 shows a 3D layered user interface 5400 for augmented reality, in accordance with one embodiment. As an option, the user interface 5400 may be implemented in the context of the architecture and environment of the previous Figures or any subsequent Figure(s). Of course, however, the user interface 5400 may be implemented in any desired environment. The aforementioned definitions may apply during the present description.

In the context of the present description, augmented reality refers to a view of a physical environment, received from a camera, which is augmented by overlaying additional information from other sources. In various embodiments, the view of a physical environment may be a live video signal from a camera.

In various embodiments, a 3D layered user interface for augmented reality may display a video signal on one display layer, overlaid with additional information displayed on additional display layers. For example, see FIG. 54.

As shown, user interface 5400 is comprised of two layers, a back layer 5404 containing a video signal, and a front layer 5402 containing display elements which augment the video signal. These display elements are hereinafter referred to as augmenting display elements. These layers are depicted in a staggered arrangement, to illustrate the depth; it should be noted that in various embodiments, the layers would be aligned.

In various embodiments, an augmenting display element may include business information. Business information may include, but is not limited to, business name, business contact information (i.e. website, phone number, email address, etc.), business hours, reviews, and/or any other information related to a business. In one embodiment, an augmenting display element may include an iconic and/or text based indication of business type. For example, see restaurant indicator 5406 in user interface 5400.

In various embodiments, an augmenting display element may include information obtained from a social network. Social network information may include, but is not limited to, posts tagged with GPS coordinates, posts referring to a specific location, and/or any other information found on a social network. In one embodiment, an augmenting display element may include an iconic and/or text based indication that an individual on a known contacts list made a post at a visible location. For example, see friend post indicator 5408 in user interface 5400.

In various embodiments, an augmenting display element may include navigation information. Navigation information may include, but is not limited to route information, GPS coordinates, estimated time or arrival, street names, compass directions, current address, speed, and/or any other navigation related information. In one embodiment, a augmenting display element may include an iconic and/or text based indication of a route. For example, see route indicator 5410 in user interface 5400.

In various embodiments, a 3D layered user interface for augmented reality may use 3D depth cues to visually differentiate augmenting display elements associated with physical locations near the user from those associate with distant physical locations. In one embodiment, 3D depth cues may be used to give augmenting display elements an apparent distance from the user roughly equal to the physical location with which they are associated. In another embodiment, 3D depth cues may be used to augment the video signal such that it has a three dimensional appearance.

FIG. 55 shows a device 5500 with user gaze tracking sensors, in accordance with one embodiment. As an option, the device 5500 may be implemented in the context of the architecture and environment of the previous Figures or any subsequent Figure(s). Of course, however, the device 5500 may be carried out in any desired environment. The aforementioned definitions may apply during the present description.

As discussed previously, user gaze is a type of user focus. In the context of the present description, user gaze tracking refers to a procedure which extrapolates where on a display a user is looking, using data related to the user's eyes.

In one embodiment, a determination of user gaze may result in a field of eye gaze probabilities. In another embodiment, a determination of user gaze may result in data similar to proximity data obtained from a proximity-sensitive interaction surface. In yet another embodiment, a determination of user gaze may result in a specific location on a display, with an associated uncertainty. As an option, the uncertainty may not be radially symmetric (i.e. greater uncertainty in left-right directions than up-down, etc.).

In one embodiment, a user gaze tracking sensor may include a camera. In another embodiment, a user gaze tracking sensor may include an infra-red sensor. In various embodiments, a user gaze tracking sensor may also include a light source. In some embodiments, this light source may be used to observe reflections within a user's eye. In one embodiment, the light source may emit light primarily in the infra-red wavelengths.

Some embodiments of a device with user gaze tracking sensors may include more than one sensor. For example, see FIG. 55.

As shown, device 5500 includes a front display 5502 and two user gaze tracking sensors 5504.

In one embodiment, the front display 5502 may be a single layer display. In one embodiment, the front display 5502 may be a layered display, having two or more physical display layers. In some embodiments of a layered display device with user gaze tracking sensors, a determination of user gaze may indicate where on the display a user is looking, as well as which layer. As an option, such a determination may also result in uncertainty value(s) for location as well as depth.

In some embodiments, a device with user gaze tracking sensors may have one sensor positioned for gaze tracking while the device is in a user's hands, and one or more gaze tracking sensors positioned for alternative use scenarios. Possible use scenarios include, but are not limited to, placed in a stand or dock, laying flat on a table, and/or any other use scenarios.

In some embodiments of a device with user gaze tracking sensors and a single layer display, a determination of user gaze may also be used to determine which virtual display layer a user is looking at. In various embodiments of a 3D layered user interface implemented on a device capable to tracking user gaze, user gaze may be used to select which display layer a user may interact with using an interaction surface. In one embodiment, a device with user gaze tracking sensor(s) may use user gaze tracking to determine one or more areas of attention.

In various embodiments, a user interface may be sensitive to user gaze. For example, in some embodiments, user gaze may be used to predict what a user wants to do (i.e. likely next step, probable next input, which layer is the area of attention, which button or key is likely to be pressed, etc.). In one embodiment, the user interface may adapt based upon predicted user intent. Adaptations may include, but are not limited to, resizing of buttons or controls, altering the assigned function of software or hardware controls, adjusting backlighting, changing one or more aspects of one or more display layers (i.e. 3D depth cues, layer order, etc.), and/or any other modification which can be made to a user interface.

In various embodiments, user gaze may be used as another form of user input. In the embodiments described in the present description, user gaze may be substituted for another form of user input. For example, in one embodiment, a user may be able to perform gestures based upon user gaze. In various embodiments, user gaze tracking may be initiated/terminated through similar or identical methods described for enabling touch, pressure, or proximity sensitive interfaces. In various embodiments, a user may determine if user gaze is being tracked through any of the forms of feedback described to indicate activation of pressure, touch, or proximity-sensitivity.

In various embodiments, user gaze may be used to generate 3D depth cues. See, for example, FIG. 56, which shows the utilization of user gaze to make a user focus float above a source layer. This and other embodiments may be implemented in a variety of environments, including that shown in FIG. 57, which depicts a two layer display having a transparent front display and opaque back display.

In various embodiments, other techniques may be used to generate a three-dimensional effect or image. See, for example, FIG. 58, which shows an example of an automultiscopic display. In the context of the present description, an automultiscopic display refers to a type of display which can provide high-resolution stereoscopic images without the use of glasses. In one embodiment, this is done using view-dependent pixels, whose color depends upon viewing angle, combined with parallax barriers.

In another embodiment, a three dimensional image may be generated through Depth Fused 3D (DFD). See, for example, FIG. 59, which shows how images at an intermediate depth may be produced by controlling the luminances of two stacked 2D images, in accordance with one embodiment.

In yet another embodiment, a layered display may be utilized for other functions. For example, FIG. 60 shows a light-field camera made from a multiple display sensors.

In these and other embodiments, a user may be provided with different forms of feedback. For example, in one embodiment, one or more embedded force transducers may provide tactile feedback to a user. See, for example, FIG. 63. In another embodiment, feedback may be provided to the user through a secondary device. See, for example, FIG. 64, which shows a watch being used as an extension of a device display.

Embodiments described herein may be implemented in a variety of environments, including that shown in FIG. 65. FIG. 65 shows one embodiment of a wireless storage ring and wireless storage key. Any of the other embodiments may be implemented in this environment.

Another embodiment of a 3D layered user interface is shown in FIG. 61. In this embodiment, a soft keyboard may be displayed on a lower display layer, beneath an active document (i.e. word processing, email, etc.), such that the words appear to float above the soft keyboard. In another embodiment, a user may interact with the soft keyboard through a back interaction surface. In yet another embodiment, FIG. 62 shows a different implementation of a 3D layered user interface on a layered display backtouch-enabled device.

FIG. 66 shows a 3D layered user interface 6600 having a clipboard layer, in accordance with one embodiment. As an option, the user interface 6600 may be implemented in the context of the architecture and environment of the previous Figures or any subsequent Figure(s). Of course, however, the user interface 6600 may be implemented in any desired environment. The aforementioned definitions may apply during the present description.

In the context of the present description, a clipboard layer refers to a display layer in a 3D layered user interface that is used to store one or more selectable objects upon which relocation/replication operations may be performed. Relocation/replication operations may include, but are not limited to, copying, pasting, sending to specified application, inserting into a new message (i.e. email, SMS, social network posting, etc.), and/or any other operation which may be performed on a selectable object. Selectable objects may include, but are not limited to, images, text (plain, rich, hypertext, etc.), video clips, sound clips, files, and/or any other type of object.

In various embodiments, a 3D layered user interface with a clipboard layer may insert the clipboard layer immediately after the active display layer. For example, see FIG. 66.

As shown, user interface 6600 is comprised of two layers, an active layer 6602 and a clipboard layer 6604. These layers are depicted in a staggered arrangement, to illustrate the depth; it should be noted that in various embodiments, the layers would be aligned. In one embodiment, user interface 6600 may include additional layers. In another embodiment, active layer 6602 may contain one or more display elements, one or more of which either is, or contains, a selectable object.

In various embodiments, an object may be selected before it may be placed on the clipboard layer. Objects may be selected using any of the methods in the present description, or any other methods or procedures for indicating a selection. In one embodiment, a screen capture may be placed on the clipboard layer without having to be selected.

Once there is an active selection, the selected object may be moved or copied to the clipboard layer. In various embodiments, the clipboard layer may be activated before an object may be moved or copied to it. In one embodiment, the clipboard layer may be activated through selecting an icon located in the status bar, or elsewhere on the display.

In various embodiments, the clipboard layer may be activated by performing a gesture. For example, in one embodiment, the clipboard layer may be activated with a 1-6 pinch slide gesture, where the user "pulls" the clipboard layer into view from one edge of the display. In various other embodiments, the clipboard layer may only be active while a gesture is being performed, with the gesture's final operation being hiding the clipboard layer. For example, in one embodiment, the clipboard layer may be activated after a squeeze gesture (i.e. a double-press squeeze gesture, etc.) is initiated, and remains active until the contact pressures fall below a threshold level, ending the gesture.

In various embodiments, an activated clipboard layer is placed directly after the active display layer (i.e. the layer which contains the selection, etc.). In various embodiments, the activation of a clipboard layer may change one or more visual properties of the active display layer. For example, in one embodiment, the active display layer may become translucent, allowing the user to see the contents of the clipboard layer. In some embodiments, the degree of translucency may be a function of a user input. For example, in one embodiment, the active display layer may become more translucent as the user increases a contact pressure (i.e. a contact pressure associated with an activating gesture, backtouch pressure, etc.). In one embodiment, the active selection in the active display layer may be less translucent than the rest of the active display layer.

In various embodiments, once the clipboard layer is activated, objects may be copied or moved to and from the clipboard layer as a result of user input. For example, in one embodiment, an object may be cut (i.e. removed from the active display layer and placed on the clipboard layer) by performing a 1-6 pinch gesture, where the contact pressure on the front interaction surface is greater than the contact pressure on the back interaction surface. This provides the user with the sensation of pushing the selected object through the active display layer, into the clipboard layer.

In one embodiment, a selected object may be copied from the active display layer by performing a press gesture on the front interaction surface, where the user applies a contact pressure level on the selected object that exceeds a predefined threshold. See, for example, FIG. 66. In another embodiment, the user may be provided with one or more visual indications that the object has been copied to the clipboard layer.

As shown in FIG. 66, a user has performed a press gesture by applying sufficient contact pressure on contact area 6606, situated on selected object 6608 which is located in the active display layer 6602. The press gesture triggered a copy operation, placing a copy 6610 of the selected object to the clipboard layer 6604.

In one embodiment, a clipboard layer may only hold one object. Cutting or copying a second object may replace the first clipboard object. In another embodiment, a clipboard layer may contain multiple objects.

In one embodiment, an object may be copied from the clipboard layer and pasted into the active display layer by performing a press gesture on a back interaction surface, behind the object. This provides the user with the sensation of pushing a copy of the object up from the clipboard layer to the active display layer. As an option, the object may remain in the clipboard layer after the copy operation.

In one embodiment, an object may be cut from the clipboard layer and pasted into the active display layer by performing a 1-6 pinch gesture, where the contact pressure on the back interaction surface is greater than the contact pressure on the front interaction surface. This provides the user with the sensation of pulling the clipboard object up to the active display layer. As an option, the object may be removed from the clipboard layer after the cut operation.

In various embodiments, a clipboard layer may contain multiple objects. In one embodiment, the clipboard layer may operated as a first-in-last-out type container, such that when a user causes a new object to be placed on the clipboard layer, previous objects get incremented in order. In such an embodiment, repeated paste operations from the clipboard to the active display layer may eventually transfer all clipboard objects to the active display layer, while repeated copy operations from the clipboard to the active display layer may create multiple copies of the active clipboard object.

In the context of the present description, an active clipboard object refers to the clipboard object which is visible in an activated clipboard layer. In various embodiments, the default active clipboard object is the last object placed in the clipboard layer. In one embodiment, a user may cycle through various clipboard objects until the desired object is visible. In another embodiment, the clipboard layer may only display objects which are able to be copied or pasted into the current active display layer (i.e. a video clip may not be displayed in the clipboard layer, even though it has been copied, if the active display layer is a text-only environment).

In various embodiments, a user may remove an object from an activated clipboard layer by selecting an icon associated with deletion. See, for example, icon 6612 in FIG. 66. As an option, the user may be prompted to confirm this operation before removing the object from the clipboard.

In one embodiment, the user may move all clipboard objects to the active display layer by performing a predefined gesture. In another embodiment, a user may select certain objects to always be available in the clipboard layer. Such objects may include, but are not limited to, email signatures, text snippets, emoticons, avatars, digital signatures, and/or any other often used object.

Of course, in various other embodiments, these clipboard layer actions (i.e. copy, cut, paste, etc.) may be triggered through any form of user input including, but not limited to, user interface controls, gestures, voice commands, and/or any other form of user input.

FIG. 67 shows a 3D layered user interface 6700 having an operation layer, in accordance with one embodiment. As an option, the user interface 6700 may be implemented in the context of the architecture and environment of the previous Figures or any subsequent Figure(s). Of course, however, the user interface 6700 may be implemented in any desired environment. The aforementioned definitions may apply during the present description.

In the context of the present description, an operation layer refers to a display layer in a 3D layered user interface that may be used to apply operations on display elements located in display layers beneath the operation layer. Operations may include, but are not limited to, image manipulations, data detection, image recognition, OCR, movie filters, sound filters, display modifications, and/or any other type of operation which may be applied to one or more display elements, or portions thereof.

In various embodiments, a 3D layered user interface with an operation layer may insert the clipboard layer immediately above the active display layer. For example, see FIG. 67.

As shown, user interface 6700 is comprised of two layers, an operation layer 6702 and one or more display layers 6704. These layers are depicted in a staggered arrangement, to illustrate the depth; it should be noted that in various embodiments, the layers would be aligned. In one embodiment, user interface 6700 may include additional layers. In another embodiment, display layer 6704 may contain one or more display elements, such as graphic 6706.

In various embodiments, an operation layer may be activated by performing a gesture. For example, in one embodiment, an operation layer may be activated with a 1-6 pinch slide gesture, where the user "pulls" the operation layer into view from one edge of the display. In various other embodiments, an operation layer may only be active while a gesture is being performed, with the gesture's final operation being hiding the operation layer. For example, in one embodiment, the operation layer may be activated after a squeeze gesture (i.e. a triple-press squeeze gesture, etc.) is initiated, and remains active until the contact pressures fall below a threshold level, ending the gesture.

In various embodiments, an operation layer may have an operation window which defines the boundaries within which the operation may be applied. See, for example, operation window 6708 in FIG. 67.

In one embodiment, a user may resize the operation window. In another embodiment, the operation window may be automatically scaled, translated, and/or reshaped to fit a display element which is in or near the user focus. In yet another embodiment, an operation layer may include a button which enlarges the operation window to fit the entire display.

In various embodiments, an operation window may be able to perform a plurality of operations. In some embodiments, operations may be divided into subject matter categories. In one embodiment, a user may select an operation by first selecting a subject matter category, then selecting an operation from a list. In various embodiments, once an operation has been selected by the user, it is applied to the contents of the operation window.

In various embodiments, possible subject matter categories may include, but are not limited to, image, text, video, audio, display, and/or any other category of subject matter. Possible image operations may include, but are not limited to, color operations (i.e. desaturate, replace color, saturate, etc.), changes in color space (i.e. grayscale, sepia, custom 2-tone space, etc.), processing effects (i.e. halftone, pixelate, posterize, etc.), distortions (i.e. twirl, warp, motion blur, etc.), enhancements (i.e. sharpen, blur, image repair, remove red eye, etc.), and/or any other possible image operation.

One example of a text operation may include data extractors. In the context of the present description, a data extractor refers to logic which parses text data, identifying information fragments which can trigger further action. For example, in one embodiment, a data extractor operation may highlight all email addresses in the text inside the operation window. As an option, touching or otherwise selecting a highlighted email address may create a new email message to that address. Other examples of information fragments may include, but are not limited to, phone numbers, contact names, dates, times, addresses, appointments, web addresses, and/or any other information fragment which may be used in a related action. Other examples of text operations may include, but are not limited to, foreign language translation, profanity removal, optical character recognition, and/or any other text operation.

In various embodiments, possible video operations may include, but are not limited to, color adjustment, resolution reduction, sound volume adjustment, text overlay, graphics overlay, and/or any other possible video operation. In one embodiment, image operations may also be applied to video.

In various embodiments, possible audio operations may include, but are not limited to, volume normalization (i.e. softening loud portions, amplifying soft portions), application of equalizer settings, audio effects (i.e. echo, envelope, reverberation, etc.), and/or any other possible audio operation. In one embodiment, audio operations may also be applied to video.

In the context of the present description, a display operation refers to an operation which affects one or more display properties for the display region delineated by the operation window. For example, in one embodiment, a display operation may include adjustment of backlight intensity within the operation window. Other possible display operations may include, but are not limited to, application of power saving backlight profiles (i.e. highlighting only areas of interest, etc.), activation/deactivation of display layer types (i.e. only using e-ink within operation window, etc.), modifying 3D depth cues within operation window, and/or any other possible display operation.

As a specific example of an operation layer in use, see FIG. 67. As shown, a user has selected the "Image" subject matter category from a plurality of categories 6710, and the "Invert" operation from a plurality of operations 6712. As a result, an "Invert" operation has been applied to the contents of operation window 6708.

In one embodiment, a user may apply multiple operations within a single operation window. As an option, the operations may come from different subject matter categories. In another embodiment, certain operations may only be available if certain conditions are satisfied, such as the operation window spanning entire display.

In various embodiments, once the user has selected one or more operations, and has adjusted the operation window to their liking, they may choose to apply the operation. In one embodiment, application of the operation may be elected by selecting a button. See, for example, button 6714.

Upon application, in one embodiment, the operation may modify all the content within the operation window. In another embodiment, application of the operations may create a modified copy of the content within the operation window. In still other embodiments, the user may be prompted to choose between modifying the original and creating a copy. In one embodiment, certain operations perform non-destructive modifications, such as backlighting modifications. In another embodiment, some operations may not make permanent changes, but rather are only useful within the operation layer (i.e. certain text operations, etc.).

In one embodiment, the selected operation(s) may be cancelled and the operation layer hidden by selecting a button. See, for example, button 6716.

In various embodiments, operations may be provided by the operating system. In another embodiment, operations may also be provided by third party developers through applications. As an option, these applications may run in the background of a multitasking environment.

FIG. 68 shows a user interface 6800 for providing touch feedback, in accordance with one embodiment. As an option, the user interface 6800 may be implemented in the context of the architecture and environment of the previous Figures or any subsequent Figure(s). Of course, however, the user interface 6800 may be implemented in any desired environment. The aforementioned definitions may apply during the present description.

In the context of the present description, touch feedback refers to any form of visual feedback given to the user to indicate the location and uncertainty associated with their current or historical contact with a touch-sensitive interaction surface.

In various embodiments, touch feedback may be given to the user in the form of a crosshairs. For example, see FIG. 68.

As shown, user interface 6800 includes a soft keyboard 6802. In the course of interacting with the soft keyboard, the user makes contact with the interaction surface over contact area 6804. In one embodiment, the user may be provided with touch feedback indicating the contact point and uncertainty associated with the recent touch through crosshairs 6806.

In one embodiment of touch feedback, a crosshairs may be used to indicate contact point and/or touch uncertainty. Crosshairs 6806 are shown as across with lines horizontal and vertical. In other embodiments, different forms of crosshairs may be used. Possible forms of crosshairs may include, but are not limited to, lines at 45 degrees to the x-axis and y-axis, a star pattern made of three or more lines and/or any other type of crosshairs.

In various embodiments, the length of one or more lines in the crosshairs may indicate uncertainty associated with that contact event. For example, in one embodiment, the length of the lines may indicate measurement uncertainty along the direction of the line. In another embodiment, the length of one or more lines may indicate the degree of uncertainty associated with other touch-based operations, including, but not limited to, text selection, image selection, control operation, gesture training, gesture recognition, and/or any other type of touch event.

In one embodiment, the described forms of touch feedback may be used in conjunction with any of the forms and methods of feedback in the present description. In another embodiment, these forms of touch feedback may be used with any touch sensitive interaction surface located on any face of a device. In yet another embodiment, touch feedback may be implemented using a 3D layered user interface, placing the feedback display elements on a display layer above other display layers.

FIG. 69 shows a user interface 6900 for providing increased security, in accordance with one embodiment. As an option, the user interface 6900 may be implemented in the context of the architecture and environment of the previous Figures or any subsequent Figure(s). Of course, however, the user interface 6900 may be implemented in any desired environment. The aforementioned definitions may apply during the present description.

In various embodiments, a host device may be capable of being secured with a numeric passcode. Numeric passcodes are easier to remember, but their simplicity and their reliance on a limited keypad make them vulnerable to observers. In various embodiments, a contact pressure on a back interaction surface of the device may serve as an additional input for passcode definition. See, for example, user interface 6900.

As shown, user interface 6900 includes a numeric keypad 6902 for passcode entry. In various embodiments, when a user applies contact pressure on contact area 6904, located on a back interaction surface, the numeric keypad changes. The exemplary interface in FIG. 69 allows for four different sets of numeric keys, differentiated by small dots in the corners of the keys 6906. The addition of a contact pressure component to passcode definition increases security because it is very difficult for an observer to ascertain how much pressure is being exerted by a finger placed on the back of the device.

FIG. 70 shows a user interface 7000 for presenting a contextual menu, in accordance with one embodiment. As an option, the user interface 7000 may be implemented in the context of the architecture and environment of the previous Figures or any subsequent Figure(s). Of course, however, the user interface 7000 may be implemented in any desired environment. The aforementioned definitions may apply during the present description.

As shown, user interface 7000 may be utilized to present a context based menu for the user. In one embodiment, a user may interact with a display element 7002 by exerting contact pressure on a front interaction surface over contact area 7004. At the same time, the user may be in contact with a back interaction surface, over contact area 7006. In various embodiments, contextual menu 7008 may be displayed near the backtouch contact, after the user performs a predefined static gesture within contact area 7004. The user may then select a menu item 7010 using small movements and contact pressure applied on the back interaction surface.

In the various embodiments described above, different combinations of user input have been associated with different actions. It should be understood that the described user inputs may be associated with any action, function, operation or interface, just as the described actions may be triggered by any combination of user inputs, according to different embodiments.

The various embodiments set forth herein may be implemented in a variety of devices including, but not limited to, consumer devices, phones, cell phones, internet phones, music players, video players, cameras, social interaction devices, radios, TVs, watches, personal communication devices, electronic wallets, smart jewelry, personal computers, tablets, laptop computers, embedded systems, electronic glasses, and/or any other device that includes one or more sensors or inputs. Possible inputs may include, but are not limited to, keyboard, mouse, touchscreen(s), touchpad(s), interaction surfaces, a joystick, touchwheel, touchknob, touchbutton, touchball, trackball, scroll wheel, thumb-mouse, switch, button, wheel, knob, ball, pedal, voice recognition, audio command, audio prompt, gaze control, eye tracking, head position sensing, facial and/or gestural and/or postural expression recognition, and/or other inputs and combinations of these. Possible sensors may include, but are not limited to, range sensors, scanners, magnetometers, GPS receivers, accelerometers, cameras, depth sensors, light-field cameras, ambient light sensors, pressure sensors, infra-red (IR) sensors, UV sensors, touch and/or proximity sensor(s), grasp sensors, material sensors, chemical sensors, physical sensors, electrical sensors, biological sensors, weight sensors, force sensors, mass sensors, gas sensors, vapor sensors, particle sensors, wireless sensors, RF and other electromagnetic sensors, and/or other sensors and combinations of these.

In various embodiments, the device may include one or more different forms of displays and/or other outputs including, but not limited to, physical or other actuators, motors, tactile feedback or other tactile output, weight or mass feedback, force feedback or other force outputs, mechanical outputs, audio outputs, alarms, horns, bells, indicators, dials, meters, barcodes and/or other display patterns, vibrations, ultrasonic outputs, wireless and RF outputs, optical and light outputs, avatars, visual outputs, multiscreen displays, multilayer displays, 3D displays, holographic projections and outputs, laser displays and other laser outputs, projection systems, heads-up displays, and/or other outputs or combinations of these.

In various embodiments, the device may support one or more types of applications including, but not limited to, search applications, contacts and/or friends applications, messaging applications, telephone applications, video conferencing applications, e-mail applications, communications applications, voice recognition applications, instant messaging (IM) applications, blog and/or blogging applications, photographic applications, shopping applications, payment applications, digital camera applications, digital video camera applications, web browsing and browser applications, digital music player applications, digital video player applications, cloud applications, office productivity applications, and/or other types of applications or combinations or multiple instances of these.

In other embodiments, different applications on the device may use one or more interface devices that may be physical interface devices or virtual interface devices including, but not limited to, touchscreens, touchpads, soft inputs, hard inputs, keyboards, buttons, knobs, sliders, switches, and/or any other kind of interface device.

In various embodiments, the device may have a common physical architecture (i.e. display, touchscreen, etc.) such that the device may be used with different applications with one or more common user interfaces with one or more common properties (i.e. easy to use, simple, intuitive, transparent, etc.).

In various embodiments, user interfaces may include one or more physical interface devices (i.e. keyboard, joysticks, buttons, sliders, switches, knobs, other hard inputs, etc.) and/or one or more virtual or soft interface devices (i.e. soft keyboard, programmable buttons, UI sliders, UI knobs, check boxes, text fields, other soft inputs, etc.).

In various embodiments, the device may implement one or more types of keyboard (i.e. soft keyboard, physical keyboard, virtual keyboard, keypad, etc.). In one embodiment, the keyboard(s) may include standard keyboard arrangements (i.e. QWERTY configurations, etc.), and/or non-standard arrangements and/or symbols on the keys (i.e. soft keys, buttons, pixels, displayed icons etc.). In another embodiment, the keyboard(s) may include a reduced number of symbols (i.e. letters, icons, soft keys, etc.) compared to the number of keys on a conventional physical keyboard. In yet another embodiment, one or more alternative keyboards may make it easier for users to select one or more symbols in the keyboard, and thus, one or more corresponding representations (i.e. letter, number, special symbol, graphics, emoticon, abbreviation, slang, acronym, etc.). In still another embodiment, one or more keyboards and their associated contents and/or layouts may be modified. For example, in one embodiment, one or more displayed symbols on the keyboard may be modified in accordance with application, application state, device state, settings (i.e. language, etc.), and/or user actions.

In various embodiments, one or more keyboards may be customized to one or more applications and/or users. For example, in one embodiment, one or more keyboard embodiments may be customized to one or more users based on factors including, but not limited to, application states, stored application history, web cookies, a word usage history (i.e. lexicography, slang, individual usage, etc.), language, country, and/or any other factor. In another embodiment, one or more keyboards may be modified to reduce the probability of user error when selecting one or more keys when using the soft keyboards.

In various embodiments, the device may have multiple functions or roles including, but not limited to, telephone, video conferencing, e-mail, instant messaging, blogging, digital photography, digital video, web browsing, digital music playing, social interaction, shopping, searching, and/or any other function or role. As an option, instructions for performing the device functions may be included in a computer readable storage medium, or as a computer program product configured for execution by one or more processors.

In various optional embodiments, the features, capabilities, and/or technology, etc. of the tablets, mobile devices, computing devices, networks, hardware, and/or software, etc. disclosed in the following patents/applications may or may not be incorporated into any of the embodiments disclosed herein: U.S. Pat. No. 7,479,949; U.S. Pat. No. 7,748,634; US20060017692; US20100188268; US20110145692; U.S. Pat. No. 7,954,101; US20070103454; US20100210329; US20070091825; US20060013219; U.S. Pat. No. 7,916,166; US20090213205; US20070296805; US20100205148; US20100188473; U.S. Pat. No. 7,441,196; U.S. Pat. No. 7,894,641; U.S. Pat. No. 7,966,578; U.S. Pat. No. 7,479,949; U.S. Provisional Application No. 61/470,336, filed Mar. 31, 2011, titled "SYSTEM, METHOD, AND COMPUTER PROGRAM PRODUCT FOR UTILIZING IMAGE RECOGNITION TO PERFORM AN ACTION"; U.S. Provisional Application No. 61/470,391, filed Mar. 31, 2011, titled "SYSTEM, METHOD, AND COMPUTER PROGRAM PRODUCT FOR ENABLING A PERIPHERAL DEVICE TO UTILIZE FUNCTIONALITY ASSOCIATED WITH A MOBILE DEVICE"; and U.S. Provisional Application No. 61/569,213, filed Dec. 9, 2011, titled "SYSTEM, METHOD, AND COMPUTER PROGRAM PRODUCT FOR MODIFYING CONTENT." Each of the foregoing patents/applications are hereby incorporated by reference in their entirety for all purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

FIG. 71-1A shows a system 71-1A100 for modifying one or more objects in one or more memory devices, in accordance with one embodiment. As an option, the system 71-1A100 may be implemented in the context of the architecture and environment of any subsequent Figure(s). Of course, however, the system 71-1A100 may be implemented in any desired environment.

As shown, the system 71-1A100 includes one or more memory devices including a non-volatile memory 71-1A102. Additionally, the system 71-1A100 comprises circuitry 71-1A104 including a first communication path 71-1A106 for communicating with at least one processor 71-1A108, and a second communication path 71-1A110 for communicating with at least one storage sub-system 71-1A112 that operates slower than the one or more memory devices 71-1A102. Furthermore, the circuitry 71-1A104 is operable to modify one or more objects in the one or more memory devices 71-1A102.

In the context of the present description, objects may refer to any data, metadata, and/or any other information capable of being stored by the memory devices 71-1A102 and/or the storage sub-system 71-1A112. The memory devices 71-1A102 may include any type of memory device. For example, in one embodiment, the memory devices may include a volatile memory, in addition to the non-volatile memory. In another embodiment, the memory devices 71-1A102 may include hierarchically-organized memory. In one embodiment, the memory devices 71-1A102 may include non-volatile memory and volatile memory organized in a hierarchical manner.

The non-volatile memory may include any type of non-volatile memory such as flash memory (e.g., NAND-type memory, NOR-type memory, etc.). In various embodiments, the memory devices 71-1A102 may include FeRAM, MRAM, and/or PRAM, etc., and/or SRAM, T-RAM, Z-RAM, and/or TTRAM, etc. Further, in one embodiment, the memory devices 71-1A102 may include random access memory (RAM) or dynamic random access memory (DRAM), etc. In various embodiments, the DRAM may take any form including, but not limited to, synchronous DRAM (SDRAM), double data rate synchronous DRAM (DDR SDRAM, DDR2 SDRAM, DDR3 SDRAM, DDR4 SDRAM, etc.), graphics double data rate DRAM (GDDR, GDDR2, GDDR3, etc.), quad data rate DRAM (QDR DRAM), RAMBUS XDR DRAM (XDR DRAM), fast page mode DRAM (FPM DRAM), video DRAM (VDRAM), extended data out DRAM (EDO DRAM), burst EDO RAM (BEDO DRAM), multibank DRAM (MDRAM), synchronous graphics RAM (SGRAM), and/or any other DRAM or similar memory technology.

Additionally, in various embodiments, the system 71-1A100 may include one processor or a plurality off processors. In various embodiments, the processor 71-1A108 may include a central processing unit (CPU), a graphics processing unit (GPU), a microprocessor, and/or any other type of processor.

Furthermore, the circuitry 71-1A104 may include a variety of components and/or be in a variety of configurations. In one embodiment, the circuitry 71-1A104 may be a component of an integrated circuit. Additionally, in one embodiment, the circuitry 71-1A104 may be a component of an integrated circuit including the memory devices 71-1A102 integrated thereon.

Still yet, in various embodiments, the storage sub-system 71-1A112 may include one or more disks. In one embodiment, the storage sub-system 71-1A112 may be less expensive than the memory devices 71-1A102. For example, the cost to purchase and/or build the storage sub-system 71-1A112 may be less than the cost to purchase and/or build the memory devices 71-1A102.

Further, the communication paths 71-1A106 and/or 71-1A110 may include any type of communication path (e.g., a bus, etc.). In one embodiment, the first communication path 71-1A106 and the second communication path 71-1A110 may both be logical communication paths.

In various embodiments, the system 71-1A100 may be in a variety of configurations. For example, in one embodiment, the system 71-1A100 may include a storage sub-system controller 71-1A114. In various embodiments, the storage sub-system controller 71-1A114 may communicate with the storage sub-system 71-1A112, the memory devices 71-1A102, and/or the processor(s) 71-1A108. In one embodiment, the storage sub-system controller 71-1A114 may function to control the storage sub-system 71-1A112.

In one embodiment, the storage sub-system controller 71-1A114 may be indirectly coupled between the circuitry 71-1A104, the communication paths 71-1A106 and 71-1A110, the at least one processor 71-1A108, and/or the one or more memory devices 71-1A102. Further, in one embodiment, the circuitry 71-1A104 and the communication paths 71-1A106 and 71-1A110 may be components of a system including the processor 71-1A108, the memory devices 71-1A102, and the storage sub-system controller 71-1A104, which may be indirectly coupled to the circuitry 71-1A104, with an expander therebetween.

In another embodiment, the circuitry 71-1A104 and the communication paths 71-1A106 and 71-1A110 may be components of a system including the processor 71-1A108, the memory devices 71-1A102, and the storage sub-system controller 71-1A104, which may be directly coupled to the circuitry 71-1A104.

In another embodiment, the circuitry 71-1A104 and the communication paths 71-1A106 and 71-1A110 may be components of a system including the processor 71-1A108, the memory devices 71-1A102, and the storage sub-system controller 71-1A114, and a network interface card to which the circuitry 71-1A104 is coupled. Still yet, in one embodiment, the system 71-1A100 may include a plurality of networked storage accelerator units. In the context of the present description, a storage accelerator unit refers to any storage system device (e.g., systems, subsystems, components, assemblies, units, blocks, modules, etc.) that include memory devices used to improve storage system performance. In one embodiment, the memory devices 71-1A102 may represent a storage accelerator unit.

The circuitry 71-1A104 may be operable to modify one or more objects in the one or more memory devices 71-1A102 in a variety of ways. For example, in one embodiment, the circuitry 71-1A104 may be operable to modify the one or more objects in the one or more memory devices 71-1A102 by writing the one or more objects.

Additionally, in one embodiment, the system 71-1A100 may be operable for identifying at least one property associated with a first one or more objects that is different from at least one property associated with a second one or more objects, and storing the first one or more objects differently from the second one or more objects based on the identification, utilizing a system including a storage accelerator unit.

In another embodiment, the system 71-1A100 or components thereof (e.g., the circuitry 71-1A104, etc.) may be operable for receiving a request from a requestor for one or more objects from a first system and for delivering the one or more objects to the requestor by accessing the one or more objects in a second system. For example, in one embodiment, a mobile phone may send a request to a computer for data objects. In another embodiment, the system 71-1A100 may be operable for writing one or more objects in the one or more memory devices 71-1A102 and subsequently writing the one or more objects from the one or more memory devices 71-1A102 to the storage sub-system 71-1A112 in a sequential manner.

In various embodiments, the system 71-1A100 may be operable for storing one or more objects in the one or more memory devices 71-1A102, utilizing a variety of techniques. For example, in one embodiment, the system 71-1A100 may be operable for storing one or more objects in the one or more memory devices 71-1A102, utilizing a log file.

Additionally, in one embodiment, the system 71-1A100 may be operable for receiving a request for storing one or more objects in the one or more memory devices 71-1A102, storing the one or more objects in the one or more memory devices 71-1A102, in response to the request, and sending the at least one processor 71-1A108 a message relating to the storage of the one or more objects.

Further, in one embodiment, the system 71-1A100 may be operable for storing one or more objects in the one or more memory devices 71-1A102, and backing up the one or more objects in the at least one storage sub-system 71-1A112. In another embodiment, the system 71-1A100 may be operable for storing one or more objects of a user in a first system and making the one or more objects available from a second system, based a location of the user. For example, the one or more objects may be made available from a second system, if the user is within a certain distance from the first system, in an specific region, in a specific country, etc.

In another embodiment, the apparatus may be operable for storing one or more objects in a first system and making the one or more objects available from a second system, based a type of the one or more objects. For example, in one embodiment, an administrator may configure settings indicating the objects (e.g., files, etc.) available to the second device, bas on type. The type may include any category including file type, object size, location of the object, and/or various other criteria.

In another embodiment, the system may be operable for storing data in a plurality of data portions of the one or more memory devices 71-1A102 and storing parity information in at least one parity portion of the one or more memory devices 71-1A102 and further storing additional parity information in at least one of the data portions of the one or more memory devices 71-1A102. In another embodiment, the system 71-1A100 may be operable for identifying at least one parity scheme associated with one or more objects, identifying at least one property, and modifying at least one aspect of the parity scheme, based on the property.

In various embodiments, the property may include at least one property of the one or more objects, a location of the one or more objects, an importance of the one or more objects, a manner in which the one or more objects are stored or retrieved, a number of errors, an error rate, a time-related property, a property of a system in which the one or more objects are stored, at least one property of a storage accelerator unit, and/or various other properties.

Furthermore, the aspect of the parity scheme that is modified may include any aspect of the parity scheme. For example, in one embodiment, the at least one aspect of the parity scheme may include a length of a parity code. In this case, the length of the parity code may be shortened or lengthened.

In another embodiment, the at least one aspect of the parity scheme may include a type of the parity scheme. In another embodiment, modifying at least one aspect of the parity scheme may include changing a first parity scheme to a second parity scheme. In another embodiment, modifying at least one aspect of the parity scheme may include removing a first parity scheme from a second parity scheme.

In another embodiment, the system 71-1A100 may be operable for identifying at least one parity scheme associated with one or more objects and modifying, in-situ, at least one aspect of the parity scheme. In yet another embodiment, the apparatus may be operable for identifying at least one parity scheme associated with one or more objects, identifying at least one map, and modifying at least one aspect of the parity scheme, based on the map. The map may include any map capable of being utilized to modify an aspect of the parity scheme (e.g., by mapping one parity scheme to another, etc.).

In one embodiment, the system 71-1A100 may be operable for identifying a rate of a code associated with one or more objects and modifying the rate of the code. In another embodiment, the system 71-1A100 may be operable for writing one or more objects to the one or more devices utilizing at least one parity scheme that is adjustable. In yet another embodiment, the system 71-1A100 may be operable for monitoring writes and errors associated with the writes, and selecting at least one parity scheme based on the monitoring.

In one embodiment, the system 71-1A100 may be operable for receiving a plurality of responses from a plurality of systems, in response to at least one read signal sent to the plurality of systems and for generating a response to the at least one read signal, based on the plurality of responses from the plurality of systems. Additionally, in one embodiment, the system 71-1A100 may be operable for receiving at least one read signal for a plurality of objects that are stored at each of a plurality of systems and for generating a plurality of read signals for requesting the plurality of objects from the plurality of systems in different order. A variety of configurations and implementations are contemplated, as described herein.

More illustrative information will now be set forth regarding various optional architectures and features with which the foregoing techniques discussed in the context of any of the present or previous figure(s) may or may not be implemented, per the desires of the user. For instance, various optional examples and/or options associated with the configuration of the system 71-1A100, the memory devices 71-1A102, the circuitry 71-1A104, the first and second communication paths 71-1A106 and 71-1A110, the storage sub-system 71-1A112, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

FIG. 71-1B shows a computer system comprising a hierarchical storage system that includes a storage accelerator unit (SAU), in accordance with one embodiment. As an option, the computer system may be implemented in the context of any other Figure(s) or accompanying description(s). Of course, however, the computer system may be implemented in the context of any desired environment.

In FIG. 71-1B, the CPU subsystem (e.g., CPU complex, etc.) comprises a plurality of CPUs (e.g., CPU1, CPU2, . . . , CPUn, etc.). The CPU subsystem is coupled to an input/output virtualization (IOV) function via a CPU bus. The IOV function is coupled to a storage array controller via an IO bus. The storage array controller is connected to a disk subsystem via a storage bus. The storage array controller is connected to a SAU via an SAU bus (SAUB). The hierarchical storage system comprises the storage array controller, the SAU, and the disk subsystem. The IO subsystem comprises the hierarchical storage system and the IOV function.

In one embodiment, each disk (e.g., HDD or SSD etc.) may have its own disk controller. The SAU may also have a controller.

In various embodiments, there may be more than one IOV function in a computer system or the IOV function may be absent or capable of being switched on or off (e.g., enabled/disabled, etc.). The IOV function(s) act to share an I/O resource (e.g., storage system, networking device, etc.) between multiple virtual machines (VMs). The IOV function may be performed using software, hardware, or hybrid approaches (e.g., software plus hardware, etc.). The IOV may comprise software on a chipset, or may reside within the CPU(s), or elsewhere. The IOV function(s) may be provided by separate hardware and/or software technology [e.g., PCI-SIG SR-MY, PCI-SIG MR-IOV, Intel Vanderpool, Intel VT-x, Intel VT-d, AMD IOMMU, IOMMU, AMD Vi, Intel VT-c, Intel Virtualization Technology for Directed I/O, Solaris Device Virtual Memory Access (DVMA), AMD Pacifica, etc.].

Depending on how the IOV function is implemented (e.g., hardware, software, combination, etc.), the CPU(s) may be logically coupled (e.g., via software, drivers, routines, etc.) and/or physically coupled (e.g., via hardware, connectors, buses, chips, controllers, etc.) to the IOV function(s).

In FIG. 71-1B, one or more CPUs may comprise a single die with multiple cores. In various embodiments, one or more of the CPUs may comprise multiple dies. In various embodiments, one or more CPUs may comprise multiple sockets (e.g., each CPU block may contain more than one CPU, etc.). In various embodiments, the CPUs may comprise one or more VMs (e.g., each CPU block may be a VM) or comprise a changing (e.g., variable number, different type, etc.) number of VMs. Each CPU may also comprise one or more VMs (e.g., each CPU block may be one or more VMs). In various embodiments, a single CPU may be utilized or a CPU subsystem/complex such as those described in any embodiment may be utilized.

Other topologies for the system are possible than shown in FIG. 71-1B. For example, in one embodiment, the CPU(s) may connect via a single CPU bus or there may be multiple CPU buses. In one embodiment, the CPU(s) may be similar or different (e.g., one CPU may be a server CPU, another a cell phone CPU, etc.). In one embodiment, the CPUs may be in different locations. In one embodiment, one or more of the CPUs (and/or VMs) may be a client (e.g., user or consumer of storage and/or other services performed by one or more CPUs and/or VMs).

In one embodiment, the CPU bus(es) may be coherent or non-coherent (e.g., with respect to memory access, etc.). In one embodiment, the CPU bus(es) may be a standard (e.g., Intel FSB, Intel QuickPath, Intel QPI, HyperTransport, etc.) or non-standard. In one embodiment, there may be a single IO bus or multiple IO buses. In one embodiment, the CPU(s) may connect or be coupled (e.g., logically connected and/or physically connected, etc.) to the IO bus(es) via one or more chipset(s) and/or IOV function(s).

In one embodiment, there may be a single SAU bus or multiple SAU buses. In one embodiment, the IO bus(es) and SAU bus(es) may use a serial point-to-point topology and bus technology (such as PCI Express, InfiniBand, HyperTransport, QPI, etc.), but may also use a parallel and/or multi-drop topology and bus technology (such as PCI, etc.). In one embodiment, there may be a single storage bus or multiple storage bus(es).

In one embodiment, the storage bus(es) and SAU bus(es) may use a parallel and/or multi-drop topology and bus technology (such as SCSI, etc.), may use a serial point-to-point topology and bus technology (such as SATA, SAS, FC, USB, Light Peak, etc.), or may use a networked protocol (such as iSCSI, FCoE, etc.), or a combination of technologies and/or protocols. In one embodiment, there may be more than one disk controller in the computer system. In one embodiment, there may be more than one SAU in the computer system.

In one embodiment, there may be more than one disk subsystem in the computer system. In one embodiment, there may be more than one IO subsystem in the computer system. In one embodiment, there may be more than one hierarchical storage system in the computer system.

In one embodiment, multiple computer systems may share the IOV function(s), the disk controller(s), the disk subsystem(s), the IO subsystem(s), or the SAU(s). In one embodiment, the various bus technologies used may be standard or proprietary. In one embodiment, each of the bus(es) may comprise a series and/or parallel network of cascaded connections (e.g., connected bus(es), wireless networks, etc.).

In one embodiment, the various bus technologies used may be electrical, optical, wireless, combinations of these and/or other bus, networking, IO technologies, etc. In one embodiment, portions of the computer system may be integrated together in one or more chips or integrated packages. In one embodiment, portions of any of the systems or subsystems (e.g., the computer system(s), IO subsystem(s), hierarchical storage system(s), disk subsystem(s), etc.) may be in different enclosures, in different locations, networked in various ways (e.g., wired, wireless, shared, etc.), coupled logically or physically in different ways, assembled separately, etc.

In various embodiments, the hierarchical storage system configuration may be different than shown in FIG. 71-1B. For example, in various embodiments, the hierarchical storage system(s) may include hard-disk drives, solid-state disk drives, other storage devices such as storage cards (i.e., CF etc.), storage keys (i.e., USB etc.), other forms of storage such as optical storage devices, mechanical storage devices, storage appliances, storage peripherals, PCI-E cards (e.g., Fusion-IO, PCI-E based SSDs, etc.), or combinations of these and/or any type of electronic or other storage device, media, etc.

Many uses for the computer system(s) are possible in the various embodiments, such as in a datacenter, a mass storage system, embedded device, cloud storage, a consumer device, etc. Since storage is widely used in portable electronic devices, the techniques and devices presented here also apply when the computer system(s) or portion(s) of the computer system(s) is a cell phone, PDA, tablet, camera, video camera, portable music player, other portable or consumer electronic device, or similar.

In FIG. 71-1B, the IOV is coupled to a storage array controller. The function of the IOV allows each CPU and/or VM to operate as if it has its own storage array controller. The storage array controller may be coupled to a SAU. The storage array controller is coupled to a disk subsystem. The disk subsystem includes one or more storage devices or disks (e.g., HDD, SSD, etc.). The disk subsystem may be a storage array or any form of storage (e.g., single storage device, storage card(s), USB stick(s), cache, mirrored disks, JBOD array, RAID array, array of arrays, storage network, filer, storage appliance, tiered storage, remote storage, networked storage, cloud storage, back-up service, tape vault, etc.).

In one embodiment, the CPUs may all access (read from and write to) the disk subsystem through the storage array controller. Although each individual CPU may send storage commands sequentially, the IOV function may act as a blender (i.e., mixer, multiplexer, etc.) that may function to randomize (e.g., in time, etc.) the reads from the disk subsystem and writes to the disk subsystem. Random access to the disk subsystem may be much slower than sequential access to the disk subsystem.

FIG. 71-1B shows one embodiment of a hierarchical storage subsystem that contains an SAU. The SAU in the hierarchical storage system acts to increase the performance of the IO subsystem in the computer system by accelerating IO to/from the disk subsystem. In some embodiments, the SAU(s) may for example act to turn random 10 to the disk subsystem(s) into sequential IO (e.g., sequentialize IO, linearize IO, etc.). In other embodiments, the SAU(s) may for example perform other intelligent function(s) to allow faster read and/or write access than normally possible to the disk subsystem(s).

The level of hierarchy in a hierarchical storage subsystem is determined by the logical distance (e.g., latency of access, speed of access, etc.) from the CPU(s). The lower the latency (or faster the access), the higher the level in the storage hierarchy. The SAU is at the first level (e.g., top level, highest level, etc.) of hierarchy because the SAU provides faster access to data than the disk subsystem. The disk subsystem is at the second level (e.g., bottom level, lower level, etc.) of hierarchy because it provides slower access to data than the SAU.

FIG. 71-1B-1 shows another computer system comprising a hierarchical storage system that includes a storage accelerator unit (SAU), in accordance with one embodiment. As an option, the computer system may be implemented in the context of FIG. 71-1B and the accompanying description. Of course, however, the computer system may be implemented in the context of any desired environment.

FIG. 71-1C shows a computer system comprising a hierarchical storage system that includes a storage accelerator unit (SAU) coupled to a CPU, in accordance with one embodiment. As an option, the computer system may be implemented in the context of any other Figure(s) or accompanying description(s). Of course, however, the computer system may be implemented in the context of any desired environment.

The computer system of FIG. 71-1C is similar, but not identical, in structure (e.g., system architecture, etc.) to the computer system shown in FIG. 71-1B. FIG. 71-1C has been simplified from FIG. 71-1B to show the main difference between the computer systems of FIG. 71-1B and FIG. 71-1C. The main difference between FIG. 71-1B and FIG. 71-1C is the connection of the SAU. In FIG. 71-1C the SAU is coupled to the CPU via the IOV function.

In FIG. 71-1C, the computer system comprises a single CPU (CPU1). In FIG. 71-1C, CPU1 is coupled to an input/output virtualization (IOV) function via a CPU bus. The IOV function is coupled to a storage array controller via an IO bus. The storage array controller is connected to a disk subsystem via a storage bus. The storage array controller is connected to a SAU via an SAU bus (SAUB). The hierarchical storage system comprises the storage array controller, the SAU, and the disk subsystem. The IO subsystem comprises the hierarchical storage system and the IOV function.

In one embodiment, the CPU subsystem (e.g., CPU complex, etc.) may comprise a plurality of CPUs (e.g., CPU1, CPU2, . . . , CPUn, etc.).

In one embodiment, the CPU subsystem (e.g., CPU complex, etc.) may be coupled directly to the SAUs (e.g., the IOV may be performed elsewhere (e.g., in the CPU; in another manner, fashion, etc.); the IOV function may be omitted (e.g., not present, etc.); IOV function may be performed by the SAUs; etc.).

In many of the Figures herein the connection (e.g., coupling, etc.) of the SAU(s) may be as shown in FIG. 71-1B (e.g., the SAU(s) may be coupled to the storage array controller(s), etc.). It should be recognized that alternative connection(s) of the SAU(s) are possible in any embodiment described herein including, but not limited to, the connection shown in FIG. 71-1C for example. Of course in various embodiments described herein the bus(es) and arrangement of buses (e.g., their number, architectures, connections, types, etc.) may also be different than that shown in the Figures herein.

In many of the Figures herein the SAU(s) may be connected to one or more other computer system component(s) (e.g., CPU(s), other SAU(s), SAC(s), IOV(s), disk subsystem(s), disk(s), other components not shown, etc.). It should be recognized that alternative connection(s) of the SAU(s) are possible in any embodiment described herein and the SAU bus(es) may be a CPU bus (e.g., Intel QuickPath, HyperTransport, etc.) or may be an IO bus (e.g., PCI Express, USB, Ethernet, etc.) and/or any bus type and/or combination of buses and bus types and/or any combination(s) of connection(s) of one or more bus(es) (e.g., cascade, serial connection, parallel connection(s), combination(s) of series/parallel connection(s), etc.).

In many of the Figures herein the SACs may be connected to one or more other computer system component(s) (e.g., CPU(s), SAU(s), other SAC(s), IOV(s), disk subsystem(s), disk(s), other components not shown, etc.). It should be recognized that alternative connection(s) of the SAU(s) are possible in any embodiment described herein and the SAC bus(es) may be a CPU bus (e.g., Intel QuickPath, HyperTransport, etc.) or may be an IO bus (e.g., PCI Express, USB, Ethernet, etc.) and/or any bus type and/or combination of buses and bus types and/or any combination(s) of connection(s) of one or more bus(es) (e.g., cascade, serial connection, parallel connection(s), combination(s) of series/parallel connection(s), etc.).

FIG. 71-1D shows a computer system comprising a hierarchical storage system that includes a storage accelerator unit coupled inline, in accordance with one embodiment. As an option, the computer system may be implemented in the context of any other Figure(s) or accompanying description(s). Of course, however, the computer system may be implemented in the context of any desired environment.

In one embodiment, the CPU subsystem (e.g., CPU complex, etc.) may comprise a plurality of CPUs (e.g., CPU1, CPU2, . . . , CPUn, etc.).

In one embodiment, the CPU subsystem (e.g., CPU complex, etc.) may be coupled to the SAUs via one or more IOV function(s); the IOV function(s) may be performed by the SAUs; etc.

In one embodiment, the SAU may comprise a plurality of SAUs (e.g., SAU1, SAU2, . . . , SAUn, etc.).

The computer system of FIG. 71-1D is similar, but not identical, in structure (e.g., system architecture, etc.) to the computer system shown in FIG. 71-1C. The main difference between FIG. 71-1C and FIG. 71-1D is the connection of the SAU. In FIG. 71-1D, the SAU is coupled to the CPU directly (with no IOV shown) and inline with the storage array controller (SAC) and the disk subsystem (Disk Subsystem 1) (i.e., the SAU, SAC and disk subsystem are coupled in a series fashion).

In FIG. 71-1D, the computer system comprises a single CPU (CPU1). In FIG. 1D, CPU1 is coupled to an SAU via an IO Bus (IO Bus 1). The hierarchical storage system comprises the SAC, the SAU, and the disk subsystem.

In FIG. 71-1D, the SAC is coupled to a disk subsystem. In many of the Figures herein the disk subsystem is shown as a single disk. It should be recognized that alternative disk subsystems are possible in any embodiment described herein and the disk subsystem may be one or more disks, SSD(s), combination(s) of any type of storage device(s), a group of disks and/or storage device(s) (e.g., JBOD, RAID array, etc.), a hybrid (e.g., combination(s) of solid-state memory and/or storage device(s), etc.), one or more storage systems or subsystems, one or more storage area networks (SANs), network attached storage (NAS), filer(s), direct attached storage (DAS) a group (e.g., collection, array, network, etc.) of any of these, etc.

In FIG. 71-1D, the SAC is coupled to a disk subsystem using a storage bus (e.g., iSCSI, Fibre Channel, SATA, SAS, Ethernet, wireless, optical, etc.), It should be recognized that alternative bus(es) are possible in any embodiment described herein and the disk subsystem(s) may be coupled using any bus type (CPU bus, I/O bus, storage bus, wireless, optical, etc.) and/or combination of buses and bus types and/or any combination(s) of connection(s) of one or more bus(es) (e.g., cascade, serial connection, parallel connection(s), combination(s) of series/parallel connection(s), etc.).

FIG. 71-1E shows a computer system comprising a hierarchical storage system that includes a storage accelerator unit coupled to a CPU and to a disk subsystem, in accordance with one embodiment. As an option, the computer system may be implemented in the context of any other Figure(s) or accompanying description(s). Of course, however, the computer system may be implemented in the context of any desired environment.

The computer system of FIG. 71-1E is similar, but not identical, in structure (e.g., system architecture, etc.) to the computer system shown in FIG. 71-1C. The main difference between FIG. 71-1E and FIG. 71-1C is the connection of the SAU. In FIG. 71-1E, the SAU is coupled to the CPU via IO Bus 1. In FIG. 71-1E the SAU is coupled inline to the CPU (CPU1) and the disk subsystem (Disk Subsystem 1). In FIG. 71-1E, the SAC is coupled to the SAU via IO Bus 2.

In one embodiment, the CPU subsystem (e.g., CPU complex, etc.) may comprise a plurality of CPUs (e.g., CPU1, CPU2, . . . , CPUn, etc.).

In one embodiment, the CPU subsystem (e.g., CPU complex, etc.) may be coupled to the SAUs via one or more IOV function(s); the IOV function(s) may be performed by the SAUs; etc.

In various embodiments, alternative bus(es) and/or bus type(s) and/or arrangement(s) of bus(es) are possible.

FIG. 71-1F shows a computer system comprising a hierarchical storage system that includes a storage accelerator unit coupled to a CPU and a network interface, in accordance with one embodiment. As an option, the computer system may be implemented in the context of any other Figure(s) or accompanying description(s). Of course, however, the computer system may be implemented in the context of any desired environment.

In one embodiment, the CPU subsystem (e.g., CPU complex, etc.) may comprise a plurality of CPUs (e.g., CPU1, CPU2, . . . , CPUn, etc.).

In one embodiment, the CPU subsystem (e.g., CPU complex, etc.) may be coupled to the SAUs via one or more IOV function(s); the IOV function(s) may be performed by the SAUs; etc.

The computer system of FIG. 71-1F is similar, but not identical, in structure (e.g., system architecture, etc.) to the computer system shown in FIG. 71-1E. The main difference between FIG. 71-1F and FIG. 71-1E is the connection of the disk subsystem. In FIG. 71-1F the disk subsystem (Disk Subsystem 1) is coupled to the SAU(s) using a network interface.

In many of the Figures herein the connection of the disk subsystem(s) may be as shown in FIG. 71-1C (e.g., the disk subsystem is connected via a storage bus, etc.). It should be recognized that alternative connection(s) of the disk subsystem(s) (or other parts, portion(s), etc. of the computer system, etc.) are possible in any embodiment described herein including, but not limited to, connection(s) using network(s), as shown in FIG. 71-1F for example.

In any of the various embodiments described herein, connection(s) (e.g., coupling, etc.) of computer system component(s) (e.g., function(s), group(s) of function(s), system block(s), subsystem(s), etc.) may use one or more network(s). In various embodiments, the network(s) may be Ethernet, Fibre Channel, InfiniBand, switched, non-switched, packet-switched, optical, wireless, LAN, WAN, Internet, etc. and/or may employ layered protocol(s), nested protocol(s), combination(s) of these, etc. and/or may be any other network(s) or combination(s) (e.g., cascade, series, parallel, combination(s) of series/parallel, etc.) of network(s) and/or network type(s).

In any of the various embodiments described herein any or all of the computer system component(s) may be connected using network(s) and/or bus(es) and/or combination(s) of network(s) and bus(es), etc.

Of course in various embodiments described herein the bus(es) and arrangement of bus(es) and/or network(s) (e.g., their number, architectures, connections, types, etc.) may also be different than that shown in the Figures herein.

FIG. 71-2 shows a networked hierarchical storage system, in accordance with one embodiment. As an option, the system of FIG. 71-2 may be implemented in the context of any other Figure(s) or accompanying description(s). Of course, however, the system of FIG. 71-2 may be implemented in the context of any desired environment.

In FIG. 71-2, an IOV function (IOV1) is coupled to one or more CPUs (not shown). In one embodiment, the IOV function (IOV1) may be coupled to a storage system (SS1), as described in FIG. 71-1. In FIG. 71-2, storage system SS1 comprises a storage array controller (SAC1), SAU (SAU1), and a disk subsystem (DS1).

Additionally, the IOV (IOV1) may be coupled to a network interface card (NIC), NIC1.

In one embodiment, the IOV function may allow each CPU to operate as if it has its own disk subsystem and/or NIC. In one embodiment, NIC1 may be coupled to a SAU (SAU2). In one embodiment, NIC1 may be coupled to a network N1. The network may be a local area network (LAN) or wide area network (WAN). Alternatively, the network may be a wireless network.

In one embodiment, network N1 may be coupled to one or more NICs In this example, as shown in FIG. 71-2, the network N1 may be coupled to NIC2 and NIC3. Further, in one embodiment, each NIC may be coupled to an SAU. In one embodiment, NIC2 may be coupled to an SAU (e.g., SAU3). Further, NIC3 may be coupled to an SAU (SAU4). In one embodiment, each SAU may perform a different function.

In one embodiment, each NIC may be coupled to a storage system. As shown, NIC2 may be coupled to an SAC (SAC2) and disk subsystem 2 (DS2). Further, NIC3 may be coupled to an SAC (SAC3) and disk subsystem 3 (DS3). Additionally, NIC3 may be coupled to an SAU (SAU5). Still yet, SAC3 may be coupled to an SAU (SAU6). FIG. 2 has been simplified to show just the essential components. For example CPUs and/or VMs as well as any IOV function(s) associated with SAC2/DS2 and SAC3/DS4 have been omitted for clarity.

In various embodiments, the system shown in FIG. 71-2 may be a single computer system (i.e., a single datacenter etc.), a set (e.g., group, cluster, set, etc.) of connected computer systems (i.e., network of datacenters, etc.), a group of client(s)/server(s) (i.e., DS1 could be a storage server and DS2, DS3, etc. could be clients), clients and servers do not have to have the same architecture [i.e., DS1 may be associated with (i.e., part of, etc.) a datacenter while DS2 may be associated with (i.e., part of, etc.) a cell phone and DS3 associated with (i.e., part of, etc.) a tablet PC].

In FIG. 71-2, for example, DS1 may be cloud storage assigned to a user. Further in FIG. 71-2, for example, disk subsystem DS2 may be part of a tablet PC. Also in FIG. 71-2, for example, disk subsystem DS3 may be part of a cell phone. In one embodiment, the storage acceleration function(s) in the system(s) may function to accelerate and/or otherwise improve user access to information (e.g., data and/or metadata, etc.) stored in one or more computer system(s), and/or in the cloud, and/or elsewhere.

Thus, for example, in FIG. 71-2 if the user wishes to access video data (e.g., movie, TV, YouTube, etc.) from a cell phone, all of the SAUs (SAU1-SAU6) in the system may provide functions (individually and/or cooperatively) to improve one or more facets of the access.

In various embodiments, in the case of video data access, the acceleration functions may be utilized to achieve increased speed (e.g., reduced latency and/or increased bandwidth, etc.), improved fidelity (i.e., higher resolution through greater bandwidth, etc.), selectable resolution (i.e., down sampling, upscaling, etc.), transcoding (e.g., mp3 to avi conversion, etc.), and/or search capabilities. For example, the acceleration functions may be utilized to find one or more target(s) [e.g., person(s), object(s), location(s), building(s), car(s), text, photograph(s), event(s), shape(s), sequence(s), caption(s), subtitle(s), score(s), team name(s), credit(s), date(s), name(s), audio (e.g., by title of recorded piece, audio sample, lyrics, instrument, etc.), song(s), music, genre of music, program introductions and endings, commentaries, critique(s), hyperlinks, web page(s), film(s), etc.], and/or image recognition (i.e., switch to game in which a score or other event has occurred, and to recognize, find, and label friends, places, and to perform other image processing and recognition functions, etc.

Still yet, in various embodiments, the acceleration functions may be utilized to skip commercials or otherwise recognize program changes or events, fast forward, pause, slow motion, replay, zoom, rewind, skip forward to markers, insert markers, insert and manipulate picture-in-picture (PIP), perform editing (e.g., splicing, deletion, insertion, copy/paste, etc.), perform touchups (e.g., colorizing, focus, filter, noise reduction, etc.), generate augmented reality (i.e., superimpose maps, multiple video angles, hidden views, etc.), superimpose video and/or still photos, insert commercials, insert sprites (e.g., titles, text, photographs, advertisements, subtitles, tickers, alerts, scores, prices, offers, coupons, search boxes and/or other dialog and control fields, etc.), perform the addition of metadata and/or the retrieval of metadata (e.g., date created, filename, security and/or other privacy settings and/or controls, image content, other information about the data, etc.), and/or various other functions.

FIG. 71-3A shows a method 71-3A300 for storing a first one or more objects differently from a second one or more objects based on the identification, in accordance with one embodiment. As an option, the method 71-3A300 may be implemented in the context of any other Figure(s) or accompanying description(s). Of course, however, the method 71-3A300 may be implemented in the context of any desired environment.

As shown, at least one property associated with a first one or more objects that is different from at least one property associated with a second one or more objects is identified. See operation 71-3A302. Further, the first one or more objects is stored differently from the second one or more objects based on the identification, utilizing a system including a storage accelerator unit. See operation 71-3A304.

The property associated with the first and/or second objects may include any number of properties. For example, in one embodiment, the property associated with the first one or more objects may relate to a current location of the first one or more objects. In another embodiment, the property associated with the first one or more objects may relate to a destination of the first one or more objects. In another embodiment, the property associated with the first one or more objects may relate to time.

In another embodiment, the property associated with the first one or more objects may relate to a time in which the storage accelerator unit has been utilized. In yet another embodiment, the property associated with a first one or more objects may relate to a content associated with the first one or more objects. In another embodiment, the property associated with the first one or more objects may relate to a sampling associated with the first one or more objects. In another embodiment, the property associated with the first one or more objects may relate to a file type associated with the first one or more objects.

Additionally, in one embodiment, the first one or more objects may be stored differently from the second one or more objects in a variety of ways. For example, in one embodiment, the first one or more objects may be stored differently from the second one or more objects by storing the first one or more objects is a different location.

More illustrative information will now be set forth regarding various optional architectures and features with which the foregoing techniques discussed in the context of any of the present or previous figure(s) may or may not be implemented, per the desires of the user. For instance, various optional examples and/or options associated with the identifying of operation 71-3A302, the storing of operation 71-3A304, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

FIG. 71-3B shows a use of a hierarchical storage system, including a write storage accelerator unit, implementing intermediate write commands, in accordance with one embodiment. As an option, the system may be implemented in the context of any other Figure(s) or accompanying description(s). Of course, however, the system may be implemented in the context of any desired environment.

In operation, a CPU (not shown) in a computer system may issue a write command including write data to the IO subsystem. As shown in FIG. 71-3B, the IO subsystem may include a storage array controller (SAC1), a storage accelerator unit (SAU1), a disk subsystem (DS1). As a first step, write data may be written to the SAU1. The write data may then be written from SAU1 to DS1.

In one embodiment, the use of SAU1 may allow write data and/or write commands from the one or more CPUs to be manipulated prior to being written to disk. In one embodiment, the logic to carry out the manipulation may be contained in SAC1. Alternatively or additionally, the logic to carry out the manipulation may be in SAU1.

In various embodiments, data and command manipulation by SAC1 and/or SAU1 may include command manipulation (e.g., reordering, prioritization, arbitration, sequentialization, merging, modification, insertion, creation, deletion, replication, substitution, delaying, etc.) of commands (e.g., write, read, control, status, fence, probe, query, sense, trim, etc.) and/or write data manipulation. For example, in various embodiments, data and command manipulation by SAC1 and/or SAU1 may include the addition of data [e.g., adding data protection code(s), ECC, timestamps or other metadata, fingerprints, watermarks, hash code(s) and/or check(s), search result(s), data properties, etc.], merging (e.g., merging data, combining writes, etc.), modification, transforming (e.g., video transcoding, language translation, binary translation, code morphing, etc.), compression, decompression, deduplication, searching (e.g., for text patterns, binary patterns, virus detection, images, hidden data, watermarks, security codes, numerical values, and/or other codes, etc.), filtering [e.g., based on access control, privileges, data content and/or codes or other mark(s), etc.], concatenation (e.g., joining writes, merging writes, etc.), checking data [e.g., checking and/or correcting data and/or file(s), flagging error(s), providing status, etc.], and/or various other operations.

The logical location of SAU(s) and/or SAC(s) in the system may allow these intelligent acceleration functions involving data manipulation to be performed where they may not otherwise be possible of being performed in other component(s) of the computer system(s). Further examples of data manipulations will be described in the context of subsequent figures.

In one embodiment, write data may be committed when the CPU has been signaled that the data is stored and data retention is guaranteed. In one embodiment, the write data may be committed (i.e., retention guaranteed, etc.) when the write data is written to SAU1 (e.g., before being written to DS1). This may allow the write data to be committed much sooner than when the write data is written to DS1.

In another embodiment, write data may be committed when the data is written to DS1 (e.g., after being written to SAU1). This may permit the guarantee of retention to be much stronger (i.e., a lower probability of data loss, etc.).

In another embodiment, SAU1 may be disabled (e.g., not used, turned off, unavailable, etc.) and write data may be committed when the data is written to DS1. In another embodiment, DS1 may be disabled (e.g., not used, turned off, unavailable, etc.) and write data may be committed when the data is written to SAU1.

In another embodiment, write data may be committed when the data is written to SAU1 and/or to DS1 depending on a commit setting. In various embodiments, the commit setting may be set, fixed or programmable by the user(s), by the computer system(s), or portion(s) of the computer system(s). Additionally, in various embodiments, the commit setting may be dependent on the write data or other data (of the user or other users), and/or determined automatically by the SAU(s) or SAC(s).

Further, in one embodiment, the commit setting may be determined based on an algorithm or algorithms that are function(s) of data or metadata [e.g., write data, write data size, file and/or data importance/value, data type (e.g., X-ray negatives, video, family photos, bank records, etc.), file size, directory name, disk name, partition name, file name, data access pattern(s), recent data access(es) (read and write), date(s) last written, date(s) last accessed, date(s) created, date(s) last backed-up, number(s) of back-up copies, number (s) of replicated copies, RAID level(s), property or properties of disk(s) or disk subsystem(s) (e.g., age, cost, reliability, error rate, service state, service level agreement, etc.), value of write data (or value or other property or properties of other related data), associated transaction size and/or type (e.g., value of goods, purchase price, stock transaction, bank transfer amount, etc.), user priority and/or user profile(s) settings, type and/or function of user (e.g., CEO, CFO, bank manager, student, manager, corporate officer, doctor, stock broker, etc.), corporate or other data retention policy or policies, regulation(s) (e.g., government and/or other regulating authority, etc.), and/or a combination of these and/or any other data or metadata, etc.

Further, in various embodiments, the commit setting may be variable (e.g., adjustable, changing, programmed, variable with time of day, variable with age of data, or other factor, etc.), based on user location or other location-based factor(s), based on system load, based on disk quota(s), based on system capacity, and/or based on system performance factors (e.g., latency, error rate, service dates, etc.), etc.

Additionally, in various embodiments, the commit setting may depend on network constraints or factors (e.g., a network capacity, a past, a current or predicted use or load, a network bandwidth, a network latency, network congestion, etc.), a network type (e.g., low-speed modem, cellular, or wireless connection, high-bandwidth wired connection, etc.), user costs (e.g., storage prices set, contracts in place, etc.) and/or charges (e.g., wireless roaming, local, cable/DSL rates, etc.), location (e.g., of client(s) and/or server(s), etc.), the type, location, nature, etc., of cloud storage provider(s), on a backup policy, on backup or other service provider(s), on a number and type of client machines (e.g., desktop PC, server, cell phone, tablet PC, etc.), user preference(s), and/or the commit setting may depend on any combination of these preceding factors and/or any other factors.

Depending on the availability of SAU(s) and disk subsystem(s), in one embodiment, a commit policy (or set of commit policies) may be used (e.g., constructed, programmed, applied, etc.) that allows default (e.g., fall-back, alternative, etc.) operation(s) to those just described. For example, if the commit setting is set to always write to a target disk subsystem but that particular disk subsystem (or part of the disk subsystem) is disabled or otherwise unavailable, the commit policy may allow a write commit to take place once data is written to one or more storage acceleration unit(s) or to a combination of one or more storage acceleration units and other (i.e., non-target) available disk subsystem(s). The commit policies may be fixed and/or variable and dependent on any or all of the factor(s) described for the commit setting(s).

In one embodiment, the logical location of SAU(s) and/or SAC(s) in the system may allow these intelligent acceleration functions based on commit setting(s) and/or commit policies to be performed where they may not otherwise be possible to perform in other component(s) of the computer system(s).

FIG. 71-4A shows a use of a hierarchical storage system, including a read storage accelerator unit, implementing intermediate read commands, in accordance with one embodiment. As an option, the system may be implemented in the context of any other Figure(s) or accompanying description(s). Of course, however, the system may be implemented in the context of any desired environment.

In FIG. 71-4A, a CPU (not shown) may be coupled to storage array controller SAC1. Additionally, SAC1 may be coupled to a disk subsystem DS1. Further, SAC1 may be coupled to storage accelerator unit SAUL In operation, CPU1 may issue a read command (1) for data block A to the disk subsystem DS1. In one embodiment, the required data (shown as a first copy of data block A in FIG. 71-4A) may reside in the storage accelerator unit SAU1. A second copy of data block A may also reside in DS1.

In the system of FIG. 71-4A, a decision D1 may be made, that data block A is read from SAU1 rather than DS1. There may be several advantages to reading from SAU1 rather than DS1. For example, reading from SAU1 may be faster than reading from DS1, DS1 may be disabled (e.g., disconnected, turned off, or otherwise unavailable, etc.), only SAU1 may contain data block A (e.g., because data block A has not yet been written to DS1), the second copy of data block A in DS1 may be corrupted, and/or any various other advantages.

Additionally, in operation, CPU1 may issue a read command (2) for data block B. If data block B is not resident in SAU1, a decision may be made D2 that data block B is read from DS1.

There may be several advantages to using SAU1 to accelerate reads. This allows, for example, data that is accessed more frequently, or subsets of large files (e.g., movies, etc.) to be kept in SAU1 for faster access.

In the system of FIG. 71-4A, the decisions D1 and D2 may be made using appropriate logic in SAU1 and/or SAC1. The logic to determine which data blocks should be kept in SAU1 may be contained in SAU1 and/or SAC1.

In various embodiments a read policy may allow the reading of data from SAU1 or DS1. The read policy may depend on such factors as already described for commit setting and commit policy, as an example.

The use of SAU1 in FIG. 71-4A allows read data and/or read commands from the one or more CPUs to be manipulated prior to being read from DS1 and/or SAU1. In various embodiments, the logic to carry out the manipulation may be contained in SAU1 and/or SAC1.

Further and alternative embodiments of systems using logic to perform the read command manipulation are described in the context of various other figure(s) herein.

FIG. 71-4B shows a use of a hierarchical storage system implementing acceleration of metadata storage, in accordance with one embodiment. As an option, the system may be implemented in the context of any other Figure(s) or accompanying description(s). Of course, however, the system may be implemented in the context of any desired environment.

In FIG. 71-4B, a CPU (not shown) may be coupled to a storage array controller SAC1. Additionally, SAC1 may be coupled to a storage accelerator unit SAU1. Further, SAC1 may be coupled to a disk subsystem DS1.

In one embodiment, SAU1 may store metadata. For example, SAU1 may store information associated with file sizes, creation dates, file types, keywords, content information, security information, fingerprint information (e.g., hash checks, etc.), précis information (e.g., movie previews, thumbnails, etc.), and/or other preview data and/or metadata, etc.

In one embodiment, a host read command directed to DS1 may be detected (e.g., by address location, etc.) to be an access to metadata. In some cases, metadata may be accessed more frequently (or even instead of) files and file data. SAU1 may complete the read request for metadata faster than would be possible if metadata were stored on DS1.

In one embodiment, metadata may be stored on both SAU1 and DS1. Metadata may be copied from/to DS1 to/from SAU1 as required and/or synchronized from/to DS1 to/from SAU1 as needed.

In various embodiments, the logic to carry out the determination of metadata access, read/write behavior, etc., may be contained in SAU1 and/or SAC1. Alternatively the required logic may be located completely/partly in software (e.g., in an OS, a device driver, in a storage stack, etc.) and completely/partly in hardware (e.g., in either SAC1 or SAU1, etc.).

In various embodiments, the behavior of SAU1 and DS1 (for metadata reads and writes etc.) may be controlled by policies as described previously for a commit policy, for example.

FIG. 71-5A shows a multiple storage accelerator unit storage subsystem including two storage accelerator units contained at the same level of storage subsystem hierarchy, in accordance with one embodiment. As an option, the system may be implemented in the context of any other Figure(s) or accompanying description(s). Of course, however, the system may be implemented in the context of any desired environment.

Within a hierarchical storage system, a storage array controller may be coupled to more than one storage accelerator unit. In one embodiment, each storage accelerator unit device may be in hierarchical level 1, and the disk subsystem(s) in hierarchical level 2.

In FIG. 71-5A, a CPU (not shown) may be coupled to storage array controller SAC1. Additionally, SAC1 may be coupled to a disk subsystem DS1. Further, SAC1 may be coupled to storage accelerator unit SAU1 and storage accelerator unit SAU2.

In various embodiments, each storage accelerator unit may be different. For example, one storage accelerator unit may be single level cell (SLC) flash and the other multi level cell (MLC) flash.

In one embodiment, each storage accelerator unit may use any memory component (or other storage device, etc.), including, for example, DRAM.

In one embodiment, SAU1 and SAU2 may be in different locations, or in different systems, etc. Further, storage accelerator units may be chosen based on various criteria (e.g., speed, latency, cost, power, size, reliability, etc.).

With respect to FIG. 71-5A, in operation, a data block A may be first written (1) to SAU1. Next, the data block A may be written (2) to DS1. Further, the data block A may be written (3) to SAU2.

In one embodiment, the data block A may be written to DS1 first, or in an alternative embodiment (or with different policy setting, etc.) may be written to SAU2 first.

As shown in FIG. 71-5A, the data block A may be read (4) from SAU2. Alternatively, data block A may be read from SAU1 or read from DS1. Thus, firstly either SAU1, SAU2, or DS1 may be the data source. In one embodiment, a read policy, as previously described, and logic in SAU1/SAU2/SAC1 may decide which data source is chosen and what to do if one or more data sources are disabled and/or unavailable.

In one embodiment, a commit setting and/or commit policy, as previously described (e.g., the factors for the commit setting, etc.), may decide how the write of data block A is committed to the CPU.

Data block A may be written to SAU1, SAU2, DS1 or a combination of these data targets. Thirdly, a write policy may decide which of SAU1, SAU2, and DS1 are data targets for CPU reads. The write policy may depend on various factors as described above (e.g., the factors for the commit setting, etc.).

Alternatively, data block A may be evicted (e.g., cleared, cleaned, removed, moved, etc.) from FC1 and stored only in FC2. In this case, data block A may be read from FC2. Fourthly, an eviction policy may decide when and how data is evicted from SAU1, SAU2, or DS1. The eviction policy may depend on various factors as described above (e.g., the factors for the commit setting, etc.).

The functions, programming and performance of the operations associated with (a) read policy (b) commit setting (c) commit policy (d) write policy (e) eviction policy and combinations of these functions may be performed by hardware and/or software in the storage array controller(s), storage accelerator unit(s), or in combinations of these.

FIG. 71-5B shows a method 71-5B500 for delivering one or more objects to a requestor, in accordance with one embodiment. As an option, the method 71-5B500 may be implemented in the context of any other Figure(s) or accompanying description(s). Of course, however, the method 71-5B500 may be implemented in the context of any desired environment.

As shown, a request is received from a requestor for one or more objects from a first system. See operation 71-5B502. Additionally, the one or more objects are delivered to the requestor by accessing the one or more objects in a second system. See operation 71-5B504.

The request may be initiated by any device capable of making a request. For example, in various embodiments, the requestor may include a mobile phone device, a tablet device (e.g., a tablet computer, etc.), a computer, a PDA, cloud storage service, and/or various other devices. Furthermore, in one embodiment, the first system may include a first cloud storage service and the second system may include a second cloud storage service.

In various embodiments, the request may be in different forms. In one embodiment, the request may be in a form readable to a receiving component. In another embodiment, the request may be translated (e.g., utilizing computer code, etc.). For example, in one embodiment, the request may be translated for causing the delivery of the one or more objects to the requestor by accessing the one or more objects in the second system.

In one embodiment, a proxy command may be generated in response to the request. In the context of the present description a proxy command refers to any intermediate and/or alternative command. In one embodiment, a proxy command may be generated in response to the request, for causing the delivery of the one or more objects to the requestor by accessing the one or more objects in the second system. Furthermore, in one embodiment, the one or more objects may be delivered to the requestor by automatically accessing the one or more objects in the second system, in response to the request.

More illustrative information will now be set forth regarding various optional architectures and features with which the foregoing techniques discussed in the context of any of the present or previous figure(s) may or may not be implemented, per the desires of the user. For instance, various optional examples and/or options associated with the receiving of operation 71-5B502, the delivering of operation 71-5B504, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

FIG. 71-5C shows a use of a hierarchical storage system implementing proxy storage acceleration, in accordance with one embodiment. As an option, the system may be implemented in the context of any other Figure(s) or accompanying description(s). Of course, however, the system may be implemented in the context of any desired environment.

In FIG. 71-5C, a disk subsystem D1 may be part of a cloud storage service CS1. Additionally, a tablet PC T1 may be linked to CS1 via wireless link WL2. Further, a cell phone C1 may be linked to T1 via WL3 and to CS1 via WL1.

In operation, a read request #1 may be issued by C1 directed to D1 in CS1 (1). Further, a data response #1 may be completed by D1 in CS1 to T1 (2). Additionally, a data response #2 may be completed by T1 to C1 (3).

In one embodiment, cell phone C1 may use tablet PC T1 as a storage proxy. A read request may be issued by the cell phone to the cloud storage, but by previous arrangement the request is completed (e.g., satisfied, etc.) using a storage proxy. For example, the cell phone read request may result in data first being copied to a tablet PC of a user, a storage proxy, before being copied from the tablet PC to the cell phone.

In various embodiments, the setup, behavior and control of one or more storage proxies may be managed using a read policy and/or a write policy, both as previously described.

FIG. 71-5D shows a use of a system implementing command virtualization and acceleration, in accordance with one embodiment. As an option, the system may be implemented in the context of any other Figure(s) or accompanying description(s). Of course, however, the system may be implemented in the context of any desired environment.

In FIG. 71-5D, three computer systems CS1, CS2, CS3 are coupled each to each other to form a system. The command target refers to the destination for a command (i.e., the place a command is received, etc).

In operation, a command COMMAND#1 (e.g., read, write, status, etc.) may be issued by source CS1 with command target CS3. Further, COMMAND#2 may be issued by source CS1 with command target CS2. Additionally, COMMAND#2 may trigger target CS2 to issue COMMAND#3 with command target CS1.

In one embodiment, COMMAND#2 and COMMAND#3 may be constructed so that their effect is the same as COMMAND#1. The effect is to create a series of commands (COMMAND#2 and COMMAND#3) equivalent to a virtual command COMMAND#1. CS2 may be referred to as a command proxy. As far as CS1 is concerned, a command may have been issued and a response may be received. With the exception that any response may be received from a different computer system (i.e., the completion source may be different from the target, etc.), there may be no difference between the real and virtual commands. In various embodiments, the completion source (and any other data, metadata, command contents, completion contents, etc.) may be hidden, altered, masked, ghosted, translated, etc. so that the results of real and virtual commands may appear identical to the command source.

As an example of a read command sequence using virtual commands, as a first step, CS1 may issue a read command #A to target CS3. As step two, CS3 may receive read command #A from source CS1. CS3 may not respond to CS1 (the source of read command #A). Instead CS3 responds to a proxy (e.g., intermediate, alternative, gateway, etc.) target. Computer system CS2 may be delegated as a proxy (e.g., by programming, by policy, by trigger(s), by event(s), by time, by cost(s), by location(s), etc.). CS3 issues response command #B to CS2. As step three, CS2 may receive a response command #B from source CS2. CS2 acting as a proxy issues a response command #C with target CS1. As step four, CS1 may receive a response command #C from source CS2.

In the above example, the virtual command may include a response command #B and response command #C. Comparing the above example with FIG. 5C, the virtual command corresponds to COMMAND#1, read response #B corresponds to COMMAND#2, and read response #C corresponds to COMMAND#3. In operation, source CS1 was expecting a response (a read completion) from target CS3 but received a response (read completion) from CS2. This difference in completion may be masked if necessary and/or required. Any such completion masking may be performed in various ways depending on the network/bus/technology involved in the commands and their transmission.

For example, in Ethernet/TCP/IP networks completion masking may be performed using a similar method to Network Address Translation (NAT) to mask IP address, IP masquerade, Hide NAT, many-one NAT (PAT), etc. In a storage network using storage protocols and native storage commands completion masking may be performed using manipulation of LUNs (using LUN masking and/or LUN translation for example). In an IO system using protocols such as PCI-E completion masking may use the same techniques that manipulate completer addresses in IO virtualization, for example. Combinations of these and other techniques may also be used to flexibly mask, translate or otherwise manipulate real and virtual commands. In some embodiments, the use of virtual commands may help bypass networks, IO buses, protocols, etc. that cannot support completion masking if it is required.

As an example of the use of an embodiment just described, CS1 may be a cell phone belonging to User X, CS2 may be a tablet PC belonging to User Y, CS3 may be a service providing email for X and Y who work at the same company, for example. Users X and Y may be on a business trip and user X may wish to download an email with a large PowerPoint attachment. User X CS1 may send a read request to CS3 (e.g., Step 1 above). Computer system CS3 may recognize that User Y has already downloaded the email and/or the large PowerPoint to his/her tablet PC CS2. Computer system CS3 may delegate CS2 as a proxy. CS3 may forward the read request to tablet PC CS2 (e.g., Step 2 above). Tablet PC CS2 may receive the request from CS3 and may issue a response to CS1 (e.g., Step 3 above). User X and cell phone CS1 may receive the response with email and PowerPoint (e.g., Step 4 above).

In one embodiment, virtual commands may be utilized to add flexibility. For example, in variations of the preceding example CS3 may add the email requested by User X if it was not already downloaded by User Y. This may be done in various ways. For example, extra read responses to CS1 may be created containing the email (either by virtual or real commands). Alternatively, the email may be added with the read request forwarded to CS2 (either together or separately, etc.). Other techniques may be used depending on the constraints of system(s), system(s) software, data sizes involved, nature of commands, etc.

In the context of the present description, data target of a command refers to the data source that the command is expecting to read from or the data target that the command is expecting to write to (and similarly for other types of commands). The data target of a command may not necessarily be the same as the command target.

As an example of a write command sequence using virtual commands, as a first step, CS1 may issue a write command #A with proxy command target CS2 and data target CS3. As a second step, CS2 may receive write command #A from source CS1. CS2 may not respond to CS1 (the source of write command #A). Instead, CS2 may forward the command to the data target CS3 and may issue write command #B with target (command and data) CS3.

As a third step, CS3 may receive write command #B from source CS2. CS3 may perform the data write. As an example of the use of the embodiment just described, in one case, CS3 may be unable to perform the task required by write command

A if it were issued directly (i.e., with command and target of CS3). Using a virtual command allows CS2 to perform some function that CS3 cannot (e.g., deduplication, compression, decryption, etc.).

In various embodiments, the handling (e.g., creation, transmission, reception, implementation, etc.) of commands with possibly different command and data targets may be implemented in various ways. In order to avoid changing standard command structures, sources and targets may be programmed to intercept and modify some or all commands for specific targets. Thus, in the above example, CS2 may be programmed to recognize a specific LUN (or other data field, etc.) in a write command as an indication to forward those commands to CS3. In other embodiments, fields may be added to existing commands in a wrapper (e.g., in a packet structure, or by extending packets, extending command length(s), etc.). Alternatively, the effect of virtual commands may be created by modifying command structures, repurposing existing command fields, or using existing command structures.

The embodiment and variations just described are a more general version of proxy storage acceleration. In other embodiments, there may be more complex chains of computer systems involved in command virtualization, as the proxy chain. The proxy chain may be static (i.e., fixed, pre-programmed, etc.) or dynamic (e.g., changing, variable, etc.). A dynamic proxy chain may be configured based on factors such as command type, data size or type requested (for reads) or transmitted (for writes), etc.

In one embodiment, the system shown in FIG. 71-5D may be a storage system. Furthermore, in one embodiment, the commands shown in the embodiment of FIG. 71-5D may include storage commands.

In various embodiments, the setup, behavior and control of command virtualization may be managed using a read policy and/or a write policy, both as previously described.

FIG. 71-6 shows a hierarchical storage system implementing a method for sequentializing write commands from a plurality of CPUs, in accordance with one embodiment. As an option, the system may be implemented in the context of any other Figure(s) or accompanying description(s). Of course, however, the system may be implemented in the context of any desired environment.

As shown in FIG. 71-6, a plurality of CPUs (CPU1, CPU2, . . . , CPUn) may be coupled to a storage array controller SAC1. Additionally, SAC1 may be coupled to a storage accelerator unit SAU1. Further, SAC1 may be coupled to a disk subsystem DS1. In one embodiment, the plurality of CPUs may be coupled to SAC1 through IOV function(s) (e.g., as described previously). In one embodiment, the IOV function(s) may be included in the plurality of CPUs.

In various embodiments, the storage accelerator unit SAU1 may comprise one or more storage accelerator subunits. In one embodiment, each storage accelerator subunit may use a different type of memory component.

The plurality of CPUs may access (e.g., read from and write to, etc.) the disk subsystem DS1 through the storage array controller SAC1. Although each individual CPU may send host commands sequentially, the IOV function(s) may function as a blender (e.g., mixer, etc.) that effectively randomizes the disk commands (e.g., including reads and writes, etc.) in time. Even without an IOV function, sequential host commands may be randomized by the time they reach the IO subsystem as disk commands.

For example, in FIG. 71-6, host write commands may be issued from various CPUs to the hierarchical storage subsystem. In FIG. 71-6, seven such host write commands (1-7) are issued from three CPUs. CPU1 may issue two sequential host write commands (1, 2, 6); CPU2 may issue two sequential host write commands (2, 7); and CPU3 may issue two sequential host write commands (3, 5).

In operation, the seven host write commands may arrive at SAU1 in the following order: CPU1, CPU1, CPU3, CPU2, CPU3, CPU1, CPU2. These host commands may then be transmitted as disk commands in the same order. The sequential host write commands have thus been randomized (e.g., jumbled, out-of-order, etc.)

The disk write commands may be sequentialized. In one embodiment, the sequentialization may be performed by logic contained in SAU1 and/or SAC1. For example, in FIG. 71-6, sequentialization may be performed by SAU1. In FIG. 71-6, data block(s) A represent data written from each of three CPUs, numbered consistent with the CPU from which they came.

In one embodiment, SAU1 may write the entire data block(s) A (e.g., by concatenating data and merging host write commands, etc.) to DS1 (represented by data blocks B in DS1). One advantage of sequentialization is that a single (or series of sequential) disk write(s) to DS1 may be faster than a series of random disk writes to DS1.

In one embodiment, the write data may be stored in DS1 in locations different from where the CPU that issued the write command allocated. As an option, a map may be created and stored in SAU1 to map (e.g., convert, etc.) the host write commands and data locations (with associated host block address, HBA) to the disk write commands and data locations in DS1 (e.g., with associated array block address, ABA, etc.).

In one embodiment, a write commit may be transmitted to the CPU after a block of data is stored in the SAU. Alternatively the write commit may not be made until the data is on DS1. Other alternatives are possible in various other embodiments (e.g., setting a threshold on the number of writes before a commit is made, setting a threshold on write data size before a commit is made, different commit policies for different data types, etc.). Commit settings and/or commit policies and/or a sequentialization policy may be used to control sequentialization and storage behavior, as previously described. The sequentialization policy may depend on various factors (as described previously for the commit setting for example).

FIG. 71-7 shows a hierarchical storage system implementing a method for sequentializing write commands from a plurality of CPUs, in accordance with one embodiment. As an option, the system and/or method may be implemented in the context of any other Figure(s) or accompanying description(s). Of course, however, the system and/or method may be implemented in the context of any desired environment.

As shown in FIG. 71-7, a plurality of CPUs (CPU1, CPU2, . . . , CPUn) may be coupled to a storage array controller SAC1. SAC1 may be coupled to a storage accelerator unit SAU1. SAC1 may be coupled to disk subsystems DS1, DS2 and DS3. In one embodiment, the plurality of CPUs may be coupled to SAC1 through IOV functions (e.g., the IOV function(s) may be contained in the plurality of CPUs, etc.). In one embodiment, disk subsystems DS1, DS2, and DS3 may be in different geographic locations. In various embodiments, there may be any number of disk subsystems.

In operation, sequential host writes (1-7) may be randomized. The write data may be arranged (e.g., data arrangement, sorted, manipulated using linked lists, re-ordered, merged, combined, etc.) so that certain data is written to a particular disk as a block or blocks. In various embodiments, the logic to accomplish the data arrangement may be in SAU1 and/or SAC1. The data written from CPU1 may be written to DS1, the data written from CPU2 may be written to DS2, and the data from CPU3 may be written to DS3. In other embodiments, data from any CPU may be written to any disk subsystem in the hierarchical storage subsystem.

In one embodiment, the write data may be stored in (e.g., written to, committed to, etc.) one or more locations that are different from the location(s) that were allocated by the CPU that issued the write command. As an option, a map may be created to associate the CPU host write command locations to the locations in the disk subsystem(s). The map may be created and stored in SAU1, for example. Thus, the target disk subsystem may be mapped to one or more virtual targets. A target policy may be used to determine the SAU behavior and control the target mapping function(s). The target policy may depend on various factors as described above for the commit setting for example.

FIG. 71-8 shows a hierarchical storage system integrated with the operating system, implementing a method of prioritizing files and data, in accordance with one embodiment. As an option, the system and/or method may be implemented in the context of any other Figure(s) or accompanying description(s). Of course, however, the system and/or method may be implemented in the context of any desired environment.

As shown in FIG. 71-8, a CPU is coupled to a storage array controller SAC1. In one embodiment, CPU1 may include an operating system (OS) associated with a storage stack, SS1. Additionally, SAC1 may be coupled to a storage accelerator unit SAU1. Further, SAC1 may be coupled to a disk subsystem DS1. In one embodiment, host write commands (1) may be directed to target SAU1. In another embodiment, host write commands (2) may be directed to target DS1.

In the context of the present description, a hot file refers to a file that is written and/or read at least a threshold number of times within a given time period. Further, in the context of the present description, cold files refer to files that are not hot. Hot files are frequently accessed and it may be advantageous to keep hot files in SAU1 for faster access, for example.

At the bottom of the storage stack at the level that host write commands (1 and 2) are issued to an IO subsystem, the host write commands may include addresses and write data but little other information. At this level there may be no notion of files. The storage stack or host write commands may thus provide little or no information to help determine whether files (or data) are hot or cold.

In one embodiment, SAC1 may decide D1 (e.g., determine, etc.) which of the host write commands correspond to hot files and which commands correspond to cold files. As a result of this decision D1, the host write commands may be directed to SAU1 or DS1 using a filter. In one embodiment, hot files may be written to SAU1 and cold files may be written to DS1.

In one embodiment, a file temperature policy may determine the behavior of the SAC filter. The file temperature policy may depend on various factors (e.g., as described above with respect to the commit setting, etc.).

In various embodiments, behavior at the file level may be monitored (e.g., detected, determined, etc.) in addition to or instead of behavior at the data level. In some cases, it is harder to detect hot file activity at the bottom of the storage stack than to detect hot data. Thus, just as hot files and cold files are detected, hot data and cold data may be detected. Data written to specific locations (e.g., file tables in a filesystem, etc.) may also be detected as metadata (e.g., filenames, dates accessed, access controls, etc.).

In one embodiment, operations (e.g., acceleration, filtering, etc.) may be performed based on object temperature for any object (e.g., files, data, metadata, disks, LUNs, partitions, etc.). In any embodiment that detects hot file activity, the temperature of other objects may be detected (e.g., hot data activity, hot metadata activity, etc.). In such embodiments that determine multiple object activity, there may be separate object temperature policies for different objects or groups of objects. In an alternative embodiment, host read commands may be used to determine object temperature (e.g., for files, data, etc.).

Additionally, in one embodiment, host write commands and host read commands may be used to determine object temperature (e.g., for files, data, etc.). An object temperature policy may be used to weight various commands to determine operations (e.g., acceleration(s) to be performed, target storage location(s), filter operation(s), etc.).

In one embodiment, other host commands may be used in addition to or instead of host read commands and/or host write commands to determine object temperature. For example, repetitive trim commands to an SSD may indicate hot objects (e.g., data, files, metadata, etc.), repeated status (e.g., query, etc.) commands may indicate hot objects, and repeated format or label commands may indicate hot partitions, hot LUNs, or hot disks, etc.

In various embodiments, various criteria may be used to determine hot and cold files or data. For example, in one embodiment, a hot file may be one of a certain size. In another embodiment, a hot file may contain a recognized pattern of data (e.g., known pattern, programmed pattern, heuristically determined, etc.). In another embodiment, a hot file may be located in or near a certain address or address range (e.g., determined using host block address HBA or array block address ABA for example, etc.) already known to be hot. In one embodiment, a hot file may have a tag [e.g., data or metadata set by the user(s), set by portion(s) of the computer system, set by application program(s), set by OS, etc.].

Alternatively, a hot file may have some other characteristic or attribute that allows it to be identified as such. In various embodiments, hot data may be determined from host commands [e.g., command content(s): reads, writes, data, address, etc.], by pattern matching (e.g., of data, of addresses, etc.), by frequent commands to the same address (e.g., including over-writing data in successive commands, multiple reads, etc.), by recognition of command patterns (e.g., write data size, read frequency, etc.), by combinations of these to recognize which applications are reading and/or writing, and/or by other factors.

In one embodiment, the logic to monitor the host read and write commands and determine, for example, which files are hot and which are cold, may be on SAC1. In another embodiment, the logic to determine, for example, which files are hot and which are cold may be on SAU1.

In one embodiment, all blocks may be first written to SAU1, and the logic to determine which files are hot and which are cold, for example, may be on SAU1. In one embodiment, hot objects may remain on SAU1, while cold objects may be written to DS1.

In one embodiment, a decision D1 may be made that blocks (A-C) belong to a hot file F1. Suppose file F1 comprises blocks (A-G). As a result of D1, the remaining blocks (D-G) may be copied (e.g., moved, transferred, etc.) to SAU1. In other embodiments other operations may be performed (e.g., all files in the same directory as F1 may be copied to the SAU preemptively, etc.).

In one embodiment, additional software in the storage stack may determine hot and cold files (e.g., a software filter, etc.). In another embodiment, hardware and software may determine hot and cold files (e.g., a hybrid filter, etc.).

In one embodiment, the file table in the file system may be used. For example, the address may be reversed to determine the filename. Additionally, a list of hot files may be stored.

In one embodiment, a temperature policy may be used to modify a read policy (e.g., determine where files are located to accelerate reads, etc.). In one embodiment, a temperature policy may be implemented in combination with a commit setting/commit policy and write policy [e.g., how and where hot files/data (and thus cold files/data) are written, etc.).

In one embodiment, prioritization (or other operation, manipulation, filtering, etc.) does not have to be based on a hot/cold classification. Other criteria (e.g., for classification, for selection, etc.) for prioritization may be used. Examples may include, but are not limited to, the process writing the data, a target disk subsystem, system load, nature of data, value of data, etc.

In one embodiment, prioritization may be under the control of a prioritization policy. In one embodiment, the temperature policy may be part of the prioritization policy.

FIG. 71-9A shows a method 71-9A900 for storing one or more objects in a system including a storage accelerator unit, in accordance with one embodiment. As an option, the method may be implemented in the context of any other Figure(s) or accompanying description(s). Of course, however, the method may be implemented in the context of any desired environment.

As shown, a log file is stored. See operation 71-9A902. Additionally, one or more objects are stored in a system including a storage accelerator unit, utilizing the log file. See operation 71-9A904.

In one embodiment, the method 71-9A900 may further include performing an undo operation involving the one or more objects in the system including the storage accelerator unit, utilizing the log file. Further, in one embodiment, a rewind operation involving the one or more objects in the system including the storage accelerator unit may be capable of being performed, utilizing the log file. Still yet, in one embodiment, a repeat operation involving the one or more objects in the system including the storage accelerator unit may be capable of being performed, utilizing the log file.

More illustrative information will now be set forth regarding various optional architectures and features with which the foregoing techniques discussed in the context of any of the present or previous figure(s) may or may not be implemented, per the desires of the user. For instance, various optional examples and/or options associated with the storing of operation 71-9A902, the log file of operation 71-9A904, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

FIG. 71-9B shows a hierarchical storage system implementing a method of logging transactions between a CPU and the hierarchical storage system, in accordance with one embodiment. As an option, the system and/or method may be implemented in the context of any other Figure(s) or accompanying description(s). Of course, however, the system and/or method may be implemented in the context of any desired environment.

As shown in FIG. 71-9B, a CPU may be coupled to a storage array controller SAC1. Additionally, SAC1 may be coupled to a storage accelerator unit SAU1. Further, SAC1 may be coupled to a disk subsystem DS1.

In one embodiment, a list of disk transactions (e.g., the result of performing one or more host write commands, a list of host write commands, etc.) may be written (1) to a log file on SAU1. In FIG. 71-9B, disk transactions are X1, X2, X3 and may be written to data block A in SAU1. The result(s) of the disk transaction(s) may be written (2) periodically to data block(s) B on DS1.

In one embodiment, SAU1 may map host block addresses (HBAs) to array block addresses (ABAs). Additionally, in one embodiment, each disk transaction may correspond to a single write command. Further, in one embodiment, each transaction may correspond to more than one write command (e.g., SAU1 may merge write commands, etc.). Still yet, in one embodiment, a log file or multiple log files may be used together with (e.g., in conjunction, as part of, etc.) any of the embodiments described here that perform other read and/or write acceleration function(s) (e.g., read acceleration, write acceleration, write sequentialization, file prioritization, other acceleration function(s), etc.).

In various embodiments, there may be multiple log files for each CPU or VM, multiple log files for each disk in a disk subsystem, multiple log files for each target disk subsystem, and/or multiple log files for each virtual target disk subsystem.

In another embodiment, the log file(s) may be used to manipulate disk transactions (e.g., rewind, retract, reverse, replay transactions, otherwise alter or manipulate transactions, etc.). For example, if there is a failure in DS1, the data on DS1 may be replicated (e.g., reconstructed, recreated, revived, etc.) using the log file. In another embodiment, the log file(s) may be used to write data (e.g., complete files, portion(s) of data, a fixed size or threshold of data, etc.) to DS1 at certain times (e.g., set or fixed times, varying times, periodically written, flushed on command, other manual or automated triggers based on time/data size or other factor(s), etc.). In one embodiment, a flush policy may determine the behavior of the SAU and log file(s). The flush policy may depend on various factors (e.g., as described above for the commit setting, etc.).

FIG. 71-10 shows a method of replaying transactions from a log file, in accordance with one environment. As an option, the method may be implemented in the context of any other Figure(s) or accompanying description(s). Of course, however, the method may be implemented in the context of any desired environment.

In operation, a series of seven disk transactions (x1-x7) may be written to a log file. A disk transaction may include one or more host disk commands. Accordingly, the terms host disk commands and disk transactions will be used carefully and a distinction will be maintained between the two terms.

In one embodiment, the result(s) of disk transaction(s) may be written out periodically to a disk subsystem. As shown in FIG. 71-10, at one point in time (t1), the first 5 disk transactions may be chosen to be completed on the disk. At time t2, disk transactions x4 and x5 may be undone, setting the disk back to the state it would have been in if only disk transactions x1, x2, and x3 were carried out. At time t3, x4 and x5 are replayed and x6 is also completed.

In one embodiment, these manipulations may be used to undo (e.g., replay, retract, unwind, etc.) unwanted changes. In one embodiment, these transaction manipulations may be made directly on the disk. Alternatively, these transaction manipulations may be made only to copies of what is on the disk.

In another embodiment, a log file may be kept and manipulated on the SAU. In another embodiment, the log file may be kept on a disk and manipulated by the SAC. In another embodiment, the log file may be kept on the SAU and manipulated by the SAC. In another embodiment, the log file may be kept on the SAU and manipulated by a computer system.

Still yet, in one embodiment, multiple log files may be used to manipulate transactions.

In one embodiment, log file(s) may be used together with (e.g., in conjunction, as part of, etc.) any of the embodiments described here that perform other read and/or write acceleration function(s) (e.g., read acceleration, write acceleration, write sequentialization, file prioritization, other acceleration function(s), etc.).

Further, in one embodiment, a transaction policy may maintain control over ability to replay transactions, a depth of transaction replay (e.g., number of transactions that may be replayed, etc.), and/or correspondence between host disk commands and transactions (e.g., how many disk commands per transaction, etc.).

FIG. 71-11A shows a method 71-11A1100 for sending at least one processor a message relating to the storage of the one or more objects in the system including a storage accelerator unit, in accordance with one embodiment. As an option, the method 71-11A1100 may be implemented in the context of any other Figure(s) or accompanying description(s). Of course, however, the method 71-11A1100 may be implemented in the context of any desired environment.

As shown, a request for storing one or more objects in a system including a storage accelerator unit is received. See operation 71-11A1102. Additionally, the one or more objects is stored in the system including the storage accelerator unit, in response to the request. See operation 71-11A1104. Further, at least one processor is sent a message relating to the storage of the one or more objects in the system including the storage accelerator unit. See operation 71-11A1106.

In various embodiments, the processor(s) may include any type of processor including a central processing unit, a graphics processing unit, a microprocessor, and/or any other type of processor. In one embodiment, the request may be prompted by the at least one processor. Additionally, in one embodiment, the request may originate at the at least one processor.

Further, in one embodiment, the message may include a guarantee that the one or more objects have been stored in the system including the storage accelerator unit. In one embodiment, the guarantee may be in the form of an acknowledgement.

For example, in one embodiment, the message may include a confirmation that the one or more objects have been stored in the system including the storage accelerator unit. In one embodiment, the message may include an acknowledgement that the one or more objects have been stored in the system including the storage accelerator unit.

The message may include any message relating to the storage of the one or more objects in the system. In one embodiment, the message may include a commit message. In the context of the present description, a commit message refers to any message capable of indicating that one or more objects are to be committed to a device (e.g., a processor, memory, etc.).

In one embodiment, the storage accelerator unit may be capable of manipulating the one or more objects. Additionally, in one embodiment, the one or more objects may be capable of being replicated in at least one storage sub-system.

More illustrative information will now be set forth regarding various optional architectures and features with which the foregoing techniques discussed in the context of any of the present or previous figure(s) may or may not be implemented, per the desires of the user. For instance, various optional examples and/or options associated with the receiving of operation 71-11A1102, the storing of operation 71-11A1104, and the sending of operation 71-11A1106, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

FIG. 71-11B shows a hierarchical storage subsystem implementing a method for committing and replicating data, in accordance with one embodiment. As an option, the system and/or method may be implemented in the context of any other Figure(s) or accompanying description(s). Of course, however, the system and/or method may be implemented in the context of any desired environment.

As shown in FIG. 71-11B, a CPU may be coupled to a storage array controller SAC1. Additionally, SAC1 may be coupled to a storage accelerator unit SAU1. Further, SAC1 may be coupled to a plurality of disk subsystems comprising: DS1, DS2, DS3. In one embodiment, the CPU may be coupled to SAC1 through IOV functions (e.g., the IOV function(s) may be contained in the CPU, etc.). In one embodiment, disk subsystems DS1, DS2, and DS3 may be in different geographic locations. In various embodiments, there may be any number of disk subsystems and any number of CPUs, etc.

As shown in FIG. 71-11B, block(s) of data A may be written (1) to SAU1. Further, SAU1 may commit the write to the CPU. The block(s) of data A may then be replicated (e.g., copied, written, duplicated, moved, transferred, etc.) and written to one or more disks (e.g., in FIG. 71-11B, block(s) A may be replicated to block(s) B on DS1, to block(s) C on DS2, and to block(s) D on DS3).

In various embodiments, the functions of replicating, writing and any other data manipulation may be performed by SAU1. In various embodiments, the functions of replicating, writing and any other data manipulation may be performed by SAC1, by SAC1 and SAU1 in combination, by a CPU (or CPUs and/or VMs), by software (e.g., OS, device driver, storage stack, etc.), or by combinations of these, etc.

In one embodiment, any or all of disk subsystems DS1, DS2, DS3 may be in a different computer system. Additionally, in one embodiment, one or more of the disk subsystems may be remote (e.g., a series of LAN-networked disks, part of a storage network, part of a cloud storage array, etc.).

In various embodiments, the block(s) of data A in SAU1 may be replicated (e.g., copied, written, duplicated, moved, transferred, etc.) to the plurality of disk subsystems in various manners (e.g., simultaneously, synchronously, asynchronously, concurrently, in parallel, sequentially, automated, autonomously, manually, etc.). The method of replication (e.g., a copy versus a move, etc.) and manner of replication (e.g., parallel versus sequential) may be different for any or all of the disk subsystems. For example, a group 1 (e.g., set, number, plurality, etc.) of disk subsystems may use a move while another group 2 of disk subsystems uses a copy, and/or a group 3 (not necessarily the same as group 1 or group 2) of disk subsystems may be updated in parallel while another group 4 may be updated in a serial manner, etc.

In various embodiments, the block(s) of data A may be written to different disk subsystems at different times. The times may be controlled (e.g., fixed, variable, programmed, dependent on events, staggered, etc.).

In various embodiments, the block(s) of data A may be written to different disk subsystems with additional processing. For example, writes to a group C of disk subsystems may be compressed, while writes to a group D of disk subsystems may be deduplicated. In various embodiments, groups C and D may or may not overlap.

In various embodiments, the additional processing may be of any form, such as deduplication, duplication, compression, decompression, transcoding (e.g., video, audio, etc.), encryption, decryption, searching, scanning, indexing, keyword creation, keyword insertion, keyword detection, preview creation, preview recognition, preview insertion, thumbnail creation, thumbnail recognition, thumbnail insertion, pattern recognition, image recognition, audio recognition, video recognition, watermark insertion, detection/creation/insertion/deletion of security code(s), format conversion, endian conversion, language (e.g., spoken, written, computer) recognition, language (e.g., spoken, written, computer) conversion, language (e.g., spoken, written, computer) translation, binary conversion, detection/correction of data and/or file error(s), deliberate insertion of file and/or data error(s), coding, decoding, detection/creation and/or insertion/deletion of parity or other check bit(s), detection/creation and/or insertion/deletion of hash codes (e.g., MD4, MD5, SHA-1, SHA-2, etc.), detection/creation and/or insertion/deletion of file fingerprints, detection/creation and/or insertion/deletion of data and/or metadata, and/or script execution, etc.

In one embodiment, the nature (e.g., time, type, algorithm, function, parameters, agent performing the processing, etc.) and manner of the additional processing may be controlled (e.g., fixed, variable, programmed, dependent on events, dependent on data and/or file type, staggered, etc.). In various embodiments, the block(s) of data A may be written to different numbers of disk subsystems (e.g., 2 of 3 disk subsystems, etc.). In one embodiment, the number and location of copies made may depend on the type and importance of data. Any factor(s) may be used such as data size, file type, disk subsystem location, and/or the factors previously described (e.g., in the context of commit setting).

In various embodiments, the block(s) of data A may be written to disk subsystems with other data and/or metadata (e.g., timestamps, number of copies made, previews, keywords, other metadata, etc.). This may be implemented for the current embodiment, previous embodiments, and any subsequent embodiment.

As an example of the use of an embodiment just described, some SSD controllers perform deduplication to reduce write amplification. Some filesystems duplicate critical information held on a disk to increase the probability of successful filesystem reconstruction on system failure. An SSD controller may then unknowingly remove this redundancy through deduplication and thus increase the chance of filesystem loss. A disk subsystem containing SSDs with this problem may use the previously described embodiment to automatically detect and salt critical filesystem information. Salting data adds random data (but of known format and thus reversible) in order to prevent deduplication. The salt may be a random number, nonce (number used once), etc.

As another example, MD5 hash codes are still widely used to fingerprint files even though MD5 hash codes has been proven insecure. Using a just described embodiment, a computer system may automatically insert (or substitute, etc.) stronger hash codes (e.g., SHA-2, etc.) without change to the OS or rest of the computer system.

As another example, it is very difficult to test reliable computer systems for robustness. An increasing trend is the use of a large highly redundant array of unreliable inexpensive computer (RAIC) systems to create a reliable system RS. The inexpensive computer systems typically used do not have advanced error injection, testing and reporting features (e.g., reliability, availability and serviceability or RAS features, etc.). Using the techniques described in the context of the current embodiment, errors may be deliberately introduced (e.g., injected, forced, created, etc.) and/or removed (e.g., detected, corrected, deleted, erased, etc.) to/from a data set in a controlled manner in order to test the reliability and robustness of RAIC system(s).

In the various embodiments, examples, and implementations just described, the behavior of commit and replication may be under control of a replication policy and/or a commit setting and/or other policies. The replication policy may depend on various factors as described above for the commit setting.

FIG. 71-12A shows a method 71-12A1200 for backing up one or more objects in at least one storage sub-system, in accordance with one embodiment. As an option, the method 71-12A1200 may be implemented in the context of any other Figure(s) or accompanying description(s). Of course, however, the method 71-12A1200 may be implemented in the context of any desired environment.

In operation, one or more objects are stored in a storage accelerator unit. See operation 71-12A1202. Additionally, the one or more objects are backed-up in at least one storage sub-system. See operation 71-12A1204.

In one embodiment, storing the one or more objects may include writing the one or more objects in a volatile memory of the storage accelerator unit. Further, in one embodiment, the storing the one or more objects may include writing the one or more objects in a volatile memory of the storage accelerator unit and subsequently transferring the one or more objects to a non-volatile memory of the storage accelerator unit.

Additionally, in one embodiment, the backing up the one or more objects in the at least one storage sub-system may include computer code for transferring the one or more objects from a volatile memory of the storage accelerator unit to the at least one storage sub-system. In one embodiment, the backing up the one or more objects in the at least one storage sub-system may include transferring the one or more objects from a non-volatile memory of the storage accelerator unit to the at least one storage sub-system.

Further, in one embodiment, the backing up the one or more objects in the at least one storage sub-system may include automatically backing up the one or more objects in the at least one storage sub-system. In another embodiment, the method 71-12A1200 may include restoring the one or more objects in the at least one storage sub-system to the storage accelerator unit.

More illustrative information will now be set forth regarding various optional architectures and features with which the foregoing techniques discussed in the context of any of the present or previous figure(s) may or may not be implemented, per the desires of the user. For instance, various optional examples and/or options associated with the storing of operation 71-12A1202, the back-up of operation 71-12A1204, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

FIG. 71-12B shows a CPU coupled to a hierarchical storage subsystem, in accordance with one embodiment. As an option, the system may be implemented in the context of any other Figure(s) or accompanying description(s). Of course, however, the system may be implemented in the context of any desired environment.

In FIG. 71-12B, a CPU is coupled to a storage array controller SAC1. In FIG. 71-12B, SAC1 is coupled to a storage accelerator unit SAU1. In FIG. 71-12B, SAU1 comprises a volatile memory subunit (VM1) coupled to a nonvolatile memory subunit (NVM1). In FIG. 71-12B, SAC1 is coupled to a disk subsystem D1. In FIG. 71-12B, the CPU may be coupled to SAC1 through IOV functions (e.g., the IOV function(s) may be contained in the CPU). In various embodiments, there may be any number of disk subsystems and any number of CPUs, etc.

In FIG. 71-12B, data block(s) A is written (1) to VM1. In FIG. 71-12B, data block(s) A is written (2) (e.g., transferred, moved, copied, etc.) from VM1 to NVM1. In FIG. 71-12B, data block(s) A is written (3) (e.g., transferred, moved, copied, etc.) from VM1 to D1. As an alternative to a write (3), the data block(s) A may be written from NVM1 to D1.

In FIG. 71-12B, the data write may be committed to the CPU when the data is written to VM1. Alternatively, the data write may be committed to the CPU when the data is written to NVM1.

In various embodiments, the data write behavior may be determined by commit setting(s) and/or commit policies and/or write policies as described previously. The relative performance (e.g., VM1 may be a very fast DRAM-based memory subunit, etc.) and reliability required (e.g., VM1 is volatile and thus the system faces potential data loss if VM1 fails, etc.) may determine the data write behavior and policies used.

In various embodiments, at one or more points in time (e.g., set by the user, pre-programmed, fixed, variable, set by policy, etc.), D1 and/or VM1 and/or NVM1 may be synchronized (e.g., using back-up operations, checkpoint operations, restore operations, etc.).

In FIG. 71-12B, a back-up/checkpoint operation (4) synchronizes from D1 to NVM1. In alternative embodiments, a back-up/checkpoint operation may synchronize from D1 to VM1 or may synchronize from D1 to NVM1 and VM1, etc.

In FIG. 71-12B, a restore operation (5) may synchronize from NVM1 to VM1. In alternative embodiments, a restore operation may synchronize from NVM1 to D1, or may synchronize from NVM1 to D1 and VM1, or may synchronize from VM1 to NVM1, or may synchronize from VM1 to D1 and VM1, etc.

In FIG. 71-12B, if there is a problem (e.g., data corruption detected, system failure due to loss of power, etc.), the data may be restored, as an example, from NVM1 to VM1. Normal back-up/checkpoint/restore operations may then assure correct synchronization of NVM1 and/or VM1 to D1.

In alternative embodiments, other restore paths may be used (e.g., D1 to VM1 and/or NVM1, NVM1 to D1 and/or VM1, etc.).

In various embodiments, failure protection (e.g., back-up, checkpoint, restore, etc.) operations may be under control of a protection policy. The protection policy may depend on various factors as described above for the commit setting.

FIG. 71-13 shows a CPU coupled to a hierarchical storage system, in accordance with one embodiment. As an option, the system may be implemented in the context of any other Figure(s) or accompanying description(s). Of course, however, the system may be implemented in the context of any desired environment.

In FIG. 71-13, a CPU is coupled to a storage array controller SAC1. In FIG. 71-13, SAC1 is coupled to a storage accelerator unit SAU1. In FIG. 71-13, SAU1 comprises a volatile memory subunit (VM1) coupled to a nonvolatile memory subunit (NVM1). In FIG. 71-13, SAC1 is coupled to a disk subsystem D1. In FIG. 71-13, the CPU may be coupled to SAC1 through IOV functions (e.g., the IOV function(s) may be contained in the CPU, etc.). In various embodiments, there may be any number of disk subsystems and any number of CPUs, etc.

In FIG. 71-13, data block(s) A comprising blocks A, B, C, D are written (1) (e.g., transferred, replicated, copied, moved, etc.) from VM1 to NVM1 as a checkpoint operation. In FIG. 71-13, the data block(s) B comprising blocks A, B, C, D are written (2) (e.g., transferred, replicated, copied, moved, etc.) from NVM1 to VM1 as a restore operation.

At a desired point in time (e.g., at fixed intervals, after a certain number of writes, after a certain number of blocks written, under control of a protection policy, etc.), the state of VM1 may be captured and a checkpoint may be created so that the state of VM1 may be restored from NVM1

In one embodiment, checkpoint/restore may be handled by SAU1. In this case, the copy operations (e.g., copying, transferring, replicating, moving, etc.) involved in checkpoint and/or restore may be handled by hardware (e.g., the memory chip(s), by a hardware copy engine, etc.).

In another embodiment, checkpoint/restore may be controlled by the computer system (e.g., CPU, OS, CPU and OS, etc.).

The checkpoint/restore operations described in embodiments above and illustrated in FIG. 71-13 do not involve D1. Thus, this checkpoint/restore method may be used with any disk subsystem (e.g., one or more disk subsystems, networked storage, cloud storage, etc.).

FIG. 71-14 shows a hierarchical storage system implementing a method of prioritizing files and data, in accordance with one embodiment. As an option, the system and/or method may be implemented in the context of any other Figure(s) or accompanying description(s). Of course, however, the system and/or method may be implemented in the context of any desired environment.

In FIG. 71-14, a CPU is coupled to a storage array controller SAC1. In FIG. 71-14, SAC1 may be coupled to a storage accelerator unit SAU1. In FIG. 71-14, SAC1 is coupled to a disk subsystem D1. In FIG. 71-14, host write commands (1-3) are directed to target D1. In FIG. 71-14, write commands (4) are directed to target SAU1.

In FIG. 71-14, CPU1 writes (1-3) data block(s) B (A, B, C) in a short time frame to D1. In FIG. 71-14, SAC1 detects a write pattern (e.g., repetitive writes, large writes, writes to adjacent locations, etc.) and data block(s) B as part of one or more hot file(s). In FIG. 71-14, SAC1 writes (4) (e.g., copies, movers, transfers, etc.) the data block(s) B to data block(s) A on SAU1.

In FIG. 71-14, the logic to monitor the host read and write commands and determine, for example, which files are hot and which are cold is on SAC1. In another embodiment, the logic to determine, for example, which files are hot and which are cold is on SAU1.

In one embodiment, all blocks may be first written to SAU1, and the logic to determine which files are hot and which are cold may be on SAU1. In one embodiment, hot objects may remain on SAU1, while cold objects may be written to D1.

In various embodiments, other objects may be prioritized (e.g., files, data, metadata, LUNs, disks, etc.) and/or other operations (e.g., acceleration, filtering, data move(s), etc.), as described previously in the context of FIG. 8, for example.

FIG. 71-15A shows a method 71-15A1500 for making the one or more objects available from a second system, based a location of the user, in accordance with one embodiment. As an option, the method 71-15A1500 may be implemented in the context of any other Figure(s) or accompanying description(s). Of course, however, the method 71-15A1500 may be implemented in the context of any desired environment.

As shown, one or more objects of a user are stored in a first system. See operation 71-15A1502. Additionally, the one or more objects are made available from a second system, based a location of the user. See operation 71-15A1504. In one embodiment, the one or more objects may be stored in a storage accelerator unit of the first system.

In one embodiment, making the one or more objects available from the second system may include transferring the one or more objects from the first system to the second system. In one embodiment, making the one or more objects available from the second system may include transferring the one or more objects from the first system to a storage accelerator unit of the second system. In one embodiment, making the one or more objects available from the second system may include transferring the one or more objects from a storage accelerator unit of the first system to a storage accelerator unit of the second system.

In yet another embodiment, making the one or more objects available from the second system may include transferring the one or more objects from a storage sub-system of the second system to a storage accelerator unit of the second system. Still yet, in one embodiment, making the one or more objects available from a second system may include automatically making the one or more objects available from the second system.

In one embodiment, the method 71-15A1500 may also include altering an availability of the one or more objects from the first system, based on the location of the user. Further, in one embodiment, the one or more objects may be transferred from a storage accelerator unit of the first system to a storage sub-system of the first system, based on the location of the user. In one embodiment, the one or more objects may be evicted from a storage accelerator unit of the first system, based on the location of the user.

More illustrative information will now be set forth regarding various optional architectures and features with which the foregoing techniques discussed in the context of any of the present or previous figure(s) may or may not be implemented, per the desires of the user. For instance, various optional examples and/or options associated with the storing in operation 71-15A1502, the availability based on user location of operation 71-15A1504, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

FIG. 71-15B shows a system of disk subsystems, in accordance with one embodiment, where different disk subsystems may be located in different geographic locations and the system may perform geolocation storage operations. As an option, the system may be implemented in the context of any other Figure(s) or accompanying description(s). Of course, however, the system may be implemented in the context of any desired environment.

In FIG. 71-15B, disk subsystem D1 is located in storage location S1 and disk subsystem D2 is located in storage location S2. In FIG. 71-15B, a user moves from location L1 to location L2.

In FIG. 71-15B, when a user U1 of storage (e.g., data stored on a network, in the cloud, in a datacenter, in a home server, on a laptop at home, etc.) moves from one location to another, data block(s) A that the user U1 may access are copied (e.g., replicated, moved, transferred, etc.) from D1 to data block(s) B on D2.

In one embodiment, the data block(s) A may be copied (i.e., two identical copies then result, data block(s) A and data block(s) B) or moved (i.e., only one copy, data block(s) B, remains after the move).

In one embodiment, more complex geolocation storage operations may be performed. For example, files may be changed from one format (e.g., Microsoft Windows, etc.) to a different format (e.g., Apple Macintosh, Linux, Android, etc.). Such behavior might be used if user U1 normally uses a Windows PC at work in location L1 but uses a Macintosh laptop and/or Android cell phone while travelling.

In one embodiment, complex intelligent operations may be performed. For example, if user U1 may create a move policy that triggers a move/copy of a certain file F1 on a change of location. The system may then detect that F1 depends on (or is otherwise closely associated with, etc.) files F2 and F3. The system may then autonomously trigger a move/copy of files F2 and F3 for example.

In various embodiments, a move policy may determine the exact behavior of the move/copy operation(s). The move policies may be based on various factors as described previously including, but not limited to, the cost(s) of storage, user profile(s), reliability required, etc.

In one embodiment, the disk subsystems may be, for example, datacenters, cloud storage, etc. This type of embodiment may be implemented, for example, for a mobile phone user, who, by accessing data from a disk closer to his physical location, may for example avoid roaming charges. In another embodiment, the user may selectively initiate data transfer. In another embodiment the system may detect the user's movement (e.g., through a change in the user's service address, a change in IP address(es), etc.).

In one embodiment, data may be selectively transferred based on factors such as file type or recent access. In another embodiment, there may be more than two disk subsystems. Further, one or more disk subsystems may belong to the user(s). Additionally, one or more of the disk subsystems may be mobile.

In various embodiments, any of the storage acceleration functions described in other embodiments may be used in conjunction with the geolocation storage operations. In one embodiment, one or more storage acceleration units (SAUs) may perform the geolocation storage operations.

FIG. 71-16 shows a system of storage systems, in accordance with one embodiment, comprising one or more storage acceleration units (SAUs) that may perform geolocation storage operations. As an option, the system may be implemented in the context of any other Figure(s) or accompanying description(s). Of course, however, the system may be implemented in the context of any desired environment.

In FIG. 71-16, at each location (L1-L3), a CPU (CPU1-CPU3) are coupled to storage acceleration units (SAU1-SAU3). In each location, the SAU is coupled to a disk subsystem (D1-D3).

In various embodiments: (a) there may be more than one CPU and/or VM at each location; (b) not all locations are required to have an SAU; (c) the SAU may be part of or separate from a storage array controller (SAC) (not shown in FIG. 71-16 for clarity); (d) not all system component(s) (e.g., CPU, disk subsystem, SAU, SAC, etc.) need be identical; (e) other system and storage system configurations and topologies, along with different system and storage system component(s) are possible and comprehended.

In FIG. 71-16, when a trigger is fired (e.g., event occurs, action detected, alert raised, etc.), data A is loaded (1) (e.g., moved, copied, transferred, etc.) from D2 to the SAU2 at location L2. The data A may have been transferred to D2 using the techniques, method and apparatus described in the context of FIG. 71-15, etc. In one embodiment, a trigger policy may determine which events fire a trigger. In various embodiments, the events may include a change of user location, an IP address change, a wireless network change, a manual programming by user(s), autonomous system decision(s), time(s) of day, news event(s), holiday(s), stock price(s) reached, and/or various other events. Using the same trigger (or different trigger), data A may be evicted FIG. 17 shows a hierarchical storage system implementing a method of prioritizing files in accordance with one embodiment. As an option, the system may be implemented in the context of any other Figure(s) or accompanying description(s). Of course, however, the system may be implemented in the context of any desired environment.

In FIG. 71-17, a CPU is coupled to a storage array controller SAC1. In FIG. 71-17, SAC1 may be coupled to a storage accelerator unit SAU1. In FIG. 71-17, SAC1 is coupled to a disk subsystem D1. In FIG. 71-17, host write commands (1) are directed to target SAU1. In FIG. 71-17, host write commands (2) are directed to target D1.

In FIG. 71-17, filter logic on SAC1 monitors the host read and write commands and determines, for example, where objects are stored. In another embodiment, the filter logic may be on SAU1.

In one embodiment, FIG. 71-17 may depict an email system. The system may decide D1 that a Microsoft Outlook file, likely to be accessed often by its user, is a hot object. As a result of D1, files of the appropriate (e.g., hot) type (e.g., files with .msg extensions, files with other standard extensions, files of other recognizable types, etc.) are written to SAU1 to accelerate access for example. Files of other (e.g., cold) types (e.g., archive files, etc.), which are needed less frequently, are written to D1.

In one embodiment, all blocks may be first written to SAU1, and the filter logic may be on SAU1. In one embodiment, hot objects may remain on SAU1, while cold objects may be written to D1.

FIG. 71-18 shows a hierarchical storage system including a storage accelerator unit that splits data objects, in accordance with one embodiment. As an option, the system may be implemented in the context of any other Figure(s) or accompanying description(s). Of course, however, the system may be implemented in the context of any desired environment.

In FIG. 71-18, a CPU is coupled to a storage array controller SAC1. In FIG. 71-18, SAC1 may be coupled to a storage accelerator unit SAU1. In FIG. 71-18, SAC1 is coupled to a disk subsystem D1.

A disk read command is directed at a target (e.g., disk X, disk subsystem X, etc.). In this case, disk X is the target. However, a system (e.g., disk subsystem, computer system, storage system, etc.) may (e.g., depending on policies, user setting(s), system load, network status, etc.) satisfy the read request by supplying the requested data from any available source (or sources). If the source is disk Y (and assuming the data requested is an exact copy on disk X and disk Y) the read may be completed by disk Y (or completed from disk Y).

In FIG. 71-18, host read commands (1) are directed to target DS1 but completed from SAU1. In FIG. 71-18, host read commands (2) are directed to target D1. In FIG. 71-18, data is copied (3) from D1 to SAU1. In FIG. 71-18, host read commands (4) are directed to target D1 but completed from SAU1.

In FIG. 71-18, a file (or other object, etc.) may be split into two or more parts that are stored in different hierarchical layers and/or disk/storage subsystems, etc. In FIG. 71-18, data block(s) A are stored in SAU1 and data block(s) B in D1. In FIG. 71-18, a file portion (e.g., the first 5 minutes of a movie, etc.) data block(s) A may be stored in SAU1. When the file is needed, data block(s) A may be read by CPU1. In FIG. 71-18, SAU1 may allow faster read access than normally possible to the disk subsystem D1. In FIG. 71-18, the remainder of the file (e.g., data blocks B) may be stored on D1. Depending, for example, on a read policy, data block(s) B may be transferred (e.g., copied, moved, etc.) to SAU1. Thus, data block(s) B may be read by the CPU from the disk but completed from SAU1.

In one embodiment, the logic for carrying out these operations (e.g., object splits, moves, copies, transfers, filtering, decisions, transactions, command modifications, translations, mapping, etc.) may be in SAC1. Alternatively, the logic may be in SAU1.

One example of a use for such embodiments involves movie file(s) (or other media, data, file(s), information, etc.), where a movie segment (e.g., the first few minutes of a movie, synopsis, trailer(s), review(s), preview(s), clip(s), a set of clips, other portion(s), etc.) may be read directly from a SAU for fast access, for example. While that movie segment is being viewed (e.g., read by the CPU, etc.), the remainder of the movie file may be read from disk or transferred to the SAU. Another example involves calendar files, where perhaps only a portion of the calendar is needed for fast access.

In various embodiments the segment(s) stored on an SAU (or multiple SAUs) may be any data (e.g., portion(s), part(s), collection(s), etc.) extracted from or related to a larger or different collection of data stored elsewhere (e.g., on disk subsystem(s), other SAU(s), etc.).

FIG. 71-19 shows a system and method for a storage proxy, in accordance with one embodiment. As an option, the system and method may be implemented in the context of any other Figure(s) or accompanying description(s). Of course, however, the system and method may be implemented in the context of any desired environment.

In FIG. 71-19, data block(s) A are stored on disk D1 in cloud C1. In FIG. 71-19, laptop computer L1 comprises disk D2. In FIG. 71-19, data block(s) A are copied (1) (e.g., transferred, moved, etc.) from D1 to D2. In FIG. 71-19, data block(s) A are copied (2) (e.g., transferred, moved, etc.) from D2 to mobile phone P1.

In FIG. 71-19, when a trigger is fired, data block(s) A are copied from D1 to D2. The disk subsystem D2 may be coupled to computer system that acts as a storage proxy. The storage proxy may be, for example, a user's laptop, desktop computer, home storage server, TV, internet café PC, another user's cell phone, etc. The data block(s) A may then be made available locally (under privacy controls etc.) to the user or other user(s), for example, on his/her mobile phone, other hand held device, entertainment system, etc.

In one embodiment, the privacy settings, operation of proxy storage (e.g., object and data movement(s) and handling, triggers, etc.) may be controlled by a proxy policy.

In various embodiments, D1 and D2 may be of any form such as a disk, optical storage, solid-state memory, or other storage device(s). In various embodiments proxy storage (e.g., the operations to create a storage proxy etc.) and/or a storage proxy (e.g., the laptop, PC, etc. storing proxy objects etc.) may be combined with any of the storage acceleration techniques described in various other embodiments. Proxy storage may be implemented, for example, for a mobile phone user, who, by accessing data from storage closer to his physical location, may for example avoid roaming charges.

FIG. 71-20 shows a hierarchical storage system, in accordance with one embodiment. As an option, the system may be implemented in the context of any other Figure(s) or accompanying description(s). Of course, however, the system may be implemented in the context of any desired environment.

In FIG. 71-20, a CPU is coupled to a storage array controller SAC1. In FIG. 71-20, SAC1 may be coupled to a disk subsystem D1. In FIG. 71-20, SAC1 may be coupled to a plurality of solid-state drives (SSDs) (SSD1, SSD2, . . . , SSDn). The SSDs may be, for example, SATA or SAS form factors, or PCI-E cards, or of any type. In FIG. 71-20, the SSDs may be included in hierarchical level 1. The disk subsystem may be included in hierarchical level 2.

In various embodiments, each SSD may be coupled to (or part of) a storage accelerator unit. Different configurations, system and bus topologies are possible and comprehended. Thus, for example, SAC1 (or part or portion of SAC1) and one or more portion(s) of the plurality of SSDs may be viewed as one or more SAU(s). In other embodiments, there may be more than one SAC in the computer system and one or more portion(s) of the SACs together with one or more portion(s) of the SSDs may form one or more SAU(s). If there are multiple SACs and/or SAUs in the computer system they may reside on the same or different buses, etc.

In FIG. 71-20, logic for manipulating data, for example using methods described in other figure(s) and their accompanying text description(s), may be contained in SAC1. In other embodiments, the logic may be part of the SAU(s) or distributed between SAC(s) and SAU(s) in the computer system(s), etc.

FIG. 71-21 shows a hierarchical storage system, in accordance with one embodiment. As an option, the system may be implemented in the context of any other Figure(s) or accompanying description(s). Of course, however, the system may be implemented in the context of any desired environment.

In FIG. 71-21, a CPU is coupled to a storage array controller SAC1. In FIG. 71-21, SAC1 may be coupled to a disk subsystem D1. In FIG. 71-21, SAC1 may be coupled to a plurality of raw NAND flash memory devices (NAND1, NAND2, . . . , NANDn).

The term raw memory devices (e.g., raw NAND memory device) has been used to distinguish the use of individual memory devices (or components, chips, etc.) from the packaging of flash (or other memory technology) memory devices together with a (possibly integrated) controller (e.g., in an SSD or USB memory stick etc.).

In various embodiments, other types (e.g., technologies, etc.) of raw memory devices (or combinations of raw memory devices) may be used separately or in combination(s) (e.g., DRAM, eDRAM, SDRAM, other volatile or non-volatile memory technologies, etc.).

In various embodiments, different configurations of bus and system topologies are possible and comprehended. Thus, for example, SAC1 (or part or portion of SAC1) and one or more portion(s) of the plurality of raw memory devices may be viewed as one or more SAU(s). In other embodiments, there may be more than one SAC in the computer system and one or more portion(s) of the SACs together with one or raw memory devices may form one or more SAU(s). If there are multiple SACs and/or SAUs in the computer system they may reside on the same or different buses, etc.

In FIG. 71-21, logic for controlling the raw NAND memory devices, for example, using methods described in other figures, may be contained in SAC1. In various embodiments, the logic may be part of the SAU(s) or distributed between SAC(s) and SAU(s) in the computer system(s), etc.

In one embodiment a system such as that described in FIG. 71-21 may form the basis of implementation of an SAU used for example in the multiple SAU system depicted in FIG. 71-5A or any of the SAUs described here.

FIG. 71-22 shows a hierarchical storage system, in accordance with one embodiment. As an option, the system may be implemented in the context of any other Figure(s) or accompanying description(s). Of course, however, the system may be implemented in the context of any desired environment.

In FIG. 71-22, a CPU (not shown) is coupled to a storage array controller SAC1. In FIG. 71-22, SAC1 may be coupled to a NAND expander NE1 in a first tier. In FIG. 71-22, NE1 may be coupled to a plurality of NAND expanders in a second tier (NE2, NE3, . . . . , NEn). In FIG. 71-22, each of NE2 . . . NEn may be coupled to a plurality of raw NAND flash memory devices. For example NE2 may be coupled to (RN1, RN2, . . . . , RN4).

In FIG. 71-22, each of the second tier of NAND expanders are coupled to 4 raw NAND flash memory devices, but there could be any number of raw NAND flash memory devices aggregated to each NAND expander in the second tier. Each raw NAND memory device is a leaf device. The tiers of NAND expanders and raw NAND flash memory devices form a storage device tree.

In various embodiments, other types (e.g., technologies, etc.) of raw memory devices (or combinations of raw memory devices) may be used (e.g., DRAM, eDRAM, SDRAM, other volatile or non-volatile memory technologies, etc.). In general, any type of storage device or combinations of storage devices(s) may be used as a leaf device but typically solid-state storage will be used.

In various embodiments, leaf nodes may use different types of storage device(s). In various embodiments, storage devices and/or memory components may be packaged in any form (e.g., NAND die may be stacked, different memory types stacked or assembled in the same package, etc.).

In various embodiments, different configurations of storage device (type and number), memory component (type and number), expander (type and number), bus (type and number), controller (type and number), and system topologies are possible and comprehended.

For example, in various embodiments, there may be multiple tiers (e.g., any number 1, 2, 3, 4 . . . ). In various embodiments, there may be any total number of leaf devices and any number of leaf devices at each tier.

In various embodiments, the storage device tree does not have to be symmetric (e.g., there may be different numbers and/or types of leaf devices for each expander, different numbers and/or types of expanders aggregated at each tier level, expanders do not have to divide equally at each tier, different types of expander may be present in each tier, etc.). In general, any arrangement of storage device(s) type and number together with any number and type of expander(s) is possible in a storage device tree and is comprehended by this disclosure.

In various embodiments, the bus capacity (e.g., bandwidth etc.) used to connect the different tiers of storage devices and expanders may be different and generally will be as the bandwidth at each branch may be different. Thus, for example, the bandwidth at NE1 in FIG. 22 is four times the bandwidth at each of NE2, NE3, NE4, and NE5.

In one embodiment, a system such as that described in FIG. 22 may form the basis of implementation of an SAU used, for example, in the multiple SAU system depicted in FIG. 71-5A or any of the SAUs described here.

FIG. 71-23A shows a method 71-23A2300 for storing parity information in data portions of memory, in accordance with one embodiment. As an option, the method 71-23A2300 may be implemented in the context of any other Figure(s) or accompanying description(s). Of course, however, the method 71-23A2300 may be implemented in the context of any desired environment.

As shown, data is stored in a plurality of data portions of memory and parity information is stored in at least one parity portion of the memory. See operation 71-23A2302. Further, additional parity information is stored in at least one of the data portions of memory. See operation 71-23A2304.

In one embodiment, the additional parity information may include nested parity information. For example, the additional parity information may include parity information associated with parity information, etc. Furthermore, in various embodiments, the data portions of memory may include separate data blocks of memory, separate memory devices, and separate groups of memory devices, etc. In one embodiment, the at least one parity portion of the memory may include a separate memory device.

More illustrative information will now be set forth regarding various optional architectures and features with which the foregoing techniques discussed in the context of any of the present or previous figure(s) may or may not be implemented, per the desires of the user. For instance, various optional examples and/or options associated with the storing of parity information in operations 71-23A2302 and 71-23A2304, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

FIG. 71-23B shows a method to use nested parity in a raw NAND memory device, in accordance with one embodiment. As an option, the method may be implemented in the context of any other Figure(s) or accompanying description(s). Of course, however, the method may be implemented in the context of any desired environment.

In FIG. 71-23B, a raw NAND memory device RN1 contains data blocks B1-BN. In FIG. 71-23B, certain data blocks in certain raw NAND memory devices (e.g., B1, B2, B3) contain data (e.g., block B1 contains data D1) and parity information (e.g., block B1 contains parity P2). In FIG. 71-23B, certain data blocks (e.g., block B4) contain only parity information (e.g., block B4 contains parity P1 and P6).

Parity information P is said to cover (e.g., protect, etc.) data D if the parity information P may be used to detect and/or correct information in D. In FIG. 71-23B, parity P2 covers D1; P1 covers B1, B2, B3; P6 covers P1. This interleaved type of parity construction will be referred to as nested parity.

One advantage to managing parity coding in raw NAND memory components, compared to using standard interfaces with SSDs, is greater flexibility in how the coding schemes are chosen and implemented and therefore superior error control.

FIG. 71-23B shows a nested parity scheme as a novel illustrative embodiment of a general concept for better data protection using raw NAND components. In various embodiments, the parity information P may be added using different and various well-known coding schemes or types of coding. Parity may be implemented, for example, using even or odd parity. The space reserved for parity bits P may also be used for code bits derived providing more sophisticated protection than simple parity and using well-known CRC coding, ECC coding, SECDED (Single Error Correct, Double Error Detect) coding, etc. More sophisticated protection coding may employ other more complex well-known schemes such as Reed-Solomon codes, LDPC, convolutional codes, turbo codes, tornado codes, etc.

In various embodiments, the type and number of parity or other code bits, the coding scheme, the depth and nature of nesting, etc., may be controlled using a protection policy, which may depend on factors already described for commit setting and commit policy for example.

FIG. 71-24 shows a method to distribute nested parity across a plurality of raw NAND memory devices, in accordance with one embodiment. As an option, the method may be implemented in the context of any other Figure(s) or accompanying description(s). Of course, however, the method may be implemented in the context of any desired environment.

In FIG. 71-24, a raw NAND memory device RN1 contains data block(s) A (RN2 contains block(s) B, RN3 contains block(s) C, etc.). In FIG. 71-24, certain data block(s) in certain raw NAND memory devices (e.g., A, B, C in RN1, RN2, RN3) contain data (e.g., block(s) B in RN1 contain data D1) and parity information (e.g., block(s) B in RN1 contains parity P2). In FIG. 71-24, certain data blocks in certain raw NAND memory devices (e.g., block(s) D in RN4) contain only parity information (e.g., block(s) D in RN4 contains parity P1 and P6).

In FIG. 71-24, parity is distributed between raw NAND memory devices. In this example, a nested layer of parity may be distributed across multiple raw NAND memory devices. Parity may be stored on raw NAND memory devices separate from the raw NAND memory devices the data itself is stored on. In various embodiments, parity or other code bits may be constructed and alternative coding schemes may be used as explained in the description accompanying FIG. 71-23, for example.

One advantage of distributed nested parity is, for example, if data is requested from a raw NAND memory device when it is busy (e.g., due to erase, other device function(s), system operation(s), etc.). If there is enough information in data and/or parity distributed over the other raw NAND memory devices, the data can be reconstructed without having to read from the busy raw NAND memory device.

FIG. 71-25 shows a method of nested error correction implemented in a NAND expander, in accordance with one embodiment. As an option, the method may be implemented in the context of any other Figure(s) or accompanying description(s). Of course, however, the method may be implemented in the context of any desired environment.

In FIG. 71-25, a CPU (not shown) is coupled to a storage array controller SAC1. In FIG. 71-25, SAC1 is coupled to a NAND expander NE1. In FIG. 71-25, NE1 is coupled to a plurality of raw NAND memory devices (RN1, . . . ). In FIG. 71-25, RN1 contains data block(s) 1.

In FIG. 71-25, NE1 reads (1) data and parity information from RN1. In FIG. 71-25, NE1 corrects any errors found by writing data and parity information (2) to RN1.

In FIG. 71-25, data and parity are distributed in blocks across the plurality of raw NAND flash memory devices. For example, data block(s) 1 are contained in raw NAND flash memory device RN1.

In operation, data block(s) 1 may be read from RN1 to NE1. Any errors in data block(s) 1 may be detected by NE1. Additionally, any errors in data block(s) 1 may be corrected by NE1. Further, corrected data and parity information may be written to RN1.

FIG. 71-25, shows one scheme for determining data errors using multiple levels of parity. In this example, two levels of parity are added to four bits of data. In this example, even parity is added across rows and columns of data. Where there are an even number of "1" s, a zero is added. Where there are an odd number of "1" s, a one is added. In this way, each set of bits (including parity bits) has an even number of "1" s.

In FIG. 71-25, by reading each row and column, the correct value of each bit can be determined. If bit b3 is (erroneously) set to zero (e.g., as shown in FIG. 71-25 at time t2, etc.), parity bits p1 and p3 may be used to determine that b3 is in error, and bit b3 may be changed from "0" to "1".

By using the scheme described, errors on raw NAND memory devices may be identified and corrected proactively (e.g., before failure, before loss of data, etc.). Although a two dimensional parity scheme is described here, this is merely one example of a coding scheme that could be implemented in this manner. In various embodiments, any number of dimensions, any coding scheme, or combination(s) of schemes may be implemented in this manner.

A nested parity correction scheme may overcome a potential problem with using raw NAND memory devices. In modern raw NAND memory devices, bits may wear out and may become weak (e.g., may incorrectly store data, or incorrectly report stored data, etc.) after repeated reads and/or writes (e.g., and/or other program, and/or other memory device operation(s), etc.). In various embodiments, one or more nested parity correction methods may use any arbitrary scheme or combination(s) of schemes to proactively read, identify, and correct errors.

FIG. 71-26A shows a method 71-26A2600 for modifying at least one aspect of a parity scheme, based on the property, in accordance with one embodiment. As an option, the method 71-26A2600 may be implemented in the context of any other Figure(s) or accompanying description(s). Of course, however, the method 71-26A2600 may be implemented in the context of any desired environment.

As shown, at least one parity scheme associated with one or more objects is identified. See operation 71-26A2602. Additionally, at least one property is identified. See operation 71-26A2604. Further, at least one aspect of the parity scheme is modified, based on the property. See operation 71-26A2606.

The property may include any property associated with any aspect of the parity scheme, a system, the objects, data, and/or various other items. In one embodiment, the property may include at least one property of the one or more objects. Additionally, in one embodiment, the property may include a location of the one or more objects.

In one embodiment, the property may include an importance of the one or more objects. In another embodiment, the property may include a manner in which the one or more objects are stored or retrieved. In another embodiment, the property may include a number of errors. In another embodiment, the property may include an error rate. In yet another embodiment, the property may be time-related.

Further, in one embodiment, the property may include at least one property of a system in which the one or more objects are stored. In one embodiment, the property may include at least one property of a storage accelerator unit.

Additionally, in one embodiment, the at least one aspect of the parity scheme may include a length of a parity code. In another embodiment, the at least one aspect of the parity scheme may include a type of the parity scheme.

Further, in one embodiment, modifying at least one aspect of the parity scheme may include changing a first parity scheme to a second parity scheme. In another embodiment, modifying at least one aspect of the parity scheme may include adding a second parity scheme to a first parity scheme. In another embodiment, modifying at least one aspect of the parity scheme may include removing a second parity scheme from a first parity scheme. In yet another embodiment, modifying at least one aspect of the parity scheme may include changing a length of a code in association with the parity scheme.

More illustrative information will now be set forth regarding various optional architectures and features with which the foregoing techniques discussed in the context of any of the present or previous figure(s) may or may not be implemented, per the desires of the user. For instance, various optional examples and/or options associated with the identifying of operations 71-26A2602 and 71-26A2604, the modifying of 71-26A2606, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

FIG. 71-26B shows a method to apply time varying parity, in accordance with one embodiment. As an option, the method may be implemented in the context of any other Figure(s) or accompanying description(s). Of course, however, the method may be implemented in the context of any desired environment.

In FIG. 71-26B, data bits b00-bnm are covered by parity information p00-p0m and p10-p1n. In FIG. 71-26B, parity bits p00-p0m employ parity code 1 (PC1) and parity bits p10-p1m employ PC2.

In FIG. 71-26B, exclusive-or (e.g., XOR, exclusive disjunction, symmetric difference, nonequivalence, etc.) parity is applied to the data. The binary XOR operator (e.g., logic function, etc.) returns a logic value of "1" if exactly one of its two operands has a value of logic "1". For multiple arguments, the XOR function may be defined to be "1" if an odd number of its arguments are "1". For multiple arguments, XOR may also be considered addition modulo 2.

There are two types of XOR parity: even parity and odd parity. With even parity, a parity bit is set to "1" if the number of "1" s in a set of data bits not including the parity bit is odd, making the number of "1" s in the set of data bits including the parity bit even. With odd parity, the parity bit is set to "1" if the number of "1" s in a set of data bits not including the parity bit is even, making the number of "1" s in the set of data bits including the parity bit odd.

In FIG. 71-26B and various other figures, XOR parity is used in order to simplify the figures and accompanying explanations. In various embodiments, any coding scheme or combinations of one or more coding schemes, including but not limited to those shown in previous or subsequent figures, may be used.

In FIG. 71-26B, the coding scheme (or coding schemes) may be changed over time. So, in the context of the two dimensional scheme shown in FIG. 71-26B, at time t1, parity is coded across rows of data bits. Thus, for example, p00 is the parity bit for row 1, bits b00-bn0. Later, at time t2, when it is determined that a higher amount of data protection is needed, parity is added across columns of data. Thus, at time t2, for example, p10 is added, which is the parity bit for data bits b00-b0m.

In one embodiment, coding may be changed over time (e.g., any scheme(s) used changed, dimension(s) changed, algorithm(s) changed, etc.). Additionally, in one embodiment, the type (e.g., length, number of bits, algorithm, etc.) of parity code or other data protection scheme may be changed over time or with other factor(s) (e.g., XOR parity may be changed to SECDED coding, number of parity bits changed, etc.).

In one embodiment, a simple parity scheme, protection scheme, or set of protection schemes may be implemented initially, and levels of protection may be added over time (e.g., schemes(s) may be modified, changed, supplemented, substituted; more complex schemes added; additional protection added; more complex algorithm(s) used; etc.).

In one embodiment, a more complex parity scheme may be implemented initially, and levels of parity may be stripped away over time (e.g., removed, deleted, otherwise changed or simplified, etc.).

In one embodiment, one or schemes may be changed with time or other factor(s) (e.g., schemes added then removed; schemes added or updated with patches and/or firmware changes; different scheme(s) for different portion(s) of data, different disk subsystems, etc; or any other scheme/algorithm/coding changes, etc.).

FIG. 71-27 shows a method to apply software coding and correction to a data set, in accordance with one embodiment. As an option, the method may be implemented in the context of any other Figure(s) or accompanying description(s). Of course, however, the method may be implemented in the context of any desired environment.

In FIG. 71-27, a CPU is coupled to a storage driver SD1. In FIG. 71-27, SD1 is coupled to a disk subsystem D0. In FIG. 71-27, host disk commands CMDA are directed to target D0. In FIG. 71-27, SD1 intercepts and modifies host disk commands CMDA and directs the modified disk commands CMDB to D0.

In FIG. 71-27, a CMDA write command WRITE1A is directed to D0 with host block address "101" (e.g., number 101, etc.) and data b7-b0 of "00000010". In FIG. 71-27, a CMDB write command WRITE1B is directed to D0 with array block address "202" (e.g., number 202, etc.) and data b8-b0 of "000000101" (addition of parity bit p0). In FIG. 71-27, a CMDB read command READ2B is completed by D0 with array block address "202" and data b8-b0 of "000000111" (a read with b0 in error).

In FIG. 71-27, a CMDB write command WRITE3B is directed to D0 with array block address "202" and data b8-b0 of "000000101" (a write that corrects b0). In FIG. 71-27, the storage driver SD1 may be part of an OS (not shown). Alternatively, the storage driver may be part of the software supplied with a storage array controller (not shown). In yet another embodiment, SD1 may be software independent of OS and/or hardware.

In one embodiment, multiple CPUs and/or VMs may be present in the computer system. Additionally, in one embodiment, one or more CPUs/VMs may be coupled to an IOV function. Further, the IOV function(s) may be coupled to the storage driver. In various alternative embodiments, different arrangements of disk subsystems and/or storage accelerator units as described previously may or may not be present in the computer system.

In FIG. 71-27, the CPU directs a command (CMDA) to the storage driver SD1. As shown in FIG. 71-27, SD1 may then alter the data in CMDA in one or more ways. In one embodiment (e.g., as shown in FIG. 71-27, etc.), SD1 may add parity to the data in CMDA to form CMDB. Thus, in FIG. 71-27, WRITE1A is changed to WRITE1B with the addition of parity bit p0.

In FIG. 71-27, as part of the operation described SD1 may change the host block address HBA to an array block address ABA using a map. Thus, for example, in FIG. 71-27 the HBA of "101" in WRITE1A is changed to an ABA of "202" in WRITE1B. These command (e.g., address changes, data changes, etc.) may be transparent to the OS. These changes may be in addition to address changes, other error protection etc. provided by, for example, the OS, any storage array controller present, or disk controller.

The HBA to ABA mapping is known in the art for other applications, such as in the context of RAID arrays. While the CPU may issue a command to write data to a particular address (using an HBA), the RAID controller maps that to command(s) which direct that data to various parts of the RAID array (e.g., using one or more ABAs, etc.).

In various embodiments, using read commands issued autonomously (e.g., not by the CPU or OS, by SD1, etc.), errors may be identified and corrected that are not even apparent to other error protection methods. For example, command READ2B contains an error in b0, detected using added parity bit p0. The error in b0 is corrected in a subsequent write shown as WRITE3B in FIG. 71-27.

In various embodiments, the behavior of the software coding and correction operation(s) described may be controlled using a protection policy, as described in connection with FIG. 71-12B for example.

FIG. 71-28 shows a method to apply superimposed parity to a data set, in accordance with one embodiment. As an option, the method may be implemented in the context of any other Figure(s) or accompanying description(s). Of course, however, the method may be implemented in the context of any desired environment.

In FIG. 71-28, a CPU executes a storage driver SD1 and operating system OS1. In FIG. 71-28, SD1 is coupled to an IOV function IOV1. In FIG. 71-28, IOV1 is coupled to a storage array controller SAC1. In FIG. 71-28, SAC1 is coupled to a RAID array RA1. In FIG. 71-28, RA1 comprises four disks: D0, D1, D2, D3. In FIG. 71-28, RA1 is system disk D.

In FIG. 71-28, host disk commands CMDA are directed to target D. In FIG. 71-28, SD1 intercepts and modifies host disk commands CMDA and directs the modified disk commands CMDB to D. In FIG. 71-28, SAC1 maps HBA to ABA using MAP1. In FIG. 71-28, SAC1, using MAP2, maps disk commands CMDB to individual disk commands directed to disks D0-D3. In various embodiments, a plurality of CPUs and/or VMs are coupled to IOV function(s).

In FIG. 71-28, the storage driver alters the command (e.g., data, command, address fields, etc.) in one or more ways [e.g., SD1 may add parity to the data set, SD1 may modify the logical block address (LBA), etc.]. For example, in FIG. 71-28, CMD1A is a write ("W") directed to LBA 101 (and HBA) of system disk D: and contains write data b0 ... bn. In FIG. 71-28, SD1 modifies CMD1A to create CMD1B. In FIG. 71-28, CMD1B is a write ("W") directed to LBA 202 (an ABA) of system disk D: and contains write data b0 ... bn plus added parity (or other check bit, coding, etc.) p0 ... pm.

In FIG. 71-28, the storage driver maintains a map (MAP 1) that links addresses in CMDA to CMDB. In FIG. 71-28, this new command (CMDB) is passed to IOV1. In FIG. 71-28, IOV1 writes this command (CMDB), as well as other such manipulated commands from the plurality of CPUs in the CPU subsystem, to SAC1. In FIG. 71-28, SAC1 writes the data to one or more disks within the RAID array.

In one embodiment, the RAID array shown in FIG. 71-28 may be replaced by any disk subsystem(s). Alternatively, the RAID array shown in FIG. 71-28 may be a networked series of disks. In any case, the disk subsystem, RAID array etc., may appear as a single disk to the CPU (e.g., system disk D: etc.).

In FIG. 71-28, SAC1 maintains a map (MAP2) linking the addresses in the command stream CMDB for each CPU within the CPU subsystem to the address(es) in the RAID array.

FIG. 71-29A shows a method to apply multidimensional parity to a data set, in accordance with one embodiment. As an option, the method may be implemented in the context of any other Figure(s) or accompanying description(s). Of course, however, the method may be implemented in the context of any desired environment.

FIG. 71-29A, shows one scheme for determining data errors using three dimensions of parity. In this example, parity is added across the x, y, and z axes of a three dimensional array of data. In FIG. 71-29A, each plane may represent a different raw NAND memory device. Alternatively, each plane may represent a portion (e.g., block, page, slice, etc.) of one or more raw NAND memory device. Of course any type or combination of types (e.g., technology, etc.) of memory device(s) may be used.

In various embodiments, the parity bits (or other code bits, etc.), and therefore error protection and control, may be stored in a memory array (or other storage device, etc.) separable from the data set.

In some cases when using multidimensional parity addresses, the parity bits may be corruptible (e.g., subject to error(s), etc.). In various embodiments, the parity bits may be stored in separate, more reliable memory. Alternatively, the parity bits themselves may be protected by further coding schemes. Methods to achieve this may be implemented in the context of other Figures. Any of the coding schemes described in other Figure(s), as well as their accompanying text description(s), may be implemented in the method described.

FIG. 71-29B shows a method to apply dislocated parity to a data set, in accordance with one embodiment. As an option, the method may be implemented in the context of any other Figure(s) or accompanying description(s). Of course, however, the method may be implemented in the context of any desired environment.

In FIG. 71-29B, Data 1 uses Parity 1 and Data 2 uses Parity 2. In FIG. 71-29B, Data 1 is a copy of Data 2. In FIG. 29B, Parity 1 is different from Parity 2. In FIG. 71-29B, Data 1 and Parity 1 are stored on disk subsystem D1, Data 2 and Parity 2 are stored on disk subsystem D2.

It may be said that the parity schemes on D1 and D2 comprise dislocated parity. In FIG. 71-29B, there may be sufficient parity information on D1 to correct a class 1 of errors on D1 and sufficient parity information on D2 to correct a class 2 of errors on D2. For example in the simplest case both class 1 errors and class 2 errors may be a single error bit. Using dislocated parity (i.e., Parity 1 and Parity 2 together) it may be possible to correct a class 3 of errors. The class 3 may correspond to the ability to detect and/or correct (if we can correct we always detect) more errors than class 1 or class 2 i.e., dislocated parity offers better protection. Thus, for example, assume Parity 1 and Parity 2 are simple XOR parity schemes (i.e., all data bits shown connected to Parity 1 bits and Parity 2 bits in the graphs of FIG. 71-29B are XOR'd to form the parity bits, etc.). Thus, dislocated parity comprising Parity 1 and Parity 2 in FIG. 71-29B can detect and correct double errors, such as errors in bit 11 and bit 12 for example. Parity 1 alone cannot detect such double bit errors.

FIG. 71-29B shows an one exemplary scheme to illustrate the nature and use of dislocated parity. In other embodiments, more elaborate coding schemes, including but not limited to those described elsewhere herein, may be used to take advantage of dislocated parity to improve error detection and correction capabilities. There are many uses for parity (or other protection information, coding, etc.) information that is dispersed (e.g., spans multiple locations, stored in different places, etc.).

In one example of dislocated parity, if a disk fails and the parity scheme is difficult to work with (such as with proprietary RAID schemes etc.) by using a dislocated parity scheme there may be another disk with a different protection scheme that can be used to recover information.

In another example of dislocated parity, it may be better to create and then store some or all of dislocated parity information on different media to the data. For example, the parity information may be calculated on a machine that has the ability to calculate complex parity information quickly, has the ability to store parity information, but not necessarily the ability to permanently and reliably store large amounts of data. Conversely the machine that can store large amounts of data reliably may not be able to calculate complex parity information quickly.

In another example of dislocated parity, an increasing trend is the use of a large highly redundant array of unreliable inexpensive storage systems SI to create a reliable storage system SR. This is in contrast to a RAID array DR that builds a disk subsystem DS from a redundant array of disks DI, typically using a complex parity scheme such as RAID5 etc. In the case of such a system SR data is exactly duplicated typically at multiple locations. If parity is exactly duplicated at the multiple locations, the multiple copies of parity offer no advantage over simple redundancy. By using dislocated parity and different parity schemes at different locations, a system may offer greatly increased data protection.

In one embodiment, there may be more than two disk subsystems. Additionally, in one embodiment, disk subsystems (e.g., D1, D2, etc.) may be in different locations. In one embodiment, some disk subsystems may store only parity information.

In various embodiments, the dislocated parity may be calculated by a storage array controller, by a storage acceleration unit (such as those described elsewhere herein), by one or more CPUs/VMs, in software, and/or by a combination of these, etc. In various embodiments, different parity schemes, multiple parity schemes, or other parity schemes (or combinations of parity schemes) described elsewhere herein may be used.

FIG. 71-30 shows a method for parity storage, in accordance with one embodiment. As an option, the method may be implemented in the context of any other Figure(s) or accompanying description(s). Of course, however, the method may be implemented in the context of any desired environment.

The structure inherent in raw NAND flash devices allocates space set aside for data D and space allocated for protection data P. Parity coding, implementing any of the schemes described in previous figures or any other coding scheme, may be stored in the space allocated for protection data P. Alternatively, parity information may be stored in space allocate for data D, with an additional amount of parity information stored in the space allocated for protection data P or in any spare area(s) S.

In a contemporary NAND flash device with 2 kB pages a single Hamming code may be used for error correction. A 2 kB flash page may actually be 2112 bytes long with D comprising four data sections of 512 bytes each, a spare area S of 52 bytes (not used, from bytes 2049 to 2100), and P may comprise 3 bytes of protection data (ECC) for each of the 512-byte sections (for a total of 12 bytes or 96 bits of ECC).

In FIG. 71-30, a raw NAND flash memory device contains blocks B0-Bn and blocks P10-P1m. Each raw NAND flash memory device block may have preset areas for data and preset areas for protection data (e.g., parity, error-correcting code (ECC), etc.). In FIG. 71-30, block B0 uses space set aside for data to store data and uses space set aside for ECC to store protection data p0. In FIG. 71-30, block p10 uses space set aside for data and for ECC to store protection data p100-10j. This type of block may be referred to as a protection block.

In various implementations and embodiments, the protection data p0 may or may not use the same coding scheme (e.g., Hamming, Reed-Solomon, etc.) as the raw NAND flash memory device manufacturer normally uses. In various embodiments, protection blocks P10, P11, . . . P1m may be different formats from each other (e.g., using a layered, nested, or multidimensional parity or protection scheme, etc.). In various embodiments, protection blocks may be added (or subtracted) with time in a time-varying protection scheme as previously described.

Additionally, in various embodiments, the protection data (either p0-pn or the protection blocks) may be stored elsewhere, either on other raw NAND memory devices (e.g., SLC, MLC, etc.) or in a separate memory device(s), as data (which may also ne separately protected). For example, SLC flash is generally more reliable (but more expensive per bit) than MLC flash. Thus, for example, data bits may be stored in MLC flash and (some or all) protection data (e.g., bits, blocks, etc.) may be stored in SLC flash.

FIG. 71-31A shows a method 3100 for adjustable rate coding, in accordance with one embodiment. As an option, the method 71-31A3100 may be implemented in the context of any other Figure(s) or accompanying description(s). Of course, however, the method 71-31A3100 may be implemented in the context of any desired environment.

As shown, a rate of a code associated with one or more objects is identified. See operation 71-31A3102. Additionally, the rate of the code is modified. See operation 71-31A3104. In one embodiment, the method 71-31A3100 may include implementing a variable depth parity tree.

More illustrative information will now be set forth regarding various optional architectures and features with which the foregoing techniques discussed in the context of any of the present or previous figure(s) may or may not be implemented, per the desires of the user. For instance, various optional examples and/or options associated with the identifying of operation 71-31A3102, the modifying of operation 71-31A3104, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

FIG. 71-31B shows a method for adjustable rate coding, in accordance with one embodiment. As an option, the method may be implemented in the context of any other Figure(s) or accompanying description(s). Of course, however, the method may be implemented in the context of any desired environment.

The first scheme in FIG. 71-31B shows one parity level (P1) of parity bits (P10, P11, P12, P13) with each parity bit covering 4 data bits, and a second parity level (P2) of parity bits (P20 and P21) with each parity bit covering 8 data bits. This scheme provides overlapped protection for the data bits. This scheme is similar to a two-dimensional or multi-dimensional scheme but is more flexible.

The rate of a code R is the proportion of the data-stream that is useful (non-redundant). Thus, if an error-correcting code produces n bits of data (including protection data) from n bits of original data, the rate R=k/n.

In a scheme using adjustable rate coding, the number of data bits covered by parity bits may be varied within each parity level. Thus, if certain bits are identified as being more error prone (e.g., due to NAND flash wear, etc.), these bits may receive concentrated protection coverage (for example with one parity bit covering only 2 bits instead of 4 bits for a portion of the first level (as in P10, . . . , P13 in FIG. 71-31B), and covering 4 bits instead of 8 bits for a portion of the second level (as in P22, P23 in FIG. 71-31B). Thus, parity level P1 is parity level split to two parity levels, which may be written P1/2. Parity level P2 may be parity level split to two parity levels, P2/3.

Of course, in this scheme and other similar and/or related techniques, schemes, and embodiments shown in other figures or described in connection with other figures, parity (and references to the terms parity, parity code, parity bits, protection, and related terms, etc.) does not have to be a simple XOR function: any coding scheme (or combination(s) of coding scheme(s), etc.) may be used (e.g., parity, Reed-Solomon codes, BCH codes, ECC, SECDED, Hamming codes, LDPC, turbo codes, tornado codes, etc.).

In various embodiments, the parity level splits, number of splits, number of levels, protection coding within each split and/or level, or any or all of these and other architectural feature(s) may be adjusted (including, for example, time varying adjustments). Further, in various embodiments, such adjustments may be controlled using a protection policy, as previously described.

FIG. 71-32 shows a method for implementing a variable depth parity tree, in accordance with one embodiment. As an option, the method may be implemented in the context of any other Figure(s) or accompanying description(s). Of course, however, the method may be implemented in the context of any desired environment.

A parity tree may be composed of multiple parity levels. Each parity level may cover a different number of data bits. For example, in FIG. 71-32, parity level P0 covers every two data bits, P1 four data bits, P2 eight data bits, and so on. In another embodiment, more than one parity tree may be used.

In one embodiment, protection may be modified with triggers as more (or less) data and error protection and control is required. For example, parity trees may be added/subtracted/modified, parity levels may be added, parity levels may be subtracted/removed, parity levels and tree topology/architecture may be modified, protection coding scheme(s) may be changed, and/or protection data (some or all) may be moved, etc. In various embodiments, the protection may be modified over time, as a function of storage device wearout, as a function of reported or predicted error rate, and/or according to one or more protection policies, etc.

In one embodiment, the parity tree may be updated each time new data is written. Additionally, in one embodiment, changes to the parity tree may be written to a protection log file. In another embodiment, the parity tree(s) are recorded in one or more protection log files.

In some embodiments, one or more of the parity tree(s) may only be updated periodically based on the transactions in the protection log file(s). In this manner, the parity tree(s) may be updated at different times than the data. The parity tree(s) (or parts of the parity trees, etc.) may only need to be assembled (e.g., read, constructed from protection log files, etc.) when an error has occurred.

In one embodiment, the parity tree(s) (or a needed/required part of the parity trees) may only be updated from parity log file(s) after an error has occurred. In some embodiments, one or more of the protection log file(s) and/or parity tree(s) may be stored separately from the data.

In various embodiments, the parity information may be one or more set(s) of code bits constructed using one or more coding scheme(s) that uses fast executing instructions or operations on CPUs/VMs in local or remote computer systems (e.g., Intel media functions, vector instructions, Intel Streaming SIMD Extension (SSE), other hardware accelerated instructions and functions, etc.).

In various embodiments, and in other similar schemes, as well as in embodiments shown in other figures or described in connection with other figures, the parity information or other/additional protection information/data may be constructed using the logic and/or memory resources of one or more SAUs.

Using these and other techniques, the parity (e.g., protection information, protection data, error coding, etc.) may be disconnected from the data (e.g., in location, the time it is updated, and when it is read, etc.).

FIG. 71-33 shows a method for implementing overlapped parity, in accordance with one embodiment. As an option, the method may be implemented in the context of any other Figure(s) or accompanying description(s). Of course, however, the method may be implemented in the context of any desired environment.

FIG. 71-33 shows another embodiment of the parity tree, with overlap in each parity level between bits. This method may be referred to as overlapped parity. The number of parity bits for each data bit may be referred to as the overlap degree.

In FIG. 71-33, parity bit P10 covers data bits b0-b3, parity bit P11 covers data bits b2-b5, parity bit P12 covers data bits b4-b7, and parity bit P13 covers data bits b0, b1, b6, b7. In FIG. 71-33, for clarity of explanation, each parity bit at each parity level (there is only one parity level P1 in FIG. 71-33, but there may be more than one parity level) covers the same number of data bits, in contrast to FIG. 71-32, but in general need not cover the same number of data bits. This means that the overlap degree for the parity structure (e.g., architecture, topology, graph structure, etc.) of FIG. 71-33 is uniform and equal to 2. In other words, every data bit is covered by two parity bits.

In various embodiments, the overlap degree may be different between parity levels, may vary (e.g., with time, etc.), and may be non-uniform (e.g., vary within a parity level). Additionally, in various embodiments, the parity structure (e.g., number of parity levels, overlap degrees, etc.) may be changed using a protection policy as previously described. In various embodiments, the appropriate choice of coverage of parity bits may allow for a unique set of parity bits to represent each data bit.

FIG. 71-34 shows a method for implementing variable coding, in accordance with one embodiment. As an option, the method may be implemented in the context of any other Figure(s) or accompanying description(s). Of course, however, the method may be implemented in the context of any desired environment.

In FIG. 71-34, a CPU is coupled to a storage driver SD1. In FIG. 71-34, SD1 is coupled to a disk subsystem D1. In FIG. 71-34, the storage driver SD1 may be part of an OS (not shown). Alternatively, the storage driver may be part of the software supplied with a storage array controller (not shown). In yet another embodiment, SD1 may be software independent of OS and/or hardware.

In one embodiment, multiple CPUs and/or VMs may be present in the computer system. In FIG. 71-34, the commands issued by the storage driver SD1 may correspond to the commands issued from the CPU. In one embodiment, the commands issued from the storage driver SD1 may be altered. For example, the scheme(s) illustrated in FIG. 71-27 and described in the accompanying text may be employed.

In FIG. 71-34, the number of writes to each LBA may be recorded in a write tracking log file (1). In FIG. 71-34, the number of errors encountered in each LBA may be recorded in an error tracking log file (2). In one embodiment, the location(s)/bit(s) that generate those errors may also be recorded.

In various embodiments, the error tracking log file and write tracking log file may be stored on disk in one or more files, may be stored in memory in an SAU or SAC etc, or a combination of these schemes. In FIG. 71-34, a coding scheme, or change to a current coding scheme, or selection of a new coding scheme, may be chosen based on the information in the error tracking log file and/or the write tracking log file. These coding schemes may be any of the schemes, described in other Figures and/or the accompanying text, any combinations of such scheme(s), or alternatively any arbitrary coding scheme(s). The system of FIG. 71-34 may thus implement a variable coding scheme, in accordance with one embodiment.

In various embodiments, as a result of change(s) (e.g., variation, modification(s), alteration(s), etc.) in protection scheme(s) used, additional information may be gathered and/or revealed (e.g., unreliable bits, vulnerable data, etc.) and further actions may be taken. For example, further actions may be taken to protect data appropriately (e.g., by using read/correction, increasing error protection levels, further changing protection scheme(s), etc.). In various embodiments, the control of such variable coding scheme(s) as described may be performed using a protection policy, as previously described.

FIG. 71-35 shows a method for clearing and reloading data from a storage accelerator unit, in accordance with one embodiment. As an option, the method may be implemented in the context of any other Figure(s) or accompanying description(s). Of course, however, the method may be implemented in the context of any desired environment.

In FIG. 71-35, a CPU is coupled to a storage array controller SAC1. In FIG. 71-35, SAC1 may be coupled to a storage accelerator unit SAU1. In FIG. 71-35, SAC1 is coupled to a disk subsystem D1. In FIG. 71-35, a blocklist BL1 is kept. In FIG. 71-35, BL1 is a list of data blocks A in SAU1 (A, F, G, J).

In FIG. 71-35, data block(s) A are stored in SAU1. In FIG. 71-35, data block(s) A are a subset of data stored in D1. In FIG. 71-35, data blocks A, F, G, and J represent a subset of data A through J in data block(s) B on disk subsystem D1.

In FIG. 71-35, the data shown may be any of the data described in previous figures (but not necessarily). In FIG. 71-35, the method includes creation of a blocklist log file that contains the list of the blocks of data stored in SAU1 (BL1). In one embodiment, the blocklist log file may be stored separately from the storage accelerator unit.

In FIG. 71-35, if the memory of SAU1 and thus data stored in SAU1 is cleared (e.g., either intentionally or accidentally through system failure, etc.), the data may be quickly (e.g., in fractions of a second) re-loaded to SAU1 from the disk subsystem D1 according to BL1. Otherwise, it may take hours, days or even longer to reconstruct the data gathered by SAU1 from monitoring hours/days/weeks of disk subsystem activity according to one of the schemes previously described (e.g., that of FIG. 3 or 4, etc.).

In various embodiments, a similar scheme may be used to re-load data in a storage array controller or other similar controller function.

FIG. 71-36A shows a method 71-36A3600 for generating a response to the at least one read signal, in accordance with one embodiment. As an option, the method 71-36A3600 may be implemented in the context of any other Figure(s) or accompanying description(s). Of course, however, the method 71-36A3600 may be implemented in the context of any desired environment.

As shown, a plurality of responses from a plurality of systems are received, in response to at least one read signal sent to the plurality of systems. See operation 71-36A3602. Additionally, a response to the at least one read signal is generated, based on the plurality of responses from the plurality of systems. See operation 71-36A3604.

In one embodiment, the response to the at least one read signal may be generated based a majority of the plurality of responses from the plurality of systems. Additionally, in one embodiment, at least one processor may be utilized to generate the at least one read signal that is sent to the plurality of systems.

More illustrative information will now be set forth regarding various optional architectures and features with which the foregoing techniques discussed in the context of any of the present or previous figure(s) may or may not be implemented, per the desires of the user. For instance, various optional examples and/or options associated with the receiving of operation 71-36A3602, the response generation of operation 71-36A3604, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

FIG. 71-36B shows a method for implementing weighted reads, in accordance with one embodiment. As an option, the method may be implemented in the context of any other Figure(s) or accompanying description(s). Of course, however, the method may be implemented in the context of any desired environment.

In FIG. 71-36B, a CPU issues a read command RD1 (1) directed to a set of disks D1-D3. In FIG. 71-36B, the read command may be sent (e.g., through a storage array controller, etc.) to the plurality of disks as RD2, RD3, RD4 (2). In one embodiment, the disks may be in different locations. In one embodiment, each disk may contain a copy of the data.

In FIG. 71-36B, the response(s) from each disk are sent to a majority circuit, RESPONSE1, REPONSE2, REPONSE3 (3). In FIG. 71-36B, the responses from each disk are weighted by majority circuit M1 (4). In FIG. 71-36B, M1 may weight each response equally. Alternatively, greater weight may be allocated to a particular disk [e.g., if a disk or disk subsystem is reported as more or less reliable (due to cost, technology, etc.), if a disk has a lower reported or predicted error rate (due to wearout, etc.), storage network(s) error rate(s), intermediate network(s) error rate(s), etc.]. In FIG. 71-36B, the response from M1 is sent to the CPU as RESPONSE4 (5).

In another embodiment, the read command may be sent to a plurality of storage accelerator units, or other memory components. The response from each SAU may be sent to one or more majority circuit(s) that construct a response considering any of the factors previously described.

FIG. 71-37A shows a method 71-37A3700 for requesting a plurality of objects from a plurality of systems in different order, in accordance with one embodiment. As an option, the method 71-37A3700 may be implemented in the context of any other Figure(s) or accompanying description(s). Of course, however, the method 71-37A3700 may be implemented in the context of any desired environment.

As shown, at least one read signal is received for a plurality of objects that are stored at each of a plurality of systems. See operation 71-37A3702. Based on the at least one read signal, a plurality of read signals are generated for requesting the plurality of objects from the plurality of systems in different order. See operation 71-37A3704. In one embodiment, a first one of the objects may be requested from a first one of the systems before a second one of the objects is requested from the first one of the systems, and the first one of the objects may be requested from a second one of the systems after the second one of the objects is requested from the second one of the systems.

More illustrative information will now be set forth regarding various optional architectures and features with which the foregoing techniques discussed in the context of any of the present or previous figure(s) may or may not be implemented, per the desires of the user. For instance, various optional examples and/or options associated with the receiving of operation 71-37A3702, the generating of the operation 71-37A3704, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

FIG. 71-37B shows a method for implementing reordering reads, in accordance with one embodiment. As an option, the method may be implemented in the context of any other Figure(s) or accompanying description(s). Of course, however, the method may be implemented in the context of any desired environment.

In FIG. 71-37B, the system re-orders reads. In FIG. 71-37B, a CPU (not shown) may issue a read command READ1 for three blocks (or sectors, metadata, files, other objects, etc.): A, B, C. An intermediate storage array controller (SAC) (not shown) or intermediate storage accelerator unit (SAU) (not shown) (or other intermediate software or hardware component or combination of hardware/software) may translate the READ1 command into three read commands (READ1, READ2, READ3) that target three disks (DISK1, DISK2, DISK3—not shown). The agent that maps READ1 to READ2-READ4 may be referred to as an intermediate storage device.

In one embodiment, the disks may be in different locations. In one embodiment each disk may contain a copy of the data. In FIG. 71-37B, the intermediate storage device either re-orders the commands or modifies the commands so that data is requested from each of the disks in a different order. For example, DISK1 may receive the command to read A, B, C in that order; DISK2 may receive the command to read in the order B, C, A; and DISK3 may receive the command to read in the order C, A, B. In another embodiment, each read command may be sent to one or more storage accelerator units (SAUs).

In FIG. 71-37B, the CPU may receive the complete read response (containing blocks A, B, C) quicker, even if the majority circuit in FIG. 71-36B is used, than if each data block is read from a disk or disks in the same sequential order. For example, suppose the responses are received at the times shown in FIG. 71-37B. In FIG. 71-37B, we assume that responses from disks start at t0. Thus, A from DISK1 is received between t0 and t1; B between t4 and t5; and C between t8 and t9. Assuming the intermediate device can assemble RESPONSE4 after it receives all of A, B, C, then the CPU may receive A, B, C at a time equal to the latest of t1, t5, t9 or MAX (t1, t5, t9). There is a possibility of extra time in responses from DISK2 and DISK3 (which start at t4 and t8, assumed later than or equal to t0), but in general there is no reason not to assume that t4 and t8 are equal to t0. In any event, the general case is as shown with the required responses arriving at t1, t5, t9.

In FIG. 71-37B, without read reordering the CPU would have to wait until MIN (t3, t7, t11). If MAX (t1, t5, t9)<MIN (t3, t7, t11), then re-ordering reads is faster. If MAX (t1, t5, t9) >MIN (t3, t7, t11) (e.g., if DISK1 was more than 3 times faster than DISK2 or DISK3, etc.), assembling RESPONSE4 from re-ordered reads may not help. However, in such a case RESPONSE4 may still be assembled as fast as possible by taking the output from the fastest disk, which is DISK1 in this example.

In FIG. 71-37B, using a simple read plan (e.g., re-order reads as shown and take the earliest complete set of responses from three disks or from one disk) the response is MIN [(MAX (t1, t5, t9), MIN (t3, t7, t11)].

In another embodiment, the intermediate device may chop reads. For example, READ2 may only request block A, READ3 may only request B, READ4 may only request C. In various embodiments, different read chop factors may be used (e.g., READ1 requests A and C, READ2 requests A and B, READ3 requests B and C, etc.). In one such embodiment, read chop factors may be uniform (e.g., all reads have the same size, number of objects, etc.) or non-uniform.

In various embodiments, the intermediate device may use different read plans. For example, the intermediate device may use re-ordering or chop reads according to different schemes and/or plan assembly of a read response based on the relative (e.g., measured, predicted, or programmed, etc.) latencies and speeds (e.g., disk bandwidth, storage system bandwidth, network bandwidth, etc.). In various embodiments, the read plans, read chop factors etc. used in read re-ordering may be controlled by a read policy, as described previously.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

FIG. 71-38 shows a storage accelerator unit (SAU) on a PCI-E card, in accordance with one embodiment. As an option, the SAU may be implemented in the context of any other Figure(s) or accompanying description(s). Of course, however, the SAU may be implemented in the context of any desired environment.

In FIG. 71-38, the Storage Accelerator Unit (SAU) is assembled on a PCI-E card (e.g., printed-circuit board (PCB), etc.). In FIG. 71-38, the SAU includes one or more flash memory devices (e.g., NAND flash, MLC flash, SLC flash, combinations of these and/or other flash memory). In FIG. 71-38, the SAU includes one or more logic devices (e.g., ASICs; ASSPs; CPUs; microcontrollers; FPGAs; other custom, semi-custom, programmable semiconductor devices; combinations of these and/or other logic/analog/support component(s), etc.). In FIG. 71-38, the SAU is connected (e.g., coupled, etc.) to a computer system (not shown) using a bus connector (e.g., PCI-E ×1, PCI-E ×4, PCI-E ×8, PCI-E ×16, or other bus connector(s), etc.). In FIG. 38, the SAU is optionally connected to one or more disk subsystems using one or more storage connectors (e.g., SATA, SAS, etc.). In FIG. 71-38, the SAU has an option to connect to one or more memory modules. In FIG. 71-38, the memory module contains one or more DRAM devices.

In one embodiment, the SAU is separate from any disk controller(s) in the computer system. In such an embodiment the computer system may contain other PCI-E card(s) or similar components (e.g., assemblies, modules, etc.) that perform the function of one or more disk controllers.

In one embodiment, a single PCI-E card (or other similar assembly) may contain multiple SAUs.

In one embodiment, one or more SAUs may be assembled on any type of card (e.g., PCB, planar, board, etc.) or indeed any type of electronic or other system assembly or sub-assembly (e.g., part of a CPU module, integrated devices on a motherboard or system planar, integrated (e.g., on chip(s), semiconductor device(s), integrated package(s), multi-chip device(s), etc.) with one or more other system component(s), etc.).

In one embodiment, the SAU (or multiple SAUs) may include (e.g., the SAUs may subsume, contain, comprise, etc.) one or more functions of one or more disk controllers. In such an embodiment, the functions (or portion(s) of the functions) of the disk controller(s) and SAU(s) may be contained, for example, in a single or in multiple logic devices. In such an embodiment the SAU (also performing the functions of one or more disk controllers) may be connected to one or more disk subsystems using one or more storage connectors, as shown in FIG. 71-38 for example.

In one embodiment, the SAU may include one or more types of memory devices (e.g., chips, die(s), packages, etc.). The different types of memory device may, for example, be different types of flash memory devices or may be different types of memory technology. In one such embodiment, the SAU may include multiple flash memory devices (e.g., multiple NAND flash devices, multiple MLC flash devices, multiple SLC flash chips, etc.). In one such embodiment, the SAU may contain multiple instances (e.g., packages, die(s), devices, etc.) of more than one type of memory device (e.g., multiple MLC flash devices together with multiple SLC flash devices, multiple MLC flash devices together with multiple DRAM devices, etc.).

In one embodiment, the SAU may have the option to add (e.g., using a socket, plug-in card, memory module, other module, etc.) one or more types of additional components. In one embodiment, the additional components may include memory (e.g., a plug-in module including DRAM device(s), etc.). In one embodiment, the additional components may include multiple types of memory (e.g., a plug-in memory module containing DRAM device(s) and flash memory device(s), etc.).

In one embodiment, the additional components may allow any volatile memory to be copied (e.g., using checkpoint operation(s), saved, restored, etc.).

In one embodiment, the SAUs and/or one or more memory modules may include NAND flash, DRAM memory, and other support components (e.g., voltage regulator(s); ASIC(s); FPGA(s); CPU(s); microcontroller(s); switching logic; one or more switches; power controller(s); checkpoint/restore logic; other switching, housekeeping, power, and logic functions, etc; passive components; crystals; integrated combinations of these; etc.).

In one embodiment, the SAUs may include one or more disk subsystem(s). For example, one or more of the memory devices shown in FIG. 71-38 (e.g., mounted on the card, mounted on a memory module, included by other means, etc.) may be used as part of one or more disk subsystem(s).

In one embodiment, one or more disk subsystems (or other storage system component(s), etc.) may be mounted (either permanently or in a removable fashion, etc.) or otherwise logically and/or physically coupled to the SAUs. For example, one or more storage devices (e.g., disks, SSDs, flash cards, flash packages, flash modules, flash assemblies, memory modules, DIMMs, combinations of these, etc.) in any form factor(s) (e.g., 2.5" disk, PCIe mini card, compact flash card, mini SD cards, USB sticks, DIMM, SO-DIMM, other standard form factor(s), combinations of these, combinations of these with other non-standard form factor(s), etc.) may be coupled (e.g., logically and/or physically connected via connector(s), socket(s), plug-in module(s); via cable(s); via one or more buses; via cascade(s) of buses; via other system component(s) (e.g., CPU(s), chipset(s), disk controller(s), etc.); permanently soldered; otherwise coupled and/or connected and/or mounted; etc.) to one or more SAUs.

In one embodiment, one or more SAUs may be coupled to one or more disk controllers via one or more buses (e.g., PCI-E, internal system bus, on-chip bus, etc.) or a cascade of bus(es), etc.

In one embodiment, one or more SAUs may be physically coupled to one or more CPUs (e.g., using PCI-E or one or more similar bus(es), etc.).

In one embodiment, one or more SAUs may be logically coupled to one or more CPUs via an IOV function. The IOV function(s) may be performed in hardware, software, firmware or a combination of these.

In one embodiment, the function of the SAU (or one or more portion(s) of the SAU or the SAU function(s), etc.) may be integrated with one or more CPU(s) or other computer system (or disk subsystem, or storage system, etc.) component(s) (e.g., IOV logic, chipset(s), I/O controller(s), ASSPs, ASIC(s), FPGA(s), etc.).

In one embodiment, the function(s) of the SAUs may be distributed (e.g., spread out, variously assigned, partitioned, etc.) between hardware and/or software and/or firmware. For example, some SAU functions may be performed in one or more CPUs (in the CPU complex of the computer system(s) or elsewhere in the system(s), etc.) and/or one or more disk controller(s) and/or one or more other system components (e.g., ASICs, FPGAs, ASSPs, microcontrollers, CPUs, etc.).

In one embodiment, one or more functions of the SAU (or other part(s) of the system(s), etc.) may be performed by one or more hardware and/or software and/or firmware components in cooperation (e.g., in conjunction, working together, in collaboration, etc.). Thus, for example, certain function(s) may be performed partly by software in a CPU (e.g., a driver, etc.) in cooperation with hardware functions in a logic device (e.g., chip, ASIC, etc.) on an SAU and/or disk controller, etc.

In one embodiment, software may operate to control one or more SAUs. For example, the software may include the ability to control policies (e.g., retention policy, backup policy, commit policy, read policy, write policy, eviction policy, sequentialization policy, target policy, temperature policy, object temperature policy, flush policy, transaction policy, replication policy, protection policy, move policy, trigger policy, proxy policy, other policies, etc.).

In one embodiment, the control software may be integrated (or partially integrated) with the computer system OS (e.g., one or more storage driver(s), part of the kernel, part of one or more filesystem(s), stand-alone application(s), combinations of these, etc.). In one embodiment, the control software may allow policies etc. to be controlled (e.g., changed, altered, entered, modified, set, etc.) at system boot time. In one embodiment, the control software may be part of the computer system (or disk subsystem, storage system, etc.) firmware (e.g., part of BIOS, Extensible Firmware Interface (EFI), Open Firmware, etc.). In one embodiment, the control software may be part of the firmware and/or software of one or more disk controllers (e.g., additional driver, part of embedded firmware, part of embedded OS, etc.).

FIG. 72-1 shows a method 72-100 for modifying content, in accordance with one embodiment. As an option, the method 72-100 may be implemented in the context of the architecture and environment of any subsequent figure(s). Of course, however, the method 72-100 may be carried out in any desired environment.

As shown, a content request for content is received from a device, the content request including information associated with at least one aspect associated with the device. See operation 72-102. Further, the content is modified based on the information. See operation 72-104. Additionally, the content is sent to the device. See operation 72-106.

The device may include any stationary or mobile device. For example, in various embodiments the device may include a computer (e.g., a desktop computer, a laptop computer, a tablet computer, etc.), a mobile phone, a PDA, a GPS device, an e-book reader, a media player (e.g., an audio media player, a video media player, etc.), and/or any other type of device. Furthermore, the content may include any type of content. In various embodiments, the content may include video, text, and/or audio.

The information associated with the aspect associated with the device may include any type of information associated with the device. For example, in various embodiments, the at least one aspect associated with the device may include at least one of a behavioral-related aspect, an operational-related aspect, an environmental-related aspect, a hardware-related aspect, a software-related aspect, an input-related aspect, an output-related aspect, a user-related aspect, and/or any other aspect, or combination(s) of aspects associated with the device.

In various embodiments, the user-related aspect may include any aspect related to the user or use of the device, including user preferences, user habits, user configuration settings, and/or various other user-related aspects. Additionally, in various embodiments, the output-related aspect may include any output-related aspect associated with the device, including output configuration settings, output preferences, output requirements, output capability associated with the device, and/or various other output-related aspects.

Further, in various embodiments, the input-related aspect may include any input-related aspect associated with the device, including input configuration settings, input preferences, input requirements, input capability associated with the device, and/or various other input-related aspects.

The software-related aspect may include any aspect associated with software stored on the device, in communication with the device, and/or utilized by the device. In various embodiments, the software may include firmware, one or more applications, and/or various computer programs. In one embodiment, the software-related aspect may be associated with an operating system version or a firmware version.

Additionally, the hardware-related aspect may include any aspect associated with hardware of the device. For example, in various embodiments, the hardware-related aspect may include a model-related aspect, a memory-related aspect, a display-related aspect, a processor-related aspect, a sensor-related aspect, a wireless aspect, a radio aspect, and/or various other aspects associated with the hardware.

The environmental-related aspect may include any aspect of an environment, including location, a light level of the environment, an amount and/or orientation and nature (e.g., temperature of light source, characteristics of light source, etc.) of light hitting the device, an ambient temperature, a temperature of the device (e.g., components, case, etc.), an noise level (e.g., ambient noise, background noise, maximum noise level, etc.), a movement (e.g., shaking, vibration, etc.) of device, orientation of the device (e.g., vertical, horizontal, etc.), radio frequency (RF) environment (e.g., RF signal level(s) at various point(s) in the RF spectrum, noise, interference, etc.), and/or various other environmental-related aspects.

Further, in various embodiments, the behavioral-related aspect may include any aspect of behavior of the device including information as to how the device performs under different environmental conditions, information about optimal performance modes, current behavior-related information, and/or various other information associated with the behavior of the device.

The operational-related aspect of the device may include any number of operational related aspects, including an operating mode, an optimal operating mode, an operating temperature, a processor speed, a sound level, a display intensity, and/or various other operational-related aspects.

In one embodiment, a data request may be sent for data associated with the device, where the content is processed based on the data. In one embodiment, that data request may be sent in response to the receipt of the content request. Further, in one embodiment, the data request may be sent in response to one or more initial interactions with the device. Additionally, in one embodiment, the data request may be periodically sent to the device. In one embodiment, the data associated with the device is stored in a database for use in processing different content associated with different content requests.

In one embodiment, the content may be sent over time and may be modified multiple times based on updated information associated with the device. For example, in one embodiment, the content may be sent and information associated with the device may be received. As a result of receiving the information associated with the device, the content may be modified. Further, updated information associated with the device may then be received and the content may be modified again.

In one embodiment, at least one pre-existing version of the content may be selected from a plurality of pre-existing versions of the content based on the information, in response to the content request for content. Additionally, in one embodiment, the selected at least one pre-existing version of the content may be modified. For example, in one embodiment, various versions of the content may be available for various devices and/or various states of the device.

In one embodiment, the content may be modified to generate a plurality of modified versions of the content based on the information, in response to the content request for content. Additionally, in one embodiment, the content may be modified to generate a plurality of modified versions of the content based on the information, in response to the content request for content. In one embodiment, multiple of the plurality of modified versions of the content may be sent to the device. Further, in one embodiment, the received content may be modified, by the device, based on at least one additional aspect associated with the device, in response to receipt of the content by the device. In various embodiments, the additional aspect associated with the device may include at least one of a behavioral-related aspect, an operational-related aspect, an environmental-related aspect, a hardware-related aspect, a software-related aspect, an input-related aspect, an output-related aspect, a user-related aspect, and/or any other aspect associated with the device.

More illustrative information will now be set forth regarding various optional architectures and features with which the foregoing techniques discussed in the context of any of the present or previous figure(s) may or may not be implemented, per the desires of the user. For instance, various optional examples and/or options associated with the receiving the content request for content of operation 72-102, the modifying the content based of operation 72-104, the sending of content to the device of operation 72-106, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

FIG. 72-2 shows a method 72-200 for modifying content, in accordance with another embodiment. As an option, the method 72-200 may be implemented in the context of the architecture and environment of the previous Figures or any subsequent Figure(s). Of course, however, the method 72-200 may be carried out in any desired environment. It should also be noted that the aforementioned definitions may apply during the present description.

As shown, a device requests information content from a cloud source. See operation 72-202. The cloud source may include any system or device capable of operating as a source in a cloud. In one embodiment, the cloud source may include one or more databases and/or repositories. Further, the device may include any type of device, including a mobile phone, a tablet computer, an e-book reader, a PDA, a GPS device, a notebook computer, and/or any other type of device. In one embodiment, the cloud source may receive the request for information content.

As shown further, it is determined whether to modify the information content. See decision 72-204. In one embodiment, the cloud source may determine whether to modify the content (e.g., based on information received by the device, etc.). In another embodiment, the device may determine whether to modify the content. For example, in one embodiment, the cloud source may be configured to send information content in a predefined manner and the device may determine that the information content should be modified. Further, in one embodiment, the device may receive the information content and determine that the information content should be modified (e.g., by the device, the cloud source, etc.).

Additionally, the device and/or cloud source may operate on one or more parameters (e.g., battery charge level from the device, device location, etc.) to calculate the type of modification to apply to the information content. See operation 72-208. The parameters may include any parameter associated with the device including a behavioral-related parameter, an operational-related parameter, an environmental-related parameter, a hardware-related parameter, a software-related parameter, an input-related parameter, an output-related parameter, a user-related parameter, and/or any other parameter associated with the device.

In various embodiments, once the type of modification is determined, the device and/or cloud source may modify the information content. In one embodiment, the cloud source may select the appropriate information content from a group of pre-modified sources. For example, it may be determined (e.g., by the cloud source or the device, etc.) whether to select from pre-modified sources. See decision 72-212. In one embodiment, it may be determined whether to select from pre-modified sources based on availability of pre-modified content.

If it is determined to select the content from pre-modified sources, the appropriate information content is selected from one or more pre-modified content sources. See operation 72-216.

In one embodiment, the pre-modified sources may include content that has been pre-modified based on previous interactions between the cloud source and the device. Further, in one embodiment, the pre-modified sources may include content that has been pre-modified based on one or more test processes (e.g., a test process to determine optimum delivery of the content, etc.).

If it is determined that the content is not to be selected from a pre-modified source, the information content is modified. See operation 72-214. Furthermore, one or more parts of the information content are transferred from the cloud source. See operation 72-218. In one embodiment, the device may download the one or more parts of the information content from the cloud source.

As shown further, it is determined whether to further modify the content. See operation 72-220. If it is determined to further modify the content (or modify the content once received by the device, etc.), the information content is modified (e.g., by the device, or the cloud source, etc.). In one embodiment, the content may be modified by the device, once received by the device. Additionally, in one embodiment, the device may provide the content source with additional information that the content source may use to further modify the content.

FIG. 72-3 shows a system 72-300 for modifying content, in accordance with one embodiment. As an option, the system 72-300 may be implemented in the context of the architecture and environment of the previous Figures or any subsequent Figure(s). Of course, however, the system 72-300 may be implemented in any desired environment. It should also be noted that the aforementioned definitions may apply during the present description.

As shown, a cloud source 72-306 is provided. In various embodiments, the cloud source 72-306 may include storage, a server, a service, and/or any other system capable of providing information content. The information content may include any type of content including information content associated with movies, streaming media, audio, email, data, social media, search results, maps, pictures, and/or various other content.

Further, one or more devices 72-302 and 72-304 are provided for receiving, processing, and/or displaying the information content. The devices 372-02 and 72-304 may include various devices, such as mobile phones, notebook computers, desktop computers, tablet computers, e-book readers, PDAs, GPS devices, media players, and/or various other devices.

In one embodiment, the displays associated with the devices 72-302 and 72-304 (and their associated software drivers, hardware drivers, etc.) may have optimum display settings (e.g., brightness, contrast, color gamut, backlight, etc.) or other display properties (e.g., portions of the display with different properties, etc.) that may be different for different display and/or device conditions (e.g., indoor lighting, outdoor lighting, battery condition, display(s) attached, etc.) and different display content (e.g., web page, photograph, movie, search result text, etc.).

In one embodiment, information content may be modified [e.g., for different sources (e.g., different files, locations, directories, etc.) used, different content substituted, movie encoding changed, audio encoding changed, encoding properties altered, text properties altered, etc.]. In one embodiment, the cloud source 72-306 may be operable to modify the information content. Further, in one embodiment, the devices 72-302 and/or 72-304 may be operable to modify the information content.

In one embodiment, the cloud source 72-306 and the devices 72-302 and/or 72-304 may together be operable to modify the information content. Additionally, in one embodiment, combinations of the cloud source 72-306, other computer systems, and the devices 72-302 and/or 72-304 may be operable to modify the information content.

In one embodiment, one or more display settings and/or display properties (e.g., display brightness, back light intensity, location on display of information content, type of display used, location of display, etc.) may be changed (e.g., by a user, by the device, automatically, manually, combinations of these, etc.) as a response to change of conditions [e.g., detected using device an ambient light sensor, a device position sensor, a GPS location, user input, user position, battery condition, power consumption (e.g., past, present, projected, etc.), information content size, type of content (e.g., movie, streaming video, etc.), movie length or other movie property, etc.].

In one embodiment, the information content may be altered (e.g., text shortened, text font size increased, graphics expanded, movie compressed, pictures sorted, web page or style sheets modified, etc.). Further, in one embodiment, the information content may be altered to achieve optimum results (e.g., best viewing experience, least energy consumed, etc.).

In one embodiment, information content (e.g., picture, movie, etc.) downloaded from cloud storage 72-306 may be modified in the cloud according to whether the user is indoors or outdoors (e.g., display conditions may be modified, etc.). In one embodiment, information content may already be modified prior to the user requesting information content. For example, in one, embodiment, a plurality of previously modified content may be present (e.g., on the cloud storage 72-306, etc.).

In one embodiment, the information content modification type (e.g., change, manipulation, alteration, transformation, translation, etc.) may include one or more of contrast, resolution, color (e.g., from 256 to 16 colors, color to black and white, color to gray scale, etc.), frame rate, encoding (e.g., AVI to mp4, etc.), text formatting (e.g., font typeface, font size, serif to/from sans serif, text layout, style sheet or equivalent, etc.), file type and/or file extension (e.g., GIF to JPG, .doc to .pdf, etc.), and/or any other property (e.g., text or image property, etc.).

In one embodiment, information content may be modified according to device display properties (e.g., modified for adjustable back-lighting regions of the display, etc.). Furthermore, in one embodiment, information content may be modified according to user control (e.g., pre-programmed settings, on the fly, etc.).

In various embodiments, information content may be modified by the device automatically as a result of device parameters, measurements, settings, preferences, sensor inputs (e.g., using ambient light sensors, wireless connectivity, RF signal strength, etc.), etc. In one embodiment, information content may be modified statically. For example the information content modification type may be determined once and one version of modified information content may be used (e.g., delivered to device, processed by device, etc.).

Further, in one embodiment, information content may be modified dynamically. For example, a user may move from indoors to outdoors and the information content modification type may change as the users moves, etc. In various embodiments, the information content modification may be performed dynamically by the cloud storage, by the device, by other computer systems, or by combination of these, depending on the type of information content modification.

In one embodiment, multiple modified versions of the information content may be received by the device. Additionally, in one embodiment, part of the information content modification may be performed by the cloud source and part of the information content modification may be performed by the device.

In one embodiment for modifying content, information content modification may include insertion of information. For example, in one embodiment, one or more advertisements may be inserted depending on user location, etc.

In one embodiment, information content modification may include deletion of information. For example, in one embodiment, advertising may be removed depending on user and/or device settings [e.g., device user (e.g., child, parent, etc.), user location (e.g., inside, outside, stadium, store, park, movie theater, mall, restaurant, etc.), application being used, payment for premium service, demographics, etc.].

In one embodiment, information content modification may include modification of advertising information. For example, in various embodiments, the text, prices, currency, graphics, video, language, audio track, clothing style, clothing sizes, type of food, product versions, etc. of advertisements may be modified.

In one embodiment, information content modification may include indirect modification of content (e.g., altering a style sheet, altering a .css file, altering display program, altering routine or method settings, altering user and/or device settings or preferences, web redirect; etc.). Different applications and different forms/types of information content may further modify, change, or elaborate on this general flow.

FIG. 72-4 shows a method 72-400 for modifying content, in accordance with another embodiment. As an option, the method 72-400 may be implemented in the context of the architecture and environment of the previous Figures or any subsequent Figure(s). Of course, however, the method 72-400 may be carried out in any desired environment. It should also be noted that the aforementioned definitions may apply during the present description.

As shown, a device sends a request for a web page to a cloud source. See operation 72-402. In one embodiment, the device may include a mobile phone, which is requesting the web page from the cloud source. Furthermore, in one embodiment, the device may send device information. The device information may include any information capable of being utilized to determine characteristics associated with the device (e.g., a make, a model, a firmware version, an OS version, optimal settings, etc.) or characteristics of an environment associated with the device (e.g., ambient light, ambient temperature, etc.).

At the cloud source, it is determined whether a request for a web page is received. See decision 72-404. Additionally, it is determined whether device information is present. See decision 72-406.

If the request for the web page is received and device information is present, the device is determined. See operation 72-408. For example, in one embodiment, the cloud source may determine the device is a cell phone with a 208 pixel×208 pixel display and/or that the device is currently outdoors with high ambient light.

Based on the determined device and/or the device associated information, the cloud source may also determine whether there is an optimized web page available. See decision 72-410. If there is not an optimized web page available, in one embodiment, the cloud source may optimize a requested web page, based on the device associated information and/or the device. In another embodiment, the cloud source may send the requested web page.

If an optimized web page is available, the cloud source may select the optimized web page and make the web page available for download. See operations 72-412 and 72-414. For example, in one embodiment, the cloud source may select a web page optimized for a 208 pixel×208 pixel cell phone screen (e.g., if the device includes a 208 pixel×208 pixel cell phone screen, etc.).

In one embodiment, the cloud source may also select a .css style sheet optimized for outdoor viewing (e.g., white text on black background versus black text on white background for indoor viewing, etc.), if it is determined that the device is outside based on the supplied device associated information. In another embodiment, the cloud source may select a .css style sheet optimized for indoor viewing, if it is determined that the device is inside based on the supplied device associated information.

The device (e.g., with a 208 pixel×208 pixel screen, etc.) may then download the web page and an associated .css style sheet. See operation 72-416. Further, the device may apply the style sheet to the web page and render the page on the screen. See operation 72-418 and 72-420.

In one embodiment, in order to perform cloud-based services that may dynamically change a device behavior, the following steps may be performed: device identification (e.g., this device is a Nokia 6230i, etc.); read device parameters (e.g., screen size is 208 pixels×208 pixels, etc.); content modification (e.g., change video profiles in a movie, etc.).

One embodiment that includes device identification may employ detection based on the User-Agent request-header field in HTTP headers. The User-Agent field contains information about the user agent originating the request. The User-Agent field is intended for statistical purposes, the tracing of protocol violations, and automated recognition of user agents for the sake of tailoring responses to avoid particular user agent limitations. User agents should include this field with requests. The field can contain multiple product tokens and comments identifying the agent and any subproducts which form a significant part of the user agent. By convention, the product tokens are listed in order of their significance for identifying the application. The format is: User-Agent="User-Agent" ":" 1*(product|comment).

One example of a user-agent field may be as follows: Nokia7610/2.0 (5.0509.0) SymbianOS/7.0s Series60/2.1 Profile/MIDP-2.0 Configuration/CLDC-1.0. This User-Agent field may be used to identify the device as a Nokia 7610.

As another example the User-Agent field (e.g., for a tablet computer, etc.) may be as follows: Mozilla/5.0 (iPad; U; CPU OS OS 3_2 like Mac OS X; en-us) AppleWebKit/531.21.10 (KHTML, like Gecko) Version/4.0.4 Mobile/7B367 Safari/531.21.10.

The following exemplary code fragment may be used to detect a tablet PC using the User-Agent field:
$user_agent=$_SERVER['HTTP_USER_AGENT']; // get the user agent
. . .
case (preg_match('/ipad/i',$user_agent)); // match ipad in the user agent
. . .
One embodiment that includes device identification may employ user agent profiles that may be stored in a server, a profile repository. For example, a set of user agent profiles may describe the capabilities of Nokia cell phones and may be stored in a profile repository maintained by Nokia. The URL that points to the user agent profile of a mobile device may be found in the headers of requests sent by the mobile device.

One embodiment that includes device identification may use the User Agent Profile (UAProf) specification. The UAProf specification is related to the Composite Capabilities/Preference Profiles (CC/PP) specification. A UAProf uses the Resource Description Framework (RDF) as the schema. Both CC/PP and RDF were defined by the World Wide Web Consortium (W3C). UAProf is an XML document that contains information about the user agent type and device capabilities. A UAProf file typically has the file extension "rdf" or "xml", and is usually served with mimetype application/xml. A UAProf file may include data conforming to MMS, PSS5 and PSS6 schemas that include device capabilities.

To illustrate the use of UAProf for device identification, consider the following example. A device may send a header within an http request that may contain a URL that links to a UAProf. For example, an HTTP request sent by a Nokia 6230i cell phone may include the following line:
x-wap-profile: "http://ndsl.nds.nokia.com/uaprof/N6230ir200.xml".

The device may thus be identified as a N6230i model R200 manufactured by Nokia. The http header used for device identification may be "x-wap-profile", "wap-profile" or other similar headers. A UAProf file may be created by the device vendor (e.g., Nokia, Samsung, LG, etc.) or for some devices (e.g., CDMA/BREW etc.) the UAProf may be created by a telecommunications company (e.g., Verizon, Sprint, etc.).

One embodiment that includes device identification may use commercial (e.g., proprietary, non-standard, etc.) approaches to device identification that may combine various other approaches (e.g., UAProf, WURFL, etc.). Examples include DetectRight, DeviceAtlas, etc.

One embodiment that includes alternatives to device identification may include: the use of primitive (e.g., basic, lowest-common denominator, etc.) content for a large majority of devices; limit support to a known subset of devices; bypass the browser and develop a Java ME or BREW client application; etc.

In one embodiment, the User-Agent field (or other part(s) of a request etc.) may be modified by the device to transfer information (e.g., parameter, battery state, sensor reading, etc.) from a device to a cloud source and/or in order to simulate a different device, a device with changed characteristics, etc.

FIG. 72-5 shows a method 72-500 for device identification in order to modify information content, in accordance with another embodiment. As an option, the method 72-500 may be implemented in the context of the architecture and environment of the previous Figures or any subsequent Figure(s). Of course, however, the method 72-500 may be carried out in any desired environment. It should also be noted that the aforementioned definitions may apply during the present description.

As shown, a device makes an HTTP request to a cloud source including an HTTP header. See operation 72-502. Further, the cloud source parses the HTTP request for keywords (e.g., user-agent, x-wap-profile, etc.) and extracts the associated known string(s) (e.g., strings including Apple, Nokia, etc.). See operation 72-504.

Additionally, the cloud source may identify the device by manufacturer and/or model number according to predetermined formatting. See operation 72-506. For example, if "N6230ir200.xml" is found as a string, that is known to correspond to a Nokia 6230i model R200, rather than a Nokia model 62301R (which does not exist).

In various embodiments, different techniques may be used to read static parameters (e.g., fixed parameters, device specifications, unchanging parameters, fixed properties, fixed characteristics, common to all devices of the same type, etc.).

For example, the screen size of a device may be found in the ScreenSize attribute of the HardwarePlatform component of a UAProf. As an example, the x-wap-profile of a Nokia 6230i cell phone may be stored at the following URL: http://ndsl.nds.nokia.com/uaprof/N6230ir200.xml. The XML file N6230ir200.xml may contain the following data that provides information about screen size, for example:
<rdf:RDF>
... Header material omitted ...
<rdf:type rdf:resource="http://www.openmobilealliance.org/tech/profiles/UAPROF/ccppschema-20021212#HardwarePlatform"/>
... Body material omitted ...
<prf:ScreenSize>208×208</prf:ScreenSize>
</rdf:RDF>

One embodiment that includes device identification may use the Device Description Repository (DDR) proposed by the Mobile Web Initiative (MWI) Device Description Working Group (DDWG) of the W3C. An ecosystem of DDRs may reduce or eliminate the need for local device repositories. A DDR may be supported by a standard interface and provide a collection of device properties. Information in a DDR may include information such as the screen dimensions, input mechanisms, supported colors, known limitations, special capabilities etc.

One embodiment that includes device identification may use the Wireless Universal Resource FiLe (WURFL). The WURFL is a set of APIs and an XML configuration file that contains information about device capabilities and features for devices. The first WURFL API was in Perl followed by Java, PH, .NET Framework, Perl, Ruby, Python, XSLT, and C++. UAProf device profiles are one of the sources of device capability information for the WURFL. The WURFL maps the UAProfile schema and includes other items and fields (e.g., relating to device markup, multimedia capabilities, etc.). The WURFL allows development of content pages using abstractions of page elements (buttons, links and textboxes for example).

At run time, these abstractions may be converted to the appropriate, specific markup types for each device. The developer may specify other content decisions be made at runtime based on device specific capabilities and features in the WURFL. The WALL (Wireless Abstraction Library) is a JSP tag library that lets a developer author mobile pages similar to plain HTML, while delivering WML, C-HTML and XHTML Mobile Profile to the device from which the HTTP request originates, depending on the actual capabilities of the device itself. Device capabilities may be queried dynamically using the WURFL API. A WALL port to PHP (called WALL4PHP) is also available.

FIG. 72-6 shows a method 72-600 for obtaining and using static system parameters to modify information content, in accordance with another embodiment. As an option, the method 72-600 may be implemented in the context of the architecture and environment of the previous Figures or any subsequent Figure(s). Of course, however, the method 600 may be carried out in any desired environment. It should also be noted that the aforementioned definitions may apply during the present description.

As shown, a device makes an HTTP request to cloud source including an HTTP header. See operation 72-602. The cloud source parses the HTTP request for keywords (e.g., x-wapprofile, etc.) and extracts a database (e.g., repository, etc.) URL, if present. See operation 72-604.

Additionally, the cloud source extracts one or more desired fixed parameters (e.g., screen size, etc.) from the device database or repository. See operation 72-606. Further, the device and/or cloud source operates on one or more fixed system parameters (e.g., screen size, battery capacity, etc.) to calculate the type of modification to apply to the information content. See operation 72-608.

Still yet, the device and/or cloud source modify the information content. See operation 72-610.

Profiles and databases of various types (e.g., UAProf, WURFL, etc.) may include, but are not limited to, the following data fields (e.g., fixed parameters, device information, settings, preferences, profiles, specifications, capabilities, features, etc.): Bluetooth Profile, Headset Profile, Handsfree Profile, SIM Access Profile, Dial-up Networking Profile, Object Push Profile, File Transfer Profile, Generic Access Profile, Serial Port Profile, General Object Exchange Profile, Bits Per Pixel, Color Capable, Image Capable (e.g., JPEG, BMP, PNG, GIF, etc.), Input Char Set (e.g., ISO, ASCII, UTF, etc.), Keyboard, Model, Soft Keys, Pixel Aspect Ratio, Screen Size, Screen Width, Screen Height, Number of Screens, Type of Screen, Screen Color Depth, Touch Screen, E-Ink, LCD Type, Backlight, OS (e.g., Symbian, IOS, Android, etc.), Developer Platform, Screen Size Char (e.g., 8×5, etc.), Standard Font Proportional, Sound Output Capable, Text Input Capable, Vendor, Voice Input Capable, Audio Input Encoder, Application settings (e.g., Java, ring tones, radio presets, DRM settings (e.g., Forward Lock, Combined Delivery, Separate Delivery, etc.), WAP settings, bookmarks, etc.), CODECs (e.g., mp4, mp3, avi, H.263, AAC, etc.), email applications and email settings (e.g., POP, IMAP, maximum message size, etc.), Security Support (e.g., SSL, TLS, etc.), Radio Support and/or Network Protocols (e.g., GPRS, SMS, EGPRS, EDGE, UMTS, 3G, 4G, Wi-Fi, Bluetooth, etc.), Browser Support (e.g., HTML version, XHTML version, HTTPS, Cookies, Browser Name, Browser Version, Image Formats, JavaScript, Java Version, JavaVM, Frames, Useable Screen Size, Style Sheets, etc.), WAP settings, Date/Time Capability, Time Zone Capability, Device Vendor, Device Model, Year Released, Marketing Name, etc.

As an example, a database may include details of video player capabilities for a large number of mobile devices. In one exemplary embodiment, the entries in the database for a mobile phone and a table computer may be as shown in Table 1 below. Note that the 3GPP H.263 player capabilities are different.

TABLE 1

| Mobile Phone | Tablet Computer |
|---|---|
| WMV False | WMV False |
| 3GP H264 .level10 True | 3GP H264 .level10 True |
| 3GP H264 .level10b True | 3GP H264 .level10b True |
| 3GP H264 .level11 True | 3GP H264 .level11 True |
| 3GP H264 .level12 True | 3GP H264 .level12 True |
| 3GP H264 .level13 True | 3GP H264 .level13 True |
| 3GPP AAC LC True | 3GPP AAC LC True |
| 3GPP H.263 True | 3GPP H.263 False |
| 3GPP AMR NB True | 3GPP AMR NB True |
| 3GPP AMR WB False | 3GPP AMR WB False |
| MP4 H.264 Level 11 True | MP4 H.264 Level 11 True |
| MP4 H.264 Level 13 True | MP4 H.264 Level 13 True |
| MP4 AAC LC True | MP4 AAC LC True |

In one embodiment, the cloud source may determine the best encoder to be used for video content using an algorithm (e.g., method, flow, etc.). The algorithm may depend on such factors as battery charge, device location, etc. As part of the input to the algorithm, if the cloud source determines the device is a tablet computer, then the 3GPP H.263 option will not be used. There may be hundreds of such factors that may affect the choice of modification to the requested information content. Using one or more databases may provide a practical solution to the problem of passing these factors from a device to a cloud source.

In some cases, there may also be a need to make dynamic changes in system behavior as a result of one or more triggers based on gathering device and/or system parameters (e.g., battery state, network state, etc.). In one embodiment variable system parameters may be gathered (e.g., read, obtained, monitored, etc.) using a management information base (MIB). A MIB is a virtual database normally used to manage the parts of a communications network. The following Internet RFCs describe MIBs: RFC 1155, RFC 1213, RFC 1157. Objects in a MIB are defined using a subset of Abstract Syntax Notation One (ASN.1) called Structure of Management Information Version 2 (SMIv2) (RFC 2578). The software that parses a MIB is a MIB compiler. A MIB is hierarchical (e.g., tree-structured, etc.) and entries are addressed through object identifiers (object IDs, OIDs). The MIB hierarchy is a tree with a nameless root, with levels assigned by different organizations.

The top-level MIB OIDs may belong to different standards organizations, while lower-level OIDs may be allocated by associated organizations. This model may permit management across all layers of the OSI reference model. A managed object (a MIB object, object, or a MIB) is one of any number of specific characteristics of a managed device. Managed objects may consist of one or more object instances (identified by their OIDs) that are essentially variables.

Two types of managed objects exist: (1) scalar objects that define a single object instance; (2) tabular objects that define multiple related object instances that are grouped in MIB tables. An OID uniquely identifies a managed object in the MIB hierarchy.

The following data types exist in the SNMPv1 SMI: (a) Network addresses; (b) Counters that run from zero until they reach a maximum value and then reset to zero; SNMPv1 specifies a counter size of 32 bits; (c) Gauges may be non-negative integers that may increase or decrease between specified minimum and maximum values; (d) Time ticks count time since an event in hundredths of a second; (e) Opaques may be used to pass arbitrary information strings that do not conform to the strict data typing used by the SMI; (f) Integers. This data type redefines the integer data type, which has arbitrary precision in ASN.1 but bounded precision in the SMI; (g) Unsigned integers. This data type also redefines the integer data type.

As one example, a MIB for an Internet toaster device, in a file called toaster-mib, may be as follows:

```
TOASTER-MIB DEFINITIONS::=BEGIN
IMPORTS
   enterprises
   FROM RFC1155-SMI
   OBJECT-TYPE
   FROM RFC-1212
   Gauge
   FROM RFC1065-SMI;
epilogue OBJECT IDENTIFIER::={enterprises 12}
toaster OBJECT IDENTIFIER::={epilogue 2}
toasterControl OBJECT-TYPE
   SYNTAX INTEGER {up (1), down (2)}
   ACCESS read-write
```

STATUS mandatory
DESCRIPTION
"This variable controls the current state of the toaster. To begin toasting, set it to down (2). To abort toasting (perhaps in the event of an emergency), set it to up (2)."
    ::={toaster 3}
toasterDoneness OBJECT-TYPE
    SYNTAX INTEGER (1 . . . 10)
    ACCESS read-write
    STATUS mandatory
    DESCRIPTION
    "This variable controls how well-done is the toast. It should be on a scale of 1 to 10. Toast made at 10 generally is considered burned; toast made at 1 is warm."
    ::={toaster 4}
toasterToastType OBJECT-TYPE
    SYNTAX INTEGER {
    bread (1),
    waffle (2),
    bagel (3),
    pop-tart (4)
    }
    ACCESS read-write
    STATUS mandatory
    DESCRIPTION
    "This variable informs the toaster of the type of material that is being toasted. The toaster may use this information, combined with toasterToastDoneness, to compute the time the material must be toasted to achieve the required doneness."
    ::={toaster 5}
toasterTimeToDone OBJECT-TYPE
    SYNTAX INTEGER (0 . . . 65535)
    ACCESS read-write
    STATUS mandatory
    DESCRIPTION
    "This variable controls how long in seconds to finished toast."
    ::={toaster 6}
toasterPower OBJECT-TYPE
    SYNTAX Gauge
    ACCESS read-only
    STATUS mandatory
    DESCRIPTION
    "This variable returns the power being used by the toaster in Watts."
    ::={toaster 7}
END The Simple Network Management Protocol (SNMP) is a standard protocol for managing devices on IP networks. Using SNMP, one or more managers may monitor (e.g., manage, detect, supervise, control, etc.) one or more devices (e.g., group, hosts, system, network elements, etc.) on a computer network (e.g., system, Internet, LAN, WAN, home network, private network, etc.). Each managed system may run software (e.g., component, module, etc.) called an agent that reports information via SNMP to the manager. SNMP agents expose management data on the managed systems as variables. SNMP permits active management tasks, such as modifying and applying a new configuration through remote modification of variables.

A system managed by SNMP may include three components: (1) one or more managed devices; (2) agent software that runs on a managed device; (3) network management system (NMS) software that runs on the manager.

SNMP operates in the Application Layer (Layer 7 of the OSI model). The SNMP agent receives requests on UDP port 161. The manager may send requests from any available source port to port 161 in the agent. The agent response may be returned to the source port on the manager. The manager may receive notifications (e.g., Traps, InformRequests, etc.) on port 162. The agent may generate notifications from any available port. When used with Transport Layer Security (TLS) or Datagram Transport Layer Security (DTLS) requests may be received on port 10161 and traps may be sent to port 10162.

SNMPv1 specifies five basic Protocol Data Units (PDUs). Two other PDUs, GetBulkRequest and InformRequest were added in SNMPv2 and carried over to SNMPv3. All SNMP PDUs are constructed as follows: IP header /UDP header /version /community /PDU-type /request-id /error-status /error-index /variable bindings.

The seven SNMP protocol data units (PDUs) are shown in Table 2.

TABLE 2

1. GetRequest: A manager-to-agent request to retrieve the value of a variable or list of variables. Desired variables are specified in variable bindings (values are not used). Retrieval of the specified variable values is to be done as an atomic operation by the agent. A Response with current values is returned.
2. SetRequest: A manager-to-agent request to change the value of a variable or list of variables. Variable bindings are specified in the body of the request. Changes to all specified variables are to be made as an atomic operation by the agent. A Response with (current) new values for the variables is returned.
3. GetNextRequest: A manager-to-agent request to discover available variables and their values.
4. GetBulkRequest: Optimized version of GetNextRequest.
5. Response: Returns variable bindings and acknowledgement from agent to manager for GetRequest, SetRequest, GetNextRequest, GetBulkRequest and InformRequest (was GetResponse in SNMPv1).
6. Trap: Asynchronous notification from agent to manager. Includes current sysUpTime value, an OID identifying the type of trap and optional variable bindings.
7. InformRequest: Acknowledged asynchronous notification from manager to manager.

Using toaster-mib and SNMP an Internet toaster may be controlled and monitored as follows: (a) SetRequest may be used to set toasterDoneness; (b) SetRequest may be used to set toasterToastType; (c) SetRequest may be used to set toasterControl and begin toasting; (d) GetRequest may be used repeatedly to read toasterTimeToDone; (e) GetRequest may be used repeatedly to read toasterPower.

Thus, for example, by repeatedly reading toasterTimeToDone and toasterPower the total toasting energy used over the total toasting time may be calculated (e.g., toaster power is integrated over total toasting time, etc.).

The use of SNMP may be particularly suited to simple devices since SNMP is based on UDP. A UDP software stack may be much simpler, consume less power, etc. than a TCP/IP stack. SNMP also has the advantage of being a widely deployed standard with rigid and well-formed specifications. Of course, any protocol (simple or layered) may be used for parameter exchange.

In one embodiment, any protocol (e.g., IP, TCP, UDP, etc.) may be used to communicate fixed and variable data information between (e.g., in both directions, bidirectional, full duplex, etc.) device(s) and cloud source(s).

Similar embodiments may be used with other devices. For example, energy consumed by devices such as cell phones while playing movies may be monitored, back light levels and power consumed may be monitored, etc. As a result of monitoring such variables changes in content, changes in content delivery method(s), changes in device behavior(s), etc. may be made by the device, cloud server, or both.

The cloud server may be regarded as manager and the device as agent and the system as a combination of cloud server plus device(s). Alternatively, the device may monitor the cloud server or each may perform both agent and manager roles.

In one embodiment, one or more device parameters and/or system parameters may be continuously monitored and/or controlled in a system via network protocols (e.g., SNMP, etc.). In one embodiment, one or more device parameters and/or system parameters may be contained in a database (e.g., MIB, etc.).

FIG. 72-7 shows a method 72-700 for obtaining and using dynamic system parameters to modify information content, in accordance with another embodiment. As an option, the method 72-700 may be implemented in the context of the architecture and environment of the previous Figures or any subsequent Figure(s). Of course, however, the method 72-700 may be carried out in any desired environment. It should also be noted that the aforementioned definitions may apply during the present description.

As shown, a device makes an HTTP request to cloud source including an HTTP header. See operation 72-702. The cloud source (e.g., manager, etc.) monitors the device (e.g., agent, etc.). See operation 72-704. In one embodiment, the cloud source may monitor the device using SNMP and a device MIB.

Further, the manager issues commands (e.g., GetRequest in SNMP, etc.) to obtain variable parameters. See operation 72-706. The cloud source may optionally also obtain one or more desired fixed parameters (e.g., screen size, etc.). See operation 72-708.

Additionally, the device and/or cloud source operates on one or more fixed system parameters (e.g., screen size, battery capacity, connection capabilities, etc.) as well as one or more variable parameters (e.g., battery charge remaining, connection type(s) used, etc.) to calculate the type of modification to apply to the information content. See operation 72-710. Further, the device and/or cloud source modify the information content. See operation 72-712.

A typical 1.2v rechargeable alkaline C size battery is rated at 2200mAh or (1.2×2.2×60×60)=9.5 kJ. For example, a mobile phone battery may be rated at 1400mAh and 3.7V. As another example, a tablet computer battery may have a labeled capacity of 6930 mAh at nominal 3.8V. In some cases, an average tablet battery voltage over a full charge/discharge may be close to 3.6V with a capacity of 25 Wh corresponding to (25 Wh/3.6V)*1000=6944 mAh. Devices may thus have a wide range of power (e.g., capacity, run time, etc.) available. It may thus be important to present a range of alternative content.

In one embodiment, a manifest may be used to present alternative content and decision information to a device. Generally, both an overall manifest (e.g., with links to several quality levels, etc.) and a quality level manifest (with links to the several stream levels) may be used. In some cases (e.g., live streaming, etc.) a single quality level may be used.

The following is an example of an overall manifest, manifest.M3U8 that may provide energy information to the device. This overall manifest specifies three quality levels, with datarate, codecs, dimensions, and corresponding energies (e.g., normalized to a reference level, etc.).
EXTM3U
EXT-X-STREAM-INF:PROGRAM-ID=LBANDWIDTH=1280000,CODECS="vp8,vorbis", RESOLUTION=240×135, ENERGY=1.5
http://media.example.com/low.m3u8
EXT-X-STREAM-INF:PROGRAM-ID=LBANDWIDTH=2560000,CODECS="vp8,vorbis", RESOLUTION=640×360, ENERGY=2.5
http://media.example.com/mid.m3u8
EXT-X-STREAM-INF:PROGRAM-ID=1,BANDWIDTH=7680000,CODECS="vp8,vorbis", RESOLUTION=1280×720, ENERGY=5.7
http://media.example.com/hi.m3u8

In manifest.m3u8, the energy information in the EXT-X-STREAM-INF tag may allow the device and/or user to initially choose which quality to pick, or calculate estimated battery use to play the content at a chosen quality level, audio volume, screen brightness, backlight level, RF connection, etc.

In one embodiment, one or more overall manifests may be in different formats (e.g., Apple draft-pantos-http-live-streaming-04, Microsoft, Adobe, etc.). In one embodiment, the manifest may be in a standard format (e.g., approved Internet RFC format, IEEE, etc.) but with custom extensions (e.g., for energy, battery use, etc.). In other various embodiments, the manifest may be non-standard (e.g., commercial, proprietary, internet draft, etc.), an experimental (e.g., beta, trial, etc.) format, or any format that contains information that may be used to modify system behavior, etc.

The following is an example quality level manifest, low.m3u8, for a single quality level that contains a URL for each chunk for this quality level.
EXTM3U
EXT-X-MEDIA-SEQUENCE:0
EXT-X-TARGETDURATION:10
EXTINF:10, ENERGY=2.5
http://media.example.com/low_segment1.webm
EXTINF:10, ENERGY=3.5
http://media.example.com/low_segment2.webm
EXTINF:10, ENERGY=1.5
http://media.example.com/low_segment3.webm
EXT-X-ENDLIST In low.m3u8, the ENERGY information in the EXTINF tag may allow the device to adapt quality or other property etc. according to battery use for example.

In one embodiment, energy information may be presented to the device as a relative energy, normalized energy, absolute energy (e.g., in Joules, mAh, etc.), average power (e.g., milliWatts, etc.).

In one embodiment, energy information may be presented to the device in a database (e.g., matrix, list(s), table(s), spreadsheet, etc.) of information depending on (e.g., as a function of, indexed to, etc.) one or more factors (e.g., backlight intensity, wireless connection(s), etc.).

In one embodiment, one or more quality level manifests may be in different formats (e.g., Apple draft-pantos-http-live-streaming-04, Microsoft, Adobe, etc.). The manifest may be in a standard format (e.g., approved Internet RFC format, IEEE, etc.) but with custom extensions (e.g., for energy, battery use, etc.); may be non-standard (e.g., proprietary, internet draft, etc.), or any format that contains information that may be used to modify system behavior etc.

In one embodiment, the information used to modify system behavior may be contained in one or more manifests (e.g., overall manifest(s), quality level manifest(s), etc.) or may be a single manifest (or other equivalent data structure, etc.). Additionally, in one embodiment, the information used to modify system behavior may be separate from the manifest(s). Further, in one embodiment, the device may update (e.g., check for update, poll, continually poll, refresh, reload, etc.) the manifest(s). In one embodiment the device may update the manifest(s) in response to a change in one or more factors (e.g., environment, hardware attached, user changing device properties (e.g., backlighting, wireless connection, battery connected or connected to charger, etc.), combinations of these, or other change, etc.).

In one embodiment, the information in one or more manifests etc. may be used together with device identification to modify system behavior. For example, the type of device may be used with energy information may be used to obtain an estimate on battery energy required to play a movie. Thus, for example, manifest.M3U8 contains ENERGY=1.5 information for mid.m3u8. Suppose the device has been identified as an iPhone 4 with 1 GHz ARM Cortex-A8 processor, PowerVR SGX535GPU, Apple A4 chipset, and a 1420mAh battery. It may be calculated (e.g., by the device, by the cloud server, pre-calculated, etc.) using this information that playing mid.m3u8 will require 700mAh or about 50% of a fully charged iPhone 4 battery. Similar calculations may be made for low.m3u8 and high.m3u8. It may be calculated for example that playing high.m3u8 will require 150% of a fully charged iPhone 4 battery (i.e. cannot be played without recharging, etc.).

In one embodiment, the user may be prompted to make decisions on which selection (e.g., format, screen size, quality level, etc.) to play initially based on energy requirements and energy available. Information presented to the device user may include battery percentage required, battery life left after playing, etc.

In one embodiment, options that may not be available and/or possible (e.g., battery life insufficient, etc.) may be eliminated from selection. The user may for example control this and other similar behaviors through settings (e.g., preferences, etc.).

In one embodiment, the initial selection between quality levels (e.g., screen size, resolution, etc.) may be made automatically (e.g., based on highest quality that can be played with current battery level, wireless connection, etc.). After making an initial selection, the device and cloud-based server may continue to monitor use (e.g., battery life, energy use, location, wireless connection type, environment, etc.).

Suppose, for example, that the user decides to move outdoors, or change from home viewing to automobile viewing, or switch on a light at home, etc. These changes in use, environment, location etc. may be sensed by any means (e.g., ambient light sensor, GPS location, connected devices, network changes, wireless connection change(s) (e.g., 3G to Wi-Fi, etc.), etc.). In one or more of these example scenarios, the device (or user, etc.) may increase display brightness to allow proper viewing. The change may thus result in increased energy use.

In one embodiment, the device may now calculate there is insufficient battery life to continue playing at the current quality level. Using energy information in the manifest(s), the device may now change the quality level based on new calculations.

In one embodiment, the cloud server may monitor the device (e.g., using SNMP and a MIB, etc.). The device may provide updated information on current energy use (e.g., Watts, Joules etc. consumed by the movie player, wireless, etc; battery life remaining; etc.) to the cloud sever. The cloud server may then adapt (e.g., change, modify, alter, etc.) the content, connection etc. automatically to allow the user to watch the entire movie in changing conditions etc.

The iPad 10-inch LCD display uses a battery that is more than five times the capacity of the iPhone 3GS battery. The iPad screen consumes about 2 watts and drains the battery in 12 hours by itself, most of the power consumed is by the back light. Thus backlighting may be a first important component of energy use.

A cell phone or other mobile device etc. may use a variety of wireless connections, including (but not limited) to one or more of the following: 3G, 4G, GSM, Wi-Fi, etc. The energy (e.g., Joules (J), work, also power measured in Watts (J/s, energy per unit time, rate at which energy is transferred, used, transformed, etc.), battery percentage, etc.) spent (e.g., consumed, required, needed, etc.) transferring data over a wireless connection may be second important component of energy use.

The energy spent transferring data over a wireless connection may be divided into one or more portions (e.g., pieces, parts, periods of time, etc.) by measuring the energy used in one or more connection states (e.g., modes, etc.). Typically a first portion may be a ramp energy spent in one or more ramp states, the energy required (e.g., wasted, overhead, etc.) to switch from a low-power (e.g., idle, sleep, etc.) mode (e.g., state, etc.) to a high-power transmit mode; a second portion may be a transfer energy spent in one or more transfer states, the energy required to transfer data; a third portion may be a tail energy spent in one or more tail states, the energy required (e.g., wasted in high-power states, etc.) after data transfer is complete. The ramp time, the time spent in the ramp state(s), is typically small compared to the tail time, the time spent in tail state(s). For 3G the tail energy for a small data transfer (e.g., 50 kB) may be 50% or more of the total energy required.

In one embodiment the system (e.g., device, cloud server, device in cooperation with cloud server, combinations of cloud server, device and other compute elements; etc.) may calculate energy use based on the energy used in one or more wireless connection states.

In one embodiment, the system (e.g., device, cloud server, device in cooperation with cloud server, combinations of cloud server, device and other compute elements; etc.) may present options (e.g., via manifest(s), etc.) that may depend on functions of several variables. For example the cloud server may return a manifest to the requesting device that shows energy requirements for a specific device (e.g., CPU, etc.) with a given backlighting and under different ambient light conditions, with a certain wireless connection, etc.

Note that in this example, even though a device may adjust backlighting automatically depending on ambient light, the cloud server may adjust content (e.g., CODEC, contrast, font sizes, etc.) that may depend on the ambient light and thus the content may require different energies to be played with different ambient lights independently of different backlight settings. It is thus important to recognize that even variables that appear to be dependent may be used in an independent fashion to determine system behavior (e.g., information provided to a device, modification of content, etc.)

Thus, for example, the relative energy requirements (e.g., normalized to a reference value, etc.) to play http://media.example.com/low.m3u8 may be as shown in Table 3.

TABLE 3

|  | Low Backlight | Medium Backlight | High Backlight |
| --- | --- | --- | --- |
| Low Ambient Light | 0.9 | 1.0 | 1.1 |
| Medium Ambient Light | 1.3 | 1.5 | 1.7 |
| High Ambient Light | 1.5 | 1.9 | 2.0 |

For example, in manifest.M3U8 this information may be represented in linear tabular form (e.g., CSV, etc.) as follows:
EXT-X-STREAM-INF: ENERGY_TABLE=(0.9, 1.0, 1.1, 1.3, 1.5, 1.7, 1.5, 1.9, 2.0)

In one embodiment, information monitored by the system may include backlight intensity. Additionally, in one embodiment, information monitored by the system may include ambient light intensity. For example, as ambient light changes the device may switch to a different stream based on information in the manifest(s) etc.

In one embodiment, information monitored by the system may include user location (e.g., indoors, outdoors, in a car, etc.). For example, if the user moves from indoors to outdoors, energy requirements etc. may change, etc. The device may then switch to a different stream.

In one embodiment, information monitored by the system may include connected devices (e.g., type, screen size, other properties, etc.). For example, the user may be using a mobile phone to drive an LCD flat-panel TV in the home and then transfer the mobile phone to an automobile docking station attached to an in-car video display. The device may then switch to a different stream.

In one embodiment, multiple combinations of variables (e.g., location, ambient light, backlight, RF connection, etc.) may be monitored by the system in order to present different information to the device (e.g., in manifests, etc.), modify content (e.g., change streams, CODECs, etc.). As a result of changing information (e.g., in manifest(s), etc.) the device may then switch to a different stream.

FIGS. 72-8A and 72-8B show a method 72-800 for utilizing manifests to control system behavior and modify information content, in accordance with another embodiment. As an option, the method 72-800 may be implemented in the context of the architecture and environment of the previous Figures or any subsequent Figure(s). Of course, however, the method 72-800 may be carried out in any desired environment. It should also be noted that the aforementioned definitions may apply during the present description.

As shown, the device makes an HTTP request to a cloud source. See operation 72-802. The cloud source (e.g., manager, etc.) monitors the device (e.g., agent, etc.). See operation 72-804. In one embodiment, the cloud source may monitor the device using SNMP and a device MIB. Further, the manager issues commands (e.g., GetRequest in SNMP, etc.) to obtain variable parameters. See operation 72-806.

The cloud source may optionally obtain one or more desired fixed parameters (e.g., screen size, etc.). See operation 72-808. The cloud source then operates on one or more fixed system parameters (e.g., screen size, battery capacity, etc.), as well as one or more variable parameters (e.g., battery charge remaining, RF connection, etc.) to calculate the type of modification to apply to the information content. See operation 72-810.

Additionally, the cloud source creates an overall manifest (e.g., M3U8 file, etc.) that lists a menu (e.g., set, selection, list, playlist, alternatives, etc.) of possibly modified information content. See operation 72-812. The manifest may provide different formats for different screen sizes, different power/energy levels, etc.

As shown further in FIG. 72-8B, the device operates on one or more fixed system parameters (e.g., screen size, battery capacity, etc.) as well as one or more variable parameters (e.g., battery charge remaining, RF connection, etc.) to calculate the type of information content to select from the overall manifest. See operation 72-814.

The device then initiates a download of information content based on the overall manifest. See operation 72-816. The device may then continue to download chunks of information content listed in one or more quality level manifests.

The device and/or cloud source may continue (e.g., dynamically, etc.) to operate (e.g., process, monitor, etc.) on one or more fixed system parameters (e.g., screen size, battery capacity, etc.) as well as one or more variable parameters (e.g., battery charge remaining, RF connection, etc.) to calculate any changes required and/or desired in the type of modification to apply to the information content. See operation 72-818.

As a result of operation 72-818, the device may further (e.g., dynamically., etc.) modify information content (e.g., change streams using alternative sources listed in the quality level manifest, alter device settings, style sheets, etc.). See operation 820. In one embodiment, operations 72-818 and 72-820 may form a continuous loop until the current request is completed (e.g., a movie is finished, application is closed, etc.) or a new request is made.

FIG. 72-9 illustrates an exemplary system 72-900 in which the various architecture and/or functionality of the various previous embodiments may be implemented. As shown, a system 72-900 is provided including at least one host processor 72-901 which is connected to a communication bus 72-902. The system 72-900 may also include a main memory 72-904. Control logic (software) and data are stored in the main memory 72-904 which may take the form of random access memory (RAM).

The system 72-900 may optionally include a graphics processor 72-906 and a display 72-908, i.e. a computer monitor. In one embodiment, the graphics processor 72-906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 72-900 may also include a secondary storage 72-910. The secondary storage 72-910 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 72-904 and/or the secondary storage 72-910. Such computer programs, when executed, enable the system 72-900 to perform various functions. Memory 72-904, storage 72-910 and/or any other storage are possible examples of computer-readable media.

In one embodiment, the architecture and/or functionality of the various previous figures may be implemented in the context of the host processor 72-901, graphics processor 72-906, an integrated circuit (not shown) that is capable of at least a portion of the capabilities of both the host processor 72-901 and the graphics processor 72-906, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 72-900 may take the form of a desktop computer, lap-top computer, and/or any other type of logic. Still yet, the system 72-900 may take the form of various other devices including, but not limited to, a personal digital assistant (PDA) device, a mobile phone device, a television, etc.

Further, while not shown, the system 72-900 may be coupled to a network [e.g., a telecommunications network, local area network (LAN), wireless network, wide area network (WAN) such as the Internet, peer-to-peer network, cable network, etc.] for communication purposes.

The use of cellular phones has grown rapidly. In response an ecosystem has developed to provide services such as video, news, search and so on. Improvements in these cloud-based services are required to meet consumer demands for increased performance, more features, greater ease of use, and so on.

In different optional embodiments, various features disclosed herein may or may not be helpful in different contexts. For example, devices may or may not exhibit significant differences in the way they handle mobile data content. It may be difficult for mobile developers to support the increasing numbers of devices. The cost of application development, testing and the devices may make mobile development expensive compared to non-mobile development. HyperText Markup Language (HTML) is the predominant markup language for web pages. The desktop web-channel (e.g., content delivered to desktop PCs, non-mobile market, etc.) comprises a relatively small number of standard desktop browsers (e.g., Internet Explorer, Mozilla Firefox, Safari, Opera, etc.) that use HTML. Content in HTML can be expected to be visible (e.g., readable, easy to view, properly formatted, reliably displayed, etc.) using one of the standard desktop browsers. Software updates for desktop browsers may be frequent and widely distributed. In contrast, in the mobile device-channel, there may be an amount of fragmentation (e.g., diversification, differences, etc.). Markup may use WML, HTML, HDML, XHTML Mobile Profile, etc. In addition, the properties of a mobile-device channel may vary (e.g., screen sizes, ability to support client side scripting, ability to support various image formats, color, etc.). Because the content and markup is generally sent directly to a phone, there may be no opportunity for a central server to fix (e.g., adapt, alter, modify, etc.) content to match mobile browser limitations or defects. Software updates for mobile browsers are rare. There is therefore an urgent need to provide mobile content that may be modified (e.g., tailored, customized, altered, adapted, modified, translated, transformed, repurposed, etc.) to mobile devices. In particular, there may be a need for cloud-based services to provide increased performance (e.g., faster delivery, lower latency, higher bandwidth, better video and sound quality, reduced power consumption, higher fidelity, better visibility, etc.), more features (e.g., greater choice, tailored content, better security, etc.), greater ease of use (e.g., automatic content customization, user adaptation, location awareness, etc.), and so on. In such optional embodiments, any of the features disclosed herein may or may not be employed for enhancing functionality.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
    code for receiving a first signal indicative of a first manipulation of a first touchscreen interface positioned on a first side face of a device that includes a second touchscreen interface on a second front face thereof;
    code for altering a first user experience in connection with the second touchscreen interface as a function of the first signal;
    said computer program product further operable for:
        displaying a plurality of user interfaces utilizing the first touchscreen interface positioned on the first side face of the device, the plurality of user interfaces including:
            a first user interface including a plurality of favorite objects representative of favorite applications for allowing access thereto utilizing the second touchscreen interface on the second front face of the device in response to a selection thereof, and
            a second user interface including a plurality of setting objects representative of settings for selection;
        receiving a first gesture along a first axis of a common axis system utilizing the first touchscreen interface positioned on the first side face of the device;
        in response to the first gesture along the first axis of the common axis system, performing a first function for displaying the first user interface including the plurality of favorite objects representative of the favorite applications for allowing access thereto utilizing the second touchscreen interface in response to the selection thereof;
        receiving a second gesture along a second axis of the common axis system utilizing the first touchscreen interface positioned on the first side face of the device;
        in response to the second gesture along the second axis of the common axis system, performing a second function;
    code for receiving a second signal indicative of a second manipulation of the second touchscreen interface positioned on the second front face of the device; and
    code for altering a second user experience in connection with the first touchscreen interface as a function of the second signal;
    said computer program product further operable for:
        displaying a third user interface utilizing the second touchscreen interface positioned on the second front face of the device, the third user interface including at least one option for selecting the plurality of the favorite objects representative of the favorite applications to be displayed utilizing the first user interface on the first touchscreen interface positioned on the first side face of the device;
        receiving an input in connection with the at least one option of the third user interface utilizing the second touchscreen interface positioned on the second front face of the device; and
        in response to the input in connection with the at least one option of the third user interface utilizing the second touchscreen interface positioned on the second front face of the device, displaying the selected plurality of the favorite objects representative of the favorite applications to be displayed utilizing the first user interface on the first touchscreen interface positioned on the first side face of the device.

2. The computer program product of claim 1, the computer program product is operable such that at least one of:
    at least one of the first manipulation or the second manipulation includes at least one of a gesture, touch input, or pressure magnitude;

said first touchscreen interface is positioned on an entirety of the first side face of the device;
said first touchscreen interface is positioned in a first plane that is angled with respect to a second plane in which the second touchscreen interface is positioned;
at least one of the first user experience or the second user experience is altered by at least one of causing input to the device, causing output from the device, or causing processing by the device;
said favorite objects including application icons;
said setting objects including setting icons;
at least one of the settings includes at least one of a volume setting or a brightness setting;
at least one of the first gesture or the second gesture including swipe gestures;
said first gesture includes a first swipe gesture and the second gesture includes a second swipe gesture 90 degrees offset from the first swipe gesture;
said second function includes displaying at least a portion of the first user interface;
said first touchscreen interface is curved;
said at least one feature includes at least one of an operation of the first touchscreen interface or an aspect of the operation;
said first touchscreen interface is separate from the second touchscreen interface; or
said at least one option is a single option for enabling a single feature.

3. An apparatus, comprising:
a device including circuitry configured for:
receiving a first signal indicative of a first manipulation of a first touchscreen interface positioned on a first side face of the device that includes a second touchscreen interface on a second front face thereof;
altering a first user experience in connection with the second touchscreen interface as a function of the first signal;
displaying a plurality of user interfaces utilizing the first touchscreen interface positioned on the first side face of the device, the plurality of user interfaces including:
  a first user interface including a plurality of favorite objects representative of favorite applications for allowing access thereto utilizing the second touchscreen interface on the second front face of the device in response to a selection thereof, and
  a second user interface including a plurality of setting objects representative of settings;
receiving a first gesture along a first axis of a common axis system utilizing the first touchscreen interface positioned on the first side face of the device;
in response to the first gesture along the first axis of the common axis system, performing a first function for displaying the first user interface including the plurality of favorite objects representative of the favorite applications for allowing access thereto utilizing the second touchscreen interface in response to the selection thereof;
receiving a second gesture along a second axis of the common axis system utilizing the first touchscreen interface positioned on the first side face of the device;
in response to the second gesture along the second axis of the common axis system, performing a second function;
receiving a second signal indicative of a second manipulation of the second touchscreen interface positioned on the second front face of the device;
altering a second user experience in connection with the first touchscreen interface as a function of the second signal;
displaying a third user interface utilizing the second touchscreen interface positioned on the second front face of the device, the third user interface including at least one option for selecting the plurality of the favorite objects representative of the favorite applications to be displayed utilizing the first user interface on the first touchscreen interface positioned on the first side face of the device;
receiving an input in connection with the at least one option of the third user interface utilizing the second touchscreen interface positioned on the second front face of the device; and
in response to the input in connection with the at least one option of the third user interface utilizing the second touchscreen interface positioned on the second front face of the device, displaying the selected plurality of the favorite objects representative of the favorite applications to be displayed utilizing the first user interface on the first touchscreen interface positioned on the first side face of the device.

4. A device, comprising:
a first touchscreen interface positioned on a first side face of the device;
a second touchscreen interface positioned on a second front face of the device; and
circuitry configured for:
  displaying a plurality of user interfaces utilizing the first touchscreen interface positioned on the first side face of the device, the plurality of user interfaces including:
    a first user interface including a plurality of favorite objects representative of favorite applications for allowing access thereto utilizing the second touchscreen interface on the second front face of the device in response to a selection thereof, and
    a second user interface including a plurality of setting objects representative of settings;
  receiving a first gesture along a first axis of a common axis system utilizing the first touchscreen interface positioned on the first side face of the device;
  in response to the first gesture along the first axis of the common axis system, performing a first function for displaying the first user interface including the plurality of favorite objects representative of the favorite applications for allowing access thereto utilizing the second touchscreen interface in response to the selection thereof;
  receiving a second gesture along a second axis of the common axis system utilizing the first touchscreen interface positioned on the first side face of the device;
  in response to the second gesture along the second axis of the common axis system, performing a second function;
  displaying a third user interface utilizing the second touchscreen interface positioned on the second front face of the device, the second user interface including at least one option for selecting the plurality of the favorite objects representative of the favorite applications to be displayed utilizing the first user interface on the first touchscreen interface positioned on the first side face of the device;
  receiving an input in connection with the at least one option of the third user interface utilizing the second touchscreen interface positioned on the second front face of the device; and
  in response to the input in connection with the at least one option of the third user interface utilizing the second touchscreen interface positioned on the second front face of the device, displaying the selected plurality of the favorite objects representative of the favorite applications to be displayed utilizing the first user interface on the first touchscreen interface positioned on the first side face of the device.

5. The device of claim 4, wherein the device is operable such that, in response to a selection of at least one of the plurality of favorite objects representative of at least one of the favorite applications, access to the at least one favorite application is allowed, during which at least one application-specific option associated with the at least one favorite application is displayed for selection of a feature application-specific option.

6. The device of claim 4, wherein the device is operable such that, in response to a selection of at least one of the plurality of favorite objects representative of at least one of the favorite applications, access to the at least one favorite application is allowed, during which at least one application-specific feature associated with the at least one favorite application is displayed.

7. The device of claim 4, wherein the device is operable such that, in response to a selection of at least one of the plurality of favorite objects representative of at least one of the favorite applications, access to the at least one favorite application is allowed, during which at least one application-specific gesture associated with the at least one favorite application is capable of being received utilizing the first touchscreen interface positioned on the first side face of the device for utilizing an application-specific feature.

8. The device of claim 4, wherein the device is operable such that, in response to a selection of at least two of the plurality of favorite objects representative of at least two of the favorite applications utilizing the first touchscreen interface positioned on the first side face of the device, simultaneous access is allowed to both of the at least two favorite applications.

9. The device of claim 4, wherein the device is operable such that, in response to a selection of at least one of the plurality of favorite objects representative of at least one of the favorite applications, access to the at least one favorite application is allowed, and at least one application-specific option associated with the at least one favorite application is displayed for utilizing the feature application-specific option which utilizes at least one aspect of the at least one of the favorite application in connection with at least one other favorite application.

10. The device of claim 4, wherein the device is operable such that, in response to different selections of different favorite objects representative of different favorite applications displayed on a home screen utilizing the first touchscreen interface positioned on the first side face of the device, switching is effected between the different favorite applications which are active in a multitasking environment.

11. The device of claim 4, wherein the device is operable such that the favorite applications represented by the favorite objects displayed utilizing the first touchscreen interface positioned on the first side face of the device, are capable of including a search application, a contacts application, a messaging application, a telephone application, an e-mail application, a digital camera application, and a digital music player application.

12. The device of claim 4, wherein the device is operable such that a date and time are capable of being displayed utilizing the first touchscreen interface positioned on the first side face of the device.

13. The device of claim 4, wherein the device is operable such that manipulations of the first touchscreen interface positioned on the first side face of the device are capable of being received for triggering different features based on a pressure of the manipulations.

14. The device of claim 4, wherein the device is operable such that an output of the first touchscreen interface positioned on the first side face of the device is a function of an orientation of the device.

15. The device of claim 4, wherein the device is operable such that an interface context displayed utilizing the first touchscreen interface positioned on the first side face of the device is capable of being changed in response to manipulation of the first touchscreen interface positioned on the first side face of the device.

16. The device of claim 4, wherein the device is operable such that the second function includes changing between a displaying among at least the first user interface including the plurality of favorite objects representative of the favorite applications for allowing access thereto utilizing the second touchscreen interface in response to the selection thereof, and the second user interface.

17. The device of claim 4, wherein the first touchscreen interface is curved and the second touchscreen interface is planar.

18. The device of claim 4, wherein the device is operable such that a first brightness of at least a portion of the first touchscreen interface is capable of being different than a second brightness of at least a portion of the second touchscreen interface.

19. The device of claim 4, wherein the device is operable such that a position of the first touchscreen interface is configured for simultaneous viewing of first content displayed utilizing the first touchscreen interface and second content displayed utilizing the second touchscreen interface, without obstructing the second content displayed utilizing the second touchscreen interface.

20. The device of claim 4, wherein the device is operable such that each of:
at least one of the first manipulation or the second manipulation includes at least one of a gesture, touch input, or pressure magnitude;
at least one of the first user experience or the second user experience is altered by at least one of causing input to the device, causing output from the device, or causing processing by the device;
said favorite objects including application icons;
said setting objects including setting icons;
at least one of the first gesture or the second gesture including swipe gestures;
said first gesture includes a first swipe gesture and the second gesture includes a second swipe gesture 90 degrees offset from the first swipe gesture;
said first touchscreen interface is curved.

21. The device of claim 4, wherein the device is operable such that the first function includes switching the display to the first user interface from the second user interface.

* * * * *